US010868628B1

(12) United States Patent
Hu et al.

(10) Patent No.: US 10,868,628 B1
(45) Date of Patent: Dec. 15, 2020

(54) METHOD AND APPARATUS FOR GENERATING AND IMPLEMENTING SPECTRALLY-EFFICIENT ORTHOGONAL CODES FOR WIRELESS COMMUNICATIONS

(71) Applicant: HUAWEI TECHNOLOGIES CO., LTD., Guangdong (CN)

(72) Inventors: Lan Hu, Ottawa (CA); Sai Mohan Kilambi, Nepean (CA); David Neal Wessel, Kanata (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/373,333

(22) Filed: Apr. 2, 2019

(51) Int. Cl.
*H04B 7/26* (2006.01)
*H04J 13/12* (2011.01)
*H04B 1/7103* (2011.01)

(52) U.S. Cl.
CPC ............ *H04J 13/12* (2013.01); *H04B 1/7103* (2013.01); *H04B 7/2634* (2013.01); *H04B 2201/709709* (2013.01)

(58) Field of Classification Search
CPC ..... H04J 12/12; H04B 1/7103; H04B 7/2634; H04B 375/145
See application file for complete search history.

(56) References Cited

U.S. PATENT DOCUMENTS

2002/0064211 A1* 5/2002 Chen ................. H04W 56/0085 375/149
2009/0252051 A1* 10/2009 Yu ......................... H04L 5/0032 370/252

(Continued)

FOREIGN PATENT DOCUMENTS

CN 1356799 A 7/2002
WO 0019730 A2 4/2000

OTHER PUBLICATIONS

ZTE et al. Details on physical layer SR for NB-IoT, 3GPP TSG RAN WG1 Meeting #92, R1-1801602, Athens, Greece, Feb. 26-Mar. 2, 2018, total 4 pages.

(Continued)

*Primary Examiner* — Ted M Wang
(74) *Attorney, Agent, or Firm* — BCF LLP

(57) ABSTRACT

The disclosed systems, structures, and methods are directed to a spectrally-efficient orthogonal code generation architecture. The configurations presented herein employ a full-set code generation module configured to generate a candidate code group, wherein the candidate code group contains $2^L$ different codes for a given code length L, a frequency response calculation module configured to calculate frequency response of the codes within the candidate code group and a frequency code searching module configured to search the orthogonal codes within each frequency code group. In addition, the grouping of codes is done on the basis of number of frequency locations and positions, one or more code sets are formed within each frequency code group, (Continued)

codes within code sets are orthogonal in nature and orthogonal codes along with their identifier information are stored in a database forming an orthogonal code list.

31 Claims, 12 Drawing Sheets

(56) References Cited

U.S. PATENT DOCUMENTS

| | | | | |
|---|---|---|---|---|
| 2009/0323776 | A1* | 12/2009 | Greenwood | H04B 1/707 375/146 |
| 2015/0063424 | A1 | 3/2015 | Jos et al. | |
| 2015/0155878 | A1 | 6/2015 | Macleod | |
| 2016/0192398 | A1* | 6/2016 | Wang | H04J 11/00 370/329 |

OTHER PUBLICATIONS

International Search Report and Written Opinion of PCT/CN2020/083025; Guirong Lin; dated Jun. 30, 2020.

* cited by examiner

METHOD AND APPARATUS FOR GENERATING AND IMPLEMENTING SPECTRALLY-EFFICIENT ORTHOGONAL CODES FOR WIRELESS COMMUNICATIONS

CROSS-REFERENCE TO RELATED APPLICATIONS

This is the first application filed for the instantly disclosed technology.

FIELD OF THE INVENTION

The present invention generally relates to the field of wireless communications and, in particular, to a spectrally-efficient orthogonal code generation apparatus and method for wireless communication applications such as, CDMA, LTE, 4G, 5G, etc.

BACKGROUND

Typically, in multiple access-based wireless communications, numerous user devices transmit signals over a wireless communication channel to a receiver. The transmitted signals are configured to spread across a wide frequency spectrum using orthogonal codes and are superimposed, forming a combined signal that propagates over the wireless channel. Upon receipt, the receiving device performs a separation operation, utilizing the orthogonal codes, on the combined signal to recover one or more individual signals from the combined signal. By separating signals transmitted by different user devices, the different user devices may share the same communication channel without interference.

In general, one or more orthogonal codes may be utilized to provide spread spectrum-based communications, where one or more orthogonal codes are allocated to a user. By virtue of the orthogonality properties of the codes, different users may effectively communicate along the same wireless channel with minimal interference.

While orthogonality-based codes, such as, for example, Walsh-Hadamard Codes, Gold Codes, Kasami Codes, etc. codes as well as their generators are well known in the art, these codes and code generators do not consider the spectral bandwidth efficiency of these codes as a factor in code generation criteria. As such, the generated orthogonal codes may prove to be spectrally inefficient in practice, which results in limitations regarding data transmission rates.

The drawback noted may be further exacerbated by certain proposed enhancements to existing orthogonal code generators as well as next-generation orthogonal code generators. Such enhancements and designs suggest, for example, the use of variable length orthogonal codes, quasi orthogonal codes etc. Such codes still do not consider spectrum efficiency factors, potentially requiring demanding modifications to existing or next-generation hardware and software processing resources.

SUMMARY

An object of the present disclosure is to provide a spectrally-efficient orthogonal code generation architecture for generating spectrally efficient orthogonal codes. The disclosure presented herein employs a code generation module configured to generate a candidate code group, wherein the candidate code group contains $2^L$ different codes for a given code length L. A frequency response calculation module configured to calculate frequency response of the codes within the candidate code group. A code grouping module configured to divide the codes within the candidate group into a unique frequency code group and a mixed frequency code group, based on frequency response of the codes within the candidate code group. A frequency code searching module configured to search the orthogonal codes within each frequency code group.

In accordance with other aspects of the present disclosure, the spectrally-efficient orthogonal code generation architecture performs grouping of the codes. For a number of frequency locations N, the codes having same number of frequency locations N and frequency components positioned at same frequency locations are grouped to form the unique frequency code groups. Further one or more code sets are formed within each unique frequency code group, the codes within code sets are orthogonal in nature.

In accordance with other aspects of the present disclosure, the spectrally-efficient orthogonal code generation architecture performs grouping of the codes. For a number of frequency locations N, the codes having same number of frequency locations N and frequency components positioned at same frequency locations, in addition to the codes having the number of frequency locations less than N with a condition that the positions of all the frequency components of such codes will overlap with some positions of frequency components of codes having N frequency locations are grouped to form the mixed frequency code groups. Further one or more code sets are formed within each unique frequency code group, the codes within code sets are orthogonal in nature.

In accordance with other aspects of the present disclosure, the spectrally-efficient orthogonal code generation architecture generates the codes within code sets that have zero un-shifted cross correlation, minimum value of maximum side lobe, and minimum value of total side lobe.

In accordance with other aspects of the present disclosure, spectrally-efficient orthogonal code generation architecture further generates an orthogonal code of length 2L within a code set by repeating the orthogonal code of length L.

In accordance with other aspects of the present disclosure, spectrally-efficient orthogonal code generation architecture further stores an identifier information and the corresponding orthogonal code in a database forming a orthogonal code list, wherein the identifier information can be at least one of the following, a number of code sets in the unique frequency code group, a number of codes in a code set, a number of frequency components in each code, a number of overlapped frequency positions, a location of frequency component of each code, a length of each code.

In accordance with other aspects of the present disclosure, there is provided a method of generating spectrally efficient orthogonal codes. The disclosure presented herein operates to generate a candidate code group, wherein the candidate code group contains $2^L$ different codes for a given code length L and calculates a frequency response of the codes within the candidate code group. The candidate group is divided into two categories of frequency code groups, based on frequency response of the codes within the candidate code group. The frequency code groups are then searched for orthogonal codes.

In accordance with other aspects of the present disclosure, the method of generating a spectrally-efficient orthogonal code includes grouping of the codes. For a number of frequency locations N, the codes having same number of frequency locations N and frequency components positioned at same frequency locations are grouped to form the unique frequency code groups. Further one or more code sets are formed within each unique frequency code group, the codes within code sets are orthogonal in nature.

In accordance with other aspects of the present disclosure, the method of generating a spectrally-efficient orthogonal code includes grouping of the codes. For a number of frequency locations N, the codes having same number of frequency locations N and frequency components positioned at same frequency locations, in addition to the codes having the number of frequency locations less than N with a condition that the positions of all the frequency components of such codes will overlap with some positions of frequency components of codes having N frequency locations are grouped to form the mixed frequency code groups. Further one or more code sets are formed within each unique frequency code group, the codes within code sets are orthogonal in nature.

In accordance with other aspects of the present disclosure, the method of generating a spectrally-efficient orthogonal code includes generation of codes within code sets that have zero un-shifted cross correlation, minimum value of maximum side lobe, and minimum value of total side lobe.

In accordance with other aspects of the present disclosure, the method of generating a spectrally-efficient orthogonal code further generates an orthogonal code of length 2L within a code set by repeating the orthogonal code of length L.

In accordance with other aspects of the present disclosure, the method of generating a spectrally-efficient orthogonal code further stores an identifier information and the corresponding orthogonal code in a database forming a orthogonal code list, wherein the identifier information can be at least one of the following, a number of code sets in the unique frequency code group, a number of codes in a code set, a number of frequency components in each code, a number of overlapped frequency positions, a location of frequency component of each code, a length of each code.

In accordance with other aspects of the present disclosure, there is provided a method for wireless communication system. The disclosure presented herein operates to encode an input signal. The encoded input signal is then spread using a suitable orthogonal code selected from a list of orthogonal codes. The orthogonal codes used for spreading are generated by generating a candidate code group, wherein the candidate code group contains $2^L$ different codes for a given code length L and calculates a frequency response of the codes within the candidate code group. The candidate group is divided into two categories of frequency code groups, based on frequency response of the codes within the candidate code group. The frequency code groups are then searched for orthogonal codes. The spread signal is then modulated and transmitted.

In accordance with other aspects of the present disclosure, the method for wireless communication system includes grouping of codes. For a number of frequency locations N, the codes having same number of frequency locations N and frequency components positioned at same frequency locations are grouped to form the unique frequency code groups. Further one or more code sets are formed within each unique frequency code group, the codes within code sets are orthogonal in nature.

In accordance with other aspects of the present disclosure, the method for wireless communication system includes grouping of codes. For a number of frequency locations N, the codes having same number of frequency locations N and frequency components positioned at same frequency locations, in addition to the codes having the number of frequency locations less than N with a condition that the positions of all the frequency components of such codes will overlap with some positions of frequency components of codes having N frequency locations are grouped to form the mixed frequency code groups. Further one or more code sets are formed within each unique frequency code group, the codes within code sets are orthogonal in nature.

In accordance with other aspects of the present disclosure, the method for wireless communication system further stores an identifier information and the corresponding orthogonal code in a database forming a orthogonal code list, wherein the identifier information can be at least one of the following, a number of code sets in the unique frequency code group, a number of codes in a code set, a number of frequency components in each code, a number of overlapped frequency positions, a location of frequency component of each code, a length of each code.

In accordance with other aspects of the present disclosure, a wireless communications system employing a signal encoding module configured to encode a plurality of received analog signals into a single encoded analog composite signal in accordance with a code based upon a set of codes selected from a list, wherein, a set of values between a pair of round brackets represents the code and the plurality of codes in between a pair of braces represents the set of codes. An analog-to-digital conversion module configured to convert the single encoded analog composite signal into a single encoded digital composite signal. A signal decoding module configured to decode the single encoded digital composite signal into a plurality of digital signals representing the plurality of received analog signals, in accordance with a code based upon a set of codes selected from the code list

BRIEF DESCRIPTION OF THE FIGURES

The features and advantages of the present disclosure will become apparent from the following detailed description, taken in combination with the appended drawings, in which.

Figure 1:
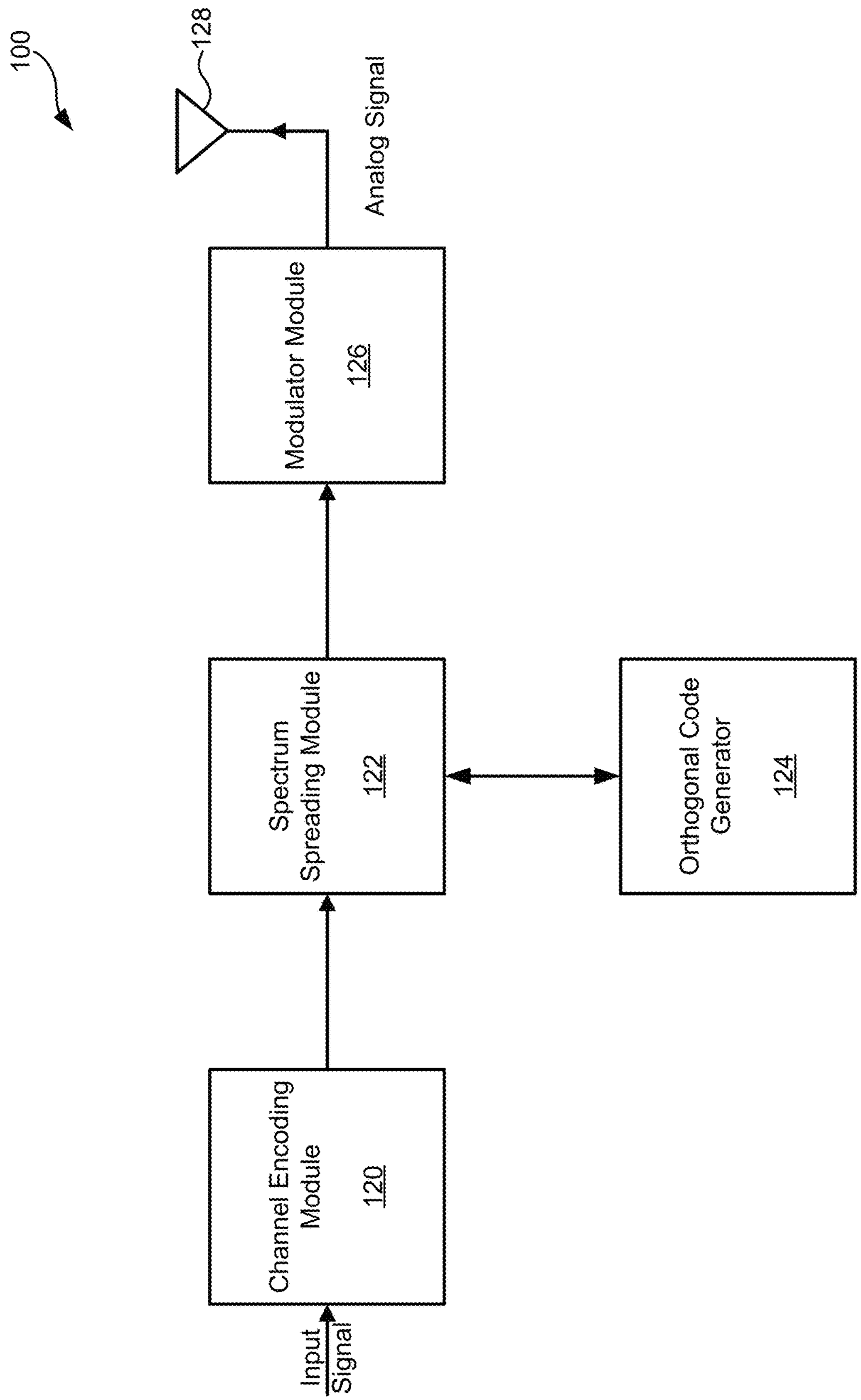
FIG. 1 depicts a functional block diagram of a conventional transmitter architecture used in spread-spectrum based communication system.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments appertain.

FIG. 1(Prior Art) illustrates a functional block diagram of a conventional transmitter architecture 100 used in a spread-spectrum based communication system directed to processing input signal and transmitting the processed signal over a wireless communication channel to a receiver. The conventional transmitter architecture 100 includes a channel encoding module 120, a spectrum spreading module 122, an orthogonal code generator 124, a modulator module 126 and a transmitter antenna 128. Other elements may be implemented but not illustrated for purposes of tractability.

As illustrated by FIG. 1, conventional transmitter architecture 100 receives an input signal into channel encoding module 120. The channel encoding module 120 encodes the input signal and outputs the encoded signal to a spectrum spreading module 122. The channel encoding module 120 may use any of the existing encoding techniques, such as, for example, but not limited to block codes, convolutional codes, turbo codes etc.

Assuming that the input signal is a digital signal (analog signals may be correspondingly processed), then the input signal may be a stream of symbols. If symbols are expressed in binary form, then each symbol has a bit value of 1 or 0. However, for ease of discussion, symbol values of 1 and −1 are used unless otherwise indicated.

The spectrum spreading module 122 receives the encoded signal from channel encoding module 120 and is configured to spread the spectrum of encoded signal according to an orthogonal code generated by orthogonal code generator 124. The spreading of spectrum is executed by mixing the encoded signal with an orthogonal code.

The modulator module 126 receives the spread signal from spectrum spreading module 122 and modulates the spread signal onto a carrier signal to output the modulated signal for transmission. An analog signal is thereafter transmitted via a transmitter antenna 128 to the wireless communication channel. The modulator 126 may use any of the existing modulation techniques, such as, for example, but not limited to PSK, FSK, ASK, OOK, QAM etc.

Figure 2:
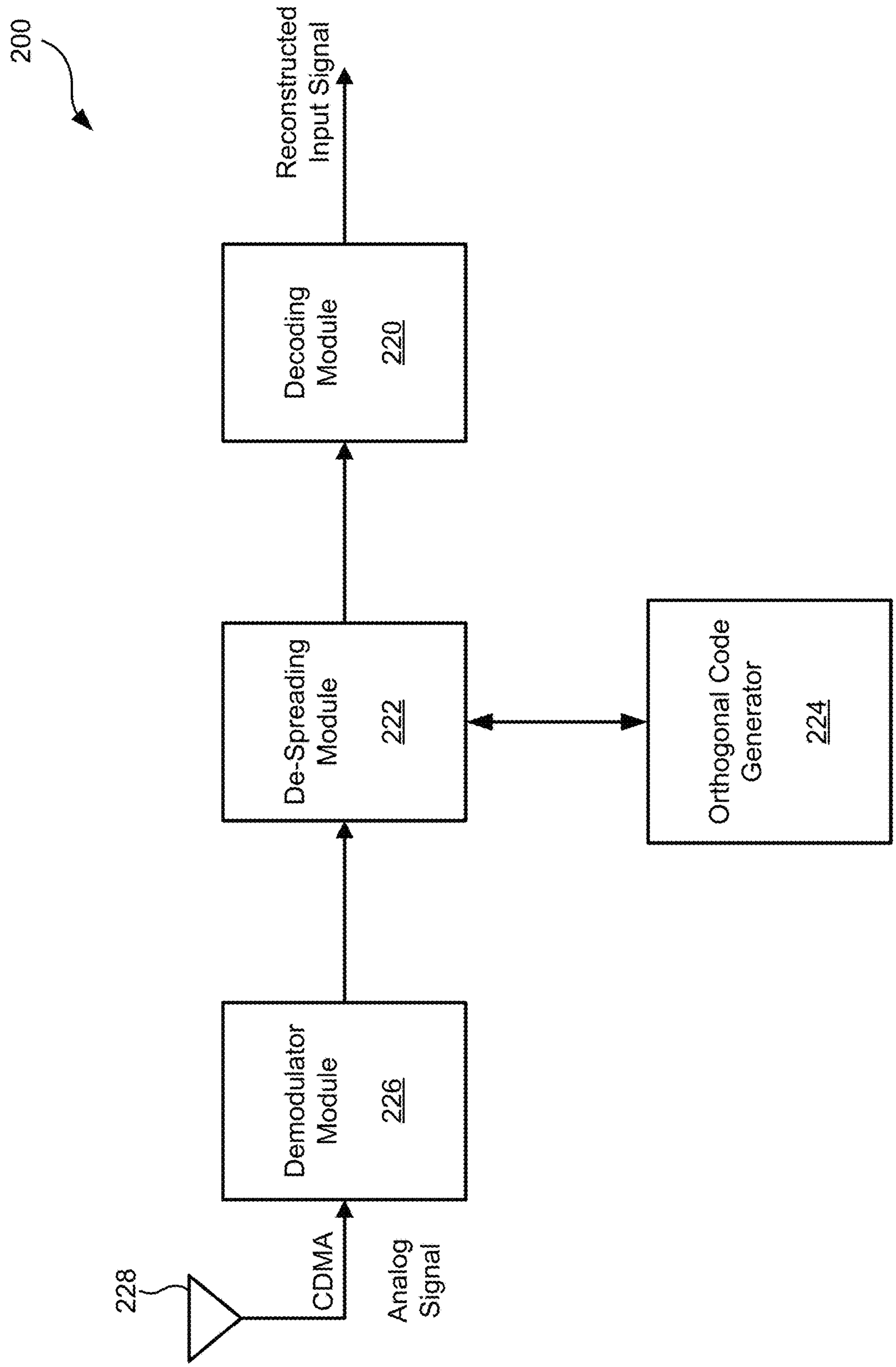
FIG. 2 depicts a functional block diagram of a conventional receiver architecture used in spread-spectrum based communication system.

FIG. 2(Prior Art) illustrates a functional block diagram of a conventional receiver architecture 200 used in spread-spectrum based communication system directed to processing received analog signal from transmitter antenna 128, to reconstruct the input signal. The conventional receiver architecture 200 includes a channel decoding module 220, a spectrum de-spreading module 222, an orthogonal code generator 224, a de-modulator module 226 and a receiver antenna 228. Other elements may be present but not illustrated for purposes of tractability.

As illustrated by FIG. 2, conventional receiver architecture 200 receives an analog signal by receiver antenna 228 that has been transmitted by transmitter antenna 128. The demodulator module 226 demodulates the received analog signal. The demodulation of received analog signal is executed by mixing the received analog signal with a suitable carrier signal.

The spectrum de-spreading module 222 receives the demodulated signal from demodulator module 226 and is configured to de-spread the spectrum of demodulated signal according to an orthogonal code generated by orthogonal code generator 224. The de-spreading of spectrum is carried out for example, by mixing the de-modulated signal with orthogonal code.

The channel decoding module 220 receives the de-spread signal from spectrum de-spreading module 222. The channel decoding module 220 decode the de-spread signal to reconstruct the input signal. The channel decoding module 220 may use any of the existing decoding techniques such as, for example, but not limited to maximum likelihood decoder, Viterbi decoder etc.

The orthogonal code generator 124 and/or 224 generates orthogonal codes such as Walsh-Hadamard Codes, Gold Codes, Kasami Codes, etc. based on various orthogonal code generation techniques. Each of the orthogonal code generation techniques has limitations to data transmission rate due to the fundamental assumptions related to the algorithms relied upon the generation of codes based only on orthogonality criteria rather than considering spectrum efficiency in conjunction with the orthogonality of generated codes.

Figure 3A:
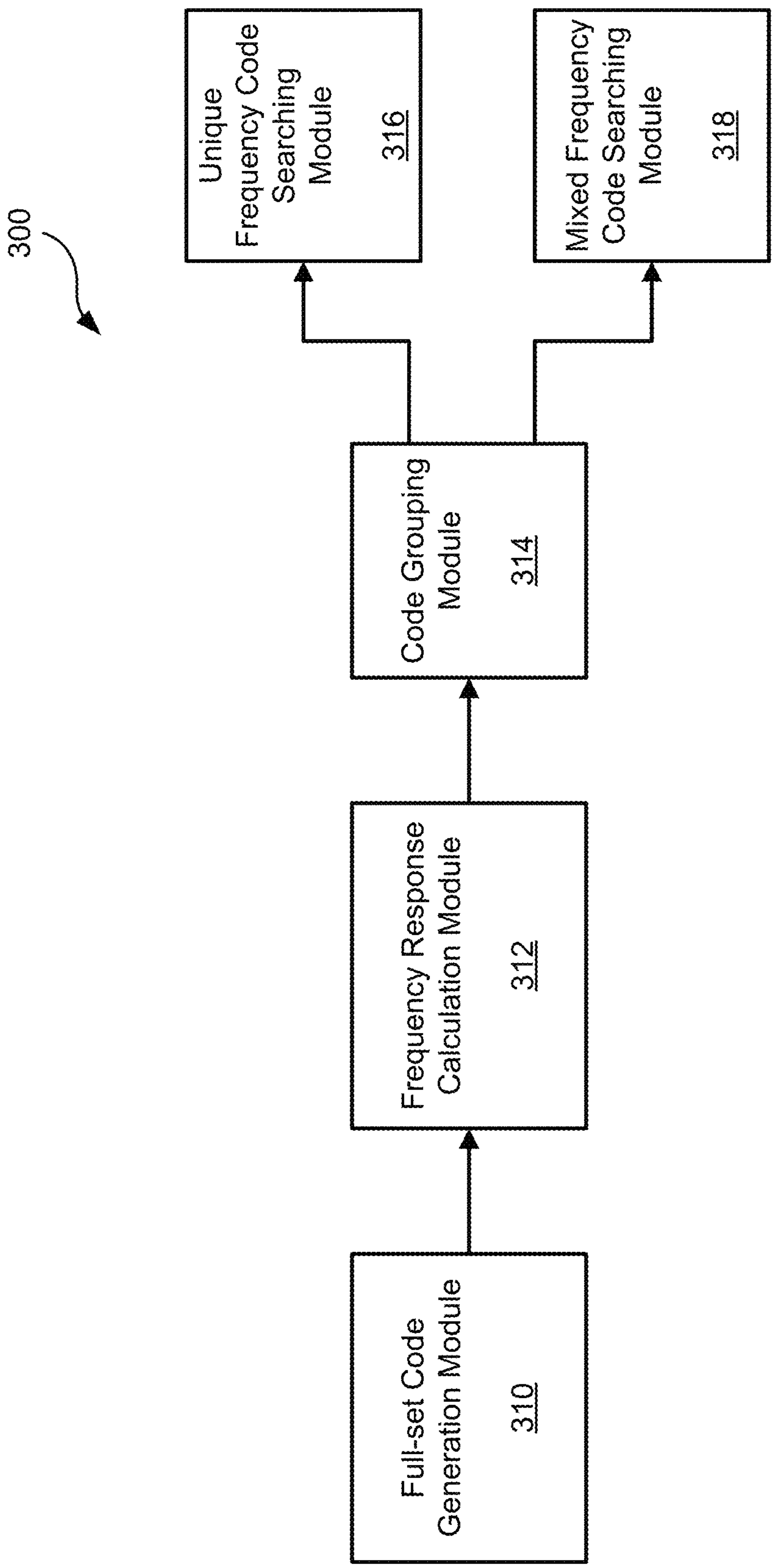
FIG. 3A depicts a high-level functional block diagram of spectrally efficient orthogonal code generation architecture, in accordance with various embodiments of the present disclosure.

FIG. 3A depicts a functional block diagram of spectrally efficient orthogonal code generation architecture 300, in accordance with various embodiments of the present disclosure. As shown, orthogonal code generator 300 employs a full-set code generation module 310, frequency response calculation module 312, code grouping module 314, unique frequency code searching module 316, and mixed frequency code searching module 318.

As will be understood in view of the ensuing descriptions and, in accordance with various embodiments of the present disclosure, the implementation of frequency response calculation module 312 and code grouping module 314 operate to assist the orthogonal code generator to generate spectrally efficient orthogonal codes, where the generated orthogonal codes may have fully or partially overlapping frequency positions. This allows the use of frequency spectrum more efficiently and thereby, improving the data transmission rate as well.

Moreover, consistent with various embodiments of the present disclosure, it will be appreciated that some or all of the notable elements of spectrally efficient orthogonal code generation architecture 300, such as, for example, full-set code generation module 310, frequency response calculation module 312, code grouping module 314, unique frequency code searching module 316 and mixed frequency code searching module 318, may be implemented by software constructs to facilitate integration with existing transmitter and receiver architectures.

Full-Set code generation module 310 receives a request from, such as, for example, a processor or a controller to generate codes of a specific length L. Full-Set code generation module 310 is further configured to generate and supply candidate code group that contains all possible combinations of codes for a given code length L, such as, for example, the total number of possible codes is $2^L$. The candidate code group generated by full-Set code generation module 310 is then supplied to frequency response calculation module 312 for calculation of frequency response of each code in candidate code group.

Frequency response calculation module 312 receives the candidate code group generated by full-Set code generation module 310 and calculates frequency response of every code present in candidate code group for a given length L. In doing so, the frequency response calculation module 312 calculates number of frequency locations and the corresponding frequency positions present in each code of candidate code group. Further, frequency response calculation module 312, by supplying the frequency response of every code, number of frequency locations and the corresponding frequency positions present in each code of candidate code group to code grouping module 314, assists the code grouping module 314 to analyze and group the codes within candidate code group on the basis of their frequency responses. Frequency response calculation module 312 may use any of the existing techniques to calculate frequency responses such as, for example, but not limited to DFT, FFT etc.

As discussed above regarding the orthogonal code generator 124 and/or 224 generates orthogonal codes based only on orthogonality criteria. However, as illustrated in FIG. 3A, spectrally efficient orthogonal code generation architecture 300 generates orthogonal codes that are not only orthogonal but spectrum efficient as well.

Figure 3B:
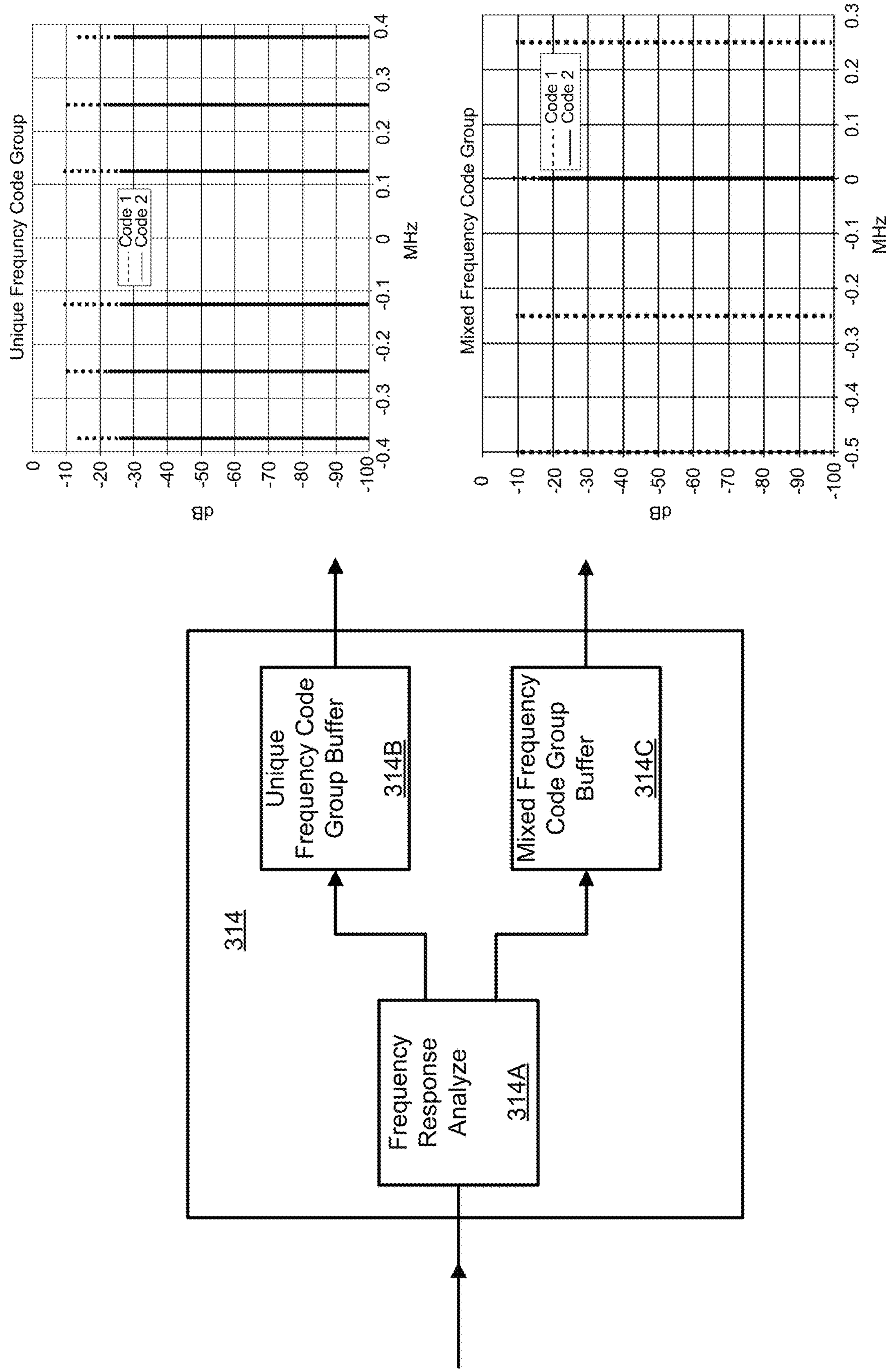
FIG. 3B depicts a high-level functional block diagram of a representative code grouping module, in accordance with various embodiments of the present disclosure.

To this end, FIG. 3B depicts a high-level functional block diagram of code grouping module 314, in accordance with various embodiments of the present disclosure. As shown, code grouping module 314 performs a code grouping operation based on calculated frequency responses of codes in candidate code group. The code grouping module 314 divides the codes into two categories of groups, namely unique frequency code groups and mixed frequency code groups. The code grouping module 314 then provides the unique frequency code groups and mixed frequency code groups. to unique frequency code searching module 316 and mixed frequency code searching 318 respectively, to form the orthogonal code sets within each frequency code group.

As shown in FIG. 3B, the code grouping operation in code grouping module 314 may be implemented by a frequency response analyzer 314A. Frequency responses of codes in candidate code group are received by frequency response analyzer 314A. The frequency response analyzer 314A then analyzes the number of frequency locations and positions present in frequency response of each code present in candidate code group. Based on number of frequency locations and positions, frequency response analyzer 314A divides the codes in two categories of groups, namely unique frequency code groups and mixed frequency code groups.

In some embodiments, such as, for example, while grouping the codes into unique frequency code group, the frequency response analyzer 314A upon detecting the codes having single frequency component and the position of frequency component is same in two or more codes in candidate code group, then the codes are grouped together to form unique single frequency group. The frequency response analyzer 314A will continue searching for all the codes in candidate code group having same number frequency components posited at same locations, to group them together. After grouping all the codes having same number of frequency components posited at same locations, the groups are supplied to unique frequency code group buffer 314B for further processing by unique frequency code searching module 316.

In some embodiments, such as, for example, during the grouping of the codes into mixed frequency group, the frequency response analyzer 314A sets the initial number of frequency locations N equal to 2 and then searches for the codes having maximum N frequency locations. In doing so, the frequency response analyzer 314A will group those codes who have N number frequency components posited at same locations. In addition, the frequency response analyzer 314A will also group those codes that have the number of frequency locations less than N with a condition that the positions of all frequency components of such codes will overlap with some positions of frequency components of codes having N frequency locations. As an example, consider a code with two frequency components such as $f_1$ and $f_2$. The frequency response analyzer 314A will group all the codes having exactly two frequency components $f_1$ and $f_2$ to form a mixed frequency code group $MG_1$ In addition, the frequency response analyzer 314A will also group the codes with single frequency component either $f_1$ or $f_2$ to form mixed frequency code group $MG_1$.

Once all the codes for a given value of N are grouped, the frequency response analyzer 314A will increase the value of N by one and repeat the above process until all codes are grouped. After grouping all the codes, the groups are supplied to mixed frequency code group buffer 314C for further processing by mixed frequency code searching module 318.

It is to be understood that the frequency response analyzer 314A supplies unique frequency code groups and mixed frequency code groups to separate buffers 314B and 314C. However these code groups may be supplied to a common buffer for temporary storage of unique frequency code groups and mixed frequency code groups. The buffers may embody any suitable memory storage elements. Frequency response analyzer 314A is further capable of transferring unique frequency code groups and mixed frequency code groups directly to unique frequency code searching module 316 and mixed frequency code searching module 318, respectively, for further processing without storing them into any buffer.

Figure 3C:
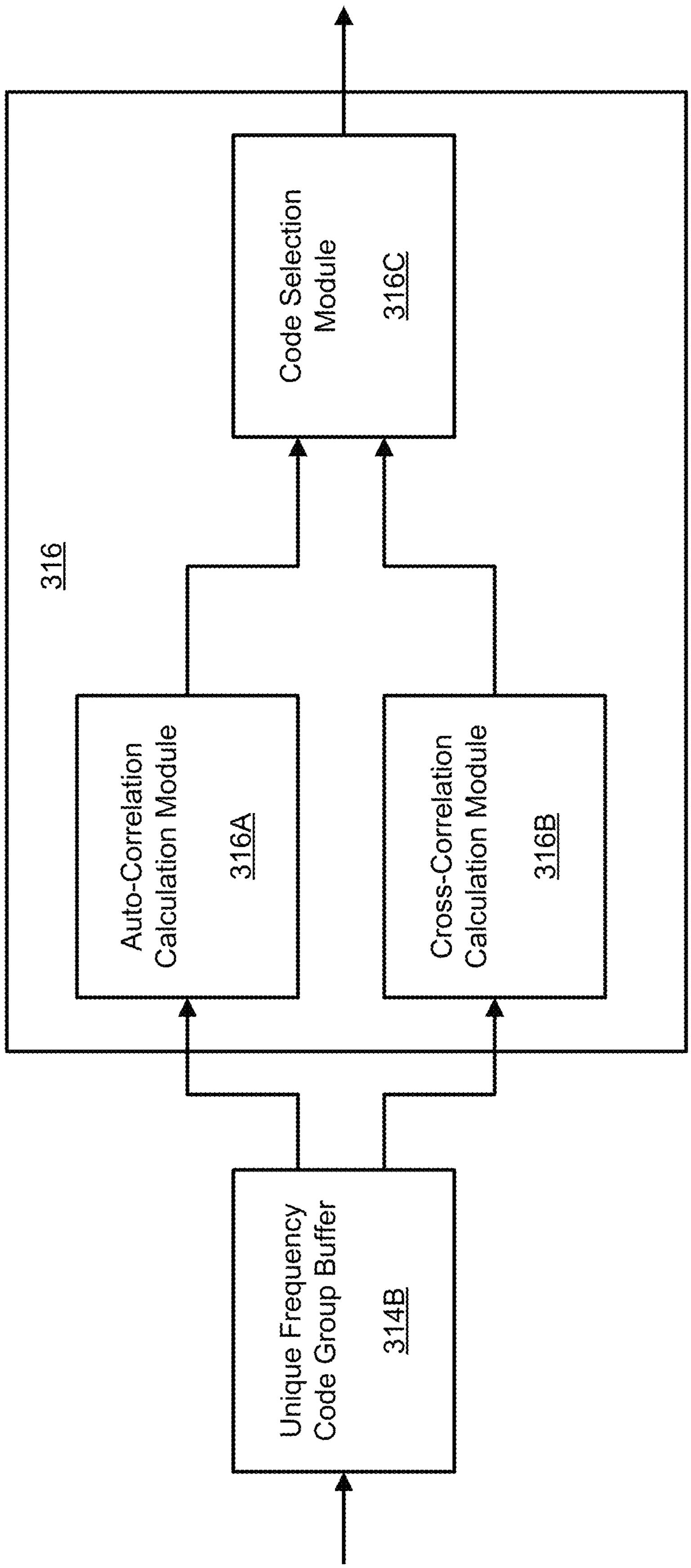
FIG. 3C depicts a high-level functional block diagram of a representative unique frequency code searching module, in accordance with various embodiments of the present disclosure.

As indicated by FIG. 3B, the unique frequency code groups outputted by unique frequency code group buffer 314B are supplied to unique frequency code searching module 316. As shown in FIG. 3C, unique frequency code searching module 316 operates to search the orthogonal codes in unique frequency code groups and form orthogonal code sets within each unique frequency code group. The codes within code sets have same frequency response and are orthogonal in nature. Thus, the sharing of frequency positions by different orthogonal codes allows the use of frequency spectrum more efficiently and thereby, improving the data transmission rate.

Consistent with the disclosed embodiments, the unique frequency code searching may be achieved by analyzing the auto-correlation, cross-correlation, auto-correlation side lobes, cross-correlation side lobes, total side lobes of auto-correlation and total side lobes of cross-correlation of various codes within same frequency group having same frequency response. By way of an illustrative example, codes X and Y are selected from same unique frequency code group and are given by:

$X=(x_0,x_1, \ldots ,x_{n-1}), Y=(y_0,y_1, \ldots ,y_{n-1}); \forall(x,y)\in(-1,1)$ As shown in FIG. 3C, the auto-correlation of selected code X with its un-shifted version is computed by auto-correlation calculation module 316A and results in a weight W which is the auto-correlation peak of the selected code X. The resultant weight W is given by:

$$W = \sum_{i=0}^{n-1} x_i x_i$$

Auto-correlation calculation module 316A further computes the side lobes, total side lobe and maximum side lobe of auto-correlation of code X. The side lobes of the auto-correlation of code X are given by:

$$s_{aut,j} = \sum_{i=0, j\neq i}^{n-1} x_i x_{i-j},\ j = 0, 1, 2, \ldots M-1$$

The total side lobe of the auto-cross correlation of code X is given by:

$$S_{aut,t} = \sum_{j=0}^{M-1} |s_{aut,j}|$$

The maximum side lobe of the auto-cross correlation of code X is given by:

$s_{aut,max}=\max\{|s_{aut,0}|,|s_{aut,1}|, \ldots ,|s_{aut,M-1}|\}$

As shown in FIG. 3C, the cross-correlation of selected code X and code Y, with their un-shifted versions is computed by cross-correlation calculation module 316B and is given by:

$$c = \sum_{i=0}^{n-1} x_i y_i$$

Cross-correlation calculation module 316B further computes the side lobes, total side lobe and maximum side lobe of cross-correlation of code X and code Y. The side lobes of the cross-correlation of code X and code Y are given by:

$$s_{cross,j} = \sum_{i=0, i\neq j}^{n-1} x_i y_{i-j}$$

The total side lobe of the cross-cross correlation of code X and code Y is given by:

$$S_{cross,t} = \sum_{j=0}^{M-1} |s_{cross,j}|$$

The maximum side lobe of the cross-cross correlation of code X and code Y is given by:

$s_{cross,max}=\max\{|s_{cross,0}|,|s_{cross,1}|, \ldots |s_{cross,M-1}|\}$

The computed values $s_{aut,max}$, $s_{cross,max}$, $s_{aut,max}$ and $s_{cross,max}$ are supplied to code selection module 316C. Code selection module 316C further selects overall maximum side lobe of correlation of code X and code Y as one the maximum value of $s_{aut,max}$ or $s_{cross,max}$ and is given by:

$s_{max}=\max\{s_{aut,max},s_{cross,max}\}$

Also, code selection module 316C computes overall total side lobe of correlation of code X and code Y by adding $S_{aut,t}$ and $S_{cross,t}$ and is given by:

$s=s_{aut,t}+s_{cross,t}$

It is to be understood that auto-correlation calculation module 316A and cross-correlation calculation module 316B will compute the auto-correlation, cross-correlation, side lobes of auto-correlation, side lobes of cross-correlation, total side lobes of auto-correlation and total side lobes of cross-correlation of all the codes within each unique frequency code group. Also, auto-correlation calculation module 316A and cross-correlation calculation module 316B supplies the computed values to code selection module 316C.

The code selection module 316C further operates to select the spectrally efficient orthogonal codes from each unique frequency code group and forms orthogonal code sets within each unique frequency code group. The codes within a code set have same number of frequency components posited at same locations and are orthogonal in nature making the codes spectrally efficient and thereby, improving the data transmission rate.

In some embodiments, code selection module 316C will set a target number of codes in orthogonal code set. The target number of codes may be for example, equal to two. Code selection module 316C will then analyze the un-sifted version of cross-correlations between all the codes within each unique frequency code group as supplied by cross-correlation calculation module 316B and the computed values of overall maximum and total side lobe of correlation of all the code within each unique frequency code group. Code selection module 316C will then select the spectrally efficient orthogonal codes satisfying the condition of having zero un-shifted version of cross-correlation between the codes within each frequency group, minimum value of maximum side lobe level $s_{max}$ and minimum value of total side lobe level s. If code selection module 316C finds a suitable code, the target number of codes is increased by one and the selection process is then repeated with updated target number of codes until the number of codes in orthogonal code set is equal to target number of codes.

As discussed above, the final output of unique frequency code searching module 316 for a given code length L will be various orthogonal code sets within each unique frequency code group. The orthogonal code sets may then be stored in any suitable memory element. Each code in a code set has same frequency response and is orthogonal in nature. Moreover, unique frequency code searching module 316 is further configured to output other information regarding the unique frequency code group, such as, for example, a number of code sets in a unique frequency code group, number of codes in a code set, number of frequency components in each code, location of frequency component of each code, length of each code, etc.

Table 1 Illustrates exemplary orthogonal code sets for unique frequency code group, with a single frequency component, outputted by unique frequency code searching module 316, in accordance with the various operational embodiments provided above of the present disclosure. It will be further appreciated that a set of values between a pair of round brackets represents a code and plurality of codes in between a pair of braces represents an orthogonal code set.

TABLE 1

| |
|---|
| {(−1, −1, 1, 1), (−1, 1, 1, −1)}, {(−1, −1, 1, 1), (1, −1, −1, 1)}, |
| {(−1, 1, 1, −1), (1, 1, −1, −1)}, {(1, −1, −1, 1), (1, 1, −1, −1)} |

The depicted orthogonal code sets, as shown in table 1, are base code sets with code length equal to 4. The unique frequency code searching module 316 is further capable of outputting orthogonal code sets for single frequency code group with code length of 8 by repeating the codes in base code sets. The unique frequency code searching module 316 is also capable of outputting orthogonal code sets for single frequency code group with code length of 16 by repeating the codes in base code sets for four times and so on. It will be appreciated that unique frequency code searching module 316 is capable of performing the above operation for all unique frequency code groups.

For instance, a code with length 4 (−1,−1,1,1) in table 1 with single frequency component may also be represented by a code with length 8 with single frequency component as (−1,−1,1,1,−1,−1,1,1), by a code with length 16 with single frequency component as (−1,−1,1,1,−1,−1,1,1,−1,−1,1,1,−1,−1,1,1) and so on.

Table 2 Illustrates another exemplary subset of an orthogonal code sets for a unique frequency code group, with two frequency components, outputted by a unique frequency code searching module 316, in accordance with various embodiments of the present disclosure. It will be further appreciated that a set of values between a pair of round brackets represents a code and plurality of codes in between a pair of braces represents an orthogonal code set.

TABLE 2

| |
|---|
| {(−1, −1, −1, −1, 1, 1, 1, 1), (−1, −1, 1, 1, 1, 1, −1, −1), |
| (−1, 1, −1, 1, 1, −1, 1, −1), (−1, 1, 1, −1, 1, −1, −1, 1)}, |
| {(−1, −1, −1, −1, 1, 1, 1, 1), (−1, −1, 1, 1, 1, 1, −1, −1), |
| (−1, 1, −1, 1, 1, −1, 1, −1), (1, −1, −1, 1, −1, 1, 1, −1)}, |
| {(−1, −1, −1, −1, 1, 1, 1, 1), (−1, −1, 1, 1, 1, 1, −1, −1), |
| (−1, 1, 1, −1, 1, −1, −1, 1), (1, −1, 1, −1, −1, 1, −1, 1)}, |
| {(−1, −1, −1, −1, 1, 1, 1, 1), (−1, −1, 1, 1, 1, 1, −1, −1), |
| (1, −1, −1, 1, −1, 1, 1, −1), (1, −1, 1, −1, −1, 1, −1, 1)}, |
| {(−1, −1, −1, −1, 1, 1, 1, 1), (−1, 1, −1, 1, 1, −1, 1, −1), |
| (−1, 1, 1, −1, 1, −1, −1, 1), (1, 1, −1, −1, −1, −1, 1, 1)}, |
| {(−1, −1, −1, −1, 1, 1, 1, 1), (−1, 1, −1, 1, 1, −1, 1, −1), |
| (1, −1, −1, 1, −1, 1, 1, −1), (1, 1, −1, −1, −1, −1, 1, 1)}, |
| {(−1, −1, −1, −1, 1, 1, 1, 1), (−1, 1, 1, −1, 1, −1, −1, 1), |
| (1, −1, 1, −1, −1, 1, −1, 1), (1, 1, −1, −1, −1, −1, 1, 1)}, |
| {(−1, −1, −1, −1, 1, 1, 1, 1), (1, −1, −1, 1, −1, 1, 1, −1), |
| (1, −1, 1, −1, −1, 1, −1, 1), (1, 1, −1, −1, −1, −1, 1, 1)}, |
| {(−1, −1, −1, 1, 1, 1, 1, −1), (−1, −1, 1, −1, 1, 1, −1, 1), |
| (−1, 1, −1, −1, 1, −1, 1, 1), (−1, 1, 1, 1, 1, −1, −1, −1)}, |
| {(−1, −1, −1, 1, 1, 1, 1, −1), (−1, −1, 1, −1, 1, 1, −1, 1), |
| (−1, 1, −1, −1, 1, −1, 1, 1), (1, −1, −1, −1, −1, 1, 1, 1)}, |
| {(−1, −1, −1, 1, 1, 1, 1, −1), (−1, −1, 1, −1, 1, 1, −1, 1), |
| (−1, 1, 1, 1, 1, −1, −1, −1), (1, −1, 1, 1, −1, 1, −1, −1)}, |
| {(−1, −1, −1, 1, 1, 1, 1, −1), (−1, −1, 1, −1, 1, 1, −1, 1), |
| (1, −1, −1, −1, −1, 1, 1, 1), (1, −1, 1, 1, −1, 1, −1, −1)}, |
| {(−1, −1, −1, 1, 1, 1, 1, −1), (−1, 1, −1, −1, 1, −1, 1, 1), |
| (−1, 1, 1, 1, 1, −1, −1, −1), (1, 1, −1, 1, −1, −1, 1, −1)}, |
| {(−1, −1, −1, 1, 1, 1, 1, −1), (−1, 1, −1, −1, 1, −1, 1, 1), |
| (1, −1, −1, −1, −1, 1, 1, 1), (1, 1, −1, 1, −1, −1, 1, −1)}, |
| {(−1, −1, −1, 1, 1, 1, 1, −1), (−1, 1, 1, 1, 1, −1, −1, −1), |

TABLE 2-continued

| |
|---|
| (1, −1, 1, 1, −1, 1, −1, −1), (1, 1, −1, 1, −1, −1, 1, −1)}, |
| {(−1, −1, −1, 1, 1, 1, 1, −1), (1, −1, −1, −1, −1, 1, 1, 1), |
| (1, −1, 1, 1, −1, 1, −1, −1), (1, 1, −1, 1, −1, −1, 1, −1)}, |
| {(−1, −1, 1, −1, 1, 1, −1, 1), (−1, 1, −1, −1, 1, −1, 1, 1), |
| (−1, 1, 1, 1, 1, −1, −1, −1), (1, 1, 1, −1, −1, −1, −1, 1)}, |
| {(−1, −1, 1, −1, 1, 1, −1, 1), (−1, 1, −1, −1, 1, −1, 1, 1), |
| (1, −1, −1, −1, −1, 1, 1, 1), (1, 1, 1, −1, −1, −1, −1, 1)}, |
| {(−1, −1, 1, −1, 1, 1, −1, 1), (−1, 1, 1, 1, 1, −1, −1, −1), |
| (1, −1, 1, 1, −1, 1, −1, −1), (1, 1, 1, −1, −1, −1, −1, 1)}, |
| {(−1, −1, 1, −1, 1, 1, −1, 1), (1, −1, −1, −1, −1, 1, 1, 1), |
| (1, −1, 1, 1, −1, 1, −1, −1), (1, 1, 1, −1, −1, −1, −1, 1)}, |
| {(−1, −1, 1, 1, 1, 1, −1, −1), (−1, 1, −1, 1, 1, −1, 1, −1), |
| (−1, 1, 1, −1, 1, −1, −1, 1), (1, 1, 1, 1, −1, −1, −1, −1)}, |
| {(−1, −1, 1, 1, 1, 1, −1, −1), (−1, 1, −1, 1, 1, −1, 1, −1), |
| (1, −1, −1, 1, −1, 1, 1, −1), (1, 1, 1, 1, −1, −1, −1, −1)}, |
| {(−1, −1, 1, 1, 1, 1, −1, −1), (−1, 1, 1, −1, 1, −1, −1, 1), |
| (1, −1, 1, −1, −1, 1, −1, 1), (1, 1, 1, 1, −1, −1, −1, −1)}, |
| {(−1, −1, 1, 1, 1, 1, −1, −1), (1, −1, −1, 1, −1, 1, 1, −1), |
| (1, −1, 1, −1, −1, 1, −1, 1), (1, 1, 1, 1, −1, −1, −1, −1)}, |
| {(−1, 1, −1, −1, 1, −1, 1, 1), (−1, 1, 1, 1, 1, −1, −1, −1), |
| (1, 1, −1, 1, −1, −1, 1, −1), (1, 1, 1, −1, −1, −1, −1, 1)}, |
| {(−1, 1, −1, −1, 1, −1, 1, 1), (1, −1, −1, −1, −1, 1, 1, 1), |
| (1, 1, −1, 1, −1, −1, 1, −1), (1, 1, 1, −1, −1, −1, −1, 1)}, |
| {(−1, 1, −1, 1, 1, −1, 1, −1), (−1, 1, 1, −1, 1, −1, −1, 1), |
| (1, 1, −1, −1, −1, −1, 1, 1), (1, 1, 1, 1, −1, −1, −1, −1)}, |
| {(−1, 1, −1, 1, 1, −1, 1, −1), (1, −1, −1, 1, −1, 1, 1, −1), |
| (1, 1, −1, −1, −1, −1, 1, 1), (1, 1, 1, 1, −1, −1, −1, −1)}, |
| {(−1, 1, 1, −1, 1, −1, −1, 1), (1, −1, 1, −1, −1, 1, −1, 1), |
| (1, 1, −1, −1, −1, −1, 1, 1), (1, 1, 1, 1, −1, −1, −1, −1)}, |
| {(−1, 1, 1, 1, 1, −1, −1, −1), (1, −1, 1, 1, −1, 1, −1, −1), |
| (1, 1, −1, 1, −1, −1, 1, −1), (1, 1, 1, −1, −1, −1, −1, 1)}, |
| {(1, −1, −1, −1, −1, 1, 1, 1), (1, −1, 1, 1, −1, 1, −1, −1), |
| (1, 1, −1, 1, −1, −1, 1, −1), (1, 1, 1, −1, −1, −1, −1, 1)}, |
| {(1, −1, −1, 1, −1, 1, 1, −1), (1, −1, 1, −1, −1, 1, −1, 1), |
| (1, 1, −1, −1, −1, −1, 1, 1), (1, 1, 1, 1, −1, −1, −1, −1)} |

The orthogonal code sets, as shown in table 2 are base code sets with code length of 8. The unique frequency code searching module 316 is further capable of outputting orthogonal code sets for double frequency code group with code length of 16 by repeating the codes in base code sets. The unique frequency code searching module 316 is also capable of outputting orthogonal code sets for double frequency code group with code length of 32 by repeating the codes in base code sets for four times and so on. It will be appreciated that unique frequency code searching module 316 is capable of performing the above operation for all unique frequency code groups.

For instance, a code with length 8 (−1,−1,−1,−1,1,1,1,1) in table 2 with two frequency components may also be represented by a code with length 16 with two frequency components as (−1,−1,−1,−1,1,1,1,1,−1,−1,−1,−1,1,1,1,1), by a code with length 32 with two frequency components as (−1,−1,−1,−1,1,1,1,1,−1,−1,−1,−1,1,1,1,1,−1,−1,−1,−1,1,1,1,1,−1,−1,−1,−1,1,1,1,1) and so on.

As indicated by FIG. 3B, the mixed frequency code groups outputted by mixed frequency code group buffer 314C are supplied to mixed frequency code searching module 318.

Figure 3D:
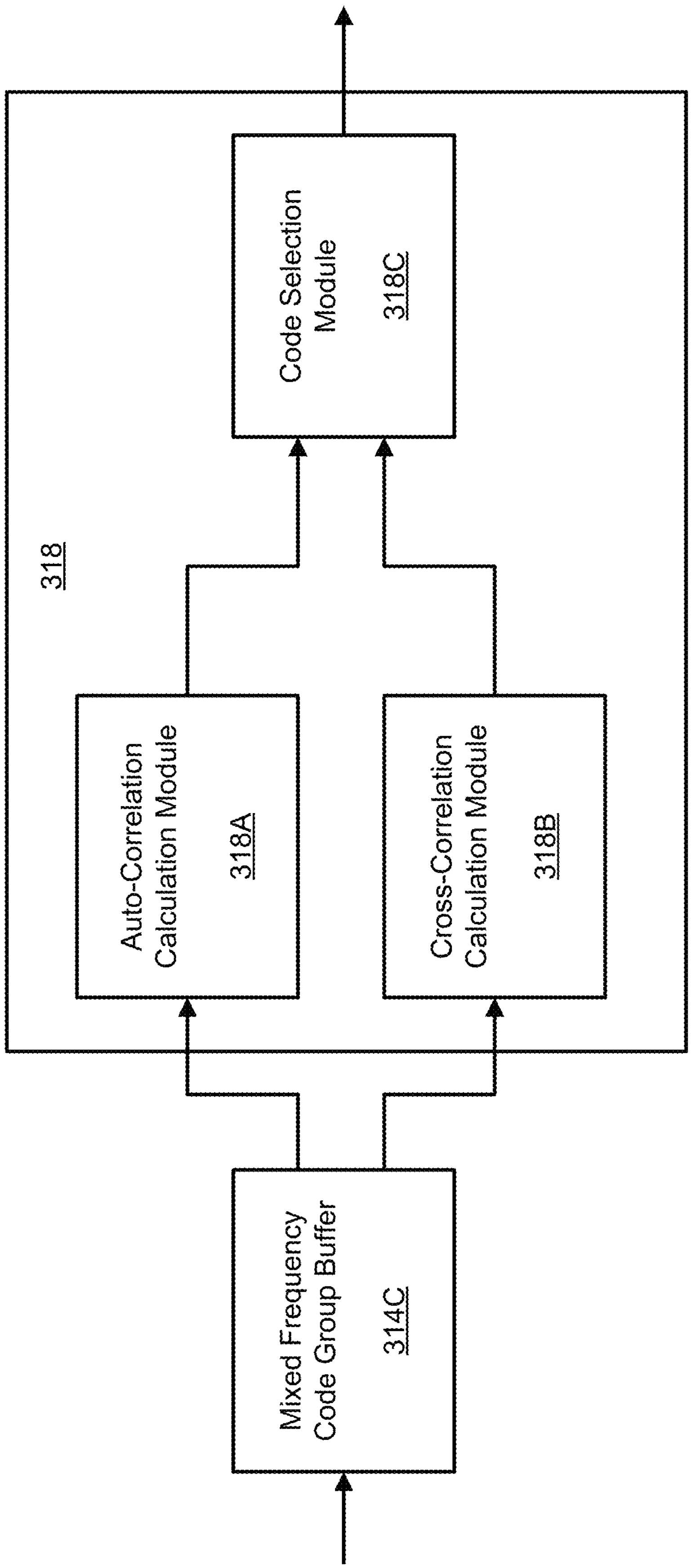
FIG. 3D depicts a high-level functional block diagram of a representative mixed frequency code searching module, in accordance with various embodiments of the present disclosure.

As shown in FIG. 3D, mixed frequency code searching module 318 operates to search the orthogonal codes in mixed frequency code groups and form orthogonal code sets within each mixed frequency code group. The codes within code sets have fully or partially overlapping frequency positions, and are orthogonal in nature. Thus, the sharing of frequency positions by different orthogonal codes allows the more efficient use of the operating frequency spectrum to thereby improve data transmission rates.

Consistent with the disclosed embodiments, the mixed frequency code searching may be achieved by analyzing the auto-correlation, cross-correlation, side lobes of auto-correlation, side lobes of cross-correlation, total side lobes of auto-correlation and total side lobes of cross-correlation of various codes within same frequency group having fully or partially overlapping frequency positions.

It is to be understood that auto-correlation calculation module 318A and cross-correlation calculation module 318B will compute the auto-correlation, cross-correlation, side lobes of auto-correlation, side lobes of cross-correlation, total side lobes of auto-correlation and total side lobes of cross-correlation of all the codes within each mixed frequency code group in a similar manner as these values are computed auto-correlation calculation module 316A and cross-correlation calculation module 316B. Also, auto-correlation calculation module 318A and cross-correlation calculation module 318B supplies the computed values to code selection module 318C The code selection module 318C further operates to select the spectrally efficient orthogonal codes from each mixed frequency code group and forms orthogonal code sets within each mixed frequency code group. The codes within a code set have same number of frequency locations, some overlapping frequency positions and are orthogonal in nature making the codes spectrally efficient and thereby, improving the data transmission rate.

It is to be appreciated that code selection module 318C operates on mixed frequency code group in similar manner as code selection module 316C operates on unique frequency code group. It will be further appreciated that unique frequency code searching module 316 and mixed frequency code searching module 318 may also be operated by single frequency code searching module performing unique frequency orthogonal code searching and mixed frequency orthogonal code searching.

As discussed above, the final output of mixed frequency code searching module 318 for a given code length L will be various orthogonal code sets within each mixed frequency code group. The orthogonal code sets may be then stored in any memory element known in the art. Further mixed frequency code searching module 318 is also capable of outputting other information regarding mixed frequency code group for example, number of code sets in a mixed frequency code group, number codes in a code set, number of overlapped frequency positions of each code, location of frequency component of each code and length of each code etc.

Table 3 illustrates an exemplary subset of orthogonal code sets for mixed frequency code group, with three frequency components, outputted by mixed frequency code searching module 318, in accordance with various embodiments of the present disclosure. It will be further appreciated that a set of values between a pair of round brackets represents a code and plurality of codes in between a pair of braces represents an orthogonal code set.

TABLE 3

| |
|---|
| {(–1, –1, –1, 1, 1, –1, 1, 1), (–1, –1, 1, –1, –1, 1, 1, 1), (–1, 1, –1, –1, 1, 1, 1, –1), (–1, 1, 1, 1, –1, –1, 1, –1), (–1, –1, 1, 1, 1, 1, –1, –1), (–1, 1, 1, –1, 1, –1, –1, 1)}, {(–1, –1, –1, 1, 1, –1, 1, 1), (–1, –1, 1, –1, –1, 1, 1, 1), (–1, 1, –1, –1, 1, 1, 1, –1), (–1, 1, 1, 1, –1, –1, 1, –1), (–1, –1, 1, 1, 1, 1, –1, –1), (1, –1, –1, 1, –1, 1, 1, –1)}, {(–1, –1, –1, 1, 1, –1, 1, 1), (–1, –1, 1, –1, –1, 1, 1, 1), (–1, 1, –1, –1, 1, 1, 1, –1), (–1, 1, 1, 1, –1, –1, 1, –1), (–1, 1, 1, –1, 1, –1, –1, 1), (1, 1, –1, –1, –1, –1, 1, 1)}, {(–1, –1, –1, 1, 1, –1, 1, 1), (–1, –1, 1, –1, –1, 1, 1, 1), (–1, 1, –1, –1, 1, 1, 1, –1), (–1, 1, 1, 1, –1, –1, 1, –1), (1, –1, –1, 1, –1, 1, 1, –1), (1, 1, –1, –1, –1, –1, 1, 1)}, {(–1, –1, –1, 1, 1, –1, 1, 1), (–1, –1, 1, –1, –1, 1, 1, 1), (–1, 1, –1, –1, 1, 1, 1, –1), (1, –1, –1, –1, 1, 1, –1, 1), (–1, –1, 1, 1, 1, 1, –1, –1), (–1, 1, 1, –1, 1, –1, –1, 1)}, {(–1, –1, –1, 1, 1, –1, 1, 1), (–1, –1, 1, –1, –1, 1, 1, 1), (–1, 1, –1, –1, 1, 1, 1, –1), (1, –1, –1, –1, 1, 1, –1, 1), (–1, –1, 1, 1, 1, 1, –1, –1), (1, –1, –1, 1, –1, 1, 1, –1)}, {(–1, –1, –1, 1, 1, –1, 1, 1), (–1, –1, 1, –1, –1, 1, 1, 1), (–1, 1, –1, –1, 1, 1, 1, –1), (1, –1, –1, –1, 1, 1, –1, 1), (–1, 1, 1, –1, 1, –1, –1, 1), (1, 1, –1, –1, –1, –1, 1, 1)}, {(–1, –1, –1, 1, 1, –1, 1, 1), (–1, –1, 1, –1, –1, 1, 1, 1), (–1, 1, –1, –1, 1, 1, 1, –1), (1, –1, –1, –1, 1, 1, –1, 1), (1, –1, –1, 1, –1, 1, 1, –1), (1, 1, –1, –1, –1, –1, 1, 1)}, {(–1, –1, –1, 1, 1, –1, 1, 1), (–1, –1, 1, –1, –1, 1, 1, 1), (–1, 1, 1, 1, –1, –1, 1, –1), (1, –1, 1, 1, –1, –1, –1, 1), (–1, –1, 1, 1, 1, 1, –1, –1), (–1, 1, 1, –1, 1, –1, –1, 1)}, {(–1, –1, –1, 1, 1, –1, 1, 1), (–1, –1, 1, –1, –1, 1, 1, 1), (–1, 1, 1, 1, –1, –1, 1, –1), (1, –1, 1, 1, –1, –1, –1, 1), (–1, –1, 1, 1, 1, 1, –1, –1), (1, –1, –1, 1, –1, 1, 1, –1)}, {(–1, –1, –1, 1, 1, –1, 1, 1), (–1, –1, 1, –1, –1, 1, 1, 1), (–1, 1, 1, 1, –1, –1, 1, –1), (1, –1, 1, 1, –1, –1, –1, 1), (–1, 1, 1, –1, 1, –1, –1, 1), (1, 1, –1, –1, –1, –1, 1, 1)}, {(–1, –1, –1, 1, 1, –1, 1, 1), (–1, –1, 1, –1, –1, 1, 1, 1), (–1, 1, 1, 1, –1, –1, 1, –1), (1, –1, 1, 1, –1, –1, –1, 1), (1, –1, –1, 1, –1, 1, 1, –1), (1, 1, –1, –1, –1, –1, 1, 1)}, {(–1, –1, –1, 1, 1, –1, 1, 1), (–1, –1, 1, –1, –1, 1, 1, 1), (1, –1, –1, –1, 1, 1, –1, 1), (1, –1, 1, 1, –1, –1, –1, 1), (–1, –1, 1, 1, 1, 1, –1, –1), (–1, 1, 1, –1, 1, –1, –1, 1)}, {(–1, –1, –1, 1, 1, –1, 1, 1), (–1, –1, 1, –1, –1, 1, 1, 1), (1, –1, –1, –1, 1, 1, –1, 1), (1, –1, 1, 1, –1, –1, –1, 1), (–1, –1, 1, 1, 1, 1, –1, –1), (1, –1, –1, 1, –1, 1, 1, –1)}, {(–1, –1, –1, 1, 1, –1, 1, 1), (–1, –1, 1, –1, –1, 1, 1, 1), (1, –1, –1, –1, 1, 1, –1, 1), (1, –1, 1, 1, –1, –1, –1, 1), (–1, 1, 1, –1, 1, –1, –1, 1), (1, 1, –1, –1, –1, –1, 1, 1)}, {(–1, –1, –1, 1, 1, –1, 1, 1), (–1, –1, 1, –1, –1, 1, 1, 1), (1, –1, –1, –1, 1, 1, –1, 1), (1, –1, 1, 1, –1, –1, –1, 1), (1, –1, –1, 1, –1, 1, 1, –1), (1, 1, –1, –1, –1, –1, 1, 1)}, {(–1, –1, –1, 1, 1, –1, 1, 1), (–1, –1, 1, 1, –1, 1, 1, –1), (–1, 1, –1, –1, 1, 1, 1, –1), (–1, 1, 1, –1, –1, –1, 1, 1), (–1, –1, 1, –1, 1, 1, –1, 1), (–1, 1, 1, 1, 1, –1, –1, –1)}, {(–1, –1, –1, 1, 1, –1, 1, 1), (–1, –1, 1, 1, –1, 1, 1, –1), (–1, 1, –1, –1, 1, 1, 1, –1), (–1, 1, 1, –1, –1, –1, 1, 1), (–1, –1, 1, –1, 1, 1, –1, 1), (1, –1, –1, –1, –1, 1, 1, 1)}, {(–1, –1, –1, 1, 1, –1, 1, 1), (–1, –1, 1, 1, –1, 1, 1, –1), (–1, 1, –1, –1, 1, 1, 1, –1), (–1, 1, 1, –1, –1, –1, 1, 1), (–1, 1, 1, 1, 1, –1, –1, –1), (1, 1, –1, 1, –1, –1, 1, –1)}, {(–1, –1, –1, 1, 1, –1, 1, 1), (–1, –1, 1, 1, –1, 1, 1, –1), (–1, 1, –1, –1, 1, 1, 1, –1), (–1, 1, 1, –1, –1, –1, 1, 1), (1, –1, –1, –1, –1, 1, 1, 1), (1, 1, –1, 1, –1, –1, 1, –1)}, {(–1, –1, –1, 1, 1, –1, 1, 1), (–1, –1, 1, 1, –1, 1, 1, –1), (–1, 1, –1, –1, 1, 1, 1, –1), (1, –1, –1, 1, 1, 1, –1, –1), (–1, –1, 1, –1, 1, 1, –1, 1), (–1, 1, 1, 1, 1, –1, –1, –1)}, {(–1, –1, –1, 1, 1, –1, 1, 1), (–1, –1, 1, 1, –1, 1, 1, –1), (–1, 1, –1, –1, 1, 1, 1, –1), (1, –1, –1, 1, 1, 1, –1, –1), (–1, –1, 1, –1, 1, 1, –1, 1), (1, –1, –1, –1, –1, 1, 1, 1)}, {(–1, –1, –1, 1, 1, –1, 1, 1), (–1, –1, 1, 1, –1, 1, 1, –1), (–1, 1, –1, –1, 1, 1, 1, –1), (1, –1, –1, 1, 1, 1, –1, –1), (–1, 1, 1, 1, 1, –1, –1, –1), (1, 1, –1, 1, –1, –1, 1, –1)}, {(–1, –1, –1, 1, 1, –1, 1, 1), (–1, –1, 1, 1, –1, 1, 1, –1), (–1, 1, –1, –1, 1, 1, 1, –1), (1, –1, –1, 1, 1, 1, –1, –1), (1, –1, –1, –1, –1, 1, 1, 1), (1, 1, –1, 1, –1, –1, 1, –1) }, {(–1, –1, –1, 1, 1, –1, 1, 1), (–1, –1, 1, 1, –1, 1, 1, –1), (–1, 1, 1, –1, –1, –1, 1, 1), (1, –1, 1, 1, –1, –1, –1, 1), (–1, –1, 1, –1, 1, 1, –1, 1), (–1, 1, 1, 1, 1, –1, –1, –1)}, {(–1, –1, –1, 1, 1, –1, 1, 1), (–1, –1, 1, 1, –1, 1, 1, –1), (–1, 1, 1, –1, –1, –1, 1, 1), (1, –1, 1, 1, –1, –1, –1, 1), (–1, –1, 1, –1, 1, 1, –1, 1), (1, –1, –1, –1, –1, 1, 1, 1)}, {(–1, –1, –1, 1, 1, –1, 1, 1), (–1, –1, 1, 1, –1, 1, 1, –1), (–1, 1, 1, –1, –1, –1, 1, 1), (1, –1, 1, 1, –1, –1, –1, 1), (–1, 1, 1, 1, 1, –1, –1, –1), (1, 1, –1, 1, –1, –1, 1, –1)}, {(–1, –1, –1, 1, 1, –1, 1, 1), (–1, –1, 1, 1, –1, 1, 1, –1), (–1, 1, 1, –1, –1, –1, 1, 1), (1, –1, 1, 1, –1, –1, –1, 1), (1, –1, –1, –1, –1, 1, 1, 1), (1, 1, –1, 1, –1, –1, 1, –1)}, {(–1, –1, –1, 1, 1, –1, 1, 1), (–1, –1, 1, 1, –1, 1, 1, –1), (1, –1, –1, 1, 1, 1, –1, –1), (1, –1, 1, 1, –1, –1, –1, 1), (–1, –1, 1, –1, 1, 1, –1, 1), (–1, 1, 1, 1, 1, –1, –1, –1)}, {(–1, –1, –1, 1, 1, –1, 1, 1), (–1, –1, 1, 1, –1, 1, 1, –1), (1, –1, –1, 1, 1, 1, –1, –1), (1, –1, 1, 1, –1, –1, –1, 1), (–1, –1, 1, –1, 1, 1, –1, 1), (1, –1, –1, –1, –1, 1, 1, 1)}, {(–1, –1, –1, 1, 1, –1, 1, 1), (–1, –1, 1, 1, –1, 1, 1, –1), (1, –1, –1, 1, 1, 1, –1, –1), (1, –1, 1, 1, –1, –1, –1, 1), (–1, 1, 1, 1, 1, –1, –1, –1), (1, 1, –1, 1, –1, –1, 1, –1)}, {(–1, –1, –1, 1, 1, –1, 1, 1), (–1, –1, 1, 1, –1, 1, 1, –1), (1, –1, –1, 1, 1, 1, –1, –1), (1, –1, 1, 1, –1, –1, –1, 1), (1, –1, –1, –1, –1, 1, 1, 1), (1, 1, –1, 1, –1, –1, 1, –1)}, {(–1, –1, –1, 1, 1, –1, 1, 1), (–1, 1, –1, –1, 1, 1, 1, –1), (–1, 1, 1, –1, –1, –1, 1, 1), (1, 1, –1, –1, 1, –1, –1, 1), (–1, –1, 1, –1, 1, 1, –1, 1), (–1, 1, 1, 1, 1, –1, –1, –1)}, {(–1, –1, –1, 1, 1, –1, 1, 1), (–1, 1, –1, –1, 1, 1, 1, –1), (–1, 1, 1, –1, –1, –1, 1, 1), (1, 1, –1, –1, 1, –1, –1, 1), (–1, –1, 1, –1, 1, 1, –1, 1), (1, –1, –1, –1, –1, 1, 1, 1)}, {(–1, –1, –1, 1, 1, –1, 1, 1), (–1, 1, –1, –1, 1, 1, 1, –1), (–1, 1, 1, –1, –1, –1, 1, 1), (1, 1, –1, –1, 1, –1, –1, 1), (–1, 1, 1, 1, 1, –1, –1, –1), (1, 1, –1, 1, –1, –1, 1, –1)}, {(–1, –1, –1, 1, 1, –1, 1, 1), (–1, 1, –1, –1, 1, 1, 1, –1), |

TABLE 3-continued (−1, 1, 1, −1, −1, −1, 1, 1), (1, 1, −1, −1, 1, −1, −1, 1), (1, −1, −1, −1, −1, 1, 1, 1), (1, 1, −1, 1, −1, −1, 1, −1)}, {(−1, −1, −1, 1, 1,
−1, 1, 1), (−1, 1, −1, −1, 1, 1, 1, −1), (−1, 1, 1, 1, −1, −1, 1, −1), (1, 1, −1, 1, 1, −1, −1, −1), (−1, −1, 1, 1, 1, 1, −1, −1), (−1, 1, 1,
−1, 1, −1, −1, 1)}, {(−1, −1, −1, 1, 1, −1, 1, 1), (−1, 1, −1, −1, 1, 1, 1, −1), (−1, 1, 1, 1, −1, −1, 1, −1), (1, 1, −1, 1, 1, −1, −1, −1),
(−1, −1, 1, 1, 1, 1, −1, −1), (1, −1, −1, 1, −1, 1, 1, −1)}, {(−1, −1, −1, 1, 1, −1, 1, 1), (−1, 1, −1, −1, 1, 1, 1, −1), (−1, 1, 1, 1, −1,
−1, 1, −1), (1, 1, −1, 1, 1, −1, −1, −1), (−1, 1, 1, −1, 1, −1, −1, 1), (1, 1, −1, −1, −1, −1, 1, 1)}, {(−1, −1, −1, 1, 1, −1, 1, 1), (−1, 1,
−1, −1, 1, 1, 1, −1), (−1, 1, 1, 1, −1, −1, 1, −1), (1, 1, −1, 1, 1, −1, −1, −1), (1, −1, −1, 1, −1, 1, 1, −1), (1, 1, −1, −1, −1, −1, 1, 1)},
{(−1, −1, −1, 1, 1, −1, 1, 1), (−1, 1, −1, −1, 1, 1, 1, −1), (1, −1, −1, −1, 1, 1, −1, 1), (1, 1, −1, 1, 1, −1, −1, −1), (−1, −1, 1, 1, 1, 1,
−1, −1), (−1, 1, 1, −1, 1, −1, −1, 1)}, {(−1, −1, −1, 1, 1, −1, 1, 1), (−1, 1, −1, −1, 1, 1, 1, −1), (1, −1, −1, −1, 1, 1, −1, 1), (1, 1,
−1, 1, 1, −1, −1, −1), (−1, −1, 1, 1, 1, 1, −1, −1), (1, −1, −1, 1, −1, 1, 1, −1)}, {(−1, −1, −1, 1, 1, −1, 1, 1), (−1, 1, −1, −1, 1, 1, 1,
−1), (1, −1, −1, −1, 1, 1, −1, 1), (1, 1, −1, 1, 1, −1, −1, −1), (−1, 1, 1, −1, 1, −1, −1, 1), (1, 1, −1, −1, −1, −1, 1, 1)}, {(−1, −1,
−1, 1, 1, −1, 1, 1), (−1, 1, −1, −1, 1, 1, 1, −1), (1, −1, −1, −1, 1, 1, −1, 1), (1, 1, −1, 1, 1, −1, −1, −1), (1, −1, −1, 1, −1, 1, 1,
−1), (1, 1, −1, −1, −1, −1, 1, 1)}, {(−1, −1, −1, 1, 1, −1, 1, 1), (−1, 1, −1, −1, 1, 1, 1, −1), (1, −1, −1, 1, 1, 1, −1, −1), (1, 1, −1,
−1, 1, −1, −1, 1), (−1, −1, 1, −1, 1, 1, −1, 1), (−1, 1, 1, 1, 1, −1, −1, −1)}, {(−1, −1, −1, 1, 1, −1, 1, 1), (−1, 1, −1, −1, 1, 1, 1,
−1), (1, −1, −1, 1, 1, 1, −1, −1), (1, 1, −1, −1, 1, −1, −1, 1), (−1, −1, 1, −1, 1, 1, −1, 1), (1, −1, −1, −1, −1, 1, 1, 1)}, {(−1, −1,
−1, 1, 1, −1, 1, 1), (−1, 1, −1, −1, 1, 1, 1, −1), (1, −1, −1, 1, 1, 1, −1, −1), (1, 1, −1, −1, 1, −1, −1, 1), (−1, 1, 1, 1, 1, −1, −1,
−1), (1, 1, −1, 1, −1, −1, 1, −1)}, {(−1, −1, −1, 1, 1, −1, 1, 1), (−1, 1, −1, −1, 1, 1, 1, −1), (1, −1, −1, 1, 1, 1, −1, −1), (1, 1, −1,
−1, 1, −1, −1, 1), (1, −1, −1, −1, −1, 1, 1, 1), (1, 1, −1, 1, −1, −1, 1, −1)}, {(−1, −1, −1, 1, 1, −1, 1, 1), (−1, 1, 1, −1, −1,
−1, 1, 1), (1, −1, 1, 1, −1, −1, −1, 1), (1, 1, −1, −1, 1, −1, −1, 1), (−1, −1, 1, −1, 1, 1, −1, 1), (−1, 1, 1, 1, 1, −1, −1, −1)}, {(−1, −1,
−1, 1, 1, −1, 1, 1), (−1, 1, 1, −1, −1, −1, 1, 1), (1, −1, 1, 1, −1, −1, −1, 1), (1, 1, −1, −1, 1, −1, −1, 1), (−1, −1, 1, −1, 1, 1, −1, 1), (1,
−1, −1, −1, −1, 1, 1, 1)}, {(−1, −1, −1, 1, 1, −1, 1, 1), (−1, 1, 1, −1, −1, −1, 1, 1), (1, −1, 1, 1, −1, −1, −1, 1), (1, 1, −1, −1, 1, −1,
−1, 1), (−1, 1, 1, 1, 1, −1, −1, −1), (1, 1, −1, 1, −1, −1, 1, −1)}, {(−1, −1, −1, 1, 1, −1, 1, 1), (−1, 1, 1, −1, −1, −1, 1, 1), (1,
−1, 1, 1, −1, −1, −1, 1), (1, 1, −1, −1, 1, −1, −1, 1), (1, −1, −1, −1, −1, 1, 1, 1), (1, 1, −1, 1, −1, −1, 1, −1)}, {(−1, −1, −1, 1, 1,
−1, 1, 1), (−1, 1, 1, 1, −1, −1, 1, −1), (1, −1, 1, 1, −1, −1, −1, 1), (1, 1, −1, 1, 1, −1, −1, −1), (−1, −1, 1, 1, 1, 1, −1, −1), (−1, 1, 1,
−1, 1, −1, −1, 1)}, {(−1, −1, −1, 1, 1, −1, 1, 1), (−1, 1, 1, 1, −1, −1, 1, −1), (1, −1, 1, 1, −1, −1, −1, 1), (1, 1, −1, 1, 1, −1, −1, −1),
(−1, −1, 1, 1, 1, 1, −1, −1), (1, −1, −1, 1, −1, 1, 1, −1)}, {(−1, −1, −1, 1, 1, −1, 1, 1), (−1, 1, 1, 1, −1, −1, 1, −1), (1, −1, 1, 1, −1, −1,
−1, 1), (1, 1, −1, 1, 1, −1, −1, −1), (−1, 1, 1, −1, 1, −1, −1, 1), (1, 1, −1, −1, −1, −1, 1, 1)}, {(−1, −1, −1, 1, 1, −1, 1, 1),
(−1, 1, 1, 1, −1, −1, 1, −1), (1, −1, 1, 1, −1, −1, −1, 1), (1, 1, −1, 1, 1, −1, −1, −1), (1, −1, −1, 1, −1, 1, 1, −1), (1, 1, −1, −1, −1,
−1, 1, 1)}, {(−1, −1, −1, 1, 1, −1, 1, 1), (1, −1, −1, −1, 1, 1, −1, 1), (1, −1, 1, 1, −1, −1, −1, 1), (1, 1, −1, 1, 1, −1, −1, −1), (−1,
−1, 1, 1, 1, 1, −1, −1), (−1, 1, 1, −1, 1, −1, −1, 1)}, {(−1, −1, −1, 1, 1, −1, 1, 1), (1, −1, −1, −1, 1, 1, −1, 1), (1, −1, 1, 1, −1, −1,
−1, 1), (1, 1, −1, 1, 1, −1, −1, −1), (−1, −1, 1, 1, 1, 1, −1, −1), (1, −1, −1, 1, −1, 1, 1, −1)}, {(−1, −1, −1, 1, 1, −1, 1, 1), (1, −1, −1,
−1, 1, 1, −1, 1), (1, −1, 1, 1, −1, −1, −1, 1), (1, 1, −1, 1, 1, −1, −1, −1), (−1, 1, 1, −1, 1, −1, −1, 1), (1, 1, −1, −1, −1, −1, 1, 1)},
{(−1, −1, −1, 1, 1, −1, 1, 1), (1, −1, −1, −1, 1, 1, −1, 1), (1, −1, 1, 1, −1, −1, −1, 1), (1, 1, −1, 1, 1, −1, −1, −1), (1, −1, −1, 1, −1, 1, 1,
−1), (1, 1, −1, −1, −1, −1, 1, 1)}, {(−1, −1, −1, 1, 1, −1, 1, 1), (1, −1, −1, 1, 1, 1, −1, −1), (1, −1, 1, 1, −1, −1, −1, 1), (1, 1, −1,
−1, 1, −1, −1, 1), (−1, −1, 1, −1, 1, 1, −1, 1), (−1, 1, 1, 1, 1, −1, −1, −1)}, {(−1, −1, −1, 1, 1, −1, 1, 1), (1, −1, −1, 1, 1, 1, −1,
−1), (1, −1, 1, 1, −1, −1, −1, 1), (1, 1, −1, −1, 1, −1, −1, 1), (−1, −1, 1, −1, 1, 1, −1, 1), (1, −1, −1, −1, −1, 1, 1, 1)}, {(−1, −1,
−1, 1, 1, −1, 1, 1), (1, −1, −1, 1, 1, 1, −1, −1), (1, −1, 1, 1, −1, −1, −1, 1), (1, 1, −1, −1, 1, −1, −1, 1), (−1, 1, 1, 1, 1, −1, −1,
−1), (1, 1, −1, 1, −1, −1, 1, −1)}, {(−1, −1, −1, 1, 1, −1, 1, 1), (1, −1, −1, 1, 1, 1, −1, −1), (1, −1, 1, 1, −1, −1, −1, 1), (1, 1, −1,
−1, 1, −1, −1, 1), (1, −1, −1, −1, −1, 1, 1, 1), (1, 1, −1, 1, −1, −1, 1, −1)}, {(−1, −1, 1, −1, −1, 1, 1, 1), (−1, −1, 1, 1, 1, −1, −1, 1),
(−1, 1, 1, −1, 1, 1, −1, −1), (−1, 1, 1, 1, −1, −1, 1, −1), (−1, −1, −1, 1, 1, 1, 1, −1), (−1, 1, −1, −1, 1, −1, 1, 1)}, {(−1, −1, 1, −1,
−1, 1, 1, 1), (−1, −1, 1, 1, 1, −1, −1, 1), (−1, 1, 1, −1, 1, 1, −1, −1), (−1, 1, 1, 1, −1, −1, 1, −1), (−1, −1, −1, 1, 1, 1, 1, −1), (1,
−1, 1, 1, −1, 1, −1, −1)}, {(−1, −1, 1, −1, −1, 1, 1, 1), (−1, −1, 1, 1, 1, −1, −1, 1), (−1, 1, 1, −1, 1, 1, −1, −1), (−1, 1, 1, 1, −1, −1, 1,
−1), (−1, 1, −1, −1, 1, −1, 1, 1), (1, 1, 1, −1, −1, −1, −1, 1)}, {(−1, −1, 1, −1, −1, 1, 1, 1), (−1, −1, 1, 1, 1, −1, −1, 1), (−1, 1, 1,
−1, 1, 1, −1, −1), (−1, 1, 1, 1, −1, −1, 1, −1), (1, −1, 1, 1, −1, 1, −1, −1), (1, 1, 1, −1, −1, −1, −1, 1)}, {(−1, −1, 1, −1, −1, 1, 1, 1),
(−1, −1, 1, 1, 1, −1, −1, 1), (−1, 1, 1, −1, 1, 1, −1, −1), (1, −1, −1, −1, 1, 1, −1, 1), (−1, −1, −1, 1, 1, 1, 1, −1), (−1, 1, −1, −1, 1,
−1, 1, 1)}, {(−1, −1, 1, −1, −1, 1, 1, 1), (−1, −1, 1, 1, 1, −1, −1, 1), (−1, 1, 1, −1, 1, 1, −1, −1), (1, −1, −1, −1, 1, 1, −1, 1), (−1, −1,
−1, 1, 1, 1, 1, −1), (1, −1, 1, 1, −1, 1, −1, −1)}, {(−1, −1, 1, −1, −1, 1, 1, 1), (−1, −1, 1, 1, 1, −1, −1, 1), (−1, 1, 1, −1, 1, 1, −1,
−1), (1, −1, −1, −1, 1, 1, −1, 1), (−1, 1, −1, −1, 1, −1, 1, 1), (1, 1, 1, −1, −1, −1, −1, 1)}, {(−1, −1, 1, −1, −1, 1, 1, 1), (−1,
−1, 1, 1, 1, −1, −1, 1), (−1, 1, 1, −1, 1, 1, −1, −1), (1, −1, −1, −1, 1, 1, −1, 1), (1, −1, 1, 1, −1, 1, −1, −1), (1, 1, 1, −1, −1, −1, −1, 1)},
{(−1, −1, 1, −1, −1, 1, 1, 1), (−1, −1, 1, 1, 1, −1, −1, 1), (−1, 1, 1, 1, −1, −1, 1, −1), (1, −1, −1, 1, −1, −1, 1, 1), (−1, −1,
−1, 1, 1, 1, 1, −1), (−1, 1, −1, −1, 1, −1, 1, 1)}, {(−1, −1, 1, −1, −1, 1, 1, 1), (−1, −1, 1, 1, 1, −1, −1, 1), (−1, 1, 1, 1, −1, −1, 1,
−1), (1, −1, −1, 1, −1, −1, 1, 1), (−1, −1, −1, 1, 1, 1, 1, −1), (1, −1, 1, 1, −1, 1, −1, −1)}, {(−1, −1, 1, −1, −1, 1, 1, 1), (−1,
−1, 1, 1, 1, −1, −1, 1), (−1, 1, 1, 1, −1, −1, 1, −1), (1, −1, −1, 1, −1, −1, 1, 1), (−1, 1, −1, −1, 1, −1, 1, 1), (1, 1, 1, −1, −1, −1, −1, 1)},
{(−1, −1, 1, −1, −1, 1, 1, 1), (−1, −1, 1, 1, 1, −1, −1, 1), (−1, 1, 1, 1, −1, −1, 1, −1), (1, −1, −1, 1, −1, −1, 1, 1), (1, −1, 1, 1, −1, 1,
−1, −1), (1, 1, 1, −1, −1, −1, −1, 1)}, {(−1, −1, 1, −1, −1, 1, 1, 1), (−1, −1, 1, 1, 1, −1, −1, 1), (1, −1, −1, −1, 1, 1, −1, 1), (1, −1,
−1, 1, −1, −1, 1, 1), (−1, −1, −1, 1, 1, 1, 1, −1), (−1, 1, −1, −1, 1, −1, 1, 1)}, {(−1, −1, 1, −1, −1, 1, 1, 1), (−1, −1, 1, 1, 1, −1,
−1, 1), (1, −1, −1, −1, 1, 1, −1, 1), (1, −1, −1, 1, −1, −1, 1, 1), (−1, −1, −1, 1, 1, 1, 1, −1), (1, −1, 1, 1, −1, 1, −1, −1)}, {(−1, −1, 1,
−1, −1, 1, 1, 1), (−1, −1, 1, 1, 1, −1, −1, 1), (1, −1, −1, −1, 1, 1, −1, 1), (1, −1, −1, 1, −1, −1, 1, 1), (−1, 1, −1, −1, 1,
−1, 1, 1), (1, 1, 1, −1, −1, −1, −1, 1)}, {(−1, −1, 1, −1, −1, 1, 1, 1), (−1, −1, 1, 1, 1, −1, −1, 1), (1, −1, −1, −1, 1, 1, −1, 1), (1, −1,
−1, 1, −1, −1, 1, 1), (1, −1, 1, 1, −1, 1, −1, −1), (1, 1, 1, −1, −1, −1, −1, 1)}, {(−1, −1, 1, −1, −1, 1, 1, 1), (−1, 1, −1, −1, 1, 1, 1,
−1), (−1, 1, 1, 1, −1, −1, 1, −1), (1, 1, 1, −1, −1, 1, −1, −1), (−1, −1, 1, 1, 1, 1, −1, −1), (−1, 1, 1, −1, 1, −1, −1, 1)}, {(−1, −1, 1, −1,
−1, 1, 1, 1), (−1, 1, −1, −1, 1, 1, 1, −1), (−1, 1, 1, 1, −1, −1, 1, −1), (1, 1, 1, −1, −1, 1, −1, −1), (−1, −1, 1, 1, 1, 1, −1, −1), (1, −1,
−1, 1, −1, 1, 1, −1)}, {(−1, −1, 1, −1, −1, 1, 1, 1), (−1, 1, −1, −1, 1, 1, 1, −1), (−1, 1, 1, 1, −1, −1, 1, −1), (1, 1, 1, −1, −1, 1, −1,
−1), (−1, 1, 1, −1, 1, −1, −1, 1), (1, 1, −1, −1, −1, −1, 1, 1)}, {(−1, −1, 1, −1, −1, 1, 1, 1), (−1, 1, −1, −1, 1, 1, 1, −1), (−1, 1, 1, 1,
−1, −1, 1, −1), (1, 1, 1, −1, −1, 1, −1, −1), (1, −1, −1, 1, −1, 1, 1, −1), (1, 1, −1, −1, −1, −1, 1, 1)}, {(−1, −1, 1, −1, −1, 1, 1, 1),
(−1, 1, −1, −1, 1, 1, 1, −1), (1, −1, −1, −1, 1, 1, −1, 1), (1, 1, 1, −1, −1, 1, −1, −1), (−1, −1, 1, 1, 1, 1, −1, −1), (−1, 1, 1, −1, 1, −1,
−1, 1)}, {(−1, −1, 1, −1, −1, 1, 1, 1), (−1, 1, −1, −1, 1, 1, 1, −1), (1, −1, −1, −1, 1, 1, −1, 1), (1, 1, 1, −1, −1, 1, −1, −1), (−1,
−1, 1, 1, 1, 1, −1, −1), (1, −1, −1, 1, −1, 1, 1, −1)}, {(−1, −1, 1, −1, −1, 1, 1, 1), (−1, 1, −1, −1, 1, 1, 1, −1), (1, −1, −1, −1, 1, 1,
−1, 1), (1, 1, 1, −1, −1, 1, −1, −1), (−1, 1, 1, −1, 1, −1, −1, 1), (1, 1, −1, −1, −1, −1, 1, 1)}, {(−1, −1, 1, −1, −1, 1, 1, 1), (−1, 1, −1,
−1, 1, 1, 1, −1), (1, −1, −1, −1, 1, 1, −1, 1), (1, 1, 1, −1, −1, 1, −1, −1), (1, −1, −1, 1, −1, 1, 1, −1), (1, 1, −1, −1, −1, −1, 1, 1)},
{(−1, −1, 1, −1, −1, 1, 1, 1), (−1, 1, 1, −1, 1, 1, −1, −1), (−1, 1, 1, 1, −1, −1, 1, −1), (1, 1, −1, −1, −1, 1, 1, −1), (−1, −1, −1, 1, 1, 1, 1,
−1), (−1, 1, −1, −1, 1, −1, 1, 1)}, {(−1, −1, 1, −1, −1, 1, 1, 1), (−1, 1, 1, −1, 1, 1, −1, −1), (−1, 1, 1, 1, −1, −1, 1, −1), (1, 1, −1, −1,
−1, 1, 1, −1), (−1, −1, −1, 1, 1, 1, 1, −1), (1, −1, 1, 1, −1, 1, −1, −1)}, {(−1, −1, 1, −1, −1, 1, 1, 1), (−1, 1, 1, −1, 1, 1, −1, −1),
(−1, 1, 1, 1, −1, −1, 1, −1), (1, 1, −1, −1, −1, 1, 1, −1), (−1, 1, −1, −1, 1, −1, 1, 1), (1, 1, 1, −1, −1, −1, −1, 1)}, {(−1, −1, 1, −1,
−1, 1, 1, 1), (−1, 1, 1, −1, 1, 1, −1, −1), (−1, 1, 1, 1, −1, −1, 1, −1), (1, 1, −1, −1, −1, 1, 1, −1), (1, −1, 1, 1, −1, 1, −1, −1), (1, 1, 1,
−1, −1, −1, −1, 1)}, {(−1, −1, 1, −1, −1, 1, 1, 1), (−1, 1, 1, −1, 1, 1, −1, −1), (1, −1, −1, −1, 1, 1, −1, 1), (1, 1, −1, −1, −1, 1, 1, −1),
(−1, −1, −1, 1, 1, 1, 1, −1), (−1, 1, −1, −1, 1, −1, 1, 1)}, {(−1, −1, 1, −1, −1, 1, 1, 1), (−1, 1, 1, −1, 1, 1, −1, −1), (1, −1, −1, −1, 1, 1,
−1, 1), (1, 1, −1, −1, −1, 1, 1, −1), (−1, −1, −1, 1, 1, 1, 1, −1), (1, −1, 1, 1, −1, 1, −1, −1)}, {(−1, −1, 1, −1, −1, 1, 1, 1), (−1, 1, 1,
−1, 1, 1, −1, −1), (1, −1, −1, −1, 1, 1, −1, 1), (1, 1, −1, −1, −1, 1, 1, −1), (−1, 1, −1, −1, 1, −1, 1, 1), (1, 1, 1, −1, −1, −1, −1, 1)},
{(−1, −1, 1, −1, −1, 1, 1, 1), (−1, 1, 1, −1, 1, 1, −1, −1), (1, −1, −1, −1, 1, 1, −1, 1), (1, 1, −1, −1, −1, 1, 1, −1), (1, −1, 1, 1, −1, 1, −1,
−1), (1, 1, 1, −1, −1, −1, −1, 1)}, {(−1, −1, 1, −1, −1, 1, 1, 1), (−1, 1, 1, 1, −1, −1, 1, −1), (1, −1, −1, 1, −1, −1, 1, 1), (1, 1, −1, −1, TABLE 3-continued −1, 1, 1, −1), (−1, −1, −1, 1, 1, 1, 1, −1), (−1, 1, −1, −1, 1, −1, 1, 1)}, {(−1, −1, 1, −1, −1, 1, 1, 1), (−1, 1, 1, 1, −1, −1, 1, −1), (1, −1, −1, 1, −1, −1, 1, 1), (1, 1, −1, −1, −1, 1, 1, −1), (−1, −1, −1, 1, 1, 1, 1, −1), (1, −1, 1, 1, −1, 1, −1, −1)}, {(−1, −1, 1, −1, −1, 1, 1, 1), (−1, 1, 1, 1, −1, −1, 1, −1), (1, −1, −1, 1, −1, −1, 1, 1), (1, 1, −1, −1, −1, 1, 1, −1), (−1, 1, −1, −1, 1, −1, 1, 1), (1, 1, 1, −1, −1, −1, −1, 1)}, {(−1, −1, 1, −1, −1, 1, 1, 1), (−1, 1, 1, 1, −1, −1, 1, −1), (1, −1, −1, 1, −1, −1, 1, 1), (1, 1, −1, −1, −1, 1, 1, −1), (1, −1, 1, 1, −1, 1, −1, −1), (1, 1, 1, −1, −1, −1, −1, 1)}, {(−1, −1, 1, −1, −1, 1, 1, 1), (−1, 1, 1, 1, −1, −1, 1, −1), (1, −1, 1, 1, −1, −1, −1, 1), (1, 1, 1, −1, −1, 1, −1, −1), (−1, −1, 1, 1, 1, 1, −1, −1), (−1, 1, 1, −1, 1, −1, −1, 1)}, {(−1, −1, 1, −1, −1, 1, 1, 1), (−1, 1, 1, 1, −1, −1, 1, −1), (1, −1, 1, 1, −1, −1, −1, 1), (1, 1, 1, −1, −1, 1, −1, −1), (−1, −1, 1, 1, 1, 1, −1, −1), (1, −1, −1, 1, −1, 1, 1, −1)}, {(−1, −1, 1, −1, −1, 1, 1, 1), (−1, 1, 1, 1, −1, −1, 1, −1), (1, −1, 1, 1, −1, −1, −1, 1), (1, 1, 1, −1, −1, 1, −1, −1), (−1, 1, 1, −1, 1, −1, −1, 1), (1, 1, −1, −1, −1, −1, 1, 1)}, {(−1, −1, 1, −1, −1, 1, 1, 1), (−1, 1, 1, 1, −1, −1, 1, −1), (1, −1, 1, 1, −1, −1, −1, 1), (1, 1, 1, −1, −1, 1, −1, −1), (1, −1, −1, 1, −1, 1, 1, −1), (1, 1, −1, −1, −1, −1, 1, 1)}, {(−1, −1, 1, −1, −1, 1, 1, 1), (1, −1, −1, −1, 1, 1, −1, 1), (1, −1, −1, 1, −1, −1, 1, 1), (1, 1, −1, −1, −1, 1, 1, −1), (−1, −1, −1, 1, 1, 1, 1, −1), (−1, 1, −1, −1, 1, −1, 1, 1)}, {(−1, −1, 1, −1, −1, 1, 1, 1), (1, −1, −1, −1, 1, 1, −1, 1), (1, −1, −1, 1, −1, −1, 1, 1), (1, 1, −1, −1, −1, 1, 1, −1), (−1, −1, −1, 1, 1, 1, 1, −1), (1, −1, 1, 1, −1, 1, −1, −1)}, {(−1, −1, 1, −1, −1, 1, 1, 1), (1, −1, −1, −1, 1, 1, −1, 1), (1, −1, −1, 1, −1, −1, 1, 1), (1, 1, −1, −1, −1, 1, 1, −1), (−1, 1, −1, −1, 1, −1, 1, 1), (1, 1, 1, −1, −1, −1, −1, 1)}, {(−1, −1, 1, −1, −1, 1, 1, 1), (1, −1, −1, −1, 1, 1, −1, 1), (1, −1, −1, 1, −1, −1, 1, 1), (1, 1, −1, −1, −1, 1, 1, −1), (1, −1, 1, 1, −1, 1, −1, −1), (1, 1, 1, −1, −1, −1, −1, 1)}, {(−1, −1, 1, −1, −1, 1, 1, 1), (1, −1, −1, −1, 1, 1, −1, 1), (1, −1, 1, 1, −1, −1, −1, 1), (1, 1, 1, −1, −1, 1, −1, −1), (−1, −1, 1, 1, 1, 1, −1, −1), (−1, 1, 1, −1, 1, −1, −1, 1)}, {(−1, −1, 1, −1, −1, 1, 1, 1), (1, −1, −1, −1, 1, 1, −1, 1), (1, −1, 1, 1, −1, −1, −1, 1), (1, 1, 1, −1, −1, 1, −1, −1), (−1, −1, 1, 1, 1, 1, −1, −1), (1, −1, −1, 1, −1, 1, 1, −1)}, {(−1, −1, 1, −1, −1, 1, 1, 1), (1, −1, −1, −1, 1, 1, −1, 1), (1, −1, 1, 1, −1, −1, −1, 1), (1, 1, 1, −1, −1, 1, −1, −1), (−1, 1, 1, −1, 1, −1, −1, 1), (1, 1, −1, −1, −1, −1, 1, 1)}, {(−1, −1, 1, −1, −1, 1, 1, 1), (1, −1, −1, −1, 1, 1, −1, 1), (1, −1, 1, 1, −1, −1, −1, 1), (1, 1, 1, −1, −1, 1, −1, −1), (1, −1, −1, 1, −1, 1, 1, −1), (1, 1, −1, −1, −1, −1, 1, 1)}, {(−1, −1, 1, 1, −1, 1, 1, −1), (−1, −1, 1, 1, 1, −1, −1, 1), (−1, 1, 1, −1, −1, −1, 1, 1), (−1, 1, 1, −1, 1, 1, −1, −1), (−1, −1, −1, −1, 1, 1, 1, 1), (−1, 1, −1, 1, 1, −1, 1, −1)}, {(−1, −1, 1, 1, −1, 1, 1, −1), (−1, −1, 1, 1, 1, −1, −1, 1), (−1, 1, 1, −1, −1, −1, 1, 1), (−1, 1, 1, −1, 1, 1, −1, −1), (−1, −1, −1, −1, 1, 1, 1, 1), (1, −1, 1, −1, −1, 1, −1, 1)}, {(−1, −1, 1, 1, −1, 1, 1, −1), (−1, −1, 1, 1, 1, −1, −1, 1), (−1, 1, 1, −1, −1, −1, 1, 1), (−1, 1, 1, −1, 1, 1, −1, −1), (−1, 1, −1, 1, 1, −1, 1, −1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, −1, −1, 1, 1), (−1, 1, 1, −1, 1, 1, −1, −1), (1, −1, 1, −1, −1, 1, −1, 1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, −1, −1, 1, 1), (1, −1, −1, 1, −1, −1, 1, 1), (−1, −1, −1, −1, 1, 1, 1, 1), (−1, 1, −1, 1, 1, −1, 1, −1)}, {(−1, −1, 1, 1, −1, 1, 1, −1), (−1, −1, 1, 1, 1, −1, −1, 1), (−1, 1, 1, −1, −1, −1, 1, 1), (1, −1, −1, 1, −1, −1, 1, 1), (−1, −1, −1, −1, 1, 1, 1, 1), (1, −1, 1, −1, −1, 1, −1, 1)}, {(−1, −1, 1, 1, −1, 1, 1, −1), (−1, −1, 1, 1, 1, −1, −1, 1), (−1, 1, 1, −1, −1, −1, 1, 1), (1, −1, −1, 1, −1, −1, 1, 1), (−1, 1, −1, 1, 1, −1, 1, −1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, −1, −1, 1, 1), (1, −1, −1, 1, −1, −1, 1, 1), (1, −1, 1, −1, −1, 1, −1, 1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, 1, 1, −1, −1), (1, −1, −1, 1, 1, 1, −1, −1), (−1, −1, −1, −1, 1, 1, 1, 1), (−1, 1, −1, 1, 1, −1, 1, −1)}, {(−1, −1, 1, 1, −1, 1, 1, −1), (−1, −1, 1, 1, 1, −1, −1, 1), (−1, 1, 1, −1, 1, 1, −1, −1), (1, −1, −1, 1, 1, 1, −1, −1), (−1, −1, −1, −1, 1, 1, 1, 1), (1, −1, 1, −1, −1, 1, −1, 1)}, {(−1, −1, 1, 1, −1, 1, 1, −1), (−1, −1, 1, 1, 1, −1, −1, 1), (−1, 1, 1, −1, 1, 1, −1, −1), (1, −1, −1, 1, 1, 1, −1, −1), (−1, 1, −1, 1, 1, −1, 1, −1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, 1, 1, −1, −1), (1, −1, −1, 1, 1, 1, −1, −1), (1, −1, 1, −1, −1, 1, −1, 1), (1, 1, 1, 1, −1, −1, −1, −1)}, {(−1, −1, 1, 1, −1, 1, 1, −1), (−1, −1, 1, 1, 1, −1, −1, 1), (1, −1, −1, 1, −1, −1, 1, 1), (1, −1, −1, 1, 1, 1, −1, −1), (−1, −1, −1, −1, 1, 1, 1, 1), (−1, 1, −1, 1, 1, −1, 1, −1)}, {(−1, −1, 1, 1, −1, 1, 1, −1), (−1, −1, 1, 1, 1, −1, −1, 1), (1, −1, −1, 1, −1, −1, 1, 1), (1, −1, −1, 1, 1, 1, −1, −1), (−1, −1, −1, −1, 1, 1, 1, 1), (1, −1, 1, −1, −1, 1, −1, 1)}, {(−1, −1, 1, 1, −1, 1, 1, −1), (−1, −1, 1, 1, 1, −1, −1, 1), (1, −1, −1, 1, −1, −1, 1, 1), (1, −1, −1, 1, 1, 1, −1, −1), (−1, 1, −1, 1, 1, −1, 1, −1), (1, 1, 1, 1, −1, −1, −1, −1)}, {(−1, −1, 1, 1, −1, 1, 1, −1), (−1, −1, 1, 1, 1, −1, −1, 1), (1, −1, −1, 1, −1, −1, 1, 1), (1, −1, −1, 1, 1, 1, −1, −1), (1, −1, 1, −1, −1, 1, −1, 1), (1, 1, 1, 1, −1, −1, −1, −1)}, {(−1, −1, 1, 1, −1, 1, 1, −1), (−1, 1, −1, −1, 1, 1, 1, −1), (−1, 1, 1, −1, −1, −1, 1, 1), (1, 1, 1, −1, −1, 1, −1, −1), (−1, −1, 1, −1, 1, 1, −1, 1), (−1, 1, 1, 1, 1, −1, −1, −1)}, {(−1, −1, 1, 1, −1, 1, 1, −1), (−1, 1, −1, −1, 1, 1, 1, −1), (−1, 1, 1, −1, −1, −1, 1, 1), (1, 1, 1, −1, −1, 1, −1, −1), (−1, −1, 1, −1, 1, 1, −1, 1), (1, −1, −1, −1, −1, 1, 1, 1)}, {(−1, −1, 1, 1, −1, 1, 1, −1), (−1, 1, −1, −1, 1, 1, 1, −1), (−1, 1, 1, −1, −1, −1, 1, 1), (1, 1, 1, −1, −1, 1, −1, −1), (−1, 1, 1, 1, 1, −1, −1, −1), (1, 1, −1, 1, −1, −1, 1, −1)}, {(−1, −1, 1, 1, −1, 1, 1, −1), (−1, 1, −1, −1, 1, 1, 1, −1), (−1, 1, 1, −1, −1, −1, 1, 1), (1, 1, 1, −1, −1, 1, −1, −1), (1, −1, −1, −1, −1, 1, 1, 1), (1, 1, −1, 1, −1, −1, 1, −1)}, {(−1, −1, 1, 1, −1, 1, 1, −1), (−1, 1, −1, −1, 1, 1, 1, −1), (1, −1, −1, 1, 1, 1, −1, −1), (1, 1, 1, −1, −1, 1, −1, −1), (−1, −1, 1, −1, 1, 1, −1, 1), (−1, 1, 1, 1, 1, −1, −1, −1)}, {(−1, −1, 1, 1, −1, 1, 1, −1), (−1, 1, −1, −1, 1, 1, 1, −1), (1, −1, −1, 1, 1, 1, −1, −1), (1, 1, 1, −1, −1, 1, −1, −1), (−1, −1, 1, −1, 1, 1, −1, 1), (1, −1, −1, −1, −1, 1, 1, 1)}, {(−1, −1, 1, 1, −1, 1, 1, −1), (−1, 1, −1, −1, 1, 1, 1, −1), (1, −1, −1, 1, 1, 1, −1, −1), (1, 1, 1, −1, −1, 1, −1, −1), (−1, 1, 1, 1, 1, −1, −1, −1), (1, 1, −1, 1, −1, −1, 1, −1)}, {(−1, −1, 1, 1, −1, 1, 1, −1), (−1, 1, −1, −1, 1, 1, 1, −1), (1, −1, −1, 1, 1, 1, −1, −1), (1, 1, 1, −1, −1, 1, −1, −1), (1, −1, −1, −1, −1, 1, 1, 1), (1, 1, −1, 1, −1, −1, 1, −1)}, {(−1, −1, 1, 1, −1, 1, 1, −1), (−1, 1, 1, −1, −1, −1, 1, 1), (−1, 1, 1, −1, 1, 1, −1, −1), (1, 1, −1, −1, −1, 1, 1, −1), (−1, −1, −1, −1, 1, 1, 1, 1), (−1, 1, −1, 1, 1, −1, 1, −1)}, {(−1, −1, 1, 1, −1, 1, 1, −1), (−1, 1, 1, −1, −1, −1, 1, 1), (−1, 1, 1, −1, 1, 1, −1, −1), (1, 1, −1, −1, −1, 1, 1, −1), (−1, −1, −1, −1, 1, 1, 1, 1), (1, −1, 1, −1, −1, 1, −1, 1)}, {(−1, −1, 1, 1, −1, 1, 1, −1), (−1, 1, 1, −1, −1, −1, 1, 1), (−1, 1, 1, −1, 1, 1, −1, −1), (1, 1, −1, −1, −1, 1, 1, −1), (−1, 1, −1, 1, 1, −1, 1, −1), (1, 1, 1, 1, −1, −1, −1, −1)}, {(−1, −1, 1, 1, −1, 1, 1, −1), (−1, 1, 1, −1, −1, −1, 1, 1), (−1, 1, 1, −1, 1, 1, −1, −1), (1, 1, −1, −1, −1, 1, 1, −1), (1, −1, 1, −1, −1, 1, −1, 1), (1, 1, 1, 1, −1, −1, −1, −1)}, {(−1, −1, 1, 1, −1, 1, 1, −1), (−1, 1, 1, −1, −1, −1, 1, 1), (1, −1, −1, 1, −1, −1, 1, 1), (1, 1, −1, −1, −1, 1, 1, −1), (−1, −1, −1, −1, 1, 1, 1, 1), (−1, 1, −1, 1, 1, −1, 1, −1)}, {(−1, −1, 1, 1, −1, 1, 1, −1), (−1, 1, 1, −1, −1, −1, 1, 1), (1, −1, −1, 1, −1, −1, 1, 1), (1, 1, −1, −1, −1, 1, 1, −1), (−1, −1, −1, −1, 1, 1, 1, 1), (1, −1, 1, −1, −1, 1, −1, 1)}, {(−1, −1, 1, 1, −1, 1, 1, −1), (−1, 1, 1, −1, −1, −1, 1, 1), (1, −1, −1, 1, −1, −1, 1, 1), (1, 1, −1, −1, −1, 1, 1, −1), (−1, 1, −1, 1, 1, −1, 1, −1), (1, 1, 1, 1, −1, −1, −1, −1)}, {(−1, −1, 1, 1, −1, 1, 1, −1), (−1, 1, 1, −1, −1, −1, 1, 1), (1, −1, −1, 1, −1, −1, 1, 1), (1, 1, −1, −1, −1, 1, 1, −1), (1, −1, 1, −1, −1, 1, −1, 1), (1, 1, 1, 1, −1, −1, −1, −1)}, {(−1, −1, 1, 1, −1, 1, 1, −1), (−1, 1, 1, −1, −1, −1, 1, 1), (1, −1, 1, 1, −1, −1, −1, 1), (1, 1, 1, −1, −1, 1, −1, −1), (−1, −1, 1, −1, 1, 1, −1, 1), (−1, 1, 1, 1, 1, −1, −1, −1)}, {(−1, −1, 1, 1, −1, 1, 1, −1), (−1, 1, 1, −1, −1, −1, 1, 1), (1, −1, 1, 1, −1, −1, −1, 1), (1, 1, 1, −1, −1, 1, −1, −1), (−1, −1, 1, −1, 1, 1, −1, 1), (1, −1, −1, −1, −1, 1, 1, 1)}, {(−1, −1, 1, 1, −1, 1, 1, −1), (−1, 1, 1, −1, −1, −1, 1, 1), (1, −1, 1, 1, −1, −1, −1, 1), (1, 1, 1, −1, −1, 1, −1, −1), (−1, 1, 1, 1, 1, −1, −1, −1), (1, 1, −1, 1, −1, −1, 1, −1)}, {(−1, −1, 1, 1, −1, 1, 1, −1), (−1, 1, 1, −1, −1, −1, 1, 1), (1, −1, 1, 1, −1, −1, −1, 1), (1, 1, 1, −1, −1, 1, −1, −1), (1, −1, −1, −1, −1, 1, 1, 1), (1, 1, −1, 1, −1, −1, 1, −1)}, {(−1, −1, 1, 1, −1, 1, 1, −1), (−1, 1, 1, −1, 1, 1, −1, −1), (1, −1, −1, 1, 1, 1, −1, −1), (1, 1, −1, −1, −1, 1, 1, −1), (−1, −1, −1, −1, 1, 1, 1, 1), (−1, 1, −1, 1, 1, −1, 1, −1)}, {(−1, −1, 1, 1, −1, 1, 1, −1), (−1, 1, 1, −1, 1, 1, −1, −1), (1, −1, −1, 1, 1, 1, −1, −1), (1, 1, −1, −1, −1, 1, 1, −1), (−1, −1, −1, −1, 1, 1, 1, 1), (1, −1, 1, −1, −1, 1, −1, 1)}, {(−1, −1, 1, 1, −1, 1, 1, −1), (−1, 1, 1, −1, 1, 1, −1, −1), (1, −1, −1, 1, 1, 1, −1, −1), (1, 1, −1, −1, −1, 1, 1, −1), (−1, 1, −1, 1, 1, −1, 1, −1), (1, 1, 1, 1, −1, −1, −1, −1)}, {(−1, −1, 1, 1, −1, 1, 1, −1), (−1, 1, 1, −1, 1, 1, −1, −1), (1, −1, −1, 1, 1, 1, −1, −1), (1, 1, −1, −1, −1, 1, 1, −1), (1, −1, 1, −1, −1, 1, −1, 1), (1, 1, 1, 1, −1, −1, −1, −1)}, {(−1, −1, 1, 1, −1, 1, 1, −1), (1, −1, −1, 1, −1, −1, 1, 1), (1, −1, −1, 1, 1, 1, −1, −1), (1, 1, −1, −1, −1, 1, 1, −1), (−1, −1, −1, −1, 1, 1, 1, 1), (−1, 1, −1, 1, 1, −1, 1, −1)}, {(−1, −1, 1, 1, −1, 1, 1, −1), (1, −1, −1, 1, −1, −1, 1, 1), (1, −1, −1, 1, 1, 1, −1, −1), (1, 1, −1, −1, −1, 1, 1, −1), (−1, −1, −1, −1, 1, 1, 1, 1), (1, −1, 1, −1, −1, 1, −1, 1)}, {(−1, −1, 1, 1, −1, 1, 1, −1), (1, −1, −1, 1, −1, −1, 1, 1), (1, −1, −1, 1, 1, 1, −1, −1), (1, 1, −1, −1, −1, 1, 1, −1), (−1, 1, −1, 1, 1, −1, 1, −1), (1, 1, 1, 1, −1, −1, −1, −1)}, {(−1, −1, 1, 1, −1, 1, 1, −1), (1, −1, −1, 1, −1, −1, 1, 1), (1, −1, −1, 1, 1, 1, −1, −1), (1, 1, −1, −1, −1, 1, 1, −1), (1, −1, 1, −1, −1, 1, −1, 1), (1, 1, 1, 1, −1, −1, −1, −1)}, {(−1, −1, 1, 1, −1, 1, 1, −1), (1, −1, −1, 1, 1, 1, −1, −1), (1, −1, 1, 1, −1, −1, −1, 1), (1, 1, 1, −1, −1, 1, −1, −1), (−1, −1, 1, −1, 1, 1, −1, 1), (−1, 1, 1, 1, 1, −1, −1, −1)}, {(−1, −1, 1, 1, −1, 1, 1, −1), (1, −1, −1, 1, 1, 1, −1, −1), (1, −1, 1, 1, −1, −1, −1, 1), (1, 1, 1, −1, −1, 1, −1, −1), (−1, −1, 1, −1, 1, 1, −1, 1), (1, −1, −1, −1, TABLE 3-continued −1, 1, 1, 1)}, {(−1, −1, 1, 1, −1, 1, 1, −1), (1, −1, −1, 1, 1, 1, −1, −1), (1, −1, 1, 1, −1, −1, −1, 1), (1, 1, 1, −1, −1, 1, −1, −1),
(−1, 1, 1, 1, 1, −1, −1, −1), (1, 1, −1, 1, −1, −1, 1, −1)}, {(−1, −1, 1, 1, −1, 1, 1, −1), (1, −1, −1, 1, 1, 1, −1, −1), (1, −1, 1, 1, −1, −1,
−1, 1), (1, 1, 1, −1, −1, 1, −1, −1), (1, −1, −1, −1, −1, 1, 1, 1), (1, 1, −1, 1, −1, −1, 1, −1)}, {(−1, −1, 1, 1, 1, −1, −1, 1), (−1, 1, 1,
−1, −1, −1, 1, 1), (−1, 1, 1, −1, 1, 1, −1, −1), (1, 1, −1, −1, 1, −1, −1, 1), (−1, −1, −1, −1, 1, 1, 1, 1), (−1, 1, −1, 1, 1, −1, 1, −1)},
{(−1, −1, 1, 1, 1, −1, −1, 1), (−1, 1, 1, −1, −1, −1, 1, 1), (−1, 1, 1, −1, 1, 1, −1, −1), (1, 1, −1, −1, 1, −1, −1, 1), (−1, −1, −1,
−1, 1, 1, 1, 1), (1, −1, 1, −1, −1, 1, −1, 1)}, {(−1, −1, 1, 1, 1, −1, −1, 1), (−1, 1, 1, −1, −1, −1, 1, 1), (−1, 1, 1, −1, 1, 1, −1,
−1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1, −1, 1), (−1, 1, 1, −1,
−1, −1, 1, 1), (−1, 1, 1, −1, 1, 1, −1, −1), (1, 1, −1, −1, 1, −1, −1, 1), (1, −1, 1, −1, −1, 1, −1, 1), (1, 1, 1, 1, −1, −1, −1, −1)}, {(−1,
−1, 1, 1, 1, −1, −1, 1), (−1, 1, 1, −1, −1, −1, 1, 1), (1, −1, −1, 1, −1, −1, 1, 1), (1, 1, −1, −1, 1, −1, −1, 1), (−1, −1, −1, −1, 1, 1, 1, 1),
(−1, 1, −1, 1, 1, −1, 1, −1)}, {(−1, −1, 1, 1, 1, −1, −1, 1), (−1, 1, 1, −1, −1, −1, 1, 1), (1, −1, −1, 1, −1, −1, 1, 1), (1, 1, −1, −1, 1, −1,
−1, 1), (−1, −1, −1, −1, 1, 1, 1, 1), (1, −1, 1, −1, −1, 1, −1, 1)}, {(−1, −1, 1, 1, 1, −1, −1, 1), (−1, 1, 1, −1, −1, −1, 1, 1), (1, −1,
−1, 1, −1, −1, 1, 1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1,
−1, 1), (−1, 1, 1, −1, −1, −1, 1, 1), (1, −1, −1, 1, −1, −1, 1, 1), (1, 1, −1, −1, 1, −1, −1, 1), (1, −1, 1, −1, −1, 1, −1, 1), (1, 1, 1, 1, −1,
−1, −1, −1)}, {(−1, −1, 1, 1, 1, −1, −1, 1), (−1, 1, 1, −1, 1, 1, −1, −1), (−1, 1, 1, 1, −1, −1, 1, −1), (1, 1, −1, 1, 1, −1, −1, −1), (−1,
−1, −1, 1, 1, 1, 1, −1), (−1, 1, −1, −1, 1, −1, 1, 1)}, {(−1, −1, 1, 1, 1, −1, −1, 1), (−1, 1, 1, −1, 1, 1, −1, −1), (−1, 1, 1, 1, −1, −1, 1,
−1), (1, 1, −1, 1, 1, −1, −1, −1), (−1, −1, −1, 1, 1, 1, 1, −1), (1, −1, 1, 1, −1, 1, −1, −1)}, {(−1, −1, 1, 1, 1, −1, −1, 1), (−1, 1, 1,
−1, 1, 1, −1, −1), (−1, 1, 1, 1, −1, −1, 1, −1), (1, 1, −1, 1, 1, −1, −1, −1), (−1, 1, −1, −1, 1, −1, 1, 1), (1, 1, 1, −1, −1, −1, −1, 1)},
{(−1, −1, 1, 1, 1, −1, −1, 1), (−1, 1, 1, −1, 1, 1, −1, −1), (−1, 1, 1, 1, −1, −1, 1, −1), (1, 1, −1, 1, 1, −1, −1, −1), (1, −1, 1, 1, −1, 1, −1,
−1), (1, 1, 1, −1, −1, −1, −1, 1)}, {(−1, −1, 1, 1, 1, −1, −1, 1), (−1, 1, 1, −1, 1, 1, −1, −1), (1, −1, −1, −1, 1, 1, −1, 1), (1, 1,
−1, 1, 1, −1, −1, −1), (−1, −1, −1, 1, 1, 1, 1, −1), (−1, 1, −1, −1, 1, −1, 1, 1)}, {(−1, −1, 1, 1, 1, −1, −1, 1), (−1, 1, 1, −1, 1, 1, −1,
−1), (1, −1, −1, −1, 1, 1, −1, 1), (1, 1, −1, 1, 1, −1, −1, −1), (−1, −1, −1, 1, 1, 1, 1, −1), (1, −1, 1, 1, −1, 1, −1, −1)}, {(−1,
−1, 1, 1, 1, −1, −1, 1), (−1, 1, 1, −1, 1, 1, −1, −1), (1, −1, −1, −1, 1, 1, −1, 1), (1, 1, −1, 1, 1, −1, −1, −1), (−1, 1, −1, −1, 1,
−1, 1, 1), (1, 1, 1, −1, −1, −1, −1, 1)}, {(−1, −1, 1, 1, 1, −1, −1, 1), (−1, 1, 1, −1, 1, 1, −1, −1), (1, −1, −1, −1, 1, 1, −1, 1), (1, 1,
−1, 1, 1, −1, −1, −1), (1, −1, 1, 1, −1, 1, −1, −1), (1, 1, 1, −1, −1, −1, −1, 1)}, {(−1, −1, 1, 1, 1, −1, −1, 1), (−1, 1, 1, −1, 1, 1, −1,
−1), (1, −1, −1, 1, 1, 1, −1, −1), (1, 1, −1, −1, 1, −1, −1, 1), (−1, −1, −1, −1, 1, 1, 1, 1), (−1, 1, −1, 1, 1, −1, 1, −1)}, {(−1,
−1, 1, 1, 1, −1, −1, 1), (−1, 1, 1, −1, 1, 1, −1, −1), (1, −1, −1, 1, 1, 1, −1, −1), (1, 1, −1, −1, 1, −1, −1, 1), (−1, −1, −1,
−1, 1, 1, 1, 1), (1, −1, 1, −1, −1, 1, −1, 1)}, {(−1, −1, 1, 1, 1, −1, −1, 1), (−1, 1, 1, −1, 1, 1, −1, −1), (1, −1, −1, 1, 1, 1, −1,
−1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1, −1, 1), (−1, 1, 1,
−1, 1, 1, −1, −1), (1, −1, −1, 1, 1, 1, −1, −1), (1, 1, −1, −1, 1, −1, −1, 1), (1, −1, 1, −1, −1, 1, −1, 1), (1, 1, 1, 1, −1, −1, −1, −1)},
{(−1, −1, 1, 1, 1, −1, −1, 1), (−1, 1, 1, 1, −1, −1, 1, −1), (1, −1, −1, 1, −1, −1, 1, 1), (1, 1, −1, 1, 1, −1, −1, −1), (−1, −1, −1, 1, 1, 1, 1,
−1), (−1, 1, −1, −1, 1, −1, 1, 1)}, {(−1, −1, 1, 1, 1, −1, −1, 1), (−1, 1, 1, 1, −1, −1, 1, −1), (1, −1, −1, 1, −1, −1, 1, 1), (1, 1,
−1, 1, 1, −1, −1, −1), (−1, −1, −1, 1, 1, 1, 1, −1), (1, −1, 1, 1, −1, 1, −1, −1)}, {(−1, −1, 1, 1, 1, −1, −1, 1), (−1, 1, 1, 1, −1, −1, 1,
−1), (1, −1, −1, 1, −1, −1, 1, 1), (1, 1, −1, 1, 1, −1, −1, −1), (−1, 1, −1, −1, 1, −1, 1, 1), (1, 1, 1, −1, −1, −1, −1, 1)}, {(−1,
−1, 1, 1, 1, −1, −1, 1), (−1, 1, 1, 1, −1, −1, 1, −1), (1, −1, −1, 1, −1, −1, 1, 1), (1, 1, −1, 1, 1, −1, −1, −1), (1, −1, 1, 1, −1, 1, −1,
−1), (1, 1, 1, −1, −1, −1, −1, 1)}, {(−1, −1, 1, 1, 1, −1, −1, 1), (1, −1, −1, −1, 1, 1, −1, 1), (1, −1, −1, 1, −1, −1, 1, 1), (1, 1,
−1, 1, 1, −1, −1, −1), (−1, −1, −1, 1, 1, 1, 1, −1), (−1, 1, −1, −1, 1, −1, 1, 1)}, {(−1, −1, 1, 1, 1, −1, −1, 1), (1, −1, −1, −1, 1, 1,
−1, 1), (1, −1, −1, 1, −1, −1, 1, 1), (1, 1, −1, 1, 1, −1, −1, −1), (−1, −1, −1, 1, 1, 1, 1, −1), (1, −1, 1, 1, −1, 1, −1, −1)}, {(−1,
−1, 1, 1, 1, −1, −1, 1), (1, −1, −1, −1, 1, 1, −1, 1), (1, −1, −1, 1, −1, −1, 1, 1), (1, 1, −1, 1, 1, −1, −1, −1), (−1, 1, −1, −1, 1,
−1, 1, 1), (1, 1, 1, −1, −1, −1, −1, 1)}, {(−1, −1, 1, 1, 1, −1, −1, 1), (1, −1, −1, −1, 1, 1, −1, 1), (1, −1, −1, 1, −1, −1, 1, 1), (1, 1,
−1, 1, 1, −1, −1, −1), (1, −1, 1, 1, −1, 1, −1, −1), (1, 1, 1, −1, −1, −1, −1, 1)}, {(−1, −1, 1, 1, 1, −1, −1, 1), (1, −1, −1, 1, −1,
−1, 1, 1), (1, −1, −1, 1, 1, 1, −1, −1), (1, 1, −1, −1, 1, −1, −1, 1), (−1, −1, −1, −1, 1, 1, 1, 1), (−1, 1, −1, 1, 1, −1, 1, −1)}, {(−1,
−1, 1, 1, 1, −1, −1, 1), (1, −1, −1, 1, −1, −1, 1, 1), (1, −1, −1, 1, 1, 1, −1, −1), (1, 1, −1, −1, 1, −1, −1, 1), (−1, −1, −1,
−1, 1, 1, 1, 1), (1, −1, 1, −1, −1, 1, −1, 1)}, {(−1, −1, 1, 1, 1, −1, −1, 1), (1, −1, −1, 1, −1, −1, 1, 1), (1, −1, −1, 1, 1, 1, −1,
−1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1, −1, 1), (1, −1, −1, 1,
−1, −1, 1, 1), (1, −1, −1, 1, 1, 1, −1, −1), (1, 1, −1, −1, 1, −1, −1, 1), (1, −1, 1, −1, −1, 1, −1, 1), (1, 1, 1, 1, −1, −1, −1, −1)},
{(−1, 1, −1, −1, 1, 1, 1, −1), (−1, 1, 1, −1, −1, −1, 1, 1), (1, 1, −1, −1, 1, −1, −1, 1), (1, 1, 1, −1, −1, 1, −1, −1), (−1, −1, 1, −1, 1, 1,
−1, 1), (−1, 1, 1, 1, 1, −1, −1, −1)}, {(−1, 1, −1, −1, 1, 1, 1, −1), (−1, 1, 1, −1, −1, −1, 1, 1), (1, 1, −1, −1, 1, −1, −1, 1), (1, 1, 1,
−1, −1, 1, −1, −1), (−1, −1, 1, −1, 1, 1, −1, 1), (1, −1, −1, −1, −1, 1, 1, 1)}, {(−1, 1, −1, −1, 1, 1, 1, −1), (−1, 1, 1, −1, −1,
−1, 1, 1), (1, 1, −1, −1, 1, −1, −1, 1), (1, 1, 1, −1, −1, 1, −1, −1), (−1, 1, 1, 1, 1, −1, −1, −1), (1, 1, −1, 1, −1, −1, 1, −1)}, {(−1, 1,
−1, −1, 1, 1, 1, −1), (−1, 1, 1, −1, −1, −1, 1, 1), (1, 1, −1, −1, 1, −1, −1, 1), (1, 1, 1, −1, −1, 1, −1, −1), (1, −1, −1, −1,
−1, 1, 1, 1), (1, 1, −1, 1, −1, −1, 1, −1) }, {(−1, 1, −1, −1, 1, 1, 1, −1), (−1, 1, 1, 1, −1, −1, 1, −1), (1, 1, −1, 1, 1, −1, −1,
−1), (1, 1, 1, −1, −1, 1, −1, −1), (−1, −1, 1, 1, 1, 1, −1, −1), (−1, 1, 1, −1, 1, −1, −1, 1)}, {(−1, 1, −1, −1, 1, 1, 1, −1), (−1, 1, 1, 1,
−1, −1, 1, −1), (1, 1, −1, 1, 1, −1, −1, −1), (1, 1, 1, −1, −1, 1, −1, −1), (−1, −1, 1, 1, 1, 1, −1, −1), (1, −1, −1, 1, −1, 1, 1, −1)},
{(−1, 1, −1, −1, 1, 1, 1, −1), (−1, 1, 1, 1, −1, −1, 1, −1), (1, 1, −1, 1, 1, −1, −1, −1), (1, 1, 1, −1, −1, 1, −1, −1), (−1, 1, 1, −1, 1, −1,
−1, 1), (1, 1, −1, −1, −1, −1, 1, 1)}, {(−1, 1, −1, −1, 1, 1, 1, −1), (−1, 1, 1, 1, −1, −1, 1, −1), (1, 1, −1, 1, 1, −1, −1, −1), (1, 1, 1,
−1, −1, 1, −1, −1), (1, −1, −1, 1, −1, 1, 1, −1), (1, 1, −1, −1, −1, −1, 1, 1)}, {(−1, 1, −1, −1, 1, 1, 1, −1), (1, −1, −1, −1, 1, 1,
−1, 1), (1, 1, −1, 1, 1, −1, −1, −1), (1, 1, 1, −1, −1, 1, −1, −1), (−1, −1, 1, 1, 1, 1, −1, −1), (−1, 1, 1, −1, 1, −1, −1, 1)}, {(−1, 1, −1,
−1, 1, 1, 1, −1), (1, −1, −1, −1, 1, 1, −1, 1), (1, 1, −1, 1, 1, −1, −1, −1), (1, 1, 1, −1, −1, 1, −1, −1), (−1, −1, 1, 1, 1, 1, −1, −1), (1, −1,
−1, 1, −1, 1, 1, −1)}, {(−1, 1, −1, −1, 1, 1, 1, −1), (1, −1, −1, −1, 1, 1, −1, 1), (1, 1, −1, 1, 1, −1, −1, −1), (1, 1, 1, −1, −1, 1, −1,
−1), (−1, 1, 1, −1, 1, −1, −1, 1), (1, 1, −1, −1, −1, −1, 1, 1)}, {(−1, 1, −1, −1, 1, 1, 1, −1), (1, −1, −1, −1, 1, 1, −1, 1), (1, 1,
−1, 1, 1, −1, −1, −1), (1, 1, 1, −1, −1, 1, −1, −1), (1, −1, −1, 1, −1, 1, 1, −1), (1, 1, −1, −1, −1, −1, 1, 1)}, {(−1, 1, −1, −1, 1, 1, 1,
−1), (1, −1, −1, 1, 1, 1, −1, −1), (1, 1, −1, −1, 1, −1, −1, 1), (1, 1, 1, −1, −1, 1, −1, −1), (−1, −1, 1, −1, 1, 1, −1, 1), (−1, 1, 1, 1, 1, −1,
−1, −1)}, {(−1, 1, −1, −1, 1, 1, 1, −1), (1, −1, −1, 1, 1, 1, −1, −1), (1, 1, −1, −1, 1, −1, −1, 1), (1, 1, 1, −1, −1, 1, −1, −1), (−1, −1, 1,
−1, 1, 1, −1, 1), (1, −1, −1, −1, −1, 1, 1, 1)}, {(−1, 1, −1, −1, 1, 1, 1, −1), (1, −1, −1, 1, 1, 1, −1, −1), (1, 1, −1, −1, 1, −1,
−1, 1), (1, 1, 1, −1, −1, 1, −1, −1), (−1, 1, 1, 1, 1, −1, −1, −1), (1, 1, −1, 1, −1, −1, 1, −1)}, {(−1, 1, −1, −1, 1, 1, 1, −1), (1, −1,
−1, 1, 1, 1, −1, −1), (1, 1, −1, −1, 1, −1, −1, 1), (1, 1, 1, −1, −1, 1, −1, −1), (1, −1, −1, −1, −1, 1, 1, 1), (1, 1, −1, 1, −1, −1, 1, −1)},
{(−1, 1, 1, −1, −1, −1, 1, 1), (−1, 1, 1, −1, 1, 1, −1, −1), (1, 1, −1, −1, −1, 1, 1, −1), (1, 1, −1, −1, 1, −1, −1, 1), (−1, −1, −1,
−1, 1, 1, 1, 1), (−1, 1, −1, 1, 1, −1, 1, −1)}, {(−1, 1, 1, −1, −1, −1, 1, 1), (−1, 1, 1, −1, 1, 1, −1, −1), (1, 1, −1, −1, −1, 1, 1,
−1), (1, 1, −1, −1, 1, −1, −1, 1), (−1, −1, −1, −1, 1, 1, 1, 1), (1, −1, 1, −1, −1, 1, −1, 1)}, {(−1, 1, 1, −1, −1, −1, 1, 1), (−1, 1, 1,
−1, 1, 1, −1, −1), (1, 1, −1, −1, −1, 1, 1, −1), (1, 1, −1, −1, 1, −1, −1, 1), (−1, 1, −1, 1, 1, −1, 1, −1), (1, 1, 1, 1, −1, −1, −1, −1)},
{(−1, 1, 1, −1, −1, −1, 1, 1), (−1, 1, 1, −1, 1, 1, −1, −1), (1, 1, −1, −1, −1, 1, 1, −1), (1, 1, −1, −1, 1, −1, −1, 1), (1, −1, 1, −1, −1, 1,
−1, 1), (1, 1, 1, 1, −1, −1, −1, −1)}, {(−1, 1, 1, −1, −1, −1, 1, 1), (1, −1, −1, 1, −1, −1, 1, 1), (1, 1, −1, −1, −1, 1, 1, −1), (1, 1, −1,
−1, 1, −1, −1, 1), (−1, −1, −1, −1, 1, 1, 1, 1), (−1, 1, −1, 1, 1, −1, 1, −1)}, {(−1, 1, 1, −1, −1, −1, 1, 1), (1, −1, −1, 1, −1,
−1, 1, 1), (1, 1, −1, −1, −1, 1, 1, −1), (1, 1, −1, −1, 1, −1, −1, 1), (−1, −1, −1, −1, 1, 1, 1, 1), (1, −1, 1, −1, −1, 1, −1, 1)},
{(−1, 1, 1, −1, −1, −1, 1, 1), (1, −1, −1, 1, −1, −1, 1, 1), (1, 1, −1, −1, −1, 1, 1, −1), (1, 1, −1, −1, 1, −1, −1, 1), (−1, 1, −1, 1, 1, −1, 1,
−1), (1, 1, 1, 1, −1, −1, −1, −1)}, {(−1, 1, 1, −1, −1, −1, 1, 1), (1, −1, −1, 1, −1, −1, 1, 1), (1, 1, −1, −1, −1, 1, 1, −1), (1, 1, −1,
−1, 1, −1, −1, 1), (1, −1, 1, −1, −1, 1, −1, 1), (1, 1, 1, 1, −1, −1, −1, −1)}, {(−1, 1, 1, −1, −1, −1, 1, 1), (1, −1, 1, 1, −1, −1,
−1, 1), (1, 1, −1, −1, 1, −1, −1, 1), (1, 1, 1, −1, −1, 1, −1, −1), (−1, −1, 1, −1, 1, 1, −1, 1), (−1, 1, 1, 1, 1, −1, −1, −1)}, {(−1, 1, 1,
−1, −1, −1, 1, 1), (1, −1, 1, 1, −1, −1, −1, 1), (1, 1, −1, −1, 1, −1, −1, 1), (1, 1, 1, −1, −1, 1, −1, −1), (−1, −1, 1, −1, 1, 1, −1, 1), (1,
−1, −1, −1, −1, 1, 1, 1)}, {(−1, 1, 1, −1, −1, −1, 1, 1), (1, −1, 1, 1, −1, −1, −1, 1), (1, 1, −1, −1, 1, −1, −1, 1), (1, 1, 1, −1, −1, 1, −1, TABLE 3-continued −1), (−1, 1, 1, 1, 1, −1, −1, −1), (1, 1, −1, 1, −1, −1, 1, −1)}, {(−1, 1, 1, −1, −1, −1, 1, 1), (1, −1, 1, 1, −1, −1, −1, 1), (1, 1, −1,
−1, 1, −1, −1, 1), (1, 1, 1, −1, −1, 1, −1, −1), (1, −1, −1, −1, −1, 1, 1, 1), (1, 1, −1, 1, −1, −1, 1, −1)}, {(−1, 1, 1, −1, 1, 1, −1, −1),
(−1, 1, 1, 1, −1, −1, 1, −1), (1, 1, −1, −1, −1, 1, 1, −1), (1, 1, −1, 1, 1, −1, −1, −1), (−1, −1, −1, 1, 1, 1, 1, −1), (−1, 1, −1, −1, 1,
−1, 1, 1)}, {(−1, 1, 1, −1, 1, 1, −1, −1), (−1, 1, 1, 1, −1, −1, 1, −1), (1, 1, −1, −1, −1, 1, 1, −1), (1, 1, −1, 1, 1, −1, −1, −1), (−1, −1,
−1, 1, 1, 1, 1, −1), (1, −1, 1, 1, −1, 1, −1, −1)}, {(−1, 1, 1, −1, 1, 1, −1, −1), (−1, 1, 1, 1, −1, −1, 1, −1), (1, 1, −1, −1, −1, 1, 1,
−1), (1, 1, −1, 1, 1, −1, −1, −1), (−1, 1, −1, −1, 1, −1, 1, 1), (1, 1, 1, −1, −1, −1, −1, 1)}, {(−1, 1, 1, −1, 1, 1, −1, −1), (−1, 1, 1, 1,
−1, −1, 1, −1), (1, 1, −1, −1, −1, 1, 1, −1), (1, 1, −1, 1, 1, −1, −1, −1), (1, −1, 1, 1, −1, 1, −1, −1), (1, 1, 1, −1, −1, −1, −1, 1)},
{(−1, 1, 1, −1, 1, 1, −1, −1), (1, −1, −1, −1, 1, 1, −1, 1), (1, 1, −1, −1, −1, 1, 1, −1), (1, 1, −1, 1, 1, −1, −1, −1), (−1, −1, −1, 1, 1, 1, 1,
−1), (−1, 1, −1, −1, 1, −1, 1, 1)}, {(−1, 1, 1, −1, 1, 1, −1, −1), (1, −1, −1, −1, 1, 1, −1, 1), (1, 1, −1, −1, −1, 1, 1, −1), (1, 1,
−1, 1, 1, −1, −1, −1), (−1, −1, −1, 1, 1, 1, 1, −1), (1, −1, 1, 1, −1, 1, −1, −1)}, {(−1, 1, 1, −1, 1, 1, −1, −1), (1, −1, −1, −1, 1, 1,
−1, 1), (1, 1, −1, −1, −1, 1, 1, −1), (1, 1, −1, 1, 1, −1, −1, −1), (−1, 1, −1, −1, 1, −1, 1, 1), (1, 1, 1, −1, −1, −1, −1, 1)}, {(−1, 1, 1,
−1, 1, 1, −1, −1), (1, −1, −1, −1, 1, 1, −1, 1), (1, 1, −1, −1, −1, 1, 1, −1), (1, 1, −1, 1, 1, −1, −1, −1), (1, −1, 1, 1, −1, 1, −1,
−1), (1, 1, 1, −1, −1, −1, −1, 1)}, {(−1, 1, 1, −1, 1, 1, −1, −1), (1, −1, −1, 1, 1, 1, −1, −1), (1, 1, −1, −1, −1, 1, 1, −1), (1, 1, −1,
−1, 1, −1, −1, 1), (−1, −1, −1, −1, 1, 1, 1, 1), (−1, 1, −1, 1, 1, −1, 1, −1)}, {(−1, 1, 1, −1, 1, 1, −1, −1), (1, −1, −1, 1, 1, 1, −1,
−1), (1, 1, −1, −1, −1, 1, 1, −1), (1, 1, −1, −1, 1, −1, −1, 1), (−1, −1, −1, −1, 1, 1, 1, 1), (1, −1, 1, −1, −1, 1, −1, 1)}, {(−1, 1, 1,
−1, 1, 1, −1, −1), (1, −1, −1, 1, 1, 1, −1, −1), (1, 1, −1, −1, −1, 1, 1, −1), (1, 1, −1, −1, 1, −1, −1, 1), (−1, 1, −1, 1, 1, −1, 1,
−1), (1, 1, 1, 1, −1, −1, −1, −1)}, {(−1, 1, 1, −1, 1, 1, −1, −1), (1, −1, −1, 1, 1, 1, −1, −1), (1, 1, −1, −1, −1, 1, 1, −1), (1, 1, −1,
−1, 1, −1, −1, 1), (1, −1, 1, −1, −1, 1, −1, 1), (1, 1, 1, 1, −1, −1, −1, −1)}, {(−1, 1, 1, 1, −1, −1, 1, −1), (1, −1, −1, 1, −1,
−1, 1, 1), (1, 1, −1, −1, −1, 1, 1, −1), (1, 1, −1, 1, 1, −1, −1, −1), (−1, −1, −1, 1, 1, 1, 1, −1), (−1, 1, −1, −1, 1, −1, 1, 1)},
{(−1, 1, 1, 1, −1, −1, 1, −1), (1, −1, −1, 1, −1, −1, 1, 1), (1, 1, −1, −1, −1, 1, 1, −1), (1, 1, −1, 1, 1, −1, −1, −1), (−1, −1, −1, 1, 1, 1, 1,
−1), (1, −1, 1, 1, −1, 1, −1, −1)}, {(−1, 1, 1, 1, −1, −1, 1, −1), (1, −1, −1, 1, −1, −1, 1, 1), (1, 1, −1, −1, −1, 1, 1, −1), (1, 1,
−1, 1, 1, −1, −1, −1), (−1, 1, −1, −1, 1, −1, 1, 1), (1, 1, 1, −1, −1, −1, −1, 1)}, {(−1, 1, 1, 1, −1, −1, 1, −1), (1, −1, −1, 1, −1,
−1, 1, 1), (1, 1, −1, −1, −1, 1, 1, −1), (1, 1, −1, 1, 1, −1, −1, −1), (1, −1, 1, 1, −1, 1, −1, −1), (1, 1, 1, −1, −1, −1, −1, 1)},
{(−1, 1, 1, 1, −1, −1, 1, −1), (1, −1, 1, 1, −1, −1, −1, 1), (1, 1, −1, 1, 1, −1, −1, −1), (1, 1, 1, −1, −1, 1, −1, −1), (−1, −1, 1, 1, 1, 1, −1,
−1), (−1, 1, 1, −1, 1, −1, −1, 1)}, {(−1, 1, 1, 1, −1, −1, 1, −1), (1, −1, 1, 1, −1, −1, −1, 1), (1, 1, −1, 1, 1, −1, −1, −1), (1, 1, 1, −1,
−1, 1, −1, −1), (−1, −1, 1, 1, 1, 1, −1, −1), (1, −1, −1, 1, −1, 1, 1, −1)}, {(−1, 1, 1, 1, −1, −1, 1, −1), (1, −1, 1, 1, −1, −1,
−1, 1), (1, 1, −1, 1, 1, −1, −1, −1), (1, 1, 1, −1, −1, 1, −1, −1), (−1, 1, 1, −1, 1, −1, −1, 1), (1, 1, −1, −1, −1, −1, 1, 1)},
{(−1, 1, 1, 1, −1, −1, 1, −1), (1, −1, 1, 1, −1, −1, −1, 1), (1, 1, −1, 1, 1, −1, −1, −1), (1, 1, 1, −1, −1, 1, −1, −1), (1, −1, −1, 1, −1, 1, 1,
−1), (1, 1, −1, −1, −1, −1, 1, 1)}, {(1, −1, −1, −1, 1, 1, −1, 1), (1, −1, −1, 1, −1, −1, 1, 1), (1, 1, −1, −1, −1, 1, 1, −1), (1, 1,
−1, 1, 1, −1, −1, −1), (−1, −1, −1, 1, 1, 1, 1, −1), (−1, 1, −1, −1, 1, −1, 1, 1)}, {(1, −1, −1, −1, 1, 1, −1, 1), (1, −1, −1, 1, −1,
−1, 1, 1), (1, 1, −1, −1, −1, 1, 1, −1), (1, 1, −1, 1, 1, −1, −1, −1), (−1, −1, −1, 1, 1, 1, 1, −1), (1, −1, 1, 1, −1, 1, −1, −1)}, {(1, −1,
−1, −1, 1, 1, −1, 1), (1, −1, −1, 1, −1, −1, 1, 1), (1, 1, −1, −1, −1, 1, 1, −1), (1, 1, −1, 1, 1, −1, −1, −1), (−1, 1, −1, −1, 1,
−1, 1, 1), (1, 1, 1, −1, −1, −1, −1, 1)}, {(1, −1, −1, −1, 1, 1, −1, 1), (1, −1, −1, 1, −1, −1, 1, 1), (1, 1, −1, −1, −1, 1, 1, −1), (1, 1,
−1, 1, 1, −1, −1, −1), (1, −1, 1, 1, −1, 1, −1, −1), (1, 1, 1, −1, −1, −1, −1, 1)}, {(1, −1, −1, −1, 1, 1, −1, 1), (1, −1, 1, 1, −1, −1,
−1, 1), (1, 1, −1, 1, 1, −1, −1, −1), (1, 1, 1, −1, −1, 1, −1, −1), (−1, −1, 1, 1, 1, 1, −1, −1), (−1, 1, 1, −1, 1, −1, −1, 1)}, {(1, −1, −1,
−1, 1, 1, −1, 1), (1, −1, 1, 1, −1, −1, −1, 1), (1, 1, −1, 1, 1, −1, −1, −1), (1, 1, 1, −1, −1, 1, −1, −1), (−1, −1, 1, 1, 1, 1, −1, −1), (1, −1,
−1, 1, −1, 1, 1, −1)}, {(1, −1, −1, −1, 1, 1, −1, 1), (1, −1, 1, 1, −1, −1, −1, 1), (1, 1, −1, 1, 1, −1, −1, −1), (1, 1, 1, −1, −1, 1, −1,
−1), (−1, 1, 1, −1, 1, −1, −1, 1), (1, 1, −1, −1, −1, −1, 1, 1)}, {(1, −1, −1, −1, 1, 1, −1, 1), (1, −1, 1, 1, −1, −1, −1, 1), (1, 1,
−1, 1, 1, −1, −1, −1), (1, 1, 1, −1, −1, 1, −1, −1), (1, −1, −1, 1, −1, 1, 1, −1), (1, 1, −1, −1, −1, −1, 1, 1)}, {(1, −1, −1, 1, −1,
−1, 1, 1), (1, −1, −1, 1, 1, 1, −1, −1), (1, 1, −1, −1, −1, 1, 1, −1), (1, 1, −1, −1, 1, −1, −1, 1), (−1, −1, −1, −1, 1, 1, 1, 1), (−1, 1,
−1, 1, 1, −1, 1, −1)}, {(1, −1, −1, 1, −1, −1, 1, 1), (1, −1, −1, 1, 1, 1, −1, −1), (1, 1, −1, −1, −1, 1, 1, −1), (1, 1, −1, −1, 1, −1,
−1, 1), (−1, −1, −1, −1, 1, 1, 1, 1), (1, −1, 1, −1, −1, 1, −1, 1)}, {(1, −1, −1, 1, −1, −1, 1, 1), (1, −1, −1, 1, 1, 1, −1, −1), (1, 1, −1,
−1, −1, 1, 1, −1), (1, 1, −1, −1, 1, −1, −1, 1), (−1, 1, −1, 1, 1, −1, 1, −1), (1, 1, 1, 1, −1, −1, −1, −1)}, {(1, −1, −1, 1, −1,
−1, 1, 1), (1, −1, −1, 1, 1, 1, −1, −1), (1, 1, −1, −1, −1, 1, 1, −1), (1, 1, −1, −1, 1, −1, −1, 1), (1, −1, 1, −1, −1, 1, −1, 1), (1, 1, 1, 1,
−1, −1, −1, −1)}, {(1, −1, −1, 1, 1, 1, −1, −1), (1, −1, 1, 1, −1, −1, −1, 1), (1, 1, −1, −1, 1, −1, −1, 1), (1, 1, 1, −1, −1, 1, −1, −1),
(−1, −1, 1, −1, 1, 1, −1, 1), (−1, 1, 1, 1, 1, −1, −1, −1)}, {(1, −1, −1, 1, 1, 1, −1, −1), (1, −1, 1, 1, −1, −1, −1, 1), (1, 1, −1, −1, 1, −1,
−1, 1), (1, 1, 1, −1, −1, 1, −1, −1), (−1, −1, 1, −1, 1, 1, −1, 1), (1, −1, −1, −1, −1, 1, 1, 1)}, {(1, −1, −1, 1, 1, 1, −1, −1), (1,
−1, 1, 1, −1, −1, −1, 1), (1, 1, −1, −1, 1, −1, −1, 1), (1, 1, 1, −1, −1, 1, −1, −1), (−1, 1, 1, 1, 1, −1, −1, −1), (1, 1, −1, 1, −1, −1, 1,
−1)}, {(1, −1, −1, 1, 1, 1, −1, −1), (1, −1, 1, 1, −1, −1, −1, 1), (1, 1, −1, −1, 1, −1, −1, 1), (1, 1, 1, 1, −1, 1, −1, −1), (1, −1, −1, −1,
−1, 1, 1, 1), (1, 1, −1, 1, −1, −1, 1, −1) }, {(−1, −1, −1, −1, 1, 1, 1, 1), (−1, −1, 1, 1, 1, 1, −1, −1), (−1, 1, −1, 1, 1, −1, 1, −1),
(−1, 1, 1, −1, 1, −1, −1, 1), (−1, −1, 1, 1, −1, −1, 1, 1), (−1, 1, 1, −1, −1, 1, 1, −1)}, {(−1, −1, −1, −1, 1, 1, 1, 1), (−1, −1, 1, 1, 1, 1,
−1, −1), (−1, 1, −1, 1, 1, −1, 1, −1), (−1, 1, 1, −1, 1, −1, −1, 1), (−1, −1, 1, 1, −1, −1, 1, 1), (1, −1, −1, 1, 1, −1, −1, 1)}, {(−1, −1,
−1, −1, 1, 1, 1, 1), (−1, −1, 1, 1, 1, 1, −1, −1), (−1, 1, −1, 1, 1, −1, 1, −1), (−1, 1, 1, −1, 1, −1, −1, 1), (−1, 1, 1, −1, −1, 1, 1,
−1), (1, 1, −1, −1, 1, 1, −1, −1)}, {(−1, −1, −1, −1, 1, 1, 1, 1), (−1, −1, 1, 1, 1, 1, −1, −1), (−1, 1, −1, 1, 1, −1, 1, −1), (−1, 1, 1,
−1, 1, −1, −1, 1), (1, −1, −1, 1, 1, −1, −1, 1), (1, 1, −1, −1, 1, 1, −1, −1)}, {(−1, −1, −1, −1, 1, 1, 1, 1), (−1, −1, 1, 1, 1, 1, −1, −1),
(−1, 1, −1, 1, 1, −1, 1, −1), (1, −1, −1, 1, −1, 1, 1, −1), (−1, −1, 1, 1, −1, −1, 1, 1), (−1, 1, 1, −1, −1, 1, 1, −1)}, {(−1, −1, −1,
−1, 1, 1, 1, 1), (−1, −1, 1, 1, 1, 1, −1, −1), (−1, 1, −1, 1, 1, −1, 1, −1), (1, −1, −1, 1, −1, 1, 1, −1), (−1, −1, 1, 1, −1, −1, 1, 1), (1, −1,
−1, 1, 1, −1, −1, 1)}, {(−1, −1, −1, −1, 1, 1, 1, 1), (−1, −1, 1, 1, 1, 1, −1, −1), (−1, 1, −1, 1, 1, −1, 1, −1), (1, −1, −1, 1, −1, 1, 1,
−1), (−1, 1, 1, −1, −1, 1, 1, −1), (1, 1, −1, −1, 1, 1, −1, −1)}, {(−1, −1, −1, −1, 1, 1, 1, 1), (−1, −1, 1, 1, 1, 1, −1, −1), (−1, 1,
−1, 1, 1, −1, 1, −1), (1, −1, −1, 1, −1, 1, 1, −1), (1, −1, −1, 1, 1, −1, −1, 1), (1, 1, −1, −1, 1, 1, −1, −1)}, {(−1, −1, −1,
−1, 1, 1, 1, 1), (−1, −1, 1, 1, 1, 1, −1, −1), (−1, 1, 1, −1, 1, −1, −1, 1), (1, −1, 1, −1, −1, 1, −1, 1), (−1, −1, 1, 1, −1, −1, 1, 1),
(−1, 1, 1, −1, −1, 1, 1, −1)}, {(−1, −1, −1, −1, 1, 1, 1, 1), (−1, −1, 1, 1, 1, 1, −1, −1), (−1, 1, 1, −1, 1, −1, −1, 1), (1, −1, 1, −1, −1, 1,
−1, 1), (−1, −1, 1, 1, −1, −1, 1, 1), (1, −1, −1, 1, 1, −1, −1, 1)}, {(−1, −1, −1, −1, 1, 1, 1, 1), (−1, −1, 1, 1, 1, 1, −1, −1), (−1, 1, 1,
−1, 1, −1, −1, 1), (1, −1, 1, −1, −1, 1, −1, 1), (−1, 1, 1, −1, −1, 1, 1, −1), (1, 1, −1, −1, 1, 1, −1, −1)}, {(−1, −1, −1, −1, 1, 1, 1, 1),
(−1, −1, 1, 1, 1, 1, −1, −1), (−1, 1, 1, −1, 1, −1, −1, 1), (1, −1, 1, −1, −1, 1, −1, 1), (1, −1, −1, 1, 1, −1, −1, 1), (1, 1, −1, −1, 1, 1, −1,
−1)}, {(−1, −1, −1, −1, 1, 1, 1, 1), (−1, −1, 1, 1, 1, 1, −1,−1), (1, −1, −1, 1, −1, 1, 1, −1), (1, −1, 1, −1, −1, 1, −1, 1), (−1, −1, 1, 1,
−1, −1, 1, 1), (−1, 1, 1, −1, −1, 1, 1, −1)}, {(−1, −1, −1, −1, 1, 1, 1, 1), (−1, −1, 1, 1, 1, 1, −1, −1), (1, −1, −1, 1, −1, 1, 1, −1), (1,
−1, 1, −1, −1, 1, −1, 1), (−1, −1, 1, 1, −1, −1, 1, 1), (1, −1, −1, 1, 1, −1, −1, 1)}, {(−1, −1, −1, −1, 1, 1, 1, 1), (−1, −1, 1, 1, 1, 1, −1,
−1), (1, −1, −1, 1, −1, 1, 1, −1), (1, −1, 1, −1, −1, 1, −1, 1), (−1, 1, 1, −1, −1, 1, 1, −1), (1, 1, −1, −1, 1, 1, −1, −1)}, {(−1, −1, −1,
−1, 1, 1, 1, 1), (−1, −1, 1, 1, 1, 1, −1, −1), (1, −1, −1, 1, −1, 1, 1, −1), (1, −1, 1, −1, −1, 1, −1, 1), (1, −1, −1, 1, 1, −1, −1, 1), (1, 1,
−1, −1, 1, 1, −1, −1)}, {(−1, −1, −1, −1, 1, 1, 1, 1), (−1, 1, −1, 1, 1, −1, 1, −1), (−1, 1, 1, −1, 1, −1, −1, 1), (1, 1, −1, −1, −1,
−1, 1, 1), (−1, −1, 1, 1, −1, −1, 1, 1), (−1, 1, 1, −1, −1, 1, 1, −1)}, {(−1, −1, −1, −1, 1, 1, 1, 1), (−1, 1, −1, 1, 1, −1, 1, −1),
(−1, 1, 1, −1, 1, −1, −1, 1), (1, 1, −1, −1, −1, −1, 1, 1), (−1, −1, 1, 1, −1, −1, 1, 1), (1, −1, −1, 1, 1, −1, −1, 1)}, {(−1, −1, −1,
−1, 1, 1, 1, 1), (−1, 1, −1, 1, 1, −1, 1, −1), (−1, 1, 1, −1, 1, −1, −1, 1), (1, 1, −1, −1, −1, −1, 1, 1), (−1, 1, 1, −1, −1, 1, 1, −1), (1, 1,
−1, −1, 1, 1, −1, −1)}, {(−1, −1, −1, −1, 1, 1, 1, 1), (−1, 1, −1, 1, 1, −1, 1, −1), (−1, 1, 1, −1, 1, −1, −1, 1), (1, 1, −1, −1, −1,
−1, 1, 1), (1, −1, −1, 1, 1, −1, −1, 1), (1, 1, −1, −1, 1, 1, −1, −1)}, {(−1, −1, −1, −1, 1, 1, 1, 1), (−1, 1, −1, 1, 1, −1, 1, −1), (1, −1,
−1, 1, −1, 1, 1, −1), (1, 1, −1, −1, −1, −1, 1, 1), (−1, −1, 1, 1, −1, −1, 1, 1), (−1, 1, 1, −1, −1, 1, 1, −1)}, {(−1, −1, −1,
−1, 1, 1, 1, 1), (−1, 1, −1, 1, 1, −1, 1, −1), (1, −1, −1, 1, −1, 1, 1, −1), (1, 1, −1, −1, −1, −1, 1, 1), (−1, −1, 1, 1, −1, −1, 1, 1), (1, −1,
−1, 1, 1, −1, −1, 1)}, {(−1, −1, −1, −1, 1, 1, 1, 1), (−1, 1, −1, 1, 1, −1, 1, −1), (1, −1, −1, 1, −1, 1, 1, −1), (1, 1, −1, −1, −1,
−1, 1, 1), (−1, 1, 1, −1, −1, 1, 1, −1), (1, 1, −1, −1, 1, 1, −1, −1)}, {(−1, −1, −1, −1, 1, 1, 1, 1), (−1, 1, −1, 1, 1, −1, 1, −1), (1, −1, TABLE 3-continued −1, 1, −1, 1, 1, −1), (1, 1, −1, −1, −1, −1, 1, 1), (1, −1, −1, 1, 1, −1, −1, 1), (1, 1, −1, −1, 1, 1, −1, −1)}, {(−1, −1, −1,
−1, 1, 1, 1, 1), (−1, 1, 1, −1, 1, −1, −1, 1), (1, −1, 1, −1, −1, 1, −1, 1), (1, 1, −1, −1, −1, −1, 1, 1), (−1, −1, 1, 1, −1, −1, 1, 1),
(−1, 1, 1, −1, −1, 1, 1, −1)}, {(−1, −1, −1, −1, 1, 1, 1, 1), (−1, 1, 1, −1, 1, −1, −1, 1), (1, −1, 1, −1, −1, 1, −1, 1), (1, 1, −1, −1, −1,
−1, 1, 1), (−1, −1, 1, 1, −1, −1, 1, 1), (1, −1, −1, 1, 1, −1, −1, 1)}, {(−1, −1, −1, −1, 1, 1, 1, 1), (−1, 1, 1, −1, 1, −1, −1, 1), (1,
−1, 1, −1, −1, 1, −1, 1), (1, 1, −1, −1, −1, −1, 1, 1), (−1, 1, 1, −1, −1, 1, 1, −1), (1, 1, −1, −1, 1, 1, −1, −1)}, {(−1, −1, −1,
−1, 1, 1, 1, 1), (−1, 1, 1, −1, 1, −1, −1, 1), (1, −1, 1, −1, −1, 1, −1, 1), (1, 1, −1, −1, −1, −1, 1, 1), (1, −1, −1, 1, 1, −1, −1, 1), (1, 1,
−1, −1, 1, 1, −1, −1)}, {(−1, −1, −1, −1, 1, 1, 1, 1), (1, −1, −1, 1, −1, 1, 1, −1), (1, −1, 1, −1, −1, 1, −1, 1), (1, 1, −1, −1, −1,
−1, 1, 1), (−1, −1, 1, 1, −1, −1, 1, 1), (−1, 1, 1, −1, −1, 1, 1, −1)}, {(−1, −1, −1, −1, 1, 1, 1, 1), (1, −1, −1, 1, −1, 1, 1, −1), (1,
−1, 1, −1, −1, 1, −1, 1), (1, 1, −1, −1, −1, −1, 1, 1), (−1, −1, 1, 1, −1, −1, 1, 1), (1, −1, −1, 1, 1, −1, −1, 1)}, {(−1, −1, −1,
−1, 1, 1, 1, 1), (1, −1, −1, 1, −1, 1, 1, −1), (1, −1, 1, −1, −1, 1, −1, 1), (1, 1, −1, −1, −1, −1, 1, 1), (−1, 1, 1, −1, −1, 1, 1, −1), (1, 1,
−1, −1, 1, 1, −1, −1)}, {(−1, −1, −1, −1, 1, 1, 1, 1), (1, −1, −1, 1, −1, 1, 1, −1), (1, −1, 1, −1, −1, 1, −1, 1), (1, 1, −1, −1, −1,
−1, 1, 1), (1, −1, −1, 1, 1, −1, −1, 1), (1, 1, −1, −1, 1, 1, −1, −1)}, {(−1, −1, −1, 1, 1, 1, 1, −1), (−1, −1, 1, −1, 1, 1, −1, 1), (−1, 1,
−1, −1, 1, −1, 1, 1), (−1, 1, 1, 1, 1, −1, −1, −1), (−1, −1, 1, 1, −1, −1, 1, 1), (−1, 1, 1, −1, −1, 1, 1, −1)}, {(−1, −1, −1, 1, 1, 1, 1,
−1), (−1, −1, 1, −1, 1, 1, −1, 1), (−1, 1, −1, −1, 1, −1, 1, 1), (−1, 1, 1, 1, 1, −1, −1, −1), (−1, −1, 1, 1, −1, −1, 1, 1), (1, −1, −1, 1, 1,
−1, −1, 1)}, {(−1, −1, −1, 1, 1, 1, 1, −1), (−1, −1, 1, −1, 1, 1, −1, 1), (−1, 1, −1, −1, 1, −1, 1, 1), (−1, 1, 1, 1, 1, −1, −1, −1),
(−1, 1, 1, −1, −1, 1, 1, −1), (1, 1, −1, −1, 1, 1, −1, −1)}, {(−1, −1, −1, 1, 1, 1, 1, −1), (−1, −1, 1, −1, 1, 1, −1, 1), (−1, 1, −1, −1, 1,
−1, 1, 1), (−1, 1, 1, 1, 1, −1, −1, −1), (1, −1, −1, 1, 1, −1, −1, 1), (1, 1, −1, −1, 1, 1, −1, −1)}, {(−1, −1, −1, 1, 1, 1, 1, −1), (−1,
−1, 1, −1, 1, 1, −1, 1), (−1, 1, −1, −1, 1, −1, 1, 1), (1, −1, −1, −1, −1, 1, 1, 1), (−1, −1, 1, 1, −1, −1, 1, 1), (−1, 1, 1, −1, −1, 1, 1, −1)},
{(−1, −1, −1, 1, 1, 1, 1, −1), (−1, −1, 1, −1, 1, 1, −1, 1), (−1, 1, −1, −1, 1, −1, 1, 1), (1, −1, −1, −1, −1, 1, 1, 1), (−1, −1, 1, 1, −1,
−1, 1, 1), (1, −1, −1, 1, 1, −1, −1, 1)}, {(−1, −1, −1, 1, 1, 1, 1, −1), (−1, −1, 1, −1, 1, 1, −1, 1), (−1, 1, −1, −1, 1, −1, 1, 1), (1, −1,
−1, −1, −1, 1, 1, 1), (−1, 1, 1, −1, −1, 1, 1, −1), (1, 1, −1, −1, 1, 1, −1, −1)}, {(−1, −1, −1, 1, 1, 1, 1, −1), (−1, −1, 1, −1, 1, 1,
−1, 1), (−1, 1, −1, −1, 1, −1, 1, 1), (1, −1, −1, −1, −1, 1, 1, 1), (1, −1, −1, 1, 1, −1, −1, 1), (1, 1, −1, −1, 1, 1, −1, −1)}, {(−1, −1,
−1, 1, 1, 1, 1, −1), (−1, −1, 1, −1, 1, 1, −1, 1), (−1, 1, 1, 1, 1, −1, −1, −1), (1, −1, 1, 1, −1, 1, −1, −1), (−1, −1, 1, 1, −1, −1, 1, 1),
(−1, 1, 1, −1, −1, 1, 1, −1)}, {(−1, −1, −1, 1, 1, 1, 1, −1), (−1, −1, 1, −1, 1, 1, −1, 1), (−1, 1, 1, 1, 1, −1, −1, −1), (1, −1, 1, 1, −1, 1,
−1, −1), (−1, −1, 1, 1, −1, −1, 1, 1), (1, −1, −1, 1, 1, −1, −1, 1)}, {(−1, −1, −1, 1, 1, 1, 1, −1), (−1, −1, 1, −1, 1, 1, −1, 1),
(−1, 1, 1, 1, 1, −1, −1, −1), (1, −1, 1, 1, −1, 1, −1, −1), (−1, 1, 1, −1, −1, 1, 1, −1), (1, 1, −1, −1, 1, 1, −1, −1)}, {(−1, −1,
−1, 1, 1, 1, 1, −1), (−1, −1, 1, −1, 1, 1, −1, 1), (−1, 1, 1, 1, 1, −1, −1, −1), (1, −1, 1, 1, −1, 1, −1, −1), (1, −1, −1, 1, 1, −1,
−1, 1), (1, 1, −1, −1, 1, 1, −1, −1)}, {(−1, −1, −1, 1, 1, 1, 1, −1), (−1, −1, 1, −1, 1, 1, −1, 1), (1, −1, −1, −1, −1, 1, 1, 1), (1,
−1, 1, 1, −1, 1, −1, −1), (−1, −1, 1, 1, −1, −1, 1, 1), (−1, 1, 1, −1, −1, 1, 1, −1)}, {(−1, −1, −1, 1, 1, 1, 1, −1), (−1, −1, 1, −1, 1, 1,
−1, 1), (1, −1, −1, −1, −1, 1, 1, 1), (1, −1, 1, 1, −1, 1, −1, −1), (−1, −1, 1, 1, −1, −1, 1, 1), (1, −1, −1, 1, 1, −1, −1, 1)}, {(−1, −1,
−1, 1, 1, 1, 1, −1), (−1, −1, 1, −1, 1, 1, −1, 1), (1, −1, −1, −1, −1, 1, 1, 1), (1, −1, 1, 1, −1, 1, −1, −1), (−1, 1, 1, −1, −1, 1, 1,
−1), (1, 1, −1, −1, 1, 1, −1, −1)}, {(−1, −1, −1, 1, 1, 1, 1, −1), (−1, −1, 1, −1, 1, 1, −1, 1), (1, −1, −1, −1, −1, 1, 1, 1), (1, −1, 1, 1,
−1, 1, −1, −1), (1, −1, −1, 1, 1, −1, −1, 1), (1, 1, −1, −1, 1, 1, −1, −1)}, {(−1, −1, −1, 1, 1, 1, 1, −1), (−1, 1, −1, −1, 1, −1, 1, 1),
(−1, 1, 1, 1, 1, −1, −1, −1), (1, 1, −1, 1, −1, −1, 1, −1), (−1, −1, 1, 1, −1, −1, 1, 1), (−1, 1, 1, −1, −1, 1, 1, −1)}, {(−1, −1,
−1, 1, 1, 1, 1, −1), (−1, 1, −1, −1, 1, −1, 1, 1), (−1, 1, 1, 1, 1, −1, −1, −1), (1, 1, −1, 1, −1, −1, 1, −1), (−1, −1, 1, 1, −1, −1, 1, 1), (1,
−1, −1, 1, 1, −1, −1, 1)}, {(−1, −1, −1, 1, 1, 1, 1, −1), (−1, 1, −1, −1, 1, −1, 1, 1), (−1, 1, 1, 1, 1, −1, −1, −1), (1, 1, −1, 1, −1, −1, 1,
−1), (−1, 1, 1, −1, −1, 1, 1, −1), (1, 1, −1, −1, 1, 1, −1, −1)}, {(−1, −1, −1, 1, 1, 1, 1, −1), (−1, 1, −1, −1, 1, −1, 1, 1),
(−1, 1, 1, 1, 1, −1, −1, −1), (1, 1, −1, 1, −1, −1, 1, −1), (1, −1, −1, 1, 1, −1, −1, 1), (1, 1, −1, −1, 1, 1, −1, −1)}, {(−1, −1,
−1, 1, 1, 1, 1, −1), (−1, 1, −1, −1, 1, −1, 1, 1), (1, −1, −1, −1, −1, 1, 1, 1), (1, 1, −1, 1, −1, −1, 1, −1), (−1, −1, 1, 1, −1, −1, 1, 1),
(−1, 1, 1, −1, −1, 1, 1, −1)}, {(−1, −1, −1, 1, 1, 1, 1, −1), (−1, 1, −1, −1, 1, −1, 1, 1), (1, −1, −1, −1, −1, 1, 1, 1), (1, 1, −1, 1, −1,
−1, 1, −1), (−1, −1, 1, 1, −1, −1, 1, 1), (1, −1, −1, 1, 1, −1, −1, 1)}, {(−1, −1, −1, 1, 1, 1, 1, −1), (−1, 1, −1, −1, 1, −1, 1, 1), (1, −1,
−1, −1, −1, 1, 1, 1), (1, 1, −1, 1, −1, −1, 1, −1), (−1, 1, 1, −1, −1, 1, 1, −1), (1, 1, −1, −1, 1, 1, −1, −1)}, {(−1, −1, −1, 1, 1, 1, 1,
−1), (−1, 1, −1, −1, 1, −1, 1, 1), (1, −1, −1, −1, −1, 1, 1, 1), (1, 1, −1, 1, −1, −1, 1, −1), (1, −1, −1, 1, 1, −1, −1, 1), (1, 1, −1, −1, 1, 1,
−1, −1)}, {(−1, −1, −1, 1, 1, 1, 1, −1), (−1, 1, 1, 1, 1, −1, −1, −1), (1, −1, 1, 1, −1, 1, −1, −1), (1, 1, −1, 1, −1, −1, 1, −1), (−1,
−1, 1, 1, −1, −1, 1, 1), (−1, 1, 1, −1, −1, 1, 1, −1)}, {(−1, −1, −1, 1, 1, 1, 1, −1), (−1, 1, 1, 1, 1, −1, −1, −1), (1, −1, 1, 1, −1, 1, −1,
−1), (1, 1, −1, 1, −1, −1, 1, −1), (−1, −1, 1, 1, −1, −1, 1, 1), (1, −1, −1, 1, 1, −1, −1, 1)}, {(−1, −1, −1, 1, 1, 1, 1, −1),
(−1, 1, 1, 1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, −1, −1, 1, 1, −1,
−1)}, {(−1, −1, −1, 1, 1, 1, 1, −1), (−1, 1, 1, 1, 1, −1, −1, −1), (1, −1, 1, 1, −1, 1, −1, −1), (1, 1, −1, 1, −1, −1, 1, −1), (1, −1,
−1, 1, 1, −1, −1, 1), (1, 1, −1, −1, 1, 1, −1, −1)}, {(−1, −1, −1, 1, 1, 1, 1, −1), (1, −1, −1, −1, −1, 1, 1, 1), (1, −1, 1, 1, −1, 1, −1,
−1), (1, 1, −1, 1, −1, −1, 1, −1), (−1, −1, 1, 1, −1, −1, 1, 1), (−1, 1, 1, −1, −1, 1, 1, −1)}, {(−1, −1, −1, 1, 1, 1, 1, −1), (1, −1, −1, −1,
−1, 1, 1, 1), (1, −1, 1, 1, −1, 1, −1, −1), (1, 1, −1, 1, −1, −1, 1, −1), (−1, −1, 1, 1, −1, −1, 1, 1), (1, −1, −1, 1, 1, −1, −1, 1)}, {(−1,
−1, −1, 1, 1, 1, 1, −1), (1, −1, −1, −1, −1, 1, 1, 1), (1, −1, 1, 1, −1, 1, −1, −1), (1, 1, −1, 1, −1, −1, 1, −1), (−1, 1, 1, −1, −1, 1, 1,
−1), (1, 1, −1, −1, 1, 1, −1, −1)}, {(−1, −1, −1, 1, 1, 1, 1, −1), (1, −1, −1, −1, −1, 1, 1, 1), (1, −1, 1, 1, −1, 1, −1, −1), (1, 1, −1, 1,
−1, −1, 1, −1), (1, −1, −1, 1, 1, −1, −1, 1), (1, 1, −1, −1, 1, 1, −1, −1)}, {(−1, −1, 1, −1, 1, 1, −1, 1), (−1, 1, −1, −1, 1, −1, 1, 1),
(−1, 1, 1, 1, 1, −1, −1, −1), (1, 1, 1, −1, −1, −1, −1, 1), (−1, −1, 1, 1, −1, −1, 1, 1), (−1, 1, 1, −1, −1, 1, 1, −1)}, {(−1, −1, 1, −1, 1, 1,
−1, 1), (−1, 1, −1, −1, 1, −1, 1, 1), (−1, 1, 1, 1, 1, −1, −1, −1), (1, 1, 1, −1, −1, −1, −1, 1), (−1, −1, 1, 1, −1, −1, 1, 1), (1, −1, −1, 1, 1,
−1, −1, 1)}, {(−1, −1, 1, −1, 1, 1, −1, 1), (−1, 1, −1, −1, 1, −1, 1, 1), (−1, 1, 1, 1, 1, −1, −1, −1), (1, 1, 1, −1, −1, −1, −1, 1),
(−1, 1, 1, −1, −1, 1, 1, −1), (1, 1, −1, −1, 1, 1, −1, −1)}, {(−1, −1, 1, −1, 1, 1, −1, 1), (−1, 1, −1, −1, 1, −1, 1, 1), (−1, 1, 1, 1, 1, −1,
−1, −1), (1, 1, 1, −1, −1, −1, −1, 1), (1, −1, −1, 1, 1, −1, −1, 1), (1, 1, −1, −1, 1, 1, −1, −1)}, {(−1, −1, 1, −1, 1, 1, −1, 1), (−1, 1, −1,
−1, 1, −1, 1, 1), (1, −1, −1, −1, −1, 1, 1, 1), (1, 1, 1, −1, −1, −1, −1, 1), (−1, −1, 1, 1, −1, −1, 1, 1), (−1, 1, 1, −1, −1, 1, 1, −1)},
{(−1, −1, 1, −1, 1, 1, −1, 1), (−1, 1, −1, −1, 1, −1, 1, 1), (1, −1, −1, −1, −1, 1, 1, 1), (1, 1, 1, −1, −1, −1, −1, 1), (−1, −1, 1, 1, −1,
−1, 1, 1), (1, −1, −1, 1, 1, −1, −1, 1)}, {(−1, −1, 1, −1, 1, 1, −1, 1), (−1, 1, −1, −1, 1, −1, 1, 1), (1, −1, −1, −1, −1, 1, 1, 1), (1, 1, 1,
−1, −1, −1, −1, 1), (−1, 1, 1, −1, −1, 1, 1, −1), (1, 1, −1, −1, 1, 1, −1, −1)}, {(−1, −1, 1, −1, 1, 1, −1, 1), (−1, 1, −1, −1, 1,
−1, 1, 1), (1, −1, −1, −1, −1, 1, 1, 1), (1, 1, 1, −1, −1, −1, −1, 1), (1, −1, −1, 1, 1, −1, −1, 1), (1, 1, −1, −1, 1, 1, −1, −1)}, {(−1,
−1, 1, −1, 1, 1, −1, 1), (−1, 1, 1, 1, 1, −1, −1, −1), (1, −1, 1, 1, −1, 1, −1, −1), (1, 1, 1, −1, −1, −1, −1, 1), (−1, −1, 1, 1, −1, −1, 1, 1),
(−1, 1, 1, −1, −1, 1, 1, −1)}, {(−1, −1, 1, −1, 1, 1, −1, 1), (−1, 1, 1, 1, 1, −1, −1, −1), (1, −1, 1, 1, −1, 1, −1, −1), (1, 1, 1, −1, −1, −1,
−1, 1), (−1, −1, 1, 1, −1, −1, 1, 1), (1, −1, −1, 1, 1, −1, −1, 1)}, {(−1, −1, 1, −1, 1, 1, −1, 1), (−1, 1, 1, 1, 1, −1, −1, −1), (1,
−1, 1, 1, −1, 1, −1, −1), (1, 1, 1, −1, −1, −1, −1, 1), (−1, 1, 1, −1, −1, 1, 1, −1), (1, 1, −1, −1, 1, 1, −1, −1)}, {(−1, −1, 1, −1, 1, 1,
−1, 1), (−1, 1, 1, 1, 1, −1, −1, −1), (1, −1, 1, 1, −1, 1, −1, −1), (1, 1, 1, −1, −1, −1, −1, 1), (1, −1, −1, 1, 1, −1, −1, 1), (1, 1, −1,
−1, 1, 1, −1, −1)}, {(−1, −1, 1, −1, 1, 1, −1, 1), (1, −1, −1, −1, −1, 1, 1, 1), (1, −1, 1, 1, −1, 1, −1, −1), (1, 1, 1, −1, −1, −1, −1, 1),
(−1, −1, 1, 1, −1, −1, 1, 1), (−1, 1, 1, −1, −1, 1, 1, −1)}, {(−1, −1, 1, −1, 1, 1, −1, 1), (1, −1, −1, −1, −1, 1, 1, 1), (1, −1, 1, 1, −1, 1,
−1, −1), (1, 1, 1, −1, −1, −1, −1, 1), (−1, −1, 1, 1, −1, −1, 1, 1), (1, −1, −1, 1, 1, −1, −1, 1)}, {(−1, −1, 1, −1, 1, 1, −1, 1), (1, −1, −1,
−1, −1, 1, 1, 1), (1, −1, 1, 1, −1, 1, −1, −1), (1, 1, 1, −1, −1, −1, −1, 1), (−1, 1, 1, −1, −1, 1, 1, −1), (1, 1, −1, −1, 1, 1, −1, −1)},
{(−1, −1, 1, −1, 1, 1, −1, 1), (1, −1, −1, −1, −1, 1, 1, 1), (1, −1, 1, 1, −1, 1, −1, −1), (1, 1, 1, −1, −1, −1, −1, 1), (1, −1, −1, 1, 1, −1,
−1, 1), (1, 1, −1, −1, 1, 1, −1, −1)}, {(−1, −1, 1, 1, 1, 1, −1, −1), (−1, 1, −1, 1, 1, −1, 1, −1), (−1, 1, 1, −1, 1, −1, −1, 1), (1, 1, 1, 1,
−1, −1, −1, −1), (−1, −1, 1, 1, −1, −1, 1, 1), (−1, 1, 1, −1, −1, 1, 1, −1)}, {(−1, −1, 1, 1, 1, 1, −1, −1), (−1, 1, −1, 1, 1, −1, 1, −1),
(−1, 1, 1, −1, 1, −1, −1, 1), (1, 1, 1, 1, −1, −1, −1, −1), (−1, −1, 1, 1, −1, −1, 1, 1), (1, −1, −1, 1, 1, −1, −1, 1)}, {(−1, −1, 1, 1, 1, 1, TABLE 3-continued

| |
|---|
| −1, −1), (−1, 1, −1, 1, 1, −1, 1, −1), (−1, 1, 1, −1, 1, −1, −1, 1), (1, 1, 1, 1, −1, −1, −1, −1), (−1, 1, 1, −1, −1, 1, 1, −1), (1, 1, −1, −1, 1, 1, −1, −1)}, {(−1, −1, 1, 1, 1, 1, −1, −1), (−1, 1, −1, 1, 1, −1, 1, −1), (−1, 1, 1, −1, 1, −1, −1, 1), (1, 1, 1, 1, −1, −1, −1, −1), (1, −1, −1, 1, 1, −1, −1, 1), (1, 1, −1, −1, 1, 1, −1, −1)}, {(−1, −1, 1, 1, 1, 1, −1, −1), (−1, 1, −1, 1, 1, −1, 1, −1), (1, −1, −1, 1, −1, 1, 1, −1), (1, 1, 1, 1, −1, −1, −1, −1), (−1, −1, 1, 1, −1, −1, 1, 1), (−1, 1, 1, −1, −1, 1, 1, −1)}, {(−1, −1, 1, 1, 1, 1, −1, −1), (−1, 1, −1, 1, 1, −1, 1, −1), (1, −1, −1, 1, −1, 1, 1, −1), (1, 1, 1, 1, −1, −1, −1, −1), (−1, −1, 1, 1, −1, −1, 1, 1), (1, −1, −1, 1, 1, −1, −1, 1)}, {(−1, −1, 1, 1, 1, 1, −1, −1), (−1, 1, −1, 1, 1, −1, 1, −1), (1, −1, −1, 1, −1, 1, 1, −1), (1, 1, 1, 1, −1, −1, −1, −1), (−1, 1, 1, −1, −1, 1, 1, −1), (1, 1, −1, −1, 1, 1, −1, −1)}, {(−1, −1, 1, 1, 1, 1, −1, −1), (−1, 1, −1, 1, 1, −1, 1, −1), (1, −1, −1, 1, −1, 1, 1, −1), (1, 1, 1, 1, −1, −1, −1, −1), (1, −1, −1, 1, 1, −1, −1, 1), (1, 1, −1, −1, 1, 1, −1, −1)}, {(−1, −1, 1, 1, 1, 1, −1, −1), (−1, 1, 1, −1, 1, −1, −1, 1), (1, −1, 1, −1, −1, 1, −1, 1), (1, 1, 1, 1, −1, −1, −1, −1), (−1, −1, 1, 1, −1, −1, 1, 1), (−1, 1, 1, −1, −1, 1, 1, −1)}, {(−1, −1, 1, 1, 1, 1, −1, −1), (−1, 1, 1, −1, 1, −1, −1, 1), (1, −1, 1, −1, −1, 1, −1, 1), (1, 1, 1, 1, −1, −1, −1, −1), (−1, −1, 1, 1, −1, −1, 1, 1), (1, −1, −1, 1, 1, −1, −1, 1)}, {(−1, −1, 1, 1, 1, 1, −1, −1), (−1, 1, 1, −1, 1, −1, −1, 1), (1, −1, 1, −1, −1, 1, −1, 1), (1, 1, 1, 1, −1, −1, −1, −1), (−1, 1, 1, −1, −1, 1, 1, −1), (1, 1, −1, −1, 1, 1, −1, −1)}, {(−1, −1, 1, 1, 1, 1, −1, −1), (−1, 1, 1, −1, 1, −1, −1, 1), (1, −1, 1, −1, −1, 1, −1, 1), (1, 1, 1, 1, −1, −1, −1, −1), (1, −1, −1, 1, 1, −1, −1, 1), (1, 1, −1, −1, 1, 1, −1, −1)}, {(−1, −1, 1, 1, 1, 1, −1, −1), (1, −1, −1, 1, −1, 1, 1, −1), (1, −1, 1, −1, −1, 1, −1, 1), (1, 1, 1, 1, −1, −1, −1, −1), (−1, −1, 1, 1, −1, −1, 1, 1), (−1, 1, 1, −1, −1, 1, 1, −1)}, {(−1, −1, 1, 1, 1, 1, −1, −1), (1, −1, −1, 1, −1, 1, 1, −1), (1, −1, 1, −1, −1, 1, −1, 1), (1, 1, 1, 1, −1, −1, −1, −1), (−1, −1, 1, 1, −1, −1, 1, 1), (1, −1, −1, 1, 1, −1, −1, 1)}, {(−1, −1, 1, 1, 1, 1, −1, −1), (1, −1, −1, 1, −1, 1, 1, −1), (1, −1, 1, −1, −1, 1, −1, 1), (1, 1, 1, 1, −1, −1, −1, −1), (−1, 1, 1, −1, −1, 1, 1, −1), (1, 1, −1, −1, 1, 1, −1, −1)}, {(−1, −1, 1, 1, 1, 1, −1, −1), (1, −1, −1, 1, −1, 1, 1, −1), (1, −1, 1, −1, −1, 1, −1, 1), (1, 1, 1, 1, −1, −1, −1, −1), (1, −1, −1, 1, 1, −1, −1, 1), (1, 1, −1, −1, 1, 1, −1, −1)}, {(−1, 1, −1, −1, 1, −1, 1, 1), (−1, 1, 1, 1, 1, −1, −1, −1), (1, 1, −1, 1, −1, −1, 1, −1), (1, 1, 1, −1, −1, −1, −1, 1), (−1, −1, 1, 1, −1, −1, 1, 1), (−1, 1, 1, −1, −1, 1, 1, −1)}, {(−1, 1, −1, −1, 1, −1, 1, 1), (−1, 1, 1, 1, 1, −1, −1, −1), (1, 1, −1, 1, −1, −1, 1, −1), (1, 1, 1, −1, −1, −1, −1, 1), (−1, −1, 1, 1, −1, −1, 1, 1), (1, −1, −1, 1, 1, −1, −1, 1)}, {(−1, 1, −1, −1, 1, −1, 1, 1), (−1, 1, 1, 1, 1, −1, −1, −1), (1, 1, −1, 1, −1, −1, 1, −1), (1, 1, 1, −1, −1, −1, −1, 1), (−1, 1, 1, −1, −1, 1, 1, −1), (1, 1, −1, −1, 1, 1, −1, −1)}, {(−1, 1, −1, −1, 1, −1, 1, 1), (−1, 1, 1, 1, 1, −1, −1, −1), (1, 1, −1, 1, −1, −1, 1, −1), (1, 1, 1, −1, −1, −1, −1, 1), (1, −1, −1, 1, 1, −1, −1, 1), (1, 1, −1, −1, 1, 1, −1, −1)}, {(−1, 1, −1, −1, 1, −1, 1, 1), (1, −1, −1, −1, −1, 1, 1, 1), (1, 1, −1, 1, −1, −1, 1, −1), (1, 1, 1, −1, −1, −1, −1, 1), (−1, −1, 1, 1, −1, −1, 1, 1), (−1, 1, 1, −1, −1, 1, 1, −1)}, {(−1, 1, −1, −1, 1, −1, 1, 1), (1, −1, −1, −1, −1, 1, 1, 1), (1, 1, −1, 1, −1, −1, 1, −1), (1, 1, 1, −1, −1, −1, −1, 1), (−1, −1, 1, 1, −1, −1, 1, 1), (1, −1, −1, 1, 1, −1, −1, 1)}, {(−1, 1, −1, −1, 1, −1, 1, 1), (1, −1, −1, −1, −1, 1, 1, 1), (1, 1, −1, 1, −1, −1, 1, −1), (1, 1, 1, −1, −1, −1, −1, 1), (−1, 1, 1, −1, −1, 1, 1, −1), (1, 1, −1, −1, 1, 1, −1, −1)}, {(−1, 1, −1, −1, 1, −1, 1, 1), (1, −1, −1, −1, −1, 1, 1, 1), (1, 1, −1, 1, −1, −1, 1, −1), (1, 1, 1, −1, −1, −1, −1, 1), (1, −1, −1, 1, 1, −1, −1, 1), (1, 1, −1, −1, 1, 1, −1, −1)}, {(−1, 1, −1, 1, 1, −1, 1, −1), (−1, 1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (−1, 1, 1, −1, −1, 1, 1, −1)}, {(−1, 1, −1, 1, 1, −1, 1, −1), (−1, 1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, −1, −1, 1, 1, −1, −1, 1)}, {(−1, 1, −1, 1, 1, −1, 1, −1), (−1, 1, 1, −1, 1, −1, −1, 1), (1, 1, −1, −1, −1, −1, 1, 1), (1, 1, 1, 1, −1, −1, −1, −1), (−1, 1, 1, −1, −1, 1, 1, −1), (1, 1, −1, −1, 1, 1, −1, −1)}, {(−1, 1, −1, 1, 1, −1, 1, −1), (−1, 1, 1, −1, 1, −1, −1, 1), (1, 1, −1, −1, −1, −1, 1, 1), (1, 1, 1, 1, −1, −1, −1, −1), (1, −1, −1, 1, 1, −1, −1, 1), (1, 1, −1, −1, 1, 1, −1, −1)}, {(−1, 1, −1, 1, 1, −1, 1, −1), (1,−1, −1, 1, −1, 1, 1, −1), (1, 1, −1, −1, −1, −1, 1, 1), (1, 1, 1, 1, −1, −1, −1, −1), (−1, −1, 1, 1, −1, −1, 1, 1), (−1, 1, 1, −1, −1, 1, 1, −1)}, {(−1, 1, −1, 1, 1, −1, 1, −1), (1, −1, −1, 1, −1, 1, 1, −1), (1, 1, −1, −1, −1, −1, 1, 1), (1, 1, 1, 1, −1, −1, −1, −1), (−1, −1, 1, 1, −1, −1, 1, 1), (1, −1, −1, 1, 1, −1, −1, 1)}, {(−1, 1, −1, 1, 1, −1, 1, −1), (1, −1, −1, 1, −1, 1, 1, −1), (1, 1, −1, −1, −1, −1, 1, 1), (1, 1, 1, 1, −1, −1, −1, −1), (−1, 1, 1, −1, −1, 1, 1, −1), (1, 1, −1, −1, 1, 1, −1, −1)}, {(−1, 1, −1, 1, 1, −1, 1, −1), (1, −1, −1, 1, −1, 1, 1, −1), (1, 1, −1, −1, −1, −1, 1, 1), (1, 1, 1, 1, −1, −1, −1, −1), (1, −1, −1, 1, 1, −1, −1, 1), (1, 1, −1, −1, 1, 1, −1, −1)}, {(−1, 1, 1, −1, 1, −1, −1, 1), (1, −1, 1, −1, −1, 1, −1, 1), (1, 1, −1, −1, −1, −1, 1, 1), (1, 1, 1, 1, −1, −1, −1, −1), (−1, −1, 1, 1, −1, −1, 1, 1), (−1, 1, 1, −1, −1, 1, 1, −1)}, {(−1, 1, 1, −1, 1, −1, −1, 1), (1, −1, 1, −1, −1, 1, −1, 1), (1, 1, −1, −1, −1, −1, 1, 1), (1, 1, 1, 1, −1, −1, −1, −1), (−1, −1, 1, 1, −1, −1, 1, 1), (1, −1, −1, 1, 1, −1, −1, 1)}, {(−1, 1, 1, −1, 1, −1, −1, 1), (1, −1, 1, −1, −1, 1, −1, 1), (1, 1, −1, −1, −1, −1, 1, 1), (1, 1, 1, 1, −1, −1, −1, −1), (−1, 1, 1, −1, −1, 1, 1, −1), (1, 1, −1, −1, 1, 1, −1, −1)}, {(−1, 1, 1, −1, 1, −1, −1, 1), (1, −1, 1, −1, −1, 1, −1, 1), (1, 1, −1, −1, −1, −1, 1, 1), (1, 1, 1, 1, −1, −1, −1, −1), (1, −1, −1, 1, 1, −1, −1, 1), (1, 1, −1, −1, 1, 1, −1, −1)}, {(−1, 1, 1, 1, 1, −1, −1, −1), (1, −1, 1, 1, −1, 1, −1, −1), (1, 1, −1, 1, −1, −1, 1, −1), (1, 1, 1, −1, −1, −1, −1, 1), (−1, −1, 1, 1, −1, −1, 1, 1), (−1, 1, 1, −1, −1, 1, 1, −1)}, {(−1, 1, 1, 1, 1, −1, −1, −1), (1, −1, 1, 1, −1, 1, −1, −1), (1, 1, −1, 1, −1, −1, 1, −1), (1, 1, 1, −1, −1, −1, −1, 1), (−1, −1, 1, 1, −1, −1, 1, 1), (1, −1, −1, 1, 1, −1, −1, 1)}, {(−1, 1, 1, 1, 1, −1, −1, −1), (1, −1, 1, 1, −1, 1, −1, −1), (1, 1, −1, 1, −1, −1, 1, −1), (1, 1, 1, −1, −1, −1, −1, 1), (−1, 1, 1, −1, −1, 1, 1, −1), (1, 1, −1, −1, 1, 1, −1, −1)}, {(−1, 1, 1, 1, 1, −1, −1, −1), (1, −1, 1, 1, −1, 1, −1, −1), (1, 1, −1, 1, −1, −1, 1, −1), (1, 1, 1, −1, −1, −1, −1, 1), (1, −1, −1, 1, 1, −1, −1, 1), (1, 1, −1, −1, 1, 1, −1, −1)}, {(1, −1, −1, −1, −1, 1, 1, 1), (1, −1, 1, 1, −1, 1, −1, −1), (1, 1, −1, 1, −1, −1, 1, −1), (1, 1, 1, −1, −1, −1, −1, 1), (−1, −1, 1, 1, −1, −1, 1, 1), (−1, 1, 1, −1, −1, 1, 1, −1)}, 1, −1, −1, −1, 1, 1, 1), (1, −1, 1, 1, −1, 1, −1, −1), (1, 1, −1, 1, −1, −1, 1, −1), (1, 1, 1, −1, −1, −1, −1, 1), (−1, −1, 1, 1, −1, −1, 1, 1), (1, −1, −1, 1, 1, −1, −1, 1)}, {(1, −1, −1, −1, −1, 1, 1, 1), (1, −1, 1, 1, −1, 1, −1, −1), (1, 1, −1, 1, −1, −1, 1, −1), (1, 1, 1, −1, −1, −1, −1, 1), (−1, 1, 1, −1, −1, 1, 1, −1), (1, 1, −1, −1, 1, 1, −1, −1)}, {(1, −1, −1, −1, −1, 1, 1, 1), (1, −1, 1, 1, −1, 1, −1, −1), (1, 1, −1, 1, −1, −1, 1, −1), (1, 1, 1, −1, −1, −1, −1, 1), (1, −1, −1, 1, 1, −1, −1, 1), (1, 1, −1, −1, 1, 1, −1, −1)}, {(1, −1, −1, 1, −1, 1, 1, −1), (1, −1, 1, −1, −1, 1, −1, 1), (1, 1, −1, −1, −1, −1, 1, 1), (1, 1, 1, 1, −1, −1, −1, −1), (−1, −1, 1, 1, −1, −1, 1, 1), (−1, 1, 1, −1, −1, 1, 1, −1)}, {(1, −1, −1, 1, −1, 1, 1, −1), (1, −1, 1, −1, −1, 1, −1, 1), (1, 1, −1, −1, −1, −1, 1, 1), (1, 1, 1, 1, −1, −1, −1, −1), (−1, −1, 1, 1, −1, −1, 1, 1), (1, −1, −1, 1, 1, −1, −1, 1)}, {(1, −1, −1, 1, −1, 1, 1, −1), (1, −1, 1, −1, −1, 1, −1, 1), (1, 1, −1, −1, −1, −1, 1, 1), (1, 1, 1, 1, −1, −1, −1, −1), (−1, 1, 1, −1, −1, 1, 1, −1), (1, 1, −1, −1, 1, 1, −1, −1)}, {(1, −1, −1, 1, −1, 1, 1, −1), (1, −1, 1, −1, −1, 1, −1, 1), (1, 1, −1, −1, −1, −1, 1, 1), (1, 1, 1, 1, −1, −1, −1, −1), (1, −1, −1, 1, 1, −1, −1, 1), (1, 1, −1, −1, 1, 1, −1, −1)} |

The orthogonal code sets, as shown in table 3, are base code sets with code length of 8. The mixed frequency code searching module 318 is further capable of outputting orthogonal code sets for triple frequency code group with code length of 16 by repeating the codes in base code sets. The mixed frequency code searching module 318 is also capable of outputting orthogonal code sets for triple frequency code group with code length of 32 by repeating the codes in base code sets for four times and so on. It will be appreciated that mixed frequency code searching module 318 is capable of performing the above operation for all mixed frequency code groups.

For instance, a code with length 8 (−1,−1,−1,1,1,−1,1,1) in table 3 with three frequency components may also be represented by a code with length 16 with three frequency component as (−1,−1,−1,1,1,−1,1,1,−1,−1,−1,1,1,−1,1,1), by a code with length 32 with three frequency component as (−1,−1,−1,1,1,−1,1,1,−1,−1,−1,1,1,−1,1,1,−1,−1,−1,1,1,−1, 1,1,−1,−1,−1,1,1,−1,1,1) and so on.

Table 4 illustrates an exemplary subset of orthogonal code sets for mixed frequency code group, with four frequency components, outputted by mixed frequency code searching module 318, in accordance with various embodiments of the present disclosure. It will be further appreciated that a set of values between a pair of round brackets represents a code and plurality of codes in between a pair of braces represents an orthogonal code set.

TABLE 4

{(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1, −1, 1), (−1,
−1, 1, 1, 1, 1, −1, −1), (−1, 1, −1, 1, 1, −1, 1, −1), (−1, −1, −1, −1, −1, −1, −1, −1), (−1, 1, 1, −1, −1, 1, 1, −1)}, {(−1, −1, −1, 1,
−1, 1, 1, 1), (−1, −1, 1, −1, 1, −1, 1, 1), (−1, 1, −1, −1, 1, 1, −1, 1), (−1, 1, 1, 1, −1, −1, −1, 1), (−1, −1, 1, 1, 1, 1, −1, −1),
(−1, 1, −1, 1, 1, −1, 1, −1), (−1, −1, −1, −1, −1, −1, −1, −1), (1, −1, −1, 1, 1, −1, −1, 1)}, {(−1, −1, −1, 1, −1, 1, 1, 1), (−1, −1, 1,
−1, 1, −1, 1, 1), (−1, 1, −1, −1, 1, 1, −1, 1), (−1, 1, 1, 1, −1, −1, −1, 1), (−1, −1, 1, 1, 1, 1, −1, −1), (−1, 1, −1, 1, 1, −1, 1, −1),
(−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1,
−1, 1), (−1, 1, 1, 1, −1, −1, −1, 1), (−1, −1, 1, 1, 1, 1, −1, −1), (−1, 1, −1, 1, 1, −1, 1, −1), (1, −1, −1, 1, 1, −1, −1, 1),
(1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1,
−1, 1), (−1, −1, 1, 1, 1, 1, −1, −1), (1, −1, 1, −1, −1, 1, −1, 1), (−1, −1, −1, −1, −1, −1, −1, −1), (−1, 1, 1, −1, −1, 1, 1, −1)},
{(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1, −1, 1), (−1, −1, 1, 1, 1, 1,
−1, −1), (1, −1, 1, −1, −1, 1, −1, 1), (−1, −1, −1, −1, −1, −1, −1, −1), (1, −1, −1, 1, 1, −1, −1, 1)}, {(−1, −1, −1, 1, −1, 1, 1, 1),
(−1, −1, 1, −1, 1, −1, 1, 1), (−1, 1, −1, −1, 1, 1, −1, 1), (−1, 1, 1, 1, −1, −1, −1, 1), (−1, −1, 1, 1, 1, 1, −1, −1), (1, −1, 1, −1, −1, 1,
−1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1, −1, 1, 1), (−1, 1, −1,
−1, 1, 1, −1, 1), (−1, 1, 1, 1, −1, −1, −1, 1), (−1, −1, 1, 1, 1, 1, −1, −1), (1, −1, 1, −1, −1, 1, −1, 1), (1, −1, −1, 1, 1, −1, −1, 1),
(1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1,
−1, 1), (−1, 1, −1, 1, 1, −1, 1, −1), (1, 1, −1, −1, −1, −1, 1, 1), (−1, −1, −1, −1, −1, −1, −1, −1), (−1, 1, 1, −1, −1, 1, 1, −1)},
{(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1, −1, 1), (−1, 1, −1, 1, 1,
−1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1, −1, 1, −1, 1, 1, 1),
(−1, −1, 1, −1, 1, −1, 1, 1), (−1, 1, −1, −1, 1, 1, −1, 1), (−1, 1, 1, 1, −1, −1, −1, 1), (−1, 1, −1, 1, 1, −1, 1, −1), (1, 1, −1, −1, −1,
−1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1, −1, 1, 1), (−1, 1,
−1, −1, 1, 1, −1, 1), (−1, 1, 1, 1, −1, −1, −1, 1), (−1, 1, −1, 1, 1, −1, 1, −1), (1, 1, −1, −1, −1, −1, 1, 1), (1, −1, −1, 1, 1, −1, −1, 1),
(1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1,
−1, 1), (1, −1, 1, −1, −1, 1, −1, 1), (1, 1, −1, −1, −1, −1, 1, 1), (−1, −1, −1, −1, −1, −1, −1, −1), (−1, 1, 1, −1, −1, 1, 1, −1)},
{(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1, −1, 1), (1, −1, 1, −1, −1, 1,
−1, 1), (1, 1, −1, −1, −1, −1, 1, 1), (−1, −1, −1, −1, −1, −1, −1, −1), (1, −1, −1, 1, 1, −1, −1, 1)}, {(−1, −1, −1, 1, −1, 1, 1, 1),
(−1, −1, 1, −1, 1, −1, 1, 1), (−1, 1, −1, −1, 1, 1, −1, 1), (−1, 1, 1, 1, −1, −1, −1, 1), (1, −1, 1, −1, −1, 1, −1, 1), (1, 1, −1, −1, −1,
−1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1, −1, 1, 1), (−1, 1,
−1, −1, 1, 1, −1, 1), (−1, 1, 1, 1, −1, −1, −1, 1), (1, −1, 1, −1, −1, 1, −1, 1), (1, 1, −1, −1, −1, −1, 1, 1), (1, −1, −1, 1, 1, −1, −1, 1),
(1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1), (1, −1, −1,
−1, 1, 1, 1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1, −1, 1, 1,
−1)}, {(−1, −1, −1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (−1,
−1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, −1, 1,
−1, 1, 1, 1), (−1, −1, 1, −1, 1, −1, 1, 1), (−1, 1, −1, −1, 1, 1, −1, 1), (1, −1, −1, −1, 1, 1, 1, −1), (−1, −1, 1, 1, 1, 1, −1, −1),
(−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (−1, 1, −1, −1, 1, 1, −1, 1), (1, −1, −1, −1, 1, 1, 1, −1), (−1, −1, 1, 1, 1, 1, −1, −1), (−1, 1, −1, 1, 1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1),
(1, −1, −1, −1, 1, 1, 1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1),
(−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (−1, −1, 1, 1, 1, 1, −1, −1),
(1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (−1, 1, −1, −1, 1, 1, −1, 1), (1, −1, −1, −1, 1, 1, 1, −1), (−1, −1, 1, 1, 1, 1, −1, −1), (1, −1, 1, −1, −1, 1, −1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1),
(1, −1, −1, −1, 1, 1, 1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1),
(−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (−1, 1, −1, 1, 1, −1, 1, −1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (−1, 1, −1, −1, 1, 1, −1, 1), (1, −1, −1, −1, 1, 1, 1, −1), (−1, 1, −1, 1, 1, −1, 1, −1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1),
(1, −1, −1, −1, 1, 1, 1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1),
(1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (1, −1, 1, −1, −1, 1, −1, 1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (−1, 1, −1, −1, 1, 1, −1, 1), (1, −1, −1, −1, 1, 1, 1, −1), (1, −1, 1, −1, −1, 1, −1, 1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, 1, 1, −1, −1, −1, 1),
(1, −1, 1, 1, −1, −1, 1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1),
(−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, −1, 1, 1, 1, 1, −1, −1),
(−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (−1, 1, 1, 1, −1, −1, −1, 1), (1, −1, 1, 1, −1, −1, 1, −1), (−1, −1, 1, 1, 1, 1, −1, −1), (−1, 1, −1, 1, 1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, 1, 1, −1, −1, −1, 1),
(1, −1, 1, 1, −1, −1, 1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1),
(−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, −1, 1, 1, 1, 1, −1, −1),
(1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (−1, 1, 1, 1, −1, −1, −1, 1), (1, −1, 1, 1, −1, −1, 1, −1), (−1, −1, 1, 1, 1, 1, −1, −1), (1, −1, 1, −1, −1, 1, −1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, 1, 1, −1, −1, −1, 1),
(1, −1, 1, 1, −1, −1, 1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1),
(−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, 1, −1, 1, 1, −1, 1, −1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (−1, 1, 1, 1, −1, −1, −1, 1), (1, −1, 1, 1, −1, −1, 1, −1), (−1, 1, −1, 1, 1, −1, 1, −1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, 1, 1, −1, −1, −1, 1),
(1, −1, 1, 1, −1, −1, 1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1),

TABLE 4-continued (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (1, −1, 1, −1, −1, 1, −1, 1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (−1, 1, 1, 1, −1, −1, −1, 1), (1, −1, 1, 1, −1, −1, 1, −1), (1, −1, 1, −1, −1, 1, −1, 1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (1, −1, −1, −1, 1, 1, 1, −1),
(1, −1, 1, 1, −1, −1, 1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1),
(−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, −1, 1, 1, 1, 1, −1, −1),
(−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (1, −1, −1, −1, 1, 1, 1, −1), (1, −1, 1, 1, −1, −1, 1, −1), (−1, −1, 1, 1, 1, 1, −1, −1), (−1, 1, −1, 1, 1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (1, −1, −1, −1, 1, 1, 1, −1),
(1, −1, 1, 1, −1, −1, 1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1),
(−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, −1, 1, 1, 1, 1, −1, −1),
(1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (1, −1, −1, −1, 1, 1, 1, −1), (1, −1, 1, 1, −1, −1, 1, −1), (−1, −1, 1, 1, 1, 1, −1, −1), (1, −1, 1, −1, −1, 1, −1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (1, −1, −1, −1, 1, 1, 1, −1),
(1, −1, 1, 1, −1, −1, 1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1),
(−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, 1, −1, 1, 1, −1, 1, −1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (1, −1, −1, −1, 1, 1, 1, −1), (1, −1, 1, 1, −1, −1, 1, −1), (−1, 1, −1, 1, 1, −1, 1, −1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (1, −1, −1, −1, 1, 1, 1, −1),
(1, −1, 1, 1, −1, −1, 1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1),
(1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (1, −1, 1, −1, −1, 1, −1, 1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,
−1, 1, 1), (1, −1, −1, −1, 1, 1, 1, −1), (1, −1, 1, 1, −1, −1, 1, −1), (1, −1, 1, −1, −1, 1, −1, 1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1),
(−1, 1, 1, 1, −1, −1, −1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1),
(−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, −1, 1, −1, 1, 1, −1, 1),
(−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (−1, 1, −1, 1, 1, 1, −1, −1), (−1, 1, 1, 1, −1, −1, −1, 1), (−1, −1, 1, −1, 1, 1, −1, 1), (−1, 1, −1, −1, 1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1),
(−1, 1, 1, 1, −1, −1, −1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1),
(−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, −1, 1, −1, 1, 1, −1, 1),
(1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (−1, 1, −1, 1, 1, 1, −1, −1), (−1, 1, 1, 1, −1, −1, −1, 1), (−1, −1, 1, −1, 1, 1, −1, 1), (1, −1, 1, 1, −1, 1, −1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1),
(−1, 1, 1, 1, −1, −1, −1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1),
(−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, 1, −1, −1, 1, −1, 1, 1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (−1, 1, −1, 1, 1, 1, −1, −1), (−1, 1, 1, 1, −1, −1, −1, 1), (−1, 1, −1, −1, 1, −1, 1, 1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1),
(−1, 1, 1, 1, −1, −1, −1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1),
(1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (1, −1, 1, 1, −1, 1, −1, −1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (−1, 1, −1, 1, 1, 1, −1, −1), (−1, 1, 1, 1, −1, −1, −1, 1), (1, −1, 1, 1, −1, 1, −1, −1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1),
(1, −1, −1, −1, 1, 1, 1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1),
(−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, −1, 1, −1, 1, 1, −1, 1),
(−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (−1, 1, −1, 1, 1, 1, −1, −1), (1, −1, −1, −1, 1, 1, 1, −1), (−1, −1, 1, −1, 1, 1, −1, 1), (−1, 1, −1, −1, 1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1),
(1, −1, −1, −1, 1, 1, 1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1),
(−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, −1, 1, −1, 1, 1, −1, 1),
(1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (−1, 1, −1, 1, 1, 1, −1, −1), (1, −1, −1, −1, 1, 1, 1, −1), (−1, −1, 1, −1, 1, 1, −1, 1), (1, −1, 1, 1, −1, 1, −1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1),
(1, −1, −1, −1, 1, 1, 1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1),
(−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, 1, −1, −1, 1, −1, 1, 1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1, TABLE 4-continued −1, 1, −1), (−1, 1, −1, 1, 1, 1, −1, −1), (1, −1, −1, −1, 1, 1, 1, −1), (−1, 1, −1, −1, 1, −1, 1, 1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1),
(1, −1, −1, −1, 1, 1, 1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1),
(1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (1, −1, 1, 1, −1, 1, −1, −1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (−1, 1, −1, 1, 1, 1, −1, −1), (1, −1, −1, −1, 1, 1, 1, −1), (1, −1, 1, 1, −1, 1, −1, −1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, 1, 1, −1, −1, −1, 1),
(1, −1, 1, −1, −1, −1, 1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1),
(−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, −1, 1, −1, 1, 1, −1, 1),
(−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (−1, 1, 1, 1, −1, −1, −1, 1), (1, −1, 1, −1, −1, −1, 1, 1), (−1, −1, 1, −1, 1, 1, −1, 1), (−1, 1, −1, −1, 1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, 1, 1, −1, −1, −1, 1),
(1, −1, 1, −1, −1, −1, 1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1),
(−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, −1, 1, −1, 1, 1, −1, 1),
(1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (−1, 1, 1, 1, −1, −1, −1, 1), (1, −1, 1, −1, −1, −1, 1, 1), (−1, −1, 1, −1, 1, 1, −1, 1), (1, −1, 1, 1, −1, 1, −1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, 1, 1, −1, −1, −1, 1),
(1, −1, 1, −1, −1, −1, 1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1),
(−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, 1, −1, −1, 1, −1, 1, 1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (−1, 1, 1, 1, −1, −1, −1, 1), (1, −1, 1, −1, −1, −1, 1, 1), (−1, 1, −1, −1, 1, −1, 1, 1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, 1, 1, −1, −1, −1, 1),
(1, −1, 1, −1, −1, −1, 1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1),
(1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (1, −1, 1, 1, −1, 1, −1, −1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (−1, 1, 1, 1, −1, −1, −1, 1), (1, −1, 1, −1, −1, −1, 1, 1), (1, −1, 1, 1, −1, 1, −1, −1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (1, −1, −1, −1, 1, 1, 1, −1),
(1, −1, 1, −1, −1, −1, 1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1),
(−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, −1, 1, −1, 1, 1, −1, 1),
(−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (1, −1, −1, −1, 1, 1, 1, −1), (1, −1, 1, −1, −1, −1, 1, 1), (−1, −1, 1, −1, 1, 1, −1, 1), (−1, 1, −1, −1, 1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (1, −1, −1, −1, 1, 1, 1, −1),
(1, −1, 1, −1, −1, −1, 1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1),
(−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, −1, 1, −1, 1, 1, −1, 1),
(1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (1, −1, −1, −1, 1, 1, 1, −1), (1, −1, 1, −1, −1, −1, 1, 1), (−1, −1, 1, −1, 1, 1, −1, 1), (1, −1, 1, 1, −1, 1, −1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (1, −1, −1, −1, 1, 1, 1, −1),
(1, −1, 1, −1, −1, −1, 1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1),
(−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, 1, −1, −1, 1, −1, 1, 1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (1, −1, −1, −1, 1, 1, 1, −1), (1, −1, 1, −1, −1, −1, 1, 1), (−1, 1, −1, −1, 1, −1, 1, 1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (1, −1, −1, −1, 1, 1, 1, −1),
(1, −1, 1, −1, −1, −1, 1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1),
(1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (1, −1, 1, 1, −1, 1, −1, −1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,
−1, 1, −1), (1, −1, −1, −1, 1, 1, 1, −1), (1, −1, 1, −1, −1, −1, 1, 1), (1, −1, 1, 1, −1, 1, −1, −1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (−1, 1, 1, 1, −1, −1, −1, 1),
(1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1),
(−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, −1, 1, 1, 1, 1, −1, −1),
(−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,
−1, 1), (−1, 1, 1, 1, −1, −1, −1, 1), (1, 1, −1, 1, −1, 1, −1, −1), (−1, −1, 1, 1, 1, 1, −1, −1), (−1, 1, −1, 1, 1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (−1, 1, 1, 1, −1, −1, −1, 1),
(1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1),
(−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, −1, 1, 1, 1, 1, −1, −1),
(1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,
−1, 1), (−1, 1, 1, 1, −1, −1, −1, 1), (1, 1, −1, 1, −1, 1, −1, −1), (−1, −1, 1, 1, 1, 1, −1, −1), (1, −1, 1, −1, −1, 1, −1, 1), (1, −1,
−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (−1, 1, 1, 1, −1, −1, −1, 1),
(1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1, TABLE 4-continued −1, 1, 1, −1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1),
(−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, 1, −1, 1, 1, −1, 1, −1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,
−1, 1), (−1, 1, 1, 1, −1, −1, −1, 1), (1, 1, −1, 1, −1, 1, −1, −1), (−1, 1, −1, 1, 1, −1, 1, −1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (−1, 1, 1, 1, −1, −1, −1, 1),
(1, 1, −1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1),
(1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (1, −1, 1, −1, −1, 1, −1, 1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,
−1, 1), (−1, 1, 1, 1, −1, −1, −1, 1), (1, 1, −1, 1, −1, 1, −1, −1), (1, −1, 1, −1, −1, 1, −1, 1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (1, −1, −1, −1, 1, 1, 1, −1),
(1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1),
(−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, −1, 1, 1, 1, 1, −1, −1),
(−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,
−1, 1), (1, −1, −1, −1, 1, 1, 1, −1), (1, 1, −1, 1, −1, 1, −1, −1), (−1, −1, 1, 1, 1, 1, −1, −1), (−1, 1, −1, 1, 1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (1, −1, −1, −1, 1, 1, 1, −1),
(1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1),
(−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, −1, 1, 1, 1, 1, −1, −1),
(1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,
−1, 1), (1, −1, −1, −1, 1, 1, 1, −1), (1, 1, −1, 1, −1, 1, −1, −1), (−1, −1, 1, 1, 1, 1, −1, −1), (1, −1, 1, −1, −1, 1, −1, 1), (1, −1,
−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (1, −1, −1, −1, 1, 1, 1, −1),
(1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1),
(−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, 1, −1, 1, 1, −1, 1, −1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,
−1, 1), (1, −1, −1, −1, 1, 1, 1, −1), (1, 1, −1, 1, −1, 1, −1, −1), (−1, 1, −1, 1, 1, −1, 1, −1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (1, −1, −1, −1, 1, 1, 1, −1),
(1, 1, −1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1),
(1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (1, −1, 1, −1, −1, 1, −1, 1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,
−1, 1), (1, −1, −1, −1, 1, 1, 1, −1), (1, 1, −1, 1, −1, 1, −1, −1), (1, −1, 1, −1, −1, 1, −1, 1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (−1, 1, 1, 1, −1, −1, −1, 1),
(1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1),
(−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, −1, 1, −1, 1, 1, −1, 1),
(−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,
−1, −1), (−1, 1, 1, 1, −1, −1, −1, 1), (1, 1, −1, −1, −1, 1, −1, 1), (−1, −1, 1, −1, 1, 1, −1, 1), (−1, 1, −1, −1, 1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (−1, 1, 1, 1, −1, −1, −1, 1),
(1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1),
(−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, −1, 1, −1, 1, 1, −1, 1),
(1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,
−1, −1), (−1, 1, 1, 1, −1, −1, −1, 1), (1, 1, −1, −1, −1, 1, −1, 1), (−1, −1, 1, −1, 1, 1, −1, 1), (1, −1, 1, 1, −1, 1, −1, −1), (1, −1,
−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (−1, 1, 1, 1, −1, −1, −1, 1),
(1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1),
(−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, 1, −1, −1, 1, −1, 1, 1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,
−1, −1), (−1, 1, 1, 1, −1, −1, −1, 1), (1, 1, −1, −1, −1, 1, −1, 1), (−1, 1, −1, −1, 1, −1, 1, 1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (−1, 1, 1, 1, −1, −1, −1, 1),
(1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1),
(1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (1, −1, 1, 1, −1, 1, −1, −1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,
−1, −1), (−1, 1, 1, 1, −1, −1, −1, 1), (1, 1, −1, −1, −1, 1, −1, 1), (1, −1, 1, 1, −1, 1, −1, −1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (1, −1, −1, −1, 1, 1, 1, −1),
(1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, 1, 1, 1, −1, −1), (1, −1, −1, −1, 1, 1, 1, −1), (1, 1, −1, −1, −1, 1, −1, 1),
(−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, −1, 1, −1, 1, 1, −1, 1),
(−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,
−1, −1), (1, −1, −1, −1, 1, 1, 1, −1), (1, 1, −1, −1, −1, 1, −1, 1), (−1, −1, 1, −1, 1, 1, −1, 1), (−1, 1, −1, −1, 1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (1, −1, −1, −1, 1, 1, 1, −1),
(1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, 1, 1, 1, −1, −1), (1, −1, −1, −1, 1, 1, 1, −1), (1, 1, −1, −1, −1, 1, −1, 1),
(−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, −1, 1, −1, 1, 1, −1, 1), TABLE 4-continued (1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,
−1, −1), (1, −1, −1, −1, 1, 1, 1, −1), (1, 1, −1, −1, −1, 1, −1, 1), (−1, −1, 1, −1, 1, 1, −1, 1), (1, −1, 1, 1, −1, 1, −1, −1), (1, −1,
−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (1, −1, −1, −1, 1, 1, 1, −1),
(1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, 1, 1, 1, −1, −1), (1, −1, −1, −1, 1, 1, 1, −1), (1, 1, −1, −1, −1, 1, −1, 1),
(−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, 1, −1, −1, 1, −1, 1, 1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,
−1, −1), (1, −1, −1, −1, 1, 1, 1, −1), (1, 1, −1, −1, −1, 1, −1, 1), (−1, 1, −1, −1, 1, −1, 1, 1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (1, −1, −1, −1, 1, 1, 1, −1),
(1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, −1, 1, 1, 1, −1, −1), (1, −1, −1, −1, 1, 1, 1, −1), (1, 1, −1, −1, −1, 1, −1, 1),
(1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (1, −1, 1, 1, −1, 1, −1, −1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,
−1, −1), (1, −1, −1, −1, 1, 1, 1, −1), (1, 1, −1, −1, −1, 1, −1, 1), (1, −1, 1, 1, −1, 1, −1, −1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, −1, −1, −1, 1, 1),
(1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1),
(−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, −1, 1, −1, 1, 1, −1, 1),
(−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,
−1, 1), (1, −1, 1, −1, −1, −1, 1, 1), (1, 1, −1, −1, −1, 1, −1, 1), (−1, −1, 1, −1, 1, 1, −1, 1), (−1, 1, −1, −1, 1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, −1, −1, −1, 1, 1),
(1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1),
(−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, −1, 1, −1, 1, 1, −1, 1),
(1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,
−1, 1), (1, −1, 1, −1, −1, −1, 1, 1), (1, 1, −1, −1, −1, 1, −1, 1), (−1, −1, 1, −1, 1, 1, −1, 1), (1, −1, 1, 1, −1, 1, −1, −1), (1, −1,
−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, −1, −1, −1, 1, 1),
(1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1),
(−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, 1, −1, −1, 1, −1, 1, 1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,
−1, 1), (1, −1, 1, −1, −1, −1, 1, 1), (1, 1, −1, −1, −1, 1, −1, 1), (−1, 1, −1, −1, 1, −1, 1, 1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, −1, −1, −1, 1, 1),
(1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1),
(1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (1, −1, 1, 1, −1, 1, −1, −1),
(1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,
−1, 1), (1, −1, 1, −1, −1, −1, 1, 1), (1, 1, −1, −1, −1, 1, −1, 1), (1, −1, 1, 1, −1, 1, −1, −1), (1, 1, −1, 1, −1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, 1, −1, −1, 1, −1),
(1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,
−1, 1, 1, −1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1),
(−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1,
−1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, −1, 1, 1, 1, 1, −1, −1),
(−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,
−1, 1), (1, −1, 1, 1, −1, −1, 1, −1), (1, 1, −1, 1, −1, 1, −1, −1), (−1, −1, 1, 1, 1, 1, −1, −1), (−1, 1, −1, 1, 1, −1, 1, −1), (1, −1,
−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, 1, −1, −1, 1, −1),
(1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, 1,
−1, 1, 1, −1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1),
(−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, −1, 1, 1, 1, 1, −1, −1),
(1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,
−1, 1), (1, −1, 1, 1, −1, −1, 1, −1), (1, 1, −1, 1, −1, 1, −1, −1), (−1, −1, 1, 1, 1, 1, −1, −1), (1, −1, 1, −1, −1, 1, −1, 1), (1, −1,
−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, 1, −1, −1, 1, −1),
(1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1),
(−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, 1, −1, 1, 1, −1, 1, −1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,
−1, 1), (1, −1, 1, 1, −1, −1, 1, −1), (1, 1, −1, 1, −1, 1, −1, −1), (−1, 1, −1, 1, 1, −1, 1, −1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, 1, −1, −1, 1, −1),
(1, 1, −1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1),
(1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (1, −1, 1, −1, −1, 1, −1, 1),
(1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,
−1, 1), (1, −1, 1, 1, −1, −1, 1, −1), (1, 1, −1, 1, −1, 1, −1, −1), (1, −1, 1, −1, −1, 1, −1, 1), (1, 1, −1, −1, −1, −1, 1, 1), (1, −1,
−1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, −1, −1, −1, 1, 1),
(1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,
−1, 1, 1, −1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1),
(−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,
−1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, −1, 1, −1, 1, 1, −1, 1),
(−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (1, −1, −1,
−1, 1, 1, 1, −1), (1, −1, 1, −1, −1, −1, 1, 1), (1, 1, −1, −1, −1, 1, −1, 1), (−1, −1, 1, −1, 1, 1, −1, 1), (−1, 1, −1, −1, 1, −1, 1, 1),
(1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, −1, −1, TABLE 4-continued −1, 1, 1), (1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, −1, 1, −1, 1, 1, −1, 1), (1, −1, 1, 1, −1, 1, −1, −1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, 1, −1, −1, 1, −1, 1, 1), (1, 1, −1, 1, −1, −1, 1, −1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (1, −1, 1, 1, −1, 1, −1, −1), (1, 1, −1, 1, −1, −1, 1, −1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, −1, 1, 1, 1, 1, −1, −1), (−1, 1, −1, 1, 1, −1, 1, −1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, −1, 1, 1, 1, 1, −1, −1), (1, −1, 1, −1, −1, 1, −1, 1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, 1, −1, 1, 1, −1, 1, −1), (1, 1, −1, −1, −1, −1, 1, 1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (1, −1, 1, −1, −1, 1, −1, 1), (1, 1, −1, −1, −1, −1, 1, 1), (1, −1, −1, 1, 1, −1, −1, 1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (1, −1, −1, 1, −1, 1, 1, −1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, 1, −1, 1, −1, −1, 1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (1, −1, −1, 1, −1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, TABLE 4-continued −1, −1)}, {(1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (−1, 1,
−1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, −1, 1, 1, 1, −1, 1),
(−1, −1, 1, −1, 1, 1, 1, −1), (−1, 1, −1, −1, −1, 1, 1, 1), (1, −1, −1, −1, 1, −1, 1, 1), (−1, 1, −1, 1, 1, −1, 1, −1), (−1, 1, 1, −1, 1,
−1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1,
−1, −1, −1, 1, 1, 1), (1, −1, −1, −1, 1, −1, 1, 1), (−1, 1, −1, 1, 1, −1, 1, −1), (1, −1, −1, 1, −1, 1, 1, −1), (−1, −1, −1, −1, −1, −1, −1,
−1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (1, −1, −1,
−1, 1, −1, 1, 1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1,
−1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (−1, 1,
−1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, −1, 1, 1, 1, −1, 1),
(−1, −1, 1, −1, 1, 1, 1, −1), (−1, 1, −1, −1, −1, 1, 1, 1), (1, −1, −1, −1, 1, −1, 1, 1), (−1, 1, −1, 1, 1, −1, 1, −1), (1, −1, −1, 1,
−1, 1, 1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1),
(−1, 1, −1, −1, −1, 1, 1, 1), (1, −1, −1, −1, 1, −1, 1, 1), (−1, 1, 1, −1, 1, −1, −1, 1), (1, −1, 1, −1, −1, 1, −1, 1), (−1, −1, −1, −1, −1,
−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (1,
−1, −1, −1, 1, −1, 1, 1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1,
−1, −1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1),
(−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1,
−1, 1), (−1, −1, 1, −1, 1, 1, 1, −1), (−1, 1, −1, −1, −1, 1, 1, 1), (1, −1, −1, −1, 1, −1, 1, 1), (−1, 1, 1, −1, 1, −1, −1, 1), (1, −1, 1,
−1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1),
(−1, 1, −1, −1, −1, 1, 1, 1), (1, −1, −1, −1, 1, −1, 1, 1), (1, −1, −1, 1, −1, 1, 1, −1), (1, −1, 1, −1, −1, 1, −1, 1), (−1, −1, −1, −1, −1,
−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (1,
−1, −1, −1, 1, −1, 1, 1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1,
−1, −1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (1, −1,
−1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1),
(−1, −1, 1, −1, 1, 1, 1, −1), (−1, 1, −1, −1, −1, 1, 1, 1), (1, −1, −1, −1, 1, −1, 1, 1), (1, −1, −1, 1, −1, 1, 1, −1), (1, −1, 1, −1,
−1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1),
(−1, 1, −1, 1, −1, 1, 1, −1), (−1, 1, 1, −1, −1, 1, −1, 1), (−1, 1, −1, −1, 1, −1, 1, 1), (−1, 1, 1, 1, 1, −1, −1, −1), (−1, −1, −1, −1, −1,
−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1, −1),
(−1, 1, 1, −1, −1, 1, −1, 1), (−1, 1, −1, −1, 1, −1, 1, 1), (−1, 1, 1, 1, 1, −1, −1, −1), (−1, −1, −1, −1, −1, −1, −1, −1), (1, 1, −1,
−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1),
(−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1, −1, 1, 1, 1,
−1, 1), (−1, −1, 1, −1, 1, 1, 1, −1), (−1, 1, −1, 1, −1, 1, 1, −1), (−1, 1, 1, −1, −1, 1, −1, 1), (−1, 1, −1, −1, 1, −1, 1, 1),
(−1, 1, 1, 1, 1, −1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,
−1), (−1, 1, −1, 1, −1, 1, 1, −1), (−1, 1, 1, −1, −1, 1, −1, 1), (−1, 1, −1, −1, 1, −1, 1, 1), (1, −1, −1, −1, −1, 1, 1, 1), (−1, −1, −1,
−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1,
−1), (−1, 1, 1, −1, −1, 1, −1, 1), (−1, 1, −1, −1, 1, −1, 1, 1), (1, −1, −1, −1, −1, 1, 1, 1), (−1, −1, −1, −1, −1, −1, −1, −1), (1, 1, −1,
−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1),
(−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, −1, 1, 1, 1,
−1, 1), (−1, −1, 1, −1, 1, 1, 1, −1), (−1, 1, −1, 1, −1, 1, 1, −1), (−1, 1, 1, −1, −1, 1, −1, 1), (−1, 1, −1, −1, 1, −1, 1, 1), (1, −1, −1,
−1, −1, 1, 1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1),
(−1, 1, −1, 1, −1, 1, 1, −1), (−1, 1, 1, −1, −1, 1, −1, 1), (−1, 1, 1, 1, 1, −1, −1, −1), (1, −1, 1, 1, −1, 1, −1, −1), (−1, −1, −1, −1, −1,
−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1, −1),
(−1, 1, 1, −1, −1, 1, −1, 1), (−1, 1, 1, 1, 1, −1, −1, −1), (1, −1, 1, 1, −1, 1, −1, −1), (−1, −1, −1, −1, −1, −1, −1, −1), (1, 1, −1,
−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1),
(−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1,
−1, 1), (−1, −1, 1, −1, 1, 1, 1, −1), (−1, 1, −1, 1, −1, 1, 1, −1), (−1, 1, 1, −1, −1, 1, −1, 1), (−1, 1, 1, 1, 1, −1, −1, −1), (1,
−1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,
−1), (−1, 1, −1, 1, −1, 1, 1, −1), (−1, 1, 1, −1, −1, 1, −1, 1), (1, −1, −1, −1, −1, 1, 1, 1), (1, −1, 1, 1, −1, 1, −1, −1), (−1, −1, −1,
−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1,
−1), (−1, 1, 1, −1, −1, 1, −1, 1), (1, −1, −1, −1, −1, 1, 1, 1), (1, −1, 1, 1, −1, 1, −1, −1), (−1, −1, −1, −1, −1, −1, −1, −1), (1, 1, −1,
−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1),
(1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1,
−1, 1), (−1, −1, 1, −1, 1, 1, 1, −1), (−1, 1, −1, 1, −1, 1, 1, −1), (−1, 1, 1, −1, −1, 1, −1, 1), (1, −1, −1, −1, −1, 1, 1, 1), (1,
−1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,
−1), (−1, 1, −1, 1, −1, 1, 1, −1), (1, −1, −1, 1, 1, −1, 1, −1), (−1, 1, −1, −1, 1, −1, 1, 1), (−1, 1, 1, 1, 1, −1, −1, −1), (−1, −1, −1,
−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1,
−1), (1, −1, −1, 1, 1, −1, 1, −1), (−1, 1, −1, −1, 1, −1, 1, 1), (−1, 1, 1, 1, 1, −1, −1, −1), (−1, −1, −1, −1, −1, −1, −1, −1), (1, 1, −1,
−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (1, −1, −1, 1, 1, −1, 1, −1),
(−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1, −1, 1, 1, 1,
−1, 1), (−1, −1, 1, −1, 1, 1, 1, −1), (−1, 1, −1, 1, −1, 1, 1, −1), (1, −1, −1, 1, 1, −1, 1, −1), (−1, 1, −1, −1, 1, −1, 1, 1),
(−1, 1, 1, 1, 1, −1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,
−1), (−1, 1, −1, 1, −1, 1, 1, −1), (1, −1, −1, 1, 1, −1, 1, −1), (−1, 1, −1, −1, 1, −1, 1, 1), (1, −1, −1, −1, −1, 1, 1, 1), (−1, −1, −1,
−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1,
−1), (1, −1, −1, 1, 1, −1, 1, −1), (−1, 1, −1, −1, 1, −1, 1, 1), (1, −1, −1, −1, −1, 1, 1, 1), (−1, −1, −1, −1, −1, −1, −1, −1), (1, 1, −1,
−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (1, −1, −1, 1, 1, −1, 1, −1),
(−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, −1, 1, 1, 1,
−1, 1), (−1, −1, 1, −1, 1, 1, 1, −1), (−1, 1, −1, 1, −1, 1, 1, −1), (1, −1, −1, 1, 1, −1, 1, −1), (−1, 1, −1, −1, 1, −1, 1, 1), (1, −1, −1,
−1, −1, 1, 1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1),
(−1, 1, −1, 1, −1, 1, 1, −1), (1, −1, −1, 1, 1, −1, 1, −1), (−1, 1, 1, 1, 1, −1, −1, −1), (1, −1, 1, 1, −1, 1, −1, −1), (−1, −1, −1, −1, −1,
−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1, −1), (1,
−1, −1, 1, 1, −1, 1, −1), (−1, 1, 1, 1, 1, −1, −1, −1), (1, −1, 1, 1, −1, 1, −1, −1), (−1, −1, −1, −1, −1, −1, −1, −1), (1, 1, −1, −1, 1, 1,
−1, −1)}, {(−1, −1, −1, 1, 1, 1, −1, 1), (−1, −1, 1, −1, 1, 1, 1, −1), (−1, 1, −1, 1, −1, 1, 1, −1), (1, −1, −1, 1, 1, −1, 1, −1),
(−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1,
−1, 1), (−1, −1, 1, −1, 1, 1, 1, −1), (−1, 1, −1, 1, −1, 1, 1, −1), (1, −1, −1, 1, 1, −1, 1, −1), (−1, 1, 1, 1, 1, −1, −1, −1), (1,
−1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,
−1), (−1, 1, −1, 1, −1, 1, 1, −1), (1, −1, −1, 1, 1, −1, 1, −1), (1, −1, −1, −1, −1, 1, 1, 1), (1, −1, 1, 1, −1, 1, −1, −1), (−1, −1, −1,
−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1,
−1), (1, −1, −1, 1, 1, −1, 1, −1), (1, −1, −1, −1, −1, 1, 1, 1), (1, −1, 1, 1, −1, 1, −1, −1), (−1, −1, −1, −1, −1, −1, −1, −1), (1, 1, −1,
−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (1, −1, −1, 1, 1, −1, 1, −1),
(1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1,
−1, 1), (−1, −1, 1, −1, 1, 1, 1, −1), (−1, 1, −1, 1, −1, 1, 1, −1), (1, −1, −1, 1, 1, −1, 1, −1), (1, −1, −1, −1, −1, 1, 1, 1), (1, TABLE 4-continued −1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,
−1), (−1, 1, 1, −1, −1, 1, −1, 1), (1, −1, 1, −1, 1, −1, −1, 1), (−1, 1, −1, −1, 1, −1, 1, 1), (−1, 1, 1, 1, 1, −1, −1, −1), (−1, −1, −1,
−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, 1, −1, −1, 1,
−1, 1), (1, −1, 1, −1, 1, −1, −1, 1), (−1, 1, −1, −1, 1, −1, 1, 1), (−1, 1, 1, 1, 1, −1, −1, −1), (−1, −1, −1, −1, −1, −1, −1, −1), (1, 1,
−1, −1, 1, 1, −1, −1)}, {(−1, −1, −1, 1, 1, 1, −1, 1), (−1, −1, 1, −1, 1, 1, 1, −1), (−1, 1, 1, −1, −1, 1, −1, 1), (1, −1, 1, −1, 1, −1,
−1, 1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1,
−1, 1, 1, 1, −1, 1), (−1, −1, 1, −1, 1, 1, 1, −1), (−1, 1, 1, −1, −1, 1, −1, 1), (1, −1, 1, −1, 1, −1, −1, 1), (−1, 1, −1, −1, 1, −1, 1, 1),
(−1, 1, 1, 1, 1, −1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1,
−1, 1, 1, 1, −1), (−1, 1, 1, −1, −1, 1, −1, 1), (1, −1, 1, −1, 1, −1, −1, 1), (−1, 1, −1, −1, 1, −1, 1, 1), (1, −1, −1, −1, −1, 1, 1, 1),
(−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, 1, −1,
−1, 1, −1, 1), (1, −1, 1, −1, 1, −1, −1, 1), (−1, 1, −1, −1, 1, −1, 1, 1), (1, −1, −1, −1, −1, 1, 1, 1), (−1, −1, −1, −1, −1, −1, −1, −1),
(1, 1, −1, −1, 1, 1, −1, −1)}, {(−1, −1, −1, 1, 1, 1, −1, 1), (−1, −1, 1, −1, 1, 1, 1, −1), (−1, 1, 1, −1, −1, 1, −1, 1), (1, −1, 1,
−1, 1, −1, −1, 1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (−1, 1, 1, −1, −1, 1, −1, 1), (1, −1, 1, −1, 1, −1, −1, 1), (−1, 1, −1, −1, 1,
−1, 1, 1), (1, −1, −1, −1, −1, 1, 1, 1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (−1, 1, 1, −1, −1, 1, −1, 1), (1, −1, 1, −1, 1, −1, −1, 1), (−1, 1, 1, 1, 1, −1, −1, −1), (1, −1, 1, 1, −1, 1, −1,
−1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1),
(−1, 1, 1, −1, −1, 1, −1, 1), (1, −1, 1, −1, 1, −1, −1, 1), (−1, 1, 1, 1, 1, −1, −1, −1), (1, −1, 1, 1, −1, 1, −1, −1), (−1, −1, −1, −1, −1,
−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, −1, −1, 1, −1, 1), (1,
−1, 1, −1, 1, −1, −1, 1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (−1, 1, 1, −1, −1, 1, −1, 1), (1, −1, 1, −1, 1, −1, −1, 1), (−1, 1, 1, 1, 1,
−1, −1, −1), (1, −1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (−1, 1, 1, −1, −1, 1, −1, 1), (1, −1, 1, −1, 1, −1, −1, 1), (1, −1, −1, −1, −1, 1, 1, 1), (1, −1, 1, 1, −1, 1, −1,
−1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1),
(−1, 1, 1, −1, −1, 1, −1, 1), (1, −1, 1, −1, 1, −1, −1, 1), (1, −1, −1, −1, −1, 1, 1, 1), (1, −1, 1, 1, −1, 1, −1, −1), (−1, −1, −1, −1, −1,
−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, −1, −1, 1, −1, 1), (1,
−1, 1, −1, 1, −1, −1, 1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (−1, 1, 1, −1, −1, 1, −1, 1), (1, −1, 1, −1, 1, −1, −1, 1), (1, −1, −1, −1,
−1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (−1, 1, 1, 1, −1, 1, −1, −1), (1, −1, 1, 1, 1, −1, −1, −1), (−1, 1, −1, 1, 1, −1, 1, −1), (−1, 1, 1, −1, 1, −1,
−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1),
(−1, 1, 1, 1, −1, 1, −1, −1), (1, −1, 1, 1, 1, −1, −1, −1), (−1, 1, −1, 1, 1, −1, 1, −1), (−1, 1, 1, −1, 1, −1, −1, 1), (−1, −1, −1, −1, −1,
−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, 1, −1, 1, −1, −1), (1,
−1, 1, 1, 1, −1, −1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (−1, 1, −1, 1, 1,
−1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (−1, 1, 1, 1, −1, 1, −1, −1), (1, −1, 1, 1, 1, −1, −1, −1), (−1, 1, −1, 1, 1, −1, 1, −1), (1, −1, −1, 1, −1, 1, 1,
−1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1),
(−1, 1, 1, 1, −1, 1, −1, −1), (1, −1, 1, 1, 1, −1, −1, −1), (−1, 1, −1, 1, 1, −1, 1, −1), (1, −1, −1, 1, −1, 1, 1, −1), (−1, −1, −1, −1, −1,
−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, 1, −1, 1, −1, −1), (1,
−1, 1, 1, 1, −1, −1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (−1, 1, −1, 1, 1,
−1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (−1, 1, 1, 1, −1, 1, −1, −1), (1, −1, 1, 1, 1, −1, −1, −1), (−1, 1, 1, −1, 1, −1, −1, 1), (1, −1, 1, −1, −1, 1,
−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1),
(−1, 1, 1, 1, −1, 1, −1, −1), (1, −1, 1, 1, 1, −1, −1, −1), (−1, 1, 1, −1, 1, −1, −1, 1), (1, −1, 1, −1, −1, 1, −1, 1), (−1, −1, −1, −1, −1,
−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, 1, −1, 1, −1, −1), (1,
−1, 1, 1, 1, −1, −1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (−1, 1, 1, −1, 1,
−1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (−1, 1, 1, 1, −1, 1, −1, −1), (1, −1, 1, 1, 1, −1, −1, −1), (1, −1, −1, 1, −1, 1, 1, −1), (1, −1, 1, −1, −1, 1,
−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1),
(−1, 1, 1, 1, −1, 1, −1, −1), (1, −1, 1, 1, 1, −1, −1, −1), (1, −1, −1, 1, −1, 1, 1, −1), (1, −1, 1, −1, −1, 1, −1, 1), (−1, −1, −1, −1, −1,
−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, 1, −1, 1, −1, −1), (1,
−1, 1, 1, 1, −1, −1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (1, −1, −1, 1,
−1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (1, −1, −1, −1, 1, −1, 1, 1), (1, −1, 1, 1, 1, −1, −1, −1), (−1, 1, −1, 1, 1, −1, 1, −1), (−1, 1, 1, −1, 1, −1,
−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1,
−1, −1, −1, 1, −1, 1, 1), (1, −1, 1, 1, 1, −1, −1, −1), (−1, 1, −1, 1, 1, −1, 1, −1), (−1, 1, 1, −1, 1, −1, −1, 1), (−1, −1, −1, −1, −1, −1,
−1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, −1, 1, −1, 1, 1), (1,
−1, 1, 1, 1, −1, −1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (1, −1, −1, −1, 1, −1, 1, 1), (1, −1, 1, 1, 1, −1, −1, −1), (−1, 1, −1, 1, 1,
−1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (1, −1, −1, −1, 1, −1, 1, 1), (1, −1, 1, 1, 1, −1, −1, −1), (−1, 1, −1, 1, 1, −1, 1, −1), (1, −1, −1, 1, −1, 1, 1,
−1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1,
−1, −1, −1, 1, −1, 1, 1), (1, −1, 1, 1, 1, −1, −1, −1), (−1, 1, −1, 1, 1, −1, 1, −1), (1, −1, −1, 1, −1, 1, 1, −1), (−1, −1, −1, −1, −1, −1,
−1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, −1, 1, −1, 1, 1), (1,
−1, 1, 1, 1, −1, −1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (1, −1, −1, −1, 1, −1, 1, 1), (1, −1, 1, 1, 1, −1, −1, −1), (−1, 1, −1, 1, 1,
−1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (1, −1, −1, −1, 1, −1, 1, 1), (1, −1, 1, 1, 1, −1, −1, −1), (−1, 1, 1, −1, 1, −1, −1, 1), (1, −1, 1, −1, −1, 1,
−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1,
−1, −1, −1, 1, −1, 1, 1), (1, −1, 1, 1, 1, −1, −1, −1), (−1, 1, 1, −1, 1, −1, −1, 1), (1, −1, 1, −1, −1, 1, −1, 1), (−1, −1, −1, −1, −1, −1,
−1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, −1, 1, −1, 1, 1), (1,
−1, 1, 1, 1, −1, −1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (1, −1, −1, −1, 1, −1, 1, 1), (1, −1, 1, 1, 1, −1, −1, −1), (−1, 1, 1, −1, 1,
−1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (1, −1, −1, −1, 1, −1, 1, 1), (1, −1, 1, 1, 1, −1, −1, −1), (1, −1, −1, 1, −1, 1, 1, −1), (1, −1, 1, −1, −1, 1,
−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1, TABLE 4-continued −1, −1, −1, 1, −1, 1, 1), (1, −1, 1, 1, 1, −1, −1, −1), (1, −1, −1, 1, −1, 1, 1, −1), (1, −1, 1, −1, −1, 1, −1, 1), (−1, −1, −1, −1, −1, −1,
−1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, −1, 1, −1, 1, 1), (1,
−1, 1, 1, 1, −1, −1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (1, −1, −1, −1, 1, −1, 1, 1), (1, −1, 1, 1, 1, −1, −1, −1), (1, −1, −1, 1,
−1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (1, −1, −1, 1, 1, −1, 1, −1), (1, −1, 1, −1, 1, −1, −1, 1), (−1, 1, −1, −1, 1, −1, 1, 1), (−1, 1, 1, 1, 1, −1, −1,
−1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1,
−1, −1, 1, 1, −1, 1, −1), (1, −1, 1, −1, 1, −1, −1, 1), (−1, 1, −1, −1, 1, −1, 1, 1), (−1, 1, 1, 1, 1, −1, −1, −1), (−1, −1, −1, −1, −1, −1,
−1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, 1, 1, −1, 1, −1), (1,
−1, 1, −1, 1, −1, −1, 1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)},
{(−1, −1, −1, 1, 1, 1, −1, 1), (−1, −1, 1, −1, 1, 1, 1, −1), (1, −1, −1, 1, 1, −1, 1, −1), (1, −1, 1, −1, 1, −1, −1, 1), (−1, 1, −1, −1, 1,
−1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, −1, 1, 1, 1, −1, 1), (−1,
−1, 1, −1, 1, 1, 1, −1), (1, −1, −1, 1, 1, −1, 1, −1), (1, −1, 1, −1, 1, −1, −1, 1), (−1, 1, −1, −1, 1, −1, 1, 1), (1, −1, −1, −1,
−1, 1, 1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1),
(1, −1, −1, 1, 1, −1, 1, −1), (1, −1, 1, −1, 1, −1, −1, 1), (−1, 1, −1, −1, 1, −1, 1, 1), (1, −1, −1, −1, −1, 1, 1, 1), (−1, −1, −1, −1,
−1, −1, −1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, 1, 1, −1, 1, −1),
(1, −1, 1, −1, 1, −1, −1, 1), (−1, 1, −1, −1, 1, −1, 1, 1), (1, −1, −1, −1, −1, 1, 1, 1), (−1, −1, 1, 1, −1, −1, 1, 1),
(1, 1, 1, 1, 1, 1, 1, 1)}, {(−1, −1, −1, 1, 1, 1, −1, 1), (−1, −1, 1, −1, 1, 1, 1, −1), (1, −1, −1, 1, 1, −1, 1, −1), (1, −1, 1, −1, 1, −1,
−1, 1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1,
−1, 1, 1, 1, −1, 1), (−1, −1, 1, −1, 1, 1, 1, −1), (1, −1, −1, 1, 1, −1, 1, −1), (1, −1, 1, −1, 1, −1, −1, 1), (−1, 1, 1, 1, 1, −1, −1, −1),
(1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, −1, 1,
−1, 1, 1, 1, −1), (1, −1, −1, 1, 1, −1, 1, −1), (1, −1, 1, −1, 1, −1, −1, 1), (−1, 1, 1, 1, 1, −1, −1, −1), (1, −1, 1, 1, −1, 1, −1, −1),
(−1, −1, −1, −1, −1, −1, −1, −1), (1, 1, −1, −1, 1, 1, −1, −1)}, {(−1, −1, −1, 1, 1, 1, −1, 1), (−1, −1, 1, −1, 1, 1, 1, −1), (1, −1,
−1, 1, 1, −1, 1, −1), (1, −1, 1, −1, 1, −1, −1, 1), (−1, 1, 1, 1, 1, −1, −1, −1), (1, −1, 1, 1, −1, 1, −1, −1), (−1, −1, 1, 1, −1, −1, 1, 1),
(1, 1, 1, 1, 1, 1, 1, 1)}, {(−1, −1, −1, 1, 1, 1, −1, 1), (−1, −1, 1, −1, 1, 1, 1, −1), (1, −1, −1, 1, 1, −1, 1, −1), (1, −1, 1, −1, 1, −1,
−1, 1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1,
−1, 1, 1, 1, −1, 1), (−1, −1, 1, −1, 1, 1, 1, −1), (1, −1, −1, 1, 1, −1, 1, −1), (1, −1, 1, −1, 1, −1, −1, 1), (1, −1, −1, −1, −1, 1, 1, 1),
(1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, −1, 1,
−1, 1, 1, 1, −1), (1, −1, −1, 1, 1, −1, 1, −1), (1, −1, 1, −1, 1, −1, −1, 1), (1, −1, −1, −1, −1, 1, 1, 1), (1, −1, 1, 1, −1, 1, −1, −1),
(−1, −1, −1, −1, −1, −1, −1, −1), (1, 1, −1, −1, 1, 1, −1, −1)}, {(−1, −1, −1, 1, 1, 1, −1, 1), (−1, −1, 1, −1, 1, 1, 1, −1), (1, −1,
−1, 1, 1, −1, 1, −1), (1, −1, 1, −1, 1, −1, −1, 1), (1, −1, −1, −1, −1, 1, 1, 1), (1, −1, 1, 1, −1, 1, −1, −1), (−1, −1, 1, 1, −1, −1, 1, 1),
(1, 1, 1, 1, 1, 1, 1, 1)}, {(−1, −1, −1, 1, 1, 1, −1, 1), (−1, −1, 1, −1, 1, 1, 1, −1), (1, −1, −1, 1, 1, −1, 1, −1), (1, −1, 1, −1, 1, −1,
−1, 1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1,
−1, 1, 1, 1, −1, 1), (−1, 1, −1, −1, −1, 1, 1, 1), (−1, 1, 1, 1, −1, 1, −1, −1), (1, 1, −1, 1, −1, −1, −1, 1), (−1, 1, −1, 1, 1, −1, 1, −1),
(−1, 1, 1, −1, 1, −1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,
−1, −1, 1, 1, 1), (−1, 1, 1, 1, −1, 1, −1, −1), (1, 1, −1, 1, −1, −1, −1, 1), (−1, 1, −1, 1, 1, −1, 1, −1), (−1, 1, 1, −1, 1, −1, −1, 1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (−1, 1, 1, 1,
−1, 1, −1, −1), (1, 1, −1, 1, −1, −1, −1, 1), (−1, 1, −1, 1, 1, −1, 1, −1), (−1, 1, 1, −1, 1, −1, −1, 1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, −1, −1, 1, 1, 1), (−1, 1, 1, 1, −1, 1, −1, −1), (1, 1, −1, 1, −1, −1,
−1, 1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1,
−1, 1, 1, 1, −1, 1), (−1, 1, −1, −1, −1, 1, 1, 1), (−1, 1, 1, 1, −1, 1, −1, −1), (1, 1, −1, 1, −1, −1, −1, 1), (−1, 1, −1, 1, 1, −1, 1, −1),
(1, −1, −1, 1, −1, 1, 1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,
−1, −1, 1, 1, 1), (−1, 1, 1, 1, −1, 1, −1, −1), (1, 1, −1, 1, −1, −1, −1, 1), (−1, 1, −1, 1, 1, −1, 1, −1), (1, −1, −1, 1, −1, 1, 1, −1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (−1, 1, 1, 1,
−1, 1, −1, −1), (1, 1, −1, 1, −1, −1, −1, 1), (−1, 1, −1, 1, 1, −1, 1, −1), (1, −1, −1, 1, −1, 1, 1, −1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, −1, −1, 1, 1, 1), (−1, 1, 1, 1, −1, 1, −1, −1), (1, 1, −1, 1, −1, −1,
−1, 1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1,
−1, 1, 1, 1, −1, 1), (−1, 1, −1, −1, −1, 1, 1, 1), (−1, 1, 1, 1, −1, 1, −1, −1), (1, 1, −1, 1, −1, −1, −1, 1), (−1, 1, 1, −1, 1, −1, −1, 1),
(1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,
−1, −1, 1, 1, 1), (−1, 1, 1, 1, −1, 1, −1, −1), (1, 1, −1, 1, −1, −1, −1, 1), (−1, 1, 1, −1, 1, −1, −1, 1), (1, −1, 1, −1, −1, 1, −1, 1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (−1, 1, 1, 1,
−1, 1, −1, −1), (1, 1, −1, 1, −1, −1, −1, 1), (−1, 1, 1, −1, 1, −1, −1, 1), (1, −1, 1, −1, −1, 1, −1, 1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, −1, −1, 1, 1, 1), (−1, 1, 1, 1, −1, 1, −1, −1), (1, 1, −1, 1, −1, −1,
−1, 1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1,
−1, 1, 1, 1, −1, 1), (−1, 1, −1, −1, −1, 1, 1, 1), (−1, 1, 1, 1, −1, 1, −1, −1), (1, 1, −1, 1, −1, −1, −1, 1), (1, −1, −1, 1, −1, 1, 1, −1),
(1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,
−1, −1, 1, 1, 1), (−1, 1, 1, 1, −1, 1, −1, −1), (1, 1, −1, 1, −1, −1, −1, 1), (1, −1, −1, 1, −1, 1, 1, −1), (1, −1, 1, −1, −1, 1, −1, 1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (−1, 1, 1, 1,
−1, 1, −1, −1), (1, 1, −1, 1, −1, −1, −1, 1), (1, −1, −1, 1, −1, 1, 1, −1), (1, −1, 1, −1, −1, 1, −1, 1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, −1, −1, 1, 1, 1), (−1, 1, 1, 1, −1, 1, −1, −1), (1, 1, −1, 1, −1, −1,
−1, 1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1,
−1, 1, 1, 1, −1, 1), (−1, 1, −1, −1, −1, 1, 1, 1), (1, −1, −1, −1, 1, −1, 1, 1), (1, 1, −1, 1, −1, −1, −1, 1), (−1, 1, −1, 1, 1, −1, 1, −1),
(−1, 1, 1, −1, 1, −1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,
−1, −1, 1, 1, 1), (1, −1, −1, −1, 1, −1, 1, 1), (1, 1, −1, 1, −1, −1, −1, 1), (−1, 1, −1, 1, 1, −1, 1, −1), (−1, 1, 1, −1, 1, −1, −1, 1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (1, −1, −1,
−1, 1, −1, 1, 1), (1, 1, −1, 1, −1, −1, −1, 1), (−1, 1, −1, 1, 1, −1, 1, −1), (−1, 1, 1, −1, 1, −1, −1, 1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, −1, −1, 1, 1, 1), (1, −1, −1, −1, 1, −1, 1, 1), (1, 1, −1, 1, −1, −1,
−1, 1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1,
−1, 1, 1, 1, −1, 1), (−1, 1, −1, −1, −1, 1, 1, 1), (1, −1, −1, −1, 1, −1, 1, 1), (1, 1, −1, 1, −1, −1, −1, 1), (−1, 1, −1, 1, 1, −1, 1, −1),
(1, −1, −1, 1, −1, 1, 1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,
−1, −1, 1, 1, 1), (1, −1, −1, −1, 1, −1, 1, 1), (1, 1, −1, 1, −1, −1, −1, 1), (−1, 1, −1, 1, 1, −1, 1, −1), (1, −1, −1, 1, −1, 1, 1, −1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (1, −1, −1,
−1, 1, −1, 1, 1), (1, 1, −1, 1, −1, −1, −1, 1), (−1, 1, −1, 1, 1, −1, 1, −1), (1, −1, −1, 1, −1, 1, 1, −1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, −1, −1, 1, 1, 1), (1, −1, −1, −1, 1, −1, 1, 1), (1, 1, −1, 1, −1, −1,
−1, 1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1,
−1, 1, 1, 1, −1, 1), (−1, 1, −1, −1, −1, 1, 1, 1), (1, −1, −1, −1, 1, −1, 1, 1), (1, 1, −1, 1, −1, −1, −1, 1), (−1, 1, 1, −1, 1, −1, −1, 1),
(1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,
−1, −1, 1, 1, 1), (1, −1, −1, −1, 1, −1, 1, 1), (1, 1, −1, 1, −1, −1, −1, 1), (−1, 1, 1, −1, 1, −1, −1, 1), (1, −1, 1, −1, −1, 1, −1, 1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (1, −1, −1,
−1, 1, −1, 1, 1), (1, 1, −1, 1, −1, −1, −1, 1), (−1, 1, 1, −1, 1, −1, −1, 1), (1, −1, 1, −1, −1, 1, −1, 1), (−1, −1, 1, 1, −1, −1, 1, 1), TABLE 4-continued (1, 1, 1, 1, 1, 1, 1, 1)}, {(−1, −1, −1, 1, 1, 1, −1, 1), (−1, 1, −1, −1, −1, 1, 1, 1), (1, −1, −1, −1, 1, −1, 1, 1), (1, 1, −1, 1, −1, −1,
−1, 1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1,
−1, 1, 1, 1, −1, 1), (−1, 1, −1, −1, −1, 1, 1, 1), (1, −1, −1, −1, 1, −1, 1, 1), (1, 1, −1, 1, −1, −1, −1, 1), (1, −1, −1, 1, −1, 1, 1, −1),
(1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,
−1, −1, 1, 1, 1), (1, −1, −1, −1, 1, −1, 1, 1), (1, 1, −1, 1, −1, −1, −1, 1), (1, −1, −1, 1, −1, 1, 1, −1), (1, −1, 1, −1, −1, 1, −1, 1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (1, −1, −1,
−1, 1, −1, 1, 1), (1, 1, −1, 1, −1, −1, −1, 1), (1, −1, −1, 1, −1, 1, 1, −1), (1, −1, 1, −1, −1, 1, −1, 1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, −1, −1, 1, 1, 1), (1, −1, −1, −1, 1, −1, 1, 1), (1, 1, −1, 1, −1, −1,
−1, 1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1,
−1, 1, 1, 1, −1, 1), (−1, 1, −1, 1, −1, 1, 1, −1), (−1, 1, 1, −1, −1, 1, −1, 1), (1, 1, −1, 1, −1, −1, −1, 1), (−1, 1, −1, −1, 1, −1, 1, 1),
(−1, 1, 1, 1, 1, −1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,
−1, 1, −1, 1, 1, −1), (−1, 1, 1, −1, −1, 1, −1, 1), (1, 1, −1, 1, −1, −1, −1, 1), (−1, 1, −1, −1, 1, −1, 1, 1), (−1, 1, 1, 1, 1, −1, −1, −1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (−1, 1, 1,
−1, −1, 1, −1, 1), (1, 1, −1, 1, −1, −1, −1, 1), (−1, 1, −1, −1, 1, −1, 1, 1), (−1, 1, 1, 1, 1, −1, −1, −1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, 1, −1, 1, 1, −1), (−1, 1, 1, −1, −1, 1, −1, 1), (1, 1, −1, 1, −1, −1,
−1, 1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1,
−1, 1, 1, 1, −1, 1), (−1, 1, −1, 1, −1, 1, 1, −1), (−1, 1, 1, −1, −1, 1, −1, 1), (1, 1, −1, 1, −1, −1, −1, 1), (−1, 1, −1, −1, 1, −1, 1, 1),
(1, −1, −1, −1, −1, 1, 1, 1), (−1, −1, −1, −1, −1, −1, −1, −1), (−1, −1, 1, 1, −1, −1, 1, 1)}, {(−1, −1, −1, 1, 1, 1, −1, 1), (−1, 1,
−1, 1, −1, 1, 1, −1), (−1, 1, 1, −1, −1, 1, −1, 1), (1, 1, −1, 1, −1, −1, −1, 1), (−1, 1, −1, −1, 1, −1, 1, 1), (1, −1, −1, −1, −1, 1, 1, 1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (−1, 1, 1,
−1, −1, 1, −1, 1), (1, 1, −1, 1, −1, −1, −1, 1), (−1, 1, −1, −1, 1, −1, 1, 1), (1, −1, −1, −1, −1, 1, 1, 1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, 1, −1, 1, 1, −1), (−1, 1, 1, −1, −1, 1, −1, 1), (1, 1, −1, 1, −1, −1,
−1, 1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1,
−1, 1, 1, 1, −1, 1), (−1, 1, −1, 1, −1, 1, 1, −1), (−1, 1, 1, −1, −1, 1, −1, 1), (1, 1, −1, 1, −1, −1, −1, 1), (−1, 1, 1, 1, 1, −1, −1, −1),
(1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,
−1, 1, −1, 1, 1, −1), (−1, 1, 1, −1, −1, 1, −1, 1), (1, 1, −1, 1, −1, −1, −1, 1), (−1, 1, 1, 1, 1, −1, −1, −1), (1, −1, 1, 1, −1, 1, −1, −1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (−1, 1, 1,
−1, −1, 1, −1, 1), (1, 1, −1, 1, −1, −1, −1, 1), (−1, 1, 1, 1, 1, −1, −1, −1), (1, −1, 1, 1, −1, 1, −1, −1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, 1, −1, 1, 1, −1), (−1, 1, 1, −1, −1, 1, −1, 1), (1, 1, −1, 1, −1, −1,
−1, 1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1,
−1, 1, 1, 1, −1, 1), (−1, 1, −1, 1, −1, 1, 1, −1), (−1, 1, 1, −1, −1, 1, −1, 1), (1, 1, −1, 1, −1, −1, −1, 1), (1, −1, −1, −1, −1, 1, 1, 1),
(1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,
−1, 1, −1, 1, 1, −1), (−1, 1, 1, −1, −1, 1, −1, 1), (1, 1, −1, 1, −1, −1, −1, 1), (1, −1, −1, −1, −1, 1, 1, 1), (1, −1, 1, 1, −1, 1, −1, −1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (−1, 1, 1,
−1, −1, 1, −1, 1), (1, 1, −1, 1, −1, −1, −1, 1), (1, −1, −1, −1, −1, 1, 1, 1), (1, −1, 1, 1, −1, 1, −1, −1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, 1, −1, 1, 1, −1), (−1, 1, 1, −1, −1, 1, −1, 1), (1, 1, −1, 1, −1, −1,
−1, 1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1,
−1, 1, 1, 1, −1, 1), (−1, 1, −1, 1, −1, 1, 1, −1), (1, −1, −1, 1, 1, −1, 1, −1), (1, 1, −1, 1, −1, −1, −1, 1), (−1, 1, −1, −1, 1, −1, 1, 1),
(−1, 1, 1, 1, 1, −1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,
−1, 1, −1, 1, 1, −1), (1, −1, −1, 1, 1, −1, 1, −1), (1, 1, −1, 1, −1, −1, −1, 1), (−1, 1, −1, −1, 1, −1, 1, 1), (−1, 1, 1, 1, 1, −1, −1, −1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (1, −1,
−1, 1, 1, −1, 1, −1), (1, 1, −1, 1, −1, −1, −1, 1), (−1, 1, −1, −1, 1, −1, 1, 1), (−1, 1, 1, 1, 1, −1, −1, −1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, 1, −1, 1, 1, −1), (1, −1, −1, 1, 1, −1, 1, −1), (1, 1, −1, 1, −1, −1,
−1, 1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1,
−1, 1, 1, 1, −1, 1), (−1, 1, −1, 1, −1, 1, 1, −1), (1, −1, −1, 1, 1, −1, 1, −1), (1, 1, −1, 1, −1, −1, −1, 1), (−1, 1, −1, −1, 1, −1, 1, 1),
(1, −1, −1, −1, −1, 1, 1, 1), (−1, −1, −1, −1, −1, −1, −1, −1), (−1, −1, 1, 1, −1, −1, 1, 1)}, {(−1, −1, −1, 1, 1, 1, −1, 1), (−1, 1,
−1, 1, −1, 1, 1, −1), (1, −1, −1, 1, 1, −1, 1, −1), (1, 1, −1, 1, −1, −1, −1, 1), (−1, 1, −1, −1, 1, −1, 1, 1), (1, −1, −1, −1, −1, 1, 1, 1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (1, −1,
−1, 1, 1, −1, 1, −1), (1, 1, −1, 1, −1, −1, −1, 1), (−1, 1, −1, −1, 1, −1, 1, 1), (1, −1, −1, −1, −1, 1, 1, 1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, 1, −1, 1, 1, −1), (1, −1, −1, 1, 1, −1, 1, −1), (1, 1, −1, 1, −1, −1,
−1, 1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1,
−1, 1, 1, 1, −1, 1), (−1, 1, −1, 1, −1, 1, 1, −1), (1, −1, −1, 1, 1, −1, 1, −1), (1, 1, −1, 1, −1, −1, −1, 1), (−1, 1, 1, 1, 1, −1, −1, −1),
(1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,
−1, 1, −1, 1, 1, −1), (1, −1, −1, 1, 1, −1, 1, −1), (1, 1, −1, 1, −1, −1, −1, 1), (−1, 1, 1, 1, 1, −1, −1, −1), (1, −1, 1, 1, −1, 1, −1, −1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (1, −1,
−1, 1, 1, −1, 1, −1), (1, 1, −1, 1, −1, −1, −1, 1), (−1, 1, 1, 1, 1, −1, −1, −1), (1, −1, 1, 1, −1, 1, −1, −1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, 1, −1, 1, 1, −1), (1, −1, −1, 1, 1, −1, 1, −1), (1, 1, −1, 1, −1, −1,
−1, 1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1,
−1, 1, 1, 1, −1, 1), (−1, 1, −1, 1, −1, 1, 1, −1), (1, −1, −1, 1, 1, −1, 1, −1), (1, 1, −1, 1, −1, −1, −1, 1), (1, −1, −1, −1, −1, 1, 1, 1),
(1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,
−1, 1, −1, 1, 1, −1), (1, −1, −1, 1, 1, −1, 1, −1), (1, 1, −1, 1, −1, −1, −1, 1), (1, −1, −1, −1, −1, 1, 1, 1), (1, −1, 1, 1, −1, 1, −1, −1),
(−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (1, −1,
−1, 1, 1, −1, 1, −1), (1, 1, −1, 1, −1, −1, −1, 1), (1, −1, −1, −1, −1, 1, 1, 1), (1, −1, 1, 1, −1, 1, −1, −1), (−1, −1, 1, 1, −1, −1, 1, 1),
(1, 1, 1, 1, 1, 1, 1, 1)}, {(−1, −1, −1, 1, 1, 1, −1, 1), (−1, 1, −1, 1, −1, 1, 1, −1), (1, −1, −1, 1, 1, −1, 1, −1), (1, 1, −1, 1, −1, −1,
−1, 1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1,
−1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (−1, 1, −1, −1, 1, −1, 1, 1),
(−1, 1, 1, 1, 1, −1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, 1,
−1, −1, 1, −1, 1), (1, −1, 1, −1, 1, −1, −1, 1), (1, 1, −1, 1, −1, −1, −1, 1), (−1, 1, −1, −1, 1, −1, 1, 1), (−1, 1, 1, 1, 1, −1, −1, −1),
(−1, −1, −1, −1, −1, −1, −1, −1), (1, 1, −1, −1, 1, 1, −1, −1)}, {(−1, −1, −1, 1, 1, 1, −1, 1), (−1, 1, 1, −1, −1, 1, −1, 1), (1, −1, 1,
−1, 1, −1, −1, 1), (1, 1, −1, 1, −1, −1, −1, 1), (−1, 1, −1, −1, 1, −1, 1, 1), (−1, 1, 1, 1, 1, −1, −1, −1), (−1, −1, 1, 1, −1, −1, 1, 1),
(1, 1, 1, 1, 1, 1, 1, 1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1,
−1, 1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1,
−1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (−1, 1, −1, −1, 1, −1, 1, 1),
(1, −1, −1, −1, −1, 1, 1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, 1,
−1, −1, 1, −1, 1), (1, −1, 1, −1, 1, −1, −1, 1), (1, 1, −1, 1, −1, −1, −1, 1), (−1, 1, −1, −1, 1, −1, 1, 1), (1, −1, −1, −1, −1, 1, 1, 1),
(−1, −1, −1, −1, −1, −1, −1, −1), (1, 1, −1, −1, 1, 1, −1, −1)}, {(−1, −1, −1, 1, 1, 1, −1, 1), (−1, 1, 1, −1, −1, 1, −1, 1), (1, −1, 1,
−1, 1, −1, −1, 1), (1, 1, −1, 1, −1, −1, −1, 1), (−1, 1, −1, −1, 1, −1, 1, 1), (1, −1, −1, −1, −1, 1, 1, 1), (−1, −1, 1, 1, −1, −1, 1, 1),
(1, 1, 1, 1, 1, 1, 1, 1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1,
−1, 1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1,
−1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (−1, 1, 1, 1, 1, −1, −1, −1), TABLE 4-continued (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (−1, 1, 1, 1, 1, −1, −1, −1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (1, −1, −1, 1, −1, 1, 1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, 1, −1, 1, −1, −1, 1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (1, −1, −1, 1, −1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (1, −1, −1, 1, −1, 1, 1, −1), (−1, −1, −1, −1, −1, −1, −1, −1), (−1, −1, 1, 1, −1, −1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, 1, −1, 1, −1, −1, 1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (1, −1, −1, 1, −1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1, −1, 1, 1), (−1, 1, 1, 1, 1, −1, −1, −1), (−1, −1, −1, −1, −1, −1, −1, −1), (−1, −1, 1, 1, −1, −1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1, −1, 1, 1), (−1, 1, 1, 1, 1, −1, −1, −1), (−1, −1, −1, −1, −1, −1, −1, −1), (1, 1, −1, −1, 1, 1, −1, −1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1, −1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1, −1, 1, 1), (1, −1, −1, −1, −1, 1, 1, 1), (−1, −1, −1, −1, −1, −1, −1, −1), (1, 1, −1, −1, 1, 1, −1, −1)}, {(−1, −1, −1, 1, 1, 1, −1, 1), (1, −1, −1, 1, 1, −1, 1, −1), TABLE 4-continued (1, −1, 1, −1, 1, −1, −1, 1), (1, 1, −1, 1, −1, −1, −1, 1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, 1, 1, 1, −1, −1, −1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, 1, 1, 1, −1, −1, −1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, −1, −1, 1, 1, 1, 1, −1), (−1, 1, 1, 1, 1, −1, −1, −1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, −1, −1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, −1, −1, 1, 1, 1, 1, −1), (1, −1, −1, −1, −1, 1, 1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, −1, −1, 1, 1, 1, 1, −1), (1, −1, −1, −1, −1, 1, 1, 1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, 1, 1, 1, 1, −1, −1, −1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, 1, 1, 1, 1, −1, −1, −1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), 1 (−1, 1, −1, 1, −1, −1, 1, 1), (1, −1, −1, −1, −1, 1, 1, 1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (1, −1, −1, −1, −1, 1, 1, 1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, 1, 1, 1, 1, −1, −1, −1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (−1, 1, 1, 1, 1, −1, −1, −1), (1, −1, TABLE 4-continued −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (1, −1, −1, −1, −1, 1, 1, 1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, 1, 1, 1, 1, −1, −1, −1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (1, −1, −1, −1, −1, 1, 1, 1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, 1, 1, 1, 1, −1, −1, −1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (1, −1, −1, −1, −1, 1, 1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, 1, 1, 1, 1, −1, −1, −1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), TABLE 4-continued (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (−1, 1, −1, 1, 1, −1, 1, −1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (1, −1, 1, −1, −1, 1, −1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, 1, −1, 1, 1, −1, 1, −1), (1, 1, −1, −1, −1, −1, 1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (1, −1, 1, −1, −1, 1, −1, 1), (1, 1, −1, −1, −1, −1, 1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (−1, 1, −1, 1, 1, −1, 1, −1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (1, −1, 1, −1, −1, 1, −1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, 1, −1, 1, 1, −1, 1, −1), (1, 1, −1, −1, −1, −1, 1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (1, −1, 1, −1, −1, 1, −1, 1), (1, 1, −1, −1, −1, −1, 1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (1, −1, −1, −1, −1, 1, 1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, 1, 1, 1, 1, −1, −1, −1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1, −1, 1, 1, −1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1, TABLE 4-continued −1, 1), (1, −1, 1, −1, 1, 1, −1, −1), (1, 1, −1, −1, 1, −1, 1, −1), (1, −1, −1, −1, −1, 1, 1, 1), (1, 1, 1, −1, −1, −1, −1, 1), (1, −1,
−1, 1, 1, −1, −1, 1), (1, 1, 1, 1, 1, 1, 1, 1)}, {(−1, −1, 1, −1, 1, −1, 1, 1), (−1, 1, −1, 1, −1, −1, 1, 1), (1, −1, 1, 1, −1, −1, 1, −1),
(1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1,
−1, 1, 1, −1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1),
(−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1,
−1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, −1, −1, 1, 1, 1, 1, −1),
(−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, 1, −1, 1, −1,
−1, 1, 1), (1, −1, 1, 1, −1, −1, 1, −1), (1, 1, −1, −1, 1, −1, 1, −1), (−1, −1, −1, 1, 1, 1, 1, −1), (−1, 1, 1, 1, 1, −1, −1, −1), (1, −1,
−1, 1, 1, −1, −1, 1), (1, 1, 1, 1, 1, 1, 1, 1)}, {(−1, −1, 1, −1, 1, −1, 1, 1), (−1, 1, −1, 1, −1, −1, 1, 1), (1, −1, 1, 1, −1, −1, 1, −1),
(1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1,
−1, 1, 1, −1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1),
(−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1,
−1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, −1, −1, 1, 1, 1, 1, −1),
(1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, 1, −1,
−1, 1, 1), (1, −1, 1, 1, −1, −1, 1, −1), (1, 1, −1, −1, 1, −1, 1, −1), (−1, −1, −1, 1, 1, 1, 1, −1), (1, −1, −1, −1, −1, 1, 1, 1), (1, −1,
−1, 1, 1, −1, −1, 1), (1, 1, 1, 1, 1, 1, 1, 1)}, {(−1, −1, 1, −1, 1, −1, 1, 1), (−1, 1, −1, 1, −1, −1, 1, 1), (1, −1, 1, 1, −1, −1, 1, −1),
(1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1,
−1, 1, 1, −1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1),
(−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1,
−1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, 1, 1, 1, 1, −1, −1, −1),
(1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, 1, −1,
−1, 1, 1), (1, −1, 1, 1, −1, −1, 1, −1), (1, 1, −1, −1, 1, −1, 1, −1), (−1, 1, 1, 1, 1, −1, −1, −1), (1, 1, 1, −1, −1, −1, −1, 1), (1, −1,
−1, 1, 1, −1, −1, 1), (1, 1, 1, 1, 1, 1, 1, 1)}, {(−1, −1, 1, −1, 1, −1, 1, 1), (−1, 1, −1, 1, −1, −1, 1, 1), (1, −1, 1, 1, −1, −1, 1, −1),
(1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1,
−1, 1, 1, −1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1),
(1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1,
−1, 1, −1, 1, 1), (−1, 1, −1, 1, −1, −1, 1, 1), (1, −1, 1, 1, −1, −1, 1, −1), (1, 1, −1, −1, 1, −1, 1, −1), (1, −1, −1, −1, −1, 1, 1, 1),
(1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, 1, −1,
−1, 1, 1), (1, −1, 1, 1, −1, −1, 1, −1), (1, 1, −1, −1, 1, −1, 1, −1), (1, −1, −1, −1, −1, 1, 1, 1), (1, 1, 1, −1, −1, −1, −1, 1), (1, −1,
−1, 1, 1, −1, −1, 1), (1, 1, 1, 1, 1, 1, 1, 1)}, {(−1, −1, 1, −1, 1, −1, 1, 1), (−1, 1, 1, 1, −1, −1, −1, 1), (1, −1, 1, 1, −1, −1, 1, −1),
(1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,
−1, 1, 1, −1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1),
(−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, 1,
−1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, −1, 1, 1, 1, 1, −1, −1),
(−1, 1, −1, 1, 1, −1, 1, −1), (−1, 1, 1, −1, −1, 1, 1, −1), (1, 1, 1, 1, 1, 1, 1, 1)}, {(−1, −1, 1, −1, 1, −1, 1, 1), (−1, 1, 1, 1, −1, −1,
−1, 1), (1, −1, 1, 1, −1, −1, 1, −1), (1, 1, 1, −1, 1, −1, −1, −1), (−1, −1, 1, 1, 1, 1, −1, −1), (−1, 1, −1, 1, 1, −1, 1, −1), (1, −1,
−1, 1, 1, −1, −1, 1), (1, 1, 1, 1, 1, 1, 1, 1)}, {(−1, −1, 1, −1, 1, −1, 1, 1), (−1, 1, 1, 1, −1, −1, −1, 1), (1, −1, 1, 1, −1, −1, 1, −1),
(1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,
−1, 1, 1, −1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1),
(−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1, 1,
−1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, −1, 1, 1, 1, 1, −1, −1),
(1, −1, 1, −1, −1, 1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, 1, 1, −1, −1,
−1, 1), (1, −1, 1, 1, −1, −1, 1, −1), (1, 1, 1, −1, 1, −1, −1, −1), (−1, −1, 1, 1, 1, 1, −1, −1), (1, −1, 1, −1, −1, 1, −1, 1), (1, −1,
−1, 1, 1, −1, −1, 1), (1, 1, 1, 1, 1, 1, 1, 1)}, {(−1, −1, 1, −1, 1, −1, 1, 1), (−1, 1, 1, 1, −1, −1, −1, 1), (1, −1, 1, 1, −1, −1, 1, −1),
(1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,
−1, 1, 1, −1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1),
(−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1, 1,
−1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, 1, −1, 1, 1, −1, 1, −1),
(1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, 1, 1, −1, −1,
−1, 1), (1, −1, 1, 1, −1, −1, 1, −1), (1, 1, 1, −1, 1, −1, −1, −1), (−1, 1, −1, 1, 1, −1, 1, −1), (1, 1, −1, −1, −1, −1, 1, 1), (1, −1,
−1, 1, 1, −1, −1, 1), (1, 1, 1, 1, 1, 1, 1, 1)}, {(−1, −1, 1, −1, 1, −1, 1, 1), (−1, 1, 1, 1, −1, −1, −1, 1), (1, −1, 1, 1, −1, −1, 1, −1),
(1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,
−1, 1, 1, −1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1),
(1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1, 1,
−1, 1, −1, 1, 1), (−1, 1, 1, 1, −1, −1, −1, 1), (1, −1, 1, 1, −1, −1, 1, −1), (1, 1, 1, −1, 1, −1, −1, −1), (1, −1, 1, −1, −1, 1, −1, 1),
(1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, 1, 1, −1, −1,
−1, 1), (1, −1, 1, 1, −1, −1, 1, −1), (1, 1, 1, −1, 1, −1, −1, −1), (1, −1, 1, −1, −1, 1, −1, 1), (1, 1, −1, −1, −1, −1, 1, 1), (1, −1,
−1, 1, 1, −1, −1, 1), (1, 1, 1, 1, 1, 1, 1, 1)}, {(−1, −1, 1, −1, 1, −1, 1, 1), (1, −1, −1, −1, 1, 1, 1, −1), (1, −1, 1, 1, −1, −1, 1, −1),
(1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,
−1, 1, 1, −1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1, −1, −1, −1),
(−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, 1,
−1, 1, −1, 1, 1), (1, −1, −1, −1, 1, 1, 1, −1), (1, −1, 1, 1, −1, −1, 1, −1), (1, 1, 1, −1, 1, −1, −1, −1), (−1, −1, 1, 1, 1, 1, −1, −1),
(−1, 1, −1, 1, 1, −1, 1, −1), (−1, 1, 1, −1, −1, 1, 1, −1), (1, 1, 1, 1, 1, 1, 1, 1)}, {(−1, −1, 1, −1, 1, −1, 1, 1), (1, −1, −1, −1, 1, 1, 1,
−1), (1, −1, 1, 1, −1, −1, 1, −1), (1, 1, 1, −1, 1, −1, −1, −1), (−1, −1, 1, 1, 1, 1, −1, −1), (−1, 1, −1, 1, 1, −1, 1, −1), (1, −1,
−1, 1, 1, −1, −1, 1), (1, 1, 1, 1, 1, 1, 1, 1)}, {(−1, −1, 1, −1, 1, −1, 1, 1), (1, −1, −1, −1, 1, 1, 1, −1), (1, −1, 1, 1, −1, −1, 1, −1),
(1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,
−1, 1, 1, −1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1, −1, −1, −1),
(−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1, 1,
−1, 1, −1, 1, 1), (1, −1, −1, −1, 1, 1, 1, −1), (1, −1, 1, 1, −1, −1, 1, −1), (1, 1, 1, −1, 1, −1, −1, −1), (−1, −1, 1, 1, 1, 1, −1, −1),
(1, −1, 1, −1, −1, 1, −1, 1), (−1, 1, 1, −1, −1, 1, 1, −1), (1, 1, 1, 1, 1, 1, 1, 1)}, {(−1, −1, 1, −1, 1, −1, 1, 1), (1, −1, −1,
−1, 1, 1, 1, −1), (1, −1, 1, 1, −1, −1, 1, −1), (1, 1, 1, −1, 1, −1, −1, −1), (−1, −1, 1, 1, 1, 1, −1, −1), (1, −1, 1, −1, −1, 1, −1, 1),
(1, −1, −1, 1, 1, −1, −1, 1), (1, 1, 1, 1, 1, 1, 1, 1)}, {(−1, −1, 1, −1, 1, −1, 1, 1), (1, −1, −1, −1, 1, 1, 1, −1), (1, −1, 1, 1, −1,
−1, 1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1),
(−1, 1, 1, −1, −1, 1, 1, −1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1,
−1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)},
{(−1, −1, 1, −1, 1, −1, 1, 1), (1, −1, −1, −1, 1, 1, 1, −1), (1, −1, 1, 1, −1, −1, 1, −1), (1, 1, 1, −1, 1, −1, −1, −1), (−1, 1, −1, 1, 1,
−1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (1, −1,
−1, −1, 1, 1, 1, −1), (1, −1, 1, 1, −1, −1, 1, −1), (1, 1, 1, −1, 1, −1, −1, −1), (−1, 1, −1, 1, 1, −1, 1, −1), (1, 1, −1, −1, −1, −1, 1, 1),
(1, −1, −1, 1, 1, −1, −1, 1), (1, 1, 1, 1, 1, 1, 1, 1)}, {(−1, −1, 1, −1, 1, −1, 1, 1), (1, −1, −1, −1, 1, 1, 1, −1), (1, −1, 1, 1, −1,
−1, 1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), TABLE 4-continued (−1, 1, 1, −1, −1, 1, 1, −1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1,
−1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)},
{(−1, −1, 1, −1, 1, −1, 1, 1), (1, −1, −1, −1, 1, 1, 1, −1), (1, −1, 1, 1, −1, −1, 1, −1), (1, 1, 1, −1, 1, −1, −1, −1), (1, −1, 1, −1,
−1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (1,
−1, −1, −1, 1, 1, 1, −1), (1, −1, 1, 1, −1, −1, 1, −1), (1, 1, 1, −1, 1, −1, −1, −1), (1, −1, 1, −1, −1, 1, −1, 1), (1, 1, −1, −1, −1,
−1, 1, 1), (1, −1, −1, 1, 1, −1, −1, 1), (1, 1, 1, 1, 1, 1, 1, 1)}, {(−1, −1, 1, −1, 1, −1, 1, 1), (1, −1, 1, −1, 1, 1, −1, −1), (1,
−1, 1, 1, −1, −1, 1, −1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1,
−1, −1), (−1, 1, 1, −1, −1, 1, 1, −1)}, {(−1, −1, 1, −1, 1, −1, 1, 1), (1, −1, 1, −1, 1, 1, −1, −1), (1, −1, 1, 1, −1, −1, 1, −1), (1, 1,
−1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1,
−1, 1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1, −1), (−1, −1,
−1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1),
(1, −1, 1, −1, 1, 1, −1, −1), (1, −1, 1, 1, −1, −1, 1, −1), (1, 1, −1, −1, 1, −1, 1, −1), (−1, −1, −1, 1, 1, 1, 1, −1), (−1, 1, 1, 1, 1, −1,
−1, −1), (1, −1, −1, 1, 1, −1, −1, 1), (1, 1, 1, 1, 1, 1, 1, 1)}, {(−1, −1, 1, −1, 1, −1, 1, 1), (1, −1, 1, −1, 1, 1, −1, −1), (1,
−1, 1, 1, −1, −1, 1, −1), (1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1,
−1, −1), (−1, 1, 1, −1, −1, 1, 1, −1)}, {(−1, −1, 1, −1, 1, −1, 1, 1), (1, −1, 1, −1, 1, 1, −1, −1), (1, −1, 1, 1, −1, −1, 1, −1), (1, 1,
−1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1,
−1, 1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1, −1), (−1, −1,
−1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1),
(1, −1, 1, −1, 1, 1, −1, −1), (1, −1, 1, 1, −1, −1, 1, −1), (1, 1, −1, −1, 1, −1, 1, −1), (−1, −1, −1, 1, 1, 1, 1, −1), (1, −1, −1, −1,
−1, 1, 1, 1), (1, −1, −1, 1, 1, −1, −1, 1), (1, 1, 1, 1, 1, 1, 1, 1)}, {(−1, −1, 1, −1, 1, −1, 1, 1), (1, −1, 1, −1, 1, 1, −1, −1), (1,
−1, 1, 1, −1, −1, 1, −1), (1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1,
−1, −1), (−1, 1, 1, −1, −1, 1, 1, −1)}, {(−1, −1, 1, −1, 1, −1, 1, 1), (1, −1, 1, −1, 1, 1, −1, −1), (1, −1, 1, 1, −1, −1, 1, −1), (1, 1,
−1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1,
−1, 1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1, −1),
(−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1,
−1, 1, 1), (1, −1, 1, −1, 1, 1, −1, −1), (1, −1, 1, 1, −1, −1, 1, −1), (1, 1, −1, −1, 1, −1, 1, −1), (−1, 1, 1, 1, 1, −1, −1, −1), (1, 1, 1,
−1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (1, −1, 1, −1, 1, 1, −1, −1),
(1, −1, 1, 1, −1, −1, 1, −1), (1, 1, −1, −1, 1, −1, 1, −1), (1, −1, −1, −1, −1, 1, 1, 1), (1, 1, 1, −1, −1, −1, −1, 1), (−1, −1, −1, −1,
−1, −1, −1, −1), (−1, 1, 1, −1, −1, 1, 1, −1)}, {(−1, −1, 1, −1, 1, −1, 1, 1), (1, −1, 1, −1, 1, 1, −1, −1), (1, −1, 1, 1, −1, −1, 1, −1),
(1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (1, −1,
−1, 1, 1, −1, −1, 1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1,
−1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1,
−1, 1, −1, 1, 1), (1, −1, 1, −1, 1, 1, −1, −1), (1, −1, 1, 1, −1, −1, 1, −1), (1, 1, −1, −1, 1, −1, 1, −1), (1, −1, −1, −1, −1, 1, 1, 1),
(1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, 1, 1, −1), (−1, 1, −1, −1,
−1, 1, 1, 1), (−1, 1, 1, 1, −1, 1, −1, −1), (1, 1, 1, −1, −1, −1, 1, −1), (−1, 1, −1, 1, 1, −1, 1, −1), (−1, 1, 1, −1, 1, −1, −1, 1), (−1,
−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (−1, 1, 1, 1,
−1, 1, −1, −1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1),
(1, 1, −1, −1, 1, 1, −1, −1)}, {(−1, −1, 1, −1, 1, 1, 1, −1), (−1, 1, −1, −1, −1, 1, 1, 1), (−1, 1, 1, 1, −1, 1, −1, −1), (1, 1, 1, −1,
−1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1,
−1, 1, −1, 1, 1, 1, −1), (−1, 1, −1, −1, −1, 1, 1, 1), (−1, 1, 1, 1, −1, 1, −1, −1), (1, 1, 1, −1, −1, −1, 1, −1), (−1, 1, −1, 1, 1, −1, 1,
−1), (−1, 1, 1, −1, 1, −1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1, −1,
−1, 1, 1, 1), (−1, 1, 1, 1, −1, 1, −1, −1), (1, 1, 1, −1, −1, −1, 1, −1), (−1, 1, −1, 1, 1, −1, 1, −1), (1, −1, −1, 1, −1, 1, 1, −1), (−1,
−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (−1, 1, 1, 1,
−1, 1, −1, −1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1),
(1, 1, −1, −1, 1, 1, −1, −1)}, {(−1, −1, 1, −1, 1, 1, 1, −1), (−1, 1, −1, −1, −1, 1, 1, 1), (−1, 1, 1, 1, −1, 1, −1, −1), (1, 1, 1, −1,
−1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1,
−1, 1, −1, 1, 1, 1, −1), (−1, 1, −1, −1, −1, 1, 1, 1), (−1, 1, 1, 1, −1, 1, −1, −1), (1, 1, 1, −1, −1, −1, 1, −1), (−1, 1, −1, 1, 1, −1, 1,
−1), (1, −1, −1, 1, −1, 1, 1, −1), (1, 1, −1, −1, 1, 1, −1, −1), (1, 1, 1, 1, 1, 1, 1, 1)}, {(−1, −1, 1, −1, 1, 1, 1, −1), (−1, 1, −1, −1,
−1, 1, 1, 1), (−1, 1, 1, 1, −1, 1, −1, −1), (1, 1, 1, −1, −1, −1, 1, −1), (−1, 1, 1, −1, 1, −1, −1, 1), (1, −1, 1, −1, −1, 1, −1, 1), (−1,
−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (−1, 1, 1, 1,
−1, 1, −1, −1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1),
(1, 1, −1, −1, 1, 1, −1, −1)}, {(−1, −1, 1, −1, 1, 1, 1, −1), (−1, 1, −1, −1, −1, 1, 1, 1), (−1, 1, 1, 1, −1, 1, −1, −1), (1, 1, 1, −1,
−1, −1, 1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1,
−1, 1, −1, 1, 1, 1, −1), (−1, 1, −1, −1, −1, 1, 1, 1), (−1, 1, 1, 1, −1, 1, −1, −1), (1, 1, 1, −1, −1, −1, 1, −1), (−1, 1, 1, −1, 1, −1,
−1, 1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1,
−1, −1, 1, 1, 1), (−1, 1, 1, 1, −1, 1, −1, −1), (1, 1, 1, −1, −1, −1, 1, −1), (1, −1, −1, 1, −1, 1, 1, −1), (1, −1, 1, −1, −1, 1, −1, 1),
(−1, −1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (−1, 1, 1, 1,
−1, 1, −1, −1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1),
(1, 1, −1, −1, 1, 1, −1, −1)}, {(−1, −1, 1, −1, 1, 1, 1, −1), (−1, 1, −1, −1, −1, 1, 1, 1), (−1, 1, 1, 1, −1, 1, −1, −1), (1, 1, 1, −1,
−1, −1, 1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1,
−1, 1, −1, 1, 1, 1, −1), (−1, 1, −1, −1, −1, 1, 1, 1), (−1, 1, 1, 1, −1, 1, −1, −1), (1, 1, 1, −1, −1, −1, 1, −1), (1, −1, −1, 1, −1, 1, 1,
−1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1, −1,
−1, 1, 1, 1), (1, −1, −1, −1, 1, −1, 1, 1), (1, 1, 1, −1, −1, −1, 1, −1), (−1, 1, −1, 1, 1, −1, 1, −1), (−1, 1, 1, −1, 1, −1, −1, 1), (−1,
−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (1, −1, −1, −1, 1,
−1, 1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1),
(1, 1, −1, −1, 1, 1, −1, −1)}, {(−1, −1, 1, −1, 1, 1, 1, −1), (−1, 1, −1, −1, −1, 1, 1, 1), (1, −1, −1, −1, 1, −1, 1, 1), (1, 1, 1, −1,
−1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1,
−1, 1, −1, 1, 1, 1, −1), (−1, 1, −1, −1, −1, 1, 1, 1), (1, −1, −1, −1, 1, −1, 1, 1), (1, 1, 1, −1, −1, −1, 1, −1), (−1, 1, −1, 1, 1, −1, 1,
−1), (−1, 1, 1, −1, 1, −1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1, −1,
−1, 1, 1, 1), (1, −1, −1, −1, 1, −1, 1, 1), (1, 1, 1, −1, −1, −1, 1, −1), (−1, 1, −1, 1, 1, −1, 1, −1), (1, −1, −1, 1, −1, 1, 1, −1), (−1,
−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (1, −1, −1, −1, 1,
−1, 1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1),
(1, 1, −1, −1, 1, 1, −1, −1)}, {(−1, −1, 1, −1, 1, 1, 1, −1), (−1, 1, −1, −1, −1, 1, 1, 1), (1, −1, −1, −1, 1, −1, 1, 1), (1, 1, 1, −1,
−1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1,
−1, 1, −1, 1, 1, 1, −1), (−1, 1, −1, −1, −1, 1, 1, 1), (1, −1, −1, −1, 1, −1, 1, 1), (1, 1, 1, −1, −1, −1, 1, −1), (−1, 1, −1, 1, 1, −1, 1,
−1), (1, −1, −1, 1, −1, 1, 1, −1), (1, 1, −1, −1, 1, 1, −1, −1), (1, 1, 1, 1, 1, 1, 1, 1)}, {(−1, −1, 1, −1, 1, 1, 1, −1), (−1, 1, −1, −1,
−1, 1, 1, 1), (1, −1, −1, −1, 1, −1, 1, 1), (1, 1, 1, −1, −1, −1, 1, −1), (−1, 1, 1, −1, 1, −1, −1, 1), (1, −1, 1, −1, −1, 1, −1, 1), (−1,
−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (1, −1, −1, −1, 1,
−1, 1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1),
(1, 1, −1, −1, 1, 1, −1, −1)}, {(−1, −1, 1, −1, 1, 1, 1, −1), (−1, 1, −1, −1, −1, 1, 1, 1), (1, −1, −1, −1, 1, −1, 1, 1), (1, 1, 1, −1, TABLE 4-continued −1, −1, 1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1,
−1, 1, −1, 1, 1, 1, −1), (−1, 1, −1, −1, −1, 1, 1, 1), (1, −1, −1, −1, 1, −1, 1, 1), (1, 1, 1, −1, −1, −1, 1, −1), (−1, 1, 1, −1, 1, −1,
−1, 1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1,
−1, −1, 1, 1, 1), (1, −1, −1, −1, 1, −1, 1, 1), (1, 1, 1, −1, −1, −1, 1, −1), (1, −1, −1, 1, −1, 1, 1, −1), (1, −1, 1, −1, −1, 1, −1, 1),
(−1, −1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (1, −1, −1,
−1, 1, −1, 1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1),
(1, 1, −1, −1, 1, 1, −1, −1)}, {(−1, −1, 1, −1, 1, 1, 1, −1), (−1, 1, −1, −1, −1, 1, 1, 1), (1, −1, −1, −1, 1, −1, 1, 1), (1, 1, 1, −1,
−1, −1, 1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1,
−1, 1, −1, 1, 1, 1, −1), (−1, 1, −1, −1, −1, 1, 1, 1), (1, −1, −1, −1, 1, −1, 1, 1), (1, 1, 1, −1, −1, −1, 1, −1), (1, −1, −1, 1, −1, 1, 1,
−1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1, 1,
−1, 1, 1, −1), (−1, 1, 1, −1, −1, 1, −1, 1), (1, 1, 1, −1, −1, −1, 1, −1), (−1, 1, −1, −1, 1, −1, 1, 1), (−1, 1, 1, 1, 1, −1, −1, −1), (−1,
−1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (−1, 1, 1, −1,
−1, 1, −1, 1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1, −1),
(1, 1, −1, −1, 1, 1, −1, −1)}, {(−1, −1, 1, −1, 1, 1, 1, −1), (−1, 1, −1, 1, −1, 1, 1, −1), (−1, 1, 1, −1, −1, 1, −1, 1), (1, 1, 1, −1,
−1, −1, 1, −1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1,
−1, 1, −1, 1, 1, 1, −1), (−1, 1, −1, 1, −1, 1, 1, −1), (−1, 1, 1, −1, −1, 1, −1, 1), (1, 1, 1, −1, −1, −1, 1, −1), (−1, 1, −1, −1, 1,
−1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1,
−1, 1, −1, 1, 1, −1), (−1, 1, 1, −1, −1, 1, −1, 1), (1, 1, 1, −1, −1, −1, 1, −1), (−1, 1, −1, −1, 1, −1, 1, 1), (1, −1, −1, −1, −1, 1, 1, 1),
(−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (−1, 1, 1,
−1, −1, 1, −1, 1), (1, 1, 1, −1, −1, −1, 1, −1), (−1, 1, −1, −1, 1, −1, 1, 1), (1, −1, −1, −1, −1, 1, 1, 1), (−1, −1, −1, −1, −1, −1, −1,
−1), (1, 1, −1, −1, 1, 1, −1, −1)}, {(−1, −1, 1, −1, 1, 1, 1, −1), (−1, 1, −1, 1, −1, 1, 1, −1), (−1, 1, 1, −1, −1, 1, −1, 1), (1, 1, 1,
−1, −1, −1, 1, −1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)},
{(−1, −1, 1, −1, 1, 1, 1, −1), (−1, 1, −1, 1, −1, 1, 1, −1), (−1, 1, 1, −1, −1, 1, −1, 1), (1, 1, 1, −1, −1, −1, 1, −1), (−1, 1, −1, −1, 1,
−1, 1, 1), (1, −1, −1, −1, −1, 1, 1, 1), (1, 1, −1, −1, 1, 1, −1, −1), (1, 1, 1, 1, 1, 1, 1, 1)}, {(−1, −1, 1, −1, 1, 1, 1, −1), (−1, 1,
−1, 1, −1, 1, 1, −1), (−1, 1, 1, −1, −1, 1, −1, 1), (1, 1, 1, −1, −1, −1, 1, −1), (−1, 1, 1, 1, 1, −1, −1, −1), (1, −1, 1, 1, −1, 1, −1, −1),
(−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (−1, 1, 1,
−1, −1, 1, −1, 1), (1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1,
−1), (1, 1, −1, −1, 1, 1, −1, −1)}, {(−1, −1, 1, −1, 1, 1, 1, −1), (−1, 1, −1, 1, −1, 1, 1, −1), (−1, 1, 1, −1, −1, 1, −1, 1), (1, 1, 1,
−1, −1, −1, 1, −1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)},
{(−1, −1, 1, −1, 1, 1, 1, −1), (−1, 1, −1, 1, −1, 1, 1, −1), (−1, 1, 1, −1, −1, 1, −1, 1), (1, 1, 1, −1, −1, −1, 1, −1), (−1, 1, 1, 1, 1, −1,
−1, −1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1,
−1, 1, −1, 1, 1, −1), (−1, 1, 1, −1, −1, 1, −1, 1), (1, 1, 1, −1, −1, −1, 1, −1), (1, −1, −1, −1, −1, 1, 1, 1), (1, −1, 1, 1, −1, 1, −1, −1),
(−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (−1, 1, 1,
−1, −1, 1, −1, 1), (1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1,
−1), (1, 1, −1, −1, 1, 1, −1, −1)}, {(−1, −1, 1, −1, 1, 1, 1, −1), (−1, 1, −1, 1, −1, 1, 1, −1), (−1, 1, 1, −1, −1, 1, −1, 1), (1, 1, 1,
−1, −1, −1, 1, −1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)},
{(−1, −1, 1, −1, 1, 1, 1, −1), (−1, 1, −1, 1, −1, 1, 1, −1), (−1, 1, 1, −1, −1, 1, −1, 1), (1, 1, 1, −1, −1, −1, 1, −1), (1, −1, −1, −1,
−1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1,
−1, 1, −1, 1, 1, −1), (1, −1, −1, 1, 1, −1, 1, −1), (1, 1, 1, −1, −1, −1, 1, −1), (−1, 1, −1, −1, 1, −1, 1, 1), (−1, 1, 1, 1, 1, −1, −1, −1),
(−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (1, −1,
−1, 1, 1, −1, 1, −1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1,
−1), (1, 1, −1, −1, 1, 1, −1, −1)}, {(−1, −1, 1, −1, 1, 1, 1, −1), (−1, 1, −1, 1, −1, 1, 1, −1), (1, −1, −1, 1, 1, −1, 1, −1), (1, 1, 1,
−1, −1, −1, 1, −1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)},
{(−1, −1, 1, −1, 1, 1, 1, −1), (−1, 1, −1, 1, −1, 1, 1, −1), (1, −1, −1, 1, 1, −1, 1, −1), (1, 1, 1, −1, −1, −1, 1, −1), (−1, 1, −1, −1, 1,
−1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1,
−1, 1, −1, 1, 1, −1), (1, −1, −1, 1, 1, −1, 1, −1), (1, 1, 1, −1, −1, −1, 1, −1), (−1, 1, −1, −1, 1, −1, 1, 1), (1, −1, −1, −1, −1, 1, 1, 1),
(−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (1, −1,
−1, 1, 1, −1, 1, −1), (1, 1, 1, −1, −1, −1, 1, −1), (−1, 1, −1, −1, 1, −1, 1, 1), (1, −1, −1, −1, −1, 1, 1, 1), (−1, −1, −1, −1, −1, −1, −1,
−1), (1, 1, −1, −1, 1, 1, −1, −1)}, {(−1, −1, 1, −1, 1, 1, 1, −1), (−1, 1, −1, 1, −1, 1, 1, −1), (1, −1, −1, 1, 1, −1, 1, −1), (1, 1, 1,
−1, −1, −1, 1, −1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)},
{(−1, −1, 1, −1, 1, 1, 1, −1), (−1, 1, −1, 1, −1, 1, 1, −1), (1, −1, −1, 1, 1, −1, 1, −1), (1, 1, 1, −1, −1, −1, 1, −1), (−1, 1, −1, −1, 1,
−1, 1, 1), (1, −1, −1, −1, −1, 1, 1, 1), (1, 1, −1, −1, 1, 1, −1, −1), (1, 1, 1, 1, 1, 1, 1, 1)}, {(−1, −1, 1, −1, 1, 1, 1, −1), (−1, 1,
−1, 1, −1, 1, 1, −1), (1, −1, −1, 1, 1, −1, 1, −1), (1, 1, 1, −1, −1, −1, 1, −1), (−1, 1, 1, 1, 1, −1, −1, −1), (1, −1, 1, 1, −1, 1, −1, −1),
(−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (1, −1,
−1, 1, 1, −1, 1, −1), (1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1,
−1), (1, 1, −1, −1, 1, 1, −1, −1)}, {(−1, −1, 1, −1, 1, 1, 1, −1), (−1, 1, −1, 1, −1, 1, 1, −1), (1, −1, −1, 1, 1, −1, 1, −1), (1, 1, 1,
−1, −1, −1, 1, −1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)},
{(−1, −1, 1, −1, 1, 1, 1, −1), (−1, 1, −1, 1, −1, 1, 1, −1), (1, −1, −1, 1, 1, −1, 1, −1), (1, 1, 1, −1, −1, −1, 1, −1), (−1, 1, 1, 1, 1, −1,
−1, −1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1,
−1, 1, −1, 1, 1, −1), (1, −1, −1, 1, 1, −1, 1, −1), (1, 1, 1, −1, −1, −1, 1, −1), (1, −1, −1, −1, −1, 1, 1, 1), (1, −1, 1, 1, −1, 1, −1, −1),
(−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (1, −1,
−1, 1, 1, −1, 1, −1), (1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1,
−1), (1, 1, −1, −1, 1, 1, −1, −1)}, {(−1, −1, 1, −1, 1, 1, 1, −1), (−1, 1, −1, 1, −1, 1, 1, −1), (1, −1, −1, 1, 1, −1, 1, −1), (1, 1, 1,
−1, −1, −1, 1, −1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)},
{(−1, −1, 1, −1, 1, 1, 1, −1), (−1, 1, −1, 1, −1, 1, 1, −1), (1, −1, −1, 1, 1, −1, 1, −1), (1, 1, 1, −1, −1, −1, 1, −1), (1, −1, −1, −1,
−1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1),
(−1, 1, 1, −1, −1, 1, −1, 1), (1, −1, 1, −1, 1, −1, −1, 1), (1, 1, 1, −1, −1, −1, 1, −1), (−1, 1, −1, −1, 1, −1, 1, 1), (−1, 1, 1, 1, 1, −1,
−1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, −1, −1, 1, −1, 1),
(1, −1, 1, −1, 1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, −1, −1,
−1, −1, −1, −1), (1, 1, −1, −1, 1, 1, −1, −1)}, {(−1, −1, 1, −1, 1, 1, 1, −1), (−1, 1, 1, −1, −1, 1, −1, 1), (1, −1, 1, −1, 1, −1, −1, 1),
(1, 1, 1, −1, −1, −1, 1, −1), (−1, 1, −1, −1, 1, −1, 1, 1), (−1, 1, 1, 1, 1, −1, −1, −1), (−1, −1, 1, 1, −1, −1, 1, 1),
(1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1,
−1, 1, −1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1,
−1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, −1, −1, 1,
−1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, 1, −1, 1, 1, 1, −1),
(−1, 1, 1, −1, −1, 1, −1, 1), (1, −1, 1, −1, 1, −1, −1, 1), (1, 1, 1, −1, −1, −1, 1, −1), (−1, 1, −1, −1, 1, −1, 1, 1), (1, −1, −1, −1,
−1, 1, 1, 1), (−1, −1, −1, −1, −1, −1, −1, −1), (1, 1, −1, −1, 1, 1, −1, −1)}, {(−1, −1, 1, −1, 1, 1, 1, −1), (−1, 1, 1, −1, −1, 1, −1, 1),
(1, −1, 1, −1, 1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, 1, 1, −1,
−1, 1, 1), (1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1,
−1, −1, −1, 1, −1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, TABLE 4-continued {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1, −1), (1, 1, −1, −1, 1, 1, −1, −1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1, −1), (1, 1, −1, −1, 1, 1, −1, −1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (−1, −1, 1, 1, −1, −1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (−1, −1, 1, 1, −1, −1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1, −1), (−1, −1, 1, 1, −1, −1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1, −1), (1, 1, −1, −1, 1, 1, −1, −1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, −1, −1, 1, −1, 1, 1), (1, −1, −1, −1, TABLE 4-continued −1, 1, 1, 1), (−1, −1, −1, −1, −1, −1, −1, −1), (1, 1, −1, −1, 1, 1, −1, −1)}, {(−1, −1, 1, −1, 1, 1, 1, −1), (1, −1, −1, 1, 1, −1, 1, −1),
(1, −1, 1, −1, 1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, 1, 1, −1,
−1, 1, 1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1,
−1, −1, −1, 1, −1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)},
{(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, 1, 1, 1, −1,
−1, −1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1),
(1, −1, −1, 1, 1, −1, 1, −1), (1, −1, 1, −1, 1, −1, −1, 1), (1, 1, 1, −1, −1, −1, 1, −1), (−1, 1, 1, 1, 1, −1, −1, −1), (1, −1, 1, 1, −1, 1,
−1, −1), (−1, −1, −1, −1, −1, −1, −1, −1), (1, 1, −1, −1, 1, 1, −1, −1)}, {(−1, −1, 1, −1, 1, 1, 1, −1), (1, −1, −1, 1, 1, −1, 1, −1),
(1, −1, 1, −1, 1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, 1, 1, −1,
−1, 1, 1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1,
−1, −1, −1, 1, −1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)},
{(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (1, −1, −1, −1,
−1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1),
(1, −1, −1, 1, 1, −1, 1, −1), (1, −1, 1, −1, 1, −1, −1, 1), (1, 1, 1, −1, −1, −1, 1, −1), (1, −1, −1, −1, −1, 1, 1, 1), (1, −1, 1, 1, −1, 1,
−1, −1), (−1, −1, −1, −1, −1, −1, −1, −1), (1, 1, −1, −1, 1, 1, −1, −1)}, {(−1, −1, 1, −1, 1, 1, 1, −1), (1, −1, −1, 1, 1, −1, 1, −1),
(1, −1, 1, −1, 1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, 1, 1, −1,
−1, 1, 1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1,
−1, −1, −1, 1, −1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)},
{(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (−1, −1, −1,
−1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, −1, 1,
−1, 1), (−1, −1, 1, 1, 1, −1, 1, −1), (−1, 1, −1, 1, −1, −1, 1, 1), (−1, 1, −1, 1, 1, 1, −1, −1), (−1, −1, −1, −1, 1, 1, 1, 1), (−1, 1, 1,
−1, 1, −1, −1, 1), (−1, −1, −1, −1, −1, −1, −1, −1), (1, −1, −1, 1, 1, −1, −1, 1)}, {(−1, −1, 1, 1, −1, 1, −1, 1), (−1, −1, 1, 1, 1, −1, 1,
−1), (−1, 1, −1, 1, −1, −1, 1, 1), (−1, 1, −1, 1, 1, 1, −1, −1), (−1, −1, −1, −1, 1, 1, 1, 1), (−1, 1, 1, −1, 1, −1, −1, 1), (−1, 1, 1, −1,
−1, 1, 1, −1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1),
(−1, 1, −1, 1, 1, 1, −1, −1), (−1, −1, −1, −1, 1, 1, 1, 1), (−1, 1, 1, −1, 1, −1, −1, 1), (1, −1, −1, 1, 1, −1, −1, 1),
(1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1,
−1, −1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1, −1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (−1, −1, −1,
−1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, −1, 1,
−1, 1), (−1, −1, 1, 1, 1, −1, 1, −1), (−1, 1, −1, 1, −1, −1, 1, 1), (−1, 1, −1, 1, 1, 1, −1, −1), (−1, −1, −1, −1, 1, 1, 1, 1), (1, −1,
−1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1),
(−1, 1, −1, 1, −1, −1, 1, 1), (−1, 1, −1, 1, 1, 1, −1, −1), (−1, −1, −1, −1, 1, 1, 1, 1), (1, −1, −1, 1, −1, 1, 1, −1), (1, −1, −1, 1, 1,
−1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (−1, 1,
−1, 1, 1, 1, −1, −1), (−1, 1, 1, −1, 1, −1, −1, 1), (1, 1, 1, 1, −1, −1, −1, −1), (−1, −1, −1, −1, −1, −1, −1, −1), (−1, 1, 1, −1, −1, 1, 1,
−1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (−1, 1, 1,
−1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, −1, 1,
−1, 1), (−1, −1, 1, 1, 1, −1, 1, −1), (−1, 1, −1, 1, −1, −1, 1, 1), (−1, 1, −1, 1, 1, 1, −1, −1), (−1, 1, 1, −1, 1, −1, −1, 1), (1, 1, 1, 1,
−1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1),
(−1, 1, −1, 1, −1, −1, 1, 1), (−1, 1, −1, 1, 1, 1, −1, −1), (−1, 1, 1, −1, 1, −1, −1, 1), (1, 1, 1, 1, −1, −1, −1, −1), (1, −1, −1, 1, 1, −1,
−1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (−1, 1,
−1, 1, 1, 1, −1, −1), (1, −1, −1, 1, −1, 1, 1, −1), (1, 1, 1, 1, −1, −1, −1, −1), (−1, −1, −1, −1, −1, −1, −1, −1), (−1, 1, 1, −1, −1, 1, 1,
−1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (1, −1,
−1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, −1, 1,
−1, 1), (−1, −1, 1, 1, 1, −1, 1, −1), (−1, 1, −1, 1, −1, −1, 1, 1), (−1, 1, −1, 1, 1, 1, −1, −1), (1, −1, −1, 1, −1, 1, 1, −1), (1, 1, 1, 1,
−1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1),
(−1, 1, −1, 1, −1, −1, 1, 1), (−1, 1, −1, 1, 1, 1, −1, −1), (1, −1, −1, 1, −1, 1, 1, −1), (1, 1, 1, 1, −1, −1, −1, −1), (1, −1, −1, 1, 1, −1,
−1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (1, −1, 1,
−1, −1, −1, 1, 1), (−1, −1, −1, −1, 1, 1, 1, 1), (−1, 1, 1, −1, 1, −1, −1, 1), (−1, −1, −1, −1, −1, −1, −1, −1), (−1, 1, 1, −1, −1, 1, 1,
−1)}, {(−1, −1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1), (−1, −1,
−1, −1, 1, 1, 1, 1), (−1, 1, 1, −1, 1, −1, −1, 1), (−1, −1, −1, −1, −1, −1, −1, −1), (1, −1, −1, 1, 1, −1, −1, 1)}, {(−1, −1, 1, 1, −1, 1,
−1, 1), (−1, −1, 1, 1, 1, −1, 1, −1), (−1, 1, −1, 1, −1, −1, 1, 1), (1, −1, 1, −1, −1, −1, 1, 1), (−1, −1, −1, −1, 1, 1, 1, 1), (−1, 1, 1,
−1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1),
(−1, 1, −1, 1, −1, −1, 1, 1), (1, −1, 1, −1, −1, −1, 1, 1), (−1, −1, −1, −1, 1, 1, 1, 1), (−1, 1, 1, −1, 1, −1, −1, 1), (1, −1, −1, 1, 1, −1,
−1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (1, −1, 1,
−1, −1, −1, 1, 1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1,
−1)}, {(−1, −1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1), (−1, −1,
−1, −1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, −1, 1,
−1, 1), (−1, −1, 1, 1, 1, −1, 1, −1), (−1, 1, −1, 1, −1, −1, 1, 1), (1, −1, 1, −1, −1, −1, 1, 1), (−1, −1, −1, −1, 1, 1, 1, 1), (1, −1,
−1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1),
(−1, 1, −1, 1, −1, −1, 1, 1), (1, −1, 1, −1, −1, −1, 1, 1), (−1, −1, −1, −1, 1, 1, 1, 1), (1, −1, −1, 1, −1, 1, 1, −1), (1, −1, −1, 1, 1,
−1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (1,
−1, 1, −1, −1, −1, 1, 1), (−1, 1, 1, −1, 1, −1, −1, 1), (1, 1, 1, 1, −1, −1, −1, −1), (−1, −1, −1, −1, −1, −1, −1, −1), (−1, 1, 1, −1,
−1, 1, 1, −1)}, {(−1, −1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1),
(−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1,
−1, 1, −1, 1), (−1, −1, 1, 1, 1, −1, 1, −1), (−1, 1, −1, 1, −1, −1, 1, 1), (1, −1, 1, −1, −1, −1, 1, 1), (−1, 1, 1, −1, 1, −1, −1, 1),
(1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1,
−1, 1, −1), (−1, 1, −1, 1, −1, −1, 1, 1), (1, −1, 1, −1, −1, −1, 1, 1), (−1, 1, 1, −1, 1, −1, −1, 1), (1, 1, 1, 1, −1, −1, −1, −1), (1, −1,
−1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1),
(1, −1, 1, −1, −1, −1, 1, 1), (1, −1, −1, 1, −1, 1, 1, −1), (1, 1, 1, 1, −1, −1, −1, −1), (−1, −1, −1, −1, −1, −1, −1, −1), (−1, 1, 1, −1,
−1, 1, 1, −1)}, {(−1, −1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1),
(1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1,
−1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1), (1, −1, −1, 1, −1, 1, 1,
−1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1,
−1, 1, 1, 1, −1, 1, −1), (−1, 1, −1, 1, −1, −1, 1, 1), (1, −1, 1, −1, −1, −1, 1, 1), (1, −1, −1, 1, −1, 1, 1, −1), (1, 1, 1, 1, −1, −1, −1,
−1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1,
−1, 1, 1, 1, −1, −1), (1, −1, 1, −1, 1, 1, −1, −1), (−1, −1, −1, −1, 1, 1, 1, 1), (−1, 1, 1, −1, 1, −1, −1, 1), (−1, −1, −1, −1, −1, −1, −1,
−1), (−1, 1, 1, −1, −1, 1, 1, −1)}, {(−1, −1, 1, 1, −1, 1, −1, 1), (−1, −1, 1, 1, 1, −1, 1, −1), (−1, 1, −1, 1, 1, 1, −1, −1), (1, −1, 1,
−1, 1, 1, −1, −1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1, −1,
−1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1), (−1, −1,
−1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1), TABLE 4-continued (−1, −1, 1, 1, 1, −1, 1, −1), (−1, 1, −1, 1, 1, 1, −1, −1), (1, −1, 1, −1, 1, 1, −1, −1), (−1, −1, −1, −1, 1, 1, 1, 1), (−1, 1, 1, −1, 1, −1,
−1, 1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1,
−1, 1, 1, 1, −1, −1), (1, −1, 1, −1, 1, 1, −1, −1), (−1, −1, −1, −1, 1, 1, 1, 1), (1, −1, −1, 1, −1, 1, 1, −1), (−1, −1, −1, −1, −1, −1, −1,
−1), (−1, 1, 1, −1, −1, 1, 1, −1)}, {(−1, −1, 1, 1, −1, 1, −1, 1), (−1, −1, 1, 1, 1, −1, 1, −1), (−1, 1, −1, 1, 1, 1, −1, −1), (1, −1, 1,
−1, 1, 1, −1, −1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1,
−1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1), (−1, −1,
−1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1),
(−1, −1, 1, 1, 1, −1, 1, −1), (−1, 1, −1, 1, 1, 1, −1, −1), (1, −1, 1, −1, 1, 1, −1, −1), (−1, −1, −1, −1, 1, 1, 1, 1), (1, −1, −1, 1,
−1, 1, 1, −1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1),
(−1, 1, −1, 1, 1, 1, −1, −1), (1, −1, 1, −1, 1, 1, −1, −1), (−1, 1, 1, −1, 1, −1, −1, 1), (1, 1, 1, 1, −1, −1, −1, −1), (−1, −1, −1, −1, −1,
−1, −1, −1), (−1, 1, 1, −1, −1, 1, 1, −1)}, {(−1, −1, 1, 1, −1, 1, −1, 1), (−1, −1, 1, 1, 1, −1, 1, −1), (−1, 1, −1, 1, 1, 1, −1, −1), (1,
−1, 1, −1, 1, 1, −1, −1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1,
−1, −1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1),
(−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1,
−1, 1), (−1, −1, 1, 1, 1, −1, 1, −1), (−1, 1, −1, 1, 1, 1, −1, −1), (1, −1, 1, −1, 1, 1, −1, −1), (−1, 1, 1, −1, 1, −1, −1, 1), (1, 1, 1, 1,
−1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1),
(−1, 1, −1, 1, 1, 1, −1, −1), (1, −1, 1, −1, 1, 1, −1, −1), (1, −1, −1, 1, −1, 1, 1, −1), (1, 1, 1, 1, −1, −1, −1, −1), (−1, −1, −1, −1, −1,
−1, −1, −1), (−1, 1, 1, −1, −1, 1, 1, −1)}, {(−1, −1, 1, 1, −1, 1, −1, 1), (−1, −1, 1, 1, 1, −1, 1, −1), (−1, 1, −1, 1, 1, 1, −1, −1), (1,
−1, 1, −1, 1, 1, −1, −1), (1, −1, −1, 1, −1, 1, 1, −1), (1, 1, 1, 1, −1, −1, −1, −1), (−1, −1, −1, −1, −1, −1, −1, −1), (1, −1, −1, 1, 1,
−1, −1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1), (1,
−1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1,
−1, 1), (−1, −1, 1, 1, 1, −1, 1, −1), (−1, 1, −1, 1, 1, 1, −1, −1), (1, −1, 1, −1, 1, 1, −1, −1), (1, −1, −1, 1, −1, 1, 1, −1), (1, 1, 1, 1,
−1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (1,
−1, 1, −1, −1, −1, 1, 1), (1, −1, 1, −1, 1, 1, −1, −1), (−1, −1, −1, −1, 1, 1, 1, 1), (−1, 1, 1, −1, 1, −1, −1, 1), (−1, −1, −1, −1, −1, −1,
−1, −1), (−1, 1, 1, −1, −1, 1, 1, −1)}, {(−1, −1, 1, 1, −1, 1, −1, 1), (−1, −1, 1, 1, 1, −1, 1, −1), (1, −1, 1, −1, −1, −1, 1, 1), (1,
−1, 1, −1, 1, 1, −1, −1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1,
−1, −1, 1)}, {(−1, −1, 1, 1, −1, 1, −1, 1), (−1, −1, 1, 1, 1, −1, 1, −1), (1, −1, 1, −1, −1, −1, 1, 1), (1, −1, 1, −1, 1, 1, −1, −1), (−1,
−1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1),
(−1, −1, 1, 1, 1, −1, 1, −1), (1, −1, 1, −1, −1, −1, 1, 1), (1, −1, 1, −1, 1, 1, −1, −1), (−1, −1, −1, −1, 1, 1, 1, 1), (−1, 1, 1, −1, 1,
−1, −1, 1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (1,
−1, 1, −1, −1, −1, 1, 1), (1, −1, 1, −1, 1, 1, −1, −1), (−1, −1, −1, −1, 1, 1, 1, 1), (1, −1, −1, 1, −1, 1, 1, −1), (−1, −1, −1, −1, −1, −1,
−1, −1), (−1, 1, 1, −1, −1, 1, 1, −1)}, {(−1, −1, 1, 1, −1, 1, −1, 1), (−1, −1, 1, 1, 1, −1, 1, −1), (1, −1, 1, −1, −1, −1, 1, 1), (1,
−1, 1, −1, 1, 1, −1, −1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1,
−1, −1, 1)}, {(−1, −1, 1, 1, −1, 1, −1, 1), (−1, −1, 1, 1, 1, −1, 1, −1), (1, −1, 1, −1, −1, −1, 1, 1), (1, −1, 1, −1, 1, 1, −1, −1), (−1,
−1, −1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1),
(−1, −1, 1, 1, 1, −1, 1, −1), (1, −1, 1, −1, −1, −1, 1, 1), (1, −1, 1, −1, 1, 1, −1, −1), (−1, −1, −1, −1, 1, 1, 1, 1), (1, −1, −1, 1,
−1, 1, 1, −1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (1,
−1, 1, −1, −1, −1, 1, 1), (1, −1, 1, −1, 1, 1, −1, −1), (−1, 1, 1, −1, 1, −1, −1, 1), (1, 1, 1, 1, −1, −1, −1, −1), (−1, −1, −1, −1, −1, −1,
−1, −1), (−1, 1, 1, −1, −1, 1, 1, −1)}, {(−1, −1, 1, 1, −1, 1, −1, 1), (−1, −1, 1, 1, 1, −1, 1, −1), (1, −1, 1, −1, −1, −1, 1, 1), (1,
−1, 1, −1, 1, 1, −1, −1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1,
−1, −1, 1)}, {(−1, −1, 1, 1, −1, 1, −1, 1), (−1, −1, 1, 1, 1, −1, 1, −1), (1, −1, 1, −1, −1, −1, 1, 1), (1, −1, 1, −1, 1, 1, −1, −1),
(−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1,
−1, 1), (−1, −1, 1, 1, 1, −1, 1, −1), (1, −1, 1, −1, −1, −1, 1, 1), (1, −1, 1, −1, 1, 1, −1, −1), (−1, 1, 1, −1, 1, −1, −1, 1), (1, 1, 1, 1,
−1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (1,
−1, 1, −1, −1, −1, 1, 1), (1, −1, 1, −1, 1, 1, −1, −1), (1, −1, −1, 1, −1, 1, 1, −1), (1, 1, 1, 1, −1, −1, −1, −1), (−1, −1, −1, −1, −1, −1,
−1, −1), (−1, 1, 1, −1, −1, 1, 1, −1)}, {(−1, −1, 1, 1, −1, 1, −1, 1), (−1, −1, 1, 1, 1, −1, 1, −1), (1, −1, 1, −1, −1, −1, 1, 1), (1,
−1, 1, −1, 1, 1, −1, −1), (1, −1, −1, 1, −1, 1, 1, −1), (1, 1, 1, 1, −1, −1, −1, −1), (−1, −1, −1, −1, −1, −1, −1, −1), (1, −1, −1, 1, 1,
−1, −1, 1)}, {(−1, −1, 1, 1, −1, 1, −1, 1), (−1, −1, 1, 1, 1, −1, 1, −1), (1, −1, 1, −1, −1, −1, 1, 1), (1, −1, 1, −1, 1, 1, −1, −1), (1,
−1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1,
−1, 1), (−1, −1, 1, 1, 1, −1, 1, −1), (1, −1, 1, −1, −1, −1, 1, 1), (1, −1, 1, −1, 1, 1, −1, −1), (1, −1, −1, 1, −1, 1, 1, −1), (1, 1, 1, 1,
−1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, −1, 1, 1, −1, 1),
(−1, 1, −1, 1, −1, −1, 1, 1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1,
−1, −1, −1), (−1, 1, 1, −1, −1, 1, 1, −1)}, {(−1, −1, 1, 1, −1, 1, −1, 1), (−1, 1, −1, −1, 1, 1, −1, 1), (−1, 1, −1, 1, −1, −1, 1, 1),
(1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1,
−1, 1, 1, −1, −1, 1)}, {(−1, −1, 1, 1, −1, 1, −1, 1), (−1, 1, −1, −1, 1, 1, −1, 1), (−1, 1, −1, 1, −1, −1, 1, 1), (1, 1, −1, 1, −1, 1, −1,
−1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, 1,
−1, 1, −1, 1), (−1, 1, −1, −1, 1, 1, −1, 1), (−1, 1, −1, 1, −1, −1, 1, 1), (1, 1, −1, 1, −1, 1, −1, −1), (−1, −1, −1, 1, 1, 1, 1, −1),
(−1, 1, 1, 1, 1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, −1, 1, 1,
−1, 1), (−1, 1, −1, 1, −1, −1, 1, 1), (1, 1, −1, 1, −1, 1, −1, −1), (−1, −1, −1, 1, 1, 1, 1, −1), (1, −1, −1, −1, −1, 1, 1, 1), (−1, −1, −1,
−1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1), (−1, 1, −1, 1, −1,
−1, 1, 1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (1,
−1, −1, 1, 1, −1, −1, 1)}, {(−1, −1, 1, 1, −1, 1, −1, 1), (−1, 1, −1, −1, 1, 1, −1, 1), (−1, 1, −1, 1, −1, −1, 1, 1), (1, 1, −1, 1, −1, 1,
−1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1,
−1, 1, 1, −1, 1, −1, 1), (−1, 1, −1, −1, 1, 1, −1, 1), (−1, 1, −1, 1, −1, −1, 1, 1), (1, 1, −1, 1, −1, 1, −1, −1), (−1, −1, −1, 1, 1, 1, 1,
−1), (1, −1, −1, −1, −1, 1, 1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1,
−1, 1, 1, −1, 1), (−1, 1, −1, 1, −1, −1, 1, 1), (1, 1, −1, 1, −1, 1, −1, −1), (−1, 1, 1, 1, 1, −1, −1, −1), (1, 1, 1, −1, −1, −1, −1, 1),
(−1, −1, −1, −1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1), (−1, 1, −1, 1,
−1, −1, 1, 1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1),
(1, −1, −1, 1, 1, −1, −1, 1)}, {(−1, −1, 1, 1, −1, 1, −1, 1), (−1, 1, −1, −1, 1, 1, −1, 1), (−1, 1, −1, 1, −1, −1, 1, 1), (1, 1, −1, 1,
−1, 1, −1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1,
−1, 1, 1, −1, 1, −1, 1), (−1, 1, −1, −1, 1, 1, −1, 1), (−1, 1, −1, 1, −1, −1, 1, 1), (1, 1, −1, 1, −1, 1, −1, −1), (−1, 1, 1, 1, 1, −1, −1,
−1), (1, 1, 1, −1, −1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1,
−1, 1, 1, −1, 1), (−1, 1, −1, 1, −1, −1, 1, 1), (1, 1, −1, 1, −1, 1, −1, −1), (1, −1, −1, −1, −1, 1, 1, 1), (1, 1, 1, −1, −1, −1, −1, 1),
(−1, −1, −1, −1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1), (−1, 1, −1, 1,
−1, −1, 1, 1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1),
(1, −1, −1, 1, 1, −1, −1, 1)}, {(−1, −1, 1, 1, −1, 1, −1, 1), (−1, 1, −1, −1, 1, 1, −1, 1), (−1, 1, −1, 1, −1, −1, 1, 1), (1, 1, −1, 1,
−1, 1, −1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1,
−1, 1, 1, −1, 1, −1, 1), (−1, 1, −1, −1, 1, 1, −1, 1), (−1, 1, −1, 1, −1, −1, 1, 1), (1, 1, −1, 1, −1, 1, −1, −1), (1, −1, −1, −1,
−1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1,
−1, −1, 1, 1, −1, 1), (1, −1, 1, −1, 1, 1, −1, −1), (1, 1, −1, 1, −1, 1, −1, −1), (−1, −1, −1, 1, 1, 1, 1, −1), (−1, 1, 1, 1, 1, −1, −1, −1), TABLE 4-continued (−1, −1, −1, −1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1), (1, −1, 1,
−1, 1, 1, −1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1,
−1), (1, −1, −1, 1, 1, −1, −1, 1)}, {(−1, −1, 1, 1, −1, 1, −1, 1), (−1, 1, −1, −1, 1, 1, −1, 1), (1, −1, 1, −1, 1, 1, −1, −1), (1, 1,
−1, 1, −1, 1, −1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)},
{(−1, −1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (−1, −1,
−1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, −1, 1, 1, −1, 1, −1, 1),
(−1, 1, −1, −1, 1, 1, −1, 1), (1, −1, 1, −1, 1, 1, −1, −1), (1, 1, −1, 1, −1, 1, −1, −1), (−1, −1, −1, 1, 1, 1, 1, −1), (1, −1, −1, −1,
−1, 1, 1, 1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1),
(1, −1, 1, −1, 1, 1, −1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1,
−1, −1, −1, −1), (1, −1, −1, 1, 1, −1, −1, 1)}, {(−1, −1, 1, 1, −1, 1, −1, 1), (−1, 1, −1, −1, 1, 1, −1, 1), (1, −1, 1, −1, 1, 1, −1, −1),
(1, 1, −1, 1, −1, 1, −1, −1), (−1, −1, −1, 1, 1, 1, 1, −1), (1, −1, −1, −1, −1, 1, 1, 1), (−1, 1, 1, −1, −1, 1, 1, −1),
(1, 1, 1, 1, 1, 1, 1, 1)}, {(−1, −1, 1, 1, −1, 1, −1, 1), (−1, 1, −1, −1, 1, 1, −1, 1), (1, −1, 1, −1, 1, 1, −1, −1), (1, 1, −1, 1, −1, 1,
−1, −1), (−1, −1, −1, 1, 1, 1, 1, −1), (1, −1, −1, −1, −1, 1, 1, 1), (1, −1, −1, 1, 1, −1, −1, 1), (1, 1, 1, 1, 1, 1, 1, 1)}, {(−1,
−1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (−1, 1, 1, 1, 1, −1, −1,
−1), (1, 1, 1, −1, −1, −1, −1, 1), (−1, −1, −1, −1, −1, −1, −1, −1), (−1, 1, 1, −1, −1, 1, 1, −1)}, {(−1, −1, 1, 1, −1, 1, −1, 1),
(−1, 1, −1, −1, 1, 1, −1, 1), (1, −1, 1, −1, 1, 1, −1, −1), (1, 1, −1, 1, −1, 1, −1, −1), (−1, 1, 1, 1, 1, −1, −1, −1), (1, 1, 1, −1, −1, −1,
−1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, −1, 1, 1, −1, 1), (1,
−1, 1, −1, 1, 1, −1, −1), (1, 1, −1, 1, −1, 1, −1, −1), (−1, 1, 1, 1, 1, −1, −1, −1), (1, 1, 1, −1, −1, −1, −1, 1), (−1, 1, 1, −1, −1, 1, 1,
−1), (1, 1, 1, 1, 1, 1, 1, 1)}, {(−1, −1, 1, 1, −1, 1, −1, 1), (−1, 1, −1, −1, 1, 1, −1, 1), (1, −1, 1, −1, 1, 1, −1, −1), (1, 1, −1, 1,
−1, 1, −1, −1), (−1, 1, 1, 1, 1, −1, −1, −1), (1, 1, 1, −1, −1, −1, −1, 1), (1, −1, −1, 1, 1, −1, −1, 1), (1, 1, 1, 1, 1, 1, 1, 1)}, {(−1,
−1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (1, −1, −1, −1,
−1, 1, 1, 1), (1, 1, 1, −1, −1, −1, −1, 1), (−1, −1, −1, −1, −1, −1, −1, −1), (−1, 1, 1, −1, −1, 1, 1, −1)}, {(−1, −1, 1, 1, −1, 1, −1, 1),
(−1, 1, −1, −1, 1, 1, −1, 1), (1, −1, 1, −1, 1, 1, −1, −1), (1, 1, −1, 1, −1, 1, −1, −1), (1, −1, −1, −1, −1, 1, 1, 1), (1, 1, 1, −1, −1,
−1, −1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, −1, 1, 1, −1, 1),
(1, −1, 1, −1, 1, 1, −1, −1), (1, 1, −1, 1, −1, 1, −1, −1), (1, −1, −1, −1, −1, 1, 1, 1), (1, 1, 1, −1, −1, −1, −1, 1), (−1, 1, 1, −1,
−1, 1, 1, −1), (1, 1, 1, 1, 1, 1, 1, 1)}, {(−1, −1, 1, 1, −1, 1, −1, 1), (−1, 1, −1, −1, 1, 1, −1, 1), (1, −1, 1, −1, 1, 1, −1, −1), (1, 1,
−1, 1, −1, 1, −1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)},
{(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1), (−1, −1, −1,
−1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, −1, 1,
−1, 1), (−1, 1, −1, 1, −1, −1, 1, 1), (−1, 1, −1, 1, 1, 1, −1, −1), (1, 1, −1, −1, −1, 1, −1, 1), (−1, −1, −1, −1, 1, 1, 1, 1), (−1, 1, 1,
−1, 1, −1, −1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, −1,
−1, 1, 1), (−1, 1, −1, 1, 1, 1, −1, −1), (1, 1, −1, −1, −1, 1, −1, 1), (−1, −1, −1, −1, 1, 1, 1, 1), (−1, 1, 1, −1, 1, −1, −1, 1),
(−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (−1, 1, −1, 1, 1, 1, −1,
−1), (1, 1, −1, −1, −1, 1, −1, 1), (−1, −1, −1, −1, 1, 1, 1, 1), (−1, 1, 1, −1, 1, −1, −1, 1), (1, −1, −1, 1, 1, −1, −1, 1),
(1, 1, 1, 1, 1, 1, 1, 1)}, {(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1,
−1, 1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1, −1)},
{(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1), (−1, −1, −1,
−1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, −1, 1,
−1, 1), (−1, 1, −1, 1, −1, −1, 1, 1), (−1, 1, −1, 1, 1, 1, −1, −1), (1, 1, −1, −1, −1, 1, −1, 1), (−1, −1, −1, −1, 1, 1, 1, 1), (1, −1,
−1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1),
(−1, 1, −1, 1, 1, 1, −1, −1), (1, 1, −1, −1, −1, 1, −1, 1), (−1, −1, −1, −1, 1, 1, 1, 1), (1, −1, −1, 1, −1, 1, 1, −1), (1, −1, −1, 1, 1,
−1, −1, 1), (1, 1, 1, 1, 1, 1, 1, 1)}, {(−1, −1, 1, 1, −1, 1, −1, 1), (−1, 1, −1, 1, −1, −1, 1, 1), (−1, 1, −1, 1, 1, 1, −1, −1), (1, 1,
−1, −1, −1, 1, −1, 1), (−1, 1, 1, −1, 1, −1, −1, 1), (1, 1, 1, 1, −1, −1, −1, −1), (−1, −1, −1, −1, −1, −1, −1, −1), (−1, 1, 1, −1,
−1, 1, 1, −1)}, {(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1),
(−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1,
−1, 1, −1, 1), (−1, 1, −1, 1, −1, −1, 1, 1), (−1, 1, −1, 1, 1, 1, −1, −1), (1, 1, −1, −1, −1, 1, −1, 1), (−1, 1, 1, −1, 1, −1, −1, 1),
(1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1,
−1, 1, 1), (−1, 1, −1, 1, 1, 1, −1, −1), (1, 1, −1, −1, −1, 1, −1, 1), (−1, 1, 1, −1, 1, −1, −1, 1), (1, 1, 1, 1, −1, −1, −1, −1), (1, −1,
−1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (−1, 1, −1, 1, 1, 1, −1, −1),
(1, 1, −1, −1, −1, 1, −1, 1), (1, −1, −1, 1, −1, 1, 1, −1), (1, 1, 1, 1, −1, −1, −1, −1), (−1, −1, −1, −1, −1, −1, −1, −1), (−1, 1, 1, −1,
−1, 1, 1, −1)}, {(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1),
(1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1,
−1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1), (1, −1, −1, 1, −1, 1, 1,
−1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1,
−1, −1, 1, 1), (−1, 1, −1, 1, 1, 1, −1, −1), (1, 1, −1, −1, −1, 1, −1, 1), (1, −1, −1, 1, −1, 1, 1, −1), (1, 1, 1, 1, −1, −1, −1, −1), (1,
−1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1, −1, 1, −1, −1,
−1, 1, 1), (1, 1, −1, −1, −1, 1, −1, 1), (−1, −1, −1, −1, 1, 1, 1, 1), (−1, 1, 1, −1, 1, −1, −1, 1), (−1, −1, −1, −1, −1, −1, −1, −1),
(−1, 1, 1, −1, −1, 1, 1, −1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1,
−1, 1, −1, 1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1, −1, −1, 1)},
{(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1), (−1, −1, −1,
−1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1),
(−1, 1, −1, 1, −1, −1, 1, 1), (1, −1, 1, −1, −1, −1, 1, 1), (1, 1, −1, −1, −1, 1, −1, 1), (−1, −1, −1, −1, 1, 1, 1, 1), (−1, 1, 1, −1, 1, −1,
−1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1, −1, 1,
−1, −1, −1, 1, 1), (1, 1, −1, −1, −1, 1, −1, 1), (−1, −1, −1, −1, 1, 1, 1, 1), (1, −1, −1, 1, −1, 1, 1, −1), (−1, −1, −1, −1, −1, −1, −1,
−1), (−1, 1, 1, −1, −1, 1, 1, −1)}, {(−1, −1, 1, 1, −1, 1, −1, 1), (−1, 1, −1, 1, −1, −1, 1, 1), (1, −1, 1, −1, −1, −1, 1, 1), (1, 1, −1,
−1, −1, 1, −1, 1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1,
−1, 1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1), (−1, −1,
−1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1),
(−1, 1, −1, 1, −1, −1, 1, 1), (1, −1, 1, −1, −1, −1, 1, 1), (1, 1, −1, −1, −1, 1, −1, 1), (−1, −1, −1, −1, 1, 1, 1, 1), (1, −1, −1, 1,
−1, 1, 1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1,
−1, 1, −1, −1, −1, 1, 1), (1, 1, −1, −1, −1, 1, −1, 1), (−1, 1, 1, −1, 1, −1, −1, 1), (1, 1, 1, 1, −1, −1, −1, −1), (−1, −1, −1, −1, −1, −1,
−1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, −1, −1, −1, 1, 1), (1, 1,
−1, −1, −1, 1, −1, 1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1,
−1, 1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1),
(−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1,
−1, 1), (−1, 1, −1, 1, −1, −1, 1, 1), (1, −1, 1, −1, −1, −1, 1, 1), (1, 1, −1, −1, −1, 1, −1, 1), (−1, 1, 1, −1, 1, −1, −1, 1), (1, 1, 1, 1,
−1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1,
−1, 1, −1, −1, −1, 1, 1), (1, 1, −1, −1, −1, 1, −1, 1), (1, −1, −1, 1, −1, 1, 1, −1), (1, 1, 1, 1, −1, −1, −1, −1), (−1, −1, −1, −1, −1, −1,
−1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, −1, −1, −1, 1, 1), (1, 1,
−1, −1, −1, 1, −1, 1), (1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, TABLE 4-continued −1, 1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1), (1, −1, −1, 1, −1, 1, 1, −1), (1, 1, 1, 1, −1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1, −1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1, −1, 1, 1, 1, 1, −1), (1, −1, −1, −1, −1, 1, 1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, 1, 1, 1, 1, −1, −1, −1), (1, 1, 1, −1, −1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1, −1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1, −1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1, −1, 1, 1, 1, 1), (1, −1, −1, 1, −1, 1, 1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (1, −1, −1, 1, −1, 1, 1, −1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (1, −1, −1, 1, −1, 1, 1, −1), (1, 1, 1, 1, −1, −1, −1, −1), (1, −1, −1, 1, 1, −1, −1, 1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, −1, −1, −1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1, −1, −1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, −1, −1, −1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1, −1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, −1, −1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, −1, −1, −1, 1, 1, 1, 1), (1, −1, −1, 1, −1, 1, 1, −1), (1, −1, −1, 1, 1, −1, −1, 1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (1, −1, 1, −1, −1, TABLE 4-continued −1, 1, 1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (1, −1,
−1, 1, 1, −1, −1, 1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1, −1),
(1, 1, −1, −1, −1, 1, −1, 1), (1, −1, −1, 1, −1, 1, 1, −1), (1, 1, 1, 1, −1, −1, −1, −1), (−1, −1, −1, −1, −1, −1, −1, −1), (−1, 1, 1, −1,
−1, 1, 1, −1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1),
(1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1,
−1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (1, −1, −1, 1, −1, 1, 1,
−1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (1, −1, 1, −1,
−1, −1, 1, 1), (1, −1, 1, −1, 1, 1, −1, −1), (1, 1, −1, −1, −1, 1, −1, 1), (1, −1, −1, 1, −1, 1, 1, −1), (1, 1, 1, 1, −1, −1, −1, −1), (1,
−1, −1, 1, 1, −1, −1, 1), (1, 1, 1, 1, 1, 1, 1, 1)}, {(−1, −1, 1, 1, −1, 1, −1, 1), (1, −1, 1, −1, 1, 1, −1, −1), (1, −1, 1, 1, −1, −1, 1,
−1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (−1, 1, 1,
−1, −1, 1, 1, −1)}, {(−1, −1, 1, 1, −1, 1, −1, 1), (1, −1, 1, −1, 1, 1, −1, −1), (1, −1, 1, 1, −1, −1, 1, −1), (1, 1, −1, 1, −1, 1, −1, −1),
(−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1,
−1, 1, 1, −1, 1, −1, 1), (1, −1, 1, −1, 1, 1, −1, −1), (1, −1, 1, 1, −1, −1, 1, −1), (1, 1, −1, 1, −1, 1, −1, −1), (−1, −1, −1, 1, 1, 1, 1,
−1), (−1, 1, 1, 1, 1, −1, −1, −1), (−1, 1, 1, −1, −1, 1, 1, −1), (1, 1, 1, 1, 1, 1, 1, 1)}, {(−1, −1, 1, 1, −1, 1, −1, 1), (1, −1, 1,
−1, 1, 1, −1, −1), (1, −1, 1, 1, −1, −1, 1, −1), (1, 1, −1, 1, −1, 1, −1, −1), (−1, −1, −1, 1, 1, 1, 1, −1), (−1, 1, 1, 1, 1, −1, −1, −1),
(1, −1, −1, 1, 1, −1, −1, 1), (1, 1, 1, 1, 1, 1, 1, 1)}, {(−1, −1, 1, 1, −1, 1, −1, 1), (1, −1, 1, −1, 1, 1, −1, −1), (1, −1, 1, 1, −1,
−1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1),
(−1, 1, 1, −1, −1, 1, 1, −1)}, {(−1, −1, 1, 1, −1, 1, −1, 1), (1, −1, 1, −1, 1, 1, −1, −1), (1, −1, 1, 1, −1, −1, 1, −1), (1, 1, −1, 1,
−1, 1, −1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)},
{(−1, −1, 1, 1, −1, 1, −1, 1), (1, −1, 1, −1, 1, 1, −1, −1), (1, −1, 1, 1, −1, −1, 1, −1), (1, 1, −1, 1, −1, 1, −1, −1), (−1, −1,
−1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, 1, −1, 1, −1, 1),
(1, −1, 1, −1, 1, 1, −1, −1), (1, −1, 1, 1, −1, −1, 1, −1), (1, 1, −1, 1, −1, 1, −1, −1), (−1, −1, −1, 1, 1, 1, 1, −1), (1, −1, −1, −1,
−1, 1, 1, 1), (1, −1, −1, 1, 1, −1, −1, 1), (1, 1, 1, 1, 1, 1, 1, 1)}, {(−1, −1, 1, 1, −1, 1, −1, 1), (1, −1, 1, −1, 1, 1, −1, −1), (1,
−1, 1, 1, −1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1,
−1, −1), (−1, 1, 1, −1, −1, 1, 1, −1)}, {(−1, −1, 1, 1, −1, 1, −1, 1), (1, −1, 1, −1, 1, 1, −1, −1), (1, −1, 1, 1, −1, −1, 1, −1), (1, 1,
−1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1,
−1, 1)}, {(−1, −1, 1, 1, −1, 1, −1, 1), (1, −1, 1, −1, 1, 1, −1, −1), (1, −1, 1, 1, −1, −1, 1, −1), (1, 1, −1, 1, −1, 1, −1, −1),
(−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, 1, −1, 1,
−1, 1), (1, −1, 1, −1, 1, 1, −1, −1), (1, −1, 1, 1, −1, −1, 1, −1), (1, 1, −1, 1, −1, 1, −1, −1), (−1, 1, 1, 1, 1, −1, −1, −1), (1, 1, 1,
−1, −1, −1, −1, 1), (1, −1, −1, 1, 1, −1, −1, 1), (1, 1, 1, 1, 1, 1, 1, 1)}, {(−1, −1, 1, 1, −1, 1, −1, 1), (1, −1, 1, −1, 1, 1, −1, −1),
(1, −1, 1, 1, −1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1,
−1, −1, −1, −1), (−1, 1, 1, −1, −1, 1, 1, −1)}, {(−1, −1, 1, 1, −1, 1, −1, 1), (1, −1, 1, −1, 1, 1, −1, −1), (1, −1, 1, 1, −1, −1, 1, −1),
(1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (1, −1,
−1, 1, 1, −1, −1, 1)}, {(−1, −1, 1, 1, −1, 1, −1, 1), (1, −1, 1, −1, 1, 1, −1, −1), (1, −1, 1, 1, −1, −1, 1, −1), (1, 1, −1, 1, −1, 1, −1,
−1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, 1,
−1, 1, −1, 1), (1, −1, 1, −1, 1, 1, −1, −1), (1, −1, 1, 1, −1, −1, 1, −1), (1, 1, −1, 1, −1, 1, −1, −1), (1, −1, −1, −1, −1, 1, 1, 1),
(1, 1, 1, −1, −1, −1, −1, 1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, −1,
−1, 1, 1), (−1, 1, −1, 1, 1, 1, −1, −1), (1, 1, −1, −1, 1, −1, 1, −1), (−1, −1, −1, −1, 1, 1, 1, 1), (−1, 1, 1, −1, 1, −1, −1, 1), (−1, −1,
−1, −1, −1, −1, −1, −1), (−1, 1, 1, −1, −1, 1, 1, −1)}, {(−1, −1, 1, 1, 1, −1, 1, −1), (−1, 1, −1, 1, −1, −1, 1, 1), (−1, 1, −1, 1, 1, 1,
−1, −1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (1,
−1, −1, 1, 1, −1, −1, 1)}, {(−1, −1, 1, 1, 1, −1, 1, −1), (−1, 1, −1, 1, −1, −1, 1, 1), (−1, 1, −1, 1, 1, 1, −1, −1), (1, 1, −1, −1, 1,
−1, 1, −1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1,
−1, 1, 1, 1, −1, 1, −1), (−1, 1, −1, 1, −1, −1, 1, 1), (−1, 1, −1, 1, 1, 1, −1, −1), (1, 1, −1, −1, 1, −1, 1, −1), (−1, −1, −1,
−1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, 1, −1, 1, −1),
(−1, 1, −1, 1, −1, −1, 1, 1), (−1, 1, −1, 1, 1, 1, −1, −1), (1, 1, −1, −1, 1, −1, 1, −1), (−1, −1, −1, −1, 1, 1, 1, 1), (1, −1, −1, 1,
−1, 1, 1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, −1, −1, 1, 1),
(−1, 1, −1, 1, 1, 1, −1, −1), (1, 1, −1, −1, 1, −1, 1, −1), (−1, −1, −1, −1, 1, 1, 1, 1), (1, −1, −1, 1, −1, 1, 1, −1), (−1, −1, −1, −1,
−1, −1, −1, −1), (1, −1, −1, 1, 1, −1, −1, 1)}, {(−1, −1, 1, 1, 1, −1, 1, −1), (−1, 1, −1, 1, −1, −1, 1, 1), (−1, 1, −1, 1, 1, 1, −1, −1),
(1, 1, −1, −1, 1, −1, 1, −1), (−1, −1, −1, −1, 1, 1, 1, 1), (1, −1, −1, 1, −1, 1, 1, −1), (−1, 1, 1, −1, −1, 1, 1, −1),
(1, 1, 1, 1, 1, 1, 1, 1)}, {(−1, −1, 1, 1, 1, −1, 1, −1), (−1, 1, −1, 1, −1, −1, 1, 1), (−1, 1, −1, 1, 1, 1, −1, −1), (1, 1, −1, −1, 1,
−1, 1, −1), (−1, −1, −1, −1, 1, 1, 1, 1), (1, −1, −1, 1, −1, 1, 1, −1), (1, −1, −1, 1, 1, −1, −1, 1), (1, 1, 1, 1, 1, 1, 1, 1)}, {(−1,
−1, 1, 1, 1, −1, 1, −1), (−1, 1, −1, 1, −1, −1, 1, 1), (−1, 1, −1, 1, 1, 1, −1, −1), (1, 1, −1, −1, 1, −1, 1, −1), (−1, 1, 1, −1, 1, −1,
−1, 1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, 1, −1, 1, −1),
(−1, 1, −1, 1, −1, −1, 1, 1), (−1, 1, −1, 1, 1, 1, −1, −1), (1, 1, −1, −1, 1, −1, 1, −1), (−1, 1, 1, −1, 1, −1, −1, 1), (1, 1, 1, 1, −1, −1,
−1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, −1, −1, 1, 1),
(−1, 1, −1, 1, 1, 1, −1, −1), (1, 1, −1, −1, 1, −1, 1, −1), (−1, 1, 1, −1, 1, −1, −1, 1), (1, 1, 1, 1, −1, −1, −1, −1), (−1, 1, 1, −1,
−1, 1, 1, −1), (1, 1, 1, 1, 1, 1, 1, 1)}, {(−1, −1, 1, 1, 1, −1, 1, −1), (−1, 1, −1, 1, −1, −1, 1, 1), (−1, 1, −1, 1, 1, 1, −1, −1), (1, 1,
−1, −1, 1, −1, 1, −1), (−1, 1, 1, −1, 1, −1, −1, 1), (1, 1, 1, 1, −1, −1, −1, −1), (1, −1, −1, 1, 1, −1, −1, 1), (1, 1, 1, 1, 1, 1, 1, 1)},
{(−1, −1, 1, 1, 1, −1, 1, −1), (−1, 1, −1, 1, −1, −1, 1, 1), (−1, 1, −1, 1, 1, 1, −1, −1), (1, 1, −1, −1, 1, −1, 1, −1), (1, −1, −1, 1,
−1, 1, 1, −1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, 1, −1, 1, −1),
(−1, 1, −1, 1, −1, −1, 1, 1), (−1, 1, −1, 1, 1, 1, −1, −1), (1, 1, −1, −1, 1, −1, 1, −1), (1, −1, −1, 1, −1, 1, 1, −1), (1, 1, 1, 1, −1, −1,
−1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, −1, −1, 1, 1),
(−1, 1, −1, 1, 1, 1, −1, −1), (1, 1, −1, −1, 1, −1, 1, −1), (1, −1, −1, 1, −1, 1, 1, −1), (1, 1, 1, 1, −1, −1, −1, −1), (−1, 1, 1, −1,
−1, 1, 1, −1), (1, 1, 1, 1, 1, 1, 1, 1)}, {(−1, −1, 1, 1, 1, −1, 1, −1), (−1, 1, −1, 1, −1, −1, 1, 1), (−1, 1, −1, 1, 1, 1, −1, −1), (1, 1,
−1, −1, 1, −1, 1, −1), (1, −1, −1, 1, −1, 1, 1, −1), (1, 1, 1, 1, −1, −1, −1, −1), (1, −1, −1, 1, 1, −1, −1, 1), (1, 1, 1, 1, 1, 1, 1, 1)},
{(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (−1, −1, −1,
−1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, 1, −1, 1,
−1), (−1, 1, −1, 1, −1, −1, 1, 1), (1, −1, 1, −1, −1, −1, 1, 1), (1, 1, −1, −1, 1, −1, 1, −1), (−1, −1, −1, −1, 1, 1, 1, 1), (−1, 1, 1,
−1, 1, −1, −1, 1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, −1,
−1, 1, 1), (1, −1, 1, −1, −1, −1, 1, 1), (1, 1, −1, −1, 1, −1, 1, −1), (−1, −1, −1, −1, 1, 1, 1, 1), (−1, 1, 1, −1, 1, −1, −1, 1),
(−1, 1, 1, −1, −1, 1, 1, −1), (1, 1, 1, 1, 1, 1, 1, 1)}, {(−1, −1, 1, 1, 1, −1, 1, −1), (−1, 1, −1, 1, −1, −1, 1, 1), (1, −1, 1, −1, −1,
−1, 1, 1), (1, 1, −1, −1, 1, −1, 1, −1), (−1, −1, −1, −1, 1, 1, 1, 1), (−1, 1, 1, −1, 1, −1, −1, 1), (1, −1, −1, 1, 1, −1, −1, 1),
(1, 1, 1, 1, 1, 1, 1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1,
−1, 1, −1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1, −1)},
{(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (−1, −1, −1,
−1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, 1, −1, 1,
−1), (−1, 1, −1, 1, −1, −1, 1, 1), (1, −1, 1, −1, −1, −1, 1, 1), (1, 1, −1, −1, 1, −1, 1, −1), (−1, −1, −1, −1, 1, 1, 1, 1), (1, −1, −1, 1,
−1, 1, 1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, −1, −1, 1, 1), (1,
−1, 1, −1, −1, −1, 1, 1), (1, 1, −1, −1, 1, −1, 1, −1), (−1, −1, −1, −1, 1, 1, 1, 1), (1, −1, −1, 1, −1, 1, 1, −1), (1, −1, −1, 1, 1, −1,
−1, 1), (1, 1, 1, 1, 1, 1, 1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1, TABLE 4-continued −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (−1, 1, 1, −1, 1, −1, −1, 1), (1, 1, 1, 1, −1, −1, −1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (1, −1, −1, 1, −1, 1, 1, −1), (1, 1, 1, 1, −1, −1, −1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (−1, 1, −1, −1, 1, −1, 1, 1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (1, −1, 1, 1, −1, 1, −1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, 1, −1, −1, 1, −1, 1, 1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (1, −1, 1, 1, −1, 1, −1, −1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (−1, 1, −1, −1, 1, −1, 1, 1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (1, −1, 1, 1, −1, 1, −1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, 1, −1, −1, 1, −1, 1, 1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (1, −1, 1, 1, −1, 1, −1, −1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, −1, −1, −1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), TABLE 4-continued (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1,
−1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, −1, −1,
−1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, 1, −1, 1, −1),
(−1, 1, −1, 1, 1, 1, −1, −1), (1, −1, 1, −1, 1, 1, −1, −1), (1, 1, −1, −1, 1, −1, 1, −1), (−1, −1, −1, −1, 1, 1, 1, 1), (1, −1, −1, 1,
−1, 1, 1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1,
−1, 1, −1, 1, 1, −1, −1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1,
−1, −1), (−1, 1, 1, −1, −1, 1, 1, −1)}, {(−1, −1, 1, 1, 1, −1, 1, −1), (−1, 1, −1, 1, 1, 1, −1, −1), (1, −1, 1, −1, 1, 1, −1, −1), (1, 1,
−1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1,
−1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1),
(−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, 1, −1, 1,
−1), (−1, 1, −1, 1, 1, 1, −1, −1), (1, −1, 1, −1, 1, 1, −1, −1), (1, 1, −1, −1, 1, −1, 1, −1), (−1, 1, 1, −1, 1, −1, −1, 1), (1, 1, 1, 1,
−1, −1, −1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1,
−1, 1, −1, 1, 1, −1, −1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1,
−1, −1), (−1, 1, 1, −1, −1, 1, 1, −1)}, {(−1, −1, 1, 1, 1, −1, 1, −1), (−1, 1, −1, 1, 1, 1, −1, −1), (1, −1, 1, −1, 1, 1, −1, −1), (1, 1,
−1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (1, −1, −1, 1, 1, −1,
−1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (1, −1,
−1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, 1, −1, 1, −1),
(−1, 1, −1, 1, 1, 1, −1, −1), (1, −1, 1, −1, 1, 1, −1, −1), (1, 1, −1, −1, 1, −1, 1, −1), (1, −1, −1, 1, −1, 1, 1, −1), (1, 1, 1, 1, −1, −1,
−1, −1), (1, −1, −1, 1, 1, −1, −1, 1), (1, 1, 1, 1, 1, 1, 1, 1)}, {(−1, −1, 1, 1, 1, −1, 1, −1), (−1, 1, 1, 1, −1, −1, −1, 1), (1, −1, 1,
−1, −1, −1, 1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1,
−1), (−1, 1, 1, −1, −1, 1, 1, −1)}, {(−1, −1, 1, 1, 1, −1, 1, −1), (−1, 1, 1, 1, −1, −1, −1, 1), (1, −1, 1, −1, −1, −1, 1, 1), (1, 1, 1,
−1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1,
−1, 1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (−1,
−1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, 1, 1, 1, −1, 1, −1),
(−1, 1, 1, 1, −1, −1, −1, 1), (1, −1, 1, −1, −1, −1, 1, 1), (1, 1, 1, −1, 1, −1, −1, −1), (−1, −1, 1, −1, 1, 1, −1, 1), (−1, 1, −1, −1, 1,
−1, 1, 1), (1, −1, −1, 1, 1, −1, −1, 1), (1, 1, 1, 1, 1, 1, 1, 1)}, {(−1, −1, 1, 1, 1, −1, 1, −1), (−1, 1, 1, 1, −1, −1, −1, 1), (1, −1, 1,
−1, −1, −1, 1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1,
−1), (−1, 1, 1, −1, −1, 1, 1, −1)}, {(−1, −1, 1, 1, 1, −1, 1, −1), (−1, 1, 1, 1, −1, −1, −1, 1), (1, −1, 1, −1, −1, −1, 1, 1), (1, 1, 1,
−1, 1, −1, −1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1,
−1, 1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (−1,
−1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, 1, 1, 1, −1, 1, −1),
(−1, 1, 1, 1, −1, −1, −1, 1), (1, −1, 1, −1, −1, −1, 1, 1), (1, 1, 1, −1, 1, −1, −1, −1), (−1, −1, 1, −1, 1, 1, −1, 1), (1, −1, 1, 1, −1, 1,
−1, −1), (1, −1, −1, 1, 1, −1, −1, 1), (1, 1, 1, 1, 1, 1, 1, 1)}, {(−1, −1, 1, 1, 1, −1, 1, −1), (−1, 1, 1, 1, −1, −1, −1, 1), (1, −1, 1,
−1, −1, −1, 1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1,
−1), (−1, 1, 1, −1, −1, 1, 1, −1)}, {(−1, −1, 1, 1, 1, −1, 1, −1), (−1, 1, 1, 1, −1, −1, −1, 1), (1, −1, 1, −1, −1, −1, 1, 1), (1, 1, 1,
−1, 1, −1, −1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1,
−1, 1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (−1, 1,
−1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, 1, 1, 1, −1, 1, −1),
(−1, 1, 1, 1, −1, −1, −1, 1), (1, −1, 1, −1, −1, −1, 1, 1), (1, 1, 1, −1, 1, −1, −1, −1), (−1, 1, −1, −1, 1, −1, 1, 1), (1, 1, −1, 1, −1,
−1, 1, −1), (1, −1, −1, 1, 1, −1, −1, 1), (1, 1, 1, 1, 1, 1, 1, 1)}, {(−1, −1, 1, 1, 1, −1, 1, −1), (−1, 1, 1, 1, −1, −1, −1, 1), (1,
−1, 1, −1, −1, −1, 1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1,
−1, −1), (−1, 1, 1, −1, −1, 1, 1, −1)}, {(−1, −1, 1, 1, 1, −1, 1, −1), (−1, 1, 1, 1, −1, −1, −1, 1), (1, −1, 1, −1, −1, −1, 1, 1),
(1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (1, −1,
−1, 1, 1, −1, −1, 1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1,
−1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1,
−1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (1, −1, 1, 1, −1, 1, −1,
−1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (1, −1, −1,
−1, 1, 1, 1, −1), (1, −1, 1, −1, −1, −1, 1, 1), (1, 1, 1, −1, 1, −1, −1, −1), (−1, −1, 1, −1, 1, 1, −1, 1), (−1, 1, −1, −1, 1, −1, 1, 1),
(−1, −1, −1, −1, −1, −1, −1, −1), (−1, 1, 1, −1, −1, 1, 1, −1)}, {(−1, −1, 1, 1, 1, −1, 1, −1), (1, −1, −1, −1, 1, 1, 1, −1), (1, −1, 1, −1,
−1, −1, 1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1),
(1, −1, −1, 1, 1, −1, −1, 1)}, {(−1, −1, 1, 1, 1, −1, 1, −1), (1, −1, −1, −1, 1, 1, 1, −1), (1, −1, 1, −1, −1, −1, 1, 1), (1, 1, 1, −1, 1,
−1, −1, −1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1,
−1, 1, 1, 1, −1, 1, −1), (1, −1, −1, −1, 1, 1, 1, −1), (1, −1, 1, −1, −1, −1, 1, 1), (1, 1, 1, −1, 1, −1, −1, −1), (−1, −1, 1, −1, 1, 1,
−1, 1), (−1, 1, −1, −1, 1, −1, 1, 1), (1, −1, −1, 1, 1, −1, −1, 1), (1, 1, 1, 1, 1, 1, 1, 1)}, {(−1, −1, 1, 1, 1, −1, 1, −1), (1, −1, −1,
−1, 1, 1, 1, −1), (1, −1, 1, −1, −1, −1, 1, 1), (1, 1, 1, −1, 1, −1, −1, −1), (−1, −1, 1, −1, 1, 1, −1, 1), (1, −1, 1, 1, −1, 1, −1, −1),
(−1, −1, −1, −1, −1, −1, −1, −1), (−1, 1, 1, −1, −1, 1, 1, −1)}, {(−1, −1, 1, 1, 1, −1, 1, −1), (1, −1, −1, −1, 1, 1, 1, −1), (1, −1, 1, −1,
−1, −1, 1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1),
(1, −1, −1, 1, 1, −1, −1, 1)}, {(−1, −1, 1, 1, 1, −1, 1, −1), (1, −1, −1, −1, 1, 1, 1, −1), (1, −1, 1, −1, −1, −1, 1, 1), (1, 1, 1, −1, 1,
−1, −1, −1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1,
−1, 1, 1, 1, −1, 1, −1), (1, −1, −1, −1, 1, 1, 1, −1), (1, −1, 1, −1, −1, −1, 1, 1), (1, 1, 1, −1, 1, −1, −1, −1), (−1, −1, 1, −1, 1, 1,
−1, 1), (1, −1, 1, 1, −1, 1, −1, −1), (1, −1, −1, 1, 1, −1, −1, 1), (1, 1, 1, 1, 1, 1, 1, 1)}, {(−1, −1, 1, 1, 1, −1, 1, −1), (1, −1, −1,
−1, 1, 1, 1, −1), (1, −1, 1, −1, −1, −1, 1, 1), (1, 1, 1, −1, 1, −1, −1, −1), (−1, 1, −1, −1, 1, −1, 1, 1), (1, 1, −1, 1, −1, −1, 1, −1),
(−1, −1, −1, −1, −1, −1, −1, −1), (−1, 1, 1, −1, −1, 1, 1, −1)}, {(−1, −1, 1, 1, 1, −1, 1, −1), (1, −1, −1, −1, 1, 1, 1, −1), (1, −1, 1, −1,
−1, −1, 1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1),
(1, −1, −1, 1, 1, −1, −1, 1)}, {(−1, −1, 1, 1, 1, −1, 1, −1), (1, −1, −1, −1, 1, 1, 1, −1), (1, −1, 1, −1, −1, −1, 1, 1), (1, 1, 1, −1, 1,
−1, −1, −1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1,
−1, 1, 1, 1, −1, 1, −1), (1, −1, −1, −1, 1, 1, 1, −1), (1, −1, 1, −1, −1, −1, 1, 1), (1, 1, 1, −1, 1, −1, −1, −1), (−1, 1, −1, −1, 1,
−1, 1, 1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (1, −1,
−1, −1, 1, 1, 1, −1), (1, −1, 1, −1, −1, −1, 1, 1), (1, 1, 1, −1, 1, −1, −1, −1), (1, −1, 1, 1, −1, 1, −1, −1), (1, 1, −1, 1, −1, −1, 1, −1),
(−1, −1, −1, −1, −1, −1, −1, −1), (−1, 1, 1, −1, −1, 1, 1, −1)}, {(−1, −1, 1, 1, 1, −1, 1, −1), (1, −1, −1, −1, 1, 1, 1, −1), (1, −1, 1,
−1, −1, −1, 1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1,
−1), (1, −1, −1, 1, 1, −1, −1, 1)}, {(−1, −1, 1, 1, 1, −1, 1, −1), (1, −1, −1, −1, 1, 1, 1, −1), (1, −1, 1, −1, −1, −1, 1, 1), (1, 1, 1,
−1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)},
{(−1, −1, 1, 1, 1, −1, 1, −1), (1, −1, −1, −1, 1, 1, 1, −1), (1, −1, 1, −1, −1, −1, 1, 1), (1, 1, 1, −1, 1, −1, −1, −1), (1, −1, 1, 1, −1, 1,
−1, −1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (1, −1, 1,
−1, −1, −1, 1, 1), (1, −1, 1, −1, 1, 1, −1, −1), (1, 1, −1, −1, 1, −1, 1, −1), (−1, −1, −1, −1, 1, 1, 1, 1), (−1, 1, 1, −1, 1, −1, −1, 1),
(−1, −1, −1, −1, −1, −1, −1, −1), (−1, 1, 1, −1, −1, 1, 1, −1)}, {(−1, −1, 1, 1, 1, −1, 1, −1), (1, −1, 1, −1, −1, −1, 1, 1), (1, −1, 1,
−1, 1, 1, −1, −1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1,
−1), (1, −1, −1, 1, 1, −1, −1, 1)}, {(−1, −1, 1, 1, 1, −1, 1, −1), (1, −1, 1, −1, −1, −1, 1, 1), (1, −1, 1, −1, 1, 1, −1, −1), (1, 1, −1,
−1, 1, −1, 1, −1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, TABLE 4-continued {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (−1, −1, −1, −1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1, −1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (−1, −1, −1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (−1, −1, −1, −1, 1, 1, 1, 1), (1, −1, −1, 1, −1, 1, 1, −1), (1, −1, −1, 1, 1, −1, −1, 1), (1, 1, 1, 1, 1, 1, 1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (−1, 1, 1, −1, 1, −1, −1, 1), (1, 1, 1, 1, −1, −1, −1, −1), (1, −1, −1, 1, 1, −1, −1, 1), (1, 1, 1, 1, 1, 1, 1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (1, −1, −1, 1, −1, 1, 1, −1), (1, 1, 1, 1, −1, −1, −1, −1), (1, −1, −1, 1, 1, −1, −1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, −1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, −1, 1, 1, 1, 1, −1), (1, 1, −1, 1, −1, −1, 1, −1), (1, 1, −1, −1, 1, 1, −1, −1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, 1, −1, 1, 1, −1, 1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (1, 1, −1, 1, −1, −1, 1, −1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, −1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, −1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, −1, 1, 1, 1, 1, −1), (1, 1, −1, 1, −1, −1, 1, −1), (1, 1, −1, −1, 1, 1, −1, −1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (−1, −1, 1, −1, 1, 1, −1, 1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (1, −1, −1, −1, 1, −1, 1, 1), (1, 1, −1, 1, −1, −1, 1, −1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1, −1, 1), (−1, −1, −1, 1, 1, 1, 1, −1), TABLE 4-continued (−1, −1, 1, −1, 1, 1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1,
−1, 1, 1, −1, −1, 1), (−1, 1, 1, 1, −1, 1, −1, −1), (1, −1, −1, 1, −1, 1, −1, 1), (−1, −1, −1, 1, 1, 1, 1, −1), (−1, −1, 1, −1, 1, 1, −1, 1),
(−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1, −1, −1, 1),
(−1, 1, 1, 1, −1, 1, −1, −1), (1, −1, −1, 1, −1, 1, −1, 1), (−1, −1, −1, 1, 1, 1, 1, −1), (−1, −1, 1, −1, 1, 1, −1, 1), (−1, −1, 1, 1, −1,
−1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, 1, −1, 1, −1, −1), (1, −1,
−1, 1, −1, 1, −1, 1), (−1, −1, −1, 1, 1, 1, 1, −1), (−1, −1, 1, −1, 1, 1, −1, 1), (1, 1, −1, 1, −1, −1, 1, −1), (1, 1, 1, 1, 1, 1, 1, 1)},
{(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1, −1, 1), (−1, −1,
−1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)}, {(−1, 1, −1, −1,
−1, 1, 1, 1), (−1, 1, −1, 1, 1, −1, −1, 1), (−1, 1, 1, 1, −1, 1, −1, −1), (1, −1, −1, 1, −1, 1, −1, 1), (−1, −1, −1, 1, 1, 1, 1, −1), (1, 1,
−1, 1, −1, −1, 1, −1), (−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1,
−1, −1, 1), (−1, 1, 1, 1, −1, 1, −1, −1), (1, −1, −1, 1, −1, 1, −1, 1), (−1, −1, −1, 1, 1, 1, 1, −1), (1, 1, −1, 1, −1, −1, 1, −1), (−1,
−1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, 1, −1, 1, −1, −1),
(1, −1, −1, 1, −1, 1, −1, 1), (−1, −1, −1, 1, 1, 1, 1, −1), (1, 1, −1, 1, −1, −1, 1, −1), (1, 1, −1, −1, 1, 1, −1, −1),
(1, 1, 1, 1, 1, 1, 1, 1)}, {(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1,
−1, 1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1, −1, 1, 1)},
{(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1, −1, 1), (−1, −1, 1, −1, 1, 1,
−1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1),
(−1, 1, −1, 1, 1, −1, −1, 1), (−1, 1, 1, 1, −1, 1, −1, −1), (1, −1, −1, 1, −1, 1, −1, 1), (−1, −1, 1, −1, 1, 1, −1, 1), (1, 1, 1, −1, −1, −1,
−1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, 1,
−1, 1, −1, −1), (1, −1, −1, 1, −1, 1, −1, 1), (−1, −1, 1, −1, 1, 1, −1, 1), (1, 1, −1, 1, −1, −1, 1, −1), (1, 1, −1, −1, 1, 1, −1, −1),
(1, 1, 1, 1, 1, 1, 1, 1)}, {(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1,
−1, 1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1, −1, 1, 1)},
{(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1, −1, 1), (1, 1, −1, 1, −1,
−1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1),
(−1, 1, −1, 1, 1, −1, −1, 1), (−1, 1, 1, 1, −1, 1, −1, −1), (1, −1, −1, 1, −1, 1, −1, 1), (1, 1, −1, 1, −1, −1, 1, −1), (1, 1, 1, −1, −1,
−1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1),
(−1, 1, 1, 1, −1, 1, −1, −1), (1, −1, −1, 1, −1, 1, −1, 1), (1, 1, −1, 1, −1, −1, 1, −1), (1, 1, 1, −1, −1, −1, −1, 1), (1, 1, −1, −1, 1, 1,
−1, −1), (1, 1, 1, 1, 1, 1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1,
−1, 1, −1, 1, −1, 1), (−1, −1, −1, 1, 1, 1, 1, −1), (−1, −1, 1, −1, 1, 1, −1, 1), (−1, −1, −1, −1, −1, −1, −1, −1), (−1, −1, 1, 1, −1,
−1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1, −1, 1, −1, 1, −1, 1), (−1,
−1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1, −1,
−1, 1, 1, 1), (−1, 1, −1, 1, 1, −1, −1, 1), (1, −1, −1, −1, 1, −1, 1, 1), (1, −1, −1, 1, −1, 1, −1, 1), (−1, −1, −1, 1, 1, 1, 1, −1), (−1,
−1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1),
(1, −1, −1, −1, 1, −1, 1, 1), (1, −1, −1, 1, −1, 1, −1, 1), (−1, −1, −1, 1, 1, 1, 1, −1), (−1, −1, 1, −1, 1, 1, −1, 1), (1, 1, −1, −1, 1, 1,
−1, −1), (1, 1, 1, 1, 1, 1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1,
−1, 1, −1, 1, −1, 1), (−1, −1, −1, 1, 1, 1, 1, −1), (1, 1, −1, 1, −1, −1, 1, −1), (−1, −1, −1, −1, −1, −1, −1, −1), (4, 4, 1, 1, 4,
−1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1, −1, 1, −1, 1, −1, 1), (−1,
−1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1, −1,
−1, 1, 1, 1), (−1, 1, −1, 1, 1, −1, −1, 1), (1, −1, −1, −1, 1, −1, 1, 1), (1, −1, −1, 1, −1, 1, −1, 1), (−1, −1, −1, 1, 1, 1, 1, −1), (1, 1,
−1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1),
(1, −1, −1, −1, 1, −1, 1, 1), (1, −1, −1, 1, −1, 1, −1, 1), (−1, −1, −1, 1, 1, 1, 1, −1), (1, 1, −1, 1, −1, −1, 1, −1), (1, 1, −1, −1, 1, 1,
−1, −1), (1, 1, 1, 1, 1, 1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1,
−1, 1, −1, 1, −1, 1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1,
−1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1, −1, 1, −1, 1, −1, 1), (−1,
−1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1,
−1, 1, 1, 1), (−1, 1, −1, 1, 1, −1, −1, 1), (1, −1, −1, −1, 1, −1, 1, 1), (1, −1, −1, 1, −1, 1, −1, 1), (−1, −1, 1, −1, 1, 1, −1, 1),
(1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1,
−1, 1), (1, −1, −1, −1, 1, −1, 1, 1), (1, −1, −1, 1, −1, 1, −1, 1), (−1, −1, 1, −1, 1, 1, −1, 1), (1, 1, 1, −1, −1, −1, −1, 1), (1, 1, −1,
−1, 1, 1, −1, −1), (1, 1, 1, 1, 1, 1, 1, 1)}, {(−1, 1, −1, −1, −1, 1, 1, 1), (−1, 1, −1, 1, 1, −1, −1, 1), (1, −1, −1, −1, 1, −1, 1, 1),
(1, −1, −1, 1, −1, 1, −1, 1), (1, 1, −1, 1, −1, −1, 1, −1), (1, 1, 1, −1, −1, −1, −1, 1), (−1, −1, −1, −1, −1, −1, −1, −1), (−1, −1, 1, 1,
−1, −1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1, −1, 1, −1, 1, −1, 1),
(1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1,
−1, −1, 1, 1, 1), (−1, 1, −1, 1, 1, −1, −1, 1), (1, −1, −1, −1, 1, −1, 1, 1), (1, −1, −1, 1, −1, 1, −1, 1), (1, 1, −1, 1, −1, −1, 1, −1),
(1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1,
−1, 1), (1, −1, −1, −1, 1, −1, 1, 1), (1, −1, −1, 1, −1, 1, −1, 1), (1, 1, −1, 1, −1, −1, 1, −1), (1, 1, 1, −1, −1, −1, −1, 1), (1, 1, −1,
−1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (−1, 1, 1, 1, −1, 1, −1, −1),
(1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1,
−1, −1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1),
(−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1,
−1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, −1, 1, 1, 1, 1, −1),
(−1, −1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1, −1, 1,
−1), (−1, 1, 1, 1, −1, 1, −1, −1), (1, −1, 1, −1, −1, 1, 1, −1), (−1, −1, −1, 1, 1, 1, 1, −1), (−1, −1, 1, −1, 1, 1, −1, 1), (1, 1, −1,
−1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (−1, 1, 1, 1, −1, 1, −1, −1),
(1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1,
−1, −1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1),
(−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1,
−1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, −1, 1, 1, 1, 1, −1),
(1, 1, −1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1,
−1, 1, −1), (−1, 1, 1, 1, −1, 1, −1, −1), (1, −1, 1, −1, −1, 1, 1, −1), (−1, −1, −1, 1, 1, 1, 1, −1), (1, 1, −1, 1, −1, −1, 1, −1), (1, 1,
−1, −1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (−1, 1, 1, 1, −1, 1, −1, −1),
(1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1,
−1, −1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1),
(−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1,
−1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, 1, −1, 1, 1, −1, 1),
(1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1,
−1, 1, −1), (−1, 1, 1, 1, −1, 1, −1, −1), (1, −1, 1, −1, −1, 1, 1, −1), (−1, −1, 1, −1, 1, 1, −1, 1), (1, 1, 1, −1, −1, −1, −1, 1), (1, 1,
−1, −1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (−1, 1, 1, 1, −1, 1, −1, −1),
(1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,
−1, −1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1),
(1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1, TABLE 4-continued −1, −1, 1, 1, 1), (−1, 1, 1, −1, 1, −1, 1, −1), (−1, 1, 1, 1, −1, 1, −1, −1), (1, −1, 1, −1, −1, 1, 1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1), (1, 1, −1, 1, −1, −1, 1, −1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (1, 1, −1, 1, −1, −1, 1, −1), (1, 1, −1, −1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, 1, −1, 1, 1, −1, 1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (1, 1, −1, 1, −1, −1, 1, −1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (1, 1, −1, −1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (1, 1, −1, TABLE 4-continued −1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (1, 1, −1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (−1, −1, 1, 1, −1, −1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (−1, −1, 1, 1, −1, −1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1, −1, 1, 1, −1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1, −1, 1, 1, −1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (1, −1, −1, 1, 1, −1, −1, 1), (1, 1, 1, 1, 1, 1, 1, 1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1, −1, 1, 1, −1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), TABLE 4-continued (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, 1, −1,
−1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, 1, 1, 1, 1, −1, −1, −1),
(1, 1, 1, −1, −1, −1, −1, 1), (−1, 1, 1, −1, −1, 1, 1, −1), (1, 1, 1, 1, 1, 1, 1, 1)}, {(−1, 1, −1, −1, 1, 1, −1, 1), (−1, 1, −1, 1, −1,
−1, 1, 1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (1, −1,
−1, 1, 1, −1, −1, 1), (1, 1, 1, 1, 1, 1, 1, 1)}, {(−1, 1, −1, −1, 1, 1, −1, 1), (−1, 1, −1, 1, −1, −1, 1, 1), (1, 1, −1, −1, 1, −1, 1, −1),
(1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1,
−1, 1, 1, −1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1),
(1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, 1, −1,
−1, 1, 1, −1, 1), (−1, 1, −1, 1, −1, −1, 1, 1), (1, 1, −1, −1, 1, −1, 1, −1), (1, 1, −1, 1, −1, 1, −1, −1), (1, −1, −1, −1, −1, 1, 1, 1),
(1, 1, 1, −1, −1, −1, −1, 1), (−1, 1, 1, −1, −1, 1, 1, −1), (1, 1, 1, 1, 1, 1, 1, 1)}, {(−1, 1, −1, −1, 1, 1, −1, 1), (−1, 1, −1, 1, −1,
−1, 1, 1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (1, −1,
−1, 1, 1, −1, −1, 1), (1, 1, 1, 1, 1, 1, 1, 1)}, {(−1, 1, −1, −1, 1, 1, −1, 1), (−1, 1, 1, 1, −1, −1, −1, 1), (1, 1, −1, 1, −1, 1, −1, −1),
(1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,
−1, 1, 1, −1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1),
(−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, 1, −1,
−1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, −1, 1, 1, 1, 1, −1, −1),
(−1, 1, −1, 1, 1, −1, 1, −1), (−1, 1, 1, −1, −1, 1, 1, −1), (1, 1, 1, 1, 1, 1, 1, 1)}, {(−1, 1, −1, −1, 1, 1, −1, 1), (−1, 1, 1, 1, −1, −1,
−1, 1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (1, −1,
−1, 1, 1, −1, −1, 1), (1, 1, 1, 1, 1, 1, 1, 1)}, {(−1, 1, −1, −1, 1, 1, −1, 1), (−1, 1, 1, 1, −1, −1, −1, 1), (1, 1, −1, 1, −1, 1, −1, −1),
(1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,
−1, 1, 1, −1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1),
(−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, 1, −1,
−1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, −1, 1, 1, 1, 1, −1, −1),
(1, −1, 1, −1, −1, 1, −1, 1), (−1, 1, 1, −1, −1, 1, 1, −1), (1, 1, 1, 1, 1, 1, 1, 1)}, {(−1, 1, −1, −1, 1, 1, −1, 1), (−1, 1, 1, 1, −1, −1,
−1, 1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (1, −1,
−1, 1, 1, −1, −1, 1), (1, 1, 1, 1, 1, 1, 1, 1)}, {(−1, 1, −1, −1, 1, 1, −1, 1), (−1, 1, 1, 1, −1, −1, −1, 1), (1, 1, −1, 1, −1, 1, −1, −1),
(1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,
−1, 1, 1, −1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1),
(−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, 1, −1,
−1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, 1, −1, 1, 1, −1, 1, −1),
(1, 1, −1, −1, −1, −1, 1, 1), (−1, 1, 1, −1, −1, 1, 1, −1), (1, 1, 1, 1, 1, 1, 1, 1)}, {(−1, 1, −1, −1, 1, 1, −1, 1), (−1, 1, 1, 1, −1, −1,
−1, 1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (1, −1,
−1, 1, 1, −1, −1, 1), (1, 1, 1, 1, 1, 1, 1, 1)}, {(−1, 1, −1, −1, 1, 1, −1, 1), (−1, 1, 1, 1, −1, −1, −1, 1), (1, 1, −1, 1, −1, 1, −1, −1),
(1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,
−1, 1, 1, −1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1),
(1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, 1, −1,
−1, 1, 1, −1, 1), (−1, 1, 1, 1, −1, −1, −1, 1), (1, 1, −1, 1, −1, 1, −1, −1), (1, 1, 1, −1, 1, −1, −1, −1), (1, −1, 1, −1, −1, 1, −1, 1),
(1, 1, −1, −1, −1, −1, 1, 1), (−1, 1, 1, −1, −1, 1, 1, −1), (1, 1, 1, 1, 1, 1, 1, 1)}, {(−1, 1, −1, −1, 1, 1, −1, 1), (−1, 1, 1, 1, −1, −1,
−1, 1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (1, −1,
−1, 1, 1, −1, −1, 1), (1, 1, 1, 1, 1, 1, 1, 1)}, {(−1, 1, −1, −1, 1, 1, −1, 1), (1, −1, −1, −1, 1, 1, 1, −1), (1, 1, −1, 1, −1, 1, −1, −1),
(1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,
−1, 1, 1, −1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1, −1, −1, −1),
(−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, 1, −1,
−1, 1, 1, −1, 1), (1, −1, −1, −1, 1, 1, 1, −1), (1, 1, −1, 1, −1, 1, −1, −1), (1, 1, 1, −1, 1, −1, −1, −1), (−1, −1, 1, 1, 1, 1, −1, −1),
(−1, 1, −1, 1, 1, −1, 1, −1), (−1, 1, 1, −1, −1, 1, 1, −1), (1, 1, 1, 1, 1, 1, 1, 1)}, {(−1, 1, −1, −1, 1, 1, −1, 1), (1, −1, −1, −1, 1, 1, 1,
−1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (1, −1,
−1, 1, 1, −1, −1, 1), (1, 1, 1, 1, 1, 1, 1, 1)}, {(−1, 1, −1, −1, 1, 1, −1, 1), (1, −1, −1, −1, 1, 1, 1, −1), (1, 1, −1, 1, −1, 1, −1, −1),
(1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,
−1, 1, 1, −1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1, −1, −1, −1),
(−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, 1, −1,
−1, 1, 1, −1, 1), (1, −1, −1, −1, 1, 1, 1, −1), (1, 1, −1, 1, −1, 1, −1, −1), (1, 1, 1, −1, 1, −1, −1, −1), (−1, −1, 1, 1, 1, 1, −1, −1),
(1, −1, 1, −1, −1, 1, −1, 1), (−1, 1, 1, −1, −1, 1, 1, −1), (1, 1, 1, 1, 1, 1, 1, 1)}, {(−1, 1, −1, −1, 1, 1, −1, 1), (1, −1, −1,
−1, 1, 1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1),
(1, −1, −1, 1, 1, −1, −1, 1), (1, 1, 1, 1, 1, 1, 1, 1)}, {(−1, 1, −1, −1, 1, 1, −1, 1), (1, −1, −1, −1, 1, 1, 1, −1), (1, 1, −1, 1, −1, 1,
−1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1),
(−1, 1, 1, −1, −1, 1, 1, −1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1,
−1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)},
{(−1, 1, −1, −1, 1, 1, −1, 1), (1, −1, −1, −1, 1, 1, 1, −1), (1, 1, −1, 1, −1, 1, −1, −1), (1, 1, 1, −1, 1, −1, −1, −1), (−1, 1, −1, 1, 1,
−1, 1, −1), (1, 1, −1, −1, −1, −1, 1, 1), (−1, 1, 1, −1, −1, 1, 1, −1), (1, 1, 1, 1, 1, 1, 1, 1)}, {(−1, 1, −1, −1, 1, 1, −1, 1), (1, −1,
−1, −1, 1, 1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1),
(1, −1, −1, 1, 1, −1, −1, 1), (1, 1, 1, 1, 1, 1, 1, 1)}, {(−1, 1, −1, −1, 1, 1, −1, 1), (1, −1, −1, −1, 1, 1, 1, −1), (1, 1, −1, 1, −1, 1,
−1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1),
(−1, 1, 1, −1, −1, 1, 1, −1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1,
−1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)},
{(−1, 1, −1, −1, 1, 1, −1, 1), (1, −1, −1, −1, 1, 1, 1, −1), (1, 1, −1, 1, −1, 1, −1, −1), (1, 1, 1, −1, 1, −1, −1, −1), (1, −1, 1, −1,
−1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, 1, −1, −1, 1, 1, −1, 1), (1,
−1, −1, −1, 1, 1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1,
−1, 1, 1), (1, −1, −1, 1, 1, −1, −1, 1), (1, 1, 1, 1, 1, 1, 1, 1)}, {(−1, 1, −1, −1, 1, 1, −1, 1), (1, −1, 1, −1, 1, 1, −1, −1), (1, 1, −1,
−1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1,
−1), (−1, 1, 1, −1, −1, 1, 1, −1)}, {(−1, 1, −1, −1, 1, 1, −1, 1), (1, −1, 1, −1, 1, 1, −1, −1), (1, 1, −1, −1, 1, −1, 1, −1), (1, 1,
−1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1,
−1, 1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1, −1), (−1, −1,
−1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, 1, −1, −1, 1, 1, −1, 1),
(1, −1, 1, −1, 1, 1, −1, −1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1,
−1, −1), (1, −1, −1, 1, 1, −1, −1, 1), (1, 1, 1, 1, 1, 1, 1, 1)}, {(−1, 1, −1, −1, 1, 1, −1, 1), (1, −1, 1, −1, 1, 1, −1, −1), (1, 1, −1,
−1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1,
−1), (−1, 1, 1, −1, −1, 1, 1, −1)}, {(−1, 1, −1, −1, 1, 1, −1, 1), (1, −1, 1, −1, 1, 1, −1, −1), (1, 1, −1, −1, 1, −1, 1, −1), (1, 1,
−1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1,
−1, 1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1, −1), (−1, −1,
−1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, 1, −1, −1, 1, 1, −1, 1), TABLE 4-continued (1, −1, 1, −1, 1, 1, −1, −1), (1, 1, −1, −1, 1, −1, 1, −1), (1, 1, −1, 1, −1, 1, −1, −1), (−1, −1, −1, 1, 1, 1, 1, −1), (1, −1, −1, −1,
−1, 1, 1, 1), (1, −1, −1, 1, 1, −1, −1, 1), (1, 1, 1, 1, 1, 1, 1, 1)}, {(−1, 1, −1, −1, 1, 1, −1, 1), (1, −1, 1, −1, 1, 1, −1, −1), (1, 1,
−1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1,
−1, −1), (−1, 1, 1, −1, −1, 1, 1, −1)}, {(−1, 1, −1, −1, 1, 1, −1, 1), (1, −1, 1, −1, 1, 1, −1, −1), (1, 1, −1, −1, 1, −1, 1, −1), (1, 1,
−1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1,
−1, 1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1, −1),
(−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, 1, −1, −1, 1, 1,
−1, 1), (1, −1, 1, −1, 1, 1, −1, −1), (1, 1, −1, −1, 1, −1, 1, −1), (1, 1, −1, 1, −1, 1, −1, −1), (−1, 1, 1, 1, 1, −1, −1, −1), (1, 1, 1,
−1, −1, −1, −1, 1), (1, −1, −1, 1, 1, −1, −1, 1), (1, 1, 1, 1, 1, 1, 1, 1)}, {(−1, 1, −1, −1, 1, 1, −1, 1), (1, −1, 1, −1, 1, 1, −1, −1),
(1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1,
−1, −1, −1, −1), (−1, 1, 1, −1, −1, 1, 1, −1)}, {(−1, 1, −1, −1, 1, 1, −1, 1), (1, −1, 1, −1, 1, 1, −1, −1), (1, 1, −1, −1, 1, −1, 1, −1),
(1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (1, −1,
−1, 1, 1, −1, −1, 1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1,
−1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, 1, −1,
−1, 1, 1, −1, 1), (1, −1, 1, −1, 1, 1, −1, −1), (1, 1, −1, −1, 1, −1, 1, −1), (1, 1, −1, 1, −1, 1, −1, −1), (1, −1, −1, −1, −1, 1, 1, 1),
(1, 1, 1, −1, −1, −1, −1, 1), (1, −1, −1, 1, 1, −1, −1, 1), (1, 1, 1, 1, 1, 1, 1, 1)}, {(−1, 1, −1, 1, −1, −1, 1, 1), (−1, 1, −1, 1, 1, 1,
−1, −1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1, −1, 1), (−1, −1,
−1, −1, −1, −1, −1, −1), (−1, 1, 1, −1, −1, 1, 1, −1)}, {(−1, 1, −1, 1, −1, −1, 1, 1), (−1, 1, −1, 1, 1, 1, −1, −1), (1, 1, −1, −1, −1, 1,
−1, 1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (1, −1,
−1, 1, 1, −1, −1, 1)}, {(−1, 1, −1, 1, −1, −1, 1, 1), (−1, 1, −1, 1, 1, 1, −1, −1), (1, 1, −1, −1, −1, 1, −1, 1), (1, 1, −1, −1, 1, −1, 1,
−1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, 1, −1, 1,
−1, −1, 1, 1), (−1, 1, −1, 1, 1, 1, −1, −1), (1, 1, −1, −1, −1, 1, −1, 1), (1, 1, −1, −1, 1, −1, 1, −1), (−1, −1, −1, −1, 1, 1, 1, 1),
(−1, 1, 1, −1, 1, −1, −1, 1), (1, −1, −1, 1, 1, −1, −1, 1), (1, 1, 1, 1, 1, 1, 1, 1)}, {(−1, 1, −1, 1, −1, −1, 1, 1), (−1, 1, −1, 1, 1, 1, −1,
−1), (1, 1, −1, −1, −1, 1, −1, 1), (1, 1, −1, −1, 1, −1, 1, −1), (−1, −1, −1, −1, 1, 1, 1, 1), (1, −1, −1, 1, −1, 1, 1, −1), (−1, −1, −1,
−1, −1, −1, −1, −1), (−1, 1, 1, −1, −1, 1, 1, −1)}, {(−1, 1, −1, 1, −1, −1, 1, 1), (−1, 1, −1, 1, 1, 1, −1, −1), (1, 1, −1, −1, −1, 1,
−1, 1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (1, −1,
−1, 1, 1, −1, −1, 1)}, {(−1, 1, −1, 1, −1, −1, 1, 1), (−1, 1, −1, 1, 1, 1, −1, −1), (1, 1, −1, −1, −1, 1, −1, 1), (1, 1, −1, −1, 1, −1, 1,
−1), (−1, −1, −1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, 1, −1, 1,
−1, −1, 1, 1), (−1, 1, −1, 1, 1, 1, −1, −1), (1, 1, −1, −1, −1, 1, −1, 1), (1, 1, −1, −1, 1, −1, 1, −1), (−1, −1, −1, −1, 1, 1, 1, 1), (1,
−1, −1, 1, −1, 1, 1, −1), (1, −1, −1, 1, 1, −1, −1, 1), (1, 1, 1, 1, 1, 1, 1, 1)}, {(−1, 1, −1, 1, −1, −1, 1, 1), (−1, 1, −1, 1, 1, 1, −1,
−1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (−1, −1, −1,
−1, −1, −1, −1, −1), (−1, 1, 1, −1, −1, 1, 1, −1)}, {(−1, 1, −1, 1, −1, −1, 1, 1), (−1, 1, −1, 1, 1, 1, −1, −1), (1, 1, −1, −1, −1, 1,
−1, 1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (1, −1,
−1, 1, 1, −1, −1, 1)}, {(−1, 1, −1, 1, −1, −1, 1, 1), (−1, 1, −1, 1, 1, 1, −1, −1), (1, 1, −1, −1, −1, 1, −1, 1), (1, 1, −1, −1, 1, −1, 1,
−1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, 1, −1, 1,
−1, −1, 1, 1), (−1, 1, −1, 1, 1, 1, −1, −1), (1, 1, −1, −1, −1, 1, −1, 1), (1, 1, −1, −1, 1, −1, 1, −1), (−1, 1, 1, −1, 1, −1, −1, 1),
(1, 1, 1, 1, −1, −1, −1, −1), (1, −1, −1, 1, 1, −1, −1, 1), (1, 1, 1, 1, 1, 1, 1, 1)}, {(−1, 1, −1, 1, −1, −1, 1, 1), (−1, 1, −1, 1, 1, 1,
−1, −1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (−1, −1,
−1, −1, −1, −1, −1, −1), (−1, 1, 1, −1, −1, 1, 1, −1)}, {(−1, 1, −1, 1, −1, −1, 1, 1), (−1, 1, −1, 1, 1, 1, −1, −1), (1, 1, −1, −1, −1, 1,
−1, 1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (1, −1,
−1, 1, 1, −1, −1, 1)}, {(−1, 1, −1, 1, −1, −1, 1, 1), (−1, 1, −1, 1, 1, 1, −1, −1), (1, 1, −1, −1, −1, 1, −1, 1), (1, 1, −1, −1, 1, −1, 1,
−1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, 1, −1, 1,
−1, −1, 1, 1), (−1, 1, −1, 1, 1, 1, −1, −1), (1, 1, −1, −1, −1, 1, −1, 1), (1, 1, −1, −1, 1, −1, 1, −1), (1, −1, −1, 1, −1, 1, 1, −1),
(1, 1, 1, 1, −1, −1, −1, −1), (1, −1, −1, 1, 1, −1, −1, 1), (1, 1, 1, 1, 1, 1, 1, 1)}, {(−1, 1, −1, 1, −1, −1, 1, 1), (1, −1, 1, −1, −1,
−1, 1, 1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1, −1, 1), (−1, −1,
−1, −1, −1, −1, −1, −1), (−1, 1, 1, −1, −1, 1, 1, −1)}, {(−1, 1, −1, 1, −1, −1, 1, 1), (1, −1, 1, −1, −1, −1, 1, 1), (1, 1, −1, −1, −1, 1,
−1, 1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (1, −1,
−1, 1, 1, −1, −1, 1)}, {(−1, 1, −1, 1, −1, −1, 1, 1), (1, −1, 1, −1, −1, −1, 1, 1), (1, 1, −1, −1, −1, 1, −1, 1), (1, 1, −1, −1, 1, −1, 1,
−1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, 1, −1, 1,
−1, −1, 1, 1), (1, −1, 1, −1, −1, −1, 1, 1), (1, 1, −1, −1, −1, 1, −1, 1), (1, 1, −1, −1, 1, −1, 1, −1), (−1, −1, −1, −1, 1, 1, 1, 1),
(−1, 1, 1, −1, 1, −1, −1, 1), (1, −1, −1, 1, 1, −1, −1, 1), (1, 1, 1, 1, 1, 1, 1, 1)}, {(−1, 1, −1, 1, −1, −1, 1, 1), (1, −1, 1, −1, −1,
−1, 1, 1), (1, 1, −1, −1, −1, 1, −1, 1), (1, 1, −1, −1, 1, −1, 1, −1), (−1, −1, −1, −1, 1, 1, 1, 1), (1, −1, −1, 1, −1, 1, 1, −1), (−1, −1,
−1, −1, −1, −1, −1, −1), (−1, 1, 1, −1, −1, 1, 1, −1)}, {(−1, 1, −1, 1, −1, −1, 1, 1), (1, −1, 1, −1, −1, −1, 1, 1), (1, 1, −1, −1, −1, 1,
−1, 1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (1, −1,
−1, 1, 1, −1, −1, 1)}, {(−1, 1, −1, 1, −1, −1, 1, 1), (1, −1, 1, −1, −1, −1, 1, 1), (1, 1, −1, −1, −1, 1, −1, 1), (1, 1, −1, −1, 1, −1, 1,
−1), (−1, −1, −1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, 1, −1, 1,
−1, −1, 1, 1), (1, −1, 1, −1, −1, −1, 1, 1), (1, 1, −1, −1, −1, 1, −1, 1), (1, 1, −1, −1, 1, −1, 1, −1), (−1, −1, −1, −1, 1, 1, 1, 1), (1,
−1, −1, 1, −1, 1, 1, −1), (1, −1, −1, 1, 1, −1, −1, 1), (1, 1, 1, 1, 1, 1, 1, 1)}, {(−1, 1, −1, 1, −1, −1, 1, 1), (1, −1, 1, −1, −1,
−1, 1, 1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (−1, −1,
−1, −1, −1, −1, −1, −1), (−1, 1, 1, −1, −1, 1, 1, −1)}, {(−1, 1, −1, 1, −1, −1, 1, 1), (1, −1, 1, −1, −1, −1, 1, 1), (1, 1, −1, −1, −1, 1,
−1, 1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (1, −1,
−1, 1, 1, −1, −1, 1)}, {(−1, 1, −1, 1, −1, −1, 1, 1), (1, −1, 1, −1, −1, −1, 1, 1), (1, 1, −1, −1, −1, 1, −1, 1), (1, 1, −1, −1, 1, −1, 1,
−1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, 1, −1, 1,
−1, −1, 1, 1), (1, −1, 1, −1, −1, −1, 1, 1), (1, 1, −1, −1, −1, 1, −1, 1), (1, 1, −1, −1, 1, −1, 1, −1), (−1, 1, 1, −1, 1, −1, −1, 1),
(1, 1, 1, 1, −1, −1, −1, −1), (1, −1, −1, 1, 1, −1, −1, 1), (1, 1, 1, 1, 1, 1, 1, 1)}, {(−1, 1, −1, 1, −1, −1, 1, 1), (1, −1, 1, −1, −1,
−1, 1, 1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (−1, −1,
−1, −1, −1, −1, −1, −1), (−1, 1, 1, −1, −1, 1, 1, −1)}, {(−1, 1, −1, 1, −1, −1, 1, 1), (1, −1, 1, −1, −1, −1, 1, 1), (1, 1, −1, −1, −1, 1,
−1, 1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (1, −1,
−1, 1, 1, −1, −1, 1)}, {(−1, 1, −1, 1, −1, −1, 1, 1), (1, −1, 1, −1, −1, −1, 1, 1), (1, 1, −1, −1, −1, 1, −1, 1), (1, 1, −1, −1, 1, −1, 1,
−1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, 1, −1, 1,
−1, −1, 1, 1), (1, −1, 1, −1, −1, −1, 1, 1), (1, 1, −1, −1, −1, 1, −1, 1), (1, 1, −1, −1, 1, −1, 1, −1), (1, −1, −1, 1, −1, 1, 1, −1),
(1, 1, 1, 1, −1, −1, −1, −1), (1, −1, −1, 1, 1, −1, −1, 1), (1, 1, 1, 1, 1, 1, 1, 1)}, {(−1, 1, −1, 1, −1, −1, 1, 1), (1, −1, 1, 1, −1,
−1, 1, −1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1,
−1, −1, −1, −1, −1, −1), (−1, 1, 1, −1, −1, 1, 1, −1)}, {(−1, 1, −1, 1, −1, −1, 1, 1), (1, −1, 1, 1, −1, −1, 1, −1), (1, 1, −1, −1, 1,
−1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1,
−1, −1, 1, 1, −1, −1, 1)}, {(−1, 1, −1, 1, −1, −1, 1, 1), (1, −1, 1, 1, −1, −1, 1, −1), (1, 1, −1, −1, 1, −1, 1, −1), (1, 1, −1, 1, −1, 1,
−1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, 1,
−1, 1, −1, −1, 1, 1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1),
(−1, 1, 1, 1, 1, −1, −1, −1), (1, −1, −1, 1, 1, −1, −1, 1), (1, 1, 1, 1, 1, 1, 1, 1)}, {(−1, 1, −1, 1, −1, −1, 1, 1), (1, −1, 1, 1, −1,
−1, 1, −1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, TABLE 4-continued −1, −1, −1, −1, −1, −1), (−1, 1, 1, −1, −1, 1, 1, −1)}, {(−1, 1, −1, 1, −1, −1, 1, 1), (1, −1, 1, 1, −1, −1, 1, −1), (1, 1, −1, −1, 1,
−1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (1,
−1, −1, 1, 1, −1, −1, 1)}, {(−1, 1, −1, 1, −1, −1, 1, 1), (1, −1, 1, 1, −1, −1, 1, −1), (1, 1, −1, −1, 1, −1, 1, −1), (1, 1, −1, 1, −1, 1,
−1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, 1,
−1, 1, −1, −1, 1, 1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1),
(1, −1, −1, −1, −1, 1, 1, 1), (1, −1, −1, 1, 1, −1, −1, 1), (1, 1, 1, 1, 1, 1, 1, 1)}, {(−1, 1, −1, 1, −1, −1, 1, 1), (1, −1, 1, 1, −1,
−1, 1, −1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1,
−1, −1, −1, −1, −1, −1), (−1, 1, 1, −1, −1, 1, 1, −1)}, {(−1, 1, −1, 1, −1, −1, 1, 1), (1, −1, 1, 1, −1, −1, 1, −1), (1, 1, −1, −1, 1,
−1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (1,
−1, −1, 1, 1, −1, −1, 1)}, {(−1, 1, −1, 1, −1, −1, 1, 1), (1, −1, 1, 1, −1, −1, 1, −1), (1, 1, −1, −1, 1, −1, 1, −1), (1, 1, −1, 1, −1, 1,
−1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, 1,
−1, 1, −1, −1, 1, 1), (1, −1, 1, 1, −1, −1, 1, −1), (1, 1, −1, −1, 1, −1, 1, −1), (1, 1, −1, 1, −1, 1, −1, −1), (−1, 1, 1, 1, 1, −1, −1, −1),
(1, 1, 1, −1, −1, −1, −1, 1), (1, −1, −1, 1, 1, −1, −1, 1), (1, 1, 1, 1, 1, 1, 1, 1)}, {(−1, 1, −1, 1, −1, −1, 1, 1), (1, −1, 1, 1, −1,
−1, 1, −1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (−1, −1,
−1, −1, −1, −1, −1, −1), (−1, 1, 1, −1, −1, 1, 1, −1)}, {(−1, 1, −1, 1, −1, −1, 1, 1), (1, −1, 1, 1, −1, −1, 1, −1), (1, 1, −1, −1, 1,
−1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (1,
−1, −1, 1, 1, −1, −1, 1)}, {(−1, 1, −1, 1, −1, −1, 1, 1), (1, −1, 1, 1, −1, −1, 1, −1), (1, 1, −1, −1, 1, −1, 1, −1), (1, 1, −1, 1, −1, 1,
−1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, 1,
−1, 1, −1, −1, 1, 1), (1, −1, 1, 1, −1, −1, 1, −1), (1, 1, −1, −1, 1, −1, 1, −1), (1, 1, −1, 1, −1, 1, −1, −1), (1, −1, −1, −1, −1, 1, 1, 1),
(1, 1, 1, −1, −1, −1, −1, 1), (1, −1, −1, 1, 1, −1, −1, 1), (1, 1, 1, 1, 1, 1, 1, 1)}, {(−1, 1, −1, 1, −1, 1, 1, −1), (−1, 1, −1, 1, 1, −1,
−1, 1), (−1, 1, 1, −1, −1, 1, −1, 1), (−1, 1, 1, −1, 1, −1, 1, −1), (−1, −1, −1, −1, 1, 1, 1, 1), (−1, −1, 1, 1, 1, 1, −1, −1), (−1, −1, −1,
−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,
−1, 1), (−1, 1, 1, −1, 1, −1, 1, −1), (−1, −1, −1, −1, 1, 1, 1, 1), (−1, −1, 1, 1, 1, 1, −1, −1), (−1, −1, −1, −1, −1, −1, −1, −1), (1, 1,
−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (−1, 1, 1, −1, 1, −1, 1,
−1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1,
−1, 1, 1, −1), (−1, 1, −1, 1, 1, −1, −1, 1), (−1, 1, 1, −1, −1, 1, −1, 1), (−1, 1, 1, −1, 1, −1, 1, −1), (−1, −1, −1, −1, 1, 1, 1, 1), (−1,
−1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1, −1, 1),
(−1, 1, 1, −1, −1, 1, −1, 1), (−1, 1, 1, −1, 1, −1, 1, −1), (−1, −1, −1, −1, 1, 1, 1, 1), (1, 1, −1, −1, −1, −1, 1, 1), (−1, −1, −1, −1,
−1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1, −1, 1),
(−1, 1, 1, −1, 1, −1, 1, −1), (−1, −1, −1, −1, 1, 1, 1, 1), (1, 1, −1, −1, −1, −1, 1, 1), (−1, −1, −1, −1, −1, −1, −1, −1), (1, 1, −1,
−1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (−1, 1, 1, −1, 1, −1, 1, −1),
(−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1,
−1, 1, 1, −1), (−1, 1, −1, 1, 1, −1, −1, 1), (−1, 1, 1, −1, −1, 1, −1, 1), (−1, 1, 1, −1, 1, −1, 1, −1), (−1, −1, −1, −1, 1, 1, 1, 1),
(1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,
−1, 1), (−1, 1, 1, −1, −1, 1, −1, 1), (−1, 1, 1, −1, 1, −1, 1, −1), (−1, −1, 1, 1, 1, 1, −1, −1), (1, 1, 1, 1, −1, −1, −1, −1), (−1, −1, −1,
−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,
−1, 1), (−1, 1, 1, −1, 1, −1, 1, −1), (−1, −1, 1, 1, 1, 1, −1, −1), (1, 1, 1, 1, −1, −1, −1, −1), (−1, −1, −1, −1, −1, −1, −1, −1), (1, 1,
−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (−1, 1, 1, −1, 1, −1, 1,
−1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,
−1, 1, 1, −1), (−1, 1, −1, 1, 1, −1, −1, 1), (−1, 1, 1, −1, −1, 1, −1, 1), (−1, 1, 1, −1, 1, −1, 1, −1), (−1, −1, 1, 1, 1, 1, −1, −1),
(1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,
−1, 1), (−1, 1, 1, −1, −1, 1, −1, 1), (−1, 1, 1, −1, 1, −1, 1, −1), (1, 1, −1, −1, −1, −1, 1, 1), (1, 1, 1, 1, −1, −1, −1, −1), (−1, −1, −1,
−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,
−1, 1), (−1, 1, 1, −1, 1, −1, 1, −1), (1, 1, −1, −1, −1, −1, 1, 1), (1, 1, 1, 1, −1, −1, −1, −1), (−1, −1, −1, −1, −1, −1, −1, −1), (1, 1,
−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (−1, 1, 1, −1, 1, −1, 1,
−1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,
−1, 1, 1, −1), (−1, 1, −1, 1, 1, −1, −1, 1), (−1, 1, 1, −1, −1, 1, −1, 1), (−1, 1, 1, −1, 1, −1, 1, −1), (1, 1, −1, −1, −1, −1, 1, 1),
(1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,
−1, 1), (−1, 1, 1, −1, −1, 1, −1, 1), (1, −1, −1, 1, −1, 1, −1, 1), (−1, −1, −1, −1, 1, 1, 1, 1), (−1, −1, 1, 1, 1, 1, −1, −1), (−1, −1, −1,
−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,
−1, 1), (1, −1, −1, 1, −1, 1, −1, 1), (−1, −1, −1, −1, 1, 1, 1, 1), (−1, −1, 1, 1, 1, 1, −1, −1), (−1, −1, −1, −1, −1, −1, −1, −1), (1, 1,
−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (1, −1, −1, 1, −1, 1,
−1, 1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1,
−1, 1, −1, 1, 1, −1), (−1, 1, −1, 1, 1, −1, −1, 1), (−1, 1, 1, −1, −1, 1, −1, 1), (1, −1, −1, 1, −1, 1, −1, 1), (−1, −1, −1, −1, 1, 1, 1, 1),
(−1, −1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,
−1, 1), (−1, 1, 1, −1, −1, 1, −1, 1), (1, −1, −1, 1, −1, 1, −1, 1), (−1, −1, −1, −1, 1, 1, 1, 1), (1, 1, −1, −1, −1, −1, 1, 1), (−1, −1, −1,
−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,
−1, 1), (1, −1, −1, 1, −1, 1, −1, 1), (−1, −1, −1, −1, 1, 1, 1, 1), (1, 1, −1, −1, −1, −1, 1, 1), (−1, −1, −1, −1, −1, −1, −1, −1), (1, 1,
−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (1, −1, −1, 1, −1, 1,
−1, 1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1,
−1, 1, −1, 1, 1, −1), (−1, 1, −1, 1, 1, −1, −1, 1), (−1, 1, 1, −1, −1, 1, −1, 1), (1, −1, −1, 1, −1, 1, −1, 1), (−1, −1, −1, −1, 1, 1, 1, 1),
(1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,
−1, 1), (−1, 1, 1, −1, −1, 1, −1, 1), (1, −1, −1, 1, −1, 1, −1, 1), (−1, −1, 1, 1, 1, 1, −1, −1), (1, 1, 1, 1, −1, −1, −1, −1), (−1, −1, −1,
−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,
−1, 1), (1, −1, −1, 1, −1, 1, −1, 1), (−1, −1, 1, 1, 1, 1, −1, −1), (1, 1, 1, 1, −1, −1, −1, −1), (−1, −1, −1, −1, −1, −1, −1, −1), (1, 1,
−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (1, −1, −1, 1, −1, 1,
−1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1,
−1, 1, −1, 1, 1, −1), (−1, 1, −1, 1, 1, −1, −1, 1), (−1, 1, 1, −1, −1, 1, −1, 1), (1, −1, −1, 1, −1, 1, −1, 1), (−1, −1, 1, 1, 1, 1, −1, −1),
(1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,
−1, 1), (−1, 1, 1, −1, −1, 1, −1, 1), (1, −1, −1, 1, −1, 1, −1, 1), (1, 1, −1, −1, −1, −1, 1, 1), (1, 1, 1, 1, −1, −1, −1, −1), (−1, −1, −1,
−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,
−1, 1), (1, −1, −1, 1, −1, 1, −1, 1), (1, 1, −1, −1, −1, −1, 1, 1), (1, 1, 1, 1, −1, −1, −1, −1), (−1, −1, −1, −1, −1, −1, −1, −1), (1, 1,
−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (1, −1, −1, 1, −1, 1,
−1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1,
−1, 1, −1, 1, 1, −1), (−1, 1, −1, 1, 1, −1, −1, 1), (−1, 1, 1, −1, −1, 1, −1, 1), (1, −1, −1, 1, −1, 1, −1, 1), (1, 1, −1, −1, −1, −1, 1, 1),
(1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,
−1, 1), (−1, 1, 1, −1, 1, −1, 1, −1), (1, −1, −1, 1, 1, −1, 1, −1), (−1, −1, −1, −1, 1, 1, 1, 1), (−1, −1, 1, 1, 1, 1, −1, −1), (−1, −1, −1,
−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, 1, −1, 1,
−1), (1, −1, −1, 1, 1, −1, 1, −1), (−1, −1, −1, −1, 1, 1, 1, 1), (−1, −1, 1, 1, 1, 1, −1, −1), (−1, −1, −1, −1, −1, −1, −1, −1), (1, 1, −1,
−1, 1, 1, −1, −1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), TABLE 4-continued (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, −1, −1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, −1, −1, 1, 1, 1, 1), (1, 1, −1, −1, −1, −1, 1, 1), (−1, −1, −1, −1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, 1, 1, 1, 1, −1, −1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (1, 1, −1, −1, −1, −1, 1, 1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (−1, −1, 1, 1, 1, 1, −1, −1), (−1, −1, −1, −1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (1, 1, −1, −1, −1, −1, 1, 1), (−1, −1, −1, −1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, 1, 1, 1, 1, −1, −1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (1, 1, −1, −1, −1, −1, 1, 1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (−1, −1, 1, 1, 1, 1, −1, −1), (−1, −1, −1, −1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, −1, −1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, 1, 1, 1, 1, −1, −1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (1, 1, −1, −1, −1, −1, 1, 1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1, TABLE 4-continued –1, 1), (1, –1, –1, 1, –1, 1, –1, 1), (1, –1, 1, –1, –1, 1, 1, –1), (–1, –1, –1, –1, 1, 1, 1, 1), (–1, –1, 1, 1, 1, 1, –1, –1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (–1, –1, –1, –1, 1, 1, 1, 1), (–1, –1, 1, 1, 1, 1, –1, –1), (–1, –1, –1, –1, –1, –1, –1, –1), (1, 1, –1, –1, 1, 1, –1, –1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (–1, –1, –1, –1, 1, 1, 1, 1), (–1, –1, 1, 1, 1, 1, –1, –1), (–1, –1, 1, 1, –1, –1, 1, 1), (1, 1, 1, 1, 1, 1, 1, 1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (–1, –1, –1, –1, 1, 1, 1, 1), (–1, –1, 1, 1, 1, 1, –1, –1), (1, 1, –1, –1, 1, 1, –1, –1), (1, 1, 1, 1, 1, 1, 1, 1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (–1, –1, –1, –1, 1, 1, 1, 1), (1, 1, –1, –1, –1, –1, 1, 1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (–1, –1, –1, –1, 1, 1, 1, 1), (1, 1, –1, –1, –1, –1, 1, 1), (–1, –1, –1, –1, –1, –1, –1, –1), (1, 1, –1, –1, 1, 1, –1, –1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (–1, –1, –1, –1, 1, 1, 1, 1), (1, 1, –1, –1, –1, –1, 1, 1), (–1, –1, 1, 1, –1, –1, 1, 1), (1, 1, 1, 1, 1, 1, 1, 1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (–1, –1, –1, –1, 1, 1, 1, 1), (1, 1, –1, –1, –1, –1, 1, 1), (1, 1, –1, –1, 1, 1, –1, –1), (1, 1, 1, 1, 1, 1, 1, 1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (–1, –1, 1, 1, 1, 1, –1, –1), (1, 1, 1, 1, –1, –1, –1, –1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (–1, –1, 1, 1, 1, 1, –1, –1), (1, 1, 1, 1, –1, –1, –1, –1), (–1, –1, –1, –1, –1, –1, –1, –1), (1, 1, –1, –1, 1, 1, –1, –1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (–1, –1, 1, 1, 1, 1, –1, –1), (1, 1, 1, 1, –1, –1, –1, –1), (–1, –1, 1, 1, –1, –1, 1, 1), (1, 1, 1, 1, 1, 1, 1, 1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (–1, –1, 1, 1, 1, 1, –1, –1), (1, 1, 1, 1, –1, –1, –1, –1), (1, 1, –1, –1, 1, 1, –1, –1), (1, 1, 1, 1, 1, 1, 1, 1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (1, 1, –1, –1, –1, –1, 1, 1), (1, 1, 1, 1, –1, –1, –1, –1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (1, 1, –1, –1, –1, –1, 1, 1), (1, 1, 1, 1, –1, –1, –1, –1), (–1, –1, –1, –1, –1, –1, –1, –1), (1, 1, –1, –1, 1, 1, –1, –1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (1, 1, –1, –1, –1, –1, 1, 1), (1, 1, 1, 1, –1, –1, –1, –1), (–1, –1, 1, 1, –1, –1, 1, 1), (1, 1, 1, 1, 1, 1, 1, 1)}, {(–1, 1, –1, 1, –1, 1, 1, –1), (–1, 1, 1, –1, –1, 1, –1, 1), (1, –1, –1, 1, –1, 1, –1, 1), (1, –1, 1, –1, –1, 1, 1, –1), (1, 1, –1, –1, –1, –1, 1, 1), (1, 1, 1, 1, –1, –1, –1, –1), (1, 1, –1, –1, 1, 1, –1, –1), (1, 1, 1, 1, 1, 1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, –1, –1, 1, –1, 1, 1), (–1, 1, 1, 1, 1, –1, –1, –1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, –1, –1, 1, –1, 1, 1), (–1, 1, 1, 1, 1, –1, –1, –1), (–1, –1, –1, –1, –1, –1, –1, –1), (1, 1, –1, –1, 1, 1, –1, –1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, –1, –1, 1, –1, 1, 1), (–1, 1, 1, 1, 1, –1, –1, –1), (–1, –1, 1, 1, –1, –1, 1, 1), (1, 1, 1, 1, 1, 1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, –1, –1, 1, –1, 1, 1), (–1, 1, 1, 1, 1, –1, –1, –1), (1, 1, –1, –1, 1, 1, –1, –1), (1, 1, 1, 1, 1, 1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, –1, –1, 1, –1, 1, 1), (1, –1, –1, –1, –1, 1, 1, 1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, –1, –1, 1, –1, 1, 1), (1, –1, –1, –1, –1, 1, 1, 1), (–1, –1, –1, –1, –1, –1, –1, –1), (1, 1, –1, –1, 1, 1, –1, –1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, –1, –1, 1, –1, 1, 1), (1, –1, –1, –1, –1, 1, 1, 1), (–1, –1, 1, 1, –1, –1, 1, 1), (1, 1, 1, 1, 1, 1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, –1, –1, 1, –1, 1, 1), (1, –1, –1, –1, –1, 1, 1, 1), (1, 1, –1, –1, 1, 1, –1, –1), (1, 1, 1, 1, 1, 1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, 1, 1, 1, –1, –1, –1), (1, –1, 1, 1, –1, 1, –1, –1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, 1, 1, 1, –1, –1, –1), (1, –1, 1, 1, –1, 1, –1, –1), (–1, –1, –1, –1, –1, –1, –1, –1), (1, 1, –1, –1, 1, 1, –1, –1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, 1, 1, 1, –1, –1, –1), (1, –1, 1, 1, –1, 1, –1, –1), (–1, –1, 1, 1, –1, –1, 1, 1), (1, 1, 1, 1, 1, 1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (–1, 1, 1, 1, 1, –1, –1, –1), (1, –1, 1, 1, –1, 1, –1, –1), (1, 1, –1, –1, 1, 1, –1, –1), (1, 1, 1, 1, 1, 1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (1, –1, –1, –1, –1, 1, 1, 1), (1, –1, 1, 1, –1, 1, –1, –1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (1, –1, –1, –1, –1, 1, 1, 1), (1, –1, 1, 1, –1, 1, –1, –1), (–1, –1, –1, –1, –1, –1, –1, –1), (1, 1, –1, –1, 1, 1, –1, –1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (1, –1, –1, –1, –1, 1, 1, 1), (1, –1, 1, 1, –1, 1, –1, –1), (–1, –1, 1, 1, –1, –1, 1, 1), (1, 1, 1, 1, 1, 1, 1, 1)}, {(–1, 1, –1, 1, –1, 1, 1, –1), (–1, 1, 1, –1, –1, 1, –1, 1), (1, 1, –1, 1, –1, –1, –1, 1), (1, 1, 1, –1, –1, –1, 1, –1), (1, –1, –1, –1, –1, 1, 1, 1), (1, –1, 1, 1, –1, 1, –1, –1), (1, 1, –1, –1, 1, 1, –1, –1), (1, 1, 1, 1, 1, 1, 1, 1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, –1, –1, 1, 1, 1, 1), (–1, –1, 1, 1, 1, 1, –1, –1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, –1, –1, 1, 1, 1, 1), (–1, –1, 1, 1, 1, 1, –1, –1), (–1, –1, –1, –1, –1, –1, –1, –1), (1, 1, –1, –1, 1, 1, –1, –1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, –1, –1, 1, 1, 1, 1), (–1, –1, 1, 1, 1, 1, –1, –1), (–1, –1, 1, 1, –1, –1, 1, 1), (1, 1, 1, 1, 1, 1, 1, 1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, –1, –1, 1, 1, 1, 1), (–1, –1, 1, 1, 1, 1, –1, –1), (1, 1, –1, –1, 1, 1, –1, –1), (1, 1, 1, 1, 1, 1, 1, 1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, –1, –1, 1, 1, 1, 1), (1, 1, –1, –1, –1, –1, 1, 1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, –1, –1, 1, 1, 1, 1), (1, 1, –1, –1, –1, –1, 1, 1), (–1, –1, –1, –1, –1, –1, –1, –1), (1, 1, –1, –1, 1, 1, –1, –1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, –1, –1, 1, 1, 1, 1), (1, 1, –1, –1, –1, –1, 1, 1), (–1, –1, 1, 1, –1, –1, 1, 1), (1, 1, 1, 1, 1, 1, 1, 1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, –1, –1, 1, 1, 1, 1), (1, 1, –1, –1, –1, –1, 1, 1), (1, 1, –1, –1, 1, 1, –1, –1), (1, 1, 1, 1, 1, 1, 1, 1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, 1, 1, 1, 1, –1, –1), (1, 1, 1, 1, –1, –1, –1, –1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, 1, 1, 1, 1, –1, –1), (1, 1, 1, 1, –1, –1, –1, –1), (–1, –1, –1, –1, –1, –1, –1, –1), (1, 1, –1, –1, 1, 1, –1, –1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, 1, 1, 1, 1, –1, –1), (1, 1, 1, 1, –1, –1, –1, –1), (–1, –1, 1, 1, –1, –1, 1, 1), (1, 1, 1, 1, 1, 1, 1, 1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (–1, –1, 1, 1, 1, 1, –1, –1), (1, 1, 1, 1, –1, –1, –1, –1), (1, 1, –1, –1, 1, 1, –1, –1), (1, 1, 1, 1, 1, 1, 1, 1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (1, 1, –1, –1, –1, –1, 1, 1), (1, 1, 1, 1, –1, –1, –1, –1), (–1, –1, –1, –1, –1, –1, –1, –1), (–1, –1, 1, 1, –1, –1, 1, 1)}, {(–1, 1, –1, 1, –1, 1, 1, –1), (–1, 1, 1, –1, 1, –1, 1, –1), (1, –1, –1, 1, 1, –1, 1, –1), (1, –1, 1, –1, –1, 1, 1, –1), (1, 1, –1, –1, –1, –1, 1, 1), (1, 1, 1, 1, –1, –1, –1, –1), (–1, –1, –1, –1, –1, –1, –1, TABLE 4-continued −1), (1, 1, −1, −1, 1, 1, −1, −1)}, {(−1, 1, −1, 1, −1, 1, 1, −1), (−1, 1, 1, −1, 1, −1, 1, −1), (1, −1, −1, 1, 1, −1, 1, −1), (1, −1, 1,
−1, −1, 1, 1, −1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)},
{(−1, 1, −1, 1, −1, 1, 1, −1), (−1, 1, 1, −1, 1, −1, 1, −1), (1, −1, −1, 1, 1, −1, 1, −1), (1, −1, 1, −1, −1, 1, 1, −1), (1, 1, −1, −1, −1,
−1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (1, −1,
−1, 1, −1, 1, −1, 1), (1, −1, −1, 1, 1, −1, 1, −1), (1, −1, 1, −1, −1, 1, 1, −1), (−1, −1, −1, −1, 1, 1, 1, 1), (−1, −1, 1, 1, 1, 1, −1, −1),
(−1, −1, −1, −1, −1, −1, −1, −1), (−1, −1, 1, 1, −1, −1, 1, 1)}, {(−1, 1, −1, 1, −1, 1, 1, −1), (1, −1, −1, 1, −1, 1, −1, 1), (1, −1,
−1, 1, 1, −1, 1, −1), (1, −1, 1, −1, −1, 1, 1, −1), (−1, −1, −1, −1, 1, 1, 1, 1), (−1, −1, 1, 1, 1, 1, −1, −1), (−1, −1, −1, −1, −1, −1, −1,
−1), (1, 1, −1, −1, 1, 1, −1, −1)}, {(−1, 1, −1, 1, −1, 1, 1, −1), (1, −1, −1, 1, −1, 1, −1, 1), (1, −1, −1, 1, 1, −1, 1, −1), (1, −1, 1,
−1, −1, 1, 1, −1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)},
{(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (−1, −1, −1,
−1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (1,
−1, −1, 1, −1, 1, −1, 1), (1, −1, −1, 1, 1, −1, 1, −1), (1, −1, 1, −1, −1, 1, 1, −1), (−1, −1, −1, −1, 1, 1, 1, 1), (1, 1, −1, −1, −1,
−1, 1, 1), (−1, −1, −1, −1, −1, −1, −1, −1), (−1, −1, 1, 1, −1, −1, 1, 1)}, {(−1, 1, −1, 1, −1, 1, 1, −1), (1, −1, −1, 1, −1, 1, −1, 1),
(1, −1, −1, 1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, −1, −1,
−1, −1, −1, −1), (1, 1, −1, −1, 1, 1, −1, −1)}, {(−1, 1, −1, 1, −1, 1, 1, −1), (1, −1, −1, 1, −1, 1, −1, 1), (1, −1, −1, 1, 1, −1, 1, −1),
(1, −1, 1, −1, −1, 1, 1, −1), (−1, −1, −1, −1, 1, 1, 1, 1), (1, 1, −1, −1, −1, −1, 1, 1), (−1, −1, 1, 1, −1, −1, 1, 1),
(1, 1, 1, 1, 1, 1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1, −1,
−1, 1, 1, −1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)},
{(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (−1, −1, 1, 1, 1, 1,
−1, −1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, −1, 1, 1, −1),
(1, −1, −1, 1, −1, 1, −1, 1), (1, −1, −1, 1, 1, −1, 1, −1), (1, −1, 1, −1, −1, 1, 1, −1), (−1, −1, 1, 1, 1, 1, −1, −1), (1, 1, 1, 1, −1, −1,
−1, −1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, −1, 1, −1, 1),
(1, −1, −1, 1, 1, −1, 1, −1), (1, −1, 1, −1, −1, 1, 1, −1), (−1, −1, 1, 1, 1, 1, −1, −1), (1, 1, 1, 1, −1, −1, −1, −1), (−1, −1, 1, 1, −1,
−1, 1, 1), (1, 1, 1, 1, 1, 1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1,
−1, −1, 1, 1, −1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)},
{(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (1, 1, −1, −1, −1,
−1, 1, 1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, −1, 1, 1, −1),
(1, −1, −1, 1, −1, 1, −1, 1), (1, −1, −1, 1, 1, −1, 1, −1), (1, −1, 1, −1, −1, 1, 1, −1), (1, 1, −1, −1, −1, −1, 1, 1), (1, 1, 1, 1, −1, −1,
−1, −1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, −1, 1, −1, 1),
(1, −1, −1, 1, 1, −1, 1, −1), (1, −1, 1, −1, −1, 1, 1, −1), (1, 1, −1, −1, −1, −1, 1, 1), (1, 1, 1, 1, −1, −1, −1, −1), (−1, −1, 1, 1, −1,
−1, 1, 1), (1, 1, 1, 1, 1, 1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1,
−1, −1, 1, 1, −1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)},
{(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, −1, −1, 1,
−1, 1, 1), (−1, 1, 1, 1, 1, −1, −1, −1), (−1, −1, −1, −1, −1, −1, −1, −1), (−1, −1, 1, 1, −1, −1, 1, 1)}, {(−1, 1, −1, 1, −1, 1, 1, −1),
(1, −1, −1, 1, 1, −1, 1, −1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1,
−1, −1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, 1, −1, 1, −1),
(1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, 1, 1, −1,
−1, 1, 1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1,
−1, −1, −1, 1, −1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)},
{(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, −1, −1, 1,
−1, 1, 1), (1, −1, −1, −1, −1, 1, 1, 1), (−1, −1, −1, −1, −1, −1, −1, −1), (−1, −1, 1, 1, −1, −1, 1, 1)}, {(−1, 1, −1, 1, −1, 1, 1, −1),
(1, −1, −1, 1, 1, −1, 1, −1), (1, 1, −1, 1, −1, −1, −1, 1), (1, 1, 1, −1, −1, −1, 1, −1), (−1, 1, −1, −1, 1, −1, 1, 1), (1, −1, −1, −1,
−1, 1, 1, 1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, 1, −1, 1, −1),
(1, 1, −1, 1, −1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, 1, 1, −1,
−1, 1, 1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1,
−1, −1, −1, 1, −1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)},
{(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, 1, 1, 1, −1,
−1, −1), (1, −1, 1, 1, −1, 1, −1, −1), (−1, −1, −1, −1, −1, −1, −1, −1), (−1, −1, 1, 1, −1, −1, 1, 1)}, {(−1, 1, −1, 1, −1, 1, 1, −1),
(1, −1, −1, 1, 1, −1, 1, −1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1,
−1, −1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, 1, −1, 1, −1),
(1, 1, −1, 1, −1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, 1, 1, −1,
−1, 1, 1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1,
−1, −1, −1, 1, −1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)},
{(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (1, −1, −1, −1,
−1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, 1, −1, 1, −1, 1, 1, −1),
(1, −1, −1, 1, 1, −1, 1, −1), (1, 1, −1, 1, −1, −1, −1, 1), (1, 1, 1, −1, −1, −1, 1, −1), (1, −1, −1, −1, −1, 1, 1, 1), (1, −1, 1, 1, −1, 1,
−1, −1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, 1, −1, 1, −1),
(1, 1, −1, 1, −1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, 1, 1, −1,
−1, 1, 1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1,
−1, −1, −1, 1, −1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)},
{(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (−1, −1, −1,
−1, 1, 1, 1, 1), (−1, −1, 1, 1, 1, 1, −1, −1), (−1, −1, −1, −1, −1, −1, −1, −1), (−1, −1, 1, 1, −1, −1, 1, 1)}, {(−1, 1, −1, 1, 1, −1,
−1, 1), (−1, 1, 1, −1, −1, 1, −1, 1), (−1, 1, 1, −1, 1, −1, 1, −1), (1, −1, 1, −1, 1, −1, −1, 1), (−1, −1, −1, −1, 1, 1, 1, 1), (−1,
−1, 1, 1, 1, 1, −1, −1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1,
−1, 1, −1, 1), (−1, 1, 1, −1, 1, −1, 1, −1), (1, −1, 1, −1, 1, −1, −1, 1), (−1, −1, −1, −1, 1, 1, 1, 1), (−1, −1, 1, 1, 1, 1, −1, −1), (−1,
−1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1, −1, 1), (−1, 1, 1, −1, 1, −1, 1, −1),
(1, −1, 1, −1, 1, −1, −1, 1), (−1, −1, −1, −1, 1, 1, 1, 1), (−1, −1, 1, 1, 1, 1, −1, −1), (1, 1, −1, −1, 1, 1, −1, −1),
(1, 1, 1, 1, 1, 1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1,
−1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1, −1, −1, 1, 1)},
{(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (−1, −1, −1,
−1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1, −1, 1, 1, −1,
−1, 1), (−1, 1, 1, −1, −1, 1, −1, 1), (−1, 1, 1, −1, 1, −1, 1, −1), (1, −1, 1, −1, 1, −1, −1, 1), (−1, −1, −1, −1, 1, 1, 1, 1), (1, 1, −1,
−1, −1, −1, 1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1, −1, 1),
(−1, 1, 1, −1, 1, −1, 1, −1), (1, −1, 1, −1, 1, −1, −1, 1), (−1, −1, −1, −1, 1, 1, 1, 1), (1, 1, −1, −1, −1, −1, 1, 1), (1, 1, −1, −1, 1, 1,
−1, −1), (1, 1, 1, 1, 1, 1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1,
−1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1, −1,
−1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (−1,
−1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, 1,
−1, −1, 1), (−1, 1, 1, −1, −1, 1, −1, 1), (−1, 1, 1, −1, 1, −1, 1, −1), (1, −1, 1, −1, 1, −1, −1, 1), (−1, −1, 1, 1, 1, 1, −1, −1),
(1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1, TABLE 4-continued −1, 1), (−1, 1, 1, −1, 1, −1, 1, −1), (1, −1, 1, −1, 1, −1, −1, 1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (1, 1, −1, 1, −1, −1, 1, −1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, 1, −1, 1, 1, −1, 1), (1, 1, 1, −1, −1, −1, −1, 1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (1, 1, −1, 1, −1, −1, 1, −1), (1, 1, 1, −1, −1, −1, −1, 1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (1, 1, −1, 1, −1, −1, 1, −1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, TABLE 4-continued −1, −1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1),
(−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1,
−1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, 1, −1, 1, 1, −1, 1),
(1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,
−1, 1, −1), (1, −1, −1, −1, 1, −1, 1, 1), (1, −1, 1, 1, 1, −1, −1, −1), (−1, −1, 1, −1, 1, 1, −1, 1), (1, 1, 1, −1, −1, −1, −1, 1), (1, 1,
−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, −1, 1, −1, 1, 1),
(1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,
−1, −1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1),
(1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1,
−1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (1, 1, −1, 1, −1, −1, 1, −1),
(1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,
−1, 1, −1), (1, −1, −1, −1, 1, −1, 1, 1), (1, −1, 1, 1, 1, −1, −1, −1), (1, 1, −1, 1, −1, −1, 1, −1), (1, 1, 1, −1, −1, −1, −1, 1), (1, 1,
−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, 1, 1, −1, 1, −1),
(1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (−1, −1, 1, 1,
−1, −1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1),
(−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(−1, 1,
−1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, −1, −1, 1, 1, 1, 1),
(−1, −1, 1, 1, 1, 1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,
−1, 1, −1), (1, −1, −1, 1, 1, −1, 1, −1), (1, −1, 1, −1, 1, −1, −1, 1), (−1, −1, −1, −1, 1, 1, 1, 1), (−1, −1, 1, 1, 1, 1, −1, −1), (1, 1,
−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, 1, 1, −1, 1, −1),
(1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1,
−1, −1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1),
(−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1,
−1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, −1, −1, 1, 1, 1, 1),
(1, 1, −1, −1, −1, −1, 1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,
−1, 1, −1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (1, 1,
−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, 1, 1, −1, 1, −1),
(1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1,
−1, −1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1),
(−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1,
−1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, 1, 1, 1, 1, −1, −1),
(1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,
−1, 1, −1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (1, 1,
−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, 1, 1, −1, 1, −1),
(1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1,
−1, −1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1),
(1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1,
−1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (1, 1, −1, −1, −1, −1, 1, 1),
(1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,
−1, 1, −1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (1, 1,
−1, −1, 1, 1, −1, −1), (1, 1, 1, 1, 1, 1, 1, 1)}, {(−1, 1, −1, 1, 1, −1, −1, 1), (−1, 1, 1, 1, −1, 1, −1, −1), (1, −1, −1, 1, −1, 1, −1, 1),
(1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1,
−1, −1, 1, 1)}, {(−1, 1, −1, 1, 1, −1, −1, 1), (−1, 1, 1, 1, −1, 1, −1, −1), (1, −1, −1, 1, −1, 1, −1, 1), (1, −1, 1, 1, 1, −1, −1, −1),
(−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1,
−1, 1, 1, −1, −1, 1), (−1, 1, 1, 1, −1, 1, −1, −1), (1, −1, −1, 1, −1, 1, −1, 1), (1, −1, 1, 1, 1, −1, −1, −1), (−1, −1, −1, 1, 1, 1, 1, −1),
(−1, −1, 1, −1, 1, 1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, 1, −1, 1,
−1, −1), (1, −1, −1, 1, −1, 1, −1, 1), (1, −1, 1, 1, 1, −1, −1, −1), (−1, −1, −1, 1, 1, 1, 1, −1), (−1, −1, 1, −1, 1, 1, −1, 1), (1, 1, −1,
−1, 1, 1, −1, −1), (1, 1, 1, 1, 1, 1, 1, 1)}, {(−1, 1, −1, 1, 1, −1, −1, 1), (−1, 1, 1, 1, −1, 1, −1, −1), (1, −1, −1, 1, −1, 1, −1, 1),
(1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1,
−1, −1, 1, 1)}, {(−1, 1, −1, 1, 1, −1, −1, 1), (−1, 1, 1, 1, −1, 1, −1, −1), (1, −1, −1, 1, −1, 1, −1, 1), (1, −1, 1, 1, 1, −1, −1, −1),
(−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1,
−1, 1, 1, −1, −1, 1), (−1, 1, 1, 1, −1, 1, −1, −1), (1, −1, −1, 1, −1, 1, −1, 1), (1, −1, 1, 1, 1, −1, −1, −1), (−1, −1, −1, 1, 1, 1, 1, −1),
(1, 1, −1, 1, −1, −1, 1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, 1, −1, 1,
−1, −1), (1, −1, −1, 1, −1, 1, −1, 1), (1, −1, 1, 1, 1, −1, −1, −1), (−1, −1, −1, 1, 1, 1, 1, −1), (1, 1, −1, 1, −1, −1, 1, −1), (1, 1, −1,
−1, 1, 1, −1, −1), (1, 1, 1, 1, 1, 1, 1, 1)}, {(−1, 1, −1, 1, 1, −1, −1, 1), (−1, 1, 1, 1, −1, 1, −1, −1), (1, −1, −1, 1, −1, 1, −1, 1),
(1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1,
−1, −1, 1, 1)}, {(−1, 1, −1, 1, 1, −1, −1, 1), (−1, 1, 1, 1, −1, 1, −1, −1), (1, −1, −1, 1, −1, 1, −1, 1), (1, −1, 1, 1, 1, −1, −1, −1),
(−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1,
−1, 1, 1, −1, −1, 1), (−1, 1, 1, 1, −1, 1, −1, −1), (1, −1, −1, 1, −1, 1, −1, 1), (1, −1, 1, 1, 1, −1, −1, −1), (−1, −1, 1, −1, 1, 1, −1, 1),
(1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, 1, −1, 1,
−1, −1), (1, −1, −1, 1, −1, 1, −1, 1), (1, −1, 1, 1, 1, −1, −1, −1), (−1, −1, 1, −1, 1, 1, −1, 1), (1, 1, 1, −1, −1, −1, −1, 1), (1, 1, −1,
−1, 1, 1, −1, −1), (1, 1, 1, 1, 1, 1, 1, 1)}, {(−1, 1, −1, 1, 1, −1, −1, 1), (−1, 1, 1, 1, −1, 1, −1, −1), (1, −1, −1, 1, −1, 1, −1, 1),
(1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,
−1, −1, 1, 1)}, {(−1, 1, −1, 1, 1, −1, −1, 1), (−1, 1, 1, 1, −1, 1, −1, −1), (1, −1, −1, 1, −1, 1, −1, 1), (1, −1, 1, 1, 1, −1, −1, −1),
(1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1,
−1, 1, 1, −1, −1, 1), (−1, 1, 1, 1, −1, 1, −1, −1), (1, −1, −1, 1, −1, 1, −1, 1), (1, −1, 1, 1, 1, −1, −1, −1), (1, 1, −1, 1, −1, −1, 1, −1),
(1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, 1, −1, 1,
−1, −1), (1, −1, −1, 1, −1, 1, −1, 1), (1, −1, 1, 1, 1, −1, −1, −1), (1, 1, −1, 1, −1, −1, 1, −1), (1, 1, 1, −1, −1, −1, −1, 1), (1, 1, −1,
−1, 1, 1, −1, −1), (1, 1, 1, 1, 1, 1, 1, 1)}, {(−1, 1, −1, 1, 1, −1, −1, 1), (1, −1, −1, −1, 1, −1, 1, 1), (1, −1, −1, 1, −1, 1, −1, 1),
(1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1,
−1, −1, 1, 1)}, {(−1, 1, −1, 1, 1, −1, −1, 1), (1, −1, −1, −1, 1, −1, 1, 1), (1, −1, −1, 1, −1, 1, −1, 1), (1, −1, 1, 1, 1, −1, −1, −1),
(−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1,
−1, 1, 1, −1, −1, 1), (1, −1, −1, −1, 1, −1, 1, 1), (1, −1, −1, 1, −1, 1, −1, 1), (1, −1, 1, 1, 1, −1, −1, −1), (−1, −1, −1, 1, 1, 1, 1, −1),
(−1, −1, 1, −1, 1, 1, −1, 1), (−1, −1, 1, 1, −1, −1, 1, 1), (1, 1, 1, 1, 1, 1, 1, 1)}, {(−1, 1, −1, 1, 1, −1, −1, 1), (1, −1, −1, −1, 1,
−1, 1, 1), (1, −1, −1, 1, −1, 1, −1, 1), (1, −1, 1, 1, 1, −1, −1, −1), (−1, −1, −1, 1, 1, 1, 1, −1), (−1, −1, 1, −1, 1, 1, −1, 1), (1, 1,
−1, −1, 1, 1, −1, −1), (1, 1, 1, 1, 1, 1, 1, 1)}, {(−1, 1, −1, 1, 1, −1, −1, 1), (1, −1, −1, −1, 1, −1, 1, 1), (1, −1, −1, 1, −1, 1, −1, 1),
(1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1,
−1, −1, 1, 1)}, {(−1, 1, −1, 1, 1, −1, −1, 1), (1, −1, −1, −1, 1, −1, 1, 1), (1, −1, −1, 1, −1, 1, −1, 1), (1, −1, 1, 1, 1, −1, −1, −1),
(−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1,
−1, 1, 1, −1, −1, 1), (1, −1, −1, −1, 1, −1, 1, 1), (1, −1, −1, 1, −1, 1, −1, 1), (1, −1, 1, 1, 1, −1, −1, −1), (−1, −1, −1, 1, 1, 1, 1, −1), TABLE 4-continued (1, 1, −1, 1, −1, −1, 1, −1), (−1, −1, 1, 1, −1, −1, 1, 1), (1, 1, 1, 1, 1, 1, 1, 1)}, {(−1, 1, −1, 1, 1, −1, −1, 1), (1, −1, −1, −1, 1, −1, 1, 1), (1, −1, −1, 1, −1, 1, −1, 1), (1, −1, 1, 1, 1, −1, −1, −1), (−1, −1, −1, 1, 1, 1, 1, −1), (1, 1, −1, 1, −1, −1, 1, −1), (1, 1, −1, −1, 1, 1, −1, −1), (1, 1, 1, 1, 1, 1, 1, 1)}, {(−1, 1, −1, 1, 1, −1, −1, 1), (1, −1, −1, −1, 1, −1, 1, 1), (1, −1, −1, 1, −1, 1, −1, 1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1, −1, 1, 1)}, {(−1, 1, −1, 1, 1, −1, −1, 1), (1, −1, −1, −1, 1, −1, 1, 1), (1, −1, −1, 1, −1, 1, −1, 1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1, 1, 1, −1, −1, 1), (1, −1, −1, −1, 1, −1, 1, 1), (1, −1, −1, 1, −1, 1, −1, 1), (1, −1, 1, 1, 1, −1, −1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (1, −1, −1, −1, 1, −1, 1, 1), (1, −1, −1, 1, −1, 1, −1, 1), (1, −1, 1, 1, 1, −1, −1, −1), (−1, −1, 1, −1, 1, 1, −1, 1), (1, 1, 1, −1, −1, −1, −1, 1), (1, 1, −1, −1, 1, 1, −1, −1), (1, 1, 1, 1, 1, 1, 1, 1)}, {(−1, 1, −1, 1, 1, −1, −1, 1), (1, −1, −1, −1, 1, −1, 1, 1), (1, −1, −1, 1, −1, 1, −1, 1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1, −1, 1, 1)}, {(−1, 1, −1, 1, 1, −1, −1, 1), (1, −1, −1, −1, 1, −1, 1, 1), (1, −1, −1, 1, −1, 1, −1, 1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1, 1, 1, −1, −1, 1), (1, −1, −1, −1, 1, −1, 1, 1), (1, −1, −1, 1, −1, 1, −1, 1), (1, −1, 1, 1, 1, −1, −1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (1, −1, −1, −1, 1, −1, 1, 1), (1, −1, −1, 1, −1, 1, −1, 1), (1, −1, 1, 1, 1, −1, −1, −1), (1, 1, −1, 1, −1, −1, 1, −1), (1, 1, 1, −1, −1, −1, −1, 1), (1, 1, −1, −1, 1, 1, −1, −1), (1, 1, 1, 1, 1, 1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (−1, −1, 1, 1, −1, −1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, −1, −1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1, −1, −1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1, −1, 1, 1, −1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (1, −1, −1, 1, 1, −1, −1, 1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1, −1, 1, 1, −1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (1, −1, −1, 1, 1, −1, −1, 1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1, −1, 1, 1, −1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (1, −1, −1, 1, 1, −1, −1, 1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1, −1, 1, 1, −1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (1, −1, −1, 1, 1, −1, −1, 1), (1, 1, 1, 1, 1, 1, 1, 1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1, −1, 1, 1, −1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (1, −1, −1, 1, 1, −1, −1, 1), (1, 1, 1, 1, 1, 1, 1, 1)}, {(−1, 1, −1, 1, 1, 1, −1, −1), (1, −1, −1, −1, 1, 1, 1, −1), (1, 1, −1, −1, −1, 1, TABLE 4-continued −1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1),
(−1, 1, 1, −1, −1, 1, 1, −1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1,
−1, −1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)},
{(−1, 1, −1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (−1, −1, 1,
−1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, 1, −1, 1, 1, 1, −1, −1), (1,
−1, −1, −1, 1, 1, 1, −1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1,
−1), (1, −1, −1, 1, 1, −1, −1, 1), (1, 1, 1, 1, 1, 1, 1, 1)}, {(−1, 1, −1, 1, 1, 1, −1, −1), (1, −1, −1, −1, 1, 1, 1, −1), (1, 1, −1, −1,
−1, 1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1),
(−1, 1, 1, −1, −1, 1, 1, −1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1,
−1, −1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)},
{(−1, 1, −1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (−1, 1, −1, −1, 1,
−1, 1, 1), (1, 1, −1, 1, −1, −1, 1, −1), (−1, 1, 1, −1, −1, 1, 1, −1), (1, 1, 1, 1, 1, 1, 1, 1)}, {(−1, 1, −1, 1, 1, 1, −1, −1), (1, −1,
−1, −1, 1, 1, 1, −1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1),
(1, −1, −1, 1, 1, −1, −1, 1), (1, 1, 1, 1, 1, 1, 1, 1)}, {(−1, 1, −1, 1, 1, 1, −1, −1), (1, −1, −1, −1, 1, 1, 1, −1), (1, 1, −1, −1, −1, 1,
−1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1),
(−1, 1, 1, −1, −1, 1, 1, −1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1,
−1, −1, −1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)},
{(−1, 1, −1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (1, −1, 1, 1,
−1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, 1, −1, 1, 1, 1, −1, −1), (1,
−1, −1, −1, 1, 1, 1, −1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1,
−1), (1, −1, −1, 1, 1, −1, −1, 1), (1, 1, 1, 1, 1, 1, 1, 1)}, {(−1, 1, −1, 1, 1, 1, −1, −1), (1, −1, 1, −1, 1, 1, −1, −1), (1, 1, −1, −1,
−1, 1, −1, 1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1),
(−1, 1, 1, −1, −1, 1, 1, −1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1,
−1, 1, −1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1, −1, −1, 1)},
{(−1, 1, −1, 1, 1, 1, −1, −1), (1, −1, 1, −1, 1, 1, −1, −1), (1, 1, −1, −1, −1, 1, −1, 1), (1, 1, −1, −1, 1, −1, 1, −1), (−1, −1, −1,
−1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, 1, −1, 1, 1, 1, −1, −1), (1,
−1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1,
−1, 1), (1, −1, −1, 1, 1, −1, −1, 1), (1, 1, 1, 1, 1, 1, 1, 1)}, {(−1, 1, −1, 1, 1, 1, −1, −1), (1, −1, 1, −1, 1, 1, −1, −1), (1, 1, −1,
−1, −1, 1, −1, 1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1,
−1), (−1, 1, 1, −1, −1, 1, 1, −1)}, {(−1, 1, −1, 1, 1, 1, −1, −1), (1, −1, 1, −1, 1, 1, −1, −1), (1, 1, −1, −1, −1, 1, −1, 1), (1, 1, −1,
−1, 1, −1, 1, −1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1,
−1, 1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1, −1, 1, −1), (−1, −1,
−1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, 1, −1, 1, 1, 1, −1, −1),
(1, −1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1), (1, −1, −1, 1,
−1, 1, 1, −1), (1, −1, −1, 1, 1, −1, −1, 1), (1, 1, 1, 1, 1, 1, 1, 1)}, {(−1, 1, −1, 1, 1, 1, −1, −1), (1, −1, 1, −1, 1, 1, −1, −1), (1, 1,
−1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1,
−1, −1), (−1, 1, 1, −1, −1, 1, 1, −1)}, {(−1, 1, −1, 1, 1, 1, −1, −1), (1, −1, 1, −1, 1, 1, −1, −1), (1, 1, −1, −1, −1, 1, −1, 1), (1, 1,
−1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1,
−1, 1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1, −1, 1, −1),
(−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, 1, −1, 1, 1, 1, −1,
−1), (1, −1, 1, −1, 1, 1, −1, −1), (1, 1, −1, −1, −1, 1, −1, 1), (1, 1, −1, −1, 1, −1, 1, −1), (−1, 1, 1, −1, 1, −1, −1, 1), (1, 1, 1, 1,
−1, −1, −1, −1), (1, −1, −1, 1, 1, −1, −1, 1), (1, 1, 1, 1, 1, 1, 1, 1)}, {(−1, 1, −1, 1, 1, 1, −1, −1), (1, −1, 1, −1, 1, 1, −1, −1),
(1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (−1, −1, −1, −1,
−1, −1, −1, −1), (−1, 1, 1, −1, −1, 1, 1, −1)}, {(−1, 1, −1, 1, 1, 1, −1, −1), (1, −1, 1, −1, 1, 1, −1, −1), (1, 1, −1, −1, −1, 1, −1, 1),
(1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (1, −1,
−1, 1, 1, −1, −1, 1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1, −1, 1,
−1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, 1,
−1, 1, 1, 1, −1, −1), (1, −1, 1, −1, 1, 1, −1, −1), (1, 1, −1, −1, −1, 1, −1, 1), (1, 1, −1, −1, 1, −1, 1, −1), (1, −1, −1, 1, −1, 1, 1, −1),
(1, 1, 1, 1, −1, −1, −1, −1), (1, −1, −1, 1, 1, −1, −1, 1), (1, 1, 1, 1, 1, 1, 1, 1)}, {(−1, 1, 1, −1, −1, 1, −1, 1), (−1, 1, 1, −1, 1,
−1, 1, −1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1,
−1, −1, −1, −1, −1, −1), (−1, −1, 1, 1, −1, −1, 1, 1)}, {(−1, 1, 1, −1, −1, 1, −1, 1), (−1, 1, 1, −1, 1, −1, 1, −1), (1, −1, 1, −1,
−1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1),
(1, 1, −1, −1, 1, 1, −1, −1)}, {(−1, 1, 1, −1, −1, 1, −1, 1), (−1, 1, 1, −1, 1, −1, 1, −1), (1, −1, 1, −1, −1, 1, 1, −1), (1, −1, 1,
−1, 1, −1, −1, 1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)},
{(−1, 1, 1, −1, −1, 1, −1, 1), (−1, 1, 1, −1, 1, −1, 1, −1), (1, −1, 1, −1, −1, 1, 1, −1), (1, −1, 1, −1, 1, −1, −1, 1), (−1, −1, −1,
−1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, 1, −1, −1, 1, −1, 1),
(−1, 1, 1, −1, 1, −1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1,
−1, 1, 1), (−1, −1, −1, −1, −1, −1, −1, −1), (−1, −1, 1, 1, −1, −1, 1, 1)}, {(−1, 1, 1, −1, −1, 1, −1, 1), (−1, 1, 1, −1, 1, −1, 1, −1),
(1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (−1, −1, −1, −1,
−1, −1, −1, −1), (1, 1, −1, −1, 1, 1, −1, −1)}, {(−1, 1, 1, −1, −1, 1, −1, 1), (−1, 1, 1, −1, 1, −1, 1, −1), (1, −1, 1, −1, −1, 1, 1, −1),
(1, −1, 1, −1, 1, −1, −1, 1), (−1, −1, −1, −1, 1, 1, 1, 1), (1, 1, −1, −1, −1, −1, 1, 1), (−1, −1, 1, 1, −1, −1, 1, 1),
(1, 1, 1, 1, 1, 1, 1, 1)}, {(−1, 1, 1, −1, −1, 1, −1, 1), (−1, 1, 1, −1, 1, −1, 1, −1), (1, −1, 1, −1, −1, 1, 1, −1), (1, −1, 1, −1, 1, −1,
−1, 1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, 1,
−1, −1, 1, −1, 1), (−1, 1, 1, −1, 1, −1, 1, −1), (1, −1, 1, −1, −1, 1, 1, −1), (1, −1, 1, −1, 1, −1, −1, 1), (−1, −1, 1, 1, 1, 1, −1, −1),
(1, 1, 1, 1, −1, −1, −1, −1), (−1, −1, −1, −1, −1, −1, −1, −1), (−1, −1, 1, 1, −1, −1, 1, 1)}, {(−1, 1, 1, −1, −1, 1, −1, 1), (−1, 1, 1,
−1, 1, −1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1),
(−1, −1, −1, −1, −1, −1, −1, −1), (1, 1, −1, −1, 1, 1, −1, −1)}, {(−1, 1, 1, −1, −1, 1, −1, 1), (−1, 1, 1, −1, 1, −1, 1, −1), (1, −1, 1, −1,
−1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1),
(1, 1, 1, 1, 1, 1, 1, 1)}, {(−1, 1, 1, −1, −1, 1, −1, 1), (−1, 1, 1, −1, 1, −1, 1, −1), (1, −1, 1, −1, −1, 1, 1, −1), (1, −1, 1, −1, 1, −1,
−1, 1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, 1,
−1, −1, 1, −1, 1), (−1, 1, 1, −1, 1, −1, 1, −1), (1, −1, 1, −1, −1, 1, 1, −1), (1, −1, 1, −1, 1, −1, −1, 1), (1, 1, −1, −1, −1, −1, 1, 1),
(1, 1, 1, 1, −1, −1, −1, −1), (−1, −1, −1, −1, −1, −1, −1, −1), (−1, −1, 1, 1, −1, −1, 1, 1)}, {(−1, 1, 1, −1, −1, 1, −1, 1), (−1, 1, 1,
−1, 1, −1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1),
(−1, −1, −1, −1, −1, −1, −1, −1), (1, 1, −1, −1, 1, 1, −1, −1)}, {(−1, 1, 1, −1, −1, 1, −1, 1), (−1, 1, 1, −1, 1, −1, 1, −1), (1, −1, 1, −1,
−1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1),
(1, 1, 1, 1, 1, 1, 1, 1)}, {(−1, 1, 1, −1, −1, 1, −1, 1), (−1, 1, 1, −1, 1, −1, 1, −1), (1, −1, 1, −1, −1, 1, 1, −1), (1, −1, 1, −1, 1, −1,
−1, 1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, 1,
−1, −1, 1, −1, 1), (1, −1, −1, 1, −1, 1, −1, 1), (1, −1, 1, −1, −1, 1, 1, −1), (1, −1, 1, −1, 1, −1, −1, 1), (−1, −1, −1, −1, 1, 1, 1, 1),
(−1, −1, 1, 1, 1, 1, −1, −1), (−1, −1, −1, −1, −1, −1, −1, −1), (−1, −1, 1, 1, −1, −1, 1, 1)}, {(−1, 1, 1, −1, −1, 1, −1, 1), (1, −1, −1, 1,
−1, 1, −1, 1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (−1, TABLE 4-continued −1, −1, −1, −1, −1, −1, −1), (1, 1, −1, −1, 1, 1, −1, −1)}, {(−1, 1, 1, −1, −1, 1, −1, 1), (1, −1, −1, 1, −1, 1, −1, 1), (1, −1, 1, −1,
−1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1, 1, 1, −1, −1, 1, 1),
(1, 1, 1, 1, 1, 1, 1, 1)}, {(−1, 1, 1, −1, −1, 1, −1, 1), (1, −1, −1, 1, −1, 1, −1, 1), (1, −1, 1, −1, −1, 1, 1, −1), (1, −1, 1, −1, 1, −1,
−1, 1), (−1, −1, −1, −1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, 1,
−1, −1, 1, −1, 1), (1, −1, −1, 1, −1, 1, −1, 1), (1, −1, 1, −1, −1, 1, 1, −1), (1, −1, 1, −1, 1, −1, −1, 1), (−1, −1, −1, −1, 1, 1, 1, 1),
(1, 1, −1, −1, −1, −1, 1, 1), (−1, −1, −1, −1, −1, −1, −1, −1), (−1, −1, 1, 1, −1, −1, 1, 1)}, {(−1, 1, 1, −1, −1, 1, −1, 1), (1, −1,
−1, 1, −1, 1, −1, 1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1),
(−1, −1, −1, −1, −1, −1, −1, −1), (1, 1, −1, −1, 1, 1, −1, −1)}, {(−1, 1, 1, −1, −1, 1, −1, 1), (1, −1, −1, 1, −1, 1, −1, 1), (1, −1, 1,
−1, −1, 1, 1, −1), (1, −1, 1, −1, 1, −1, −1, 1), (−1, −1, −1, −1, 1, 1, 1, 1), (1, 1, −1, −1, −1, −1, 1, 1), (−1, −1, 1, 1, −1, −1, 1, 1),
(1, 1, 1, 1, 1, 1, 1, 1)}, {(−1, 1, 1, −1, −1, 1, −1, 1), (1, −1, −1, 1, −1, 1, −1, 1), (1, −1, 1, −1, −1, 1, 1, −1), (1, −1, 1, −1, 1, −1,
−1, 1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, 1,
−1, −1, 1, −1, 1), (1, −1, −1, 1, −1, 1, −1, 1), (1, −1, 1, −1, −1, 1, 1, −1), (1, −1, 1, −1, 1, −1, −1, 1), (−1, −1, 1, 1, 1, 1, −1, −1),
(1, 1, 1, 1, −1, −1, −1, −1), (−1, −1, −1, −1, −1, −1, −1, −1), (−1, −1, 1, 1, −1, −1, 1, 1)}, {(−1, 1, 1, −1, −1, 1, −1, 1), (1, −1,
−1, 1, −1, 1, −1, 1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1),
(−1, −1, −1, −1, −1, −1, −1, −1), (1, 1, −1, −1, 1, 1, −1, −1)}, {(−1, 1, 1, −1, −1, 1, −1, 1), (1, −1, −1, 1, −1, 1, −1, 1), (1, −1, 1,
−1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1),
(1, 1, 1, 1, 1, 1, 1, 1)}, {(−1, 1, 1, −1, −1, 1, −1, 1), (1, −1, −1, 1, −1, 1, −1, 1), (1, −1, 1, −1, −1, 1, 1, −1), (1, −1, 1, −1, 1, −1,
−1, 1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, 1,
−1, −1, 1, −1, 1), (1, −1, −1, 1, −1, 1, −1, 1), (1, −1, 1, −1, −1, 1, 1, −1), (1, −1, 1, −1, 1, −1, −1, 1), (1, 1, −1, −1, −1, −1, 1, 1),
(1, 1, 1, 1, −1, −1, −1, −1), (−1, −1, −1, −1, −1, −1, −1, −1), (−1, −1, 1, 1, −1, −1, 1, 1)}, {(−1, 1, 1, −1, −1, 1, −1, 1), (1, −1,
−1, 1, −1, 1, −1, 1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1),
(−1, −1, −1, −1, −1, −1, −1, −1), (1, 1, −1, −1, 1, 1, −1, −1)}, {(−1, 1, 1, −1, −1, 1, −1, 1), (1, −1, −1, 1, −1, 1, −1, 1), (1, −1, 1,
−1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1),
(1, 1, 1, 1, 1, 1, 1, 1)}, {(−1, 1, 1, −1, −1, 1, −1, 1), (1, −1, −1, 1, −1, 1, −1, 1), (1, −1, 1, −1, −1, 1, 1, −1), (1, −1, 1, −1, 1, −1,
−1, 1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, 1,
−1, −1, 1, −1, 1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1),
(−1, 1, 1, 1, 1, −1, −1, −1), (−1, −1, −1, −1, −1, −1, −1, −1), (−1, −1, 1, 1, −1, −1, 1, 1)}, {(−1, 1, 1, −1, −1, 1, −1, 1), (1, −1, 1,
−1, 1, −1, −1, 1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1),
(−1, −1, −1, −1, −1, −1, −1, −1), (1, 1, −1, −1, 1, 1, −1, −1)}, {(−1, 1, 1, −1, −1, 1, −1, 1), (1, −1, 1, −1, 1, −1, −1, 1), (1, 1, −1, 1,
−1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, 1, 1, −1, −1, 1, 1),
(1, 1, 1, 1, 1, 1, 1, 1)}, {(−1, 1, 1, −1, −1, 1, −1, 1), (1, −1, 1, −1, 1, −1, −1, 1), (1, 1, −1, 1, −1, −1, −1, 1), (1, 1, 1, −1, −1,
−1, 1, −1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)},
{(−1, 1, 1, −1, −1, 1, −1, 1), (1, −1, 1, −1, 1, −1, −1, 1), (1, 1, −1, 1, −1, −1, −1, 1), (1, 1, 1, −1, −1, −1, 1, −1), (−1, 1, −1, −1, 1,
−1, 1, 1), (1, −1, −1, −1, −1, 1, 1, 1), (−1, −1, −1, −1, −1, −1, −1, −1), (−1, −1, 1, 1, −1, −1, 1, 1)}, {(−1, 1, 1, −1, −1, 1, −1, 1),
(1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1), (1, −1, −1, −1,
−1, 1, 1, 1), (−1, −1, −1, −1, −1, −1, −1, −1), (1, 1, −1, −1, 1, 1, −1, −1)}, {(−1, 1, 1, −1, −1, 1, −1, 1), (1, −1, 1, −1, 1, −1, −1, 1),
(1, 1, −1, 1, −1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, 1, 1, −1,
−1, 1, 1), (1, 1, 1, 1, 1, 1, 1, 1)}, {(−1, 1, 1, −1, −1, 1, −1, 1), (1, −1, 1, −1, 1, −1, −1, 1), (1, 1, −1, 1, −1, −1, −1, 1), (1, 1, 1,
−1, −1, −1, 1, −1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)},
{(−1, 1, 1, −1, −1, 1, −1, 1), (1, −1, 1, −1, 1, −1, −1, 1), (1, 1, −1, 1, −1, −1, −1, 1), (1, 1, 1, −1, −1, −1, 1, −1), (−1, 1, 1, 1, 1, −1,
−1, −1), (1, −1, 1, 1, −1, 1, −1, −1), (−1, −1, −1, −1, −1, −1, −1, −1), (−1, −1, 1, 1, −1, −1, 1, 1)}, {(−1, 1, 1, −1, −1, 1, −1, 1),
(1, −1, 1, −1, 1, −1, −1, 1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1,
−1, −1), (−1, −1, −1, −1, −1, −1, −1, −1), (1, 1, −1, −1, 1, 1, −1, −1)}, {(−1, 1, 1, −1, −1, 1, −1, 1), (1, −1, 1, −1, 1, −1, −1, 1),
(1, 1, −1, 1, −1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, 1, 1, −1,
−1, 1, 1), (1, 1, 1, 1, 1, 1, 1, 1)}, {(−1, 1, 1, −1, −1, 1, −1, 1), (1, −1, 1, −1, 1, −1, −1, 1), (1, 1, −1, 1, −1, −1, −1, 1), (1, 1, 1,
−1, −1, −1, 1, −1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)},
{(−1, 1, 1, −1, −1, 1, −1, 1), (1, −1, 1, −1, 1, −1, −1, 1), (1, 1, −1, 1, −1, −1, −1, 1), (1, 1, 1, −1, −1, −1, 1, −1), (1, −1, −1, −1,
−1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, 1, 1, −1, −1, 1, −1, 1),
(1, −1, 1, −1, 1, −1, −1, 1), (1, 1, −1, 1, −1, −1, −1, 1), (1, 1, 1, −1, −1, −1, 1, −1), (1, −1, −1, −1, −1, 1, 1, 1), (1, −1, 1, 1, −1, 1,
−1, −1), (−1, −1, −1, −1, −1, −1, −1, −1), (1, 1, −1, −1, 1, 1, −1, −1)}, {(−1, 1, 1, −1, −1, 1, −1, 1), (1, −1, 1, −1, 1, −1, −1, 1),
(1, 1, −1, 1, −1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, 1, 1, −1,
−1, 1, 1), (1, 1, 1, 1, 1, 1, 1, 1)}, {(−1, 1, 1, −1, −1, 1, −1, 1), (1, −1, 1, −1, 1, −1, −1, 1), (1, 1, −1, 1, −1, −1, −1, 1), (1, 1, 1,
−1, −1, −1, 1, −1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)},
{(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1, −1, −1), (−1, −1,
−1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(−1, 1, 1, −1, 1,
−1, 1, −1), (−1, 1, 1, 1, −1, 1, −1, −1), (1, −1, 1, −1, −1, 1, 1, −1), (1, −1, 1, 1, 1, −1, −1, −1), (−1, −1, −1, 1, 1, 1, 1, −1), (−1,
−1, 1, −1, 1, 1, −1, 1), (−1, −1, −1, −1, −1, −1, −1, −1), (1, 1, −1, −1, 1, 1, −1, −1)}, {(−1, 1, 1, −1, 1, −1, 1, −1), (−1, 1, 1, 1,
−1, 1, −1, −1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1,
−1, 1, 1, −1, −1, 1, 1), (1, 1, 1, 1, 1, 1, 1, 1)}, {(−1, 1, 1, −1, 1, −1, 1, −1), (−1, 1, 1, 1, −1, 1, −1, −1), (1, −1, 1, −1, −1, 1, 1, −1),
(1, −1, 1, 1, 1, −1, −1, −1), (−1, −1, −1, 1, 1, 1, 1, −1), (−1, −1, 1, −1, 1, 1, −1, 1), (1, 1, −1, −1, 1, 1, −1, −1),
(1, 1, 1, 1, 1, 1, 1, 1)}, {(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1,
−1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)},
{(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1, −1, −1), (−1, −1,
−1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, 1, −1, 1,
−1, 1, −1), (−1, 1, 1, 1, −1, 1, −1, −1), (1, −1, 1, −1, −1, 1, 1, −1), (1, −1, 1, 1, 1, −1, −1, −1), (−1, −1, −1, 1, 1, 1, 1, −1), (1, 1,
−1, 1, −1, −1, 1, −1), (−1, −1, 1, 1, −1, −1, 1, 1), (1, 1, 1, 1, 1, 1, 1, 1)}, {(−1, 1, 1, −1, 1, −1, 1, −1), (−1, 1, 1, 1, −1, 1, −1, −1),
(1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (1, 1, −1, −1, 1, 1,
−1, −1), (1, 1, 1, 1, 1, 1, 1, 1)}, {(−1, 1, 1, −1, 1, −1, 1, −1), (−1, 1, 1, 1, −1, 1, −1, −1), (1, −1, 1, −1, −1, 1, 1, −1), (1,
−1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1,
−1, 1, 1)}, {(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1, −1, −1), (−1,
−1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, 1, −1, 1,
−1, 1, −1), (−1, 1, 1, 1, −1, 1, −1, −1), (1, −1, 1, −1, −1, 1, 1, −1), (1, −1, 1, 1, 1, −1, −1, −1), (−1, −1, 1, −1, 1, 1, −1, 1),
(1, 1, 1, −1, −1, −1, −1, 1), (−1, −1, 1, 1, −1, −1, 1, 1), (1, 1, 1, 1, 1, 1, 1, 1)}, {(−1, 1, 1, −1, 1, −1, 1, −1), (−1, 1, 1, 1, −1, 1,
−1, −1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (1, 1, −1,
−1, 1, 1, −1, −1), (1, 1, 1, 1, 1, 1, 1, 1)}, {(−1, 1, 1, −1, 1, −1, 1, −1), (−1, 1, 1, 1, −1, 1, −1, −1), (1, −1, 1, −1, −1, 1, 1, −1),
(1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,
−1, −1, 1, 1)}, {(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1, −1, −1),
(1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, 1,
−1, 1, −1, 1, −1), (−1, 1, 1, 1, −1, 1, −1, −1), (1, −1, 1, −1, −1, 1, 1, −1), (1, −1, 1, 1, 1, −1, −1, −1), (1, 1, −1, 1, −1, −1, 1, −1),
(1, 1, 1, −1, −1, −1, −1, 1), (−1, −1, 1, 1, −1, −1, 1, 1), (1, 1, 1, 1, 1, 1, 1, 1)}, {(−1, 1, 1, −1, 1, −1, 1, −1), (−1, 1, 1, 1, −1, 1, TABLE 4-continued −1, −1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (1, 1, −1,
−1, 1, 1, −1, −1), (1, 1, 1, 1, 1, 1, 1, 1)}, {(−1, 1, 1, −1, 1, −1, 1, −1), (1, −1, −1, −1, 1, −1, 1, 1), (1, −1, 1, −1, −1, 1, 1, −1),
(1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1,
−1, −1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1),
(−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, 1,
−1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, −1, 1, 1, 1, 1, −1),
(−1, −1, 1, −1, 1, 1, −1, 1), (−1, −1, 1, 1, −1, −1, 1, 1), (1, 1, 1, 1, 1, 1, 1, 1)}, {(−1, 1, 1, −1, 1, −1, 1, −1), (1, −1, −1, −1, 1,
−1, 1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (1, 1,
−1, −1, 1, 1, −1, −1), (1, 1, 1, 1, 1, 1, 1, 1)}, {(−1, 1, 1, −1, 1, −1, 1, −1), (1, −1, −1, −1, 1, −1, 1, 1), (1, −1, 1, −1, −1, 1, 1, −1),
(1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1,
−1, −1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1),
(−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, 1,
−1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, −1, 1, 1, 1, 1, −1),
(1, 1, −1, 1, −1, −1, 1, −1), (−1, −1, 1, 1, −1, −1, 1, 1), (1, 1, 1, 1, 1, 1, 1, 1)}, {(−1, 1, 1, −1, 1, −1, 1, −1), (1, −1, −1, −1, 1,
−1, 1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (1, 1,
−1, −1, 1, 1, −1, −1), (1, 1, 1, 1, 1, 1, 1, 1)}, {(−1, 1, 1, −1, 1, −1, 1, −1), (1, −1, −1, −1, 1, −1, 1, 1), (1, −1, 1, −1, −1, 1, 1, −1),
(1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1,
−1, −1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1),
(−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, 1,
−1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, 1, −1, 1, 1, −1, 1),
(1, 1, 1, −1, −1, −1, −1, 1), (−1, −1, 1, 1, −1, −1, 1, 1), (1, 1, 1, 1, 1, 1, 1, 1)}, {(−1, 1, 1, −1, 1, −1, 1, −1), (1, −1, −1, −1, 1,
−1, 1, 1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (1, 1,
−1, −1, 1, 1, −1, −1), (1, 1, 1, 1, 1, 1, 1, 1)}, {(−1, 1, 1, −1, 1, −1, 1, −1), (1, −1, −1, −1, 1, −1, 1, 1), (1, −1, 1, −1, −1, 1, 1, −1),
(1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,
−1, −1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1),
(1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, 1,
−1, 1, −1, 1, −1), (1, −1, −1, −1, 1, −1, 1, 1), (1, −1, 1, −1, −1, 1, 1, −1), (1, −1, 1, 1, 1, −1, −1, −1), (1, 1, −1, 1, −1, −1, 1, −1),
(1, 1, 1, −1, −1, −1, −1, 1), (−1, −1, 1, 1, −1, −1, 1, 1), (1, 1, 1, 1, 1, 1, 1, 1)}, {(−1, 1, 1, −1, 1, −1, 1, −1), (1, −1, −1, −1, 1,
−1, 1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (1, 1,
−1, −1, 1, 1, −1, −1), (1, 1, 1, 1, 1, 1, 1, 1)}, {(−1, 1, 1, −1, 1, −1, 1, −1), (1, −1, −1, 1, 1, −1, 1, −1), (1, −1, 1, −1, −1, 1, 1, −1),
(1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (−1, −1, 1, 1,
−1, −1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1),
(−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(−1, 1, 1,
−1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1),
(−1, −1, 1, 1, 1, 1, −1, −1), (−1, −1, 1, 1, −1, −1, 1, 1), (1, 1, 1, 1, 1, 1, 1, 1)}, {(−1, 1, 1, −1, 1, −1, 1, −1), (1, −1, −1, 1, 1, −1, 1,
−1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (1, 1, −1,
−1, 1, 1, −1, −1), (1, 1, 1, 1, 1, 1, 1, 1)}, {(−1, 1, 1, −1, 1, −1, 1, −1), (1, −1, −1, 1, 1, −1, 1, −1), (1, −1, 1, −1, −1, 1, 1, −1),
(1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1,
−1, −1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1),
(−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1, 1,
−1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1),
(1, 1, −1, −1, −1, −1, 1, 1), (−1, −1, 1, 1, −1, −1, 1, 1), (1, 1, 1, 1, 1, 1, 1, 1)}, {(−1, 1, 1, −1, 1, −1, 1, −1), (1, −1, −1, 1, 1,
−1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (1, 1,
−1, −1, 1, 1, −1, −1), (1, 1, 1, 1, 1, 1, 1, 1)}, {(−1, 1, 1, −1, 1, −1, 1, −1), (1, −1, −1, 1, 1, −1, 1, −1), (1, −1, 1, −1, −1, 1, 1, −1),
(1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1,
−1, −1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1),
(−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, 1,
−1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, 1, 1, 1, 1, −1, −1),
(1, 1, 1, 1, −1, −1, −1, −1), (−1, −1, 1, 1, −1, −1, 1, 1), (1, 1, 1, 1, 1, 1, 1, 1)}, {(−1, 1, 1, −1, 1, −1, 1, −1), (1, −1, −1, 1, 1,
−1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (1, 1,
−1, −1, 1, 1, −1, −1), (1, 1, 1, 1, 1, 1, 1, 1)}, {(−1, 1, 1, −1, 1, −1, 1, −1), (1, −1, −1, 1, 1, −1, 1, −1), (1, −1, 1, −1, −1, 1, 1, −1),
(1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1,
−1, −1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1),
(1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1, 1,
−1, 1, −1, 1, −1), (1, −1, −1, 1, 1, −1, 1, −1), (1, −1, 1, −1, −1, 1, 1, −1), (1, −1, 1, −1, 1, −1, −1, 1), (1, 1, −1, −1, −1, −1, 1, 1),
(1, 1, 1, 1, −1, −1, −1, −1), (−1, −1, 1, 1, −1, −1, 1, 1), (1, 1, 1, 1, 1, 1, 1, 1)}, {(−1, 1, 1, −1, 1, −1, 1, −1), (1, −1, −1, 1, 1,
−1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (1, 1,
−1, −1, 1, 1, −1, −1), (1, 1, 1, 1, 1, 1, 1, 1)}, {(−1, 1, 1, 1, −1, −1, −1, 1), (1, −1, 1, −1, −1, −1, 1, 1), (1, 1, −1, −1, −1, 1, −1, 1),
(1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,
−1, 1, 1, −1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1),
(−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, 1, 1, 1,
−1, −1, −1, 1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1),
(−1, 1, −1, −1, 1, −1, 1, 1), (−1, 1, 1, −1, −1, 1, 1, −1), (1, 1, 1, 1, 1, 1, 1, 1)}, {(−1, 1, 1, 1, −1, −1, −1, 1), (1, −1, 1, −1, −1,
−1, 1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (1, −1,
−1, 1, 1, −1, −1, 1), (1, 1, 1, 1, 1, 1, 1, 1)}, {(−1, 1, 1, 1, −1, −1, −1, 1), (1, −1, 1, −1, −1, −1, 1, 1), (1, 1, −1, −1, −1, 1, −1, 1),
(1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1,
−1, 1, 1, −1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1),
(−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, 1, 1, 1,
−1, −1, −1, 1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (1,
−1, 1, 1, −1, 1, −1, −1), (−1, 1, 1, −1, −1, 1, 1, −1), (1, 1, 1, 1, 1, 1, 1, 1)}, {(−1, 1, 1, 1, −1, −1, −1, 1), (1, −1, 1, −1, −1,
−1, 1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (1, −1,
−1, 1, 1, −1, −1, 1), (1, 1, 1, 1, 1, 1, 1, 1)}, {(−1, 1, 1, 1, −1, −1, −1, 1), (1, −1, 1, −1, −1, −1, 1, 1), (1, 1, −1, −1, −1, 1, −1, 1),
(1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1,
−1, 1, 1, −1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1),
(−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, 1, 1, 1,
−1, −1, −1, 1), (1, −1, 1, −1, −1, −1, 1, 1), (1, 1, −1, −1, −1, 1, −1, 1), (1, 1, 1, −1, 1, −1, −1, −1), (−1, 1, −1, −1, 1, −1, 1, 1),
(1, 1, −1, 1, −1, −1, 1, −1), (−1, 1, 1, −1, −1, 1, 1, −1), (1, 1, 1, 1, 1, 1, 1, 1)}, {(−1, 1, 1, 1, −1, −1, −1, 1), (1, −1, 1, −1, −1,
−1, 1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (1, −1,
−1, 1, 1, −1, −1, 1), (1, 1, 1, 1, 1, 1, 1, 1)}, {(−1, 1, 1, 1, −1, −1, −1, 1), (1, −1, 1, −1, −1, −1, 1, 1), (1, 1, −1, −1, −1, 1, −1, 1),
(1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1, TABLE 4-continued −1, 1, 1, −1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (1, −1, −1, 1, 1, −1, −1, 1), (1, 1, 1, 1, 1, 1, 1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1, −1, 1, 1, −1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (1, −1, −1, 1, 1, −1, −1, 1), (1, 1, 1, 1, 1, 1, 1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1, −1, 1, 1, −1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (1, −1, −1, 1, 1, −1, −1, 1), (1, 1, 1, 1, 1, 1, 1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1, −1, 1, 1, −1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (1, −1, −1, 1, 1, −1, −1, 1), (1, 1, 1, 1, 1, 1, 1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1, −1, 1, 1, −1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (1, −1, −1, 1, 1, −1, −1, 1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (1, 1, −1, −1, 1, 1, −1, −1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1, −1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (1, 1, −1, −1, 1, 1, −1, −1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1, −1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (1, 1, −1, −1, 1, 1, −1, −1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (−1, −1, 1, 1, −1, −1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (−1, −1, 1, 1, −1, −1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, 1, 1, 1, −1, 1, −1, −1), (1, −1, 1, 1, 1, −1, −1, −1), TABLE 4-continued (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, 1, 1, −1,
−1, 1, 1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1,
−1, −1, −1, 1, −1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)},
{(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (1, −1, −1, 1,
−1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, 1, 1, 1, −1, 1, −1, −1),
(1, −1, 1, 1, 1, −1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1,
−1, 1, −1, 1), (−1, −1, −1, −1, −1, −1, −1, −1), (1, 1, −1, −1, 1, 1, −1, −1)}, {(−1, 1, 1, 1, −1, 1, −1, −1), (1, −1, 1, 1, 1, −1, −1, −1),
(1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, 1, 1, −1,
−1, 1, 1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1,
−1, −1, −1, 1, −1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)},
{(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (−1, −1,
−1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(1, −1, −1, −1, 1,
−1, 1, 1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (−1,
−1, 1, −1, 1, 1, −1, 1), (−1, −1, −1, −1, −1, −1, −1, −1), (1, 1, −1, −1, 1, 1, −1, −1)}, {(1, −1, −1, −1, 1, −1, 1, 1), (1, −1, −1, 1,
−1, 1, −1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1,
−1, 1, 1, −1, −1, 1, 1), (1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1),
(1, −1, 1, 1, 1, −1, −1, −1), (−1, −1, −1, 1, 1, 1, 1, −1), (−1, −1, 1, −1, 1, 1, −1, 1), (1, 1, −1, −1, 1, 1, −1, −1),
(1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1,
−1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)},
{(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (−1, −1,
−1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(1, −1, −1, −1, 1,
−1, 1, 1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (1, 1,
−1, 1, −1, −1, 1, −1), (−1, −1, 1, 1, −1, −1, 1, 1), (1, 1, 1, 1, 1, 1, 1, 1)}, {(1, −1, −1, −1, 1, −1, 1, 1), (1, −1, −1, 1, −1, 1, −1, 1),
(1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (1, 1, −1, −1, 1, 1,
−1, −1), (1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1), (1,
−1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1,
−1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (−1,
−1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(1, −1, −1, −1, 1,
−1, 1, 1), (1, −1, −1, 1, −1, 1, −1, 1), (1, −1, 1, −1, −1, 1, 1, −1), (1, −1, 1, 1, 1, −1, −1, −1), (−1, −1, 1, −1, 1, 1, −1, 1), (1, 1, 1,
1, −1, −1, −1, 1), (−1, −1, 1, 1, −1, −1, 1, 1), (1, 1, 1, 1, 1, 1, 1, 1)}, {(1, −1, −1, −1, 1, −1, 1, 1), (1, −1, −1, 1, −1, 1, −1, 1),
(1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (1, 1, −1, −1, 1, 1,
−1, −1), (1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1), (1,
−1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1,
−1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (1, 1,
−1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(1, −1, −1, −1, 1,
−1, 1, 1), (1, −1, −1, 1, −1, 1, −1, 1), (1, −1, 1, −1, −1, 1, 1, −1), (1, −1, 1, 1, 1, −1, −1, −1), (1, 1, −1, 1, −1, −1, 1, −1), (1, 1, 1,
−1, −1, −1, −1, 1), (−1, −1, 1, 1, −1, −1, 1, 1), (1, 1, 1, 1, 1, 1, 1, 1)}, {(1, −1, −1, −1, 1, −1, 1, 1), (1, −1, −1, 1, −1, 1, −1, 1),
(1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (1, 1, −1, −1, 1, 1,
−1, −1), (1, 1, 1, 1, 1, 1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1,
−1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1,
−1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1, −1, −1, −1, 1, −1),
(−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(1, −1, −1,
−1, 1, −1, 1, 1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1),
(−1, 1, 1, −1, 1, −1, −1, 1), (−1, −1, 1, 1, −1, −1, 1, 1), (1, 1, 1, 1, 1, 1, 1, 1)}, {(1, −1, −1, −1, 1, −1, 1, 1), (1, −1, 1, 1, 1, −1, −1,
−1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (1, 1, −1,
−1, 1, 1, −1, −1), (1, 1, 1, 1, 1, 1, 1, 1)}, {(1, −1, −1, −1, 1, −1, 1, 1), (1, −1, 1, 1, 1, −1, −1, −1), (1, 1, −1, 1, −1, −1, −1, 1),
(1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (−1, −1, 1, 1,
−1, −1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1, −1, −1, −1, 1, −1),
(−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(1, −1, −1,
−1, 1, −1, 1, 1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1),
(1, −1, −1, 1, −1, 1, 1, −1), (−1, −1, 1, 1, −1, −1, 1, 1), (1, 1, 1, 1, 1, 1, 1, 1)}, {(1, −1, −1, −1, 1, −1, 1, 1), (1, −1, 1, 1, 1, −1,
−1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (1, 1, −1,
−1, 1, 1, −1, −1), (1, 1, 1, 1, 1, 1, 1, 1)}, {(1, −1, −1, −1, 1, −1, 1, 1), (1, −1, 1, 1, 1, −1, −1, −1), (1, 1, −1, 1, −1, −1, −1, 1),
(1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (−1, −1, 1, 1,
−1, −1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1, −1, −1, −1, 1, −1),
(−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(1, −1, −1,
−1, 1, −1, 1, 1), (1, −1, 1, 1, 1, −1, −1, −1), (1, 1, −1, 1, −1, −1, −1, 1), (1, 1, 1, −1, −1, −1, 1, −1), (−1, 1, 1, −1, 1, −1, −1, 1),
(1, −1, 1, −1, −1, 1, −1, 1), (−1, −1, 1, 1, −1, −1, 1, 1), (1, 1, 1, 1, 1, 1, 1, 1)}, {(1, −1, −1, −1, 1, −1, 1, 1), (1, −1, 1, 1, 1, −1,
−1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (1, 1, −1,
−1, 1, 1, −1, −1), (1, 1, 1, 1, 1, 1, 1, 1)}, {(1, −1, −1, −1, 1, −1, 1, 1), (1, −1, 1, 1, 1, −1, −1, −1), (1, 1, −1, 1, −1, −1, −1, 1),
(1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (−1, −1, 1, 1,
−1, −1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1, −1, −1, −1, 1, −1),
(1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(1, −1, −1,
−1, 1, −1, 1, 1), (1, −1, 1, 1, 1, −1, −1, −1), (1, 1, −1, 1, −1, −1, −1, 1), (1, 1, 1, −1, −1, −1, 1, −1), (1, −1, −1, 1, −1, 1, 1, −1),
(1, −1, 1, −1, −1, 1, −1, 1), (−1, −1, 1, 1, −1, −1, 1, 1), (1, 1, 1, 1, 1, 1, 1, 1)}, {(1, −1, −1, −1, 1, −1, 1, 1), (1, −1, 1, 1, 1, −1,
−1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (1, 1, −1,
−1, 1, 1, −1, −1), (1, 1, 1, 1, 1, 1, 1, 1)}, {(1, −1, −1, −1, 1, 1, 1, −1), (1, −1, 1, −1, −1, −1, 1, 1), (1, 1, −1, −1, −1, 1, −1, 1),
(1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,
−1, 1, 1, −1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1),
(−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(1, −1, −1,
−1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1),
(−1, 1, −1, −1, 1, −1, 1, 1), (−1, 1, 1, −1, −1, 1, 1, −1), (1, 1, 1, 1, 1, 1, 1, 1)}, {(1, −1, −1, −1, 1, 1, 1, −1), (1, −1, 1, −1, −1,
−1, 1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (1, −1,
−1, 1, 1, −1, −1, 1), (1, 1, 1, 1, 1, 1, 1, 1)}, {(1, −1, −1, −1, 1, 1, 1, −1), (1, −1, 1, −1, −1, −1, 1, 1), (1, 1, −1, −1, −1, 1, −1, 1),
(1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1,
−1, 1, 1, −1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1),
(−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(1, −1, −1,
−1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1),
(1, −1, 1, 1, −1, 1, −1, −1), (−1, 1, 1, −1, −1, 1, 1, −1), (1, 1, 1, 1, 1, 1, 1, 1)}, {(1, −1, −1, −1, 1, 1, 1, −1), (1, −1, 1, −1, −1,
−1, 1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (1, −1, TABLE 4-continued −1, 1, 1, −1, −1, 1), (1, 1, 1, 1, 1, 1, 1, 1)}, {(1, −1, −1, −1, 1, 1, 1, −1), (1, −1, 1, −1, −1, −1, 1, 1), (1, 1, −1, −1, −1, 1, −1, 1),
(1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1,
−1, 1, 1, −1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1),
(−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(1, −1, −1,
−1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, 1, −1, −1, 1, −1, 1, 1),
(1, 1, −1, 1, −1, −1, 1, −1), (−1, 1, 1, −1, −1, 1, 1, −1), (1, 1, 1, 1, 1, 1, 1, 1)}, {(1, −1, −1, −1, 1, 1, 1, −1), (1, −1, 1, −1, −1,
−1, 1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (1, −1,
−1, 1, 1, −1, −1, 1), (1, 1, 1, 1, 1, 1, 1, 1)}, {(1, −1, −1, −1, 1, 1, 1, −1), (1, −1, 1, −1, −1, −1, 1, 1), (1, 1, −1, −1, −1, 1, −1, 1),
(1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1,
−1, 1, 1, −1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1),
(1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(1, −1, −1,
−1, 1, 1, 1, −1), (1, −1, 1, −1, −1, −1, 1, 1), (1, 1, −1, −1, −1, 1, −1, 1), (1, 1, 1, −1, 1, −1, −1, −1), (1, −1, 1, 1, −1, 1, −1, −1),
(1, 1, −1, 1, −1, −1, 1, −1), (−1, 1, 1, −1, −1, 1, 1, −1), (1, 1, 1, 1, 1, 1, 1, 1)}, {(1, −1, −1, −1, 1, 1, 1, −1), (1, −1, 1, −1, −1,
−1, 1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (1, −1,
−1, 1, 1, −1, −1, 1), (1, 1, 1, 1, 1, 1, 1, 1)}, {(1, −1, −1, −1, 1, 1, 1, −1), (1, −1, 1, 1, −1, −1, 1, −1), (1, 1, −1, 1, −1, 1, −1, −1),
(1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,
−1, 1, 1, −1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1),
(−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(1, −1, −1,
−1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1),
(−1, 1, −1, 1, 1, −1, 1, −1), (−1, 1, 1, −1, −1, 1, 1, −1), (1, 1, 1, 1, 1, 1, 1, 1)}, {(1, −1, −1, −1, 1, 1, 1, −1), (1, −1, 1, 1, −1, −1, 1,
−1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (1, −1,
−1, 1, 1, −1, −1, 1), (1, 1, 1, 1, 1, 1, 1, 1)}, {(1, −1, −1, −1, 1, 1, 1, −1), (1, −1, 1, 1, −1, −1, 1, −1), (1, 1, −1, 1, −1, 1, −1, −1),
(1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,
−1, 1, 1, −1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1),
(−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(1, −1, −1,
−1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1),
(1, −1, 1, −1, −1, 1, −1, 1), (−1, 1, 1, −1, −1, 1, 1, −1), (1, 1, 1, 1, 1, 1, 1, 1)}, {(1, −1, −1, −1, 1, 1, 1, −1), (1, −1, 1, 1, −1,
−1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (1, −1,
−1, 1, 1, −1, −1, 1), (1, 1, 1, 1, 1, 1, 1, 1)}, {(1, −1, −1, −1, 1, 1, 1, −1), (1, −1, 1, 1, −1, −1, 1, −1), (1, 1, −1, 1, −1, 1, −1, −1),
(1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,
−1, 1, 1, −1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1),
(−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(1, −1, −1,
−1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, 1, −1, 1, 1, −1, 1, −1),
(1, 1, −1, −1, −1, −1, 1, 1), (−1, 1, 1, −1, −1, 1, 1, −1), (1, 1, 1, 1, 1, 1, 1, 1)}, {(1, −1, −1, −1, 1, 1, 1, −1), (1, −1, 1, 1, −1,
−1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (1, −1,
−1, 1, 1, −1, −1, 1), (1, 1, 1, 1, 1, 1, 1, 1)}, {(1, −1, −1, −1, 1, 1, 1, −1), (1, −1, 1, 1, −1, −1, 1, −1), (1, 1, −1, 1, −1, 1, −1, −1),
(1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,
−1, 1, 1, −1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1),
(1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(1, −1, −1,
−1, 1, 1, 1, −1), (1, −1, 1, 1, −1, −1, 1, −1), (1, 1, −1, 1, −1, 1, −1, −1), (1, 1, 1, −1, 1, −1, −1, −1), (1, −1, 1, −1, −1, 1, −1, 1),
(1, 1, −1, −1, −1, −1, 1, 1), (−1, 1, 1, −1, −1, 1, 1, −1), (1, 1, 1, 1, 1, 1, 1, 1)}, {(1, −1, −1, −1, 1, 1, 1, −1), (1, −1, 1, 1, −1,
−1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (1, −1,
−1, 1, 1, −1, −1, 1), (1, 1, 1, 1, 1, 1, 1, 1)}, {(1, −1, −1, 1, −1, 1, −1, 1), (1, −1, −1, 1, 1, −1, 1, −1), (1, −1, 1, −1, −1, 1, 1, −1),
(1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (−1, −1, 1, 1,
−1, −1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1),
(−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(1, −1, −1, 1,
−1, 1, −1, 1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (−1,
−1, 1, 1, 1, 1, −1, −1), (−1, −1, 1, 1, −1, −1, 1, 1), (1, 1, 1, 1, 1, 1, 1, 1)}, {(1, −1, −1, 1, −1, 1, −1, 1), (1, −1, −1, 1, 1, −1, 1, −1),
(1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (1, 1, −1, −1, 1, 1,
−1, −1), (1, 1, 1, 1, 1, 1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1,
−1, 1, −1, −1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1, −1,
−1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1), (−1,
−1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(1, −1, −1, 1,
−1, 1, −1, 1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1),
(1, 1, −1, −1, −1, −1, 1, 1), (−1, −1, 1, 1, −1, −1, 1, 1), (1, 1, 1, 1, 1, 1, 1, 1)}, {(1, −1, −1, 1, −1, 1, −1, 1), (1, −1, −1, 1, 1,
−1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (1, 1,
−1, −1, 1, 1, −1, −1), (1, 1, 1, 1, 1, 1, 1, 1)}, {(1, −1, −1, 1, −1, 1, −1, 1), (1, −1, −1, 1, 1, −1, 1, −1), (1, −1, 1, −1, −1, 1, 1, −1),
(1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1,
−1, −1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1),
(−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(1, −1, −1, 1,
−1, 1, −1, 1), (1, −1, −1, 1, 1, −1, 1, −1), (1, −1, 1, −1, −1, 1, 1, −1), (1, −1, 1, −1, 1, −1, −1, 1), (−1, −1, 1, 1, 1, 1, −1, −1),
(1, 1, 1, 1, −1, −1, −1, −1), (−1, −1, 1, 1, −1, −1, 1, 1), (1, 1, 1, 1, 1, 1, 1, 1)}, {(1, −1, −1, 1, −1, 1, −1, 1), (1, −1, −1, 1, 1,
−1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (1, 1,
−1, −1, 1, 1, −1, −1), (1, 1, 1, 1, 1, 1, 1, 1)}, {(1, −1, −1, 1, −1, 1, −1, 1), (1, −1, −1, 1, 1, −1, 1, −1), (1, −1, 1, −1, −1, 1, 1, −1),
(1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1,
−1, −1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1),
(1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(1, −1,
−1, 1, −1, 1, −1, 1), (1, −1, −1, 1, 1, −1, 1, −1), (1, −1, 1, −1, −1, 1, 1, −1), (1, −1, 1, −1, 1, −1, −1, 1), (1, 1, −1, −1, −1, −1, 1, 1),
(1, 1, 1, 1, −1, −1, −1, −1), (−1, −1, 1, 1, −1, −1, 1, 1), (1, 1, 1, 1, 1, 1, 1, 1)}, {(1, −1, −1, 1, −1, 1, −1, 1), (1, −1, −1, 1, 1,
−1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (1, 1,
−1, −1, 1, 1, −1, −1), (1, 1, 1, 1, 1, 1, 1, 1)}, {(1, −1, −1, 1, 1, −1, 1, −1), (1, −1, 1, −1, 1, −1, −1, 1), (1, 1, −1, 1, −1, −1, −1, 1),
(1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1, −1), (−1, −1, 1, 1,
−1, −1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1),
(−1, 1, −1, −1, 1, −1, 1, 1), (−1, 1, 1, 1, 1, −1, −1, −1), (−1, −1, −1, −1, −1, −1, −1, −1), (1, 1, −1, −1, 1, 1, −1, −1)}, {(1, −1,
−1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1),
(−1, 1, 1, 1, 1, −1, −1, −1), (−1, −1, 1, 1, −1, −1, 1, 1), (1, 1, 1, 1, 1, 1, 1, 1)}, {(1, −1, −1, 1, 1, −1, 1, −1), (1, −1, 1, −1, 1, −1,
−1, 1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1), (1, 1, −1,
−1, 1, 1, −1, −1), (1, 1, 1, 1, 1, 1, 1, 1)}, {(1, −1, −1, 1, 1, −1, 1, −1), (1, −1, 1, −1, 1, −1, −1, 1), (1, 1, −1, 1, −1, −1, −1, 1),
(1, 1, 1, −1, −1, −1, 1, −1), (−1, 1, −1, −1, 1, −1, 1, 1), (1, −1, −1, −1, −1, 1, 1, 1), (−1, −1, −1, −1, −1, −1, −1, −1), (−1, −1, 1, 1,
−1, −1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1), TABLE 4-continued (−1, 1, −1, −1, 1, −1, 1, 1), (1, −1, −1, −1, −1, 1, 1, 1), (−1, −1, −1, −1, −1, −1, −1, −1), (1, 1, −1, −1, 1, 1, −1, −1)}, {(1, −1,
−1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1),
(1, −1, −1, −1, −1, 1, 1, 1), (−1, −1, 1, 1, −1, −1, 1, 1), (1, 1, 1, 1, 1, 1, 1, 1)}, {(1, −1, −1, 1, 1, −1, 1, −1), (1, −1, 1, −1, 1, −1,
−1, 1), (1, 1, −1, 1, −1, −1, −1, 1), (1, 1, 1, −1, −1, −1, 1, −1), (−1, 1, −1, −1, 1, −1, 1, 1), (1, −1, −1, −1, −1, 1, 1, 1), (1, 1, −1,
−1, 1, 1, −1, −1), (1, 1, 1, 1, 1, 1, 1, 1)}, {(1, −1, −1, 1, 1, −1, 1, −1), (1, −1, 1, −1, 1, −1, −1, 1), (1, 1, −1, 1, −1, −1, −1, 1),
(1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1, −1), (−1, −1, 1, 1,
−1, −1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1),
(−1, 1, 1, 1, 1, −1, −1, −1), (1, −1, 1, 1, −1, 1, −1, −1), (−1, −1, −1, −1, −1, −1, −1, −1), (1, 1, −1, −1, 1, 1, −1, −1)}, {(1, −1,
−1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, 1, 1, 1, −1, −1, −1),
(1, −1, 1, 1, −1, 1, −1, −1), (−1, −1, 1, 1, −1, −1, 1, 1), (1, 1, 1, 1, 1, 1, 1, 1)}, {(1, −1, −1, 1, 1, −1, 1, −1), (1, −1, 1, −1, 1, −1,
−1, 1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1, −1, −1), (1, 1, −1,
−1, 1, 1, −1, −1), (1, 1, 1, 1, 1, 1, 1, 1)}, {(1, −1, −1, 1, 1, −1, 1, −1), (1, −1, 1, −1, 1, −1, −1, 1), (1, 1, −1, 1, −1, −1, −1, 1),
(1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1, −1), (−1, −1, 1, 1,
−1, −1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1),
(1, −1, −1, −1, −1, 1, 1, 1), (1, −1, 1, 1, −1, 1, −1, −1), (−1, −1, −1, −1, −1, −1, −1, −1), (1, 1, −1, −1, 1, 1, −1, −1)}, {(1, −1,
−1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (1, −1, −1, −1, −1, 1, 1, 1),
(1, −1, 1, 1, −1, 1, −1, −1), (−1, −1, 1, 1, −1, −1, 1, 1), (1, 1, 1, 1, 1, 1, 1, 1)}, {(1, −1, −1, 1, 1, −1, 1, −1), (1, −1, 1, −1, 1, −1,
−1, 1), (1, 1, −1, 1, −1, −1, −1, 1), (1, 1, 1, −1, −1, −1, 1, −1), (1, −1, −1, −1, −1, 1, 1, 1), (1, −1, 1, 1, −1, 1, −1, −1), (1, 1, −1,
−1, 1, 1, −1, −1), (1, 1, 1, 1, 1, 1, 1, 1)}, {(1, −1, 1, −1, −1, −1, 1, 1), (1, −1, 1, −1, 1, 1, −1, −1), (1, 1, −1, −1, −1, 1, −1, 1),
(1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (−1, 1, 1, −1,
−1, 1, 1, −1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1),
(−1, −1, −1, −1, 1, 1, 1, 1), (−1, 1, 1, −1, 1, −1, −1, 1), (−1, −1, −1, −1, −1, −1, −1, −1), (1, −1, −1, 1, 1, −1, −1, 1)}, {(1, −1, 1, −1,
−1, −1, 1, 1), (1, −1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1),
(−1, 1, 1, −1, 1, −1, −1, 1), (−1, 1, 1, −1, −1, 1, 1, −1), (1, 1, 1, 1, 1, 1, 1, 1)}, {(1, −1, 1, −1, −1, −1, 1, 1), (1, −1, 1, −1, 1, 1, −1,
−1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1, −1, 1), (1, −1,
−1, 1, 1, −1, −1, 1), (1, 1, 1, 1, 1, 1, 1, 1)}, {(1, −1, 1, −1, −1, −1, 1, 1), (1, −1, 1, −1, 1, 1, −1, −1), (1, 1, −1, −1, −1, 1, −1, 1),
(1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (−1, 1, 1, −1,
−1, 1, 1, −1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1),
(−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(1, −1, 1, −1,
−1, −1, 1, 1), (1, −1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1), (1,
−1, −1, 1, −1, 1, 1, −1), (−1, 1, 1, −1, −1, 1, 1, −1), (1, 1, 1, 1, 1, 1, 1, 1)}, {(1, −1, 1, −1, −1, −1, 1, 1), (1, −1, 1, −1, 1, 1, −1,
−1), (1, 1, −1, −1, −1, 1, −1, 1), (1, 1, −1, −1, 1, −1, 1, −1), (−1, −1, −1, −1, 1, 1, 1, 1), (1, −1, −1, 1, −1, 1, 1, −1), (1, −1,
−1, 1, 1, −1, −1, 1), (1, 1, 1, 1, 1, 1, 1, 1)}, {(1, −1, 1, −1, −1, −1, 1, 1), (1, −1, 1, −1, 1, 1, −1, −1), (1, 1, −1, −1, −1, 1, −1, 1),
(1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (−1, 1, 1, −1,
−1, 1, 1, −1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1),
(−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(1, −1, 1, −1,
−1, −1, 1, 1), (1, −1, 1, −1, 1, 1, −1, −1), (1, 1, −1, −1, −1, 1, −1, 1), (1, 1, −1, −1, 1, −1, 1, −1), (−1, 1, 1, −1, 1, −1, −1, 1),
(1, 1, 1, 1, −1, −1, −1, −1), (−1, 1, 1, −1, −1, 1, 1, −1), (1, 1, 1, 1, 1, 1, 1, 1)}, {(1, −1, 1, −1, −1, −1, 1, 1), (1, −1, 1, −1, 1, 1,
−1, −1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (1, −1,
−1, 1, 1, −1, −1, 1), (1, 1, 1, 1, 1, 1, 1, 1)}, {(1, −1, 1, −1, −1, −1, 1, 1), (1, −1, 1, −1, 1, 1, −1, −1), (1, 1, −1, −1, −1, 1, −1, 1),
(1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (−1, 1, 1, −1,
−1, 1, 1, −1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1),
(1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(1, −1, 1,
−1, −1, −1, 1, 1), (1, −1, 1, −1, 1, 1, −1, −1), (1, 1, −1, −1, −1, 1, −1, 1), (1, 1, −1, −1, 1, −1, 1, −1), (1, −1, −1, 1, −1, 1, 1, −1),
(1, 1, 1, 1, −1, −1, −1, −1), (−1, 1, 1, −1, −1, 1, 1, −1), (1, 1, 1, 1, 1, 1, 1, 1)}, {(1, −1, 1, −1, −1, −1, 1, 1), (1, −1, 1, −1, 1, 1,
−1, −1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (1, −1,
−1, 1, 1, −1, −1, 1), (1, 1, 1, 1, 1, 1, 1, 1)}, {(1, −1, 1, −1, 1, 1, −1, −1), (1, −1, 1, 1, −1, −1, 1, −1), (1, 1, −1, −1, 1, −1, 1, −1),
(1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1,
−1, 1, 1, −1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1),
(−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(1, −1, 1,
−1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1),
(−1, 1, 1, 1, 1, −1, −1, −1), (−1, 1, 1, −1, −1, 1, 1, −1), (1, 1, 1, 1, 1, 1, 1, 1)}, {(1, −1, 1, −1, 1, 1, −1, −1), (1, −1, 1, 1, −1, −1, 1,
−1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (1, −1,
−1, 1, 1, −1, −1, 1), (1, 1, 1, 1, 1, 1, 1, 1)}, {(1, −1, 1, −1, 1, 1, −1, −1), (1, −1, 1, 1, −1, −1, 1, −1), (1, 1, −1, −1, 1, −1, 1, −1),
(1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1,
−1, 1, 1, −1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1),
(−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(1, −1, 1,
−1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1),
(1, −1, −1, −1, −1, 1, 1, 1), (−1, 1, 1, −1, −1, 1, 1, −1), (1, 1, 1, 1, 1, 1, 1, 1)}, {(1, −1, 1, −1, 1, 1, −1, −1), (1, −1, 1, 1, −1,
−1, 1, −1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (1, −1,
−1, 1, 1, −1, −1, 1), (1, 1, 1, 1, 1, 1, 1, 1)}, {(1, −1, 1, −1, 1, 1, −1, −1), (1, −1, 1, 1, −1, −1, 1, −1), (1, 1, −1, −1, 1, −1, 1, −1),
(1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1,
−1, 1, 1, −1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1),
(−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(1, −1, 1,
−1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, 1, 1, 1, 1, −1, −1, −1),
(1, 1, 1, −1, −1, −1, −1, 1), (−1, 1, 1, −1, −1, 1, 1, −1), (1, 1, 1, 1, 1, 1, 1, 1)}, {(1, −1, 1, −1, 1, 1, −1, −1), (1, −1, 1, 1, −1,
−1, 1, −1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (1, −1,
−1, 1, 1, −1, −1, 1), (1, 1, 1, 1, 1, 1, 1, 1)}, {(1, −1, 1, −1, 1, 1, −1, −1), (1, −1, 1, 1, −1, −1, 1, −1), (1, 1, −1, −1, 1, −1, 1, −1),
(1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1,
−1, 1, 1, −1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1),
(1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(1, −1, 1,
−1, 1, 1, −1, −1), (1, −1, 1, 1, −1, −1, 1, −1), (1, 1, −1, −1, 1, −1, 1, −1), (1, 1, −1, 1, −1, 1, −1, −1), (1, −1, −1, −1, −1, 1, 1, 1),
(1, 1, 1, −1, −1, −1, −1, 1), (−1, 1, 1, −1, −1, 1, 1, −1), (1, 1, 1, 1, 1, 1, 1, 1)}, {(1, −1, 1, −1, 1, 1, −1, −1), (1, −1, 1, 1, −1,
−1, 1, −1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (1, −1,
−1, 1, 1, −1, −1, 1), (1, 1, 1, 1, 1, 1, 1, 1)}

The orthogonal code sets, as shown in table 4 are base code sets with code length of 8. The mixed frequency code searching module 318 is further capable of outputting orthogonal code sets for four frequency code group with code length of 16 by repeating the codes in base code sets. The mixed frequency code searching module 318 is also capable of outputting orthogonal code sets for four frequency code groups with code length of 32 by repeating the codes in base code sets for four times and so on. It will be appreciated that mixed frequency code searching module 318 is capable of performing the above operation for all mixed frequency code groups.

For instance, a code with length 8 (−1,−1,−1,1,−1,1,1,1) in table 4 with four frequency component may also be represented by a code with length 16 with four frequency component as (−1,−1,−1,1,−1,1,1,1,−1,−1,−1,1,−1,1,1,1), by a code with length 32 with four frequency component as (−1,−1,−1,1,−1,1,1,1,−1,−1,−1,1,−1,1,1,1,−1,−1,−1,1,−1,1, 1,1,−1,−1,−1,1,−1,1,1,1) and so on.

The performance of orthogonal codes sets supplied by unique frequency code searching module 316 and mixed frequency code searching module 318 may be evaluated in terms of spectral efficiency calculated as:

$$SPEF = \frac{N_c}{NF_c}$$

Where NFc is the number of frequency locations of the code, and $N_c$ is the number of codes in a code set within a frequency group. The spectral efficiency of codes within the code sets achieved by one the exemplary embodiment is 2

Figure 4:
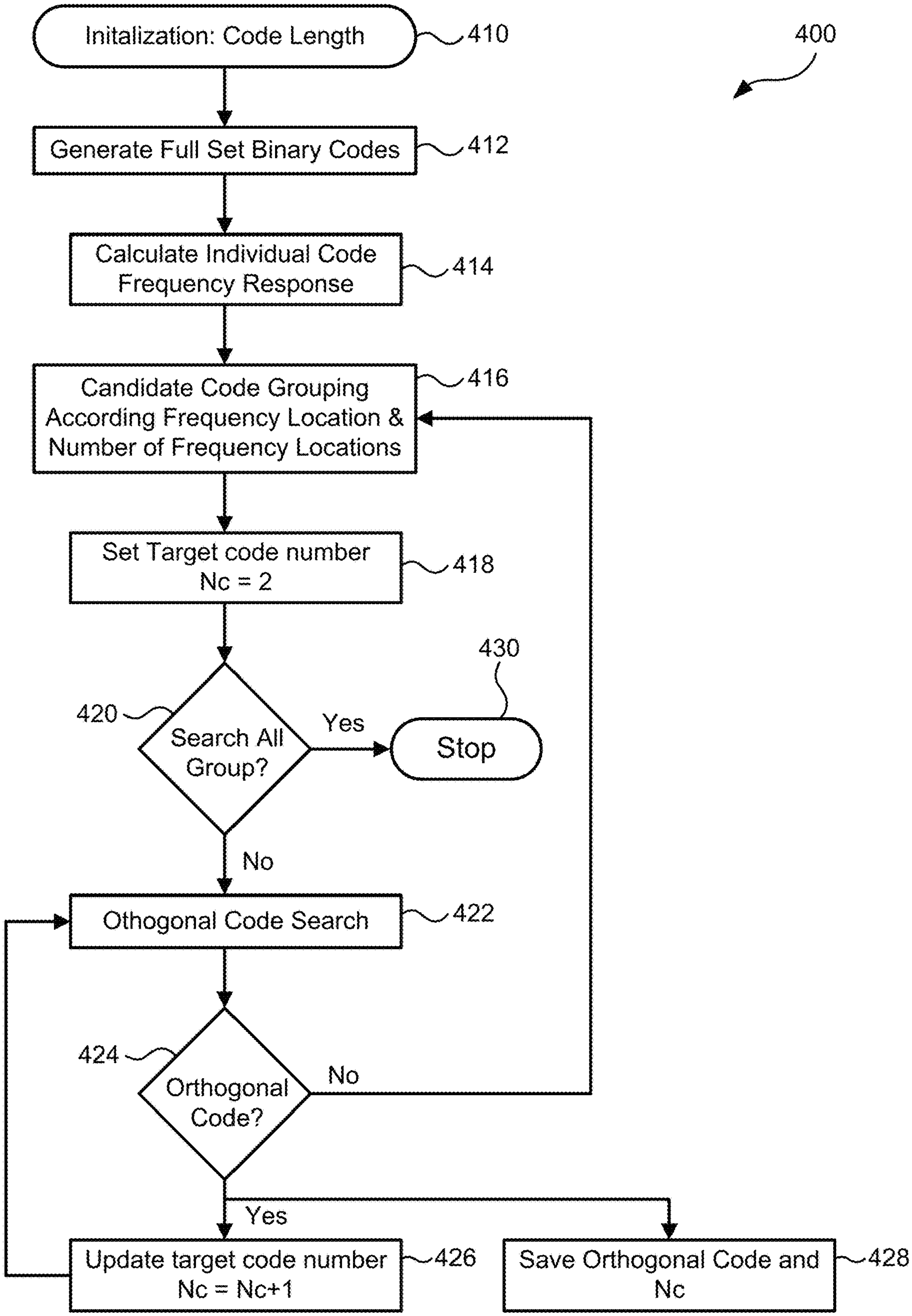
FIG. 4 depicts a functional flow diagram of spectrally efficient orthogonal code generation processing, in accordance with various embodiments of the present disclosure.

FIG. 4 depicts a functional flow diagram of process 400 directed to spectrally efficient orthogonal code generation processing in accordance with various embodiments of the present disclosure.

As shown, process 400 begins at task block 410, in which spectrally efficient orthogonal code generation architecture 300 receives a request to generate orthogonal codes of a specific length L. As noted above, architecture 300 may include full-Set code generation module 310 to receive a request to generate orthogonal codes of a specific length L.

Process 400 proceeds to task block 412, where architecture 300 generates a full-set candidate code group. As noted above, full-Set code generation module 310 generates a full-set candidate code group that contains all possible combination of codes for the code length L.

At task block 414, architecture 300 operates to calculate the frequency response of every code present in candidate code group. As discussed above, frequency response calculation module 312 calculates frequency response of every code present in candidate code group. In doing so, frequency response calculation module 312 calculates the number of frequency locations and the corresponding frequency positions present in each code of candidate code group.

Process 400 advances to task block 416, where architecture 300 operates to perform a candidate code grouping based on number of frequency locations and the corresponding frequency positions present in all the codes of candidate code group. That is, as described above, spectrum code grouping module 314 performs a code grouping operation based on calculated frequency responses of codes in candidate code group. In doing so, code grouping module 314 divides the codes into two categories of groups, namely unique frequency code groups and mixed frequency code groups.

Process 400 proceeds to task block 418, where architecture 300 sets a target number of codes in orthogonal code set. As noted above, code selection module 316C and code selection module 318C sets a target number of codes equal to two in orthogonal code set.

At task block 420, architecture 400 operates to determine whether all frequency code groups have been searched. If all frequency code groups have been searched process 400 goes to task block 430 to end the process; otherwise process 400 advances to task block 422. As discussed above, unique frequency code searching module 316 and mixed frequency code searching module 318 operate to perform searching in unique frequency code group and mixed frequency code group.

At process 400 the task block 422, where architecture 400 operates to perform orthogonal code searching. That is, as described above, code selection module 316C and code selection module 318C operates to select the orthogonal codes from each unique frequency code group and mixed frequency code group and forms orthogonal code sets within each unique frequency code group and mixed frequency code group respectively.

Process 400 advances to task block 424, where architecture 300 determines whether the code is orthogonal or not. If the code is not orthogonal, process 400 returns to task block 416 and repeat the process with another group. If the code is orthogonal, process 400 goes to task block 426 where architecture 300 increments the target number of codes in orthogonal code set by one and the process returns to task block 422 to search another orthogonal code. Also, at task block 428, architecture 300 saves the value of orthogonal code and the target number of codes in orthogonal code set in a memory element. As discussed above, if code selection module 316C and code selection module 318C finds a suitable code, the target number of codes is increased by one and the selection process is then repeated with updated target number of codes. Further, the orthogonal code and the target number of codes in orthogonal code set may be then stored in a memory element.

Figure 5:
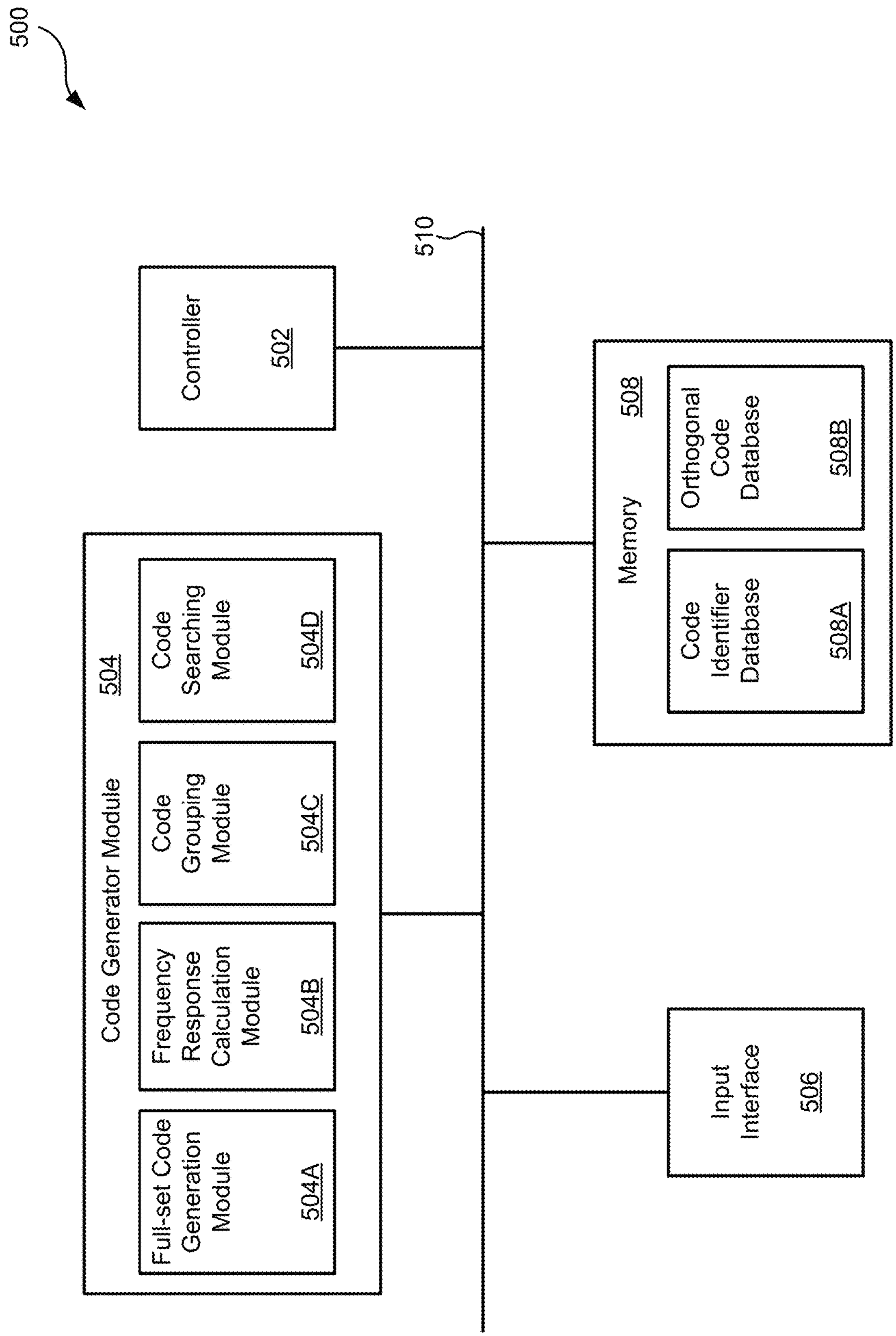
FIG. 5 depicts an exemplary high-level functional block diagram of spectrally efficient orthogonal code generation architecture, in accordance with various embodiments of the present disclosure.

FIG. 5 shows an exemplary block diagram of spectrally efficient orthogonal code generation architecture 500, in accordance with various embodiments of the present disclosure. As shown, the orthogonal code generation architecture 500 employs a controller 502, a code generator 504 that includes full-set code generation module 504A, frequency response calculation module 504B, code grouping module 504C and code searching module 504D. The orthogonal code generation architecture 500 may also include an input interface 506 and a memory 508. The above components may be coupled together via a signal bus 510.

The orthogonal code generation architecture 500 may receive a request via the input interface 506 to generate a specific orthogonal code that specifies the lengths of orthogonal codes. After receiving the request, the controller 502 proceeds to command the code generator module 504 to generate various code groups based on number of frequency locations and positions. Within each code group the codes are arranged to form orthogonal code sets based on orthogonality property. This process is similar to as described above. The code groups are placed into the memory 508 as each of the groups are generated.

The memory 508 includes databases such as a code identifier database 508A and an orthogonal code database 508B. The orthogonal code database 508B stores the code groups as generated by code generator module 504. Each of the orthogonal code is individually identified by an identifier based on additional information outputted by the code generator 504 such as number of code sets in a code group, number codes in a code set, number of frequency components of each code, number of overlapped frequency positions, location of frequency component of each code and length of each code etc. The code identifier database 508A includes lists of such identifiers so that input signals may be spread according to a selected code sequence.

It will be appreciated that the spectrally efficient orthogonal code generation architectures 300, 500 presented above may be employed in conventional transmitter and receiver architectures 100, 200. These architectures exploit the sharing of frequency positions by different orthogonal codes to enable the efficient utilization of the operating frequency spectrum, thereby improving data transmission rates.

Figure 6:
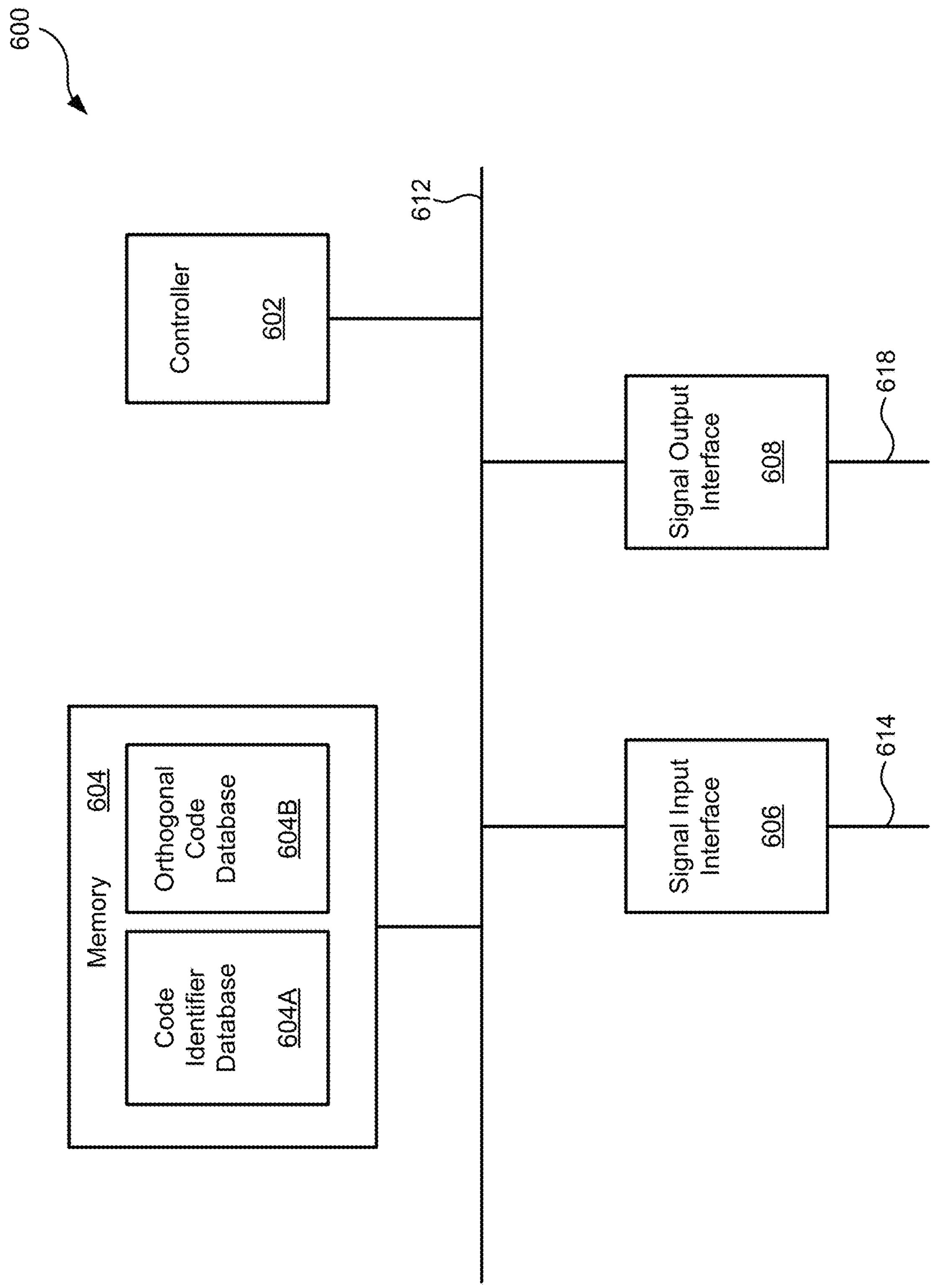
FIG. 6 depicts an exemplary high-level functional block diagram of spectrum spreading architecture, in accordance with various embodiments of the present disclosure.

FIG. 6 shows a spectrum spreading system 600, in accordance with various embodiments of the present disclosure. The spectrum spreading system 600 includes a controller 602, a memory 604, a signal input interface 606 and a signal output interface 608. The above components are coupled together via a signal bus 612.

The memory 604 includes databases such as a code identifier database 604A and an orthogonal code database 604B. The orthogonal code database 604B stores the code groups as generated by orthogonal code generation architecture 500, for example. Each of the orthogonal code is individually identified by an identifier based on additional information outputted by the code generator 504 such as number of code sets in a code group, number codes in a code set, number of frequency components of each code, number of overlapped frequency positions, location of frequency component of each code and length of each code etc.

The signal input interface 606 receives the input signal to be spread via the signal bus 614 and the signal output interface 608 outputs the spread signal via a signal bus 616.

The spectrum spreading system 600 is first initialized with the appropriate orthogonal code database 306 and the appropriate code sequence database 308. When an input signal from a previous stage such as, for example, channel encoder, is input via the signal input interface 606 as a symbol stream, the controller 602 then selects the appropriate orthogonal codes from memory 604 based on symbol stream. In doing so, the controller 602 spread each symbol based on the code sequence of selected orthogonal codes and outputs the spread signal via the signal output interface 608 to a following stage such as a modulator and transmitter for example. This process continues until the input symbol stream is exhausted.

Figure 7:
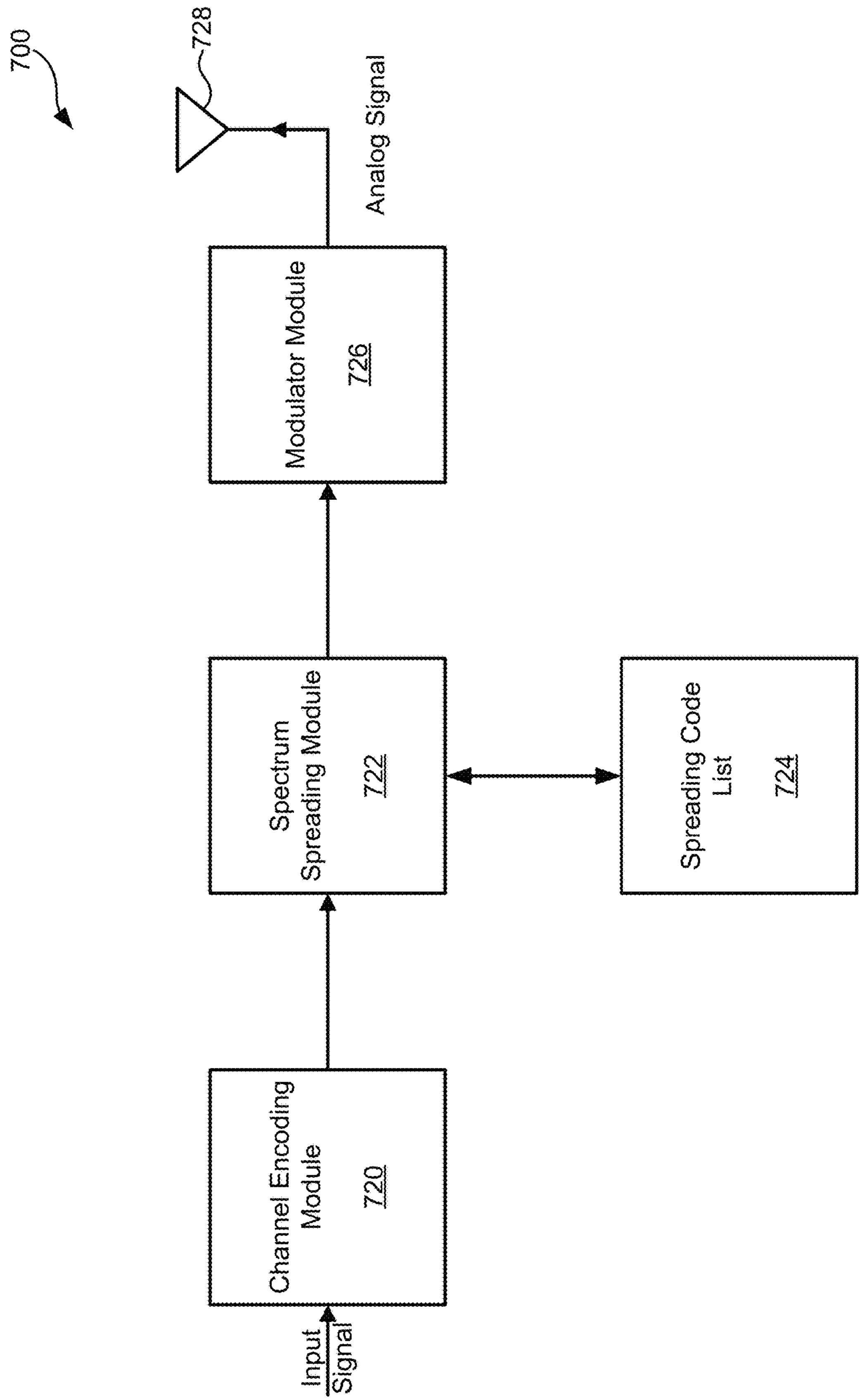
FIG. 7 depicts a high-level functional block diagram of a transmitter, in accordance with various embodiments of the present disclosure.

FIG. 7 illustrates a functional block diagram of a transmitter 700, in accordance with various embodiments of the present disclosure. The transmitter 700 includes a channel encoding module 720, a spectrum spreading module 722, a spreading code list provider 724, a modulator module 726 and a transmitter antenna 728. Other elements may be implemented but not illustrated for purposes of tractability and simplicity.

As illustrated by FIG. 7, transmitter 700 receives an input signal into channel encoding module 720. The channel encoding module 720 encodes the input signal and outputs the encoded signal to a spectrum spreading module 722. The channel encoding module 720 may use any of the existing encoding techniques, such as, for example, but not limited to block codes, convolutional codes, turbo codes etc.

The spectrum spreading module 722 receives the encoded signal from channel encoding module 720 and is configured to spread the spectrum of encoded signal according to a set of codes selected from spreading code list provider 724. The spreading of spectrum is executed by mixing the encoded signal with a code sequence in the code set.

It is to be understood, that spreading code list provider 724 is capable of storing code sets in accordance with table 1, table 2, table 3 or table 4.

The modulator module 726 receives the spread signal from spectrum spreading module 722 and modulates the spread signal onto a carrier signal to output the modulated signal for transmission. An analog signal is thereafter transmitted via a transmitter antenna 728 to the wireless communication channel. The modulator 726 may use any of the existing modulation techniques, such as, for example, but not limited to PSK, FSK, ASK, OOK, QAM etc.

Figure 8:
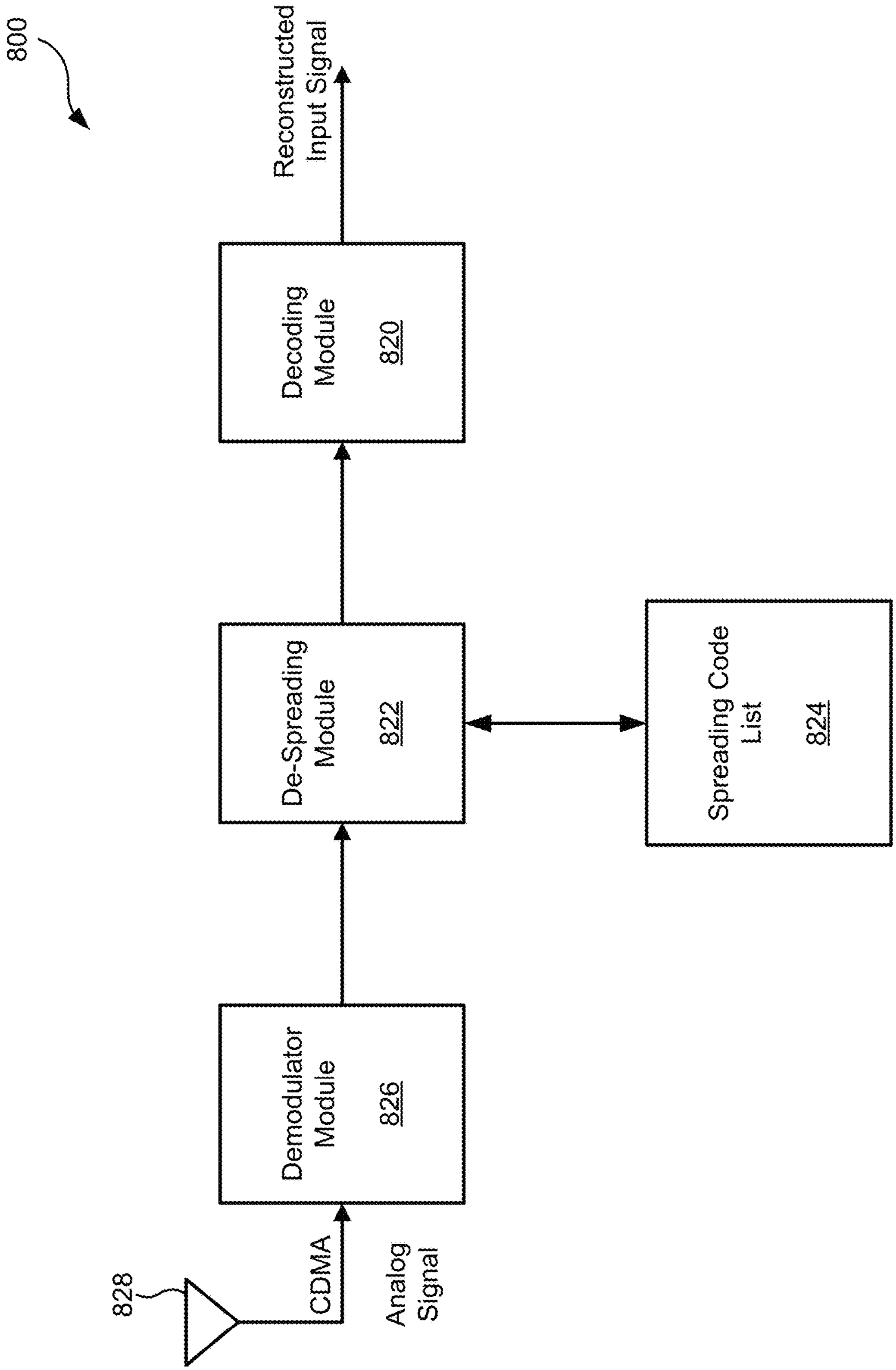
FIG. 8 depicts a high-level functional block diagram of a receiver, in accordance with various embodiments of the present disclosure.

FIG. 8 illustrates a functional block diagram of a receiver 800 used in spread-spectrum based communication system directed to processing received analog signal from transmitter antenna 828, to reconstruct the input signal. The receiver 800 includes a channel decoding module 820, a spectrum de-spreading module 822, a spreading code list provider 824, a de-modulator module 826 and a receiver antenna 828. Other elements may be present but not illustrated for purposes of tractability and simplicity.

As illustrated by FIG. 8, receiver 800 receives an analog signal by receiver antenna 828 that may be transmitted by transmitter antenna 728. The demodulator module 826 demodulates the received analog signal. The demodulation of received analog signal is executed by mixing the received analog signal with a suitable carrier signal.

The spectrum de-spreading module 822 receives the demodulated signal from demodulator module 826 and is configured to de-spread the spectrum of demodulated signal according to a set of codes selected from spreading code list provider 824. The de-spreading of spectrum is carried out for example, by mixing the de-modulated signal with a code sequence in the code set.

It is to be understood, that spreading code list provider 824 may be capable of storing code sets in accordance with table 1, table 2, table 3 or table 4.

The channel decoding module 820 receives the de-spread signal from spectrum de-spreading module 822. The channel decoding module 820 decode the de-spread signal to reconstruct the input signal. The channel decoding module 820 may use any of the existing decoding techniques such as, for example, but not limited to maximum likelihood decoder, Viterbi decoder etc.

Figure 9:
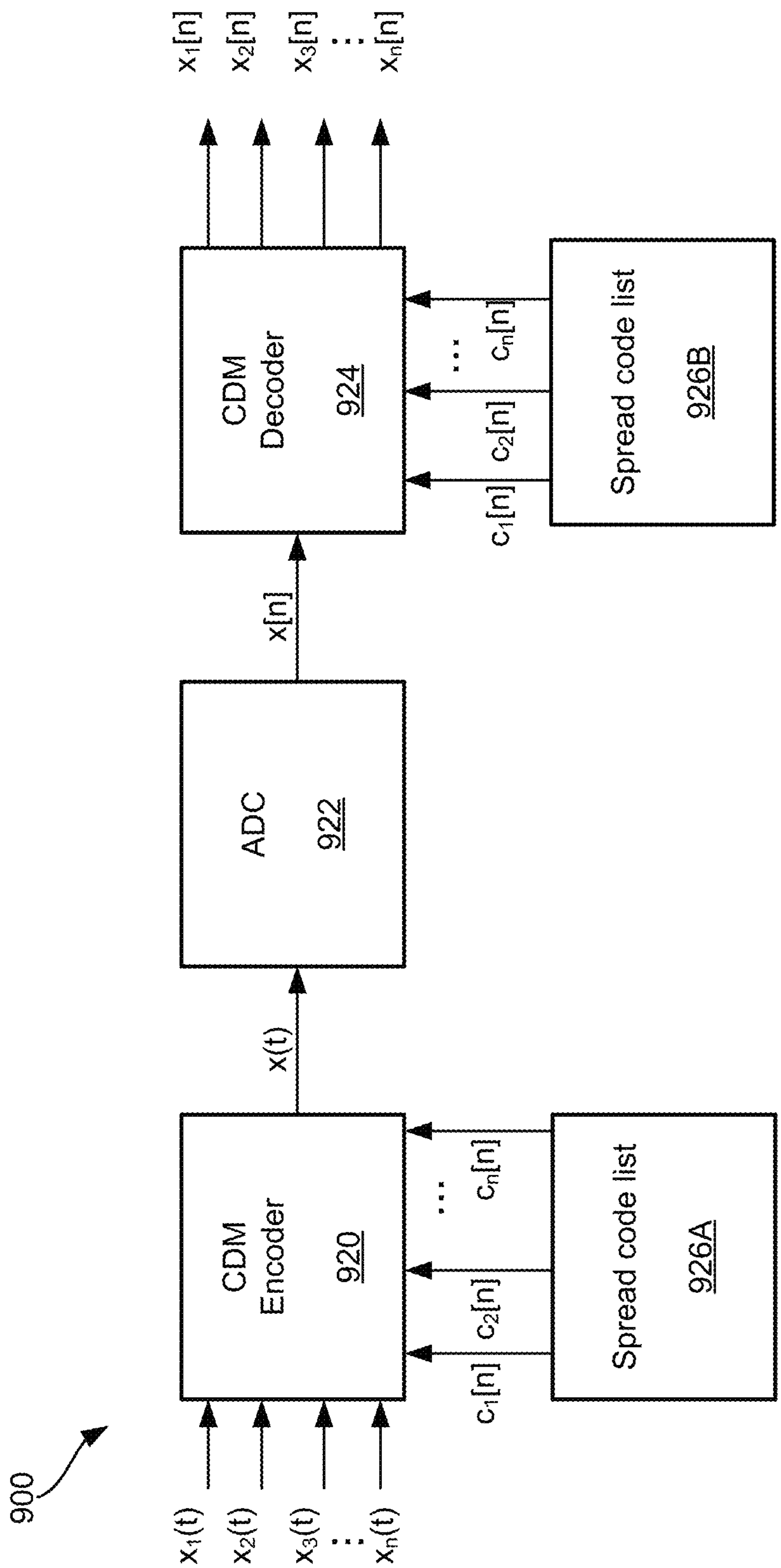
FIG. 9 depicts a high-level functional block diagram of a wireless receiver, in accordance with various embodiments of the present disclosure.

FIG. 9 illustrates a functional block diagram of the architecture of a wireless receiver 900 for processing received analog signals. The wireless receiver 900 includes a code division multiplexing (CDM) encoder module 920, an analog-to-digital converter (ADC) 922, a CDM decoder module 924, and a spread code list provider 926A, 926B. It will be understood that other elements may be present but not illustrated for the purpose of tractability and simplicity.

As illustrated by FIG. 9, wireless receiver 900 receives analog input signals $x_1(t)$, $x_2(t) \ldots x_n(t)$, which may be received by one or more antenna structures (not shown), such as, for example, MIMO/M-MIMO antennas. Moreover, each of the received signals may possess different modulation/encoding characteristics.

As shown, the analog input signals $x_1(t)$, $x_2(t) \ldots x_n(t)$ are forwarded to CDM encoder 920. The CDM encoder 920 is configured to encode and convert the n analog input signals $x_1(t)$, $x_2(t) \ldots x_n(t)$ into a single, composite, encoded analog signal x(t), in accordance with a supplied coding scheme. That is, spread code list provider 926A supplies CDM encoder module 920 with a spread code scheme $c_i[n]$: $c_1[n]$, $c_2[n] \ldots c_n[n]$. Consistent with other embodiments of present disclosure, spread code list provider 926A may be capable of storing code sets in accordance with table 1, table 2, table 3 or table 4.

In particular, the encoding operation of CDM encoder module 920 is accomplished by mixing the analog input signals $x_1(t)$, $x_2(t)$ . . . $x_n(t)$ with the spread code scheme $c_1[n]$, $c_2[n]$ . . . $c_n[n]$. The outputs of the mixing operation may be subsequently filtered and combined to yield a single analog composite signal x(t) that is effectively spread across a wide frequency bandwidth.

The encoded analog composite signal x(t) may be provided to a ADC module 922 having high bandwidth, and operates to convert analog composite signal x(t) into a digital composite signal x[n].

The digital composite signal x[n] is subsequently transmitted for further processing, such as, for example, decoding operations performed by CDM decoder module 924. CDM decoder module 924 processes digital composite signal x[n] to decode and segregate the digital composite signal x[n] to obtain digital input signals $x_1[n]$, $x_2[n]$ . . . $x_n[n]$.

That is, CDM decoder module 124 receives and processes digital composite signal x[n] by mixing the digital composite signal x[n] with the spread code scheme $c_i[n]$ provided by spread code list provider 926B. Consistent with other embodiments of present disclosure, spread code list provider 926A may be capable of storing code sets in accordance with table 1, table 2, table 3 or table 4. The resulting mixed samples may be then integrated to generate digital input signals $x_1$ [n], $x_2[n]$ . . . $x_n[n]$.

It is to be understood that the operations and functionality of the described orthogonal code generation architecture, transmitter, receiver, constituent components, and associated processes may be achieved by hardware-based, software-based, firmware-based elements and/or combinations thereof. Such operational alternatives do not, in any way, limit the scope of the present disclosure.

It will be further appreciated that the orthogonal code generation architecture, transmitter, and receiver discussed in the current discloser may be incorporated in a number of different electronic devices, such as, for example, mobile phones, laptops, user equipment (UE), etc.

It will also be understood that, although the inventive concepts and principles presented herein have been described with reference to specific features, structures, and embodiments, it is clear that various modifications and combinations may be made without departing from such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. A spectrally-efficient orthogonal code generation system, comprising:

a code generation module configured to generate a candidate code group, in which the candidate code group contains $2^L$ different codes for a given code length L;

a frequency response calculation module configured to calculate a frequency response of the codes within the candidate code group;

a code grouping module configured to divide the codes within the candidate group into a unique frequency code group and a mixed frequency code group, based on frequency response of the codes within the candidate code group;

a frequency code searching module configured to search for orthogonal codes within each of the unique and mixed frequency code groups.

2. The system of claim 1, wherein for a number of frequency locations N, the codes having same number of frequency locations N and frequency components positioned at same frequency locations are grouped to form the unique frequency code groups.

3. The system of claim 1, wherein for a number of frequency locations N, the codes having same number of frequency locations N and frequency components positioned at same frequency locations, in addition to the codes having the number of frequency locations less than N with a condition that the positions of all the frequency components of such codes will overlap with some positions of frequency components of codes having N frequency locations are grouped to form the mixed frequency code groups.

4. The system of claim 1, wherein one or more code sets are formed within each frequency code group, the codes within code sets are orthogonal in nature.

5. The system of claim 4, wherein the codes within the code sets have zero un-shifted cross correlation.

6. The system of claim 4, wherein the codes within the code sets have a minimum value of a maximum side lobe.

7. The system of claim 4, wherein the codes within the code sets have a minimum value of a total side lobe.

8. The system of claim 4, further generates an orthogonal code of length 2L within a code set by repeating the orthogonal code of length L.

9. The system of claim 4, further comprising storing identifier information and the corresponding orthogonal code in a database forming a orthogonal code list, wherein the identifier information can be at least one of the following: a number of code sets in the unique frequency code group, a number of codes in a code set, a number of frequency components in each code, a number of overlapped frequency locations, a location of a frequency component of each code, and/or a length of each code.

10. The system of claim 9, further computes a spectral efficiency wherein the spectral efficiency is a ratio of the number of codes in a code set within a frequency group and the number of frequency locations of the code.

11. The system of claim 10, wherein the spectral efficiency is at least 2.

12. A method of generating a spectrally-efficient orthogonal code, comprising:

generating a candidate code group, wherein the candidate code group contains $2^L$ different codes for a given code length L;

calculating a frequency response of the codes within the candidate code group;

dividing the codes within the candidate group into a unique frequency code group and a mixed frequency code group, based on frequency response of the codes within the candidate code group;

searching for orthogonal codes within each of the unique and mixed frequency code groups.

13. The method of claim 12, wherein for a number of frequency locations N, the codes having same number of frequency locations N and frequency components positioned at same frequency locations are grouped to form the unique frequency code groups.

14. The method of claim 12, wherein for a number of frequency locations N, the codes having same number of frequency locations N and frequency components positioned at same frequency locations, in addition to the codes having the number of frequency locations less than N with a condition that the positions of all the frequency components of such codes will overlap with some positions of frequency components of codes having N frequency locations are grouped to form a mixed frequency code group.

15. The method of claim 12, wherein one or more code sets are formed within each frequency code group, the codes within each of the code sets are orthogonal in nature.

16. The method of claim 15, wherein the codes within the code sets have zero un-shifted cross correlation.

17. The method of claim 15, wherein the codes within the code sets have a minimum value of a maximum side lobe.

18. The method of claim 15, wherein the codes within the code sets have a minimum value of a total side lobe.

19. The method of claim 15, further comprising generating an orthogonal code of length 2L within the code set by repeating the orthogonal code of length L.

20. The method of claim 15, further comprising storing an identifier information and the corresponding orthogonal code in a database forming a orthogonal code list, wherein the identifier information is at least one of the following: a number of code sets within the unique frequency code group, a number of codes within a code set, a number of frequency components in each code, a number of overlapped frequency positions, a location of frequency component of each code, and/or a length of each code.

21. The method of claim 20, further computes a spectral efficiency wherein the spectral efficiency is a ratio of the number of codes in a code set within a frequency group and the number of frequency locations of the code.

22. The method of claim 21, wherein the spectral efficiency is at least 2.

23. A method for wireless communications, comprising:

encoding an input signal;

spreading the encoded signal using a suitable orthogonal code selected from a list of orthogonal codes, the suitable orthogonal code based on:

generating a candidate code group, wherein the candidate code group contains $2^L$ different codes for a given code length L;

calculating a frequency response of the codes within the candidate code group;

dividing the codes within the candidate group into two categories of frequency code groups, based on frequency response of the codes within the candidate code group;

searching for orthogonal codes within each frequency code group;

modulating the spread signal;

transmitting the modulated signal.

24. The method of claim 23, wherein the frequency code groups comprise unique frequency code groups and for a number of frequency locations N, the codes having same number of frequency locations N and frequency components positioned at same frequency locations are grouped to form the unique frequency code groups.

25. The method of claim 23, wherein the frequency code groups comprise mixed frequency code groups and for a number of frequency locations N, the codes having same number of frequency locations N and frequency components positioned at same frequency locations, in addition to the codes having the number of frequency locations less than N with a condition that the positions of all the frequency components of such codes will overlap with some positions of frequency components of codes having N frequency locations are grouped to form a mixed frequency code group.

26. The method of claim 23, wherein one or more code sets are formed within each frequency code group, the codes within code sets are orthogonal in nature.

27. The method of claim 26, wherein the list of orthogonal codes includes identifier information and corresponding orthogonal code in a database, wherein the identifier information can be at least one of the following: a number of code sets in the unique frequency code group, a number of codes in a code set, a number of frequency components in each code, a number of overlapped frequency positions, a location of frequency component of each code, and/or a length of each code.

28. The method of claim 23, wherein the orthogonal codes are arranged as a set of codes in following code list:

{(−1,−1,1,1),(−1,1,1,−1)},{(−1,−1,1,1),(1,−1,−1,1)},{(−1,1,1,−1),(1,1,−1,−1)},{(1,−1,−1,1),(1,1,−1,−1)} wherein, a set of values between a pair of round brackets represents the code and the plurality of codes in between a pair of braces represents the set of codes.

29. The method of claim 23, wherein the orthogonal codes are arranged as a set of codes in following code list: {(−1, −1, −1, −1, 1, 1, 1, 1), (−1, −1, 1, 1, 1, 1, −1, −1), (−1, 1, −1, 1, 1, −1, 1, −1), (−1, 1, 1, −1, 1, −1, −1, 1)}, {(−1, −1, −1, −1, 1, 1, 1, 1), (−1, −1, 1, 1, 1, 1, −1, −1), (−1, 1, −1, 1, 1, −1, 1, −1), (1, −1, −1, 1, −1, 1, 1, −1)}, {(−1, −1, −1, −1, 1, 1, 1, 1), (−1, −1, 1, 1, 1, 1, −1, −1), (−1, 1, 1, −1, 1, −1, −1, 1), (1, −1, 1, −1, −1, 1, −1, 1)}, {(−1, −1, −1, −1, 1, 1, 1, 1), (−1, −1, 1, 1, 1, 1, −1, −1), (1, −1, −1, 1, −1, 1, 1, −1), (1, −1, 1, −1, −1, 1, −1, 1)}, {(−1, −1, −1, −1, 1, 1, 1, 1), (−1, 1, −1, 1, 1, −1, 1, −1), (−1, 1, 1, −1, 1, −1, −1, 1), (1, 1, −1, −1, −1, −1, 1, 1)}, {(−1, −1, −1, −1, 1, 1, 1, 1), (−1, 1, −1, 1, 1, −1, 1, −1), (1, −1, −1, 1, −1, 1, 1, −1), (1, 1, −1, −1, −1, −1, 1, 1)}, {(−1, −1, −1, −1, 1, 1, 1, 1), (−1, 1, 1, −1, 1, −1, −1, 1), (1, −1, 1, −1, −1, 1, −1, 1), (1, 1, −1, −1, −1, −1, 1, 1)}, {(−1, −1, −1, −1, 1, 1, 1, 1), (1, −1, −1, 1, −1, 1, 1, −1), (1, −1, 1, −1, −1, 1, −1, 1), (1, 1, −1, −1, −1, −1, 1, 1)}, {(−1, −1, −1, 1, 1, 1, 1, −1), (−1, −1, 1, −1, 1, 1, −1, 1), (−1, 1, −1, −1, 1, −1, 1, 1), (−1, 1, 1, 1, 1, −1, −1, −1)}, {(−1, −1, −1, 1, 1, 1, 1, −1), (−1, −1, 1, −1, 1, 1, −1, 1), (−1, 1, −1, −1, 1, −1, 1, 1), (1, −1, −1, −1, −1, 1, 1, 1)}, {(−1, −1, −1, 1, 1, 1, 1, −1), (−1, −1, 1, −1, 1, 1, −1, 1), (−1, 1, 1, 1, 1, −1, −1, −1), (1, −1, 1, 1, −1, 1, −1, −1)}, {(−1, −1, −1, 1, 1, 1, 1, −1), (−1, −1, 1, −1, 1, 1, −1, 1), (1, −1, −1, −1, −1, 1, 1, 1), (1, −1, 1, 1, −1, 1, −1, −1)}, {(−1, −1, −1, 1, 1, 1, 1, −1), (−1, 1, −1, −1, 1, −1, 1, 1), (−1, 1, 1, 1, 1, −1, −1, −1), (1, 1, −1, 1, −1, −1, 1, −1)}, {(−1, −1, −1, 1, 1, 1, 1, −1), (−1, 1, −1, −1, 1, −1, 1, 1), (1, −1, −1, −1, −1, 1, 1, 1), (1, 1, −1, 1, −1, −1, 1, −1)}, {(−1, −1, −1, 1, 1, 1, 1, −1), (−1, 1, 1, 1, 1, −1, −1, −1), (1, −1, 1, 1, −1, 1, −1, −1), (1, 1, −1, 1, −1, −1, 1, −1)}, {(−1, −1, −1, 1, 1, 1, 1, −1), (1, −1, −1, −1, −1, 1, 1, 1), (1, −1, 1, 1, −1, 1, −1, −1), (1, 1, −1, 1, −1, −1, 1, −1)}, {(−1, −1, 1, −1, 1, 1, −1, 1), (−1, 1, −1, −1, 1, −1, 1, 1), (−1, 1, 1, 1, 1, −1, −1, −1), (1, 1, 1, −1, −1, −1, −1, 1)}, {(−1, −1, 1, −1, 1, 1, −1, 1), (−1, 1, −1, −1, 1, −1, 1, 1), (1, −1, −1, −1, −1, 1, 1, 1), (1, 1, 1, −1, −1, −1, −1, 1)}, {(−1, −1, 1, −1, 1, 1, −1, 1), (−1, 1, 1, 1, 1, −1, −1, −1), (1, −1, 1, 1, −1, 1, −1, −1), (1, 1, 1, −1, −1, −1, −1, 1)}, {(−1, −1, 1, −1, 1, 1, −1, 1), (1, −1, −1, −1, −1, 1, 1, 1), (1, −1, 1, 1, −1, 1, −1, −1), (1, 1, 1, −1, −1, −1, −1, 1)}, {(−1, −1, 1, 1, 1, 1, −1, −1), (−1, 1, −1, 1, 1, −1, 1, −1), (−1, 1, 1, −1, 1, −1, −1, 1), (1, 1, 1, 1, −1, −1, −1, −1)}, {(−1, −1, 1, 1, 1, 1, −1, −1), (−1, 1, −1, 1, 1, −1, 1, −1), (1, −1, −1, 1, −1, 1, 1, −1), (1, 1, 1, 1, −1, −1, −1, −1)}, {(−1, −1, 1, 1, 1, 1, −1, −1), (−1, 1, 1, −1, 1, −1, −1, 1), (1, −1, 1, −1, −1, 1, −1, 1), (1, 1, 1, 1, −1, −1, −1, −1)}, {(−1, −1, 1, 1, 1, 1, −1, −1), (1, −1, −1, 1, −1, 1, 1, −1), (1, −1, 1, −1, −1, 1, −1, 1), (1, 1, 1, 1, −1, −1, −1, −1)}, {(−1, 1, −1, −1, 1, −1, 1, 1), (−1, 1, 1, 1, 1, −1, −1, −1), (1, 1, −1, 1, –1, –1, 1, –1), (1, 1, 1, –1, –1, –1, –1, 1)}, {(–1, 1, –1, –1, 1, –1, 1, 1), (1, –1, –1, –1, –1, 1, 1, 1), (1, 1, –1, 1, –1, –1, 1, –1), (1, 1, 1, –1, –1, –1, –1, 1)}, {(–1, 1, –1, 1, 1, –1, 1, –1), (–1, 1, 1, –1, 1, –1, –1, 1), (1, 1, –1, –1, –1, –1, 1, 1), (1, 1, 1, 1, –1, –1, –1, –1)}, {(–1, 1, –1, 1, 1, –1, 1, –1), (1, –1, –1, 1, –1, 1, 1, –1), (1, 1, –1, –1, –1, –1, 1, 1), (1, 1, 1, 1, –1, –1, –1, –1)}, {(–1, 1, 1, –1, 1, –1, –1, 1), (1, –1, 1, –1, –1, 1, –1, 1), (1, 1, –1, –1, –1, –1, 1, 1), (1, 1, 1, 1, –1, –1, –1, –1)}, {(–1, 1, 1, 1, 1, –1, –1, –1), (1, –1, 1, 1, –1, 1, –1, –1), (1, 1, –1, 1, –1, –1, 1, –1), (1, 1, 1, –1, –1, –1, –1, 1)}, {(1, –1, –1, –1, –1, 1, 1, 1), (1, –1, 1, 1, –1, 1, –1, –1), (1, 1, –1, 1, –1, –1, 1, –1), (1, 1, 1, –1, –1, –1, –1, 1)}, {(1, –1, –1, 1, –1, 1, 1, –1), (1, –1, 1, –1, –1, 1, –1, 1), (1, 1, –1, –1, –1, –1, 1, 1), (1, 1, 1, 1, –1, –1, –1, –1)} wherein, a set of values between a pair of round brackets represents the code and the plurality of codes in between a pair of braces represents the set of codes.

30. The method of claim 23, wherein the orthogonal codes are arranged as a set of codes in the following code list: {(–1, –1, –1, 1, 1, –1, 1, 1), (–1, –1, 1, –1, –1, 1, 1, 1), (–1, 1, –1, –1, 1, 1, 1, –1), (–1, 1, 1, 1, –1, –1, 1, –1), (–1, –1, 1, 1, 1, 1, –1, –1), (–1, 1, 1, –1, 1, –1, –1, 1)}, {(–1, –1, –1, 1, 1, –1, 1, 1), (–1, –1, 1, –1, –1, 1, 1, 1), (–1, 1, –1, –1, 1, 1, 1, –1), (–1, 1, 1, 1, –1, –1, 1, –1), (–1, –1, 1, 1, 1, 1, –1, –1), (1, –1, –1, 1, –1, 1, 1, –1)}, {(–1, –1, –1, 1, 1, –1, 1, 1), (–1, –1, 1, –1, –1, 1, 1, 1), (–1, 1, –1, –1, 1, 1, 1, –1), (–1, 1, 1, 1, –1, –1, 1, –1), (–1, 1, 1, –1, 1, –1, –1, 1), (1, 1, –1, –1, –1, –1, 1, 1)}, {(–1, –1, –1, 1, 1, –1, 1, 1), (–1, –1, 1, –1, –1, 1, 1, 1), (–1, 1, –1, –1, 1, 1, 1, –1), (–1, 1, 1, 1, –1, –1, 1, –1), (1, –1, –1, 1, –1, 1, 1, –1), (1, 1, –1, –1, –1, –1, 1, 1)}, {(–1, –1, –1, 1, 1, –1, 1, 1), (–1, –1, 1, –1, –1, 1, 1, 1), (–1, 1, –1, –1, 1, 1, 1, –1), (1, –1, –1, –1, 1, 1, –1, 1), (–1, –1, 1, 1, 1, 1, –1, –1), (–1, 1, 1, –1, 1, –1, –1, 1)}, {(–1, –1, –1, 1, 1, –1, 1, 1), (–1, –1, 1, –1, –1, 1, 1, 1), (–1, 1, –1, –1, 1, 1, 1, –1), (1, –1, –1, –1, 1, 1, –1, 1), (–1, –1, 1, 1, 1, 1, –1, –1), (1, –1, –1, 1, –1, 1, 1, –1)}, {(–1, –1, –1, 1, 1, –1, 1, 1), (–1, –1, 1, –1, –1, 1, 1, 1), (–1, 1, –1, –1, 1, 1, 1, –1), (1, –1, –1, –1, 1, 1, –1, 1), (–1, 1, 1, –1, 1, –1, –1, 1), (1, 1, –1, –1, –1, –1, 1, 1)}, {(–1, –1, –1, 1, 1, –1, 1, 1), (–1, –1, 1, –1, –1, 1, 1, 1), (–1, 1, –1, –1, 1, 1, 1, –1), (1, –1, –1, –1, 1, 1, –1, 1), (1, –1, –1, 1, –1, 1, 1, –1), (1, 1, –1, –1, –1, –1, 1, 1)}, {(–1, –1, –1, 1, 1, –1, 1, 1), (–1, –1, 1, –1, –1, 1, 1, 1), (–1, 1, 1, 1, –1, –1, 1, –1), (1, –1, 1, 1, –1, –1, –1, 1), (–1, –1, 1, 1, 1, 1, –1, –1), (–1, 1, 1, –1, 1, –1, –1, 1)}, {(–1, –1, –1, 1, 1, –1, 1, 1), (–1, –1, 1, –1, –1, 1, 1, 1), (–1, 1, 1, 1, –1, –1, 1, –1), (1, –1, 1, 1, –1, –1, –1, 1), (–1, –1, 1, 1, 1, 1, –1, –1), (1, –1, –1, 1, –1, 1, 1, –1)}, {(–1, –1, –1, 1, 1, –1, 1, 1), (–1, –1, 1, –1, –1, 1, 1, 1), (–1, 1, 1, 1, –1, –1, 1, –1), (1, –1, 1, 1, –1, –1, –1, 1), (–1, 1, 1, –1, 1, –1, –1, 1), (1, 1, –1, –1, –1, –1, 1, 1)}, {(–1, –1, –1, 1, 1, –1, 1, 1), (–1, –1, 1, –1, –1, 1, 1, 1), (–1, 1, 1, 1, –1, –1, 1, –1), (1, –1, 1, 1, –1, –1, –1, 1), (1, –1, –1, 1, –1, 1, 1, –1), (1, 1, –1, –1, –1, –1, 1, 1)}, {(–1, –1, –1, 1, 1, –1, 1, 1), (–1, –1, 1, –1, –1, 1, 1, 1), (1, –1, –1, –1, 1, 1, –1, 1), (1, –1, 1, 1, –1, –1, –1, 1), (–1, –1, 1, 1, 1, 1, –1, –1), (–1, 1, 1, –1, 1, –1, –1, 1)}, {(–1, –1, –1, 1, 1, –1, 1, 1), (–1, –1, 1, –1, –1, 1, 1, 1), (1, –1, –1, –1, 1, 1, –1, 1), (1, –1, 1, 1, –1, –1, –1, 1), (–1, –1, 1, 1, 1, 1, –1, –1), (1, –1, –1, 1, –1, 1, 1, –1)}, {(–1, –1, –1, 1, 1, –1, 1, 1), (–1, –1, 1, –1, –1, 1, 1, 1), (1, –1, –1, –1, 1, 1, –1, 1), (1, –1, 1, 1, –1, –1, –1, 1), (–1, 1, 1, –1, 1, –1, –1, 1), (1, 1, –1, –1, –1, –1, 1, 1)}, {(–1, –1, –1, 1, 1, –1, 1, 1), (–1, –1, 1, –1, –1, 1, 1, 1), (1, –1, –1, –1, 1, 1, –1, 1), (1, –1, 1, 1, –1, –1, –1, 1), (1, –1, –1, 1, –1, 1, 1, –1), (1, 1, –1, –1, –1, –1, 1, 1)}, {(–1, –1, –1, 1, 1, –1, 1, 1), (–1, –1, 1, 1, –1, 1, 1, –1), (–1, 1, –1, –1, 1, 1, 1, –1), (–1, 1, 1, –1, –1, –1, 1, 1), (–1, –1, 1, –1, 1, 1, –1, 1), (–1, 1, 1, 1, 1, –1, –1, –1)}, {(–1, –1, –1, 1, 1, –1, 1, 1), (–1, 1, 1, –1, 1, 1, –1), (–1, 1, –1, –1, 1, 1, 1, –1), (–1, 1, 1, –1, –1, –1, 1, 1), (–1, –1, 1, –1, 1, 1, –1, 1), (1, –1, –1, –1, –1, 1, 1, 1)}, {(–1, –1, –1, 1, 1, –1, 1, 1), (–1, –1, 1, 1, –1, 1, 1, –1), (–1, 1, –1, –1, 1, 1, 1, –1), (–1, 1, 1, –1, –1, –1, 1, 1), (–1, 1, 1, 1, 1, –1, –1, –1), (1, 1, –1, 1, –1, –1, 1, –1)}, {(–1, –1, –1, 1, 1, –1, 1, 1), (–1, –1, 1, 1, –1, 1, 1, –1), (–1, 1, –1, –1, 1, 1, 1, –1), (–1, 1, 1, –1, –1, –1, 1, 1), (–1, –1, 1, –1, 1, 1, –1, 1), (1, –1, –1, –1, –1, 1, 1, 1)}, {(–1, –1, –1, 1, 1, –1, 1, 1), (–1, –1, 1, 1, –1, 1, 1, –1), (–1, 1, –1, –1, 1, 1, 1, –1), (1, –1, –1, 1, 1, 1, –1, –1), (–1, 1, 1, 1, 1, –1, –1, –1), (1, 1, –1, 1, –1, –1, 1, –1)}, {(–1, –1, –1, 1, 1, –1, 1, 1), (–1, –1, 1, 1, –1, 1, 1, –1), (–1, 1, –1, –1, 1, 1, 1, –1), (1, –1, –1, 1, 1, 1, –1, –1), (1, –1, –1, –1, –1, 1, 1, 1), (1, 1, –1, 1, –1, –1, 1, –1) }, {(–1, –1, –1, 1, 1, –1, 1, 1), (–1, –1, 1, 1, –1, 1, 1, –1), (–1, 1, 1, –1, –1, –1, 1, 1), (1, –1, 1, 1, –1, –1, –1, 1), (–1, –1, 1, –1, 1, 1, –1, 1), (–1, 1, 1, 1, 1, –1, –1, –1)}, {(–1, –1, –1, 1, 1, –1, 1, 1), (–1, –1, 1, 1, –1, 1, 1, –1), (–1, 1, 1, –1, –1, –1, 1, 1), (1, –1, 1, 1, –1, –1, –1, 1), (–1, –1, 1, –1, 1, 1, –1, 1), (1, –1, –1, –1, –1, 1, 1, 1)}, {(–1, –1, –1, 1, 1, –1, 1, 1), (–1, –1, 1, 1, –1, 1, 1, –1), (–1, 1, 1, –1, –1, –1, 1, 1), (1, –1, 1, 1, –1, –1, –1, 1), (–1, 1, 1, 1, 1, –1, –1, –1), (1, 1, –1, 1, –1, –1, 1, –1)}, {(–1, –1, –1, 1, 1, –1, 1, 1), (–1, –1, 1, 1, –1, 1, 1, –1), (–1, 1, 1, –1, –1, –1, 1, 1), (1, –1, 1, 1, –1, –1, –1, 1), (1, –1, –1, –1, –1, 1, 1, 1), (1, 1, –1, 1, –1, –1, 1, –1)}, {(–1, –1, –1, 1, 1, –1, 1, 1), (–1, –1, 1, 1, –1, 1, 1, –1), (1, –1, –1, 1, 1, 1, –1, –1), (1, –1, 1, 1, –1, –1, –1, 1), (–1, –1, 1, –1, 1, 1, –1, 1), (–1, 1, 1, 1, 1, –1, –1, –1)}, {(–1, –1, –1, 1, 1, –1, 1, 1), (–1, –1, 1, 1, –1, 1, 1, –1), (1, –1, –1, 1, 1, 1, –1, –1), (1, –1, 1, 1, –1, –1, –1, 1), (–1, –1, 1, –1, 1, 1, –1, 1), (1, –1, –1, –1, –1, 1, 1, 1)}, {(–1, –1, –1, 1, 1, –1, 1, 1), (–1, –1, 1, 1, –1, 1, 1, –1), (1, –1, –1, 1, 1, 1, –1, –1), (1, –1, 1, 1, –1, –1, –1, 1), (–1, 1, 1, 1, 1, –1, –1, –1), (1, 1, –1, 1, –1, –1, 1, –1)}, {(–1, –1, –1, 1, 1, –1, 1, 1), (–1, –1, 1, 1, –1, 1, 1, –1), (1, –1, –1, 1, 1, 1, –1, –1), (1, –1, 1, 1, –1, –1, –1, 1), (1, –1, –1, –1, –1, 1, 1, 1), (1, 1, –1, 1, –1, –1, 1, –1)}, {(–1, –1, –1, 1, 1, –1, 1, 1), (–1, 1, –1, –1, 1, 1, 1, –1), (–1, 1, 1, –1, –1, –1, 1, 1), (1, 1, –1, –1, 1, –1, –1, 1), (–1, –1, 1, –1, 1, 1, –1, 1), (–1, 1, 1, 1, 1, –1, –1, –1)}, {(–1, –1, –1, 1, 1, –1, 1, 1), (–1, 1, –1, –1, 1, 1, 1, –1), (–1, 1, 1, –1, –1, –1, 1, 1), (1, 1, –1, –1, 1, –1, –1, 1), (–1, –1, 1, –1, 1, 1, –1, 1), (1, –1, –1, –1, –1, 1, 1, 1)}, {(–1, –1, –1, 1, 1, –1, 1, 1), (–1, 1, –1, –1, 1, 1, 1, –1), (–1, 1, 1, –1, –1, –1, 1, 1), (1, 1, –1, –1, 1, –1, –1, 1), (–1, 1, 1, 1, 1, –1, –1, –1), (1, 1, –1, 1, –1, –1, 1, –1)}, {(–1, –1, –1, 1, 1, –1, 1, 1), (–1, 1, –1, –1, 1, 1, 1, –1), (–1, 1, 1, –1, –1, –1, 1, 1), (1, 1, –1, –1, 1, –1, –1, 1), (1, –1, –1, –1, –1, 1, 1, 1), (1, 1, –1, 1, –1, –1, 1, –1)}, {(–1, –1, –1, 1, 1, –1, 1, 1), (–1, 1, –1, –1, 1, 1, 1, –1), (–1, 1, 1, 1, –1, –1, 1, –1), (1, 1, –1, 1, 1, –1, –1, –1), (–1, –1, 1, 1, 1, 1, –1, –1), (–1, 1, 1, –1, 1, –1, –1, 1)}, {(–1, –1, –1, 1, 1, –1, 1, 1), (–1, 1, –1, –1, 1, 1, 1, –1), (–1, 1, 1, 1, –1, –1, 1, –1), (1, 1, –1, 1, 1, –1, –1, –1), (–1, –1, 1, 1, 1, 1, –1, –1), (1, –1, –1, 1, –1, 1, 1, –1)}, {(–1, –1, –1, 1, 1, –1, 1, 1), (–1, 1, –1, –1, 1, 1, 1, –1), (–1, 1, 1, 1, –1, –1, 1, –1), (1, 1, –1, 1, 1, –1, –1, –1), (–1, 1, 1, –1, 1, –1, –1, 1), (1, 1, –1, –1, –1, –1, 1, 1)}, {(–1, –1, –1, 1, 1, –1, 1, 1), (–1, 1, –1, –1, 1, 1, 1, –1), (1, –1, –1, –1, 1, 1, –1, 1), (1, 1, –1, 1, 1, –1, –1, –1), (–1, –1, 1, 1, 1, 1, –1, –1), (–1, 1, 1, –1, 1, –1, –1, 1)}, {(–1, –1, –1, 1, 1, –1, 1, 1), (–1, 1, −1, −1, 1, 1, 1, −1), (1, −1, −1, −1, 1, 1, −1, 1), (1, 1, −1, 1, 1, −1, −1, −1), (−1, −1, 1, 1, 1, 1, −1, −1), (1, −1, −1, 1, −1, 1, 1, −1)}, {(−1, −1, −1, 1, 1, −1, 1, 1), (−1, 1, −1, −1, 1, 1, 1, −1), (1, −1, −1, −1, 1, 1, −1, 1), (1, 1, −1, 1, 1, −1, −1, −1), (−1, 1, 1, −1, 1, −1, −1, 1), (1, 1, −1, −1, −1, −1, 1, 1)}, {(−1, −1, −1, 1, 1, −1, 1, 1), (−1, 1, −1, −1, 1, 1, 1, −1), (1, −1, −1, −1, 1, 1, −1, 1), (1, 1, −1, 1, 1, −1, −1, −1), (1, −1, −1, 1, −1, 1, 1, −1), (1, 1, −1, −1, −1, −1, 1, 1)}, {(−1, −1, −1, 1, 1, −1, 1, 1), (−1, 1, −1, −1, 1, 1, 1, −1), (1, −1, −1, 1, 1, 1, −1, −1), (1, 1, −1, −1, 1, −1, −1, 1), (−1, −1, 1, −1, 1, 1, −1, 1), (−1, 1, 1, 1, 1, −1, −1, −1)}, {(−1, −1, −1, 1, 1, −1, 1, 1), (−1, 1, −1, −1, 1, 1, 1, −1), (1, −1, −1, 1, 1, 1, −1, −1), (1, 1, −1, −1, 1, −1, −1, 1), (−1, −1, 1, −1, 1, 1, −1, 1), (1, −1, −1, −1, −1, 1, 1, 1)}, {(−1, −1, −1, 1, 1, −1, 1, 1), (−1, 1, −1, −1, 1, 1, 1, −1), (1, −1, −1, 1, 1, 1, −1, −1), (1, 1, −1, −1, 1, −1, −1, 1), (−1, 1, 1, 1, 1, −1, −1, −1), (1, 1, −1, 1, −1, −1, 1, −1)}, {(−1, −1, −1, 1, 1, −1, 1, 1), (−1, 1, −1, −1, 1, 1, 1, −1), (1, −1, −1, 1, 1, 1, −1, −1), (1, 1, −1, −1, 1, −1, −1, 1), (1, −1, −1, −1, −1, 1, 1, 1), (1, 1, −1, 1, −1, −1, 1, −1)}, {(−1, −1, −1, 1, 1, −1, 1, 1), (−1, 1, 1, −1, −1, −1, 1, 1), (1, −1, 1, 1, −1, −1, −1, 1), (1, 1, −1, −1, 1, −1, −1, 1), (−1, −1, 1, −1, 1, 1, −1, 1), (−1, 1, 1, 1, 1, −1, −1, −1)}, {(−1, −1, −1, 1, 1, −1, 1, 1), (−1, 1, 1, −1, −1, −1, 1, 1), (1, −1, 1, 1, −1, −1, −1, 1), (1, 1, −1, −1, 1, −1, −1, 1), (−1, −1, 1, −1, 1, 1, −1, 1), (1, −1, −1, −1, −1, 1, 1, 1)}, {(−1, −1, −1, 1, 1, −1, 1, 1), (−1, 1, 1, −1, −1, −1, 1, 1), (1, −1, 1, 1, −1, −1, −1, 1), (1, 1, −1, −1, 1, −1, −1, 1), (−1, 1, 1, 1, 1, −1, −1, −1), (1, 1, −1, 1, −1, −1, 1, −1)}, {(−1, −1, −1, 1, 1, −1, 1, 1), (−1, 1, 1, −1, −1, −1, 1, 1), (1, −1, 1, 1, −1, −1, −1, 1), (1, 1, −1, −1, 1, −1, −1, 1), (1, −1, −1, −1, −1, 1, 1, 1), (1, 1, −1, 1, −1, −1, 1, −1)}, {(−1, −1, −1, 1, 1, −1, 1, 1), (−1, 1, 1, 1, −1, −1, 1, −1), (1, −1, 1, 1, −1, −1, −1, 1), (1, 1, −1, 1, 1, −1, −1, −1), (−1, −1, 1, 1, 1, 1, −1, −1), (−1, 1, 1, −1, 1, −1, −1, 1)}, {(−1, −1, −1, 1, 1, −1, 1, 1), (−1, 1, 1, 1, −1, −1, 1, −1), (1, −1, 1, 1, −1, −1, −1, 1), (1, 1, −1, 1, 1, −1, −1, −1), (−1, −1, 1, 1, 1, 1, −1, −1), (1, −1, −1, 1, −1, 1, 1, −1)}, {(−1, −1, −1, 1, 1, −1, 1, 1), (−1, 1, 1, 1, −1, −1, 1, −1), (1, −1, 1, 1, −1, −1, −1, 1), (1, 1, −1, 1, 1, −1, −1, −1), (−1, 1, 1, −1, 1, −1, −1, 1), (1, 1, −1, −1, −1, −1, 1, 1)}, {(−1, −1, −1, 1, 1, −1, 1, 1), (−1, 1, 1, 1, −1, −1, 1, −1), (1, −1, 1, 1, −1, −1, −1, 1), (1, 1, −1, 1, 1, −1, −1, −1), (1, −1, −1, 1, −1, 1, 1, −1), (1, 1, −1, −1, −1, −1, 1, 1)}, {(−1, −1, −1, 1, 1, −1, 1, 1), (1, −1, −1, −1, 1, 1, −1, 1), (1, −1, 1, 1, −1, −1, −1, 1), (1, 1, −1, 1, 1, −1, −1, −1), (−1, −1, 1, 1, 1, 1, −1, −1), (−1, 1, 1, −1, 1, −1, −1, 1)}, {(−1, −1, −1, 1, 1, −1, 1, 1), (1, −1, −1, −1, 1, 1, −1, 1), (1, −1, 1, 1, −1, −1, −1, 1), (1, 1, −1, 1, 1, −1, −1, −1), (−1, −1, 1, 1, 1, 1, −1, −1), (1, −1, −1, 1, −1, 1, 1, −1)}, {(−1, −1, −1, 1, 1, −1, 1, 1), (1, −1, −1, −1, 1, 1, −1, 1), (1, −1, 1, 1, −1, −1, −1, 1), (1, 1, −1, 1, 1, −1, −1, −1), (−1, 1, 1, −1, 1, −1, −1, 1), (1, 1, −1, −1, −1, −1, 1, 1)}, {(−1, −1, −1, 1, 1, −1, 1, 1), (1, −1, −1, −1, 1, 1, −1, 1), (1, −1, 1, 1, −1, −1, −1, 1), (1, 1, −1, 1, 1, −1, −1, −1), (1, −1, −1, 1, −1, 1, 1, −1), (1, 1, −1, −1, −1, −1, 1, 1)}, {(−1, −1, −1, 1, 1, −1, 1, 1), (1, −1, −1, 1, 1, 1, −1, −1), (1, −1, 1, 1, −1, −1, −1, 1), (1, 1, −1, −1, 1, −1, −1, 1), (−1, −1, 1, −1, 1, 1, −1, 1), (−1, 1, 1, 1, 1, −1, −1, −1)}, {(−1, −1, −1, 1, 1, −1, 1, 1), (1, −1, −1, 1, 1, 1, −1, −1), (1, −1, 1, 1, −1, −1, −1, 1), (1, 1, −1, −1, 1, −1, −1, 1), (−1, −1, 1, −1, 1, 1, −1, 1), (1, −1, −1, −1, −1, 1, 1, 1)}, {(−1, −1, −1, 1, 1, −1, 1, 1), (1, −1, −1, 1, 1, 1, −1, −1), (1, −1, 1, 1, −1, −1, −1, 1), (1, 1, −1, −1, 1, −1, −1, 1), (−1, 1, 1, 1, 1, −1, −1, −1), (1, 1, −1, 1, −1, −1, 1, −1)}, {(−1, −1, −1, 1, 1, −1, 1, 1), (1, −1, −1, 1, 1, 1, −1, −1), (1, −1, 1, 1, −1, −1, −1, 1), (1, 1, −1, −1, 1, −1, −1, 1), (1, −1, −1, −1, −1, 1, 1, 1), (1, 1, −1, 1, −1, −1, 1, −1)}, {(−1, −1, 1, −1, −1, 1, 1, 1), (−1, −1, 1, 1, 1, −1, −1, 1), (−1, 1, 1, −1, 1, 1, −1, −1), (−1, 1, 1, 1, −1, −1, 1, −1), (−1, −1, −1, 1, 1, 1, 1, −1), (−1, 1, −1, −1, 1, −1, 1, 1)}, {(−1, −1, 1, −1, −1, 1, 1, 1), (−1, −1, 1, 1, 1, −1, −1, 1), (−1, 1, 1, −1, 1, 1, −1, −1), (−1, 1, 1, 1, −1, −1, 1, −1), (−1, −1, −1, 1, 1, 1, 1, −1), (1, −1, 1, 1, −1, 1, −1, −1)}, {(−1, −1, 1, −1, −1, 1, 1, 1), (−1, −1, 1, 1, 1, −1, −1, 1), (−1, 1, 1, −1, 1, 1, −1, −1), (−1, 1, 1, 1, −1, −1, 1, −1), (−1, 1, −1, −1, 1, −1, 1, 1), (1, 1, 1, −1, −1, −1, −1, 1)}, {(−1, −1, 1, −1, −1, 1, 1, 1), (−1, −1, 1, 1, 1, −1, −1, 1), (−1, 1, 1, −1, 1, 1, −1, −1), (−1, 1, 1, 1, −1, −1, 1, −1), (1, −1, 1, 1, −1, 1, −1, −1), (1, 1, 1, −1, −1, −1, −1, 1)}, {(−1, −1, 1, −1, −1, 1, 1, 1), (−1, −1, 1, 1, 1, −1, −1, 1), (−1, 1, 1, −1, 1, 1, −1, −1), (1, −1, −1, −1, 1, 1, −1, 1), (−1, −1, −1, 1, 1, 1, 1, −1), (−1, 1, −1, −1, 1, −1, 1, 1)}, {(−1, −1, 1, −1, −1, 1, 1, 1), (−1, −1, 1, 1, 1, −1, −1, 1), (−1, 1, 1, −1, 1, 1, −1, −1), (1, −1, −1, −1, 1, 1, −1, 1), (−1, −1, −1, 1, 1, 1, 1, −1), (1, −1, 1, 1, −1, 1, −1, −1)}, {(−1, −1, 1, −1, −1, 1, 1, 1), (−1, −1, 1, 1, 1, −1, −1, 1), (−1, 1, 1, −1, 1, 1, −1, −1), (1, −1, −1, −1, 1, 1, −1, 1), (−1, 1, −1, −1, 1, −1, 1, 1), (1, 1, 1, −1, −1, −1, −1, 1)}, {(−1, −1, 1, −1, −1, 1, 1, 1), (−1, −1, 1, 1, 1, −1, −1, 1), (−1, 1, 1, −1, 1, 1, −1, −1), (1, −1, −1, −1, 1, 1, −1, 1), (1, −1, 1, 1, −1, 1, −1, −1), (1, 1, 1, −1, −1, −1, −1, 1)}, {(−1, −1, 1, −1, −1, 1, 1, 1), (−1, −1, 1, 1, 1, −1, −1, 1), (−1, 1, 1, 1, −1, −1, 1, −1), (1, −1, −1, 1, −1, −1, 1, 1), (−1, −1, −1, 1, 1, 1, 1, −1), (−1, 1, −1, −1, 1, −1, 1, 1)}, {(−1, −1, 1, −1, −1, 1, 1, 1), (−1, −1, 1, 1, 1, −1, −1, 1), (−1, 1, 1, 1, −1, −1, 1, −1), (1, −1, −1, 1, −1, −1, 1, 1), (−1, −1, −1, 1, 1, 1, 1, −1), (1, −1, 1, 1, −1, 1, −1, −1)}, {(−1, −1, 1, −1, −1, 1, 1, 1), (−1, −1, 1, 1, 1, −1, −1, 1), (−1, 1, 1, 1, −1, −1, 1, −1), (1, −1, −1, 1, −1, −1, 1, 1), (−1, 1, −1, −1, 1, −1, 1, 1), (1, 1, 1, −1, −1, −1, −1, 1)}, {(−1, −1, 1, −1, −1, 1, 1, 1), (−1, −1, 1, 1, 1, −1, −1, 1), (−1, 1, 1, 1, −1, −1, 1, −1), (1, −1, −1, 1, −1, −1, 1, 1), (1, −1, 1, 1, −1, 1, −1, −1), (1, 1, 1, −1, −1, −1, −1, 1)}, {(−1, −1, 1, −1, −1, 1, 1, 1), (−1, −1, 1, 1, 1, −1, −1, 1), (1, −1, −1, −1, 1, 1, −1, 1), (1, −1, −1, 1, −1, −1, 1, 1), (−1, −1, −1, 1, 1, 1, 1, −1), (−1, 1, −1, −1, 1, −1, 1, 1)}, {(−1, −1, 1, −1, −1, 1, 1, 1), (−1, −1, 1, 1, 1, −1, −1, 1), (1, −1, −1, −1, 1, 1, −1, 1), (1, −1, −1, 1, −1, −1, 1, 1), (−1, −1, −1, 1, 1, 1, 1, −1), (1, −1, 1, 1, −1, 1, −1, −1)}, {(−1, −1, 1, −1, −1, 1, 1, 1), (−1, −1, 1, 1, 1, −1, −1, 1), (1, −1, −1, −1, 1, 1, −1, 1), (1, −1, −1, 1, −1, −1, 1, 1), (−1, 1, −1, −1, 1, −1, 1, 1), (1, 1, 1, −1, −1, −1, −1, 1)}, {(−1, −1, 1, −1, −1, 1, 1, 1), (−1, −1, 1, 1, 1, −1, −1, 1), (1, −1, −1, −1, 1, 1, −1, 1), (1, −1, −1, 1, −1, −1, 1, 1), (1, −1, 1, 1, −1, 1, −1, −1), (1, 1, 1, −1, −1, −1, −1, 1)}, {(−1, −1, 1, −1, −1, 1, 1, 1), (−1, 1, −1, −1, 1, 1, 1, −1), (−1, 1, 1, 1, −1, −1, 1, −1), (1, 1, 1, −1, −1, 1, −1, −1), (−1, −1, 1, 1, 1, 1, −1, −1), (−1, 1, 1, −1, 1, −1, −1, 1)}, {(−1, −1, 1, −1, −1, 1, 1, 1), (−1, 1, −1, −1, 1, 1, 1, −1), (−1, 1, 1, 1, −1, −1, 1, −1), (1, 1, 1, −1, −1, 1, −1, −1), (−1, −1, 1, 1, 1, 1, −1, −1), (1, −1, −1, 1, −1, 1, 1, −1)}, {(−1, −1, 1, −1, −1, 1, 1, 1), (−1, 1, −1, −1, 1, 1, 1, −1), (−1, 1, 1, 1, −1, −1, 1, −1), (1, 1, 1, −1, −1, 1, −1, −1), (−1, 1, 1, −1, 1, −1, −1, 1), (1, 1, −1, −1, −1, −1, 1, 1)}, {(−1, −1, 1, −1, −1, 1, 1, 1), (−1, 1, −1, −1, 1, 1, 1, −1), (−1, 1, 1, 1, −1, −1, 1, −1), (1, 1, 1, −1, −1, 1, −1, −1), (1, −1, −1, 1, −1, 1, 1, −1), (1, 1, −1, −1, −1, −1, 1, 1)}, {(−1, −1, 1, −1, −1, 1, 1, 1), (−1, 1, −1, −1, 1, 1, 1, −1), (1, −1, −1, −1, 1, 1, −1, 1), (1, 1, 1, −1, −1, 1, −1, −1), (−1, −1, 1, 1, 1, 1, −1, −1), (−1, 1, 1, −1, 1, −1, −1, 1)}, {(−1, −1, 1, −1, −1, 1, 1, 1), (−1, 1, −1, −1, 1, 1, 1, −1), (1, −1, −1, −1, 1, 1, −1, 1), (1, 1, 1, −1, −1, 1, −1, −1), (−1, −1, 1, 1, 1, 1, −1, −1), (1, −1, −1, 1, −1, 1, 1, −1)}, {(−1, −1, 1, −1, −1, 1, 1, 1), (−1, 1, −1, −1, 1, 1, 1, −1), (1, −1, −1, −1, 1, 1, −1, 1), (1, 1, 1, −1, −1, 1, −1, −1), (−1, 1, 1, −1, 1, −1, −1, 1), (1, 1, −1, −1, −1, −1, 1, 1)}, {(−1, −1, 1, −1, −1, 1, 1, 1), (−1, 1, −1, −1, 1, 1, 1, −1), (1, −1, −1, −1, 1, 1, −1, 1), (1, 1, 1, −1, −1, 1, −1, −1), (1, −1, −1, 1, −1, 1, 1, −1), (1, 1, −1, −1, −1, −1, 1, 1)}, {(−1, −1, 1, −1, −1, 1, 1, 1), (−1, 1, 1, −1, 1, 1, −1, −1), (−1, 1, 1, 1, −1, −1, 1, −1), (1, 1, −1, −1, −1, 1, 1, −1), (−1, −1, −1, 1, 1, 1, 1, −1), (−1, 1, −1, −1, 1, −1, 1, 1)}, {(−1, −1, 1, −1, −1, 1, 1, 1), (−1, 1, 1, −1, 1, 1, −1, −1), (−1, 1, 1, 1, −1, −1, 1, −1), (1, 1, −1, −1, −1, 1, 1, −1), (−1, −1, −1, 1, 1, 1, 1, −1), (1, −1, 1, 1, −1, 1, −1, −1)}, {(−1, −1, 1, −1, −1, 1, 1, 1), (−1, 1, 1, −1, 1, 1, −1, −1), (−1, 1, 1, 1, −1, −1, 1, −1), (1, 1, −1, −1, −1, 1, 1, −1), (−1, 1, −1, −1, 1, −1, 1, 1), (1, 1, 1, −1, −1, −1, −1, 1)}, {(−1, −1, 1, −1, −1, 1, 1, 1), (−1, 1, 1, −1, 1, 1, −1, −1), (−1, 1, 1, 1, −1, −1, 1, −1), (1, 1, −1, −1, −1, 1, 1, −1), (1, −1, 1, 1, −1, 1, −1, −1), (1, 1, 1, −1, −1, −1, −1, 1)}, {(−1, −1, 1, −1, −1, 1, 1, 1), (−1, 1, 1, −1, 1, 1, −1, −1), (1, −1, −1, −1, 1, 1, −1, 1), (1, 1, −1, −1, −1, 1, 1, −1), (−1, −1, −1, 1, 1, 1, 1, −1), (−1, 1, −1, −1, 1, −1, 1, 1)}, {(−1, −1, 1, −1, −1, 1, 1, 1), (−1, 1, 1, −1, 1, 1, −1, −1), (1, −1, −1, −1, 1, 1, −1, 1), (1, 1, −1, −1, −1, 1, 1, −1), (−1, −1, −1, 1, 1, 1, 1, −1), (1, −1, 1, 1, −1, 1, −1, −1)}, {(−1, −1, 1, −1, −1, 1, 1, 1), (−1, 1, 1, −1, 1, 1, −1, −1), (1, −1, −1, −1, 1, 1, −1, 1), (1, 1, −1, −1, −1, 1, 1, −1), (−1, 1, −1, −1, 1, −1, 1, 1), (1, 1, 1, −1, −1, −1, −1, 1)}, {(−1, −1, 1, −1, −1, 1, 1, 1), (−1, 1, 1, −1, 1, 1, −1, −1), (1, −1, −1, −1, 1, 1, −1, 1), (1, 1, −1, −1, −1, 1, 1, −1), (1, −1, 1, 1, −1, 1, −1, −1), (1, 1, 1, −1, −1, −1, −1, 1)}, {(−1, −1, 1, −1, −1, 1, 1, 1), (−1, 1, 1, 1, −1, −1, 1, −1), (1, −1, −1, 1, −1, −1, 1, 1), (1, 1, −1, −1, −1, 1, 1, −1), (−1, −1, −1, 1, 1, 1, 1, −1), (−1, 1, −1, −1, 1, −1, 1, 1)}, {(−1, −1, 1, −1, −1, 1, 1, 1), (−1, 1, 1, 1, −1, −1, 1, −1), (1, −1, −1, 1, −1, −1, 1, 1), (1, 1, −1, −1, −1, 1, 1, −1), (−1, −1, −1, 1, 1, 1, 1, −1), (1, −1, 1, 1, −1, 1, −1, −1)}, {(−1, −1, 1, −1, −1, 1, 1, 1), (−1, 1, 1, 1, −1, −1, 1, −1), (1, −1, −1, 1, −1, −1, 1, 1), (1, 1, −1, −1, −1, 1, 1, −1), (−1, 1, −1, −1, 1, −1, 1, 1), (1, 1, 1, −1, −1, −1, −1, 1)}, {(−1, −1, 1, −1, −1, 1, 1, 1), (−1, 1, 1, 1, −1, −1, 1, −1), (1, −1, −1, 1, −1, −1, 1, 1), (1, 1, −1, −1, −1, 1, 1, −1), (1, −1, 1, 1, −1, 1, −1, −1), (1, 1, 1, −1, −1, −1, −1, 1)}, {(−1, −1, 1, −1, −1, 1, 1, 1), (−1, 1, 1, 1, −1, −1, 1, −1), (1, −1, 1, 1, −1, −1, −1, 1), (1, 1, 1, −1, −1, 1, −1, −1), (−1, −1, 1, 1, 1, 1, −1, −1), (−1, 1, 1, −1, 1, −1, −1, 1)}, {(−1, −1, 1, −1, −1, 1, 1, 1), (−1, 1, 1, 1, −1, −1, 1, −1), (1, −1, 1, 1, −1, −1, −1, 1), (1, 1, 1, −1, −1, 1, −1, −1), (−1, −1, 1, 1, 1, 1, −1, −1), (1, −1, −1, 1, −1, 1, 1, −1)}, {(−1, −1, 1, −1, −1, 1, 1, 1), (−1, 1, 1, 1, −1, −1, 1, −1), (1, −1, 1, 1, −1, −1, −1, 1), (1, 1, 1, −1, −1, 1, −1, −1), (−1, 1, 1, −1, 1, −1, −1, 1), (1, 1, −1, −1, −1, −1, 1, 1)}, {(−1, −1, 1, −1, −1, 1, 1, 1), (−1, 1, 1, 1, −1, −1, 1, −1), (1, −1, 1, 1, −1, −1, −1, 1), (1, 1, 1, −1, −1, 1, −1, −1), (1, −1, −1, 1, −1, 1, 1, −1), (1, 1, −1, −1, −1, −1, 1, 1)}, {(−1, −1, 1, −1, −1, 1, 1, 1), (1, −1, −1, −1, 1, 1, −1, 1), (1, −1, −1, 1, −1, −1, 1, 1), (1, 1, −1, −1, −1, 1, 1, −1), (−1, −1, −1, 1, 1, 1, 1, −1), (−1, 1, −1, −1, 1, −1, 1, 1)}, {(−1, −1, 1, −1, −1, 1, 1, 1), (1, −1, −1, −1, 1, 1, −1, 1), (1, −1, −1, 1, −1, −1, 1, 1), (1, 1, −1, −1, −1, 1, 1, −1), (−1, −1, −1, 1, 1, 1, 1, −1), (1, −1, 1, 1, −1, 1, −1, −1)}, {(−1, −1, 1, −1, −1, 1, 1, 1), (1, −1, −1, −1, 1, 1, −1, 1), (1, −1, −1, 1, −1, −1, 1, 1), (1, 1, −1, −1, −1, 1, 1, −1), (−1, 1, −1, −1, 1, −1, 1, 1), (1, 1, 1, −1, −1, −1, −1, 1)}, {(−1, −1, 1, −1, −1, 1, 1, 1), (1, −1, −1, −1, 1, 1, −1, 1), (1, −1, −1, 1, −1, −1, 1, 1), (1, 1, −1, −1, −1, 1, 1, −1), (1, −1, 1, 1, −1, 1, −1, −1), (1, 1, 1, −1, −1, −1, −1, 1)}, {(−1, −1, 1, −1, −1, 1, 1, 1), (1, −1, −1, −1, 1, 1, −1, 1), (1, −1, 1, 1, −1, −1, −1, 1), (1, 1, 1, −1, −1, 1, −1, −1), (−1, −1, 1, 1, 1, 1, −1, −1), (−1, 1, 1, −1, 1, −1, −1, 1)}, {(−1, −1, 1, −1, −1, 1, 1, 1), (1, −1, −1, −1, 1, 1, −1, 1), (1, −1, 1, 1, −1, −1, −1, 1), (1, 1, 1, −1, −1, 1, −1, −1), (−1, −1, 1, 1, 1, 1, −1, −1), (1, −1, −1, 1, −1, 1, 1, −1)}, {(−1, −1, 1, −1, −1, 1, 1, 1), (1, −1, −1, −1, 1, 1, −1, 1), (1, −1, 1, 1, −1, −1, −1, 1), (1, 1, 1, −1, −1, 1, −1, −1), (−1, 1, 1, −1, 1, −1, −1, 1), (1, 1, −1, −1, −1, −1, 1, 1)}, {(−1, −1, 1, −1, −1, 1, 1, 1), (1, −1, −1, −1, 1, 1, −1, 1), (1, −1, 1, 1, −1, −1, −1, 1), (1, 1, 1, −1, −1, 1, −1, −1), (1, −1, −1, 1, −1, 1, 1, −1), (1, 1, −1, −1, −1, −1, 1, 1)}, {(−1, −1, 1, 1, −1, 1, 1, −1), (−1, −1, 1, 1, 1, −1, −1, 1), (−1, 1, 1, −1, −1, −1, 1, 1), (−1, 1, 1, −1, 1, 1, −1, −1), (−1, −1, −1, −1, 1, 1, 1, 1), (−1, 1, −1, 1, 1, −1, 1, −1)}, {(−1, −1, 1, 1, −1, 1, 1, −1), (−1, −1, 1, 1, 1, −1, −1, 1), (−1, 1, 1, −1, −1, −1, 1, 1), (−1, 1, 1, −1, 1, 1, −1, −1), (−1, −1, −1, −1, 1, 1, 1, 1), (1, −1, 1, −1, −1, 1, −1, 1)}, {(−1, −1, 1, 1, −1, 1, 1, −1), (−1, −1, 1, 1, 1, −1, −1, 1), (−1, 1, 1, −1, −1, −1, 1, 1), (−1, 1, 1, −1, 1, 1, −1, −1), (−1, 1, −1, 1, 1, −1, 1, −1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, −1, −1, 1, 1), (−1, 1, 1, −1, 1, 1, −1, −1), (1, −1, 1, −1, −1, 1, −1, 1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, −1, −1, 1, 1), (1, −1, −1, 1, −1, −1, 1, 1), (−1, −1, −1, −1, 1, 1, 1, 1), (−1, 1, −1, 1, 1, −1, 1, −1)}, {(−1, −1, 1, 1, −1, 1, 1, −1), (−1, −1, 1, 1, 1, −1, −1, 1), (−1, 1, 1, −1, −1, −1, 1, 1), (1, −1, −1, 1, −1, −1, 1, 1), (−1, −1, −1, −1, 1, 1, 1, 1), (1, −1, 1, −1, −1, 1, −1, 1)}, {(−1, −1, 1, 1, −1, 1, 1, −1), (−1, −1, 1, 1, 1, −1, −1, 1), (−1, 1, 1, −1, −1, −1, 1, 1), (1, −1, −1, 1, −1, −1, 1, 1), (−1, 1, −1, 1, 1, −1, 1, −1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, −1, −1, 1, 1), (1, −1, −1, 1, −1, −1, 1, 1), (1, −1, 1, −1, −1, 1, −1, 1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, 1, 1, −1, −1), (1, −1, −1, 1, 1, 1, −1, −1), (−1, −1, −1, −1, 1, 1, 1, 1), (−1, 1, −1, 1, 1, −1, 1, −1)}, {(−1, −1, 1, 1, −1, 1, 1, −1), (−1, −1, 1, 1, 1, −1, −1, 1), (−1, 1, 1, −1, 1, 1, −1, −1), (1, −1, −1, 1, 1, 1, −1, −1), (−1, −1, −1, −1, 1, 1, 1, 1), (1, −1, 1, −1, −1, 1, −1, 1)}, {(−1, −1, 1, 1, −1, 1, 1, −1), (−1, −1, 1, 1, 1, −1, −1, 1), (−1, 1, 1, −1, 1, 1, −1, −1), (1, −1, −1, 1, 1, 1, −1, −1), (−1, 1, −1, 1, 1, −1, 1, −1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, 1, 1, −1, −1), (1, −1, −1, 1, 1, 1, −1, −1), (1, −1, 1, −1, −1, 1, −1, 1), (1, 1, 1, 1, −1, −1, −1, −1)}, {(−1, −1, 1, 1, −1, 1, 1, −1), (−1, −1, 1, 1, 1, −1, −1, 1), (1, −1, −1, 1, −1, −1, 1, 1), (1, −1, −1, 1, 1, 1, −1, −1), (−1, −1, −1, −1, 1, 1, 1, 1), (−1, 1, −1, 1, 1, −1, 1, −1)}, {(−1, −1, 1, 1, −1, 1, 1, −1), (−1, −1, 1, 1, 1, −1, −1, 1), (1, −1, −1, 1, −1, −1, 1, 1), (1, −1, −1, 1, 1, 1, −1, −1), (−1, −1, −1, −1, 1, 1, 1, 1), (1, −1, 1, −1, −1, 1, −1, 1)}, {(−1, −1, 1, 1, −1, 1, 1, −1), (−1, −1, 1, 1, 1, −1, −1, 1), (1, −1, −1, 1, −1, −1, 1, 1), (1, −1, −1, 1, 1, 1, −1, −1), (−1, 1, −1, 1, 1, −1, 1, −1), (1, 1, 1, 1, −1, −1, −1, −1)}, {(−1, −1, 1, 1, −1, 1, 1, −1), (−1, −1, 1, 1, 1, −1, −1, 1), (1, −1, −1, 1, −1, −1, 1, 1), (1, −1, −1, 1, 1, 1, −1, −1), (1, −1, 1, −1, −1, 1, −1, 1), (1, 1, 1, 1, −1, −1, −1, −1)}, {(−1, −1, 1, 1, −1, 1, 1, −1), (−1, 1, −1, −1, 1, 1, 1, −1), (−1, 1, 1, −1, −1, −1, 1, 1), (1, 1, 1, −1, −1, 1, −1, −1), (−1, −1, 1, −1, 1, 1, −1, 1), (−1, 1, 1, 1, 1, −1, −1, −1)}, {(−1, −1, 1, 1, −1, 1, 1, −1), (−1, 1, −1, −1, 1, 1, 1, −1), (−1, 1, 1, −1, −1, −1, 1, 1), (1, 1, 1, −1, −1, 1, −1, −1), (−1, −1, 1, −1, 1, 1, −1, 1), (1, −1, −1, −1, −1, 1, 1, 1)}, {(−1, −1, 1, 1, −1, 1, 1, −1), (−1, 1, −1, −1, 1, 1, 1, −1), (−1, 1, 1, −1, −1, −1, 1, 1), (1, 1, 1, −1, −1, 1, −1, −1), (−1, 1, 1, 1, 1, −1, −1, −1), (1, 1, −1, 1, −1, −1, 1, −1)}, {(−1, −1, 1, 1, −1, 1, 1, −1), (−1, 1, −1, −1, 1, 1, 1, −1), (−1, 1, 1, −1, −1, −1, 1, 1), (1, 1, 1, −1, −1, 1, −1, −1), (1, −1, −1, −1, −1, 1, 1, 1), (1, 1, −1, 1, −1, −1, 1, −1)}, {(−1, −1, 1, 1, −1, 1, 1, −1), (−1, 1, −1, −1, 1, 1, 1, −1), (1, −1, −1, 1, 1, 1, −1, −1), (1, 1, 1, −1, −1, 1, −1, −1), (−1, −1, 1, −1, 1, 1, −1, 1), (−1, 1, 1, 1, 1, −1, −1, −1)}, {(−1, −1, 1, 1, −1, 1, 1, −1), (−1, 1, −1, −1, 1, 1, 1, −1), (1, −1, −1, 1, 1, 1, −1, −1), (1, 1, 1, −1, −1, 1, −1, −1), (−1, −1, 1, −1, 1, 1, −1, 1), (1, −1, −1, −1, −1, 1, 1, 1)}, {(−1, −1, 1, 1, −1, 1, 1, −1), (−1, 1, −1, −1, 1, 1, 1, −1), (1, −1, −1, 1, 1, 1, −1, −1), (1, 1, 1, −1, −1, 1, −1, −1), (−1, 1, 1, 1, 1, −1, −1, −1), (1, 1, −1, 1, −1, −1, 1, −1)}, {(−1, −1, 1, 1, −1, 1, 1, −1), (−1, 1, −1, −1, 1, 1, 1, −1), (1, −1, −1, 1, 1, 1, −1, −1), (1, 1, 1, −1, −1, 1, −1, −1), (1, −1, −1, −1, −1, 1, 1, 1), (1, 1, −1, 1, −1, −1, 1, −1)}, {(−1, −1, 1, 1, −1, 1, 1, −1), (−1, 1, 1, −1, −1, −1, 1, 1), (−1, 1, 1, −1, 1, 1, −1, −1), (1, 1, −1, −1, −1, 1, 1, −1), (−1, −1, −1, −1, 1, 1, 1, 1), (−1, 1, −1, 1, 1, −1, 1, −1)}, {(−1, −1, 1, 1, −1, 1, 1, −1), (−1, 1, 1, −1, −1, −1, 1, 1), (−1, 1, 1, −1, 1, 1, −1, −1), (1, 1, −1, −1, −1, 1, 1, −1), (−1, −1, −1, −1, 1, 1, 1, 1), (1, −1, 1, −1, −1, 1, −1, 1)}, {(−1, −1, 1, 1, −1, 1, 1, −1), (−1, 1, 1, −1, −1, −1, 1, 1), (−1, 1, 1, −1, 1, 1, −1, −1), (1, 1, −1, −1, −1, 1, 1, −1), (−1, 1, −1, 1, 1, −1, 1, −1), (1, 1, 1, 1, −1, −1, −1, −1)}, {(−1, −1, 1, 1, −1, 1, 1, −1), (−1, 1, 1, −1, −1, −1, 1, 1), (−1, 1, 1, −1, 1, 1, −1, −1), (1, 1, −1, −1, −1, 1, 1, −1), (1, −1, 1, −1, −1, 1, −1, 1), (1, 1, 1, 1, −1, −1, −1, −1)}, {(−1, −1, 1, 1, −1, 1, 1, −1), (−1, 1, 1, −1, −1, −1, 1, 1), (1, −1, −1, 1, −1, −1, 1, 1), (1, 1, −1, −1, −1, 1, 1, −1), (−1, −1, −1, −1, 1, 1, 1, 1), (−1, 1, −1, 1, 1, −1, 1, −1)}, {(−1, −1, 1, 1, −1, 1, 1, −1), (−1, 1, 1, −1, −1, −1, 1, 1), (1, −1, −1, 1, −1, −1, 1, 1), (1, 1, −1, −1, −1, 1, 1, −1), (−1, −1, −1, −1, 1, 1, 1, 1), (1, −1, 1, −1, −1, 1, −1, 1)}, {(−1, −1, 1, 1, −1, 1, 1, −1), (−1, 1, 1, −1, −1, −1, 1, 1), (1, −1, −1, 1, −1, −1, 1, 1), (1, 1, −1, −1, −1, 1, 1, −1), (−1, 1, −1, 1, 1, −1, 1, −1), (1, 1, 1, 1, −1, −1, −1, −1)}, {(−1, −1, 1, 1, −1, 1, 1, −1), (−1, 1, 1, −1, −1, −1, 1, 1), (1, −1, −1, 1, −1, −1, 1, 1), (1, 1, −1, −1, −1, 1, 1, −1), (1, −1, 1, −1, −1, 1, −1, 1), (1, 1, 1, 1, −1, −1, −1, −1)}, {(−1, −1, 1, 1, −1, 1, 1, −1), (−1, 1, 1, −1, −1, −1, 1, 1), (1, −1, 1, 1, −1, −1, −1, 1), (1, 1, 1, −1, −1, 1, −1, −1), (−1, −1, 1, −1, 1, 1, −1, 1), (−1, 1, 1, 1, 1, −1, −1, −1)}, {(−1, −1, 1, 1, −1, 1, 1, −1), (−1, 1, 1, −1, −1, −1, 1, 1), (1, −1, 1, 1, −1, −1, −1, 1), (1, 1, 1, −1, −1, 1, −1, −1), (−1, −1, 1, −1, 1, 1, −1, 1), (1, −1, −1, −1, −1, 1, 1, 1)}, {(−1, −1, 1, 1, −1, 1, 1, −1), (−1, 1, 1, −1, −1, −1, 1, 1), (1, −1, 1, 1, −1, −1, −1, 1), (1, 1, 1, −1, −1, 1, −1, −1), (−1, 1, 1, 1, 1, −1, −1, −1), (1, 1, −1, 1, −1, −1, 1, −1)}, {(−1, −1, 1, 1, −1, 1, 1, −1), (−1, 1, 1, −1, −1, −1, 1, 1), (1, −1, 1, 1, −1, −1, −1, 1), (1, 1, 1, −1, −1, 1, −1, −1), (1, −1, −1, −1, −1, 1, 1, 1), (1, 1, −1, 1, −1, −1, 1, −1)}, {(−1, −1, 1, 1, −1, 1, 1, −1), (−1, 1, 1, −1, 1, 1, −1, −1), (1, −1, −1, 1, 1, 1, −1, −1), (1, 1, −1, −1, −1, 1, 1, −1), (−1, −1, −1, −1, 1, 1, 1, 1), (−1, 1, −1, 1, 1, −1, 1, −1)}, {(−1, −1, 1, 1, −1, 1, 1, −1), (−1, 1, 1, −1, 1, 1, −1, −1), (1, −1, −1, 1, 1, 1, −1, −1), (1, 1, −1, −1, −1, 1, 1, −1), (−1, −1, −1, −1, 1, 1, 1, 1), (1, −1, 1, −1, −1, 1, −1, 1)}, {(−1, −1, 1, 1, −1, 1, 1, −1), (−1, 1, 1, −1, 1, 1, −1, −1), (1, −1, −1, 1, 1, 1, −1, −1), (1, 1, −1, −1, −1, 1, 1, −1), (−1, 1, −1, 1, 1, −1, 1, −1), (1, 1, 1, 1, −1, −1, −1, −1)}, {(−1, −1, 1, 1, −1, 1, 1, −1), (−1, 1, 1, −1, 1, 1, −1, −1), (1, −1, −1, 1, 1, 1, −1, −1), (1, 1, −1, −1, −1, 1, 1, −1), (1, −1, 1, −1, −1, 1, −1, 1), (1, 1, 1, 1, −1, −1, −1, −1)}, {(−1, −1, 1, 1, −1, 1, 1, −1), (1, −1, −1, 1, −1, −1, 1, 1), (1, −1, −1, 1, 1, 1, −1, −1), (1, 1, −1, −1, −1, 1, 1, −1), (−1, −1, −1, −1, 1, 1, 1, 1), (−1, 1, −1, 1, 1, −1, 1, −1)}, {(−1, −1, 1, 1, −1, 1, 1, −1), (1, −1, −1, 1, −1, −1, 1, 1), (1, −1, −1, 1, 1, 1, −1, −1), (1, 1, −1, −1, −1, 1, 1, −1), (−1, −1, −1, −1, 1, 1, 1, 1), (1, −1, 1, −1, −1, 1, −1, 1)}, {(−1, −1, 1, 1, −1, 1, 1, −1), (1, −1, −1, 1, −1, −1, 1, 1), (1, −1, −1, 1, 1, 1, −1, −1), (1, 1, −1, −1, −1, 1, 1, −1), (−1, 1, −1, 1, 1, −1, 1, −1), (1, 1, 1, 1, −1, −1, −1, −1)}, {(−1, −1, 1, 1, −1, 1, 1, −1), (1, −1, −1, 1, −1, −1, 1, 1), (1, −1, −1, 1, 1, 1, −1, −1), (1, 1, −1, −1, −1, 1, 1, −1), (1, −1, 1, −1, −1, 1, −1, 1), (1, 1, 1, 1, −1, −1, −1, −1)}, {(−1, −1, 1, 1, −1, 1, 1, −1), (1, −1, −1, 1, 1, 1, −1, −1), (1, −1, 1, 1, −1, −1, −1, 1), (1, 1, 1, −1, −1, 1, −1, −1), (−1, −1, 1, −1, 1, 1, −1, 1), (−1, 1, 1, 1, 1, −1, −1, −1)}, {(−1, −1, 1, 1, −1, 1, 1, −1), (1, −1, −1, 1, 1, 1, −1, −1), (1, −1, 1, 1, −1, −1, −1, 1), (1, 1, 1, −1, −1, 1, −1, −1), (−1, −1, 1, −1, 1, 1, −1, 1), (1, −1, −1, −1, −1, 1, 1, 1)}, {(−1, −1, 1, 1, −1, 1, 1, −1), (1, −1, −1, 1, 1, 1, −1, −1), (1, −1, 1, 1, −1, −1, −1, 1), (1, 1, 1, −1, −1, 1, −1, −1), (−1, 1, 1, 1, 1, −1, −1, −1), (1, 1, −1, 1, −1, −1, 1, −1)}, {(−1, −1, 1, 1, −1, 1, 1, −1), (1, −1, −1, 1, 1, 1, −1, −1), (1, −1, 1, 1, −1, −1, −1, 1), (1, 1, 1, −1, −1, 1, −1, −1), (1, −1, −1, −1, −1, 1, 1, 1), (1, 1, −1, 1, −1, −1, 1, −1)}, {(−1, −1, 1, 1, 1, −1, −1, 1), (−1, 1, 1, −1, −1, −1, 1, 1), (−1, 1, 1, −1, 1, 1, −1, −1), (1, 1, −1, −1, 1, −1, −1, 1), (−1, −1, −1, −1, 1, 1, 1, 1), (−1, 1, −1, 1, 1, −1, 1, −1)}, {(−1, −1, 1, 1, 1, −1, −1, 1), (−1, 1, 1, −1, −1, −1, 1, 1), (−1, 1, 1, −1, 1, 1, −1, −1), (1, 1, −1, −1, 1, −1, −1, 1), (−1, −1, −1, −1, 1, 1, 1, 1), (1, −1, 1, −1, −1, 1, −1, 1)}, {(−1, −1, 1, 1, 1, −1, −1, 1), (−1, 1, 1, −1, −1, −1, 1, 1), (−1, 1, 1, −1, 1, 1, −1, −1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1, −1, 1), (−1, 1, 1, −1, −1, −1, 1, 1), (−1, 1, 1, −1, 1, 1, −1, −1), (1, 1, −1, −1, 1, −1, −1, 1), (1, −1, 1, −1, −1, 1, −1, 1), (1, 1, 1, 1, −1, −1, −1, −1)}, {(−1, −1, 1, 1, 1, −1, −1, 1), (−1, 1, 1, −1, −1, −1, 1, 1), (1, −1, −1, 1, −1, −1, 1, 1), (1, 1, −1, −1, 1, −1, −1, 1), (−1, −1, −1, −1, 1, 1, 1, 1), (−1, 1, −1, 1, 1, −1, 1, −1)}, {(−1, −1, 1, 1, 1, −1, −1, 1), (−1, 1, 1, −1, −1, −1, 1, 1), (1, −1, −1, 1, −1, −1, 1, 1), (1, 1, −1, −1, 1, −1, −1, 1), (−1, −1, −1, −1, 1, 1, 1, 1), (1, −1, 1, −1, −1, 1, −1, 1)}, {(−1, −1, 1, 1, 1, −1, −1, 1), (−1, 1, 1, −1, −1, −1, 1, 1), (1, −1, −1, 1, −1, −1, 1, 1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1, −1, 1), (−1, 1, 1, −1, −1, −1, 1, 1), (1, −1, −1, 1, −1, −1, 1, 1), (1, 1, −1, −1, 1, −1, −1, 1), (1, −1, 1, −1, −1, 1, −1, 1), (1, 1, 1, 1, −1, −1, −1, −1)}, {(−1, −1, 1, 1, 1, −1, −1, 1), (−1, 1, 1, −1, 1, 1, −1, −1), (−1, 1, 1, 1, −1, −1, 1, −1), (1, 1, −1, 1, 1, −1, −1, −1), (−1, −1, −1, 1, 1, 1, 1, −1), (−1, 1, −1, −1, 1, −1, 1, 1)}, {(−1, −1, 1, 1, 1, −1, −1, 1), (−1, 1, 1, −1, 1, 1, −1, −1), (−1, 1, 1, 1, −1, −1, 1, −1), (1, 1, −1, 1, 1, −1, −1, −1), (−1, −1, −1, 1, 1, 1, 1, −1), (1, −1, 1, 1, −1, 1, −1, −1)}, {(−1, −1, 1, 1, 1, −1, −1, 1), (−1, 1, 1, −1, 1, 1, −1, −1), (−1, 1, 1, 1, −1, −1, 1, −1), (1, 1, −1, 1, 1, −1, −1, −1), (−1, 1, −1, −1, 1, −1, 1, 1), (1, 1, 1, −1, −1, −1, −1, 1)}, {(−1, −1, 1, 1, 1, −1, −1, 1), (−1, 1, 1, −1, 1, 1, −1, −1), (−1, 1, 1, 1, −1, −1, 1, −1), (1, 1, −1, 1, 1, −1, −1, −1), (1, −1, 1, 1, −1, 1, −1, −1), (1, 1, 1, −1, −1, −1, −1, 1)}, {(−1, −1, 1, 1, 1, −1, −1, 1), (−1, 1, 1, −1, 1, 1, −1, −1), (1, −1, −1, −1, 1, 1, −1, 1), (1, 1, −1, 1, 1, −1, −1, −1), (−1, −1, −1, 1, 1, 1, 1, −1), (−1, 1, −1, −1, 1, −1, 1, 1)}, {(−1, −1, 1, 1, 1, −1, −1, 1), (−1, 1, 1, −1, 1, 1, −1, −1), (1, −1, −1, −1, 1, 1, −1, 1), (1, 1, −1, 1, 1, −1, −1, −1), (−1, −1, −1, 1, 1, 1, 1, −1), (1, −1, 1, 1, −1, 1, −1, −1)}, {(−1, −1, 1, 1, 1, −1, −1, 1), (−1, 1, 1, −1, 1, 1, −1, −1), (1, −1, −1, −1, 1, 1, −1, 1), (1, 1, −1, 1, 1, −1, −1, −1), (−1, 1, −1, −1, 1, −1, 1, 1), (1, 1, 1, −1, −1, −1, −1, 1)}, {(−1, −1, 1, 1, 1, −1, −1, 1), (−1, 1, 1, −1, 1, 1, −1, −1), (1, −1, −1, −1, 1, 1, −1, 1), (1, 1, −1, 1, 1, −1, −1, −1), (1, −1, 1, 1, −1, 1, −1, −1), (1, 1, 1, −1, −1, −1, −1, 1)}, {(−1, −1, 1, 1, 1, −1, −1, 1), (−1, 1, 1, −1, 1, 1, −1, −1), (1, −1, −1, 1, 1, 1, −1, −1), (1, 1, −1, −1, 1, −1, −1, 1), (−1, −1, −1, −1, 1, 1, 1, 1), (−1, 1, −1, 1, 1, −1, 1, −1)}, {(−1, −1, 1, 1, 1, −1, −1, 1), (−1, 1, 1, −1, 1, 1, −1, −1), (1, −1, −1, 1, 1, 1, −1, −1), (1, 1, −1, −1, 1, −1, −1, 1), (−1, −1, −1, −1, 1, 1, 1, 1), (1, −1, 1, −1, −1, 1, −1, 1)}, {(−1, −1, 1, 1, 1, −1, −1, 1), (−1, 1, 1, −1, 1, 1, −1, −1), (1, −1, −1, 1, 1, 1, −1, −1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1, −1, 1), (−1, 1, 1, −1, 1, 1, −1, −1), (1, −1, −1, 1, 1, 1, −1, −1), (1, 1, −1, −1, 1, −1, −1, 1), (1, −1, 1, −1, −1, 1, −1, 1), (1, 1, 1, 1, −1, −1, −1, −1)}, {(−1, −1, 1, 1, 1, −1, −1, 1), (−1, 1, 1, 1, −1, −1, 1, −1), (1, −1, −1, 1, −1, −1, 1, 1), (1, 1, −1, 1, 1, −1, −1, −1), (−1, −1, −1, 1, 1, 1, 1, −1), (−1, 1, −1, −1, 1, −1, 1, 1)}, {(−1, −1, 1, 1, 1, −1, −1, 1), (−1, 1, 1, 1, −1, −1, 1, −1), (1, −1, −1, 1, −1, −1, 1, 1), (1, 1, −1, 1, 1, −1, −1, −1), (−1, −1, −1, 1, 1, 1, 1, −1), (1, −1, 1, 1, −1, 1, −1, −1)}, {(−1, −1, 1, 1, 1, −1, −1, 1), (−1, 1, 1, 1, −1, −1, 1, −1), (1, −1, −1, 1, −1, −1, 1, 1), (1, 1, −1, 1, 1, −1, −1, −1), (−1, 1, −1, −1, 1, −1, 1, 1), (1, 1, 1, −1, −1, −1, −1, 1)}, {(−1, −1, 1, 1, 1, −1, −1, 1), (−1, 1, 1, 1, −1, −1, 1, −1), (1, −1, −1, 1, −1, −1, 1, 1), (1, 1, −1, 1, 1, −1, −1, −1), (1, −1, 1, 1, −1, 1, −1, −1), (1, 1, 1, −1, −1, −1, −1, 1)}, {(−1, −1, 1, 1, 1, −1, −1, 1), (1, −1, −1, −1, 1, 1, −1, 1), (1, −1, −1, 1, −1, −1, 1, 1), (1, 1, −1, 1, 1, −1, −1, −1), (−1, −1, −1, 1, 1, 1, 1, −1), (−1, 1, −1, −1, 1, −1, 1, 1)}, {(−1, −1, 1, 1, 1, −1, −1, 1), (1, −1, −1, −1, 1, 1, −1, 1), (1, −1, −1, 1, −1, −1, 1, 1), (1, 1, −1, 1, 1, −1, −1, −1), (−1, −1, −1, 1, 1, 1, 1, −1), (1, −1, 1, 1, −1, 1, −1, −1)}, {(−1, −1, 1, 1, 1, −1, −1, 1), (1, −1, −1, −1, 1, 1, −1, 1), (1, −1, −1, 1, −1, −1, 1, 1), (1, 1, −1, 1, 1, −1, −1, −1), (−1, 1, −1, −1, 1, −1, 1, 1), (1, 1, 1, −1, −1, −1, −1, 1)}, {(−1, −1, 1, 1, 1, −1, −1, 1), (1, −1, −1, −1, 1, 1, −1, 1), (1, −1, −1, 1, −1, −1, 1, 1), (1, 1, −1, 1, 1, −1, −1, −1), (1, −1, 1, 1, −1, 1, −1, −1), (1, 1, 1, −1, −1, −1, −1, 1)}, {(−1, −1, 1, 1, 1, −1, −1, 1), (1, −1, −1, 1, −1, −1, 1, 1), (1, −1, −1, 1, 1, 1, −1, −1), (1, 1, −1, −1, 1, −1, −1, 1), (−1, −1, −1, −1, 1, 1, 1, 1), (−1, 1, −1, 1, 1, −1, 1, −1)}, {(−1, −1, 1, 1, 1, −1, −1, 1), (1, −1, −1, 1, −1, −1, 1, 1), (1, −1, −1, 1, 1, 1, −1, −1), (1, 1, −1, −1, 1, −1, −1, 1), (−1, −1, −1, −1, 1, 1, 1, 1), (1, −1, 1, −1, −1, 1, −1, 1)}, {(−1, −1, 1, 1, 1, −1, −1, 1), (1, −1, −1, 1, −1, −1, 1, 1), (1, −1, −1, 1, 1, 1, −1, −1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1, −1, 1), (1, −1, −1, 1, −1, −1, 1, 1), (1, −1, −1, 1, 1, 1, −1, −1), (1, 1, −1, −1, 1, −1, −1, 1), (1, −1, 1, −1, −1, 1, −1, 1), (1, 1, 1, 1, −1, −1, −1, −1)}, {(−1, 1, −1, −1, 1, 1, 1, −1), (−1, 1, 1, −1, −1, −1, 1, 1), (1, 1, −1, −1, 1, −1, −1, 1), (1, 1, 1, −1, −1, 1, −1, −1), (−1, −1, 1, −1, 1, 1, −1, 1), (−1, 1, 1, 1, 1, −1, −1, −1)}, {(−1, 1, −1, −1, 1, 1, 1, −1), (−1, 1, 1, −1, −1, −1, 1, 1), (1, 1, −1, −1, 1, −1, −1, 1), (1, 1, 1, −1, −1, 1, −1, −1), (−1, −1, 1, −1, 1, 1, −1, 1), (1, −1, −1, −1, −1, 1, 1, 1)}, {(−1, 1, −1, −1, 1, 1, 1, −1), (−1, 1, 1, −1, −1, −1, 1, 1), (1, 1, −1, −1, 1, −1, −1, 1), (1, 1, 1, −1, −1, 1, −1, −1), (−1, 1, 1, 1, 1, −1, −1, −1), (1, 1, −1, 1, −1, −1, 1, −1)}, {(−1, 1, −1, −1, 1, 1, 1, −1), (−1, 1, 1, −1, −1, −1, 1, 1), (1, 1, −1, −1, 1, −1, −1, 1), (1, 1, 1, −1, −1, 1, −1, −1), (1, −1, −1, −1, −1, 1, 1, 1), (1, 1, −1, 1, −1, −1, 1, −1) }, {(−1, 1, −1, −1, 1, 1, 1, −1), (−1, 1, 1, 1, −1, −1, 1, −1), (1, 1, −1, 1, 1, −1, −1, −1), (1, 1, 1, −1, −1, 1, −1, −1), (−1, −1, 1, 1, 1, 1, −1, −1), (−1, 1, 1, −1, 1, −1, −1, 1)}, {(−1, 1, −1, −1, 1, 1, 1, −1), (−1, 1, 1, 1, −1, −1, 1, −1), (1, 1, −1, 1, 1, −1, −1, −1), (1, 1, 1, −1, −1, 1, −1, −1), (−1, −1, 1, 1, 1, 1, −1, −1), (1, −1, −1, 1, −1, 1, 1, −1)}, {(−1, 1, −1, −1, 1, 1, 1, −1), (−1, 1, 1, 1, −1, −1, 1, −1), (1, 1, −1, 1, 1, −1, −1, −1), (1, 1, 1, −1, −1, 1, −1, −1), (−1, 1, 1, −1, 1, −1, −1, 1), (1, 1, −1, −1, −1, −1, 1, 1)}, {(−1, 1, −1, −1, 1, 1, 1, −1), (−1, 1, 1, 1, −1, −1, 1, −1), (1, 1, −1, 1, 1, −1, −1, −1), (1, 1, 1, −1, −1, 1, −1, −1), (1, −1, −1, 1, −1, 1, 1, −1), (1, 1, −1, −1, −1, −1, 1, 1)}, {(−1, 1, −1, −1, 1, 1, 1, −1), (1, −1, −1, −1, 1, 1, −1, 1), (1, 1, −1, 1, 1, −1, −1, −1), (1, 1, 1, −1, −1, 1, −1, −1), (−1, −1, 1, 1, 1, 1, −1, −1), (−1, 1, 1, −1, 1, −1, −1, 1)}, {(−1, 1, −1, −1, 1, 1, 1, −1), (1, −1, −1, −1, 1, 1, −1, 1), (1, 1, −1, 1, 1, −1, −1, −1), (1, 1, 1, −1, −1, 1, −1, −1), (−1, −1, 1, 1, 1, 1, −1, −1), (1, −1, −1, 1, −1, 1, 1, −1)}, {(−1, 1, −1, −1, 1, 1, 1, −1), (1, −1, −1, −1, 1, 1, −1, 1), (1, 1, −1, 1, 1, −1, −1, −1), (1, 1, 1, −1, −1, 1, −1, −1), (−1, 1, 1, −1, 1, −1, −1, 1), (1, 1, −1, −1, −1, −1, 1, 1)}, {(−1, 1, −1, −1, 1, 1, 1, −1), (1, −1, −1, −1, 1, 1, −1, 1), (1, 1, −1, 1, 1, −1, −1, −1), (1, 1, 1, −1, −1, 1, −1, −1), (1, −1, −1, 1, −1, 1, 1, −1), (1, 1, −1, −1, −1, −1, 1, 1)}, {(−1, 1, −1, −1, 1, 1, 1, −1), (1, −1, −1, 1, 1, 1, −1, −1), (1, 1, −1, −1, 1, −1, −1, 1), (1, 1, 1, −1, −1, 1, −1, −1), (−1, −1, 1, −1, 1, 1, −1, 1), (−1, 1, 1, 1, 1, −1, −1, −1)}, {(−1, 1, −1, −1, 1, 1, 1, −1), (1, −1, −1, 1, 1, 1, −1, −1), (1, 1, −1, −1, 1, −1, −1, 1), (1, 1, 1, −1, −1, 1, −1, −1), (−1, −1, 1, −1, 1, 1, −1, 1), (1, −1, −1, −1, −1, 1, 1, 1)}, {(−1, 1, −1, −1, 1, 1, 1, −1), (1, −1, −1, 1, 1, 1, −1, −1), (1, 1, −1, −1, 1, −1, −1, 1), (1, 1, 1, −1, −1, 1, −1, −1), (−1, 1, 1, 1, 1, −1, −1, −1), (1, 1, −1, 1, −1, −1, 1, −1)}, {(−1, 1, −1, −1, 1, 1, 1, −1), (1, −1, −1, 1, 1, 1, −1, −1), (1, 1, −1, −1, 1, −1, −1, 1), (1, 1, 1, −1, −1, 1, −1, −1), (1, −1, −1, −1, −1, 1, 1, 1), (1, 1, −1, 1, −1, −1, 1, −1)}, {(−1, 1, 1, −1, −1, −1, 1, 1), (−1, 1, 1, −1, 1, 1, −1, −1), (1, 1, −1, −1, −1, 1, 1, −1), (1, 1, −1, −1, 1, −1, −1, 1), (−1, −1, −1, −1, 1, 1, 1, 1), (−1, 1, −1, 1, 1, −1, 1, −1)}, {(−1, 1, 1, −1, −1, −1, 1, 1), (−1, 1, 1, −1, 1, 1, −1, −1), (1, 1, −1, −1, −1, 1, 1, −1), (1, 1, −1, −1, 1, −1, −1, 1), (−1, −1, −1, −1, 1, 1, 1, 1), (1, −1, 1, −1, −1, 1, −1, 1)}, {(−1, 1, 1, −1, −1, −1, 1, 1), (−1, 1, 1, −1, 1, 1, −1, −1), (1, 1, −1, −1, −1, 1, 1, −1), (1, 1, −1, −1, 1, −1, −1, 1), (−1, 1, −1, 1, 1, −1, 1, −1), (1, 1, 1, 1, −1, −1, −1, −1)}, {(−1, 1, 1, −1, −1, −1, 1, 1), (−1, 1, 1, −1, 1, 1, −1, −1), (1, 1, −1, −1, −1, 1, 1, −1), (1, 1, −1, −1, 1, −1, −1, 1), (1, −1, 1, −1, −1, 1, −1, 1), (1, 1, 1, 1, −1, −1, −1, −1)}, {(−1, 1, 1, −1, −1, −1, 1, 1), (1, −1, −1, 1, −1, −1, 1, 1), (1, 1, −1, −1, −1, 1, 1, −1), (1, 1, −1, −1, 1, −1, −1, 1), (−1, −1, −1, −1, 1, 1, 1, 1), (−1, 1, −1, 1, 1, −1, 1, −1)}, {(−1, 1, 1, −1, −1, −1, 1, 1), (1, −1, −1, 1, −1, −1, 1, 1), (1, 1, −1, −1, −1, 1, 1, −1), (1, 1, −1, −1, 1, −1, −1, 1), (−1, −1, −1, −1, 1, 1, 1, 1), (1, −1, 1, −1, −1, 1, −1, 1)}, {(−1, 1, 1, −1, −1, −1, 1, 1), (1, −1, −1, 1, −1, −1, 1, 1), (1, 1, −1, −1, −1, 1, 1, −1), (1, 1, −1, −1, 1, −1, −1, 1), (−1, 1, −1, 1, 1, −1, 1, −1), (1, 1, 1, 1, −1, −1, −1, −1)}, {(−1, 1, 1, −1, −1, −1, 1, 1), (1, −1, −1, 1, −1, −1, 1, 1), (1, 1, −1, −1, −1, 1, 1, −1), (1, 1, −1, −1, 1, −1, −1, 1), (1, −1, 1, −1, −1, 1, −1, 1), (1, 1, 1, 1, −1, −1, −1, −1)}, {(−1, 1, 1, −1, −1, −1, 1, 1), (1, −1, 1, 1, −1, −1, −1, 1), (1, 1, −1, −1, 1, −1, −1, 1), (1, 1, 1, −1, −1, 1, −1, −1), (−1, −1, 1, −1, 1, 1, −1, 1), (−1, 1, 1, 1, 1, −1, −1, −1)}, {(−1, 1, 1, −1, −1, −1, 1, 1), (1, −1, 1, 1, −1, −1, −1, 1), (1, 1, −1, −1, 1, −1, −1, 1), (1, 1, 1, −1, −1, 1, −1, −1), (−1, −1, 1, −1, 1, 1, −1, 1), (1, −1, −1, −1, −1, 1, 1, 1)}, {(−1, 1, 1, −1, −1, −1, 1, 1), (1, −1, 1, 1, −1, −1, −1, 1), (1, 1, −1, −1, 1, −1, −1, 1), (1, 1, 1, −1, −1, 1, −1, −1), (−1, 1, 1, 1, 1, −1, −1, −1), (1, 1, −1, 1, −1, −1, 1, −1)}, {(−1, 1, 1, −1, −1, −1, 1, 1), (1, −1, 1, 1, −1, −1, −1, 1), (1, 1, −1, −1, 1, −1, −1, 1), (1, 1, 1, −1, −1, 1, −1, −1), (1, −1, −1, −1, −1, 1, 1, 1), (1, 1, −1, 1, −1, −1, 1, −1)}, {(−1, 1, 1, −1, 1, 1, −1, −1), (−1, 1, 1, 1, −1, −1, 1, −1), (1, 1, −1, −1, −1, 1, 1, −1), (1, 1, −1, 1, 1, −1, −1, −1), (−1, −1, −1, 1, 1, 1, 1, −1), (−1, 1, −1, −1, 1, −1, 1, 1)}, {(−1, 1, 1, −1, 1, 1, −1, −1), (−1, 1, 1, 1, −1, −1, 1, −1), (1, 1, −1, −1, −1, 1, 1, −1), (1, 1, −1, 1, 1, −1, −1, −1), (−1, −1, −1, 1, 1, 1, 1, −1), (1, −1, 1, 1, −1, 1, −1, −1)}, {(−1, 1, 1, −1, 1, 1, −1, −1), (−1, 1, 1, 1, −1, −1, 1, −1), (1, 1, −1, −1, −1, 1, 1, −1), (1, 1, −1, 1, 1, −1, −1, −1), (−1, 1, −1, −1, 1, −1, 1, 1), (1, 1, 1, −1, −1, −1, −1, 1)}, {(−1, 1, 1, −1, 1, 1, −1, −1), (−1, 1, 1, 1, −1, −1, 1, −1), (1, 1, −1, −1, −1, 1, 1, −1), (1, 1, −1, 1, 1, −1, −1, −1), (1, −1, 1, 1, −1, 1, −1, −1), (1, 1, 1, −1, −1, −1, −1, 1)}, {(−1, 1, 1, −1, 1, 1, −1, −1), (1, −1, −1, −1, 1, 1, −1, 1), (1, 1, −1, −1, −1, 1, 1, −1), (1, 1, −1, 1, 1, −1, −1, −1), (−1, −1, −1, 1, 1, 1, 1, −1), (−1, 1, −1, −1, 1, −1, 1, 1)}, {(−1, 1, 1, −1, 1, 1, −1, −1), (1, −1, −1, −1, 1, 1, −1, 1), (1, 1, −1, −1, −1, 1, 1, −1), (1, 1, −1, 1, 1, −1, −1, −1), (−1, −1, −1, 1, 1, 1, 1, −1), (1, −1, 1, 1, −1, 1, −1, −1)}, {(−1, 1, 1, −1, 1, 1, −1, −1), (1, −1, −1, −1, 1, 1, −1, 1), (1, 1, −1, −1, −1, 1, 1, −1), (1, 1, −1, 1, 1, −1, −1, −1), (−1, 1, −1, −1, 1, −1, 1, 1), (1, 1, 1, −1, −1, −1, −1, 1)}, {(−1, 1, 1, −1, 1, 1, −1, −1), (1, −1, −1, −1, 1, 1, −1, 1), (1, 1, −1, −1, −1, 1, 1, −1), (1, 1, −1, 1, 1, −1, −1, −1), (1, −1, 1, 1, −1, 1, −1, −1), (1, 1, 1, −1, −1, −1, −1, 1)}, {(−1, 1, 1, −1, 1, 1, −1, −1), (1, −1, −1, 1, 1, 1, −1, −1), (1, 1, −1, −1, −1, 1, 1, −1), (1, 1, −1, −1, 1, −1, −1, 1), (−1, −1, −1, −1, 1, 1, 1, 1), (−1, 1, −1, 1, 1, −1, 1, −1)}, {(−1, 1, 1, −1, 1, 1, −1, −1), (1, −1, −1, 1, 1, 1, −1, −1), (1, 1, −1, −1, −1, 1, 1, −1), (1, 1, −1, −1, 1, −1, −1, 1), (−1, −1, −1, −1, 1, 1, 1, 1), (1, −1, 1, −1, −1, 1, −1, 1)}, {(−1, 1, 1, −1, 1, 1, −1, −1), (1, −1, −1, 1, 1, 1, −1, −1), (1, 1, −1, −1, −1, 1, 1, −1), (1, 1, −1, −1, 1, −1, −1, 1), (−1, 1, −1, 1, 1, −1, 1, −1), (1, 1, 1, 1, −1, −1, −1, −1)}, {(−1, 1, 1, −1, 1, 1, −1, −1), (1, −1, −1, 1, 1, 1, −1, −1), (1, 1, −1, −1, −1, 1, 1, −1), (1, 1, −1, −1, 1, −1, −1, 1), (1, −1, 1, −1, −1, 1, −1, 1), (1, 1, 1, 1, −1, −1, −1, −1)}, {(−1, 1, 1, 1, −1, −1, 1, −1), (1, −1, −1, 1, −1, −1, 1, 1), (1, 1, −1, −1, −1, 1, 1, −1), (1, 1, −1, 1, 1, −1, −1, −1), (−1, −1, −1, 1, 1, 1, 1, −1), (−1, 1, −1, −1, 1, −1, 1, 1)}, {(−1, 1, 1, 1, −1, −1, 1, −1), (1, −1, −1, 1, −1, −1, 1, 1), (1, 1, −1, −1, −1, 1, 1, −1), (1, 1, −1, 1, 1, −1, −1, −1), (−1, −1, −1, 1, 1, 1, 1, −1), (1, −1, 1, 1, −1, 1, −1, −1)}, {(−1, 1, 1, 1, −1, −1, 1, −1), (1, −1, −1, 1, −1, −1, 1, 1), (1, 1, −1, −1, −1, 1, 1, −1), (1, 1, −1, 1, 1, −1, −1, −1), (−1, 1, −1, −1, 1, −1, 1, 1), (1, 1, 1, −1, −1, −1, −1, 1)}, {(−1, 1, 1, 1, −1, −1, 1, −1), (1, −1, −1, 1, −1, −1, 1, 1), (1, 1, −1, −1, −1, 1, 1, −1), (1, 1, −1, 1, 1, −1, −1, −1), (1, −1, 1, 1, −1, 1, −1, −1), (1, 1, 1, −1, −1, −1, −1, 1)}, {(−1, 1, 1, 1, −1, −1, 1, −1), (1, −1, 1, 1, −1, −1, −1, 1), (1, 1, −1, 1, 1, −1, −1, −1), (1, 1, 1, −1, −1, 1, −1, −1), (−1, −1, 1, 1, 1, 1, −1, −1), (−1, 1, 1, −1, 1, −1, −1, 1)}, {(−1, 1, 1, 1, −1, −1, 1, −1), (1, −1, 1, 1, −1, −1, −1, 1), (1, 1, −1, 1, 1, −1, −1, −1), (1, 1, 1, −1, −1, 1, −1, −1), (−1, −1, 1, 1, 1, 1, −1, −1), (1, −1, −1, 1, −1, 1, 1, −1)}, {(−1, 1, 1, 1, −1, −1, 1, −1), (1, −1, 1, 1, −1, −1, −1, 1), (1, 1, −1, 1, 1, −1, −1, −1), (1, 1, 1, −1, −1, 1, −1, −1), (−1, 1, 1, −1, 1, −1, −1, 1), (1, 1, −1, −1, −1, −1, 1, 1)}, {(−1, 1, 1, 1, −1, −1, 1, −1), (1, −1, 1, 1, −1, −1, −1, 1), (1, 1, −1, 1, 1, −1, −1, −1), (1, 1, 1, −1, −1, 1, −1, −1), (1, −1, −1, 1, −1, 1, 1, −1), (1, 1, −1, −1, −1, −1, 1, 1)}, {(1, −1, −1, −1, 1, 1, −1, 1), (1, −1, −1, 1, −1, −1, 1, 1), (1, 1, −1, −1, −1, 1, 1, −1), (1, 1, −1, 1, 1, −1, −1, −1), (−1, −1, −1, 1, 1, 1, 1, −1), (−1, 1, −1, −1, 1, −1, 1, 1)}, {(1, −1, −1, −1, 1, 1, −1, 1), (1, −1, −1, 1, −1, −1, 1, 1), (1, 1, −1, −1, −1, 1, 1, −1), (1, 1, −1, 1, 1, −1, −1, −1), (−1, −1, −1, 1, 1, 1, 1, −1), (1, −1, 1, 1, −1, 1, −1, −1)}, {(1, −1, −1, −1, 1, 1, −1, 1), (1, −1, −1, 1, −1, −1, 1, 1), (1, 1, −1, −1, −1, 1, 1, −1), (1, 1, −1, 1, 1, −1, −1, −1), (−1, 1, −1, −1, 1, −1, 1, 1), (1, 1, 1, −1, −1, −1, −1, 1)}, {(1, −1, −1, −1, 1, 1, −1, 1), (1, −1, −1, 1, −1, −1, 1, 1), (1, 1, −1, −1, −1, 1, 1, −1), (1, 1, −1, 1, 1, −1, −1, −1), (1, −1, 1, 1, −1, 1, −1, −1), (1, 1, 1, −1, −1, −1, −1, 1)}, {(1, −1, −1, −1, 1, 1, −1, 1), (1, −1, 1, 1, −1, −1, −1, 1), (1, 1, −1, 1, 1, −1, −1, −1), (1, 1, 1, −1, −1, 1, −1, −1), (−1, −1, 1, 1, 1, 1, −1, −1), (−1, 1, 1, −1, 1, −1, −1, 1)}, {(1, −1, −1, −1, 1, 1, −1, 1), (1, −1, 1, 1, −1, −1, −1, 1), (1, 1, −1, 1, 1, −1, −1, −1), (1, 1, 1, −1, −1, 1, −1, −1), (−1, −1, 1, 1, 1, 1, −1, −1), (1, −1, −1, 1, −1, 1, 1, −1)}, {(1, −1, −1, −1, 1, 1, −1, 1), (1, −1, 1, 1, −1, −1, −1, 1), (1, 1, −1, 1, 1, −1, −1, −1), (1, 1, 1, −1, −1, 1, −1, −1), (−1, 1, 1, −1, 1, −1, −1, 1), (1, 1, −1, −1, −1, −1, 1, 1)}, {(1, −1, −1, −1, 1, 1, −1, 1), (1, −1, 1, 1, −1, −1, −1, 1), (1, 1, −1, 1, 1, −1, −1, −1), (1, 1, 1, −1, −1, 1, −1, −1), (1, −1, −1, 1, −1, 1, 1, −1), (1, 1, −1, −1, −1, −1, 1, 1)}, {(1, −1, −1, 1, −1, −1, 1, 1), (1, −1, −1, 1, 1, 1, −1, −1), (1, 1, −1, −1, −1, 1, 1, −1), (1, 1, −1, −1, 1, −1, −1, 1), (−1, −1, −1, −1, 1, 1, 1, 1), (−1, 1, −1, 1, 1, −1, 1, −1)}, {(1, −1, −1, 1, −1, −1, 1, 1), (1, −1, −1, 1, 1, 1, −1, −1), (1, 1, −1, −1, −1, 1, 1, −1), (1, 1, −1, −1, 1, −1, −1, 1), (−1, −1, −1, −1, 1, 1, 1, 1), (1, −1, 1, −1, −1, 1, −1, 1)}, {(1, −1, −1, 1, −1, −1, 1, 1), (1, −1, −1, 1, 1, 1, −1, −1), (1, 1, −1, −1, −1, 1, 1, −1), (1, 1, −1, −1, 1, −1, −1, 1), (−1, 1, −1, 1, 1, −1, 1, −1), (1, 1, 1, 1, −1, −1, −1, −1)}, {(1, −1, −1, 1, −1, −1, 1, 1), (1, −1, −1, 1, 1, 1, −1, −1), (1, 1, −1, −1, −1, 1, 1, −1), (1, 1, −1, −1, 1, −1, −1, 1), (1, −1, 1, −1, −1, 1, −1, 1), (1, 1, 1, 1, −1, −1, −1, −1)}, {(1, −1, −1, 1, 1, 1, −1, −1), (1, −1, 1, 1, −1, −1, −1, 1), (1, 1, −1, −1, 1, −1, −1, 1), (1, 1, 1, −1, −1, 1, −1, −1), (−1, −1, 1, −1, 1, 1, −1, 1), (−1, 1, 1, 1, 1, −1, −1, −1)}, {(1, −1, −1, 1, 1, 1, −1, −1), (1, −1, 1, 1, −1, −1, −1, 1), (1, 1, −1, −1, 1, −1, −1, 1), (1, 1, 1, −1, −1, 1, −1, −1), (−1, −1, 1, −1, 1, 1, −1, 1), (1, −1, −1, −1, −1, 1, 1, 1)}, {(1, −1, −1, 1, 1, 1, −1, −1), (1, −1, 1, 1, −1, −1, −1, 1), (1, 1, −1, −1, 1, −1, −1, 1), (1, 1, 1, −1, −1, 1, −1, −1), (−1, 1, 1, 1, 1, −1, −1, −1), (1, 1, −1, 1, −1, −1, 1, −1)}, {(1, −1, −1, 1, 1, 1, −1, −1), (1, −1, 1, 1, −1, −1, −1, 1), (1, 1, −1, −1, 1, −1, −1, 1), (1, 1, 1, 1, −1, 1, −1, −1), (1, −1, −1, −1, −1, 1, 1, 1), (1, 1, −1, 1, −1, −1, 1, −1) }, {(−1, −1, −1, −1, 1, 1, 1, 1), (−1, −1, 1, 1, 1, 1, −1, −1), (−1, 1, −1, 1, 1, −1, 1, −1), (−1, 1, 1, −1, 1, −1, −1, 1), (−1, −1, 1, 1, −1, −1, 1, 1), (−1, 1, 1, −1, −1, 1, 1, −1)}, {(−1, −1, −1, −1, 1, 1, 1, 1), (−1, −1, 1, 1, 1, 1, −1, −1), (−1, 1, −1, 1, 1, −1, 1, −1), (−1, 1, 1, −1, 1, −1, −1, 1), (−1, −1, 1, 1, −1, −1, 1, 1), (1, −1, −1, 1, 1, −1, −1, 1)}, {(−1, −1, −1, −1, 1, 1, 1, 1), (−1, −1, 1, 1, 1, 1, −1, −1), (−1, 1, −1, 1, 1, −1, 1, −1), (−1, 1, 1, −1, 1, −1, −1, 1), (−1, 1, 1, −1, −1, 1, 1, −1), (1, 1, −1, −1, 1, 1, −1, −1)}, {(−1, −1, −1, −1, 1, 1, 1, 1), (−1, −1, 1, 1, 1, 1, −1, −1), (−1, 1, −1, 1, 1, −1, 1, −1), (−1, 1, 1, −1, 1, −1, −1, 1), (1, −1, −1, 1, 1, −1, −1, 1), (1, 1, −1, −1, 1, 1, −1, −1)}, {(−1, −1, −1, −1, 1, 1, 1, 1), (−1, −1, 1, 1, 1, 1, −1, −1), (−1, 1, −1, 1, 1, −1, 1, −1), (1, −1, −1, 1, −1, 1, 1, −1), (−1, −1, 1, 1, −1, −1, 1, 1), (−1, 1, 1, −1, −1, 1, 1, −1)}, {(−1, −1, −1, −1, 1, 1, 1, 1), (−1, −1, 1, 1, 1, 1, −1, −1), (−1, 1, −1, 1, 1, −1, 1, −1), (1, −1, −1, 1, −1, 1, 1, −1), (−1, −1, 1, 1, −1, −1, 1, 1), (1, −1, −1, 1, 1, −1, −1, 1)}, {(−1, −1, −1, −1, 1, 1, 1, 1), (−1, −1, 1, 1, 1, 1, −1, −1), (−1, 1, −1, 1, 1, −1, 1, −1), (1, −1, −1, 1, −1, 1, 1, −1), (−1, 1, 1, −1, −1, 1, 1, −1), (1, 1, −1, −1, 1, 1, −1, −1)}, {(−1, −1, −1, −1, 1, 1, 1, 1), (−1, −1, 1, 1, 1, 1, −1, −1), (−1, 1, −1, 1, 1, −1, 1, −1), (1, −1, −1, 1, −1, 1, 1, −1), (1, −1, −1, 1, 1, −1, −1, 1), (1, 1, −1, −1, 1, 1, −1, −1)}, {(−1, −1, −1, −1, 1, 1, 1, 1), (−1, −1, 1, 1, 1, 1, −1, −1), (−1, 1, 1, −1, 1, −1, −1, 1), (1, −1, 1, −1, −1, 1, −1, 1), (−1, −1, 1, 1, −1, −1, 1, 1), (−1, 1, 1, −1, −1, 1, 1, −1)}, {(−1, −1, −1, −1, 1, 1, 1, 1), (−1, −1, 1, 1, 1, 1, −1, −1), (−1, 1, 1, −1, 1, −1, −1, 1), (1, −1, 1, −1, −1, 1, −1, 1), (−1, −1, 1, 1, −1, −1, 1, 1), (1, −1, −1, 1, 1, −1, −1, 1)}, {(−1, −1, −1, −1, 1, 1, 1, 1), (−1, −1, 1, 1, 1, 1, −1, −1), (−1, 1, 1, −1, 1, −1, −1, 1), (1, −1, 1, −1, −1, 1, −1, 1), (−1, 1, 1, −1, −1, 1, 1, −1), (1, 1, −1, −1, 1, 1, −1, −1)}, {(−1, −1, −1, −1, 1, 1, 1, 1), (−1, −1, 1, 1, 1, 1, −1, −1), (−1, 1, 1, −1, 1, −1, −1, 1), (1, −1, 1, −1, −1, 1, −1, 1), (1, −1, −1, 1, 1, −1, −1, 1), (1, 1, −1, −1, 1, 1, −1, −1)}, {(−1, −1, −1, −1, 1, 1, 1, 1), (−1, −1, 1, 1, 1, 1, −1,−1), (1, −1, −1, 1, −1, 1, 1, −1), (1, −1, 1, −1, −1, 1, −1, 1), (−1, −1, 1, 1, −1, −1, 1, 1), (−1, 1, 1, −1, −1, 1, 1, −1)}, {(−1, −1, −1, −1, 1, 1, 1, 1), (−1, −1, 1, 1, 1, 1, −1, −1), (1, −1, −1, 1, −1, 1, 1, −1), (1, −1, 1, −1, −1, 1, −1, 1), (−1, −1, 1, 1, −1, −1, 1, 1), (1, −1, −1, 1, 1, −1, −1, 1)}, {(−1, −1, −1, −1, 1, 1, 1, 1), (−1, −1, 1, 1, 1, 1, −1, −1), (1, −1, −1, 1, −1, 1, 1, −1), (1, −1, 1, −1, −1, 1, −1, 1), (−1, 1, 1, −1, −1, 1, 1, −1), (1, 1, −1, −1, 1, 1, −1, −1)}, {(−1, −1, −1, −1, 1, 1, 1, 1), (−1, −1, 1, 1, 1, 1, −1, −1), (1, −1, −1, 1, −1, 1, 1, −1), (1, −1, 1, −1, −1, 1, −1, 1), (1, −1, −1, 1, 1, −1, −1, 1), (1, 1, −1, −1, 1, 1, −1, −1)}, {(−1, −1, −1, −1, 1, 1, 1, 1), (−1, 1, −1, 1, 1, −1, 1, −1), (−1, 1, 1, −1, 1, −1, −1, 1), (1, 1, −1, −1, −1, −1, 1, 1), (−1, −1, 1, 1, −1, −1, 1, 1), (−1, 1, 1, −1, −1, 1, 1, −1)}, {(−1, −1, −1, −1, 1, 1, 1, 1), (−1, 1, −1, 1, 1, −1, 1, −1), (−1, 1, 1, −1, 1, −1, −1, 1), (1, 1, −1, −1, −1, −1, 1, 1), (−1, −1, 1, 1, −1, −1, 1, 1), (1, −1, −1, 1, 1, −1, −1, 1)}, {(−1, −1, −1, −1, 1, 1, 1, 1), (−1, 1, −1, 1, 1, −1, 1, −1), (−1, 1, 1, −1, 1, −1, −1, 1), (1, 1, −1, −1, −1, −1, 1, 1), (−1, 1, 1, −1, −1, 1, 1, −1), (1, 1, −1, −1, 1, 1, −1, −1)}, {(−1, −1, −1, −1, 1, 1, 1, 1), (−1, 1, −1, 1, 1, −1, 1, −1), (−1, 1, 1, −1, 1, −1, −1, 1), (1, 1, −1, −1, −1, −1, 1, 1), (1, −1, −1, 1, 1, −1, −1, 1), (1, 1, −1, −1, 1, 1, −1, −1)}, {(−1, −1, −1, −1, 1, 1, 1, 1), (−1, 1, −1, 1, 1, −1, 1, −1), (1, −1, −1, 1, −1, 1, 1, −1), (1, 1, −1, −1, −1, −1, 1, 1), (−1, −1, 1, 1, −1, −1, 1, 1), (−1, 1, 1, −1, −1, 1, 1, −1)}, {(−1, −1, −1, −1, 1, 1, 1, 1), (−1, 1, −1, 1, 1, −1, 1, −1), (1, −1, −1, 1, −1, 1, 1, −1), (1, 1, −1, −1, −1, −1, 1, 1), (−1, −1, 1, 1, −1, −1, 1, 1), (1, −1, −1, 1, 1, −1, −1, 1)}, {(−1, −1, −1, −1, 1, 1, 1, 1), (−1, 1, −1, 1, 1, −1, 1, −1), (1, −1, −1, 1, −1, 1, 1, −1), (1, 1, −1, −1, −1, −1, 1, 1), (−1, 1, 1, −1, −1, 1, 1, −1), (1, 1, −1, −1, 1, 1, −1, −1)}, {(−1, −1, −1, −1, 1, 1, 1, 1), (−1, 1, −1, 1, 1, −1, 1, −1), (1, −1, −1, 1, −1, 1, 1, −1), (1, 1, −1, −1, −1, −1, 1, 1), (1, −1, −1, 1, 1, −1, −1, 1), (1, 1, −1, −1, 1, 1, −1, −1)}, {(−1, −1, −1, −1, 1, 1, 1, 1), (−1, 1, 1, −1, 1, −1, −1, 1), (1, −1, 1, −1, −1, 1, −1, 1), (1, 1, −1, −1, −1, −1, 1, 1), (−1, −1, 1, 1, −1, −1, 1, 1), (−1, 1, 1, −1, −1, 1, 1, −1)}, {(−1, −1, −1, −1, 1, 1, 1, 1), (−1, 1, 1, −1, 1, −1, −1, 1), (1, −1, 1, −1, −1, 1, −1, 1), (1, 1, −1, −1, −1, −1, 1, 1), (−1, −1, 1, 1, −1, −1, 1, 1), (1, −1, −1, 1, 1, −1, −1, 1)}, {(−1, −1, −1, −1, 1, 1, 1, 1), (−1, 1, 1, −1, 1, −1, −1, 1), (1, −1, 1, −1, −1, 1, −1, 1), (1, 1, −1, −1, −1, −1, 1, 1), (−1, 1, 1, −1, −1, 1, 1, −1), (1, 1, −1, −1, 1, 1, −1, −1)}, {(−1, −1, −1, −1, 1, 1, 1, 1), (−1, 1, 1, −1, 1, −1, −1, 1), (1, −1, 1, −1, −1, 1, −1, 1), (1, 1, −1, −1, −1, −1, 1, 1), (1, −1, −1, 1, 1, −1, −1, 1), (1, 1, −1, −1, 1, 1, −1, −1)}, {(−1, −1, −1, −1, 1, 1, 1, 1), (1, −1, −1, 1, −1, 1, 1, −1), (1, −1, 1, −1, −1, 1, −1, 1), (1, 1, −1, −1, −1, −1, 1, 1), (−1, −1, 1, 1, −1, −1, 1, 1), (−1, 1, 1, −1, −1, 1, 1, −1)}, {(−1, −1, −1, −1, 1, 1, 1, 1), (1, −1, −1, 1, −1, 1, 1, −1), (1, −1, 1, −1, −1, 1, −1, 1), (1, 1, −1, −1, −1, −1, 1, 1), (−1, −1, 1, 1, −1, −1, 1, 1), (1, −1, −1, 1, 1, −1, −1, 1)}, {(−1, −1, −1, −1, 1, 1, 1, 1), (1, −1, −1, 1, −1, 1, 1, −1), (1, −1, 1, −1, −1, 1, −1, 1), (1, 1, −1, −1, −1, −1, 1, 1), (−1, 1, 1, −1, −1, 1, 1, −1), (1, 1, −1, −1, 1, 1, −1, −1)}, {(−1, −1, −1, −1, 1, 1, 1, 1), (1, −1, −1, 1, −1, 1, 1, −1), (1, −1, 1, −1, −1, 1, −1, 1), (1, 1, −1, −1, −1, −1, 1, 1), (1, −1, −1, 1, 1, −1, −1, 1), (1, 1, −1, −1, 1, 1, −1, −1)}, {(−1, −1, −1, 1, 1, 1, 1, −1), (−1, −1, 1, −1, 1, 1, −1, 1), (−1, 1, −1, −1, 1, −1, 1, 1), (−1, 1, 1, 1, 1, −1, −1, −1), (−1, −1, 1, 1, −1, −1, 1, 1), (−1, 1, 1, −1, −1, 1, 1, −1)}, {(−1, −1, −1, 1, 1, 1, 1, −1), (−1, −1, 1, −1, 1, 1, −1, 1), (−1, 1, −1, −1, 1, −1, 1, 1), (−1, 1, 1, 1, 1, −1, −1, −1), (−1, −1, 1, 1, −1, −1, 1, 1), (1, −1, −1, 1, 1, −1, −1, 1)}, {(−1, −1, −1, 1, 1, 1, 1, −1), (−1, −1, 1, −1, 1, 1, −1, 1), (−1, 1, −1, −1, 1, −1, 1, 1), (−1, 1, 1, 1, 1, −1, −1, −1), (−1, 1, 1, −1, −1, 1, 1, −1), (1, 1, −1, −1, 1, 1, −1, −1)}, {(−1, −1, −1, 1, 1, 1, 1, −1), (−1, −1, 1, −1, 1, 1, −1, 1), (−1, 1, −1, −1, 1, −1, 1, 1), (−1, 1, 1, 1, 1, −1, −1, −1), (1, −1, −1, 1, 1, −1, −1, 1), (1, 1, −1, −1, 1, 1, −1, −1)}, {(−1, −1, −1, 1, 1, 1, 1, −1), (−1, −1, 1, −1, 1, 1, −1, 1), (−1, 1, −1, −1, 1, −1, 1, 1), (1, −1, −1, −1, −1, 1, 1, 1), (−1, −1, 1, 1, −1, −1, 1, 1), (−1, 1, 1, −1, −1, 1, 1, −1)}, {(−1, −1, −1, 1, 1, 1, 1, −1), (−1, −1, 1, −1, 1, 1, −1, 1), (−1, 1, −1, −1, 1, −1, 1, 1), (1, −1, −1, −1, −1, 1, 1, 1), (−1, −1, 1, 1, −1, −1, 1, 1), (1, −1, −1, 1, 1, −1, −1, 1)}, {(−1, −1, −1, 1, 1, 1, 1, −1), (−1, −1, 1, −1, 1, 1, −1, 1), (−1, 1, −1, −1, 1, −1, 1, 1), (1, −1, −1, −1, −1, 1, 1, 1), (−1, 1, 1, −1, −1, 1, 1, −1), (1, 1, −1, −1, 1, 1, −1, −1)}, {(−1, −1, −1, 1, 1, 1, 1, −1), (−1, −1, 1, −1, 1, 1, −1, 1), (−1, 1, −1, −1, 1, −1, 1, 1), (1, −1, −1, −1, −1, 1, 1, 1), (1, −1, −1, 1, 1, −1, −1, 1), (1, 1, −1, −1, 1, 1, −1, −1)}, {(−1, −1, −1, 1, 1, 1, 1, −1), (−1, −1, 1, −1, 1, 1, −1, 1), (−1, 1, 1, 1, 1, −1, −1, −1), (1, −1, 1, 1, −1, 1, −1, −1), (−1, −1, 1, 1, −1, −1, 1, 1), (−1, 1, 1, −1, −1, 1, 1, −1)}, {(−1, −1, −1, 1, 1, 1, 1, −1), (−1, −1, 1, −1, 1, 1, −1, 1), (−1, 1, 1, 1, 1, −1, −1, −1), (1, −1, 1, 1, −1, 1, −1, −1), (−1, −1, 1, 1, −1, −1, 1, 1), (1, −1, −1, 1, 1, −1, −1, 1)}, {(−1, −1, −1, 1, 1, 1, 1, −1), (−1, −1, 1, −1, 1, 1, −1, 1), (−1, 1, 1, 1, 1, −1, −1, −1), (1, −1, 1, 1, −1, 1, −1, −1), (−1, 1, 1, −1, −1, 1, 1, −1), (1, 1, −1, −1, 1, 1, −1, −1)}, {(−1, −1, −1, 1, 1, 1, 1, −1), (−1, −1, 1, −1, 1, 1, −1, 1), (−1, 1, 1, 1, 1, −1, −1, −1), (1, −1, 1, 1, −1, 1, −1, −1), (1, −1, −1, 1, 1, −1, −1, 1), (1, 1, −1, −1, 1, 1, −1, −1)}, {(−1, −1, −1, 1, 1, 1, 1, −1), (−1, −1, 1, −1, 1, 1, −1, 1), (1, −1, −1, −1, −1, 1, 1, 1), (1, −1, 1, 1, −1, 1, −1, −1), (−1, −1, 1, 1, −1, −1, 1, 1), (−1, 1, 1, −1, −1, 1, 1, −1)}, {(−1, −1, −1, 1, 1, 1, 1, −1), (−1, −1, 1, −1, 1, 1, −1, 1), (1, −1, −1, −1, −1, 1, 1, 1), (1, −1, 1, 1, −1, 1, −1, −1), (−1, −1, 1, 1, −1, −1, 1, 1), (1, −1, −1, 1, 1, −1, −1, 1)}, {(−1, −1, −1, 1, 1, 1, 1, −1), (−1, −1, 1, −1, 1, 1, −1, 1), (1, −1, −1, −1, −1, 1, 1, 1), (1, −1, 1, 1, −1, 1, −1, −1), (−1, 1, 1, −1, −1, 1, 1, −1), (1, 1, −1, −1, 1, 1, −1, −1)}, {(−1, −1, −1, 1, 1, 1, 1, −1), (−1, −1, 1, −1, 1, 1, −1, 1), (1, −1, −1, −1, −1, 1, 1, 1), (1, −1, 1, 1, −1, 1, −1, −1), (1, −1, −1, 1, 1, −1, −1, 1), (1, 1, −1, −1, 1, 1, −1, −1)}, {(−1, −1, −1, 1, 1, 1, 1, −1), (−1, 1, −1, −1, 1, −1, 1, 1), (−1, 1, 1, 1, 1, −1, −1, −1), (1, 1, −1, 1, −1, −1, 1, −1), (−1, −1, 1, 1, −1, −1, 1, 1), (−1, 1, 1, −1, −1, 1, 1, −1)}, {(−1, −1, −1, 1, 1, 1, 1, −1), (−1, 1, −1, −1, 1, −1, 1, 1), (−1, 1, 1, 1, 1, −1, −1, −1), (1, 1, −1, 1, −1, −1, 1, −1), (−1, −1, 1, 1, −1, −1, 1, 1), (1, −1, −1, 1, 1, −1, −1, 1)}, {(−1, −1, −1, 1, 1, 1, 1, −1), (−1, 1, −1, −1, 1, −1, 1, 1), (−1, 1, 1, 1, 1, −1, −1, −1), (1, 1, −1, 1, −1, −1, 1, −1), (−1, 1, 1, −1, −1, 1, 1, −1), (1, 1, −1, −1, 1, 1, −1, −1)}, {(−1, −1, −1, 1, 1, 1, 1, −1), (−1, 1, −1, −1, 1, −1, 1, 1), (−1, 1, 1, 1, 1, −1, −1, −1), (1, 1, −1, 1, −1, −1, 1, −1), (1, −1, −1, 1, 1, −1, −1, 1), (1, 1, −1, −1, 1, 1, −1, −1)}, {(−1, −1, −1, 1, 1, 1, 1, −1), (−1, 1, −1, −1, 1, −1, 1, 1), (1, −1, −1, −1, −1, 1, 1, 1), (1, 1, −1, 1, −1, −1, 1, −1), (−1, −1, 1, 1, −1, −1, 1, 1), (1, −1, −1, 1, 1, −1, −1, 1)}, {(−1, −1, −1, 1, 1, 1, 1, −1), (−1, 1, −1, −1, 1, −1, 1, 1), (1, −1, −1, −1, −1, 1, 1, 1), (1, 1, −1, 1, −1, −1, 1, −1), (−1, 1, 1, −1, −1, 1, 1, −1), (1, 1, −1, −1, 1, 1, −1, −1)}, {(−1, −1, −1, 1, 1, 1, 1, −1), (−1, 1, −1, −1, 1, −1, 1, 1), (1, −1, −1, −1, −1, 1, 1, 1), (1, 1, −1, 1, −1, −1, 1, −1), (1, −1, −1, 1, 1, −1, −1, 1), (1, 1, −1, −1, 1, 1, −1, −1)}, {(−1, −1, −1, 1, 1, 1, 1, −1), (−1, 1, 1, 1, 1, −1, −1, −1), (1, −1, 1, 1, −1, 1, −1, −1), (1, 1, −1, 1, −1, −1, 1, −1), (−1, −1, 1, 1, −1, −1, 1, 1), (−1, 1, 1, −1, −1, 1, 1, −1)}, {(−1, −1, −1, 1, 1, 1, 1, −1), (−1, 1, 1, 1, 1, −1, −1, −1), (1, −1, 1, 1, −1, 1, −1, −1), (1, 1, −1, 1, −1, −1, 1, −1), (−1, −1, 1, 1, −1, −1, 1, 1), (1, −1, −1, 1, 1, −1, −1, 1)}, {(−1, −1, −1, 1, 1, 1, 1, −1), (−1, 1, 1, 1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, −1, −1, 1, 1, −1, −1)}, {(−1, −1, −1, 1, 1, 1, 1, −1), (−1, 1, 1, 1, 1, −1, −1, −1), (1, −1, 1, 1, −1, 1, −1, −1), (1, 1, −1, 1, −1, −1, 1, −1), (1, −1, −1, 1, 1, −1, −1, 1), (1, 1, −1, −1, 1, 1, −1, −1)}, {(−1, −1, −1, 1, 1, 1, 1, −1), (1, −1, −1, −1, −1, 1, 1, 1), (1, −1, 1, 1, −1, 1, −1, −1), (1, 1, −1, 1, −1, −1, 1, −1), (−1, −1, 1, 1, −1, −1, 1, 1), (−1, 1, 1, −1, −1, 1, 1, −1)}, {(−1, −1, −1, 1, 1, 1, 1, −1), (1, −1, −1, −1, −1, 1, 1, 1), (1, −1, 1, 1, −1, 1, −1, −1), (1, 1, −1, 1, −1, −1, 1, −1), (−1, −1, 1, 1, −1, −1, 1, 1), (1, −1, −1, 1, 1, −1, −1, 1)}, {(−1, −1, −1, 1, 1, 1, 1, −1), (1, −1, −1, −1, −1, 1, 1, 1), (1, −1, 1, 1, −1, 1, −1, −1), (1, 1, −1, 1, −1, −1, 1, −1), (−1, 1, 1, −1, −1, 1, 1, −1), (1, 1, −1, −1, 1, 1, −1, −1)}, {(−1, −1, −1, 1, 1, 1, 1, −1), (1, −1, −1, −1, −1, 1, 1, 1), (1, −1, 1, 1, −1, 1, −1, −1), (1, 1, −1, 1, −1, −1, 1, −1), (1, −1, −1, 1, 1, −1, −1, 1), (1, 1, −1, −1, 1, 1, −1, −1)}, {(−1, −1, 1, −1, 1, 1, −1, 1), (−1, 1, −1, −1, 1, −1, 1, 1), (−1, 1, 1, 1, 1, −1, −1, −1), (1, 1, 1, −1, −1, −1, −1, 1), (−1, −1, 1, 1, −1, −1, 1, 1), (−1, 1, 1, −1, −1, 1, 1, −1)}, {(−1, −1, 1, −1, 1, 1, −1, 1), (−1, 1, −1, −1, 1, −1, 1, 1), (−1, 1, 1, 1, 1, −1, −1, −1), (1, 1, 1, −1, −1, −1, −1, 1), (−1, −1, 1, 1, −1, −1, 1, 1), (1, −1, −1, 1, 1, −1, −1, 1)}, {(−1, −1, 1, −1, 1, 1, −1, 1), (−1, 1, −1, −1, 1, −1, 1, 1), (−1, 1, 1, 1, 1, −1, −1, −1), (1, 1, 1, −1, −1, −1, −1, 1), (−1, 1, 1, −1, −1, 1, 1, −1), (1, 1, −1, −1, 1, 1, −1, −1)}, {(−1, −1, 1, −1, 1, 1, −1, 1), (−1, 1, −1, −1, 1, −1, 1, 1), (−1, 1, 1, 1, 1, −1, −1, −1), (1, 1, 1, −1, −1, −1, −1, 1), (1, −1, −1, 1, 1, −1, −1, 1), (1, 1, −1, −1, 1, 1, −1, −1)}, {(−1, −1, 1, −1, 1, 1, −1, 1), (−1, 1, −1, −1, 1, −1, 1, 1), (1, −1, −1, −1, −1, 1, 1, 1), (1, 1, 1, −1, −1, −1, −1, 1), (−1, −1, 1, 1, −1, −1, 1, 1), (−1, 1, 1, −1, −1, 1, 1, −1)}, {(−1, −1, 1, −1, 1, 1, −1, 1), (−1, 1, −1, −1, 1, −1, 1, 1), (1, −1, −1, −1, −1, 1, 1, 1), (1, 1, 1, −1, −1, −1, −1, 1), (−1, −1, 1, 1, −1, −1, 1, 1), (1, −1, −1, 1, 1, −1, −1, 1)}, {(−1, −1, 1, −1, 1, 1, −1, 1), (−1, 1, −1, −1, 1, −1, 1, 1), (1, −1, −1, −1, −1, 1, 1, 1), (1, 1, 1, −1, −1, −1, −1, 1), (−1, 1, 1, −1, −1, 1, 1, −1), (1, 1, −1, −1, 1, 1, −1, −1)}, {(−1, −1, 1, −1, 1, 1, −1, 1), (−1, 1, −1, −1, 1, −1, 1, 1), (1, −1, −1, −1, −1, 1, 1, 1), (1, 1, 1, −1, −1, −1, −1, 1), (1, −1, −1, 1, 1, −1, −1, 1), (1, 1, −1, −1, 1, 1, −1, −1)}, {(−1, −1, 1, −1, 1, 1, −1, 1), (−1, 1, 1, 1, 1, −1, −1, −1), (1, −1, 1, 1, −1, 1, −1, −1), (1, 1, 1, −1, −1, −1, −1, 1), (−1, −1, 1, 1, −1, −1, 1, 1), (−1, 1, 1, −1, −1, 1, 1, −1)}, {(−1, −1, 1, −1, 1, 1, −1, 1), (−1, 1, 1, 1, 1, −1, −1, −1), (1, −1, 1, 1, −1, 1, −1, −1), (1, 1, 1, −1, −1, −1, −1, 1), (−1, −1, 1, 1, −1, −1, 1, 1), (1, −1, −1, 1, 1, −1, −1, 1)}, {(−1, −1, 1, −1, 1, 1, −1, 1), (−1, 1, 1, 1, 1, −1, −1, −1), (1, −1, 1, 1, −1, 1, −1, −1), (1, 1, 1, −1, −1, −1, −1, 1), (−1, 1, 1, −1, −1, 1, 1, −1), (1, 1, −1, −1, 1, 1, −1, −1)}, {(−1, −1, 1, −1, 1, 1, −1, 1), (−1, 1, 1, 1, 1, −1, −1, −1), (1, −1, 1, 1, −1, 1, −1, −1), (1, 1, 1, −1, −1, −1, −1, 1), (1, −1, −1, 1, 1, −1, −1, 1), (1, 1, −1, −1, 1, 1, −1, −1)}, {(−1, −1, 1, −1, 1, 1, −1, 1), (1, −1, −1, −1, −1, 1, 1, 1), (1, −1, 1, 1, −1, 1, −1, −1), (1, 1, 1, −1, −1, −1, −1, 1), (−1, −1, 1, 1, −1, −1, 1, 1), (−1, 1, 1, −1, −1, 1, 1, −1)}, {(−1, −1, 1, −1, 1, 1, −1, 1), (1, −1, −1, −1, −1, 1, 1, 1), (1, −1, 1, 1, −1, 1, −1, −1), (1, 1, 1, −1, −1, −1, −1, 1), (−1, −1, 1, 1, −1, −1, 1, 1), (1, −1, −1, 1, 1, −1, −1, 1)}, {(−1, −1, 1, −1, 1, 1, −1, 1), (1, −1, −1, −1, −1, 1, 1, 1), (1, −1, 1, 1, −1, 1, −1, −1), (1, 1, 1, −1, −1, −1, −1, 1), (−1, 1, 1, −1, −1, 1, 1, −1), (1, 1, −1, −1, 1, 1, −1, −1)}, {(−1, −1, 1, −1, 1, 1, −1, 1), (1, −1, −1, −1, −1, 1, 1, 1), (1, −1, 1, 1, −1, 1, −1, −1), (1, 1, 1, −1, −1, −1, −1, 1), (1, −1, −1, 1, 1, −1, −1, 1), (1, 1, −1, −1, 1, 1, −1, −1)}, {(−1, −1, 1, 1, 1, 1, −1, −1), (−1, 1, −1, 1, 1, −1, 1, −1), (−1, 1, 1, −1, 1, −1, −1, 1), (1, 1, 1, 1, −1, −1, −1, −1), (−1, −1, 1, 1, −1, −1, 1, 1), (−1, 1, 1, −1, −1, 1, 1, −1)}, {(−1, −1, 1, 1, 1, 1, −1, −1), (−1, 1, −1, 1, 1, −1, 1, −1), (−1, 1, 1, −1, 1, −1, −1, 1), (1, 1, 1, 1, −1, −1, −1, −1), (−1, −1, 1, 1, −1, −1, 1, 1), (1, −1, −1, 1, 1, −1, −1, 1)}, {(−1, −1, 1, 1, 1, 1, −1, −1), (−1, 1, −1, 1, 1, −1, 1, −1), (−1, 1, 1, −1, 1, −1, −1, 1), (1, 1, 1, 1, −1, −1, −1, −1), (−1, 1, 1, −1, −1, 1, 1, −1), (1, 1, −1, −1, 1, 1, −1, −1)}, {(−1, −1, 1, 1, 1, 1, −1, −1), (−1, 1, −1, 1, 1, −1, 1, −1), (−1, 1, 1, −1, 1, −1, −1, 1), (1, 1, 1, 1, −1, −1, −1, −1), (1, −1, −1, 1, 1, −1, −1, 1), (1, 1, −1, −1, 1, 1, −1, −1)}, {(−1, −1, 1, 1, 1, 1, −1, −1), (−1, 1, −1, 1, 1, −1, 1, −1), (1, −1, −1, 1, −1, 1, 1, −1), (1, 1, 1, 1, −1, −1, −1, −1), (−1, −1, 1, 1, −1, −1, 1, 1), (−1, 1, 1, −1, −1, 1, 1, −1)}, {(−1, −1, 1, 1, 1, 1, −1, −1), (−1, 1, −1, 1, 1, −1, 1, −1), (1, −1, −1, 1, −1, 1, 1, −1), (1, 1, 1, 1, −1, −1, −1, −1), (−1, −1, 1, 1, −1, −1, 1, 1), (1, −1, −1, 1, 1, −1, −1, 1)}, {(−1, −1, 1, 1, 1, 1, −1, −1), (−1, 1, −1, 1, 1, −1, 1, −1), (1, −1, −1, 1, −1, 1, 1, −1), (1, 1, 1, 1, −1, −1, −1, −1), (−1, 1, 1, −1, −1, 1, 1, −1), (1, 1, −1, −1, 1, 1, −1, −1)}, {(−1, −1, 1, 1, 1, 1, −1, −1), (−1, 1, −1, 1, 1, −1, 1, −1), (1, −1, −1, 1, −1, 1, 1, −1), (1, 1, 1, 1, −1, −1, −1, −1), (1, −1, −1, 1, 1, −1, −1, 1), (1, 1, −1, −1, 1, 1, −1, −1)}, {(−1, −1, 1, 1, 1, 1, −1, −1), (−1, 1, 1, −1, 1, −1, −1, 1), (1, −1, 1, −1, −1, 1, −1, 1), (1, 1, 1, 1, −1, −1, −1, −1), (−1, −1, 1, 1, −1, −1, 1, 1), (−1, 1, 1, −1, −1, 1, 1, −1)}, {(−1, −1, 1, 1, 1, 1, −1, −1), (−1, 1, 1, −1, 1, −1, −1, 1), (1, −1, 1, −1, −1, 1, −1, 1), (1, 1, 1, 1, −1, −1, −1, −1), (−1, −1, 1, 1, −1, −1, 1, 1), (1, −1, −1, 1, 1, −1, −1, 1)}, {(−1, −1, 1, 1, 1, 1, −1, −1), (−1, 1, 1, −1, 1, −1, −1, 1), (1, −1, 1, −1, −1, 1, −1, 1), (1, 1, 1, 1, −1, −1, −1, −1), (−1, 1, 1, −1, −1, 1, 1, −1), (1, 1, −1, −1, 1, 1, −1, −1)}, {(−1, −1, 1, 1, 1, 1, −1, −1), (−1, 1, 1, −1, 1, −1, −1, 1), (1, −1, 1, −1, −1, 1, −1, 1), (1, 1, 1, 1, −1, −1, −1, −1), (1, −1, −1, 1, 1, −1, −1, 1), (1, 1, −1, −1, 1, 1, −1, −1)}, {(−1, −1, 1, 1, 1, 1, −1, −1), (1, −1, −1, 1, −1, 1, 1, −1), (1, −1, 1, −1, −1, 1, −1, 1), (1, 1, 1, 1, −1, −1, −1, −1), (−1, −1, 1, 1, −1, −1, 1, 1), (−1, 1, 1, −1, −1, 1, 1, −1)}, {(−1, −1, 1, 1, 1, 1, −1, −1), (1, −1, −1, 1, −1, 1, 1, −1), (1, −1, 1, −1, −1, 1, −1, 1), (1, 1, 1, 1, −1, −1, −1, −1), (−1, −1, 1, 1, −1, −1, 1, 1), (1, −1, −1, 1, 1, −1, −1, 1)}, {(−1, −1, 1, 1, 1, 1, −1, −1), (1, −1, −1, 1, −1, 1, 1, −1), (1, −1, 1, −1, −1, 1, −1, 1), (1, 1, 1, 1, −1, −1, −1, −1), (−1, 1, 1, −1, −1, 1, 1, −1), (1, 1, −1, −1, 1, 1, −1, −1)}, {(−1, −1, 1, 1, 1, 1, −1, −1), (1, −1, −1, 1, −1, 1, 1, −1), (1, −1, 1, −1, −1, 1, −1, 1), (1, 1, 1, 1, −1, −1, −1, −1), (1, −1, −1, 1, 1, −1, −1, 1), (1, 1, −1, −1, 1, 1, −1, −1)}, {(−1, 1, −1, −1, 1, −1, 1, 1), (−1, 1, 1, 1, 1, −1, −1, −1), (1, 1, −1, 1, −1, −1, 1, −1), (1, 1, 1, −1, −1, −1, −1, 1), (−1, −1, 1, 1, −1, −1, 1, 1), (−1, 1, 1, −1, −1, 1, 1, −1)}, {(−1, 1, −1, −1, 1, −1, 1, 1), (−1, 1, 1, 1, 1, −1, −1, −1), (1, 1, −1, 1, −1, −1, 1, −1), (1, 1, 1, −1, −1, −1, −1, 1), (−1, −1, 1, 1, −1, −1, 1, 1), (1, −1, −1, 1, 1, −1, −1, 1)}, {(−1, 1, −1, −1, 1, −1, 1, 1), (−1, 1, 1, 1, 1, −1, −1, −1), (1, 1, −1, 1, −1, −1, 1, −1), (1, 1, 1, −1, −1, −1, −1, 1), (−1, 1, 1, −1, −1, 1, 1, −1), (1, 1, −1, −1, 1, 1, −1, −1)}, {(−1, 1, −1, −1, 1, −1, 1, 1), (−1, 1, 1, 1, 1, −1, −1, −1), (1, 1, −1, 1, −1, −1, 1, −1), (1, 1, 1, −1, −1, −1, −1, 1), (1, −1, −1, 1, 1, −1, −1, 1), (1, 1, −1, −1, 1, 1, −1, −1)}, {(−1, 1, −1, −1, 1, −1, 1, 1), (1, −1, −1, −1, −1, 1, 1, 1), (1, 1, −1, 1, −1, −1, 1, −1), (1, 1, 1, −1, −1, −1, −1, 1), (−1, −1, 1, 1, −1, −1, 1, 1), (−1, 1, 1, −1, −1, 1, 1, −1)}, {(−1, 1, −1, −1, 1, −1, 1, 1), (1, −1, −1, −1, −1, 1, 1, 1), (1, 1, −1, 1, −1, −1, 1, −1), (1, 1, 1, −1, −1, −1, −1, 1), (−1, −1, 1, 1, −1, −1, 1, 1), (1, −1, −1, 1, 1, −1, −1, 1)}, {(−1, 1, −1, −1, 1, −1, 1, 1), (1, −1, −1, −1, −1, 1, 1, 1), (1, 1, −1, 1, −1, −1, 1, −1), (1, 1, 1, −1, −1, −1, −1, 1), (−1, 1, 1, −1, −1, 1, 1, −1), (1, 1, −1, −1, 1, 1, −1, −1)}, {(−1, 1, −1, −1, 1, −1, 1, 1), (1, −1, −1, −1, −1, 1, 1, 1), (1, 1, −1, 1, −1, −1, 1, −1), (1, 1, 1, −1, −1, −1, −1, 1), (1, −1, −1, 1, 1, −1, −1, 1), (1, 1, −1, −1, 1, 1, −1, −1)}, {(−1, 1, −1, 1, 1, −1, 1, −1), (−1, 1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (−1, 1, 1, −1, −1, 1, 1, −1)}, {(−1, 1, −1, 1, 1, −1, 1, −1), (−1, 1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, −1, −1, 1, 1, −1, −1, 1)}, {(−1, 1, −1, 1, 1, −1, 1, −1), (−1, 1, 1, −1, 1, −1, −1, 1), (1, 1, −1, −1, −1, −1, 1, 1), (1, 1, 1, 1, −1, −1, −1, −1), (−1, 1, 1, −1, −1, 1, 1, −1), (1, 1, −1, −1, 1, 1, −1, −1)}, {(−1, 1, −1, 1, 1, −1, 1, −1), (−1, 1, 1, −1, 1, −1, −1, 1), (1, 1, −1, −1, −1, −1, 1, 1), (1, 1, 1, 1, −1, −1, −1, −1), (1, −1, −1, 1, 1, −1, −1, 1), (1, 1, −1, −1, 1, 1, −1, −1)}, {(−1, 1, −1, 1, 1, −1, 1, −1), (1,−1, −1, 1, −1, 1, 1, −1), (1, 1, −1, −1, −1, −1, 1, 1), (1, 1, 1, 1, −1, −1, −1, −1), (−1, −1, 1, 1, −1, −1, 1, 1), (−1, 1, 1, −1, −1, 1, 1, −1)}, {(−1, 1, −1, 1, 1, −1, 1, −1), (1, −1, −1, 1, −1, 1, 1, −1), (1, 1, −1, −1, −1, −1, 1, 1), (1, 1, 1, 1, −1, −1, −1, −1), (−1, −1, 1, 1, −1, −1, 1, 1), (1, −1, −1, 1, 1, −1, −1, 1)}, {(−1, 1, −1, 1, 1, −1, 1, −1), (1, −1, −1, 1, −1, 1, 1, −1), (1, 1, −1, −1, −1, −1, 1, 1), (1, 1, 1, 1, −1, −1, −1, −1), (−1, 1, 1, −1, −1, 1, 1, −1), (1, 1, −1, −1, 1, 1, −1, −1)}, {(−1, 1, −1, 1, 1, −1, 1, −1), (1, −1, −1, 1, −1, 1, 1, −1), (1, 1, −1, −1, −1, −1, 1, 1), (1, 1, 1, 1, −1, −1, −1, −1), (1, −1, −1, 1, 1, −1, −1, 1), (1, 1, −1, −1, 1, 1, −1, −1)}, {(−1, 1, 1, −1, 1, −1, −1, 1), (1, −1, 1, −1, −1, 1, −1, 1), (1, 1, −1, −1, −1, −1, 1, 1), (1, 1, 1, 1, −1, −1, −1, −1), (−1, −1, 1, 1, −1, −1, 1, 1), (−1, 1, 1, −1, −1, 1, 1, −1)}, {(−1, 1, 1, −1, 1, −1, −1, 1), (1, −1, 1, −1, −1, 1, −1, 1), (1, 1, −1, −1, −1, −1, 1, 1), (1, 1, 1, 1, −1, −1, −1, −1), (−1, −1, 1, 1, −1, −1, 1, 1), (1, −1, −1, 1, 1, −1, −1, 1)}, {(−1, 1, 1, −1, 1, −1, −1, 1), (1, −1, 1, −1, −1, 1, −1, 1), (1, 1, −1, −1, −1, −1, 1, 1), (1, 1, 1, 1, −1, −1, −1, −1), (−1, 1, 1, −1, −1, 1, 1, −1), (1, 1, −1, −1, 1, 1, −1, −1)}, {(−1, 1, 1, −1, 1, −1, −1, 1), (1, −1, 1, −1, −1, 1, −1, 1), (1, 1, −1, −1, −1, −1, 1, 1), (1, 1, 1, 1, −1, −1, −1, −1), (1, −1, −1, 1, 1, −1, −1, 1), (1, 1, −1, −1, 1, 1, −1, −1)}, {(−1, 1, 1, 1, 1, −1, −1, −1), (1, −1, 1, 1, −1, 1, −1, −1), (1, 1, −1, 1, −1, −1, 1, −1), (1, 1, 1, −1, −1, −1, −1, 1), (−1, −1, 1, 1, −1, −1, 1, 1), (−1, 1, 1, −1, −1, 1, 1, −1)}, {(−1, 1, 1, 1, 1, −1, −1, −1), (1, −1, 1, 1, −1, 1, −1, −1), (1, 1, −1, 1, −1, −1, 1, −1), (1, 1, 1, −1, −1, −1, −1, 1), (−1, −1, 1, 1, −1, −1, 1, 1), (1, −1, −1, 1, 1, −1, −1, 1)}, {(−1, 1, 1, 1, 1, −1, −1, −1), (1, −1, 1, 1, −1, 1, −1, −1), (1, 1, −1, 1, −1, −1, 1, −1), (1, 1, 1, −1, −1, −1, −1, 1), (−1, 1, 1, −1, −1, 1, 1, −1), (1, 1, −1, −1, 1, 1, −1, −1)}, {(−1, 1, 1, 1, 1, −1, −1, −1), (1, −1, 1, 1, −1, 1, −1, −1), (1, 1, −1, 1, −1, −1, 1, −1), (1, 1, 1, −1, −1, −1, −1, 1), (1, −1, −1, 1, 1, −1, −1, 1), (1, 1, −1, −1, 1, 1, −1, −1)}, {(1, −1, −1, −1, −1, 1, 1, 1), (1, −1, 1, 1, −1, 1, −1, −1), (1, 1, −1, 1, −1, −1, 1, −1), (1, 1, 1, −1, −1, −1, −1, 1), (−1, −1, 1, 1, −1, −1, 1, 1), (−1, 1, 1, −1, −1, 1, 1, −1)}, 1, −1, −1, −1, 1, 1, 1), (1, −1, 1, 1, −1, 1, −1, −1), (1, 1, −1, 1, −1, −1, 1, −1), (1, 1, 1, −1, −1, −1, −1, 1), (−1, −1, 1, 1, −1, −1, 1, 1), (1, −1, −1, 1, 1, −1, −1, 1)}, {(1, −1, −1, −1, −1, 1, 1, 1), (1, −1, 1, 1, −1, 1, −1, −1), (1, 1, −1, 1, −1, −1, 1, −1), (1, 1, 1, −1, −1, −1, −1, 1), (−1, 1, 1, −1, −1, 1, 1, −1), (1, 1, −1, −1, 1, 1, −1, −1)}, {(1, −1, −1, −1, −1, 1, 1, 1), (1, −1, 1, 1, −1, 1, −1, −1), (1, 1, −1, 1, −1, −1, 1, −1), (1, 1, 1, −1, −1, −1, −1, 1), (1, −1, −1, 1, 1, −1, −1, 1), (1, 1, −1, −1, 1, 1, −1, −1)}, {(1, −1, −1, 1, −1, 1, 1, −1), (1, −1, 1, −1, −1, 1, −1, 1), (1, 1, −1, −1, −1, −1, 1, 1), (1, 1, 1, 1, −1, −1, −1, −1), (−1, −1, 1, 1, −1, −1, 1, 1), (−1, 1, 1, −1, −1, 1, 1, −1)}, {(1, −1, −1, 1, −1, 1, 1, −1), (1, −1, 1, −1, −1, 1, −1, 1), (1, 1, −1, −1, −1, −1, 1, 1), (1, 1, 1, 1, −1, −1, −1, −1), (−1, −1, 1, 1, −1, −1, 1, 1), (1, −1, −1, 1, 1, −1, −1, 1)}, {(1, −1, −1, 1, −1, 1, 1, −1), (1, −1, 1, −1, −1, 1, −1, 1), (1, 1, −1, −1, −1, −1, 1, 1), (1, 1, 1, 1, −1, −1, −1, −1), (−1, 1, 1, −1, −1, 1, 1, −1), (1, 1, −1, −1, 1, 1, −1, −1)}, {(1, −1, −1, 1, −1, 1, 1, −1), (1, −1, 1, −1, −1, 1, −1, 1), (1, 1, −1, −1, −1, −1, 1, 1), (1, 1, 1, 1, −1, −1, −1, −1), (1, −1, −1, 1, 1, −1, −1, 1), (1, 1, −1, −1, 1, 1, −1, −1)} wherein, a set of values between a pair of round brackets represents the code and the plurality of codes between a pair of braces represents the set of codes.

31. The method of claim 23, wherein the orthogonal codes are arranged as a set of codes in following code list: {(−1, −1, −1, 1, 1, −1, 1, 1), (−1, −1, 1, −1, −1, 1, 1, 1), (−1, 1, −1, −1, 1, 1, 1, −1), (−1, 1, 1, 1, −1, −1, 1, −1), (−1, −1, 1, 1, 1, 1,−1, −1), (−1, 1, 1, −1, 1, −1, −1, 1)}, {(−1, −1, −1, 1, 1, −1, 1, 1), (−1, −1, 1, −1, −1, 1, 1, 1), (−1, 1, −1, −1, 1, 1, 1, −1), (−1, 1, 1, 1, −1, −1, 1, −1), (−1, −1, 1, 1, 1, 1, −1, −1), (1, −1, −1, 1, −1, 1, 1, −1)}, {(−1, −1, −1, 1, 1, −1, 1, 1), (−1, −1, 1, −1,−1, 1, 1, 1), (−1, 1, −1, −1, 1, 1, 1, −1), (−1, 1, 1, 1, −1, −1, 1, −1), (−1, 1, 1, −1, 1, −1, −1, 1), (1, 1, −1, −1, −1, −1, 1, 1)}, {(−1,−1, −1, 1, 1, −1, 1, 1), (−1, −1, 1, −1, −1, 1, 1, 1), (−1, 1, −1, −1, 1, 1, 1, −1), (−1, 1, 1, 1, −1, −1, 1, −1), (1, −1, −1, 1, −1, 1, 1,−1), (1, 1, −1, −1, −1, −1, 1, 1)}, {(−1, −1, −1, 1, 1, −1, 1, 1), (−1, −1, 1, −1, −1, 1, 1, 1), (−1, 1, −1, −1, 1, 1, 1, −1), (1, −1, −1,−1, 1, 1, −1, 1), (−1, −1, 1, 1, 1, 1, −1, −1), (−1, 1, 1, −1, 1, −1, −1, 1)}, {(−1, −1, −1, 1, 1, −1, 1, 1), (−1, −1, 1, −1, −1, 1, 1, 1), (−1, 1, −1, −1, 1, 1, 1, −1), (1, −1, −1, −1, 1, 1, −1, 1), (−1, −1, 1, 1, 1, 1, −1, −1), (1, −1, −1, 1, −1, 1, 1, −1)}, {(−1, −1, −1, 1, 1,−1, 1, 1), (−1, −1, 1, −1, −1, 1, 1, 1), (−1, 1, −1, −1, 1, 1, 1, −1), (1, −1, −1, −1, 1, 1, −1, 1), (−1, 1, 1, −1, 1, −1, −1, 1), (1, 1, −1, −1,−1, −1, 1, 1)}, {(−1, −1, −1, 1, 1, −1, 1, 1), (−1, −1, 1, −1, −1, 1, 1, 1), (−1, 1, −1, −1, 1, 1, 1, −1), (1, −1, −1, −1, 1, 1, −1, 1), (1,−1, −1, 1, −1, 1, 1, −1), (1, 1, −1, −1, −1, −1, 1, 1)}, {(−1, −1, −1, 1, 1, −1, 1, 1), (−1, −1, 1, −1, −1, 1, 1, 1), (−1, 1, 1, 1, −1, −1, 1,−1), (1, −1, 1, 1, −1, −1, −1, 1), (−1, −1, 1, 1, 1, 1, −1, −1), (−1, 1, 1, −1, 1, −1, −1, 1)}, {(−1, −1, −1, 1, 1, −1, 1, 1), (−1, −1, 1, −1,−1, 1, 1, 1), (−1, 1, 1, 1, −1, −1, 1, −1), (1, −1, 1, 1, −1, −1, −1, 1), (−1, −1, 1, 1, 1, 1, −1, −1), (1, −1, −1, 1, −1, 1, 1, −1)}, {(−1,−1, −1, 1, 1, −1, 1, 1), (−1, −1, 1, −1, −1, 1, 1, 1), (−1, 1, 1, 1, −1, −1, 1, −1), (1, −1, 1, 1, −1, −1, −1, 1), (−1, 1, 1, −1, 1, −1,−1, 1), (1, 1, −1, −1, −1, −1, 1, 1)}, {(−1, −1, −1, 1, 1, −1, 1, 1), (−1, −1, 1, −1, −1, 1, 1, 1), (−1, 1, 1, 1, −1, −1, 1, −1), (1,−1, 1, 1, −1, −1, −1, 1), (1, −1, −1, 1, −1, 1, 1, −1), (1, 1, −1, −1, −1, −1, 1, 1)}, {(−1, −1, −1, 1, 1, −1, 1, 1), (−1, −1, 1, −1,−1, 1, 1, 1), (1, −1, −1, −1, 1, 1, −1, 1), (1, −1, 1, 1, −1, −1, −1, 1), (−1, −1, 1, 1, 1, 1, −1, −1), (−1, 1, 1, −1, 1, −1, −1, 1)}, {(−1,−1, −1, 1, 1, −1, 1, 1), (−1, −1, 1, −1, −1, 1, 1, 1), (1, −1, −1, −1, 1, 1, −1, 1), (1, −1, 1, 1, −1, −1, −1, 1), (−1, −1, 1, 1, 1, 1, −1,−1), (1, −1, −1, 1, −1, 1, 1, −1)}, {(−1, −1, −1, 1, 1, −1, 1, 1), (−1, −1, 1, −1, −1, 1, 1, 1), (1, −1, −1, −1, 1, 1, −1, 1), (1, −1, 1, 1,−1, −1, −1, 1), (−1, 1, 1, −1, 1, −1, −1, 1), (1, 1, −1, −1, −1, −1, 1, 1)}, {(−1, −1, −1, 1, 1, −1, 1, 1), (−1, −1, 1, −1, −1, 1, 1, 1), (1,−1, −1, −1, 1, 1, −1, 1), (1, −1, 1, −1, −1, 1, −1, 1), (1, −1, −1, 1, −1, 1, 1, −1), (1, 1, −1, −1, −1, −1, 1, 1)}, {(−1, −1, −1, 1, 1,−1, 1, 1), (−1, −1, 1, 1, −1, 1, 1, −1), (−1, 1, −1, −1, 1, 1, 1, −1), (−1, 1, 1, −1, −1, −1, 1, 1), (−1, −1, 1, −1, 1, 1, −1, 1), (−1, 1, 1, 1, 1, −1, −1, −1)}, {(−1, −1, −1, 1, 1, −1, 1, 1), (−1, −1, 1, 1, −1, 1, 1, −1), (−1, 1, −1, −1, 1, 1, 1, −1), (−1, 1, 1, −1, −1,−1, 1, 1), (−1, −1, 1, −1, 1, 1, −1, 1), (1, −1, −1, −1, −1, 1, 1, 1)}, {(−1, −1, −1, 1, 1, −1, 1, 1), (−1, −1, 1, 1, −1, 1, 1, −1), (−1, 1,−1, −1, 1, 1, 1, −1), (−1, 1, 1, −1, −1, −1, 1, 1), (−1, 1, 1, 1, 1, −1, −1, −1), (1, 1, −1, 1, −1, −1, 1, −1)}, {(−1, −1, −1, 1, 1,−1, 1, 1), (−1, −1, 1, 1, −1, 1, 1, −1), (−1, 1, −1, −1, 1, 1, 1, −1), (−1, 1, 1, −1, −1, −1, 1, 1), (1, −1, −1, −1, −1, 1, 1, 1), (1, 1, −1, 1,−1, −1, 1, −1)}, {(−1, −1, −1, 1, 1, −1, 1, 1), (−1, −1, 1, 1, −1, 1, 1, −1), (−1, 1, −1, −1, 1, 1, 1, −1), (1, −1, −1, 1, 1, 1, −1, −1), (−1,−1, 1, −1, 1, 1, −1, 1), (−1, 1, 1, 1, 1, −1, −1, −1)}, {(−1, −1, −1, 1, 1, −1, 1, 1), (−1, −1, 1, 1,−1, 1, 1, −1), (−1, 1, −1, −1, 1, 1, 1, −1), (1, −1, −1, 1, 1, 1, −1, −1), (−1, 1, 1, 1, 1, −1, −1, −1), (1, 1, −1, 1, −1, −1, 1, −1)}, {(−1,−1, −1, 1, 1, −1, 1, 1), (−1, −1, 1, 1, −1, 1, 1, −1), (−1, 1, −1, −1, 1, 1, 1, −1), (1, −1, −1, 1, 1, 1, −1, −1), (1, −1, −1, −1,−1, 1, 1, 1), (1, 1, −1, 1, −1, −1, 1, −1) }, {(−1, −1, −1, 1, 1, −1, 1, 1), (−1, −1, 1, 1, −1, 1, 1, −1), (−1, 1, 1, −1, −1, −1, 1, 1), (1,−1, 1, 1, −1, −1, −1, 1), (−1, −1, 1, −1, 1, 1, −1, 1), (−1, 1, 1, 1, 1, −1, −1, −1)}, {(−1, −1, −1, 1, 1, −1, 1, 1), (−1, −1, 1, 1, −1, 1, 1,−1), (−1, 1, 1, −1, −1, −1, 1, 1), (1, −1, 1, 1, −1, −1, −1, 1), (−1, −1, 1, −1, 1, 1, −1, 1), (1, −1, −1, −1, −1, 1, 1, 1)}, {(−1, −1,−1, 1, 1, −1, 1, 1), (−1, −1, 1, 1, −1, 1, 1, −1), (−1, 1, 1, −1, −1, −1, 1, 1), (1, −1, 1, 1, −1, −1, −1, 1), (−1, 1, 1, 1, 1, −1, −1,−1), (1, 1, −1, 1, −1, −1, 1, −1)}, {(−1, −1, −1, 1, 1, −1, 1, 1), (−1, −1, 1, 1, −1, 1, 1, −1), (−1, 1, 1, −1, −1, −1, 1, 1), (1, −1, 1, 1,−1, −1, −1, 1), (1, −1, −1, −1, −1, 1, 1, 1), (1, 1, −1, 1, −1, −1, 1, −1)}, {(−1, −1, −1, 1, 1, −1, 1, 1), (−1, −1, 1, 1, −1, 1, 1, −1), (1,−1, −1, 1, 1, 1, −1, −1), (1, −1, 1, 1, −1, −1, −1, 1), (−1, −1, 1, −1, 1, 1, −1, 1), (−1, 1, 1, 1, 1, −1, −1, −1)}, {(−1, −1, −1, 1, 1,−1, 1, 1), (−1, −1, 1, 1, −1, 1, 1, −1), (1, −1, −1, 1, 1, 1, −1, −1), (1, −1, 1, 1, −1, −1, −1, 1), (−1, −1, 1, −1, 1, 1, −1, 1), (1, −1, −1,−1, −1, 1, 1, 1)}, {(−1, −1, −1, 1, 1, −1, 1, 1), (−1, −1, 1, 1, −1, 1, 1, −1), (1, −1, −1, 1, 1, 1, −1, −1), (1, −1, 1, 1, −1, −1, −1, 1), (−1, 1, 1, 1, 1, −1, −1, −1), (1, 1, −1, 1, −1, −1, 1, −1)}, {(−1, −1, −1, 1, 1, −1, 1, 1), (−1, −1, 1, 1, −1, 1, 1, −1), (1, −1, −1, 1, 1, 1,−1, −1), (1, −1, 1, 1, −1, −1, −1, 1), (1, −1, −1, −1, −1, 1, 1, 1), (1, 1, −1, 1, −1, −1, 1, −1)}, {(−1, −1, −1, 1, 1, −1, 1, 1), (−1, 1, −1,−1, 1, 1, 1, −1), (−1, 1, 1, −1, −1, −1, 1, 1), (1, 1, −1, −1, 1, −1, −1, 1), (−1, −1, 1, −1, 1, 1, −1, 1), (−1, 1, 1, 1, 1, −1, −1, −1)}, {(−1, −1, −1, 1, 1, −1, 1, 1), (−1, 1, −1, −1, 1, 1, 1, −1), (−1, 1, 1, −1, −1, −1, 1, 1), (1, 1, −1, −1, 1, −1, −1, 1), (−1, −1, 1, −1, 1, 1,−1, 1), (1, −1, −1, −1, −1, 1, 1, 1)}, {(−1, −1, −1, 1, 1, −1, 1, 1), (−1, 1, −1, −1, 1, 1, 1, −1), (−1, 1, 1, −1, −1, −1, 1, 1), (1, 1, −1,−1, 1, −1, −1, 1), (−1, 1, 1, 1, 1, −1, −1, −1), (1, 1, −1, 1, −1, −1, 1, −1)}, {(−1, −1, −1, 1, 1, −1, 1, 1), (−1, 1, −1, −1, 1, 1, 1, −1), (−1, 1, 1, −1, −1, −1, 1, 1), (1, 1, −1, −1, 1, −1, −1, 1), (1, −1, −1, −1, −1, 1, 1, 1), (1, 1, −1, 1, −1, −1, 1, −1)}, {(−1, −1, −1, 1, 1,−1, 1, 1), (−1, 1, −1, −1, 1, 1, 1, −1), (−1, 1, 1, 1, −1, −1, 1, −1), (1, 1, −1, 1, 1, −1, −1, −1), (−1, −1, 1, 1, 1, 1, −1, −1), (−1, 1, 1,−1, 1, −1, −1, 1)}, {(−1, −1, −1, 1, 1, −1, 1, 1), (−1, 1, −1, −1, 1, 1, 1, −1), (−1, 1, 1, 1, −1, −1, 1, −1), (1, 1, −1, 1, 1, −1, −1, −1), (−1, −1, 1, 1, 1, 1, −1, −1), (1, −1, −1, 1, −1, 1, 1, −1)}, {(−1, −1, −1, 1, 1, −1, 1, 1), (−1, 1, −1, −1, 1, 1, 1, −1), (−1, 1, 1, 1, −1,−1, 1, −1), (1, 1, −1, 1, 1, −1, −1, −1), (−1, 1, 1, −1, 1, −1, −1, 1), (1, 1, −1, −1, −1, −1, 1, 1)}, {(−1, −1, −1, 1, 1, −1, 1, 1), (−1, 1,−1, −1, 1, 1, 1, −1), (−1, 1, 1, 1, −1, −1, 1, −1), (1, 1, −1, 1, 1, −1, −1, −1), (1, −1, −1, 1, −1, 1, 1, −1), (1, 1, −1, −1, −1, −1, 1, 1)}, {(−1, −1, −1, 1, 1, −1, 1, 1), (−1, 1, −1, −1, 1, 1, 1, −1), (1, −1, −1, −1, 1, 1, −1, 1), (1, 1, −1, 1, 1, −1, −1, −1), (−1, −1, 1, 1, 1, 1,−1, −1), (−1, 1, 1, −1, 1, −1, −1, 1)}, {(−1, −1, −1, 1, 1, −1, 1, 1), (−1, 1, −1, −1, 1, 1, 1, −1), (1, −1, −1, −1, 1, 1, −1, 1), (1, 1,−1, 1, 1, −1, −1, −1), (−1, −1, 1, 1, 1, 1, −1, −1), (1, −1, −1, 1, −1, 1, 1, −1)}, {(−1, −1, −1, 1, 1, −1, 1, 1), (−1, 1, −1, −1, 1, 1, 1,−1), (1, −1, −1, −1, 1, 1, −1, 1), (1, 1, −1, 1, 1, −1, −1, −1), (−1, 1, 1, −1, 1, −1, −1, 1), (1, 1, −1, −1, −1, −1, 1, 1)}, {(−1, −1,−1, 1, 1, −1, 1, 1), (−1, 1, −1, −1, 1, 1, 1, −1), (1, −1, −1, −1, 1, 1, −1, 1), (1, 1, −1, 1, 1, −1, −1, −1), (1, −1, −1, 1, −1, 1, 1,−1), (1, 1, −1, −1, −1, −1, 1, 1)}, {(−1, −1, −1, 1, 1, −1, 1, 1), (−1, 1, −1, −1, 1, 1, 1, −1), (1, −1, −1, 1, 1, 1, −1, −1), (1, 1, −1,−1, 1, −1, −1, 1), (−1, −1, 1, −1, 1, 1, −1, 1), (−1, 1, 1, 1, 1, −1, −1, −1)}, {(−1, −1, −1, 1, 1, −1, 1, 1), (−1, 1, −1, −1, 1, 1, 1,−1), (1, −1, −1, 1, 1, 1, −1, −1), (1, 1, −1, −1, 1, −1, −1, 1), (−1, −1, 1, −1, 1, 1, −1, 1), (1, −1, −1, −1, −1, 1, 1, 1)}, {(−1, −1,−1, 1, 1, −1, 1, 1), (−1, 1, −1, −1, 1, 1, 1, −1), (1, −1, −1, 1, 1, 1, −1, −1), (1, 1, −1, −1, 1, −1, −1, 1), (−1, 1, 1, 1, 1, −1, −1,−1), (1, 1, −1, 1, −1, −1, 1, −1)}, {(−1, −1, −1, 1, 1, −1, 1, 1), (−1, 1, −1, −1, 1, 1, 1, −1), (1, −1, −1, 1, 1, 1, −1, −1), (1, 1, −1,−1, 1, −1, −1, 1), (1, −1, −1, −1, −1, 1, 1, 1), (1, 1, −1, 1, −1, −1, 1, −1)}, {(−1, −1, −1, 1, 1, −1, 1, 1), (−1, 1, 1, −1, −1,−1, 1, 1), (1, −1, 1, 1, −1, −1, −1, 1), (1, 1, −1, −1, 1, −1, −1, 1), (−1, −1, 1, −1, 1, 1, −1, 1), (−1, 1, 1, 1, 1, −1, −1, −1)}, {(−1, −1,−1, 1, 1, −1, 1, 1), (−1, 1, 1, −1, −1, −1, 1, 1), (1, −1, 1, 1, −1, −1, −1, 1), (1, 1, −1, −1, 1, −1, −1, 1), (−1, −1, 1, −1, 1, 1, −1, 1), (1,−1, −1, −1, −1, 1, 1, 1)}, {(−1, −1, −1, 1, 1, −1, 1, 1), (−1, 1, 1, −1, −1, −1, 1, 1), (1, −1, 1, 1, −1, −1, −1, 1), (1, 1, −1, −1, 1, −1,−1, 1), (−1, 1, 1, 1, 1, −1, −1, −1), (1, 1, −1, 1, −1, −1, 1, −1)}, {(−1, −1, −1, 1, 1, −1, 1, 1), (−1, 1, 1, −1, −1, −1, 1, 1), (1,−1, 1, 1, −1, −1, −1, 1), (1, 1, −1, −1, 1, −1, −1, 1), (1, −1, −1, −1, −1, 1, 1, 1), (1, 1, −1, 1, −1, −1, 1, −1)}, {(−1, −1, −1, 1, 1,−1, 1, 1), (−1, 1, 1, 1, −1, −1, 1, −1), (1, −1, 1, 1, −1, −1, −1, 1), (1, 1, −1, 1, 1, −1, −1, −1), (−1, −1, 1, 1, 1, 1, −1, −1), (−1, 1, 1,−1, 1, −1, −1, 1)}, {(−1, −1, −1, 1, 1, −1, 1, 1), (−1, 1, 1, 1, −1, −1, 1, −1), (1, −1, 1, 1, −1, −1, −1, 1), (1, 1, −1, 1, 1, −1, −1, −1), (−1, −1, 1, 1, 1, 1, −1, −1), (1, −1, −1, 1, −1, 1, 1, −1)}, {(−1, −1, −1, 1, 1, −1, 1, 1), (−1, 1, 1, 1, −1, −1, 1, −1), (1, −1, 1, 1, −1, −1,−1, 1), (1, 1, −1, 1, 1, −1, −1, −1), (−1, 1, 1, −1, 1, −1, −1, 1), (1, 1, −1, −1, −1, −1, 1, 1)}, {(−1, −1, −1, 1, 1, −1, 1, 1), (−1, 1, 1, 1, −1, −1, 1, −1), (1, −1, 1, 1, −1, −1, −1, 1), (1, 1, −1, 1, 1, −1, −1, −1), (1, −1, −1, 1, −1, 1, 1, −1), (1, 1, −1, −1, −1,−1, 1, 1)}, {(−1, −1, −1, 1, 1, −1, 1, 1), (1, −1, −1, −1, 1, 1, −1, 1), (1, −1, 1, 1, −1, −1, −1, 1), (1, 1, −1, 1, 1, −1, −1, −1), (−1,−1, 1, 1, 1, 1, −1, −1), (−1, 1, 1, −1, 1, −1, −1, 1)}, {(−1, −1, −1, 1, 1, −1, 1, 1), (1, −1, −1, −1, 1, 1, −1, 1), (1, −1, 1, 1, −1, −1,−1, 1), (1, 1, −1, 1, 1, −1, −1, −1), (−1, −1, 1, 1, 1, 1, −1, −1), (1, −1, −1, 1, −1, 1, 1, −1)}, {(−1, −1, −1, 1, 1, −1, 1, 1), (1, −1, −1,−1, 1, 1, −1, 1), (1, −1, 1, 1, −1, −1, −1, 1), (1, 1, −1, 1, 1, −1, −1, −1), (−1, 1, 1, −1, 1, −1, −1, 1), (1, 1, −1, −1, −1, −1, 1, 1)}, {(−1, −1, −1, 1, 1, −1, 1, 1), (1, −1, −1, −1, 1, 1, −1, 1), (1, −1, 1, 1, −1, −1, −1, 1), (1, 1, −1, 1, 1, −1, −1, −1), (1, −1, −1, 1, −1, 1, 1,−1), (1, 1, −1, −1, −1, −1, 1, 1)}, {(−1, −1, −1, 1, 1, −1, 1, 1), (1, −1, −1, 1, 1, 1, −1, −1), (1, −1, 1, 1, −1, −1, −1, 1), (1, 1, −1,−1, 1, −1, −1, 1), (−1, −1, 1, −1, 1, 1, −1, 1), (−1, 1, 1, 1, 1, −1, −1, −1)}, {(−1, −1, −1, 1, 1, −1, 1, 1), (1, −1, −1, 1, 1, 1, −1,−1), (1, −1, 1, 1, −1, −1, −1, 1), (1, 1, −1, −1, 1, −1, −1, 1), (−1, −1, 1, −1, 1, 1, −1, 1), (1, −1, −1, −1, −1, 1, 1, 1)}, {(−1, −1,−1, 1, 1, −1, 1, 1), (1, −1, −1, 1, 1, 1, −1, −1), (1, −1, 1, 1, −1, −1, −1, 1), (1, 1, −1, −1, 1, −1, −1, 1), (−1, 1, 1, 1, 1, −1, −1,−1), (1, 1, −1, 1, −1, −1, 1, −1)}, {(−1, −1, −1, 1, 1, −1, 1, 1), (1, −1, −1, 1, 1, 1, −1, −1), (1, −1, 1, 1, −1, −1, −1, 1), (1, 1, −1,−1, 1, −1, −1, 1), (1, −1, −1, −1, −1, 1, 1, 1), (1, 1, −1, 1, −1, −1, 1, −1)}, {(−1, −1, 1, −1, −1, 1, 1, 1), (−1, −1, 1, 1, 1, −1, −1, 1), (−1, 1, 1, −1, 1, 1, −1, −1), (−1, 1, 1, 1, −1, −1, 1, −1), (−1, −1, −1, 1, 1, 1, 1, −1), (−1, 1, −1, −1, 1, −1, 1, 1)}, {(−1, −1, 1, −1,−1, 1, 1, 1), (−1, −1, 1, 1, 1, −1, −1, 1), (−1, 1, 1, −1, 1, 1, −1, −1), (−1, 1, 1, 1, −1, −1, 1, −1), (−1, −1, −1, 1, 1, 1, 1, −1), (1,−1, 1, 1, −1, 1, −1, −1)}, {(−1, −1, 1, −1, −1, 1, 1, 1), (−1, −1, 1, 1, 1, −1, −1, 1), (−1, 1, 1, −1, 1, 1, −1, −1), (−1, 1, 1, 1, −1, −1, 1,−1), (−1, 1, −1, −1, 1, −1, 1, 1), (1, 1, 1, −1, −1, −1, −1, 1)}, {(−1, −1, 1, −1, −1, 1, 1, 1), (−1, −1, 1, 1, 1, −1, −1, 1), (−1, 1, 1,−1, 1, 1, −1, −1), (−1, 1, 1, 1, −1, −1, 1, −1), (1, −1, 1, 1, −1, 1, −1, −1), (1, 1, 1, −1, −1, −1, −1, 1)}, {(−1, −1, 1, −1, −1, 1, 1, 1), (−1, −1, 1, 1, 1, −1, −1, 1), (−1, 1, 1, −1, 1, 1, −1, −1), (1, −1, −1, −1, 1, 1, −1, 1), (−1, −1, −1, 1, 1, 1, 1, −1), (−1, 1, −1, −1, 1,−1, 1, 1)}, {(−1, −1, 1, −1, −1, 1, 1, 1), (−1, −1, 1, 1, 1, −1, −1, 1), (−1, 1, 1, −1, 1, 1, −1, −1), (1, −1, −1, −1, 1, 1, −1, 1), (−1, −1,−1, 1, 1, 1, 1, −1), (1, −1, 1, 1, −1, 1, −1, −1)}, {(−1, −1, 1, −1, −1, 1, 1, 1), (−1, −1, 1, 1, 1, −1, −1, 1), (−1, 1, 1, −1, 1, 1, −1,−1), (1, −1, −1, −1, 1, 1, −1, 1), (−1, 1, −1, −1, 1, −1, 1, 1), (1, 1, 1, −1, −1, −1, −1, 1)}, {(−1, −1, 1, −1, −1, 1, 1, 1), (−1,−1, 1, 1, 1, −1, −1, 1), (−1, 1, 1, −1, 1, 1, −1, −1), (1, −1, −1, −1, 1, 1, −1, 1), (1, −1, 1, 1, −1, 1, −1, −1), (1, 1, 1, −1, −1, −1, −1, 1)}, {(−1, −1, 1, −1, −1, 1, 1, 1), (−1, −1, 1, 1, 1, −1, −1, 1), (−1, 1, 1, 1, −1, −1, 1, −1), (1, −1, −1, 1, −1, −1, 1, 1), (−1, −1,−1, 1, 1, 1, 1, −1), (−1, 1, −1, −1, 1, −1, 1, 1)}, {(−1, −1, 1, −1, −1, 1, 1, 1), (−1, −1, 1, 1, 1, −1, −1, 1), (−1, 1, 1, 1, −1, −1, 1,−1), (1, −1, −1, 1, −1, −1, 1, 1), (−1, −1, −1, 1, 1, 1, 1, −1), (1, −1, 1, 1, −1, 1, −1, −1)}, {(−1, −1, 1, −1, −1, 1, 1, 1), (−1,−1, 1, 1, 1, −1, −1, 1), (−1, 1, 1, 1, −1, −1, 1, −1), (1, −1, −1, 1, −1, −1, 1, 1), (−1, 1, −1, −1, 1, −1, 1, 1), (1, 1, 1, −1, −1, −1, −1, 1)}, {(−1, −1, 1, −1, −1, 1, 1, 1), (−1, −1, 1, 1, 1, −1, −1, 1), (−1, 1, 1, 1, −1, −1, 1, −1), (1, −1, −1, 1, −1, −1, 1, 1), (1, −1, 1, 1, −1, 1,−1, −1), (1, 1, 1, −1, −1, −1, −1, 1)}, {(−1, −1, 1, −1, −1, 1, 1, 1), (−1, −1, 1, 1, 1, −1, −1, 1), (1, −1, −1, −1, 1, 1, −1, 1), (1, −1,−1, 1, −1, −1, 1, 1), (−1, −1, −1, 1, 1, 1, 1, −1), (−1, 1, −1, −1, 1, −1, 1, 1)}, {(−1, −1, 1, −1, −1, 1, 1, 1), (−1, −1, 1, 1, 1, −1,−1, 1), (1, −1, −1, −1, 1, 1, −1, 1), (1, −1, −1, 1, −1, −1, 1, 1), (−1, −1, −1, 1, 1, 1, 1, −1), (1, −1, 1, 1, −1, 1, −1, −1)}, {(−1, −1, 1,−1, −1, 1, 1, 1), (−1, −1, 1, 1, 1, −1, −1, 1), (1, −1, −1, −1, 1, 1, −1, 1), (1, −1, −1, 1, −1, −1, 1, 1), (−1, 1, −1, −1, 1,−1, 1, 1), (1, 1, 1, −1, −1, −1, −1, 1)}, {(−1, −1, 1, −1, −1, 1, 1, 1), (−1, −1, 1, 1, 1, −1, −1, 1), (1, −1, −1, −1, 1, 1, −1, 1), (1, −1,−1, 1, −1, −1, 1, 1), (1, −1, 1, 1, −1, 1, −1, −1), (1, 1, 1, −1, −1, −1, −1, 1)}, {(−1, −1, 1, −1, −1, 1, 1, 1), (−1, 1, −1, −1, 1, 1, 1,−1), (−1, 1, 1, 1, −1, −1, 1, −1), (1, 1, 1, −1, −1, 1, −1, −1), (−1, −1, 1, 1, 1, 1, −1, −1), (−1, 1, 1, −1, 1, −1, −1, 1)}, {(−1, −1, 1, −1,−1, 1, 1, 1), (−1, 1, −1, −1, 1, 1, 1, −1), (−1, 1, 1, 1, −1, −1, 1, −1), (1, 1, 1, −1, −1, 1, −1, −1), (−1, −1, 1, 1, 1, 1, −1, −1), (1, −1,−1, 1, −1, 1, 1, −1)}, {(−1, −1, 1, −1, −1, 1, 1, 1), (−1, 1, −1, −1, 1, 1, 1, −1), (−1, 1, 1, 1, −1, −1, 1, −1), (1, 1, 1, −1, −1, 1, −1,−1), (−1, 1, 1, −1, 1, −1, −1, 1), (1, 1, −1, −1, −1, −1, 1, 1)}, {(−1, −1, 1, −1, −1, 1, 1, 1), (−1, 1, −1, −1, 1, 1, 1, −1), (−1, 1, 1, 1,−1, −1, 1, −1), (1, 1, 1, −1, −1, 1, −1, −1), (1, −1, −1, 1, −1, 1, 1, −1), (1, 1, −1, −1, −1, −1, 1, 1)}, {(−1, −1, 1, −1, −1, 1, 1, 1), (−1, 1, −1, −1, 1, 1, 1, −1), (1, −1, −1, −1, 1, 1, −1, 1), (1, 1, 1, −1, −1, 1, −1, −1), (−1, −1, 1, 1, 1, 1, −1, −1), (−1, 1, 1, −1, 1, −1,−1, 1)}, {(−1, −1, 1, −1, −1, 1, 1, 1), (−1, 1, −1, −1, 1, 1, 1, −1), (1, −1, −1, −1, 1, 1, −1, 1), (1, 1, 1, −1, −1, 1, −1, −1), (−1,−1, 1, 1, 1, 1, −1, −1), (1, −1, −1, 1, −1, 1, 1, −1)}, {(−1, −1, 1, −1, −1, 1, 1, 1), (−1, 1, −1, −1, 1, 1, 1, −1), (1, −1, −1, −1, 1, 1,−1, 1), (1, 1, 1, −1, −1, 1, −1, −1), (−1, 1, 1, −1, 1, −1, −1, 1), (1, 1, −1, −1, −1, −1, 1, 1)}, {(−1, −1, 1, −1, −1, 1, 1, 1), (−1, 1, −1,−1, 1, 1, 1, −1), (1, −1, −1, −1, 1, 1, −1, 1), (1, 1, 1, −1, −1, 1, −1, −1), (1, −1, −1, 1, −1, 1, 1, −1), (1, 1, −1, −1, −1, −1, 1, 1)}, {(−1, −1, 1, −1, −1, 1, 1, 1), (−1, 1, 1, −1, 1, 1, −1, −1), (−1, 1, 1, 1, −1, −1, 1, −1), (1, 1, −1, −1, −1, 1, 1, −1), (−1, −1, −1, 1, 1, 1, 1,−1), (−1, 1, −1, −1, 1, −1, 1, 1)}, {(−1, −1, 1, −1, −1, 1, 1, 1), (−1, 1, 1, −1, 1, 1, −1, −1), (−1, 1, 1, 1, −1, −1, 1, −1), (1, 1, −1, −1,−1, 1, 1, −1), (−1, −1, −1, 1, 1, 1, 1, −1), (1, −1, 1, 1, −1, 1, −1, −1)}, {(−1, −1, 1, −1, −1, 1, 1, 1), (−1, 1, 1, −1, 1, 1, −1, −1), (−1, 1, 1, 1, −1, −1, 1, −1), (1, 1, −1, −1, −1, 1, 1, −1), (−1, 1, −1, −1, 1, −1, 1, 1), (1, 1, 1, −1, −1, −1, −1, 1)}, {(−1, −1, 1, −1,−1, 1, 1, 1), (−1, 1, 1, −1, 1, 1, −1, −1), (−1, 1, 1, 1, −1, −1, 1, −1), (1, 1, −1, −1, −1, 1, 1, −1), (1, −1, 1, 1, −1, 1, −1, −1), (1, 1, 1,−1, −1, −1, −1, 1)}, {(−1, −1, 1, −1, −1, 1, 1, 1), (−1, 1, 1, −1, 1, 1, −1, −1), (1, −1, −1, −1, 1, 1, −1, 1), (1, 1, −1, −1, −1, 1, 1, −1), (−1, −1, −1, 1, 1, 1, 1, −1), (−1, 1, −1, −1, 1, −1, 1, 1)}, {(−1, −1, 1, −1, −1, 1, 1, 1), (−1, 1, 1, −1, 1, 1, −1, −1), (1, −1, −1, −1, 1, 1,−1, 1), (1, 1, −1, −1, −1, 1, 1, −1), (−1, −1, −1, 1, 1, 1, 1, −1), (1, −1, 1, 1, −1, 1, −1, −1)}, {(−1, −1, 1, −1, −1, 1, 1, 1), (−1, 1, 1,−1, 1, 1, −1, −1), (1, −1, −1, −1, 1, 1, −1, 1), (1, 1, −1, −1, −1, 1, 1, −1), (−1, 1, −1, −1, 1, −1, 1, 1), (1, 1, 1, −1, −1, −1, −1, 1)}, {(−1, −1, 1, −1, −1, 1, 1, 1), (−1, 1, 1, −1, 1, 1, −1, −1), (1, −1, −1, −1, 1, 1, −1, 1), (1, 1, −1, −1, −1, 1, 1, −1), (1, −1, 1, 1, −1, 1, −1,−1), (1, 1, 1, −1, −1, −1, −1, 1)}, {(−1, −1, 1, −1, −1, 1, 1, 1), (−1, 1, 1, 1, −1, −1, 1, −1), (1, −1, −1, 1, −1, −1, 1, 1), (1, 1, −1, −1,−1, 1, 1, −1), (−1, −1, −1, 1, 1, 1, 1, −1), (−1, 1, −1, −1, 1, −1, 1, 1)}, {(−1, −1, 1, −1, −1, 1, 1, 1), (−1, 1, 1, 1, −1, −1, 1, −1), (1, −1, −1, 1, −1, −1, 1, 1), (1, 1, −1, −1, −1, 1, 1, −1), (−1, −1, −1, 1, 1, 1, 1, −1), (1, −1, 1, 1, −1, 1, −1, −1)}, {(−1, −1, 1, −1,−1, 1, 1, 1), (−1, 1, 1, 1, −1, −1, 1, −1), (1, −1, −1, 1, −1, −1, 1, 1), (1, 1, −1, −1, −1, 1, 1, −1), (−1, 1, −1, −1, 1, −1, 1, 1), (1, 1, 1,−1, −1, −1, −1, 1)}, {(−1, −1, 1, −1, −1, 1, 1, 1), (−1, 1, 1, 1, −1, −1, 1, −1), (1, −1, −1, 1, −1, −1, 1, 1), (1, 1, −1, −1, −1, 1, 1,−1), (1, −1, 1, 1, −1, 1, −1, −1), (1, 1, 1, −1, −1, −1, −1, 1)}, {(−1, −1, 1, −1, −1, 1, 1, 1), (−1, 1, 1, 1, −1, −1, 1, −1), (1, −1, 1, 1,−1, −1, −1, 1), (1, 1, 1, −1, −1, 1, −1, −1), (−1, −1, 1, 1, 1, 1, −1, −1), (−1, 1, 1, −1, 1, −1, −1, 1)}, {(−1, −1, 1, −1, −1, 1, 1, 1), (−1, 1, 1, 1, −1, −1, 1, −1), (1, −1, 1, 1, −1, −1, −1, 1), (1, 1, 1, −1, −1, 1, −1, −1), (−1, −1, 1, 1, 1, 1, −1, −1), (1, −1, −1, 1, −1, 1, 1,−1)}, {(−1, −1, 1, −1, −1, 1, 1, 1), (−1, 1, 1, 1, −1, −1, 1, −1), (1, −1, 1, 1, −1, −1, −1, 1), (1, 1, 1, −1, −1, 1, −1, −1), (−1, 1, 1,−1, 1, −1, −1, 1), (1, 1, −1, −1, −1, −1, 1, 1)}, {(−1, −1, 1, −1, −1, 1, 1, 1), (−1, 1, 1, 1, −1, −1, 1, −1), (1, −1, 1, 1, −1, −1,−1, 1), (1, 1, 1, −1, −1, 1, −1, −1), (1, −1, −1, 1, −1, 1, 1, −1), (1, 1, −1, −1, −1, −1, 1, 1)}, {(−1, −1, 1, −1, −1, 1, 1, 1), (1, −1, −1,−1, 1, 1, −1, 1), (1, −1, −1, 1, −1, −1, 1, 1), (1, 1, −1, −1, −1, 1, 1, −1), (−1, −1, −1, 1, 1, 1, 1, −1), (−1, 1, −1, −1, 1, −1, 1, 1)}, {(−1, −1, 1, −1, −1, 1, 1, 1), (1, −1, −1, −1, 1, 1, −1, 1), (1, −1, −1, 1, −1, −1, 1, 1), (1, 1, −1, −1, −1, 1, 1, −1), (−1, −1, −1, 1, 1, 1, 1,−1), (1, −1, 1, 1, −1, 1, −1, −1)}, {(−1, −1, 1, −1, −1, 1, 1, 1), (1, −1, −1, −1, 1, 1, −1, 1), (1, −1, −1, 1, −1, −1, 1, 1), (1, 1, −1, −1,−1, 1, 1, −1), (−1, 1, −1, −1, 1, −1, 1, 1), (1, 1, 1, −1, −1, −1, −1, 1)}, {(−1, −1, 1, −1, −1, 1, 1, 1), (1, −1, −1, −1, 1, 1, −1, 1), (1,−1, −1, 1, −1, −1, 1, 1), (1, 1, −1, −1, −1, 1, 1, −1), (1, −1, 1, 1, −1, 1, −1, −1), (1, 1, 1, −1, −1, −1, −1, 1)}, {(−1, −1, 1, −1,−1, 1, 1, 1), (1, −1, −1, −1, 1, 1, −1, 1), (1, −1, 1, 1, −1, −1, −1, 1), (1, 1, 1, −1, −1, 1, −1, −1), (−1, −1, 1, 1, 1, 1, −1, −1), (−1, 1, 1,−1, 1, −1, −1, 1)}, {(−1, −1, 1, −1, −1, 1, 1, 1), (1, −1, −1, −1, 1, 1, −1, 1), (1, −1, 1, 1, −1, −1, −1, 1), (1, 1, 1, −1, −1, 1, −1, −1), (−1, −1, 1, 1, 1, 1, −1, −1), (1, −1, −1, 1, −1, 1, 1, −1)}, {(−1, −1, 1, −1, −1, 1, 1, 1), (1, −1, −1, −1, 1, 1, −1, 1), (1, −1, 1, 1, −1, −1,−1, 1), (1, 1, 1, −1, −1, 1, −1, −1), (−1, 1, 1, −1, 1, −1, −1, 1), (1, 1, −1, −1, −1, −1, 1, 1)}, {(−1, −1, 1, −1, −1, 1, 1, 1), (1, −1, −1,−1, 1, 1, −1, 1), (1, −1, 1, 1, −1, −1, −1, 1), (1, 1, 1, −1, −1, 1, −1, −1), (1, −1, −1, 1, −1, 1, 1, −1), (1, 1, −1, −1, −1, −1, 1, 1)}, {(−1, −1, 1, 1, −1, 1, 1, −1), (−1, −1, 1, 1, 1, −1, −1, 1), (−1, 1, 1, −1, −1, −1, 1, 1), (−1, 1, 1, −1, 1, 1, −1, −1), (−1, −1, −1,−1, 1, 1, 1, 1), (−1, 1, −1, 1, 1, −1, 1, −1)}, {(−1, −1, 1, 1, −1, 1, 1, −1), (−1, −1, 1, 1, 1, −1, −1, 1), (−1, 1, 1, −1, −1, −1, 1, 1), (−1, 1, 1, −1, 1, 1, −1, −1), (−1, −1, −1, −1, 1, 1, 1, 1), (1, −1, 1, −1, −1, 1, −1, 1)}, {(−1, −1, 1, 1, −1, 1, 1, −1), (−1, −1, 1, 1, 1, −1,−1, 1), (−1, 1, 1, −1, −1, −1, 1, 1), (−1, 1, 1, −1, 1, 1, −1, −1), (−1, 1, −1, 1, 1, −1, 1, −1), (1, 1, 1, 1, −1, −1, −1, −1)}, {(−1,−1, 1, 1, −1, 1, 1, −1), (−1, −1, 1, 1, 1, −1, −1, 1), (−1, 1, 1, −1, −1, −1, 1, 1), (−1, 1, 1, −1, 1, 1, −1, −1), (1, −1, 1, −1, −1, 1,−1, 1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, −1, −1, 1, 1), (1, −1,−1, 1, −1, −1, 1, 1), (−1, −1, −1, −1, 1, 1, 1, 1), (−1, 1, −1, 1, 1, −1, 1, −1)}, {(−1, −1, 1, 1, −1, 1, 1, −1), (−1, −1, 1, 1, 1, −1,−1, 1), (−1, 1, 1, −1, −1, −1, 1, 1), (1, −1, −1, 1, −1, −1, 1, 1), (−1, −1, −1, −1, 1, 1, 1, 1), (1, −1, 1, −1, −1, 1, −1, 1)}, {(−1,−1, 1, 1, −1, 1, 1, −1), (−1, −1, 1, 1, 1, −1, −1, 1), (−1, 1, 1, −1, −1, −1, 1, 1), (1, −1, −1, 1, −1, −1, 1, 1), (−1, 1, −1, 1, 1, −1, 1,−1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, −1, −1, 1, 1), (1, −1, −1, 1,−1, −1, 1, 1), (1, −1, 1, −1, −1, 1, −1, 1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, 1, 1, −1, −1), (1, −1, −1, 1, 1, 1, −1, −1), (−1, −1, −1, −1, 1, 1, 1, 1), (−1, 1, −1, 1, 1, −1, 1, −1)}, {(−1, −1, 1, 1,−1, 1, 1, −1), (−1, −1, 1, 1, 1, −1, −1, 1), (−1, 1, 1, −1, 1, 1, −1, −1), (1, −1, −1, 1, 1, 1, −1, −1), (−1, −1, −1, −1, 1, 1, 1, 1), (1, −1, 1,−1, −1, 1, −1, 1)}, {(−1, −1, 1, 1, −1, 1, 1, −1), (−1, −1, 1, 1, 1, −1, −1, 1), (−1, 1, 1, −1, 1, 1, −1, −1), (1, −1, −1, 1, 1, 1, −1, −1), (−1, 1, −1, 1, 1, −1, 1, −1), (1, 1, 1, 1, −1, −1, −1, −1)}, {(−1, −1, 1, 1, −1, 1, 1, −1), (−1, −1, 1, 1, 1, −1, −1, 1), (−1, 1, 1, −1, 1, 1,−1, −1), (1, −1, −1, 1, 1, 1, −1, −1), (1, −1, 1, −1, −1, 1, −1, 1), (1, 1, 1, 1, −1, −1, −1, −1)}, {(−1, −1, 1, 1, −1, 1, 1, −1), (−1,−1, 1, 1, 1, −1, −1, 1), (1, −1, −1, 1, −1, −1, 1, 1), (1, −1, −1, 1, 1, 1, −1, −1), (−1, −1, −1, −1, 1, 1, 1, 1), (−1, 1, −1, 1, 1, −1, 1, −1)}, {(−1, −1, 1, 1, −1, 1, 1, −1), (−1, −1, 1, 1, 1, −1, −1, 1), (1, −1, −1, 1, −1, −1, 1, 1), (1, −1, −1, 1, 1, 1, −1, −1), (−1, −1, −1,−1, 1, 1, 1, 1), (1, −1, 1, −1, −1, 1, −1, 1)}, {(−1, −1, 1, 1, −1, 1, 1, −1), (−1, −1, 1, 1, 1, −1, −1, 1), (1, −1, −1, 1, −1, −1, 1, 1), (1,−1, −1, 1, 1, 1, −1, −1), (−1, 1, −1, 1, 1, −1, 1, −1), (1, 1, 1, 1, −1, −1, −1, −1)}, {(−1, −1, 1, 1, −1, 1, 1, −1), (−1, −1, 1, 1, 1, −1,−1, 1), (1, −1, −1, 1, −1, −1, 1, 1), (1, −1, −1, 1, 1, 1, −1, −1), (1, −1, 1, −1, −1, 1, −1, 1), (1, 1, 1, 1, −1, −1, −1, −1)}, {(−1,−1, 1, 1, −1, 1, 1, −1), (−1, 1, −1, −1, 1, 1, 1, −1), (−1, 1, 1, −1, −1, −1, 1, 1), (1, 1, 1, −1, −1, 1, −1, −1), (−1, −1, 1, −1, 1, 1, −1, 1), (−1, 1, 1, 1, 1, −1, −1, −1)}, {(−1, −1, 1, 1, −1, 1, 1, −1), (−1, 1, −1, −1, 1, 1, 1, −1), (−1, 1, 1, −1, −1, −1, 1, 1), (1, 1, 1, −1, −1, 1,−1, −1), (−1, −1, 1, −1, 1, 1, −1, 1), (1, −1, −1, −1, −1, 1, 1, 1)}, {(−1, −1, 1, 1, −1, 1, 1, −1), (−1, 1, −1, −1, 1, 1, 1, −1), (−1, 1, 1,−1, −1, −1, 1, 1), (1, 1, 1, −1, −1, 1, −1, −1), (−1, 1, 1, 1, 1, −1, −1, −1), (1, 1, −1, 1, −1, −1, 1, −1)}, {(−1, −1, 1, 1, −1, 1, 1, −1), (−1, 1, −1, −1, 1, 1, 1, −1), (−1, 1, 1, −1, −1, −1, 1, 1), (1, 1, 1, −1, −1, 1, −1, −1), (1, −1, −1, −1, −1, 1, 1, 1), (1, 1, −1, 1, −1, −1, 1,−1)}, {(−1, −1, 1, 1, −1, 1, 1, −1), (−1, 1, −1, −1, 1, 1, 1, −1), (1, −1, −1, 1, 1, 1, −1, −1), (1, 1, 1, −1, −1, 1, −1, −1), (−1, −1, 1,−1, 1, 1, −1, 1), (−1, 1, 1, 1, 1, −1, −1, −1)}, {(−1, −1, 1, 1, −1, 1, 1, −1), (−1, 1, −1, −1, 1, 1, 1, −1), (1, −1, −1, 1, 1, 1, −1,−1), (1, 1, 1, −1, −1, 1, −1, −1), (−1, −1, 1, −1, 1, 1, −1, 1), (1, −1, −1, −1, −1, 1, 1, 1)}, {(−1, −1, 1, 1, −1, 1, 1, −1), (−1, 1, −1,−1, 1, 1, 1, −1), (1, −1, −1, 1, 1, 1, −1, −1), (1, 1, 1, −1, −1, 1, −1, −1), (−1, 1, 1, 1, 1, −1, −1, −1), (1, 1, −1, 1, −1, −1, 1, −1)}, {(−1, −1, 1, 1, −1, 1, 1, −1), (−1, 1, −1, −1, 1, 1, 1, −1), (1, −1, −1, 1, 1, 1, −1, −1), (1, 1, 1, −1, −1, 1, −1, −1), (1, −1, −1, −1,−1, 1, 1, 1), (1, 1, −1, 1, −1, −1, 1, −1)}, {(−1, −1, 1, 1, −1, 1, 1, −1), (−1, 1, 1, −1, −1, −1, 1, 1), (−1, 1, 1, −1, 1, 1, −1, −1), (1, 1,−1, −1, −1, 1, 1, −1), (−1, −1, −1, −1, 1, 1, 1, 1), (−1, 1, −1, 1, 1, −1, 1, −1)}, {(−1, −1, 1, 1, −1, 1, 1, −1), (−1, 1, 1, −1, −1,−1, 1, 1), (−1, 1, 1, −1, 1, 1, −1, −1), (1, 1, −1, −1, −1, 1, 1, −1), (−1, −1, −1, −1, 1, 1, 1, 1), (1, −1, 1, −1, −1, 1, −1, 1)}, {(−1,−1, 1, 1, −1, 1, 1, −1), (−1, 1, 1, −1, −1, −1, 1, 1), (−1, 1, 1, −1, 1, 1, −1, −1), (1, 1, −1, −1, −1, 1, 1, −1), (−1, 1, −1, 1, 1, −1, 1,−1), (1, 1, 1, 1, −1, −1, −1, −1)}, {(−1, −1, 1, 1, −1, 1, 1, −1), (−1, 1, 1, −1, −1, −1, 1, 1), (−1, 1, 1, −1, 1, 1, −1, −1), (1, 1, −1, −1,−1, 1, 1, −1), (1, −1, 1, −1, −1, 1, −1, 1), (1, 1, 1, 1, −1, −1, −1, −1)}, {(−1, −1, 1, 1, −1, 1, 1, −1), (−1, 1, 1, −1, −1, −1, 1, 1), (1,−1, −1, 1, −1, −1, 1, 1), (1, 1, −1, −1, −1, 1, 1, −1), (−1, −1, −1, −1, 1, 1, 1, 1), (−1, 1, −1, 1, 1, −1, 1, −1)}, {(−1, −1, 1, 1, −1, 1, 1,−1), (−1, 1, 1, −1, −1, −1, 1, 1), (1, −1, −1, 1, −1, −1, 1, 1), (1, 1, −1, −1, −1, 1, 1, −1), (−1, −1, −1, −1, 1, 1, 1, 1), (1, −1, 1, −1,−1, 1, −1, 1)}, {(−1, −1, 1, 1, −1, 1, 1, −1), (−1, 1, 1, −1, −1, −1, 1, 1), (1, −1, −1, 1, −1, −1, 1, 1), (1, 1, −1, −1, −1, 1, 1, −1), (−1, 1, −1, 1, 1, −1, 1, −1), (1, 1, 1, 1, −1, −1, −1, −1)}, {(−1, −1, 1, 1, −1, 1, 1, −1), (−1, 1, 1, −1, −1, −1, 1, 1), (1, −1, −1, 1, −1,−1, 1, 1), (1, 1, −1, −1, −1, 1, 1, −1), (1, −1, 1, −1, −1, 1, −1, 1), (1, 1, 1, 1, −1, −1, −1, −1)}, {(−1, −1, 1, 1, −1, 1, 1, −1), (−1, 1, 1, −1, −1, −1, 1, 1), (1, −1, 1, 1, −1, −1, −1, 1), (1, 1, 1, −1, −1, 1, −1, −1), (−1, −1, 1, −1, 1, 1, −1, 1), (−1, 1, 1, 1, 1, −1, −1,−1)}, {(−1, −1, 1, 1, −1, 1, 1, −1), (−1, 1, 1, −1, −1, −1, 1, 1), (1, −1, 1, 1, −1, −1, −1, 1), (1, 1, 1, −1, −1, 1, −1, −1), (−1, −1, 1,−1, 1, 1, −1, 1), (1, −1, −1, −1, −1, 1, 1, 1)}, {(−1, −1, 1, 1, −1, 1, 1, −1), (−1, 1, 1, −1, −1, −1, 1, 1), (1, −1, 1, 1, −1, −1,−1, 1), (1, 1, 1, −1, −1, 1, −1, −1), (−1, 1, 1, 1, 1, −1, −1, −1), (1, 1, −1, 1, −1, −1, 1, −1)}, {(−1, −1, 1, 1, −1, 1, 1, −1), (−1, 1, 1,−1, −1, −1, 1, 1), (1, −1, 1, 1, −1, −1, −1, 1), (1, 1, 1, −1, −1, 1, −1, −1), (1, −1, −1, −1, −1, 1, 1, 1), (1, 1, −1, 1, −1, −1, 1, −1)}, {(−1, −1, 1, 1, −1, 1, 1, −1), (−1, 1, 1, −1, 1, 1, −1, −1), (1, −1, −1, 1, 1, 1, −1, −1), (1, 1, −1, −1, −1, 1, 1, −1), (−1, −1, −1,−1, 1, 1, 1, 1), (−1, 1, −1, 1, 1, −1, 1, −1)}, {(−1, −1, 1, 1, −1, 1, 1, −1), (−1, 1, 1, −1, 1, 1, −1, −1), (1, −1, −1, 1, 1, 1, −1,−1), (1, 1, −1, −1, −1, 1, 1, −1), (−1, −1, −1, −1, 1, 1, 1, 1), (1, −1, 1, −1, −1, 1, −1, 1)}, {(−1, −1, 1, 1, −1, 1, 1, −1), (−1, 1, 1,−1, 1, 1, −1, −1), (1, −1, −1, 1, 1, 1, −1, −1), (1, 1, −1, −1, −1, 1, 1, −1), (−1, 1, −1, 1, 1, −1, 1, −1), (1, 1, 1, 1, −1, −1, −1, −1)}, {(−1, −1, 1, 1, −1, 1, 1, −1), (−1, 1, 1, −1, 1, 1, −1, −1), (1, −1, −1, 1, 1, 1, −1, −1), (1, 1, −1, −1, −1, 1, 1, −1), (1, −1, 1, −1, −1, 1,−1, 1), (1, 1, 1, 1, −1, −1, −1, −1)}, {(−1, −1, 1, 1, −1, 1, 1, −1), (1, −1, −1, 1, −1, −1, 1, 1), (1, −1, −1, 1, 1, 1, −1, −1), (1, 1, −1,−1, −1, 1, 1, −1), (−1, −1, −1, −1, 1, 1, 1, 1), (−1, 1, −1, 1, 1, −1, 1, −1)}, {(−1, −1, 1, 1, −1, 1, 1, −1), (1, −1, −1, 1, −1,−1, 1, 1), (1, −1, −1, 1, 1, 1, −1, −1), (1, 1, −1, −1, −1, 1, 1, −1), (−1, −1, −1, −1, 1, 1, 1, 1), (1, −1, 1, −1, −1, 1, −1, 1)}, {(−1,−1, 1, 1, −1, 1, 1, −1), (1, −1, −1, 1, −1, −1, 1, 1), (1, −1, −1, 1, 1, 1, −1, −1), (1, 1, −1, −1, −1, 1, 1, −1), (−1, 1, −1, 1, 1, −1, 1,−1), (1, 1, 1, 1, −1, −1, −1, −1)}, {(−1, −1, 1, 1, −1, 1, 1, −1), (1, −1, −1, 1, −1, −1, 1, 1), (1, −1, −1, 1, 1, 1, −1, −1), (1, 1, −1, −1,−1, 1, 1, −1), (1, −1, 1, −1, −1, 1, −1, 1), (1, 1, 1, 1, −1, −1, −1, −1)}, {(−1, −1, 1, 1, −1, 1, 1, −1), (1, −1, −1, 1, 1, 1, −1, −1), (1,−1, 1, 1, −1, −1, −1, 1), (1, 1, 1, −1, −1, 1, −1, −1), (−1, −1, 1, −1, 1, 1, −1, 1), (−1, 1, 1, 1, 1, −1, −1, −1)}, {(−1, −1, 1, 1, −1, 1, 1,−1), (1, −1, −1, 1, 1, 1, −1, −1), (1, −1, 1, 1, −1, −1, −1, 1), (1, 1, 1, −1, −1, 1, −1, −1), (−1, −1, 1, −1, 1, 1, −1, 1), (1, −1, −1, −1,−1, 1, 1, 1)}, {(−1, −1, 1, 1, −1, 1, 1, −1), (1, −1, −1, 1, 1, 1, −1, −1), (1, −1, 1, 1, −1, −1, −1, 1), (1, 1, 1, −1, −1, 1, −1, −1), (−1, 1, 1, 1, 1, −1, −1, −1), (1, 1, −1, 1, −1, −1, 1, −1)}, {(−1, −1, 1, 1, −1, 1, 1, −1), (1, −1, −1, 1, 1, 1, −1, −1), (1, −1, 1, 1, −1, −1,−1, 1), (1, 1, 1, −1, −1, 1, −1, −1), (1, −1, −1, −1, −1, 1, 1, 1), (1, 1, −1, 1, −1, −1, 1, −1)}, {(−1, −1, 1, 1, 1, −1, −1, 1), (−1, 1, 1,−1, −1, −1, 1, 1), (−1, 1, 1, −1, 1, 1, −1, −1), (1, 1, −1, −1, 1, −1, −1, 1), (−1, −1, −1, −1, 1, 1, 1, 1), (−1, 1, −1, 1, 1, −1, 1, −1)}, {(−1, −1, 1, 1, 1, −1, −1, 1), (−1, 1, 1, −1, −1, −1, 1, 1), (−1, 1, 1, −1, 1, 1, −1, −1), (1, 1, −1, −1, 1, −1, −1, 1), (−1, −1, −1,−1, 1, 1, 1, 1), (1, −1, 1, −1, −1, 1, −1, 1)}, {(−1, −1, 1, 1, 1, −1, −1, 1), (−1, 1, 1, −1, −1, −1, 1, 1), (−1, 1, 1, −1, 1, 1, −1,−1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1, −1, 1), (−1, 1, 1, −1,−1, −1, 1, 1), (−1, 1, 1, −1, 1, 1, −1, −1), (1, 1, −1, −1, 1, −1, −1, 1), (1, −1, 1, −1, −1, 1, −1, 1), (1, 1, 1, 1, −1, −1, −1, −1)}, {(−1,−1, 1, 1, 1, −1, −1, 1), (−1, 1, 1, −1, −1, −1, 1, 1), (1, −1, −1, 1, −1, −1, 1, 1), (1, 1, −1, −1, 1, −1, −1, 1), (−1, −1, −1, −1, 1, 1, 1, 1), (−1, 1, −1, 1, 1, −1, 1, −1)}, {(−1, −1, 1, 1, 1, −1, −1, 1), (−1, 1, 1, −1, −1, −1, 1, 1), (1, −1, −1, 1, −1, −1, 1, 1), (1, 1, −1, −1, 1, −1,−1, 1), (−1, −1, −1, −1, 1, 1, 1, 1), (1, −1, 1, −1, −1, 1, −1, 1)}, {(−1, −1, 1, 1, 1, −1, −1, 1), (−1, 1, 1, −1, −1, −1, 1, 1), (1, −1,−1, 1, −1, −1, 1, 1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1,−1, 1), (−1, 1, 1, −1, −1, −1, 1, 1), (1, −1, −1, 1, −1, −1, 1, 1), (1, 1, −1, −1, 1, −1, −1, 1), (1, −1, 1, −1, −1, 1, −1, 1), (1, 1, 1, 1, −1,−1, −1, −1)}, {(−1, −1, 1, 1, 1, −1, −1, 1), (−1, 1, 1, −1, 1, 1, −1, −1), (−1, 1, 1, 1, −1, −1, 1, −1), (1, 1, −1, 1, 1, −1, −1, −1), (−1,−1, −1, 1, 1, 1, 1, −1), (−1, 1, −1, −1, 1, −1, 1, 1)}, {(−1, −1, 1, 1, 1, −1, −1, 1), (−1, 1, 1, −1, 1, 1, −1, −1), (−1, 1, 1, 1, −1, −1, 1,−1), (1, 1, −1, 1, 1, −1, −1, −1), (−1, −1, −1, 1, 1, 1, 1, −1), (1, −1, 1, 1, −1, 1, −1, −1)}, {(−1, −1, 1, 1, 1, −1, −1, 1), (−1, 1, 1,−1, 1, 1, −1, −1), (−1, 1, 1, 1, −1, −1, 1, −1), (1, 1, −1, 1, 1, −1, −1, −1), (−1, 1, −1, −1, 1, −1, 1, 1), (1, 1, 1, −1, −1, −1, −1, 1)}, {(−1, −1, 1, 1, 1, −1, −1, 1), (−1, 1, 1, −1, 1, 1, −1, −1), (−1, 1, 1, 1, −1, −1, 1, −1), (1, 1, −1, 1, 1, −1, −1, −1), (1, −1, 1, 1, −1, 1, −1,−1), (1, 1, 1, −1, −1, −1, −1, 1)}, {(−1, −1, 1, 1, 1, −1, −1, 1), (−1, 1, 1, −1, 1, 1, −1, −1), (1, −1, −1, −1, 1, 1, −1, 1), (1, 1,−1, 1, 1, −1, −1, −1), (−1, −1, −1, 1, 1, 1, 1, −1), (−1, 1, −1, −1, 1, −1, 1, 1)}, {(−1, −1, 1, 1, 1, −1, −1, 1), (−1, 1, 1, −1, 1, 1, −1,−1), (1, −1, −1, −1, 1, 1, −1, 1), (1, 1, −1, 1, 1, −1, −1, −1), (−1, −1, −1, 1, 1, 1, 1, −1), (1, −1, 1, 1, −1, 1, −1, −1)}, {(−1,−1, 1, 1, 1, −1, −1, 1), (−1, 1, 1, −1, 1, 1, −1, −1), (1, −1, −1, −1, 1, 1, −1, 1), (1, 1, −1, 1, 1, −1, −1, −1), (−1, 1, −1, −1, 1,−1, 1, 1), (1, 1, 1, −1, −1, −1, −1, 1)}, {(−1, −1, 1, 1, 1, −1, −1, 1), (−1, 1, 1, −1, 1, 1, −1, −1), (1, −1, −1, −1, 1, 1, −1, 1), (1, 1,−1, 1, 1, −1, −1, −1), (1, −1, 1, 1, −1, 1, −1, −1), (1, 1, 1, −1, −1, −1, −1, 1)}, {(−1, −1, 1, 1, 1, −1, −1, 1), (−1, 1, 1, −1, 1, 1, −1,−1), (1, −1, −1, 1, 1, 1, −1, −1), (1, 1, −1, −1, 1, −1, −1, 1), (−1, −1, −1, −1, 1, 1, 1, 1), (−1, 1, −1, 1, 1, −1, 1, −1)}, {(−1,−1, 1, 1, 1, −1, −1, 1), (−1, 1, 1, −1, 1, 1, −1, −1), (1, −1, −1, 1, 1, 1, −1, −1), (1, 1, −1, −1, 1, −1, −1, 1), (−1, −1, −1,−1, 1, 1, 1, 1), (1, −1, 1, −1, −1, 1, −1, 1)}, {(−1, −1, 1, 1, 1, −1, −1, 1), (−1, 1, 1, −1, 1, 1, −1, −1), (1, −1, −1, 1, 1, 1, −1, −1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1, −1, 1), (−1, 1, 1,−1, 1, 1, −1, −1), (1, −1, −1, 1, 1, 1, −1, −1), (1, 1, −1, −1, 1, −1, −1, 1), (1, −1, 1, −1, −1, 1, −1, 1), (1, 1, 1, 1, −1, −1, −1, −1)}, {(−1, −1, 1, 1, 1, −1, −1, 1), (−1, 1, 1, 1, −1, −1, 1, −1), (1, −1, −1, 1, −1, −1, 1, 1), (1, 1, −1, 1, 1, −1, −1, −1), (−1, −1, −1, 1, 1, 1, 1,−1), (−1, 1, −1, −1, 1, −1, 1, 1)}, {(−1, −1, 1, 1, 1, −1, −1, 1), (−1, 1, 1, 1, −1, −1, 1, −1), (1, −1, −1, 1, −1, −1, 1, 1), (1, 1,−1, 1, 1, −1, −1, −1), (−1, −1, −1, 1, 1, 1, 1, −1), (1, −1, 1, 1, −1, 1, −1, −1)}, {(−1, −1, 1, 1, 1, −1, −1, 1), (−1, 1, 1, 1, −1, −1, 1,−1), (1, −1, −1, 1, −1, −1, 1, 1), (1, 1, −1, 1, 1, −1, −1, −1), (−1, 1, −1, −1, 1, −1, 1, 1), (1, 1, 1, −1, −1, −1, −1, 1)}, {(−1,−1, 1, 1, 1, −1, −1, 1), (−1, 1, 1, 1, −1, −1, 1, −1), (1, −1, −1, 1, −1, −1, 1, 1), (1, 1, −1, 1, 1, −1, −1, −1), (1, −1, 1, 1, −1, 1, −1,−1), (1, 1, 1, −1, −1, −1, −1, 1)}, {(−1, −1, 1, 1, 1, −1, −1, 1), (1, −1, −1, −1, 1, 1, −1, 1), (1, −1, −1, 1, −1, −1, 1, 1), (1, 1,−1, 1, 1, −1, −1, −1), (−1, −1, −1, 1, 1, 1, 1, −1), (−1, 1, −1, −1, 1, −1, 1, 1)}, {(−1, −1, 1, 1, 1, −1, −1, 1), (1, −1, −1, −1, 1, 1,−1, 1), (1, −1, −1, 1, −1, −1, 1, 1), (1, 1, −1, 1, 1, −1, −1, −1), (−1, −1, −1, 1, 1, 1, 1, −1), (1, −1, 1, 1, −1, 1, −1, −1)}, {(−1,−1, 1, 1, 1, −1, −1, 1), (1, −1, −1, −1, 1, 1, −1, 1), (1, −1, −1, 1, −1, −1, 1, 1), (1, 1, −1, 1, 1, −1, −1, −1), (−1, 1, −1, −1, 1,−1, 1, 1), (1, 1, 1, −1, −1, −1, −1, 1)}, {(−1, −1, 1, 1, 1, −1, −1, 1), (1, −1, −1, −1, 1, 1, −1, 1), (1, −1, −1, 1, −1, −1, 1, 1), (1, 1,−1, 1, 1, −1, −1, −1), (1, −1, 1, 1, −1, 1, −1, −1), (1, 1, 1, −1, −1, −1, −1, 1)}, {(−1, −1, 1, 1, 1, −1, −1, 1), (1, −1, −1, 1, −1,−1, 1, 1), (1, −1, −1, 1, 1, 1, −1, −1), (1, 1, −1, −1, 1, −1, −1, 1), (−1, −1, −1, −1, 1, 1, 1, 1), (−1, 1, −1, 1, 1, −1, 1, −1)}, {(−1,−1, 1, 1, 1, −1, −1, 1), (1, −1, −1, 1, −1, −1, 1, 1), (1, −1, −1, 1, 1, 1, −1, −1), (1, 1, −1, −1, 1, −1, −1, 1), (−1, −1, −1,−1, 1, 1, 1, 1), (1, −1, 1, −1, −1, 1, −1, 1)}, {(−1, −1, 1, 1, 1, −1, −1, 1), (1, −1, −1, 1, −1, −1, 1, 1), (1, −1, −1, 1, 1, 1, −1,−1), (1, 1, −1, −1, 1, −1, −1, 1), (−1, 1, −1, 1, 1, −1, 1, −1), (1, 1, 1, 1, −1, −1, −1, −1)}, {(−1, −1, 1, 1, 1, −1, −1, 1), (1, −1, −1, 1,−1, −1, 1, 1), (1, −1, −1, 1, 1, 1, −1, −1), (1, 1, −1, −1, 1, −1, −1, 1), (1, −1, 1, −1, −1, 1, −1, 1), (1, 1, 1, 1, −1, −1, −1, −1)}, {(−1, 1, −1, −1, 1, 1, 1, −1), (−1, 1, 1, −1, −1, −1, 1, 1), (1, 1, −1, −1, 1, −1, −1, 1), (1, 1, 1, −1, −1, 1, −1, −1), (−1, −1, 1, −1, 1, 1,−1, 1), (−1, 1, 1, 1, 1, −1, −1, −1)}, {(−1, 1, −1, −1, 1, 1, 1, −1), (−1, 1, 1, −1, −1, −1, 1, 1), (1, 1, −1, −1, 1, −1, −1, 1), (1, 1, 1,−1, −1, 1, −1, −1), (−1, −1, 1, −1, 1, 1, −1, 1), (1, −1, −1, −1, −1, 1, 1, 1)}, {(−1, 1, −1, −1, 1, 1, 1, −1), (−1, 1, 1, −1, −1, −1,−1, 1, 1), (1, 1, −1, −1, 1, −1, −1, 1), (1, 1, 1, −1, −1, 1, −1, −1), (−1, 1, 1, 1, 1, −1, −1, −1), (1, 1, −1, 1, −1, −1, 1, −1)}, {(−1, 1,−1, −1, 1, 1, 1, −1), (−1, 1, 1, −1, −1, −1, 1, 1), (1, 1, −1, −1, 1, −1, −1, 1), (1, 1, 1, −1, −1, 1, −1, −1), (1, −1, −1, −1,−1, 1, 1, 1), (1, 1, −1, 1, −1, −1, 1, −1) }, {(−1, 1, −1, −1, 1, 1, 1, −1), (−1, 1, 1, 1, −1, −1, 1, −1), (1, 1, −1, 1, 1, −1, −1,−1), (1, 1, 1, −1, −1, 1, −1, −1), (−1, −1, 1, 1, 1, 1, −1, −1), (−1, 1, 1, −1, 1, −1, −1, 1)}, {(−1, 1, −1, −1, 1, 1, 1, −1), (−1, 1, 1, 1,−1, −1, 1, −1), (1, 1, −1, 1, 1, −1, −1, −1), (1, 1, 1, −1, −1, 1, −1, −1), (−1, −1, 1, 1, 1, 1, −1, −1), (1, −1, −1, 1, −1, 1, 1, −1)}, {(−1, 1, −1, −1, 1, 1, 1, −1), (−1, 1, 1, 1, −1, −1, 1, −1), (1, 1, −1, 1, 1, −1, −1, −1), (1, 1, 1, −1, −1, 1, −1, −1), (−1, 1, 1, −1, 1, −1,−1, 1), (1, 1, −1, −1, −1, −1, 1, 1)}, {(−1, 1, −1, −1, 1, 1, 1, −1), (−1, 1, 1, 1, −1, −1, 1, −1), (1, 1, −1, 1, 1, −1, −1, −1), (1, 1, 1,−1, −1, 1, −1, −1), (1, −1, −1, 1, −1, 1, 1, −1), (1, 1, −1, −1, −1, −1, 1, 1)}, {(−1, 1, −1, −1, 1, 1, 1, −1), (1, −1, −1, −1, 1, 1,−1, 1), (1, 1, −1, 1, 1, −1, −1, −1), (1, 1, 1, −1, −1, 1, −1, −1), (−1, −1, 1, 1, 1, 1, −1, −1), (−1, 1, 1, −1, 1, −1, −1, 1)}, {(−1, 1, −1,−1, 1, 1, 1, −1), (1, −1, −1, −1, 1, 1, −1, 1), (1, 1, −1, 1, 1, −1, −1, −1), (1, 1, 1, −1, −1, 1, −1, −1), (−1, −1, 1, 1, 1, 1, −1, −1), (1, −1,−1, 1, −1, 1, 1, −1)}, {(−1, 1, −1, −1, 1, 1, 1, −1), (1, −1, −1, −1, 1, 1, −1, 1), (1, 1, −1, 1, 1, −1, −1, −1), (1, 1, 1, −1, −1, 1, −1,−1), (−1, 1, 1, −1, 1, −1, −1, 1), (1, 1, −1, −1, −1, −1, 1, 1)}, {(−1, 1, −1, −1, 1, 1, 1, −1), (1, −1, −1, −1, 1, 1, −1, 1), (1, 1,−1, 1, 1, −1, −1, −1), (1, 1, 1, −1, −1, 1, −1, −1), (1, −1, −1, 1, −1, 1, 1, −1), (1, 1, −1, −1, −1, −1, 1, 1)}, {(−1, 1, −1, −1, 1, 1, 1,−1), (1, −1, −1, 1, 1, 1, −1, −1), (1, 1, −1, −1, 1, −1, −1, 1), (1, 1, 1, −1, −1, 1, −1, −1), (−1, −1, 1, −1, 1, 1, −1, 1), (−1, 1, 1, 1, 1, −1,−1, −1)}, {(−1, 1, −1, −1, 1, 1, 1, −1), (1, −1, −1, 1, 1, 1, −1, −1), (1, 1, −1, −1, 1, −1, −1, 1), (1, 1, 1, −1, −1, 1, −1, −1), (−1, −1, 1,−1, 1, 1, −1, 1), (1, −1, −1, −1, −1, 1, 1, 1)}, {(−1, 1, −1, −1, 1, 1, 1, −1), (1, −1, −1, 1, 1, 1, −1, −1), (1, 1, −1, −1, 1, −1,−1, 1), (1, 1, 1, −1, −1, 1, −1, −1), (−1, 1, 1, 1, 1, −1, −1, −1), (1, 1, −1, 1, −1, −1, 1, −1)}, {(−1, 1, −1, −1, 1, 1, 1, −1), (1, −1,−1, 1, 1, 1, −1, −1), (1, 1, −1, −1, 1, −1, −1, 1), (1, 1, 1, −1, −1, 1, −1, −1), (1, −1, −1, −1, −1, 1, 1, 1), (1, 1, −1, 1, −1, −1, 1, −1)}, {(−1, 1, 1, −1, −1, −1, 1, 1), (−1, 1, 1, −1, 1, 1, −1, −1), (1, 1, −1, −1, −1, 1, 1, −1), (1, 1, −1, −1, 1, −1, −1, 1), (−1, −1, −1,−1, 1, 1, 1, 1), (−1, 1, −1, 1, 1, −1, 1, −1)}, {(−1, 1, 1, −1, −1, −1, 1, 1), (−1, 1, 1, −1, 1, 1, −1, −1), (1, 1, −1, −1, −1, 1, 1,−1), (1, 1, −1, −1, 1, −1, −1, 1), (−1, −1, −1, −1, 1, 1, 1, 1), (1, −1, 1, −1, −1, 1, −1, 1)}, {(−1, 1, 1, −1, −1, −1, 1, 1), (−1, 1, 1,−1, 1, 1, −1, −1), (1, 1, −1, −1, −1, 1, 1, −1), (1, 1, −1, −1, 1, −1, −1, 1), (−1, 1, −1, 1, 1, −1, 1, −1), (1, 1, 1, 1, −1, −1, −1, −1)}, {(−1, 1, 1, −1, −1, −1, 1, 1), (−1, 1, 1, −1, 1, 1, −1, −1), (1, 1, −1, −1, −1, 1, 1, −1), (1, 1, −1, −1, 1, −1, −1, 1), (1, −1, 1, −1, −1, 1,−1, 1), (1, 1, 1, 1, −1, −1, −1, −1)}, {(−1, 1, 1, −1, −1, −1, 1, 1), (1, −1, −1, 1, −1, −1, 1, 1), (1, 1, −1, −1, −1, 1, 1, −1), (1, 1, −1,−1, 1, −1, −1, 1), (−1, −1, −1, −1, 1, 1, 1, 1), (−1, 1, −1, 1, 1, −1, 1, −1)}, {(−1, 1, 1, −1, −1, −1, 1, 1), (1, −1, −1, 1, −1,−1, 1, 1), (1, 1, −1, −1, −1, 1, 1, −1), (1, 1, −1, −1, 1, −1, −1, 1), (−1, −1, −1, −1, 1, 1, 1, 1), (1, −1, 1, −1, −1, 1, −1, 1)}, {(−1, 1, 1, −1, −1, −1, 1, 1), (1, −1, −1, 1, −1, −1, 1, 1), (1, 1, −1, −1, −1, 1, 1, −1), (1, 1, −1, −1, 1, −1, −1, 1), (−1, 1, −1, 1, 1, −1, 1,−1), (1, 1, 1, 1, −1, −1, −1, −1)}, {(−1, 1, 1, −1, −1, −1, 1, 1), (1, −1, −1, 1, −1, −1, 1, 1), (1, 1, −1, −1, −1, 1, 1, −1), (1, 1, −1,−1, 1, −1, −1, 1), (1, −1, 1, −1, −1, 1, −1, 1), (1, 1, 1, 1, −1, −1, −1, −1)}, {(−1, 1, 1, −1, −1, −1, 1, 1), (1, −1, 1, 1, −1, −1,−1, 1), (1, 1, −1, −1, 1, −1, −1, 1), (1, 1, 1, −1, −1, 1, −1, −1), (−1, −1, 1, −1, 1, 1, −1, 1), (−1, 1, 1, 1, 1, −1, −1, −1)}, {(−1, 1, 1,−1, −1, −1, 1, 1), (1, −1, 1, 1, −1, −1, −1, 1), (1, 1, −1, −1, 1, −1, −1, 1), (1, 1, 1, −1, −1, 1, −1, −1), (−1, −1, 1, −1, 1, 1, −1, 1), (1,−1, −1, −1, −1, 1, 1, 1)}, {(−1, 1, 1, −1, −1, −1, 1, 1), (1, −1, 1, 1, −1, −1, −1, 1), (1, 1, −1, −1, 1, −1, −1, 1), (1, 1, 1, −1, −1, 1, −1,−1), (−1, 1, 1, 1, 1, −1, −1, −1), (1, 1, −1, 1, −1, −1, 1, −1)}, {(−1, 1, 1, −1, −1, −1, 1, 1), (1, −1, 1, 1, −1, −1, −1, 1), (1, 1, −1,−1, 1, −1, −1, 1), (1, 1, 1, −1, −1, 1, −1, −1), (1, −1, −1, −1, −1, 1, 1, 1), (1, 1, −1, 1, −1, −1, 1, −1)}, {(−1, 1, 1, −1, 1, 1, −1, −1), (−1, 1, 1, 1, −1, −1, 1, −1), (1, 1, −1, −1, −1, 1, 1, −1), (1, 1, −1, 1, 1, −1, −1, −1), (−1, −1, −1, 1, 1, 1, 1, −1), (−1, 1, −1, −1, 1,−1, 1, 1)}, {(−1, 1, 1, −1, 1, 1, −1, −1), (−1, 1, 1, 1, −1, −1, 1, −1), (1, 1, −1, −1, −1, 1, 1, −1), (1, 1, −1, 1, 1, −1, −1, −1), (−1, −1,−1, 1, 1, 1, 1, −1), (1, −1, 1, 1, −1, 1, −1, −1)}, {(−1, 1, 1, −1, 1, 1, −1, −1), (−1, 1, 1, 1, −1, −1, 1, −1), (1, 1, −1, −1, −1, 1, 1,−1), (1, 1, −1, 1, 1, −1, −1, −1), (−1, 1, −1, −1, 1, −1, 1, 1), (1, 1, 1, −1, −1, −1, −1, 1)}, {(−1, 1, 1, −1, 1, 1, −1, −1), (−1, 1, 1, 1,−1, −1, 1, −1), (1, 1, −1, −1, −1, 1, 1, −1), (1, 1, −1, 1, 1, −1, −1, −1), (1, −1, 1, 1, −1, 1, −1, −1), (1, 1, 1, −1, −1, −1, −1, 1)}, {(−1, 1, 1, −1, 1, 1, −1, −1), (1, −1, −1, −1, 1, 1, −1, 1), (1, 1, −1, −1, −1, 1, 1, −1), (1, 1, −1, 1, 1, −1, −1, −1), (−1, −1, −1, 1, 1, 1, 1,−1), (−1, 1, −1, −1, 1, −1, 1, 1)}, {(−1, 1, 1, −1, 1, 1, −1, −1), (1, −1, −1, −1, 1, 1, −1, 1), (1, 1, −1, −1, −1, 1, 1, −1), (1, 1,−1, 1, 1, −1, −1, −1), (−1, −1, −1, 1, 1, 1, 1, −1), (1, −1, 1, 1, −1, 1, −1, −1)}, {(−1, 1, 1, −1, 1, 1, −1, −1), (1, −1, −1, −1, 1, 1,−1, 1), (1, 1, −1, −1, −1, 1, 1, −1), (1, 1, −1, 1, 1, −1, −1, −1), (−1, 1, −1, −1, 1, −1, 1, 1), (1, 1, 1, −1, −1, −1, −1, 1)}, {(−1, 1, 1,−1, 1, 1, −1, −1), (1, −1, −1, −1, 1, 1, −1, 1), (1, 1, −1, −1, −1, 1, 1, −1), (1, 1, −1, 1, 1, −1, −1, −1), (1, −1, 1, 1, −1, 1, −1,−1), (1, 1, 1, −1, −1, −1, −1, 1)}, {(−1, 1, 1, −1, 1, 1, −1, −1), (1, −1, −1, 1, 1, 1, −1, −1), (1, 1, −1, −1, −1, 1, 1, −1), (1, 1, −1,−1, 1, −1, −1, 1), (−1, −1, −1, −1, 1, 1, 1, 1), (−1, 1, −1, 1, 1, −1, 1, −1)}, {(−1, 1, 1, −1, 1, 1, −1, −1), (1, −1, −1, 1, 1, 1, −1,−1), (1, 1, −1, −1, −1, 1, 1, −1), (1, 1, −1, −1, 1, −1, −1, 1), (−1, −1, −1, −1, 1, 1, 1, 1), (1, −1, 1, −1, −1, 1, −1, 1)}, {(−1, 1, 1,−1, 1, 1, −1, −1), (1, −1, −1, 1, 1, 1, −1, −1), (1, 1, −1, −1, −1, 1, 1, −1), (1, 1, −1, −1, 1, −1, −1, 1), (−1, 1, −1, 1, 1, −1, 1,−1), (1, 1, 1, 1, −1, −1, −1, −1)}, {(−1, 1, 1, −1, 1, 1, −1, −1), (1, −1, −1, 1, 1, 1, −1, −1), (1, 1, −1, −1, −1, 1, 1, −1), (1, 1, −1,−1, 1, −1, −1, 1), (1, −1, 1, −1, −1, 1, −1, 1), (1, 1, 1, 1, −1, −1, −1, −1)}, {(−1, 1, 1, 1, −1, −1, 1, −1), (1, −1, −1, 1, −1,−1, 1, 1), (1, 1, −1, −1, −1, 1, 1, −1), (1, 1, −1, 1, 1, −1, −1, −1), (−1, −1, −1, 1, 1, 1, 1, −1), (−1, 1, −1, −1, 1, −1, 1, 1)}, {(−1, 1, 1, 1, −1, −1, 1, −1), (1, −1, −1, 1, −1, −1, 1, 1), (1, 1, −1, −1, −1, 1, 1, −1), (1, 1, −1, 1, 1, −1, −1, −1), (−1, −1, −1, 1, 1, 1, 1,−1), (1, −1, 1, 1, −1, 1, −1, −1)}, {(−1, 1, 1, 1, −1, −1, 1, −1), (1, −1, −1, 1, −1, −1, 1, 1), (1, 1, −1, −1, −1, 1, 1, −1), (1, 1,−1, 1, 1, −1, −1, −1), (−1, 1, −1, −1, 1, −1, 1, 1), (1, 1, 1, −1, −1, −1, −1, 1)}, {(−1, 1, 1, 1, −1, −1, 1, −1), (1, −1, −1, 1, −1,−1, 1, 1), (1, 1, −1, −1, −1, 1, 1, −1), (1, 1, −1, 1, 1, −1, −1, −1), (1, −1, 1, 1, −1, 1, −1, −1), (1, 1, 1, −1, −1, −1, −1, 1)}, {(−1, 1, 1, 1, −1, −1, 1, −1), (1, −1, 1, 1, −1, −1, −1, 1), (1, 1, −1, 1, 1, −1, −1, −1), (1, 1, 1, −1, −1, 1, −1, −1), (−1, −1, 1, 1, 1, 1, −1,−1), (−1, 1, 1, −1, 1, −1, −1, 1)}, {(−1, 1, 1, 1, −1, −1, 1, −1), (1, −1, 1, 1, −1, −1, −1, 1), (1, 1, −1, 1, 1, −1, −1, −1), (1, 1, 1, −1,−1, 1, −1, −1), (−1, −1, 1, 1, 1, 1, −1, −1), (1, −1, −1, 1, −1, 1, 1, −1)}, {(−1, 1, 1, 1, −1, −1, 1, −1), (1, −1, 1, 1, −1, −1,−1, 1), (1, 1, −1, 1, 1, −1, −1, −1), (1, 1, 1, −1, −1, 1, −1, −1), (−1, 1, 1, −1, 1, −1, −1, 1), (1, 1, −1, −1, −1, −1, 1, 1)}, {(−1, 1, 1, 1, −1, −1, 1, −1), (1, −1, 1, 1, −1, −1, −1, 1), (1, 1, −1, 1, 1, −1, −1, −1), (1, 1, 1, −1, −1, 1, −1, −1), (1, −1, −1, 1, −1, 1, 1,−1), (1, 1, −1, −1, −1, −1, 1, 1)}, {(1, −1, −1, −1, 1, 1, −1, 1), (1, −1, −1, 1, −1, −1, 1, 1), (1, 1, −1, −1, −1, 1, 1, −1), (1, 1,−1, 1, 1, −1, −1, −1), (−1, −1, −1, 1, 1, 1, 1, −1), (−1, 1, −1, −1, 1, −1, 1, 1)}, {(1, −1, −1, −1, 1, 1, −1, 1), (1, −1, −1, 1, −1,−1, 1, 1), (1, 1, −1, −1, −1, 1, 1, −1), (1, 1, −1, 1, 1, −1, −1, −1), (−1, −1, −1, 1, 1, 1, 1, −1), (1, −1, 1, 1, −1, 1, −1, −1)}, {(1, −1,−1, −1, 1, 1, −1, 1), (1, −1, −1, 1, −1, −1, 1, 1), (1, 1, −1, −1, −1, 1, 1, −1), (1, 1, −1, 1, 1, −1, −1, −1), (−1, 1, −1, −1, 1,−1, 1, 1), (1, 1, 1, −1, −1, −1, −1, 1)}, {(1, −1, −1, −1, 1, 1, −1, 1), (1, −1, −1, 1, −1, −1, 1, 1), (1, 1, −1, −1, −1, 1, 1, −1), (1, 1,−1, 1, 1, −1, −1, −1), (1, −1, 1, 1, −1, 1, −1, −1), (1, 1, 1, −1, −1, −1, −1, 1)}, {(1, −1, −1, −1, 1, 1, −1, 1), (1, −1, 1, 1, −1, −1,−1, 1), (1, 1, −1, 1, 1, −1, −1, −1), (1, 1, 1, −1, −1, 1, −1, −1), (−1, −1, 1, 1, 1, 1, −1, −1), (−1, 1, 1, −1, 1, −1, −1, 1)}, {(1, −1, −1,−1, 1, 1, −1, 1), (1, −1, 1, 1, −1, −1, −1, 1), (1, 1, −1, 1, 1, −1, −1, −1), (1, 1, 1, −1, −1, 1, −1, −1), (−1, −1, 1, 1, 1, 1, −1, −1), (1, −1,−1, 1, −1, 1, 1, −1)}, {(1, −1, −1, −1, 1, 1, −1, 1), (1, −1, 1, 1, −1, −1, −1, 1), (1, 1, −1, 1, 1, −1, −1, −1), (1, 1, 1, −1, −1, 1, −1,−1), (−1, 1, 1, −1, 1, −1, −1, 1), (1, 1, −1, −1, −1, −1, 1, 1)}, {(1, −1, −1, −1, 1, 1, −1, 1), (1, −1, 1, 1, −1, −1, −1, 1), (1, 1,−1, 1, 1, −1, −1, −1), (1, 1, 1, −1, −1, 1, −1, −1), (1, −1, −1, 1, −1, 1, 1, −1), (1, 1, −1, −1, −1, −1, 1, 1)}, {(1, −1, −1, 1, −1,−1, 1, 1), (1, −1, −1, 1, 1, 1, −1, −1), (1, 1, −1, −1, −1, 1, 1, −1), (1, 1, −1, −1, 1, −1, −1, 1), (−1, −1, −1, −1, 1, 1, 1, 1), (−1, 1,−1, 1, 1, −1, 1, −1)}, {(1, −1, −1, 1, −1, −1, 1, 1), (1, −1, −1, 1, 1, 1, −1, −1), (1, 1, −1, −1, −1, 1, 1, −1), (1, 1, −1, −1, 1, −1,−1, 1), (−1, −1, −1, −1, 1, 1, 1, 1), (1, −1, 1, −1, −1, 1, −1, 1)}, {(1, −1, −1, 1, −1, −1, 1, 1), (1, −1, −1, 1, 1, 1, −1, −1), (1, 1, −1,−1, −1, 1, 1, −1), (1, 1, −1, −1, 1, −1, −1, 1), (−1, 1, −1, 1, 1, −1, 1, −1), (1, 1, 1, 1, −1, −1, −1, −1)}, {(1, −1, −1, 1, −1,−1, 1, 1), (1, −1, −1, 1, 1, 1, −1, −1), (1, 1, −1, −1, −1, 1, 1, −1), (1, 1, −1, −1, 1, −1, −1, 1), (1, −1, 1, −1, −1, 1, −1, 1), (1, 1, 1, 1,−1, −1, −1, −1)}, {(1, −1, −1, 1, 1, 1, −1, −1), (1, −1, 1, 1, −1, −1, −1, 1), (1, 1, −1, −1, 1, −1, −1, 1), (1, 1, 1, −1, −1, 1, −1, −1), (−1, −1, 1, −1, 1, 1, −1, 1), (−1, 1, 1, 1, 1, −1, −1, −1)}, {(1, −1, −1, 1, 1, 1, −1, −1), (1, −1, 1, 1, −1, −1, −1, 1), (1, 1, −1, −1, 1, −1,−1, 1), (1, 1, 1, −1, −1, 1, −1, −1), (−1, −1, 1, −1, 1, 1, −1, 1), (1, −1, −1, −1, −1, 1, 1, 1)}, {(1, −1, −1, 1, 1, 1, −1, −1), (1,−1, 1, 1, −1, −1, −1, 1), (1, 1, −1, −1, 1, −1, −1, 1), (1, 1, 1, −1, −1, 1, −1, −1), (−1, 1, 1, 1, 1, −1, −1, −1), (1, 1, −1, 1, −1, −1, 1,−1)}, {(1, −1, −1, 1, 1, 1, −1, −1), (1, −1, 1, 1, −1, −1, −1, 1), (1, 1, −1, −1, 1, −1, −1, 1), (1, 1, 1, 1, −1, 1, −1, −1), (1, −1, −1, −1,−1, 1, 1, 1), (1, 1, −1, 1, −1, −1, 1, −1) }, {(−1, −1, −1, −1, 1, 1, 1, 1), (−1, −1, 1, 1, 1, 1, −1, −1), (−1, 1, −1, 1, 1, −1, 1, −1), (−1, 1, 1, −1, 1, −1, −1, 1), (−1, −1, 1, 1, −1, −1, 1, 1), (−1, 1, 1, −1, −1, 1, 1, −1)}, {(−1, −1, −1, −1, 1, 1, 1, 1), (−1, −1, 1, 1, 1, 1,−1, −1), (−1, 1, −1, 1, 1, −1, 1, −1), (−1, 1, 1, −1, 1, −1, −1, 1), (−1, −1, 1, 1, −1, −1, 1, 1), (1, −1, −1, 1, 1, −1, −1, 1)}, {(−1, −1,−1, −1, 1, 1, 1, 1), (−1, −1, 1, 1, 1, 1, −1, −1), (−1, 1, −1, 1, 1, −1, 1, −1), (−1, 1, 1, −1, 1, −1, −1, 1), (−1, 1, 1, −1, −1, 1, 1,−1), (1, 1, −1, −1, 1, 1, −1, −1)}, {(−1, −1, −1, −1, 1, 1, 1, 1), (−1, −1, 1, 1, 1, 1, −1, −1), (−1, 1, −1, 1, 1, −1, 1, −1), (−1, 1, 1,−1, 1, −1, −1, 1), (1, −1, −1, 1, 1, −1, −1, 1), (1, 1, −1, −1, 1, 1, −1, −1)}, {(−1, −1, −1, −1, 1, 1, 1, 1), (−1, −1, 1, 1, 1, 1, −1, −1), (−1, 1, −1, 1, 1, −1, 1, −1), (1, −1, −1, 1, −1, 1, 1, −1), (−1, −1, 1, 1, −1, −1, 1, 1), (−1, 1, 1, −1, −1, 1, 1, −1)}, {(−1, −1, −1,−1, 1, 1, 1, 1), (−1, −1, 1, 1, 1, 1, −1, −1), (−1, 1, −1, 1, 1, −1, 1, −1), (1, −1, −1, 1, −1, 1, 1, −1), (−1, −1, 1, 1, −1, −1, 1, 1), (1, −1,−1, 1, 1, −1, −1, 1)}, {(−1, −1, −1, −1, 1, 1, 1, 1), (−1, −1, 1, 1, 1, 1, −1, −1), (−1, 1, −1, 1, 1, −1, 1, −1), (1, −1, −1, 1, −1, 1, 1,−1), (−1, 1, 1, −1, −1, 1, 1, −1), (1, 1, −1, −1, 1, 1, −1, −1)}, {(−1, −1, −1, −1, 1, 1, 1, 1), (−1, −1, 1, 1, 1, 1, −1, −1), (−1, 1,−1, 1, 1, −1, 1, −1), (1, −1, −1, 1, −1, 1, 1, −1), (1, −1, −1, 1, 1, −1, −1, 1), (1, 1, −1, −1, 1, 1, −1, −1)}, {(−1, −1, −1,−1, 1, 1, 1, 1), (−1, −1, 1, 1, 1, 1, −1, −1), (−1, 1, 1, −1, 1, −1, −1, 1), (1, −1, 1, −1, −1, 1, −1, 1), (−1, −1, 1, 1, −1, −1, 1, 1), (−1, 1, 1, −1, −1, 1, 1, −1)}, {(−1, −1, −1, −1, 1, 1, 1, 1), (−1, −1, 1, 1, 1, 1, −1, −1), (−1, 1, 1, −1, 1, −1, −1, 1), (1, −1, 1, −1, −1, 1,−1, 1), (−1, −1, 1, 1, −1, −1, 1, 1), (1, −1, −1, 1, 1, −1, −1, 1)}, {(−1, −1, −1, −1, 1, 1, 1, 1), (−1, −1, 1, 1, 1, 1, −1, −1), (−1, 1, 1,−1, 1, −1, −1, 1), (1, −1, 1, −1, −1, 1, −1, 1), (−1, 1, 1, −1, −1, 1, 1, −1), (1, 1, −1, −1, 1, 1, −1, −1)}, {(−1, −1, −1, −1, 1, 1, 1, 1), (−1, −1, 1, 1, 1, 1, −1, −1), (−1, 1, 1, −1, 1, −1, −1, 1), (1, −1, 1, −1, −1, 1, −1, 1), (1, −1, −1, 1, 1, −1, −1, 1), (1, 1, −1, −1, 1, 1, −1,−1)}, {(−1, −1, −1, −1, 1, 1, 1, 1), (−1, −1, 1, 1, 1, 1, −1,−1), (1, −1, −1, 1, −1, 1, 1, −1), (1, −1, 1, −1, −1, 1, −1, 1), (−1, −1, 1, 1,−1, −1, 1, 1), (−1, 1, 1, −1, −1, 1, 1, −1)}, {(−1, −1, −1, −1, 1, 1, 1, 1), (−1, −1, 1, 1, 1, 1, −1, −1), (1, −1, −1, 1, −1, 1, 1, −1), (1,−1, 1, −1, −1, 1, −1, 1), (−1, −1, 1, 1, −1, −1, 1, 1), (1, −1, −1, 1, 1, −1, −1, 1)}, {(−1, −1, −1, −1, 1, 1, 1, 1), (−1, −1, 1, 1, 1, 1, −1,−1), (1, −1, −1, 1, −1, 1, 1, −1), (1, −1, 1, −1, −1, 1, −1, 1), (−1, 1, 1, −1, −1, 1, 1, −1), (1, 1, −1, −1, 1, 1, −1, −1)}, {(−1, −1, −1,−1, 1, 1, 1, 1), (−1, −1, 1, 1, 1, 1, −1, −1), (1, −1, −1, 1, −1, 1, 1, −1), (1, −1, 1, −1, −1, 1, −1, 1), (1, −1, −1, 1, 1, −1, −1, 1), (1, 1,−1, −1, 1, 1, −1, −1)}, {(−1, −1, −1, −1, 1, 1, 1, 1), (−1, 1, −1, 1, 1, −1, 1, −1), (−1, 1, 1, −1, 1, −1, −1, 1), (1, 1, −1, −1, −1,−1, 1, 1), (−1, −1, 1, 1, −1, −1, 1, 1), (−1, 1, 1, −1, −1, 1, 1, −1)}, {(−1, −1, −1, −1, 1, 1, 1, 1), (−1, 1, −1, 1, 1, −1, 1, −1), (−1, 1, 1, −1, 1, −1, −1, 1), (1, 1, −1, −1, −1, −1, 1, 1), (−1, −1, 1, 1, −1, −1, 1, 1), (1, −1, −1, 1, 1, −1, −1, 1)}, {(−1, −1, −1,−1, 1, 1, 1, 1), (−1, 1, −1, 1, 1, −1, 1, −1), (−1, 1, 1, −1, 1, −1, −1, 1), (1, 1, −1, −1, −1, −1, 1, 1), (−1, 1, 1, −1, −1, 1, 1, −1), (1, 1,−1, −1, 1, 1, −1, −1)}, {(−1, −1, −1, −1, 1, 1, 1, 1), (−1, 1, −1, 1, 1, −1, 1, −1), (−1, 1, 1, −1, 1, −1, −1, 1), (1, 1, −1, −1, −1,−1, 1, 1), (1, −1, −1, 1, 1, −1, −1, 1), (1, 1, −1, −1, 1, 1, −1, −1)}, {(−1, −1, −1, −1, 1, 1, 1, 1), (−1, 1, −1, 1, 1, −1, 1, −1), (1, −1,−1, 1, −1, 1, 1, −1), (1, 1, −1, −1, −1, −1, 1, 1), (−1, −1, 1, 1, −1, −1, 1, 1), (−1, 1, 1, −1, −1, 1, 1, −1)}, {(−1, −1, −1,−1, 1, 1, 1, 1), (−1, 1, −1, 1, 1, −1, 1, −1), (1, −1, −1, 1, −1, 1, 1, −1), (1, 1, −1, −1, −1, −1, 1, 1), (−1, −1, 1, 1, −1, −1, 1, 1), (1, −1,−1, 1, 1, −1, −1, 1)}, {(−1, −1, −1, −1, 1, 1, 1, 1), (−1, 1, −1, 1, 1, −1, 1, −1), (1, −1, −1, 1, −1, 1, 1, −1), (1, 1, −1, −1, −1,−1, 1, 1), (−1, 1, 1, −1, −1, 1, 1, −1), (1, 1, −1, −1, 1, 1, −1, −1)}, {(−1, −1, −1, −1, 1, 1, 1, 1), (−1, 1, −1, 1, 1, −1, 1, −1), (1, −1,−1, 1, −1, 1, 1, −1), (1, 1, −1, −1, −1, −1, 1, 1), (1, −1, −1, 1, 1, −1, −1, 1), (1, 1, −1, −1, 1, 1, −1, −1)}, {(−1, −1, −1,−1, 1, 1, 1, 1), (−1, 1, 1, −1, 1, −1, −1, 1), (1, −1, 1, −1, −1, 1, −1, 1), (1, 1, −1, −1, −1, −1, 1, 1), (−1, −1, 1, 1, −1, −1, 1, 1), (−1, 1, 1, −1, −1, 1, 1, −1)}, {(−1, −1, −1, −1, 1, 1, 1, 1), (−1, 1, 1, −1, 1, −1, −1, 1), (1, −1, 1, −1, −1, 1, −1, 1), (1, 1, −1, −1, −1,−1, 1, 1), (−1, −1, 1, 1, −1, −1, 1, 1), (1, −1, −1, 1, 1, −1, −1, 1)}, {(−1, −1, −1, −1, 1, 1, 1, 1), (−1, 1, 1, −1, 1, −1, −1, 1), (1,−1, 1, −1, −1, 1, −1, 1), (1, 1, −1, −1, −1, −1, 1, 1), (−1, 1, 1, −1, −1, 1, 1, −1), (1, 1, −1, −1, 1, 1, −1, −1)}, {(−1, −1, −1,−1, 1, 1, 1, 1), (−1, 1, 1, −1, 1, −1, −1, 1), (1, −1, 1, −1, −1, 1, −1, 1), (1, 1, −1, −1, −1, −1, 1, 1), (1, −1, −1, 1, 1, −1, −1, 1), (1, 1,−1, −1, 1, 1, −1, −1)}, {(−1, −1, −1, −1, 1, 1, 1, 1), (1, −1, −1, 1, −1, 1, 1, −1), (1, −1, 1, −1, −1, 1, −1, 1), (1, 1, −1, −1, −1,−1, 1, 1), (−1, −1, 1, 1, −1, −1, 1, 1), (−1, 1, 1, −1, −1, 1, 1, −1)}, {(−1, −1, −1, −1, 1, 1, 1, 1), (1, −1, −1, 1, −1, 1, 1, −1), (1,−1, 1, −1, −1, 1, −1, 1), (1, 1, −1, −1, −1, −1, 1, 1), (−1, −1, 1, 1, −1, −1, 1, 1), (1, −1, −1, 1, 1, −1, −1, 1)}, {(−1, −1, −1,−1, 1, 1, 1, 1), (1, −1, −1, 1, −1, 1, 1, −1), (1, −1, 1, −1, −1, 1, −1, 1), (1, 1, −1, −1, −1, −1, 1, 1), (−1, 1, 1, −1, −1, 1, 1, −1), (1, 1,−1, −1, 1, 1, −1, −1)}, {(−1, −1, −1, −1, 1, 1, 1, 1), (1, −1, −1, 1, −1, 1, 1, −1), (1, −1, 1, −1, −1, 1, −1, 1), (1, 1, −1, −1, −1,−1, 1, 1), (1, −1, −1, 1, 1, −1, −1, 1), (1, 1, −1, −1, 1, 1, −1, −1)}, {(−1, −1, −1, 1, 1, 1, 1, −1), (−1, −1, 1, −1, 1, 1, −1, 1), (−1, 1,−1, −1, 1, −1, 1, 1), (−1, 1, 1, 1, 1, −1, −1, −1), (−1, −1, 1, 1, −1, −1, 1, 1), (−1, 1, 1, −1, −1, 1, 1, −1)}, {(−1, −1, −1, 1, 1, 1, 1,−1), (−1, −1, 1, −1, 1, 1, −1, 1), (−1, 1, −1, −1, 1, −1, 1, 1), (−1, 1, 1, 1, 1, −1, −1, −1), (−1, −1, 1, 1, −1, −1, 1, 1), (1, −1, −1, 1, 1,−1, −1, 1)}, {(−1, −1, −1, 1, 1, 1, 1, −1), (−1, −1, 1, −1, 1, 1, −1, 1), (−1, 1, −1, −1, 1, −1, 1, 1), (−1, 1, 1, 1, 1, −1, −1, −1), (−1, 1, 1, −1, −1, 1, 1, −1), (1, 1, −1, −1, 1, 1, −1, −1)}, {(−1, −1, −1, 1, 1, 1, 1, −1), (−1, −1, 1, −1, 1, 1, −1, 1), (−1, 1, −1, −1, 1,−1, 1, 1), (−1, 1, 1, 1, 1, −1, −1, −1), (1, −1, −1, 1, 1, −1, −1, 1), (1, 1, −1, −1, 1, 1, −1, −1)}, {(−1, −1, −1, 1, 1, 1, 1, −1), (−1,−1, 1, −1, 1, 1, −1, 1), (−1, 1, −1, −1, 1, −1, 1, 1), (1, −1, −1, −1, −1, 1, 1, 1), (−1, −1, 1, 1, −1, −1, 1, 1), (−1, 1, 1, −1, −1, 1, 1, −1)}, {(−1, −1, −1, 1, 1, 1, 1, −1), (−1, −1, 1, −1, 1, 1, −1, 1), (−1, 1, −1, −1, 1, −1, 1, 1), (1, −1, −1, −1, −1, 1, 1, 1), (−1, −1, 1, 1, −1,−1, 1, 1), (1, −1, −1, 1, 1, −1, −1, 1)}, {(−1, −1, −1, 1, 1, 1, 1, −1), (−1, −1, 1, −1, 1, 1, −1, 1), (−1, 1, −1, −1, 1, −1, 1, 1), (1, −1,−1, −1, −1, 1, 1, 1), (−1, 1, 1, −1, −1, 1, 1, −1), (1, 1, −1, −1, 1, 1, −1, −1)}, {(−1, −1, −1, 1, 1, 1, 1, −1), (−1, −1, 1, −1, 1, 1,−1, 1), (−1, 1, −1, −1, 1, −1, 1, 1), (1, −1, −1, −1, −1, 1, 1, 1), (1, −1, −1, 1, 1, −1, −1, 1), (1, 1, −1, −1, 1, 1, −1, −1)}, {(−1, −1,−1, 1, 1, 1, 1, −1), (−1, −1, 1, −1, 1, 1, −1, 1), (−1, 1, 1, 1, 1, −1, −1, −1), (1, −1, 1, 1, −1, 1, −1, −1), (−1, −1, 1, 1, −1, −1, 1, 1), (−1, 1, 1, −1, −1, 1, 1, −1)}, {(−1, −1, −1, 1, 1, 1, 1, −1), (−1, −1, 1, −1, 1, 1, −1, 1), (−1, 1, 1, 1, 1, −1, −1, −1), (1, −1, 1, 1, −1, 1,−1, −1), (−1, −1, 1, 1, −1, −1, 1, 1), (1, −1, −1, 1, 1, −1, −1, 1)}, {(−1, −1, −1, 1, 1, 1, 1, −1), (−1, −1, 1, −1, 1, 1, −1, 1), (−1, 1, 1, 1, 1, −1, −1, −1), (1, −1, 1, 1, −1, 1, −1, −1), (−1, 1, 1, −1, −1, 1, 1, −1), (1, 1, −1, −1, 1, 1, −1, −1)}, {(−1, −1,−1, 1, 1, 1, 1, −1), (−1, −1, 1, −1, 1, 1, −1, 1), (−1, 1, 1, 1, 1, −1, −1, −1), (1, −1, 1, 1, −1, 1, −1, −1), (1, −1, −1, 1, 1, −1,−1, 1), (1, 1, −1, −1, 1, 1, −1, −1)}, {(−1, −1, −1, 1, 1, 1, 1, −1), (−1, −1, 1, −1, 1, 1, −1, 1), (1, −1, −1, −1, −1, 1, 1, 1), (1,−1, 1, 1, −1, 1, −1, −1), (−1, −1, 1, 1, −1, −1, 1, 1), (−1, 1, 1, −1, −1, 1, 1, −1)}, {(−1, −1, −1, 1, 1, 1, 1, −1), (−1, −1, 1, −1, 1, 1,−1, 1), (1, −1, −1, −1, −1, 1, 1, 1), (1, −1, 1, 1, −1, 1, −1, −1), (−1, −1, 1, 1, −1, −1, 1, 1), (1, −1, −1, 1, 1, −1, −1, 1)}, {(−1, −1,−1, 1, 1, 1, 1, −1), (−1, −1, 1, −1, 1, 1, −1, 1), (1, −1, −1, −1, −1, 1, 1, 1), (1, −1, 1, 1, −1, 1, −1, −1), (−1, 1, 1, −1, −1, 1, 1,−1), (1, 1, −1, −1, 1, 1, −1, −1)}, {(−1, −1, −1, 1, 1, 1, 1, −1), (−1, −1, 1, −1, 1, 1, −1, 1), (1, −1, −1, −1, −1, 1, 1, 1), (1, −1, 1, 1,−1, 1, −1, −1), (1, −1, −1, 1, 1, −1, −1, 1), (1, 1, −1, −1, 1, 1, −1, −1)}, {(−1, −1, −1, 1, 1, 1, 1, −1), (−1, 1, −1, −1, 1, −1, 1, 1), (−1, 1, 1, 1, 1, −1, −1, −1), (1, 1, −1, 1, −1, −1, 1, −1), (−1, −1, 1, 1, −1, −1, 1, 1), (−1, 1, 1, −1, −1, 1, 1, −1)}, {(−1, −1,−1, 1, 1, 1, 1, −1), (−1, 1, −1, −1, 1, −1, 1, 1), (−1, 1, 1, 1, 1, −1, −1, −1), (1, 1, −1, 1, −1, −1, 1, −1), (−1, −1, 1, 1, −1, −1, 1, 1), (1,−1, −1, 1, 1, −1, −1, 1)}, {(−1, −1, −1, 1, 1, 1, 1, −1), (−1, 1, −1, −1, 1, −1, 1, 1), (−1, 1, 1, 1, 1, −1, −1, −1), (1, 1, −1, 1, −1, −1, 1,−1), (−1, 1, 1, −1, −1, 1, 1, −1), (1, 1, −1, −1, 1, 1, −1, −1)}, {(−1, −1, −1, 1, 1, 1, 1, −1), (−1, 1, −1, −1, 1, −1, 1, 1), (−1, 1, 1, 1, 1, −1, −1, −1), (1, 1, −1, 1, −1, −1, 1, −1), (1, −1, −1, 1, 1, −1, −1, 1), (1, 1, −1, −1, 1, 1, −1, −1)}, {(−1, −1,−1, 1, 1, 1, 1, −1), (−1, 1, −1, −1, 1, −1, 1, 1), (1, −1, −1, −1, −1, 1, 1, 1), (1, 1, −1, 1, −1, −1, 1, −1), (−1, −1, 1, 1, −1, −1, 1, 1), (−1, 1, 1, −1, −1, 1, 1, −1)}, {(−1, −1, −1, 1, 1, 1, 1, −1), (−1, 1, −1, −1, 1, −1, 1, 1), (1, −1, −1, −1, −1, 1, 1, 1), (1, 1, −1, 1, −1,−1, 1, −1), (−1, −1, 1, 1, −1, −1, 1, 1), (1, −1, −1, 1, 1, −1, −1, 1)}, {(−1, −1, −1, 1, 1, 1, 1, −1), (−1, 1, −1, −1, 1, −1, 1, 1), (1, −1,−1, −1, −1, 1, 1, 1), (1, 1, −1, 1, −1, −1, 1, −1), (−1, 1, 1, −1, −1, 1, 1, −1), (1, 1, −1, −1, 1, 1, −1, −1)}, {(−1, −1, −1, 1, 1, 1, 1,−1), (−1, 1, −1, −1, 1, −1, 1, 1), (1, −1, −1, −1, −1, 1, 1, 1), (1, 1, −1, 1, −1, −1, 1, −1), (1, −1, −1, 1, 1, −1, −1, 1), (1, 1, −1, −1, 1, 1,−1, −1)}, {(−1, −1, −1, 1, 1, 1, 1, −1), (−1, 1, 1, 1, 1, −1, −1, −1), (1, −1, 1, 1, −1, 1, −1, −1), (1, 1, −1, 1, −1, −1, 1, −1), (−1,−1, 1, 1, −1, −1, 1, 1), (−1, 1, 1, −1, −1, 1, 1, −1)}, {(−1, −1, −1, 1, 1, 1, 1, −1), (−1, 1, 1, 1, 1, −1, −1, −1), (1, −1, 1, 1, −1, 1, −1,−1), (1, 1, −1, 1, −1, −1, 1, −1), (−1, −1, 1, 1, −1, −1, 1, 1), (1, −1, −1, 1, 1, −1, −1, 1)}, {(−1, −1, −1, 1, 1, 1, 1, −1), (−1, 1, 1, 1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, −1, −1, 1, 1, −1,−1)}, {(−1, −1, −1, 1, 1, 1, 1, −1), (−1, 1, 1, 1, 1, −1, −1, −1), (1, −1, 1, 1, −1, 1, −1, −1), (1, 1, −1, 1, −1, −1, 1, −1), (1, −1,−1, 1, 1, −1, −1, 1), (1, 1, −1, −1, 1, 1, −1, −1)}, {(−1, −1, −1, 1, 1, 1, 1, −1), (1, −1, −1, −1, −1, 1, 1, 1), (1, −1, 1, 1, −1, 1, −1,−1), (1, 1, −1, 1, −1, −1, 1, −1), (−1, −1, 1, 1, −1, −1, 1, 1), (−1, 1, 1, −1, −1, 1, 1, −1)}, {(−1, −1, −1, 1, 1, 1, 1, −1), (1, −1, −1, −1,−1, 1, 1, 1), (1, −1, 1, 1, −1, 1, −1, −1), (1, 1, −1, 1, −1, −1, 1, −1), (−1, −1, 1, 1, −1, −1, 1, 1), (1, −1, −1, 1, 1, −1, −1, 1)}, {(−1,−1, −1, 1, 1, 1, 1, −1), (1, −1, −1, −1, −1, 1, 1, 1), (1, −1, 1, 1, −1, 1, −1, −1), (1, 1, −1, 1, −1, −1, 1, −1), (−1, 1, 1, −1, −1, 1, 1,−1), (1, 1, −1, −1, 1, 1, −1, −1)}, {(−1, −1, −1, 1, 1, 1, 1, −1), (1, −1, −1, −1, −1, 1, 1, 1), (1, −1, 1, 1, −1, 1, −1, −1), (1, 1, −1, 1,−1, −1, 1, −1), (1, −1, −1, 1, 1, −1, −1, 1), (1, 1, −1, −1, 1, 1, −1, −1)}, {(−1, −1, 1, −1, 1, 1, −1, 1), (−1, 1, −1, −1, 1, −1, 1, 1), (−1, 1, 1, 1, 1, −1, −1, −1), (1, 1, 1, −1, −1, −1, −1, 1), (−1, −1, 1, 1, −1, −1, 1, 1), (−1, 1, 1, −1, −1, 1, 1, −1)}, {(−1, −1, 1, −1, 1, 1,−1, 1), (−1, 1, −1, −1, 1, −1, 1, 1), (−1, 1, 1, 1, 1, −1, −1, −1), (1, 1, 1, −1, −1, −1, −1, 1), (−1, −1, 1, 1, −1, −1, 1, 1), (1, −1, −1, 1, 1,−1, −1, 1)}, {(−1, −1, 1, −1, 1, 1, −1, 1), (−1, 1, −1, −1, 1, −1, 1, 1), (−1, 1, 1, 1, 1, −1, −1, −1), (1, 1, 1, −1, −1, −1, −1, 1), (−1, 1, 1, −1, −1, 1, 1, −1), (1, 1, −1, −1, 1, 1, −1, −1)}, {(−1, −1, 1, −1, 1, 1, −1, 1), (−1, 1, −1, −1, 1, −1, 1, 1), (−1, 1, 1, 1, 1, −1,−1, −1), (1, 1, 1, −1, −1, −1, −1, 1), (1, −1, −1, 1, 1, −1, −1, 1), (1, 1, −1, −1, 1, 1, −1, −1)}, {(−1, −1, 1, −1, 1, 1, −1, 1), (−1, 1, −1,−1, 1, −1, 1, 1), (1, −1, −1, −1, −1, 1, 1, 1), (1, 1, 1, −1, −1, −1, −1, 1), (−1, −1, 1, 1, −1, −1, 1, 1), (−1, 1, 1, −1, −1, 1, 1, −1)}, {(−1, −1, 1, −1, 1, 1, −1, 1), (−1, 1, −1, −1, 1, −1, 1, 1), (1, −1, −1, −1, −1, 1, 1, 1), (1, 1, 1, −1, −1, −1, −1, 1), (−1, −1, 1, 1, −1,−1, 1, 1), (1, −1, −1, 1, 1, −1, −1, 1)}, {(−1, −1, 1, −1, 1, 1, −1, 1), (−1, 1, −1, −1, 1, −1, 1, 1), (1, −1, −1, −1, −1, 1, 1, 1), (1, 1, 1,−1, −1, −1, −1, 1), (−1, 1, 1, −1, −1, 1, 1, −1), (1, 1, −1, −1, 1, 1, −1, −1)}, {(−1, −1, 1, −1, 1, 1, −1, 1), (−1, 1, −1, −1, 1,−1, 1, 1), (1, −1, −1, −1, −1, 1, 1, 1), (1, 1, 1, −1, −1, −1, −1, 1), (1, −1, −1, 1, 1, −1, −1, 1), (1, 1, −1, −1, 1, 1, −1, −1)}, {(−1,−1, 1, −1, 1, 1, −1, 1), (−1, 1, 1, 1, 1, −1, −1, −1), (1, −1, 1, 1, −1, 1, −1, −1), (1, 1, 1, −1, −1, −1, −1, 1), (−1, −1, 1, 1, −1, −1, 1, 1), (−1, 1, 1, −1, −1, 1, 1, −1)}, {(−1, −1, 1, −1, 1, 1, −1, 1), (−1, 1, 1, 1, 1, −1, −1, −1), (1, −1, 1, 1, −1, 1, −1, −1), (1, 1, 1, −1, −1, −1,−1, 1), (−1, −1, 1, 1, −1, −1, 1, 1), (1, −1, −1, 1, 1, −1, −1, 1)}, {(−1, −1, 1, −1, 1, 1, −1, 1), (−1, 1, 1, 1, 1, −1, −1, −1), (1,−1, 1, 1, −1, 1, −1, −1), (1, 1, 1, −1, −1, −1, −1, 1), (−1, 1, 1, −1, −1, 1, 1, −1), (1, 1, −1, −1, 1, 1, −1, −1)}, {(−1, −1, 1, −1, 1, 1,−1, 1), (−1, 1, 1, 1, 1, −1, −1, −1), (1, −1, 1, 1, −1, 1, −1, −1), (1, 1, 1, −1, −1, −1, −1, 1), (1, −1, −1, 1, 1, −1, −1, 1), (1, 1, −1,−1, 1, 1, −1, −1)}, {(−1, −1, 1, −1, 1, 1, −1, 1), (1, −1, −1, −1, −1, 1, 1, 1), (1, −1, 1, 1, −1, 1, −1, −1), (1, 1, 1, −1, −1, −1, −1, 1), (−1, −1, 1, 1, −1, −1, 1, 1), (−1, 1, 1, −1, −1, 1, 1, −1)}, {(−1, −1, 1, −1, 1, 1, −1, 1), (1, −1, −1, −1, −1, 1, 1, 1), (1, −1, 1, 1, −1, 1,−1, −1), (1, 1, 1, −1, −1, −1, −1, 1), (−1, −1, 1, 1, −1, −1, 1, 1), (1, −1, −1, 1, 1, −1, −1, 1)}, {(−1, −1, 1, −1, 1, 1, −1, 1), (1, −1, −1,−1, −1, 1, 1, 1), (1, −1, 1, 1, −1, 1, −1, −1), (1, 1, 1, −1, −1, −1, −1, 1), (−1, 1, 1, −1, −1, 1, 1, −1), (1, 1, −1, −1, 1, 1, −1, −1)}, {(−1, −1, 1, −1, 1, 1, −1, 1), (1, −1, −1, −1, −1, 1, 1, 1), (1, −1, 1, 1, −1, 1, −1, −1), (1, 1, 1, −1, −1, −1, −1, 1), (1, −1, −1, 1, 1, −1,−1, 1), (1, 1, −1, −1, 1, 1, −1, −1)}, {(−1, −1, 1, 1, 1, 1, −1, −1), (−1, 1, −1, 1, 1, −1, 1, −1), (−1, 1, 1, −1, 1, −1, −1, 1), (1, 1, 1, 1,−1, −1, −1, −1), (−1, −1, 1, 1, −1, −1, 1, 1), (−1, 1, 1, −1, −1, 1, 1, −1)}, {(−1, −1, 1, 1, 1, 1, −1, −1), (−1, 1, −1, 1, 1, −1, 1, −1), (−1, 1, 1, −1, 1, −1, −1, 1), (1, 1, 1, 1, −1, −1, −1, −1), (−1, −1, 1, 1, −1, −1, 1, 1), (1, −1, −1, 1, 1, −1, −1, 1)}, {(−1, −1, 1, 1, 1, 1,−1, −1), (−1, 1, −1, 1, 1, −1, 1, −1), (−1, 1, 1, −1, 1, −1, −1, 1), (1, 1, 1, 1, −1, −1, −1, −1), (−1, 1, 1, −1, −1, 1, 1, −1), (1, 1, −1,−1, 1, 1, −1, −1)}, {(−1, −1, 1, 1, 1, 1, −1, −1), (−1, 1, −1, 1, 1, −1, 1, −1), (−1, 1, 1, −1, 1, −1, −1, 1), (1, 1, 1, 1, −1, −1, −1,−1), (1, −1, −1, 1, 1, −1, −1, 1), (1, 1, −1, −1, 1, 1, −1, −1)}, {(−1, −1, 1, 1, 1, 1, −1, −1), (−1, 1, −1, 1, 1, −1, 1, −1), (1, −1, −1, 1,−1, 1, 1, −1), (1, 1, 1, 1, −1, −1, −1, −1), (−1, −1, 1, 1, −1, −1, 1, 1), (−1, 1, 1, −1, −1, 1, 1, −1)}, {(−1, −1, 1, 1, 1, 1, −1, −1), (−1, 1, −1, 1, 1, −1, 1, −1), (1, −1, −1, 1, −1, 1, 1, −1), (1, 1, 1, 1, −1, −1, −1, −1), (−1, −1, 1, 1, −1, −1, 1, 1), (1, −1, −1, 1, 1, −1,−1, 1)}, {(−1, −1, 1, 1, 1, 1, −1, −1), (−1, 1, −1, 1, 1, −1, 1, −1), (1, −1, −1, 1, −1, 1, 1, −1), (1, 1, 1, 1, −1, −1, −1, −1), (−1, 1, 1,−1, −1, 1, 1, −1), (1, 1, −1, −1, 1, 1, −1, −1)}, {(−1, −1, 1, 1, 1, 1, −1, −1), (−1, 1, −1, 1, 1, −1, 1, −1), (1, −1, −1, 1, −1, 1, 1,−1), (1, 1, 1, 1, −1, −1, −1, −1), (1, −1, −1, 1, 1, −1, −1, 1), (1, 1, −1, −1, 1, 1, −1, −1)}, {(−1, −1, 1, 1, 1, 1, −1, −1), (−1, 1, 1,−1, 1, −1, −1, 1), (1, −1, 1, −1, −1, 1, −1, 1), (1, 1, 1, 1, −1, −1, −1, −1), (−1, −1, 1, 1, −1, −1, 1, 1), (−1, 1, 1, −1, −1, 1, 1, −1)}, {(−1, −1, 1, 1, 1, 1, −1, −1), (−1, 1, 1, −1, 1, −1, −1, 1), (1, −1, 1, −1, −1, 1, −1, 1), (1, 1, 1, 1, −1, −1, −1, −1), (−1, −1, 1, 1, −1,−1, 1, 1), (1, −1, −1, 1, 1, −1, −1, 1)}, {(−1, −1, 1, 1, 1, 1, −1, −1), (−1, 1, 1, −1, 1, −1, −1, 1), (1, −1, 1, −1, −1, 1,−1, 1), (1, 1, 1, 1, −1, −1, −1, −1), (−1, 1, 1, −1, −1, 1, 1, −1), (1, 1, −1, −1, 1, 1, −1, −1)}, {(−1, −1, 1, 1, 1, 1, −1, −1), (−1, 1, 1,−1, 1, −1, −1, 1), (1, −1, 1, −1, −1, 1, −1, 1), (1, 1, 1, 1, −1, −1, −1, −1), (1, −1, −1, 1, 1, −1, −1, 1), (1, 1, −1, −1, 1, 1, −1, −1)}, {(−1, −1, 1, 1, 1, 1, −1, −1), (1, −1, −1, 1, −1, 1, 1, −1), (1, −1, 1, −1, −1, 1, −1, 1), (1, 1, 1, 1, −1, −1, −1, −1), (−1, −1, 1, 1, −1,−1, 1, 1), (−1, 1, 1, −1, −1, 1, 1, −1)}, {(−1, −1, 1, 1, 1, 1, −1, −1), (1, −1, −1, 1, −1, 1, 1, −1), (1, −1, 1, −1, −1, 1,−1, 1), (1, 1, 1, 1, −1, −1, −1, −1), (−1, −1, 1, 1, −1, −1, 1, 1), (1, −1, −1, 1, 1, −1, −1, 1)}, {(−1, −1, 1, 1, 1, 1, −1, −1), (1, −1,−1, 1, −1, 1, 1, −1), (1, −1, 1, −1, −1, 1, −1, 1), (1, 1, 1, 1, −1, −1, −1, −1), (−1, 1, 1, −1, −1, 1, 1, −1), (1, 1, −1, −1, 1, 1, −1, −1)}, {(−1, −1, 1, 1, 1, 1, −1, −1), (1, −1, −1, 1, −1, 1, 1, −1), (1, −1, 1, −1, −1, 1, −1, 1), (1, 1, 1, 1, −1, −1, −1, −1), (1, −1, −1, 1, 1, −1,−1, 1), (1, 1, −1, −1, 1, 1, −1, −1)}, {(−1, 1, −1, −1, 1, −1, 1, 1), (−1, 1, 1, 1, 1, −1, −1, −1), (1, 1, −1, 1, −1, −1, 1, −1), (1, 1, 1,−1, −1, −1, −1, 1), (−1, −1, 1, 1, −1, −1, 1, 1), (−1, 1, 1, −1, −1, 1, 1, −1)}, {(−1, 1, −1, −1, 1, −1, 1, 1), (−1, 1, 1, 1, 1, −1, −1,−1), (1, 1, −1, 1, −1, −1, 1, −1), (1, 1, 1, −1, −1, −1, −1, 1), (−1, −1, 1, 1, −1, −1, 1, 1), (1, −1, −1, 1, 1, −1, −1, 1)}, {(−1, 1, −1,−1, 1, −1, 1, 1), (−1, 1, 1, 1, 1, −1, −1, −1), (1, 1, −1, 1, −1, −1, 1, −1), (1, 1, 1, −1, −1, −1, −1, 1), (−1, 1, 1, −1, −1, 1, 1, −1), (1, 1,−1, −1, 1, 1, −1, −1)}, {(−1, 1, −1, −1, 1, −1, 1, 1), (−1, 1, 1, 1, 1, −1, −1, −1), (1, 1, −1, 1, −1, −1, 1, −1), (1, 1, 1, −1, −1, −1,−1, 1), (1, −1, −1, 1, 1, −1, −1, 1), (1, 1, −1, −1, 1, 1, −1, −1)}, {(−1, 1, −1, −1, 1, −1, 1, 1), (1, −1, −1, −1, −1, 1, 1, 1), (1, 1,−1, 1, −1, −1, 1, −1), (1, 1, 1, −1, −1, −1, −1, 1), (−1, −1, 1, 1, −1, −1, 1, 1), (−1, 1, 1, −1, −1, 1, 1, −1)}, {(−1, 1, −1, −1, 1,−1, 1, 1), (1, −1, −1, −1, −1, 1, 1, 1), (1, 1, −1, 1, −1, −1, 1, −1), (1, 1, 1, −1, −1, −1, −1, 1), (−1, −1, 1, 1, −1, −1, 1, 1), (1, −1,−1, 1, 1, −1, −1, 1)}, {(−1, 1, −1, −1, 1, −1, 1, 1), (1, −1, −1, −1, −1, 1, 1, 1), (1, 1, −1, 1, −1, −1, 1, −1), (1, 1, 1, −1, −1, −1,−1, 1), (−1, 1, 1, −1, −1, 1, 1, −1), (1, 1, −1, −1, 1, 1, −1, −1)}, {(−1, 1, −1, −1, 1, −1, 1, 1), (1, −1, −1, −1, −1, 1, 1, 1), (1, 1,−1, 1, −1, −1, 1, −1), (1, 1, 1, −1, −1, −1, −1, 1), (1, −1, −1, 1, 1, −1, −1, 1), (1, 1, −1, −1, 1, 1, −1, −1)}, {(−1, 1, −1, 1, 1, −1, 1,−1), (−1, 1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (−1, 1, 1, −1,−1, 1, 1, −1)}, {(−1, 1, −1, 1, 1, −1, 1, −1), (−1, 1, 1, −1, 1, −1, −1, 1), (1, 1, −1, −1, −1, −1, 1, 1), (1, 1, 1, 1, −1, −1, −1, −1), (−1,−1, 1, 1, −1, −1, 1, 1), (1, −1, −1, 1, 1, −1, −1, 1)}, {(−1, 1, −1, 1, 1, −1, 1, −1), (−1, 1, 1, −1, 1, −1, −1, 1), (1, 1, −1, −1, −1,−1, 1, 1), (1, 1, 1, 1, −1, −1, −1, −1), (−1, 1, 1, −1, −1, 1, 1, −1), (1, 1, −1, −1, 1, 1, −1, −1)}, {(−1, 1, −1, 1, 1, −1, 1, −1), (−1, 1, 1, −1, 1, −1, −1, 1), (1, 1, −1, −1, −1, −1, 1, 1), (1, 1, 1, 1, −1, −1, −1, −1), (1, −1, −1, 1, 1, −1, −1, 1), (1, 1, −1, −1, 1, 1, −1,−1)}, {(−1, 1, −1, 1, 1, −1, 1, −1), (1,−1, −1, 1, −1, 1, 1, −1), (1, 1, −1, −1, −1, −1, 1, 1, 1), (1, 1, 1, 1, −1, −1, −1, −1), (−1, −1, 1, 1,−1, −1, 1, 1), (−1, 1, 1, −1, −1, 1, 1, −1)}, {(−1, 1, −1, 1, 1, −1, 1, −1), (1, −1, −1, 1, −1, 1, 1, −1), (1, 1, −1, −1, −1,−1, 1, 1), (1, 1, 1, 1, −1, −1, −1, −1), (−1, −1, 1, 1, −1, −1, 1, 1), (1, −1, −1, 1, 1, −1, −1, 1)}, {(−1, 1, −1, 1, 1, −1, 1, −1), (1, −1,−1, 1, −1, 1, 1, −1), (1, 1, −1, −1, −1, −1, 1, 1), (1, 1, 1, 1, −1, −1, −1, −1), (−1, 1, 1, −1, −1, 1, 1, −1), (1, 1, −1, −1, 1, 1, −1, −1)}, {(−1, 1, −1, 1, 1, −1, 1, −1), (1, −1, −1, 1, −1, 1, 1, −1), (1, 1, −1, −1, −1, −1, 1, 1), (1, 1, 1, 1, −1, −1, −1, −1), (1, −1, −1, 1, 1, −1,−1, 1), (1, 1, −1, −1, 1, 1, −1, −1)}, {(−1, 1, 1, −1, 1, −1, −1, 1), (1, −1, 1, −1, −1, 1, −1, 1), (1, 1, −1, −1, −1, −1, 1, 1), (1, 1, 1, 1,−1, −1, −1, −1), (−1, −1, 1, 1, −1, −1, 1, 1), (−1, 1, 1, −1, −1, 1, 1, −1)}, {(−1, 1, 1, −1, 1, −1, −1, 1), (1, −1, 1, −1, −1, 1,−1, 1), (1, 1, −1, −1, −1, −1, 1, 1), (1, 1, 1, 1, −1, −1, −1, −1), (−1, −1, 1, 1, −1, −1, 1, 1), (1, −1, −1, 1, 1, −1, −1, 1)}, {(−1, 1, 1,−1, 1, −1, −1, 1), (1, −1, 1, −1, −1, 1, −1, 1), (1, 1, −1, −1, −1, −1, 1, 1), (1, 1, 1, 1, −1, −1, −1, −1), (−1, 1, 1, −1, −1, 1, 1, −1), (1, 1,−1, −1, 1, 1, −1, −1)}, {(−1, 1, 1, −1, 1, −1, −1, 1), (1, −1, 1, −1, −1, 1, −1, 1), (1, 1, −1, −1, −1, −1, 1, 1), (1, 1, 1, 1, −1, −1, −1,−1), (1, −1, −1, 1, 1, −1, −1, 1), (1, 1, −1, −1, 1, 1, −1, −1)}, {(−1, 1, 1, 1, 1, −1, −1, −1), (1, −1, 1, 1, −1, 1, −1, −1), (1, 1, −1, 1,−1, −1, 1, −1), (1, 1, 1, −1, −1, −1, −1, 1), (−1, −1, 1, 1, −1, −1, 1, 1), (−1, 1, 1, −1, −1, 1, 1, −1)}, {(−1, 1, 1, 1, 1, −1, −1, −1), (1,−1, 1, 1, −1, 1, −1, −1), (1, 1, −1, 1, −1, −1, 1, −1), (1, 1, 1, −1, −1, −1, −1, 1), (−1, −1, 1, 1, −1, −1, 1, 1), (1, −1, −1, 1, 1, −1,−1, 1)}, {(−1, 1, 1, 1, 1, −1, −1, −1), (1, −1, 1, 1, −1, 1, −1, −1), (1, 1, −1, 1, −1, −1, 1, −1), (1, 1, 1, −1, −1, −1, −1, 1), (−1, 1, 1,−1, −1, 1, 1, −1), (1, 1, −1, −1, 1, 1, −1, −1)}, {(−1, 1, 1, 1, 1, −1, −1, −1), (1, −1, 1, 1, −1, 1, −1, −1), (1, 1, −1, 1, −1, −1, 1,−1), (1, 1, 1, −1, −1, −1, −1, 1), (1, −1, −1, 1, 1, −1, −1, 1), (1, 1, −1, −1, 1, 1, −1, −1)}, {(1, −1, −1, −1, −1, 1, 1, 1), (1, −1, 1, 1,−1, 1, −1, −1), (1, 1, −1, 1, −1, −1, 1, −1), (1, 1, 1, −1, −1, −1, −1, 1), (−1, −1, 1, 1, −1, −1, 1, 1), (−1, 1, 1, −1, −1, 1, 1, −1)}, 1, −1, −1, −1, 1, 1, 1), (1, −1, 1, 1, −1, 1, −1, −1), (1, 1, −1, 1, −1, −1, 1, −1), (1, 1, 1, −1, −1, −1, −1, 1), (−1, −1, 1, 1, −1,−1, 1, 1), (1, −1, −1, 1, 1, −1, −1, 1)}, {(1, −1, −1, −1, −1, 1, 1, 1), (1, −1, 1, 1, −1, 1, −1, −1), (1, 1, −1, 1, −1, −1, 1, −1), (1, 1, 1,−1, −1, −1, −1, 1), (−1, 1, 1, −1, −1, 1, 1, −1), (1, 1, −1, −1, 1, 1, −1, −1)}, {(1, −1, −1, −1, −1, 1, 1, 1), (1, −1, 1, 1, −1, 1, −1,−1), (1, 1, −1, 1, −1, −1, 1, −1), (1, 1, 1, −1, −1, −1, −1, 1), (1, −1, −1, 1, 1, −1, −1, 1), (1, 1, −1, −1, 1, 1, −1, −1)}, {(1, −1, −1, 1,−1, 1, 1, −1), (1, −1, 1, −1, −1, 1, −1, 1), (1, 1, −1, −1, −1, −1, 1, 1), (1, 1, 1, 1, −1, −1, −1, −1), (−1, −1, 1, 1, −1, −1, 1, 1), (−1, 1, 1,−1, −1, 1, 1, −1)}, {(1, −1, −1, 1, −1, 1, 1, −1), (1, −1, 1, −1, −1, 1, −1, 1), (1, 1, −1, −1, −1, −1, 1, 1), (1, 1, 1, 1, −1, −1, −1, −1), (−1, −1, 1, 1, −1, −1, 1, 1), (1, −1, −1, 1, 1, −1, −1, 1)}, {(1, −1, −1, 1, −1, 1, 1, −1), (1, −1, 1, −1, −1, 1, −1, 1), (1, 1, −1, −1, −1,−1, 1, 1), (1, 1, 1, 1, −1, −1, −1, −1), (−1, 1, 1, −1, −1, 1, 1, −1), (1, 1, −1, −1, 1, 1, −1, −1)}, {(1, −1, −1, 1, −1, 1, 1, −1), (1,−1, 1, −1, −1, 1, −1, 1), (1, 1, −1, −1, −1, −1, 1, 1), (1, 1, 1, 1, −1, −1, −1, −1), (1, −1, −1, 1, 1, −1, −1, 1), (1, 1, −1, −1, 1, 1, −1, −1)}{(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1, −1, 1), (−1,−1, 1, 1, 1, 1, −1, −1), (−1, 1, −1, 1, 1, −1, 1, −1), (−1, −1, −1, −1, −1, −1, −1, −1), (−1, 1, 1, −1, −1, 1, 1, −1)}, {(−1, −1, −1, 1,−1, 1, 1, 1), (−1, −1, 1, −1, 1, −1, 1, 1), (−1, 1, −1, −1, 1, 1, −1, 1), (−1, 1, 1, 1, −1, −1, −1, 1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, −1, 1, −1, 1, 1, 1), (−1, −1, 1,−1, 1, −1, 1, 1), (−1, 1, −1, −1, 1, 1, −1, 1), (−1, 1, 1, 1, −1, −1, −1, 1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1,−1, 1), (−1, 1, 1, 1, −1, −1, −1, 1), (−1, −1, 1, 1, 1, 1, −1, −1), (−1, 1, −1, 1, 1, −1, 1, −1), (1, −1, −1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1,−1, 1), (−1, −1, 1, 1, 1, 1, −1, −1), (1, −1, 1, −1, −1, 1, −1, 1), (−1, −1, −1, −1, −1, −1, −1, −1), (−1, 1, 1, −1, −1, 1, 1, −1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1, −1, 1), (−1, −1, 1, 1, 1, 1,−1, −1), (1, −1, 1, −1, −1, 1, −1, 1), (−1, −1, −1, −1, −1, −1, −1, −1), (1, −1, −1, 1, 1, −1, −1, 1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1, −1, 1), (−1, −1, 1, 1, 1, 1, −1, −1), (1, −1, 1, −1, −1, 1,−1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1, −1, 1, 1), (−1, 1, −1,−1, 1, 1, −1, 1), (−1, 1, 1, 1, −1, −1, −1, 1), (−1, −1, 1, 1, 1, 1, −1, −1), (1, −1, 1, −1, −1, 1, −1, 1), (1, −1, −1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1,−1, 1), (−1, 1, −1, 1, 1, −1, 1, −1), (1, 1, −1, −1, −1, −1, 1, 1), (−1, −1, −1, −1, −1, −1, −1, −1), (−1, 1, 1, −1, −1, 1, 1, −1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1, −1, 1), (−1, 1, −1, 1, 1,−1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1, −1, 1), (−1, 1, −1, 1, 1, −1, 1, −1), (1, 1, −1, −1, −1,−1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1, −1, 1, 1), (−1, 1,−1, −1, 1, 1, −1, 1), (−1, 1, 1, 1, −1, −1, −1, 1), (−1, 1, −1, 1, 1, −1, 1, −1), (1, 1, −1, −1, −1, −1, 1, 1), (1, −1, −1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1,−1, 1), (1, −1, 1, −1, −1, 1, −1, 1), (1, 1, −1, −1, −1, −1, 1, 1), (−1, −1, −1, −1, −1, −1, −1, −1), (−1, 1, 1, −1, −1, 1, 1, −1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1, −1, 1), (1, −1, 1, −1, −1, 1,−1, 1), (1, 1, −1, −1, −1, −1, 1, 1), (−1, −1, −1, −1, −1, −1, −1, −1), (1, −1, −1, 1, 1, −1, −1, 1)}, {(−1, −1, −1, 1, −1, 1, 1, 1), (−1, −1, 1, −1, 1, −1, 1, 1), (−1, 1, −1, −1, 1, 1, −1, 1), (−1, 1, 1, 1, −1, −1, −1, 1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1, −1, 1, 1), (−1, 1,−1, −1, 1, 1, −1, 1), (−1, 1, 1, 1, −1, −1, −1, 1), (1, −1, 1, −1, −1, 1, −1, 1), (1, 1, −1, −1, −1, −1, 1, 1), (1, −1, −1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1), (1, −1, −1,−1, 1, 1, 1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1, −1, 1, 1,−1)}, {(−1, −1, −1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (−1,−1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, −1, 1,−1, 1, 1, 1), (−1, −1, 1, −1, 1, −1, 1, 1), (−1, 1, −1, −1, 1, 1, −1, 1), (1, −1, −1, −1, 1, 1, 1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (−1, 1, −1, −1, 1, 1, −1, 1), (1, −1, −1, −1, 1, 1, 1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (−1, 1, −1, −1, 1, 1, −1, 1), (1, −1, −1, −1, 1, 1, 1, −1), (−1, −1, 1, 1, 1, 1, −1, −1), (1, −1, 1, −1, −1, 1, −1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (−1, 1, −1, −1, 1, 1, −1, 1), (1, −1, −1, −1, 1, 1, 1, −1), (−1, 1, −1, 1, 1, −1, 1, −1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, −1, 1, −1, 1, 1), (−1, 1, −1, −1, 1, 1, −1, 1), (1, −1, −1, −1, 1, 1, 1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (−1, 1, −1, −1, 1, 1, −1, 1), (1, −1, −1, −1, 1, 1, 1, −1), (1, −1, 1, −1, −1, 1, −1, 1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (−1, 1, 1, 1, −1, −1, −1, 1), (1, −1, 1, 1, −1, −1, 1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (−1, 1, 1, 1, −1, −1, −1, 1), (1, −1, 1, 1, −1, −1, 1, −1), (−1, −1, 1, 1, 1, 1, −1, −1), (1, −1, 1, −1, −1, 1, −1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (−1, 1, 1, 1, −1, −1, −1, 1), (1, −1, 1, 1, −1, −1, 1, −1), (−1, 1, −1, 1, 1, −1, 1, −1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, −1, 1, −1, 1, 1), (−1, 1, 1, 1, −1, −1, −1, 1), (1, −1, 1, 1, −1, −1, 1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (−1, 1, 1, 1, −1, −1, −1, 1), (1, −1, 1, 1, −1, −1, 1, −1), (1, −1, 1, −1, −1, 1, −1, 1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (1, −1, −1, −1, 1, 1, 1, −1), (1, −1, 1, 1, −1, −1, 1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (1, −1, −1, −1, 1, 1, 1, −1), (1, −1, 1, 1, −1, −1, 1, −1), (−1, −1, 1, 1, 1, 1, −1, −1), (1, −1, 1, −1, −1, 1, −1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (1, −1, −1, −1, 1, 1, 1, −1), (1, −1, 1, 1, −1, −1, 1, −1), (−1, 1, −1, 1, 1, −1, 1, −1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, −1, 1, −1, 1, 1), (1, −1, −1, −1, 1, 1, 1, −1), (1, −1, 1, 1, −1, −1, 1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, −1, 1,−1, 1, 1), (1, −1, −1, −1, 1, 1, 1, −1), (1, −1, 1, 1, −1, −1, 1, −1), (1, −1, 1, −1, −1, 1, −1, 1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, −1, 1, 1, 1, −1, −1), (−1, 1, 1, 1, −1, −1, −1, 1), (−1, −1, 1, −1, 1, 1, −1, 1), (−1, 1, −1, −1, 1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, −1, 1, 1, 1, −1, −1), (−1, 1, 1, 1, −1, −1, −1, 1), (−1, −1, 1, −1, 1, 1, −1, 1), (1, −1, 1, 1, −1, 1, −1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, −1, 1, 1, 1, −1, −1), (−1, 1, 1, 1, −1, −1, −1, 1), (−1, 1, −1, −1, 1, −1, 1, 1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, −1, 1, 1, 1, −1, −1), (−1, 1, 1, 1, −1, −1, −1, 1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, −1, 1, 1, 1, −1, −1), (−1, 1, 1, 1, −1, −1, −1, 1), (1, −1, 1, 1, −1, 1, −1, −1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, −1, 1, 1, 1, −1, −1), (1, −1, −1, −1, 1, 1, 1, −1), (−1, −1, 1, −1, 1, 1, −1, 1), (−1, 1, −1, −1, 1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, −1, 1, 1, 1, −1, −1), (1, −1, −1, −1, 1, 1, 1, −1), (−1, −1, 1, −1, 1, 1, −1, 1), (1, −1, 1, 1, −1, 1, −1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, −1, 1, 1, 1, −1, −1), (1, −1, −1, −1, 1, 1, 1, −1), (−1, 1, −1, −1, 1, −1, 1, 1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, −1, 1, 1, 1, −1, −1), (1, −1, −1, −1, 1, 1, 1, −1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, −1, 1, 1, 1, −1, −1), (1, −1, −1, −1, 1, 1, 1, −1), (1, −1, 1, 1, −1, 1, −1, −1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, 1, 1, −1, −1, −1, 1), (1, −1, 1, −1, −1, −1, 1, 1), (−1, −1, 1, −1, 1, 1, −1, 1), (−1, 1, −1, −1, 1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, 1, 1, −1, −1, −1, 1), (1, −1, 1, −1, −1, −1, 1, 1), (−1, −1, 1, −1, 1, 1, −1, 1), (1, −1, 1, 1, −1, 1, −1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, 1, 1, −1, −1, −1, 1), (1, −1, 1, −1, −1, −1, 1, 1), (−1, 1, −1, −1, 1, −1, 1, 1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (−1, 1, 1, 1, −1, −1, −1, 1), (1, −1, 1, −1, −1, −1, 1, 1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (−1, 1, 1, 1, −1, −1, −1, 1), (1, −1, 1, −1, −1, −1, 1, 1), (1, −1, 1, 1, −1, 1, −1, −1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (1, −1, −1, −1, 1, 1, 1, −1), (1, −1, 1, −1, −1, −1, 1, 1), (−1, −1, 1, −1, 1, 1, −1, 1), (−1, 1, −1, −1, 1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (1, −1, −1, −1, 1, 1, 1, −1), (1, −1, 1, −1, −1, −1, 1, 1), (−1, −1, 1, −1, 1, 1, −1, 1), (1, −1, 1, 1, −1, 1, −1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (1, −1, −1, −1, 1, 1, 1, −1), (1, −1, 1, −1, −1, −1, 1, 1), (−1, 1, −1, −1, 1, −1, 1, 1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, −1, 1, 1, 1, −1, 1, −1), (1, −1, −1, −1, 1, 1, 1, −1), (1, −1, 1, −1, −1, −1, 1, 1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, −1, 1, 1, 1,−1, 1, −1), (1, −1, −1, −1, 1, 1, 1, −1), (1, −1, 1, −1, −1, −1, 1, 1), (1, −1, 1, 1, −1, 1, −1, −1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,−1, 1), (−1, 1, 1, 1, −1, −1, −1, 1), (1, 1, −1, 1, −1, 1, −1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,−1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,−1, 1), (−1, 1, 1, 1, −1, −1, −1, 1), (1, 1, −1, 1, −1, 1, −1, −1), (−1, −1, 1, 1, 1, 1, −1, −1), (1, −1, 1, −1, −1, 1, −1, 1), (1, −1,−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,−1, 1), (−1, 1, 1, 1, −1, −1, −1, 1), (1, 1, −1, 1, −1, 1, −1, −1), (−1, 1, −1, 1, 1, −1, 1, −1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, 1, −1, −1, 1, 1, −1, 1), (−1, 1, 1, 1, −1, −1, −1, 1), (1, 1, −1, 1, −1, 1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,−1, 1), (−1, 1, 1, 1, −1, −1, −1, 1), (1, 1, −1, 1, −1, 1, −1, −1), (1, −1, 1, −1, −1, 1, −1, 1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,−1, 1), (1, −1, −1, −1, 1, 1, 1, −1), (1, 1, −1, 1, −1, 1, −1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,−1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,−1, 1), (1, −1, −1, −1, 1, 1, 1, −1), (1, 1, −1, 1, −1, 1, −1, −1), (−1, −1, 1, 1, 1, 1, −1, −1), (1, −1, 1, −1, −1, 1, −1, 1), (1, −1,−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,−1, 1), (1, −1, −1, −1, 1, 1, 1, −1), (1, 1, −1, 1, −1, 1, −1, −1), (−1, 1, −1, 1, 1, −1, 1, −1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, 1, −1, −1, 1, 1, −1, 1), (1, −1, −1, −1, 1, 1, 1, −1), (1, 1, −1, 1, −1, 1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, −1, 1, 1,−1, 1), (1, −1, −1, −1, 1, 1, 1, −1), (1, 1, −1, 1, −1, 1, −1, −1), (1, −1, 1, −1, −1, 1, −1, 1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,−1, −1), (−1, 1, 1, 1, −1, −1, −1, 1), (1, 1, −1, −1, −1, 1, −1, 1), (−1, −1, 1, −1, 1, 1, −1, 1), (−1, 1, −1, −1, 1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,−1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,−1, −1), (−1, 1, 1, 1, −1, −1, −1, 1), (1, 1, −1, −1, −1, 1, −1, 1), (−1, −1, 1, −1, 1, 1, −1, 1), (1, −1, 1, 1, −1, 1, −1, −1), (1, −1,−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,−1, −1), (−1, 1, 1, 1, −1, −1, −1, 1), (1, 1, −1, −1, −1, 1, −1, 1), (−1, 1, −1, −1, 1, −1, 1, 1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, 1, −1, 1, 1, 1, −1, −1), (−1, 1, 1, 1, −1, −1, −1, 1), (1, 1, −1, −1, −1, 1, −1, 1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,−1, −1), (−1, 1, 1, 1, −1, −1, −1, 1), (1, 1, −1, −1, −1, 1, −1, 1), (1, −1, 1, 1, −1, 1, −1, −1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,−1, −1), (1, −1, −1, −1, 1, 1, 1, −1), (1, 1, −1, −1, −1, 1, −1, 1), (−1, −1, 1, −1, 1, 1, −1, 1), (−1, 1, −1, −1, 1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,−1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,−1, −1), (1, −1, −1, −1, 1, 1, 1, −1), (1, 1, −1, −1, −1, 1, −1, 1), (−1, −1, 1, −1, 1, 1, −1, 1), (1, −1, 1, 1, −1, 1, −1, −1), (1, −1,−1, 1, 1, −1, −1, 1), (1, 1, 1, 1, 1, 1, 1, 1)}, {(−1, −1, −1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,−1, −1), (1, −1, −1, −1, 1, 1, 1, −1), (1, 1, −1, −1, −1, 1, −1, 1), (−1, 1, −1, −1, 1, −1, 1, 1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, 1, −1, 1, 1, 1,−1, −1), (1, −1, −1, −1, 1, 1, 1, −1), (1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, 1, −1, 1, 1, 1, −1, −1), (1, −1, −1, −1, 1, 1, 1, −1), (1, 1, −1, −1, −1, 1, −1, 1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, −1, 1, 1, 1,−1, −1), (1, −1, −1, −1, 1, 1, 1, −1), (1, 1, −1, −1, −1, 1, −1, 1), (1, −1, 1, 1, −1, 1, −1, −1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,−1, 1), (1, −1, 1, −1, −1, −1, 1, 1), (1, 1, −1, −1, −1, 1, −1, 1), (−1, −1, 1, −1, 1, 1, −1, 1), (−1, 1, −1, −1, 1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1,−1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,−1, 1), (1, −1, 1, −1, −1, −1, 1, 1), (1, 1, −1, −1, −1, 1, −1, 1), (−1, −1, 1, −1, 1, 1, −1, 1), (1, −1, 1, 1, −1, 1, −1, −1), (1, −1,−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,−1, 1), (1, −1, 1, −1, −1, −1, 1, 1), (1, 1, −1, −1, −1, 1, −1, 1), (−1, 1, −1, −1, 1, −1, 1, 1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, 1, 1, 1, −1, −1, −1, 1), (1, −1, 1, −1, −1, −1, 1, 1), (1, 1, −1, −1, −1, 1, −1, 1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,−1, 1), (1, −1, 1, −1, −1, −1, 1, 1), (1, 1, −1, −1, −1, 1, −1, 1), (1, −1, 1, 1, −1, 1, −1, −1), (1, 1, −1, 1, −1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,−1, 1, 1, −1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1,−1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,−1, 1), (1, −1, 1, 1, −1, −1, 1, −1), (1, 1, −1, 1, −1, 1, −1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, 1,−1, 1, 1, −1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1,−1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,−1, 1), (1, −1, 1, 1, −1, −1, 1, −1), (1, 1, −1, 1, −1, 1, −1, −1), (−1, −1, 1, 1, 1, 1, −1, −1), (1, −1, 1, −1, −1, 1, −1, 1), (1, −1,−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,−1, 1), (1, −1, 1, 1, −1, −1, 1, −1), (1, 1, −1, 1, −1, 1, −1, −1), (−1, 1, −1, 1, 1, −1, 1, −1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1,−1, 1, −1, 1, 1, 1), (−1, 1, 1, 1, −1, −1, −1, 1), (1, −1, 1, 1, −1, −1, 1, −1), (1, 1, −1, 1, −1, 1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (−1, 1, 1, 1, −1, −1,−1, 1), (1, −1, 1, 1, −1, −1, 1, −1), (1, 1, −1, 1, −1, 1, −1, −1), (1, −1, 1, −1, −1, 1, −1, 1), (1, 1, −1, −1, −1, −1, 1, 1), (1, −1,−1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1,−1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, −1, 1, −1, 1, 1, 1), (1, −1, −1,−1, 1, 1, 1, −1), (1, −1, 1, −1, −1, −1, 1, 1), (1, 1, −1, −1, −1, 1, −1, 1), (−1, −1, 1, −1, 1, 1, −1, 1), (−1, 1, −1, −1, 1, −1, 1, 1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, −1, −1,−1, 1, 1), (1, 1, −1, −1, −1, 1, −1, 1), (−1, −1, 1, −1, 1, 1, −1, 1), (1, −1, 1, 1, −1, 1, −1, −1), (−1, −1, −1, −1, −1, −1, −1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, −1, −1, −1, 1, 1), (1, 1, −1, −1,−1, 1, −1, 1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, −1, 1,−1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, −1, 1, −1, 1, 1, 1), (1,−1, −1, −1, 1, 1, 1, −1), (1, −1, 1, −1, −1, −1, 1, 1), (1, 1, −1, −1, −1, 1, −1, 1), (−1, −1, 1, −1, 1, 1, −1, 1), (1, −1, 1, 1, −1, 1, −1,−1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, −1,−1, −1, 1, 1), (1, 1, −1, −1, −1, 1, −1, 1), (−1, 1, −1, −1, 1, −1, 1, 1), (1, 1, −1, 1, −1, −1, 1, −1), (−1, −1, −1, −1, −1, −1, −1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, −1, −1, −1, 1, 1), (1, 1, −1, −1,−1, 1, −1, 1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (−1, 1, −1, −1, 1,−1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (1, −1,−1, −1, 1, 1, 1, −1), (1, −1, 1, −1, −1, −1, 1, 1), (1, 1, −1, −1, −1, 1, −1, 1), (−1, 1, −1, −1, 1, −1, 1, 1), (1, 1, −1, 1, −1, −1, 1, −1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, −1, −1,−1, 1, 1), (1, 1, −1, −1, −1, 1, −1, 1), (1, −1, 1, 1, −1, 1, −1, −1), (1, 1, −1, 1, −1, −1, 1, −1), (−1, −1, −1, −1, −1, −1, −1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, −1, −1,−1, 1, 1), (1, 1, −1, −1,−1, 1, −1, 1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, −1, −1, 1, −1, 1, 1, 1), (1, −1, −1, −1, 1, 1, 1, −1), (1, −1, 1, −1, −1, −1, 1, 1), (1, 1, −1, −1, −1, 1, −1, 1), (1, −1, 1, 1,−1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, −1, 1, −1, 1, 1, 1), (1,−1, −1, −1, 1, 1, 1, −1), (1, −1, 1, −1, −1, −1, 1, 1), (1, 1, −1, −1, −1, 1, −1, 1), (1, −1, 1, 1, −1, 1, −1, −1), (1, 1, −1, 1, −1, −1, 1,−1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1, −1, 1, 1,−1, −1, 1, −1), (1, 1, −1, 1, −1, 1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, 1, −1, −1, 1, −1), (1, 1, −1, 1,−1, 1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1,−1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, −1, 1, 1, 1, 1, −1, −1), (−1, 1, −1, 1, 1,−1, 1, −1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1,−1, 1, 1, −1, −1, 1, −1), (1, 1, −1, 1, −1, 1, −1, −1), (−1, −1, 1, 1, 1, 1, −1, −1), (1, −1, 1, −1, −1, 1, −1, 1), (−1, −1, −1, −1, −1, −1,−1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, 1, −1, −1, 1, −1), (1, 1,−1, 1, −1, 1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1,−1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1,−1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, −1, 1, 1, 1, 1, −1, −1), (1, −1, 1, −1,−1, 1, −1, 1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1,−1, 1, 1, −1, −1, 1, −1), (1, 1, −1, 1, −1, 1, −1, −1), (−1, 1, −1, 1, 1, −1, 1, −1), (1, 1, −1, −1, −1, −1, 1, 1), (−1, −1, −1, −1, −1, −1,−1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, 1, −1, −1, 1, −1), (1, 1,−1, 1, −1, 1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1,−1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, 1,−1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (−1, 1, −1, 1, 1, −1, 1, −1), (1, 1, −1, −1, −1,−1, 1, 1), (1, −1, −1, 1, 1, −1, −1, 1), (1, 1, 1, 1, 1, 1, 1, 1)}, {(−1, −1, −1, 1, −1, 1, 1, 1), (1, −1, −1, −1, 1, 1, 1, −1), (1,−1, 1, 1, −1, −1, 1, −1), (1, 1, −1, 1, −1, 1, −1, −1), (1, −1, 1, −1, −1, 1, −1, 1), (1, 1, −1, −1, −1, −1, 1, 1), (−1, −1, −1, −1, −1, −1,−1, −1), (−1, 1, 1, −1, −1, 1, 1, −1)}, {(−1, −1, −1, 1, −1, 1, 1, 1), (1, −1, −1, −1, 1, 1, 1, −1), (1, −1, 1, 1, −1, −1, 1, −1), (1, 1,−1, 1, −1, 1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1,−1, 1)}, {(−1, −1, −1, 1, −1, 1, 1, 1), (1, −1, −1, −1, 1, 1, 1, −1), (1, −1, 1, 1, −1, −1, 1, −1), (1, 1, −1, 1, −1, 1, −1, −1), (1,−1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, −1, 1,−1, 1, 1, 1), (1, −1, −1, −1, 1, 1, 1, −1), (1, −1, 1, 1, −1, −1, 1, −1), (1, 1, −1, 1, −1, 1, −1, −1), (1, −1, 1, −1, −1, 1, −1, 1), (1, 1,−1, −1, −1, −1, 1, 1), (1, −1, −1, 1, 1, −1, −1, 1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (−1, 1, 1, −1, 1, −1, −1, 1), (−1, −1, −1, −1,−1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (−1, 1, 1, −1, 1, −1, −1, 1), (−1, −1, −1, −1, −1, −1, −1, −1), (1, 1, −1,−1, 1, 1, −1, −1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (−1, 1, 1,−1, 1, −1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (1, −1, −1, 1, −1, 1, 1, −1), (−1, −1, −1, −1, −1,−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (1, −1, −1, 1, −1, 1, 1, −1), (−1, −1, −1, −1, −1, −1, −1, −1), (1, 1, −1,−1, 1, 1, −1, −1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, −1, −1, 1, 1, 1), (−1, 1, 1, 1, −1, 1, −1, −1), (−1, 1, −1, 1, 1, −1, 1, −1), (1, −1,−1, 1, −1, 1, 1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, 1, −1, 1, −1, −1, 1), (1, −1, 1, −1, −1, 1, −1, 1), (−1, −1, −1, −1,−1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, 1, −1, 1, −1, −1, 1), (1, −1, 1, −1, −1, 1, −1, 1), (−1, −1, −1, −1, −1, −1, −1, −1), (1, 1, −1,−1, 1, 1, −1, −1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, −1, −1, 1, 1, 1), (−1, 1, 1, 1, −1, 1, −1, −1), (−1, 1, 1, −1, 1, −1, −1, −1, 1), (1, −1, 1,−1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (1, −1, −1, 1, −1, 1, 1, −1), (1, −1, 1, −1, −1, 1, −1, 1), (−1, −1, −1, −1, −1,−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (1, −1, −1, 1, −1, 1, 1, −1), (1, −1, 1, −1, −1, 1, −1, 1), (−1, −1, −1, −1, −1, −1, −1, −1), (1, 1, −1,−1, 1, 1, −1, −1)}, {(−1, −1, −1, 1, 1, 1, −1, 1), (−1, −1, 1, −1, 1, 1, 1, −1), (−1, 1, −1, −1, −1, 1, 1, 1), (−1, 1, 1, 1, −1, 1, −1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, −1, −1, 1, 1, 1), (−1, 1, 1, 1, −1, 1, −1, −1), (1, −1, −1, 1, −1, 1, 1, −1), (1, −1, 1,−1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (1,−1, −1, −1, 1, −1, 1, 1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1,−1, −1)}, {(1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (−1, 1,−1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (−1, 1, −1, 1, 1, −1, 1, −1), (−1, 1, 1, −1, 1,−1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1,−1, −1, −1, 1, 1, 1), (1, −1, −1, −1, 1, −1, 1, 1), (−1, 1, −1, 1, 1, −1, 1, −1), (1, −1, −1, 1, −1, 1, 1, −1), (−1, −1, −1, −1, −1, −1, −1,−1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (1, −1, −1,−1, 1, −1, 1, 1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1,−1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (−1, 1,−1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (−1, 1, −1, 1, 1, −1, 1, −1), (1, −1, −1, 1,−1, 1, 1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (−1, 1, 1, −1, 1, −1, −1, 1), (1, −1, 1, −1, −1, 1, −1, 1), (−1, −1, −1, −1, −1,−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (1,−1, −1, −1, 1, −1, 1, 1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1,−1, −1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, −1, −1, 1, 1, 1), (1, −1, −1, −1, 1, −1, 1, 1), (−1, 1, 1, −1, 1, −1, −1, 1), (1, −1, 1,−1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (1, −1, −1, 1, −1, 1, 1, −1), (1, −1, 1, −1, −1, 1, −1, 1), (−1, −1, −1, −1, −1,−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, −1, −1, 1, 1, 1), (1,−1, −1, −1, 1, −1, 1, 1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1,−1, −1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (1, −1,−1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, −1, −1, −1, 1, 1, 1), (1, −1, −1, −1, 1, −1, 1, 1), (1, −1, −1, 1, −1, 1, 1, −1), (1, −1, 1, −1,−1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1), (−1, 1, −1, −1, 1, −1, 1, 1), (−1, 1, 1, 1, 1, −1, −1, −1), (−1, −1, −1, −1, −1,−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1), (−1, 1, −1, −1, 1, −1, 1, 1), (−1, 1, 1, 1, 1, −1, −1, −1), (−1, −1, −1, −1, −1, −1, −1, −1), (1, 1, −1,−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, 1, −1, 1, 1, −1), (−1, 1, 1, −1, −1, 1, −1, 1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,−1), (−1, 1, −1, 1, −1, 1, 1, −1), (−1, 1, 1, −1, −1, 1, −1, 1), (−1, 1, −1, −1, 1, −1, 1, 1), (1, −1, −1, −1, −1, 1, 1, 1), (−1, −1, −1,−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1,−1), (−1, 1, 1, −1, −1, 1, −1, 1), (−1, 1, −1, −1, 1, −1, 1, 1), (1, −1, −1, −1, −1, 1, 1, 1), (−1, −1, −1, −1, −1, −1, −1, −1), (1, 1, −1,−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, 1, −1, 1, 1, −1), (−1, 1, 1, −1, −1, 1, −1, 1), (−1, 1, −1, −1, 1, −1, 1, 1), (1, −1, −1,−1, −1, 1, 1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1), (−1, 1, 1, 1, 1, −1, −1, −1), (1, −1, 1, 1, −1, 1, −1, −1), (−1, −1, −1, −1, −1,−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1), (−1, 1, 1, 1, 1, −1, −1, −1), (1, −1, 1, 1, −1, 1, −1, −1), (−1, −1, −1, −1, −1, −1, −1, −1), (1, 1, −1,−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, 1, −1, 1, 1, −1), (−1, 1, 1, −1, −1, 1, −1, 1), (−1, 1, 1, 1, 1, −1, −1, −1), (1,−1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,−1), (−1, 1, −1, 1, −1, 1, 1, −1), (−1, 1, 1, −1, −1, 1, −1, 1), (1, −1, −1, −1, −1, 1, 1, 1), (1, −1, 1, 1, −1, 1, −1, −1), (−1, −1, −1,−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1,−1), (−1, 1, 1, −1, −1, 1, −1, 1), (1, −1, −1, −1, −1, 1, 1, 1), (1, −1, 1, 1, −1, 1, −1, −1), (−1, −1, −1, −1, −1, −1, −1, −1), (1, 1, −1,−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (−1, 1, 1, −1, −1, 1, −1, 1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, 1, −1, 1, 1, −1), (−1, 1, 1, −1, −1, 1, −1, 1), (1, −1, −1, −1, −1, 1, 1, 1), (1,−1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,−1), (−1, 1, −1, 1, −1, 1, 1, −1), (1, −1, −1, 1, 1, −1, 1, −1), (−1, 1, −1, −1, 1, −1, 1, 1), (−1, 1, 1, 1, 1, −1, −1, −1), (−1, −1, −1,−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1,−1), (1, −1, −1, 1, 1, −1, 1, −1), (−1, 1, −1, −1, 1, −1, 1, 1), (−1, 1, 1, 1, 1, −1, −1, −1), (−1, −1, −1, −1, −1, −1, −1, −1), (1, 1, −1,−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (1, −1, −1, 1, 1, −1, 1, −1), (−1, 1, −1, −1, 1, −1, 1, 1), (−1, 1, 1, 1, −1, −1, −1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, 1, −1, 1, 1, −1), (1, −1, −1, 1, 1, −1, 1, −1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,−1), (−1, 1, −1, 1, −1, 1, 1, −1), (1, −1, −1, 1, 1, −1, 1, −1), (−1, 1, −1, −1, 1, −1, 1, 1), (1, −1, −1, −1, −1, 1, 1, 1), (−1, −1, −1,−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1,−1), (1, −1, −1, 1, 1, −1, 1, −1), (−1, 1, −1, −1, 1, −1, 1, 1), (1, −1, −1, −1, −1, 1, 1, 1), (−1, −1, −1, −1, −1, −1, −1, −1), (1, 1, −1,−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (1, −1, −1, 1, 1, −1, 1, −1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, 1, −1, 1, 1, −1), (1, −1, −1, 1, 1, −1, 1, −1), (−1, 1, −1, −1, 1, −1, 1, 1), (1, −1, −1,−1, −1, 1, 1, 1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1, −1), (−1, 1, −1, 1, −1, 1, 1, −1), (1, −1, −1, 1, 1, −1, 1, −1), (−1, 1, 1, 1, 1, −1, −1, −1), (1, −1, 1, 1, −1, 1, −1, −1), (−1, −1, −1, −1, −1,−1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1, −1), (1,−1, −1, 1, 1, −1, 1, −1), (−1, 1, 1, 1, 1, −1, −1, −1), (1, −1, 1, 1, −1, 1, −1, −1), (−1, −1, −1, −1, −1, −1, −1, −1), (1, 1, −1, −1, 1, 1,−1, −1)}, {(−1, −1, −1, 1, 1, 1, −1, 1), (−1, −1, 1, −1, 1, 1, 1, −1), (−1, 1, −1, 1, −1, 1, 1, −1), (1, −1, −1, 1, 1, −1, 1, −1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, 1, −1, 1, 1, −1), (1, −1, −1, 1, 1, −1, 1, −1), (−1, 1, 1, 1, 1, −1, −1, −1), (1,−1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,−1), (−1, 1, −1, 1, −1, 1, 1, −1), (1, −1, −1, 1, 1, −1, 1, −1), (1, −1, −1, −1, −1, 1, 1, 1), (1, −1, 1, 1, −1, 1, −1, −1), (−1, −1, −1,−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, −1, 1, −1, 1, 1,−1), (1, −1, −1, 1, 1, −1, 1, −1), (1, −1, −1, −1, −1, 1, 1, 1), (1, −1, 1, 1, −1, 1, −1, −1), (−1, −1, −1, −1, −1, −1, −1, −1), (1, 1, −1,−1, 1, 1, −1, −1)}, {(−1, −1, −1, 1, 1, 1, −1, 1), (−1, −1, 1, −1, 1, 1, 1, −1), (−1, 1, −1, 1, −1, 1, 1, −1), (1, −1, −1, 1, 1, −1, 1, −1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1,−1, 1), (−1, −1, 1, −1, 1, 1, 1, −1), (−1, 1, −1, 1, −1, 1, 1, −1), (1, −1, −1, 1, 1, −1, 1, −1), (1, −1, −1, −1, −1, 1, 1, 1), (1,−1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1, −1, 1, 1, 1,−1), (−1, 1, 1, −1, −1, 1, −1, 1), (1, −1, 1, −1, 1, −1, −1, 1), (−1, 1, −1, −1, 1, −1, 1, 1), (−1, 1, 1, 1, 1, −1, −1, −1), (−1, −1, −1,−1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, 1, −1, −1, 1,−1, 1), (1, −1, 1, −1, 1, −1, −1, 1), (−1, 1, −1, −1, 1, −1, 1, 1), (−1, 1, 1, 1, 1, −1, −1, −1), (−1, −1, −1, −1, −1, −1, −1, −1), (1, 1,−1, −1, 1, 1, −1, −1)}, {(−1, −1, −1, 1, 1, 1, −1, 1), (−1, −1, 1, −1, 1, 1, 1, −1), (−1, 1, 1, −1, −1, 1, −1, 1), (1, −1, 1, −1, 1, −1,−1, 1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1,−1, 1, 1, 1, −1, 1), (−1, −1, 1, −1, 1, 1, 1, −1), (−1, 1, 1, −1, −1, 1, −1, 1), (1, −1, 1, −1, 1, −1, −1, 1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, −1, 1, 1, 1, −1, 1), (−1, −1, 1,−1, 1, 1, 1, −1), (−1, 1, 1, −1, −1, 1, −1, 1), (1, −1, 1, −1, 1, −1, −1, 1), (−1, 1, −1, −1, 1, −1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, 1, −1,−1, 1, −1, 1), (1, −1, 1, −1, 1, −1, −1, 1), (−1, 1, −1, −1, 1, −1, 1, 1), (1, −1, −1, −1, −1, 1, 1, 1), (−1, −1, −1, −1, −1, −1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, −1, −1, 1, −1, 1), (1, −1, 1,−1, 1, −1, −1, 1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, 1, −1, −1, 1, −1, 1), (1, −1, 1, −1, 1, −1, −1, 1), (−1, 1, −1, −1, 1,−1, 1, 1), (1, −1, −1, −1, −1, 1, 1, 1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (−1, 1, 1, −1, −1, 1, −1, 1), (1, −1, 1, −1, 1, −1, −1, 1), (−1, 1, 1, 1, 1, −1, −1, −1), (1, −1, 1, 1, −1, 1, −1,−1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, 1, −1, −1, 1, −1, 1), (1, −1, 1, −1, 1, −1, −1, 1), (−1, 1, 1, 1, 1, −1, −1, −1), (1, −1, 1, 1, −1, 1, −1, −1), (−1, −1, −1, −1, −1,−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, −1, −1, 1, −1, 1), (1,−1, 1, −1, 1, −1, −1, 1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, 1, −1, −1, 1, −1, 1), (1, −1, 1, −1, 1, −1, −1, 1), (−1, 1, 1, 1, 1,−1, −1, −1), (1, −1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (−1, 1, 1, −1, −1, 1, −1, 1), (1, −1, 1, −1, 1, −1, −1, 1), (1, −1, −1, −1, −1, 1, 1, 1), (1, −1, 1, 1, −1, 1, −1,−1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, 1, −1, −1, 1, −1, 1), (1, −1, 1, −1, 1, −1, −1, 1), (1, −1, −1, −1, −1, 1, 1, 1), (1, −1, 1, 1, −1, 1, −1, −1), (−1, −1, −1, −1, −1,−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, −1, −1, 1, −1, 1), (1,−1, 1, −1, 1, −1, −1, 1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, 1, −1, −1, 1, −1, 1), (1, −1, 1, −1, 1, −1, −1, 1), (1, −1, −1, −1,−1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (−1, 1, 1, 1, −1, 1, −1, −1), (1, −1, 1, 1, 1, −1, −1, −1), (−1, 1, −1, 1, 1, −1, 1, −1), (−1, 1, 1, −1, 1, −1,−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (−1, 1, −1, 1, 1, −1, 1, −1), (−1, 1, 1, −1, 1, −1, −1, 1), (−1, −1, −1, −1, −1,−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, 1, −1, 1, −1, −1), (1,−1, 1, 1, 1, −1, −1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (−1, 1, −1, 1, 1,−1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (−1, 1, 1, 1, −1, 1, −1, −1), (1, −1, 1, 1, 1, −1, −1, −1), (−1, 1, −1, 1, 1, −1, 1, −1), (1, −1, −1, 1, −1, 1, 1,−1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (−1, 1, −1, 1, 1, −1, 1, −1), (1, −1, −1, 1, −1, 1, 1, −1), (−1, −1, −1, −1, −1,−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, 1, −1, 1, −1, −1), (1,−1, 1, 1, 1, −1, −1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (−1, 1, −1, 1, 1,−1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (−1, 1, 1, 1, −1, 1, −1, −1), (1, −1, 1, 1, 1, −1, −1, −1), (−1, 1, 1, −1, 1, −1, −1, 1), (1, −1, 1, −1, −1, 1,−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (−1, 1, 1, −1, 1, −1, −1, 1), (1, −1, 1, −1, −1, 1, −1, 1), (−1, −1, −1, −1, −1,−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, 1, −1, 1, −1, −1), (1,−1, 1, 1, 1, −1, −1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (−1, 1, 1, −1, 1,−1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (−1, 1, 1, 1, −1, 1, −1, −1), (1, −1, 1, 1, 1, −1, −1, −1), (1, −1, −1, 1, −1, 1, 1, −1), (1, −1, 1, −1, −1, 1,−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (1, −1, −1, 1, −1, 1, 1, −1), (1, −1, 1, −1, −1, 1, −1, 1), (−1, −1, −1, −1, −1,−1, −1, −1), (1, 1, −1, −1, 1, 1, −1, −1)}, {(−1, −1, −1, 1, 1, 1, −1, 1), (−1, −1, 1, −1, 1, 1, 1, −1), (−1, 1, 1, 1, −1, 1, −1, −1), (1,−1, 1, 1, 1, −1, −1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (−1, 1, 1, 1, −1, 1, −1, −1), (1, −1, 1, 1, 1, −1, −1, −1), (1, −1, −1, 1,−1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (1, −1, −1, −1, 1, −1, 1, 1), (1, −1, 1, 1, 1, −1, −1, −1), (−1, 1, −1, 1, 1, −1, 1, −1), (−1, 1, 1, −1, 1, −1,−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1,−1, −1, −1, 1, −1, 1, 1), (1, −1, 1, 1, 1, −1, −1, −1), (−1, 1, −1, 1, 1, −1, 1, −1), (−1, 1, 1, −1, 1, −1, −1, 1), (−1, −1, −1, −1, −1, −1,−1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, −1, 1, −1, 1, 1), (1,−1, 1, 1, 1, −1, −1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (1, −1, −1, −1, 1, −1, 1, 1), (1, −1, 1, 1, 1, −1, −1, −1), (−1, 1, −1, 1, 1,−1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (1, −1, −1, −1, 1, −1, 1, 1), (1, −1, 1, 1, 1, −1, −1, −1), (−1, 1, −1, 1, 1, −1, 1, −1), (1, −1, −1, 1, −1, 1, 1,−1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1,−1, −1, −1, 1, −1, 1, 1), (1, −1, 1, 1, 1, −1, −1, −1), (−1, 1, −1, 1, 1, −1, 1, −1), (1, −1, −1, 1, −1, 1, 1, −1), (−1, −1, −1, −1, −1, −1,−1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, −1, 1, −1, 1, 1), (1,−1, 1, 1, 1, −1, −1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (1, −1, −1, −1, 1, −1, 1, 1), (1, −1, 1, 1, 1, −1, −1, −1), (−1, 1, −1, 1, 1,−1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (1, −1, −1, −1, 1, −1, 1, 1), (1, −1, 1, 1, 1, −1, −1, −1), (−1, 1, 1, −1, 1, −1, −1, 1), (1, −1, 1, −1, −1, 1,−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1,−1, −1, −1, 1, −1, 1, 1), (1, −1, 1, 1, 1, −1, −1, −1), (−1, 1, 1, −1, 1, −1, −1, 1), (1, −1, 1, −1, −1, 1, −1, 1), (−1, −1, −1, −1, −1, −1,−1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, −1, 1, −1, 1, 1), (1,−1, 1, 1, 1, −1, −1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (1, −1, −1, −1, 1, −1, 1, 1), (1, −1, 1, 1, 1, −1, −1, −1), (−1, 1, 1, −1, 1,−1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (1, −1, −1, −1, 1, −1, 1, 1), (1, −1, 1, 1, 1, −1, −1, −1), (1, −1, −1, 1, −1, 1, 1, −1), (1, −1, 1, −1, −1, 1,−1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1,−1, −1, −1, 1, −1, 1, 1), (1, −1, 1, 1, 1, −1, −1, −1), (1, −1, −1, 1, −1, 1, 1, −1), (1, −1, 1, −1, 1, −1, −1, 1), (−1, −1, −1, −1, −1,−1,−1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, −1, 1, −1, 1, 1), (1,−1, 1, 1, 1, −1, −1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (1, −1, −1, −1, 1, −1, 1, 1), (1, −1, 1, 1, 1, −1, −1, −1), (1, −1, −1, 1,−1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (1, −1, −1, 1, 1, −1, 1, −1), (1, −1, 1, −1, 1, −1, −1, 1), (−1, 1, −1, −1, 1, −1, 1, 1), (−1, 1, 1, 1, 1, −1, −1,−1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1,−1, −1, 1, 1, −1, 1, −1), (1, −1, 1, −1, 1, −1, −1, 1), (−1, 1, −1, −1, 1, −1, 1, 1), (−1, 1, 1, 1, 1, −1, −1, −1), (−1, −1, −1, −1, −1, −1,−1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, 1, 1, −1, 1, −1), (1,−1, 1, −1, 1, −1, −1, 1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (1, −1, −1, 1, 1, −1, 1, −1), (1, −1, 1, −1, 1, −1, −1, 1), (−1, 1, −1, −1, 1,−1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, −1, 1, 1, 1, −1, 1), (−1,−1, 1, −1, 1, 1, 1, −1), (1, −1, −1, 1, 1, −1, 1, −1), (1, −1, 1, −1, 1, −1, −1, 1), (−1, 1, −1, −1, 1, −1, 1, 1), (1, −1, −1, −1,−1, 1, 1, 1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1, −1, −1, 1, 1, −1, 1, −1), (1, −1, 1, −1, 1, −1, −1, 1), (−1, 1, −1, −1, 1, −1, 1, 1), (1, −1, −1, −1, −1, 1, 1, 1), (−1, −1, −1, −1,−1, −1, −1, −1), (1, 1, −1, −1, 1, 1, −1, −1)}, {(−1, −1, −1, 1, 1, 1, −1, 1), (−1, −1, 1, −1, 1, 1, 1, −1), (1, −1, −1, 1, 1, −1, 1, −1), (1, −1, 1, −1, 1, −1, −1, 1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (1, −1, −1, 1, 1, −1, 1, −1), (1, −1, 1, −1, 1, −1,−1, 1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1,−1, 1, 1, 1, −1, 1), (−1, −1, 1, −1, 1, 1, 1, −1), (1, −1, −1, 1, 1, −1, 1, −1), (1, −1, 1, −1, 1, −1, −1, 1), (−1, 1, 1, 1, 1, −1, −1, −1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, −1, 1,−1, 1, 1, 1, −1), (1, −1, −1, 1, 1, −1, 1, −1), (1, −1, 1, −1, 1, −1, −1, 1), (−1, 1, 1, 1, 1, −1, −1, −1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (−1, −1, 1, −1, 1, 1, 1, −1), (1, −1,−1, 1, 1, −1, 1, −1), (1, −1, 1, −1, 1, −1, −1, 1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (1, −1, −1, 1, 1, −1, 1, −1), (1, −1, 1, −1, 1, −1,−1, 1), (1, −1, −1, −1, −1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, −1, 1, −1, 1, 1, 1, −1), (1, −1, −1, 1, 1, −1, 1, −1), (1, −1, 1, −1, 1, −1, −1, 1), (1, −1, −1, −1, −1, 1, 1, 1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (−1, −1, 1, −1, 1, 1, 1, −1), (1, −1,−1, 1, 1, −1, 1, −1), (1, −1, 1, −1, 1, −1, −1, 1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, −1, 1, −1, 1, 1, 1, −1), (1, −1, −1, 1, 1, −1, 1, −1), (1, −1, 1, −1, 1, −1,−1, 1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1,−1, 1, 1, 1, −1, 1), (−1, 1, −1, −1, −1, 1, 1, 1), (−1, 1, 1, 1, −1, 1, −1, −1), (1, 1, −1, 1, −1, −1, −1, 1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,−1, −1, 1, 1, 1), (−1, 1, 1, 1, −1, 1, −1, −1), (1, 1, −1, 1, −1, −1, −1, 1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (−1, 1, 1, 1,−1, 1, −1, −1), (1, 1, −1, 1, −1, −1, −1, 1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, −1, 1, 1, 1, −1, 1), (−1, 1, −1, −1, −1, 1, 1, 1), (−1, 1, 1, 1, −1, 1, −1, −1), (1, 1, −1, 1, −1, −1,−1, 1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1,−1, 1, 1, 1, −1, 1), (−1, 1, −1, −1, −1, 1, 1, 1), (−1, 1, 1, 1, −1, 1, −1, −1), (1, 1, −1, 1, −1, −1, −1, 1), (−1, 1, −1, 1, 1, −1, 1, −1), (1, −1, −1, 1, −1, 1, 1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,−1, −1, 1, 1, 1), (−1, 1, 1, 1, −1, 1, −1, −1), (1, 1, −1, 1, −1, −1, −1, 1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (−1, 1, 1, 1,−1, 1, −1, −1), (1, 1, −1, 1, −1, −1, −1, 1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, −1, 1, 1, 1, −1, 1), (−1, 1, −1, −1, −1, 1, 1, 1), (−1, 1, 1, 1, −1, 1, −1, −1), (1, 1, −1, 1, −1, −1,−1, 1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1,−1, 1, 1, 1, −1, 1), (−1, 1, −1, −1, −1, 1, 1, 1), (−1, 1, 1, 1, −1, 1, −1, −1), (1, 1, −1, 1, −1, −1, −1, 1), (−1, 1, 1, −1, 1, −1, −1, 1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,−1, −1, 1, 1, 1), (−1, 1, 1, 1, −1, 1, −1, −1), (1, 1, −1, 1, −1, −1, −1, 1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (−1, 1, 1, 1,−1, 1, −1, −1), (1, 1, −1, 1, −1, −1, −1, 1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, 1, −1, −1, −1, 1, 1, 1), (−1, 1, 1, 1, −1, 1, −1, −1), (1, 1, −1, 1, −1, −1,−1, 1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1,−1, 1, 1, 1, −1, 1), (−1, 1, −1, −1, −1, 1, 1, 1), (−1, 1, 1, 1, −1, 1, −1, −1), (1, 1, −1, 1, −1, −1, −1, 1), (1, −1, −1, 1, −1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,−1, −1, 1, 1, 1), (−1, 1, 1, 1, −1, 1, −1, −1), (1, 1, −1, 1, −1, −1, −1, 1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (−1, 1, 1, 1,−1, 1, −1, −1), (1, 1, −1, 1, −1, −1, −1, 1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, 1, −1, −1, −1, 1, 1, 1), (−1, 1, 1, 1, −1, 1, −1, −1), (1, 1, −1, 1, −1, −1,−1, 1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1,−1, 1, 1, 1, −1, 1), (−1, 1, −1, −1, −1, 1, 1, 1), (1, −1, −1, −1, 1, −1, 1, 1), (1, 1, −1, 1, −1, −1, −1, 1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,−1, −1, 1, 1, 1), (1, −1, −1, −1, 1, −1, 1, 1), (1, 1, −1, 1, −1, −1, −1, 1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (1, −1, −1,−1, 1, −1, 1, 1), (1, 1, −1, 1, −1, −1, −1, 1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, −1, −1, 1, 1, 1, −1, 1), (−1, 1, −1, −1, −1, 1, 1, 1), (1, −1, −1, −1, 1, −1, 1, 1), (1, 1, −1, 1, −1, −1,−1, 1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1,−1, 1, 1, 1, −1, 1), (−1, 1, −1, −1, −1, 1, 1, 1), (1, −1, −1, −1, 1, −1, 1, 1), (1, 1, −1, 1, −1, −1, −1, 1), (−1, 1, −1, 1, 1, −1, 1, −1), (1, −1, −1, 1, −1, 1, 1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,−1, −1, 1, 1, 1), (1, −1, −1, −1, 1, −1, 1, 1), (1, 1, −1, 1, −1, −1, −1, 1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (1, −1, −1,−1, 1, −1, 1, 1), (1, 1, −1, 1, −1, −1, −1, 1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, −1, −1, 1, 1, 1, −1, 1), (−1, 1, −1, −1, −1, 1, 1, 1), (1, −1, −1, −1, 1, −1, 1, 1), (1, 1, −1, 1, −1, −1,−1, 1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1,−1, 1, 1, 1, −1, 1), (−1, 1, −1, −1, −1, 1, 1, 1), (1, −1, −1, −1, 1, −1, 1, 1), (1, 1, −1, 1, −1, −1, −1, 1), (−1, 1, 1, −1, 1, −1, −1, 1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,−1, −1, 1, 1, 1), (1, −1, −1, −1, 1, −1, 1, 1), (1, 1, −1, 1, −1, −1, −1, 1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (1, −1, −1,−1, 1, −1, 1, 1), (1, 1, −1, 1, −1, −1, −1, 1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, 1, −1, −1, −1, 1, 1, 1), (1, −1, −1, −1, 1, −1, 1, 1), (1, 1, −1, 1, −1, −1,−1, 1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1,−1, 1, 1, 1, −1, 1), (−1, 1, −1, −1, −1, 1, 1, 1), (1, −1, −1, −1, 1, −1, 1, 1), (1, 1, −1, 1, −1, −1, −1, 1), (1, −1, −1, 1, −1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, −1,−1, −1, 1, 1, 1), (1, −1, −1, −1, 1, −1, 1, 1), (1, 1, −1, 1, −1, −1, −1, 1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, −1, −1, 1, 1, 1, −1, 1), (−1, 1, −1, −1, −1, 1, 1, 1), (1, −1, −1,−1, 1, −1, 1, 1), (1, 1, −1, 1, −1, −1, −1, 1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, −1, −1, 1, 1, 1, −1, 1), (−1, 1, −1, −1, −1, 1, 1, 1), (1, −1, −1, −1, 1, −1, 1, 1), (1, 1, −1, 1, −1, −1,−1, 1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1,−1, 1, 1, 1, −1, 1), (−1, 1, −1, 1, −1, 1, 1, −1), (−1, 1, 1, −1, −1, 1, −1, 1), (1, 1, −1, 1, −1, −1, −1, 1), (−1, 1, −1, −1, 1, −1, 1, 1), (−1, 1, 1, 1, 1, −1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,−1, 1, −1, 1, 1, −1), (−1, 1, 1, −1, −1, 1, −1, 1), (1, 1, −1, 1, −1, −1, −1, 1), (−1, 1, −1, −1, 1, −1, 1, 1), (−1, 1, 1, 1, 1, −1, −1, −1), (−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (−1, 1, 1,−1, −1, 1, −1, 1), (1, 1, −1, 1, −1, −1, −1, 1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1, −1, 1, 1, 1, −1, 1), (−1, 1, −1, 1, −1, 1, 1, −1), (−1, 1, 1, −1, −1, 1, −1, 1), (1, 1, −1, 1, −1, −1,−1, 1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1,−1, 1, 1, 1, −1, 1), (−1, 1, −1, 1, −1, 1, 1, −1), (−1, 1, 1, −1, −1, 1, −1, 1), (1, 1, −1, 1, −1, −1, −1, 1), (−1, 1, −1, −1, 1, −1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, −1, 1, 1, 1, −1, 1), (−1, 1,−1, 1, −1, 1, 1, −1), (−1, 1, 1, −1, −1, 1, −1, 1), (1, 1, −1, 1, −1, −1, −1, 1), (−1, 1, −1, −1, 1, −1, 1, 1), (1, −1, −1, −1, −1, 1, 1, 1), (−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (−1, 1, 1,−1, −1, 1, −1, 1), (1, 1, −1, 1, −1, −1, −1, 1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, −1, 1, 1, 1, −1, 1), (−1, 1, −1, 1, −1, 1, 1, −1), (−1, 1, 1, −1, −1, 1, −1, 1), (1, 1, −1, 1, −1, −1,−1, 1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1,−1, 1, 1, 1, −1, 1), (−1, 1, −1, 1, −1, 1, 1, −1), (−1, 1, 1, −1, −1, 1, −1, 1), (1, 1, −1, 1, −1, −1, −1, 1), (−1, 1, 1, 1, 1, −1, −1, −1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,−1, 1, −1, 1, 1, −1), (−1, 1, 1, −1, −1, 1, −1, 1), (1, 1, −1, 1, −1, −1, −1, 1), (−1, 1, 1, 1, 1, −1, −1, −1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (−1, 1, 1,−1, −1, 1, −1, 1), (1, 1, −1, 1, −1, −1, −1, 1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, 1, −1, 1, −1, 1, 1, −1), (−1, 1, 1, −1, −1, 1, −1, 1), (1, 1, −1, 1, −1, −1,−1, 1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1,−1, 1, 1, 1, −1, 1), (−1, 1, −1, 1, −1, 1, 1, −1), (−1, 1, 1, −1, −1, 1, −1, 1), (1, 1, −1, 1, −1, −1, −1, 1), (1, −1, −1, −1, −1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,−1, 1, −1, 1, 1, −1), (−1, 1, 1, −1, −1, 1, −1, 1), (1, 1, −1, 1, −1, −1, −1, 1), (1, −1, −1, −1, −1, 1, 1, 1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (−1, 1, 1,−1, −1, 1, −1, 1), (1, 1, −1, 1, −1, −1, −1, 1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, 1, −1, 1, −1, 1, 1, −1), (−1, 1, 1, −1, −1, 1, −1, 1), (1, 1, −1, 1, −1, −1,−1, 1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1,−1, 1, 1, 1, −1, 1), (−1, 1, −1, 1, −1, 1, 1, −1), (1, −1, −1, 1, 1, −1, 1, −1), (1, 1, −1, 1, −1, −1, −1, 1), (−1, 1, −1, −1, 1, −1, 1, 1), (−1, 1, 1, 1, 1, −1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,−1, 1, −1, 1, 1, −1), (1, −1, −1, 1, 1, −1, 1, −1), (1, 1, −1, 1, −1, −1, −1, 1), (−1, 1, −1, −1, 1, −1, 1, 1), (−1, 1, 1, 1, 1, −1, −1, −1), (−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (1, −1,−1, 1, 1, −1, 1, −1), (1, 1, −1, 1, −1, −1, −1, 1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1, −1, 1, 1, 1, −1, 1), (−1, 1, −1, 1, −1, 1, 1, −1), (1, −1, −1, 1, 1, −1, 1, −1), (1, 1, −1, 1, −1, −1,−1, 1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1,−1, 1, 1, 1, −1, 1), (−1, 1, −1, 1, −1, 1, 1, −1), (1, −1, −1, 1, 1, −1, 1, −1), (1, 1, −1, 1, −1, −1, −1, 1), (−1, 1, −1, −1, 1, −1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, −1, 1, 1, 1, −1, 1), (−1, 1,−1, 1, −1, 1, 1, −1), (1, −1, −1, 1, 1, −1, 1, −1), (1, 1, −1, 1, −1, −1, −1, 1), (−1, 1, −1, −1, 1, −1, 1, 1), (1, −1, −1, −1, −1, 1, 1, 1), (−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (1, −1,−1, 1, 1, −1, 1, −1), (1, 1, −1, 1, −1, −1, −1, 1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, −1, 1, 1, 1, −1, 1), (−1, 1, −1, 1, −1, 1, 1, −1), (1, −1, −1, 1, 1, −1, 1, −1), (1, 1, −1, 1, −1, −1,−1, 1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1,−1, 1, 1, 1, −1, 1), (−1, 1, −1, 1, −1, 1, 1, −1), (1, −1, −1, 1, 1, −1, 1, −1), (1, 1, −1, 1, −1, −1, −1, 1), (−1, 1, 1, 1, 1, −1, −1, −1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,−1, 1, −1, 1, 1, −1), (1, −1, −1, 1, 1, −1, 1, −1), (1, 1, −1, 1, −1, −1, −1, 1), (−1, 1, 1, 1, 1, −1, −1, −1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (1, −1,−1, 1, 1, −1, 1, −1), (1, 1, −1, 1, −1, −1, −1, 1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, 1, −1, 1, −1, 1, 1, −1), (1, −1, −1, 1, 1, −1, 1, −1), (1, 1, −1, 1, −1, −1,−1, 1), (−1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1,−1, 1, 1, 1, −1, 1), (−1, 1, −1, 1, −1, 1, 1, −1), (1, −1, −1, 1, 1, −1, 1, −1), (1, 1, −1, 1, −1, −1, −1, 1), (1, −1, −1, −1, −1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1,−1, 1, −1, 1, 1, −1), (1, −1, −1, 1, 1, −1, 1, −1), (1, 1, −1, 1, −1, −1, −1, 1), (1, −1, −1, −1, −1, 1, 1, 1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (−1, 1, −1, 1, −1, 1, 1, −1), (1, −1,−1, 1, 1, −1, 1, −1), (1, 1, −1, 1, −1, −1, −1, 1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, 1, −1, 1, −1, 1, 1, −1), (1, −1, −1, 1, 1, −1, 1, −1), (1, 1, −1, 1, −1, −1,−1, 1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1,−1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (−1, 1, −1, −1, 1, −1, 1, 1), (−1, 1, 1, 1, 1, −1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, 1,−1, −1, 1, −1, 1), (1, −1, 1, −1, 1, −1, −1, 1), (1, 1, −1, 1, −1, −1, −1, 1), (−1, 1, −1, −1, 1, −1, 1, 1), (−1, 1, 1, 1, 1, −1, −1, −1), (−1, −1, −1, −1, −1, −1, −1, −1), (1, 1, −1, −1, 1, 1, −1, −1)}, {(−1, −1, −1, 1, 1, 1, −1, 1), (−1, 1, 1, −1, −1, 1, −1, 1), (1, −1, 1,−1, 1, −1, −1, 1), (1, 1, −1, 1, −1, −1, −1, 1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1,−1, 1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1,−1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (−1, 1, −1, −1, 1, −1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, 1,−1, −1, 1, −1, 1), (1, −1, 1, −1, 1, −1, −1, 1), (1, 1, −1, 1, −1, −1, −1, 1), (−1, 1, −1, −1, 1, −1, 1, 1), (1, −1, −1, −1, −1, 1, 1, 1), (−1, −1, −1, −1, −1, −1, −1, −1), (1, 1, −1, −1, 1, 1, −1, −1)}, {(−1, −1, −1, 1, 1, 1, −1, 1), (−1, 1, 1, −1, −1, 1, −1, 1), (1, −1, 1,−1, 1, −1, −1, 1), (1, 1, −1, 1, −1, −1, −1, 1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1,−1, 1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1,−1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (−1, 1, 1, 1, 1, −1, −1, −1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, 1,−1, −1, 1, −1, 1), (1, −1, 1, −1, 1, −1, −1, 1), (1, 1, −1, 1, −1, −1, −1, 1), (−1, 1, 1, 1, 1, −1, −1, −1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (−1, 1, 1, −1, −1, 1, −1, 1), (1, −1, 1,−1, 1, −1, −1, 1), (1, 1, −1, 1, −1, −1, −1, 1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1,−1, 1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1,−1, 1, 1, 1, −1, 1), (−1, 1, 1, −1, −1, 1, −1, 1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, 1,−1, −1, 1, −1, 1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1, −1, −1), (−1, −1, −1, −1, −1, −1, −1, −1), (1, 1, −1, −1, 1, 1, −1, −1)}, {(−1, −1, −1, 1, 1, 1, −1, 1), (−1, 1, 1, −1, −1, 1, −1, 1), (1, −1, 1,−1, 1, −1, −1, 1), (1, 1, −1, 1, −1, −1, −1, 1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, −1, 1, 1, 1, −1, 1), (−1, 1, 1, −1, −1, 1, −1, 1), (1, −1, 1, −1, 1, −1, −1, 1), (1, 1, −1, 1, −1, −1,−1, 1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1,−1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1, −1,−1, 1), (−1, −1, −1, −1, −1, −1, −1, −1), (1, 1, −1, −1, 1, 1, −1, −1)}, {(−1, −1, −1, 1, 1, 1, −1, 1), (−1, 1, 1, 1, −1, 1, −1, −1), (1,−1, 1, 1, 1, −1, −1, −1), (1, 1, −1, 1, −1, −1, −1, 1), (−1, 1, −1, 1, 1, −1, 1, −1), (−1, 1, 1, −1, 1, −1, −1, 1), (−1, −1, 1, 1, −1,−1, 1, 1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1,−1, 1, −1, −1, −1, 1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1,−1, 1, −1), (1, −1, −1, 1, −1, 1, 1, −1), (−1, −1, −1, −1, −1, −1, −1, −1), (−1, −1, 1, 1, −1, −1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (1, −1, −1, 1,−1, 1, 1, −1), (−1, −1, −1, −1, −1, −1, −1, −1), (1, 1, −1, −1, 1, 1, −1, −1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, −1, 1, 1, −1, 1, −1), (1, −1, −1, 1, −1, 1, 1, −1), (−1, −1, 1, 1, −1,−1, 1, 1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1,−1, 1, −1, −1, −1, 1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, 1, −1, 1,−1, −1, 1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, 1, −1, 1, −1, −1, 1), (1, −1, 1, −1,−1, 1, −1, 1), (−1, −1, −1, −1, −1, −1, −1, −1), (1, 1, −1, −1, 1, 1, −1, −1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (−1, 1, 1, −1, 1, −1, −1, 1), (1, −1, 1, −1, −1, 1, −1, 1), (−1, −1, 1, 1, −1,−1, 1, 1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1,−1, 1, −1, −1, −1, 1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (1, −1, −1, 1,−1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (1, −1, −1, 1, −1, 1, 1, −1), (1, −1, 1, −1,−1, 1, −1, 1), (−1, −1, −1, −1, −1, −1, −1, −1), (1, 1, −1, −1, 1, 1, −1, −1)}, {(−1, −1, −1, 1, 1, 1, −1, 1), (−1, 1, 1, 1, −1, 1, −1, −1), (1, −1, 1, 1, 1, −1, −1, −1), (1, 1, −1, 1, −1, −1, −1, 1), (1, −1, −1, 1, −1, 1, 1, −1), (1, −1, 1, −1, −1, 1, −1, 1), (−1, −1, 1, 1, −1,−1, 1, 1), (1, 1, 1, 1, 1, 1, 1, 1)}, {(−1, −1, −1, 1, 1, 1, −1, 1), (−1, 1, 1, 1, −1, 1, −1, −1), (1, −1, 1, 1, 1, −1, −1, −1), (1, 1,−1, 1, −1, −1, −1, 1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1,−1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1,−1, −1, 1), (−1, −1, −1, −1, −1, −1, −1, −1), (1, 1, −1, −1, 1, 1, −1, −1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (−1, 1, 1, −1, 1, −1, −1, 1), (−1, −1, 1, 1, −1,−1, 1, 1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1,−1, 1, −1, −1, −1, 1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1,−1, 1, −1), (1, −1, −1, 1, −1, 1, 1, −1), (−1, −1, −1, −1, −1, −1, −1, −1), (−1, −1, 1, 1, −1, −1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (1, −1, −1, 1,−1, 1, 1, −1), (−1, −1, −1, −1, −1, −1, −1, −1), (1, 1, −1, −1, 1, 1, −1, −1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, −1, 1, 1, −1, 1, −1), (1, −1, −1, 1, −1, 1, 1, −1), (−1, −1, 1, 1, −1,−1, 1, 1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1,−1, 1, −1, −1, −1, 1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, 1, −1, 1,−1, −1, 1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, 1, −1, 1, −1, −1, 1), (1, −1, 1, −1,−1, 1, −1, 1), (−1, −1, −1, −1, −1, −1, −1, −1), (1, 1, −1, −1, 1, 1, −1, −1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (−1, 1, 1, −1, 1, −1, −1, 1), (1, −1, 1, −1, −1, 1, −1, 1), (−1, −1, 1, 1, −1,−1, 1, 1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1,−1, 1, −1, −1, −1, 1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (1, −1, −1, 1,−1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (1, −1, −1, 1, −1, 1, 1, −1), (1, −1, 1, −1,−1, 1, −1, 1), (−1, −1, −1, −1, −1, −1, −1, −1), (1, 1, −1, −1, 1, 1, −1, −1)}, {(−1, −1, −1, 1, 1, 1, −1, 1), (1, −1, −1, −1, 1, −1, 1, 1), (1, −1, 1, 1, 1, −1, −1, −1), (1, 1, −1, 1, −1, −1, −1, 1), (1, −1, −1, 1, −1, 1, 1, −1), (1, −1, 1, −1, −1, 1, −1, 1), (−1, −1, 1, 1, −1,−1, 1, 1), (1, 1, 1, 1, 1, 1, 1, 1)}, {(−1, −1, −1, 1, 1, 1, −1, 1), (1, −1, −1, −1, 1, −1, 1, 1), (1, −1, 1, 1, 1, −1, −1, −1), (1, 1,−1, 1, −1, −1, −1, 1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1,−1, 1, 1), (−1, 1, 1, 1, 1, −1, −1, −1), (−1, −1, −1, −1, −1, −1, −1, −1), (−1, −1, 1, 1, −1, −1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1, −1, 1, 1), (−1, 1, 1, 1, 1, −1,−1, −1), (−1, −1, −1, −1, −1, −1, −1, −1), (1, 1, −1, −1, 1, 1, −1, −1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1, −1, 1, 1), (−1, 1, 1, 1, 1, −1, −1, −1), (−1, −1, 1, 1, −1,−1, 1, 1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1,−1, 1, −1, −1, −1, 1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1,−1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1, −1, 1, 1), (1, −1, −1, −1,−1, 1, 1, 1), (−1, −1, −1, −1, −1, −1, −1, −1), (1, 1, −1, −1, 1, 1, −1, −1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, −1, −1, 1, −1, 1, 1), (1, −1, −1, −1, −1, 1, 1, 1), (−1, −1, 1, 1, −1,−1, 1, 1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1,−1, 1, −1, −1, −1, 1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, 1, 1, 1,−1, −1, −1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, 1, 1, 1, −1, −1, −1), (1, −1, 1, 1, −1, 1,−1, −1), (−1, −1, −1, −1, −1, −1, −1, −1), (1, 1, −1, −1, 1, 1, −1, −1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (−1, 1, 1, 1, 1, −1, −1, −1), (1, −1, 1, 1, −1, 1, −1, −1), (−1, −1, 1, 1, −1,−1, 1, 1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1,−1, 1, −1, −1, −1, 1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (1, −1, −1, −1,−1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1,−1, −1), (−1, −1, −1, −1, −1, −1, −1, −1), (1, 1, −1, −1, 1, 1, −1, −1)}, {(−1, −1, −1, 1, 1, 1, −1, 1), (1, −1, −1, 1, 1, −1, 1, −1), (1, −1, 1, −1, 1, −1, −1, 1), (1, 1, −1, 1, −1, −1, −1, 1), (1, −1, −1, −1, −1, 1, 1, 1), (1, −1, 1, 1, −1, 1, −1, −1), (−1, −1, 1, 1, −1,−1, 1, 1), (1, 1, 1, 1, 1, 1, 1, 1)}, {(−1, −1, −1, 1, 1, 1, −1, 1), (1, −1, −1, 1, 1, −1, 1, −1), (1, −1, 1, −1, 1, −1, −1, 1), (1, 1,−1, 1, −1, −1, −1, 1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, −1,−1, 1, 1, 1, 1, −1), (−1, 1, 1, 1, 1, −1, −1, −1), (−1, −1, −1, −1, −1, −1, −1, −1), (−1, 1, 1, −1, −1, 1, 1, −1)}, {(−1, −1, 1, −1, 1,−1, 1, 1), (−1, −1, 1, 1, −1, 1, −1, 1), (−1, 1, −1, −1, 1, 1, −1, 1), (−1, 1, −1, 1, −1, −1, 1, 1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1, −1, 1, −1, 1, 1), (−1, −1, 1, 1,−1, 1, −1, 1), (−1, 1, −1, −1, 1, 1, −1, 1), (−1, 1, −1, 1, −1, −1, 1, 1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1,−1, 1), (−1, 1, −1, 1, −1, −1, 1, 1), (−1, −1, −1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1,−1, 1, 1), (−1, −1, −1, 1, 1, 1, 1, −1), (1, −1, −1, −1, −1, 1, 1, 1), (−1, −1, −1, −1, −1, −1, −1, −1), (−1, 1, 1, −1, −1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, −1,−1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1, −1, 1,−1, 1, 1), (−1, −1, 1, 1, −1, 1, −1, 1), (−1, 1, −1, −1, 1, 1, −1, 1), (−1, 1, −1, 1, −1, −1, 1, 1), (−1, −1, −1, 1, 1, 1, 1, −1), (1, −1,−1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, −1, −1, 1, 1, 1, 1, −1), (1, −1, −1, −1, −1, 1, 1, 1), (1, −1, −1, 1, 1,−1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (−1, 1,−1, 1, −1, −1, 1, 1), (−1, 1, 1, 1, 1, −1, −1, −1), (1, 1, 1, −1, −1, −1, −1, 1), (−1, −1, −1, −1, −1, −1, −1, −1), (−1, 1, 1, −1, −1, 1, 1,−1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (−1, 1, −1, −1, 1, 1, −1, 1), (−1, 1, −1, 1, −1, −1, 1, 1), (−1, 1, 1, 1, 1, −1, −1, −1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), 1 (−1, 1, −1, 1, −1, −1, 1, 1), (1, −1, −1, −1, −1, 1, 1, 1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (−1, 1, −1, −1, 1, 1, −1, 1), (−1, 1, −1, 1, −1, −1, 1, 1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (−1, 1, −1, −1, 1, 1, −1, 1), (−1, 1, −1, 1, −1, −1, 1, 1), (1, −1, −1, −1, −1, 1, 1, 1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (−1, 1, −1, −1, 1, 1, −1, 1), (1, −1, 1, −1, 1, 1, −1, −1), (−1, −1, −1, 1, 1, 1, 1, −1), (−1, 1, 1, 1, 1, −1, −1, −1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (−1, 1, −1, −1, 1, 1, −1, 1), (1, −1, 1, −1, 1, 1, −1, −1), (−1, −1, −1, 1, 1, 1, 1, −1), (1, −1, −1, −1, −1, 1, 1, 1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (−1, 1, −1, −1, 1, 1, −1, 1), (1, −1, 1, −1, 1, 1, −1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (−1, 1, −1, −1, 1, 1, −1, 1), (1, −1, 1, −1, 1, 1, −1, −1), (−1, 1, 1, 1, 1, −1, −1, −1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (−1, 1, −1, −1, 1, 1, −1, 1), (1, −1, 1, −1, 1, 1, −1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (−1, 1, −1, −1, 1, 1, −1, 1), (1, −1, 1, −1, 1, 1, −1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (−1, 1, −1, −1, 1, 1, −1, 1), (1, −1, 1, −1, 1, 1, −1, −1), (1, −1, −1, −1, −1, 1, 1, 1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (−1, 1, −1, 1, −1, −1, 1, 1), (1, −1, 1, 1, −1, −1, 1, −1), (−1, −1, −1, 1, 1, 1, 1, −1), (−1, 1, 1, 1, 1, −1, −1, −1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (−1, 1, −1, 1, −1, −1, 1, 1), (1, −1, 1, 1, −1, −1, 1, −1), (−1, −1, −1, 1, 1, 1, 1, −1), (1, −1, −1, −1, −1, 1, 1, 1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (−1, 1, −1, 1, −1, −1, 1, 1), (1, −1, 1, 1, −1, −1, 1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (−1, 1, −1, 1, −1, −1, 1, 1), (1, −1, 1, 1, −1, −1, 1, −1), (−1, 1, 1, 1, 1, −1, −1, −1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (−1, 1, −1, 1, −1, −1, 1, 1), (1, −1, 1, 1, −1, −1, 1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (−1, 1, −1, 1, −1, −1, 1, 1), (1, −1, 1, 1, −1, −1, 1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (−1, 1, −1, 1, −1, −1, 1, 1), (1, −1, 1, 1, −1, −1, 1, −1), (1, −1, −1, −1, −1, 1, 1, 1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (1, −1, 1, −1, 1, 1, −1, −1), (1, −1, 1, 1, −1, −1, 1, −1), (−1, −1, −1, 1, 1, 1, 1, −1), (−1, 1, 1, 1, 1, −1, −1, −1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (1, −1, 1, −1, 1, 1, −1, −1), (1, −1, 1, 1, −1, −1, 1, −1), (−1, −1, −1, 1, 1, 1, 1, −1), (1, −1, −1, −1, −1, 1, 1, 1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (1, −1, 1, −1, 1, 1, −1, −1), (1, −1, 1, 1, −1, −1, 1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (1, −1, 1, −1, 1, 1, −1, −1), (1, −1, 1, 1, −1, −1, 1, −1), (−1, 1, 1, 1, 1, −1, −1, −1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, −1, 1, 1, −1, 1, −1, 1), (1, −1, 1, −1, 1, 1, −1, −1), (1, −1, 1, 1, −1, −1, 1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, −1, 1, 1, −1, 1, −1, 1), (1, −1, 1, −1, 1, 1, −1, −1), (1, −1, 1, 1, −1, −1, 1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, −1, 1, 1, −1, 1,−1, 1), (1, −1, 1, −1, 1, 1, −1, −1), (1, −1, 1, 1, −1, −1, 1, −1), (1, −1, −1, −1, −1, 1, 1, 1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (−1, 1, −1, 1, −1, −1, 1, 1), (1, 1, −1, −1, 1, −1, 1, −1), (−1, −1, −1, 1, 1, 1, 1, −1), (−1, 1, 1, 1, 1, −1, −1, −1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (−1, 1, −1, 1, −1, −1, 1, 1), (1, 1, −1, −1, 1, −1, 1, −1), (−1, −1, −1, 1, 1, 1, 1, −1), (1, −1, −1, −1, −1, 1, 1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (−1, 1, −1, 1, −1, −1, 1, 1), (1, 1, −1, −1, 1, −1, 1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (−1, 1, −1, 1, −1, −1, 1, 1), (1, 1, −1, −1, 1, −1, 1, −1), (−1, 1, 1, 1, 1, −1, −1, −1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (−1, 1, −1, 1, −1, −1, 1, 1), (1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (−1, 1, −1, 1, −1, −1, 1, 1), (1, 1, −1, −1, 1, −1, 1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (−1, 1, −1, 1, −1, −1, 1, 1), (1, 1, −1, −1, 1, −1, 1, −1), (1, −1, −1, −1, −1, 1, 1, 1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (−1, 1, 1, 1, −1, −1, −1, 1), (1, 1, 1, −1, 1, −1, −1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (−1, 1, 1, 1, −1, −1, −1, 1), (1, 1, 1, −1, 1, −1, −1, −1), (−1, −1, 1, 1, 1, 1, −1, −1), (1, −1, 1, −1, −1, 1, −1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (−1, 1, 1, 1, −1, −1, −1, 1), (1, 1, 1, −1, 1, −1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (−1, 1, 1, 1, −1, −1, −1, 1), (1, 1, 1, −1, 1, −1, −1, −1), (−1, 1, −1, 1, 1, −1, 1, −1), (1, 1, −1, −1, −1, −1, 1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (−1, 1, 1, 1, −1, −1, −1, 1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (−1, 1, 1, 1, −1, −1, −1, 1), (1, 1, 1, −1, 1, −1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (−1, 1, 1, 1, −1, −1, −1, 1), (1, 1, 1, −1, 1, −1, −1, −1), (1, −1, 1, −1, −1, 1, −1, 1), (1, 1, −1, −1, −1, −1, 1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (1, −1, −1, −1, 1, 1, 1, −1), (1, 1, 1, −1, 1, −1, −1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (1, −1, −1, −1, 1, 1, 1, −1), (1, 1, 1, −1, 1, −1, −1, −1), (−1, −1, 1, 1, 1, 1, −1, −1), (1, −1, 1, −1, −1, 1, −1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (1, −1, −1, −1, 1, 1, 1, −1), (1, 1, 1, −1, 1, −1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (1, −1, −1, −1, 1, 1, 1, −1), (1, 1, 1, −1, 1, −1, −1, −1), (−1, 1, −1, 1, 1, −1, 1, −1), (1, 1, −1, −1, −1, −1, 1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (1, −1, −1, −1, 1, 1, 1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (1, −1, −1, −1, 1, 1, 1, −1), (1, 1, 1, −1, 1, −1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (1, −1, −1, −1, 1, 1, 1, −1), (1, 1, 1, −1, 1, −1, −1, −1), (1, −1, 1, −1, −1, 1, −1, 1), (1, 1, −1, −1, −1, −1, 1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (1, −1, 1, −1, 1, 1, −1, −1), (1, 1, −1, −1, 1, −1, 1, −1), (−1, −1, −1, 1, 1, 1, 1, −1), (−1, 1, 1, 1, 1, −1, −1, −1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (1, −1, 1, −1, 1, 1, −1, −1), (1, 1, −1, −1, 1, −1, 1, −1), (−1, −1, −1, 1, 1, 1, 1, −1), (1, −1, −1, −1, −1, 1, 1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, 1, 1, 1, 1, −1, −1, −1), (1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (1, −1, 1, −1, 1, 1, −1, −1), (1, 1, −1, −1, 1, −1, 1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (1, −1, 1, −1, 1, 1, −1, −1), (1, 1, −1, −1, 1, −1, 1, −1), (−1, 1, 1, 1, 1, −1, −1, −1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, −1, 1, 1, −1, 1), (1, −1, 1, −1, 1, 1, −1, −1), (1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, −1, 1, 1, −1, 1), (1, −1, 1, −1, 1, 1, −1, −1), (1, 1, −1, −1, 1, −1, 1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, −1, 1, 1,−1, 1), (1, −1, 1, −1, 1, 1, −1, −1), (1, 1, −1, −1, 1, −1, 1, −1), (1, −1, −1, −1, −1, 1, 1, 1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, −1, 1,−1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (−1, 1, −1, 1, −1,−1, 1, 1), (1, −1, 1, 1, −1, −1, 1, −1), (1, 1, −1, −1, 1, −1, 1, −1), (−1, −1, −1, 1, 1, 1, 1, −1), (−1, 1, 1, 1, 1, −1, −1, −1), (1, −1,−1, 1, 1, −1, −1, 1), (1, 1, 1, 1, 1, 1, 1, 1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, 1, −1,−1, 1, 1), (1, −1, 1, 1, −1, −1, 1, −1), (1, 1, −1, −1, 1, −1, 1, −1), (−1, −1, −1, 1, 1, 1, 1, −1), (1, −1, −1, −1, −1, 1, 1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, 1, −1, −1, 1, 1), (1, −1, 1, 1, −1, −1, 1, −1), (1, 1, −1, −1, 1, −1, 1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, 1, −1,−1, 1, 1), (1, −1, 1, 1, −1, −1, 1, −1), (1, 1, −1, −1, 1, −1, 1, −1), (−1, 1, 1, 1, 1, −1, −1, −1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, −1, 1, −1, −1, 1, 1), (1, −1, 1, 1, −1, −1, 1, −1), (1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1,−1, 1, −1, 1, 1), (−1, 1, −1, 1, −1, −1, 1, 1), (1, −1, 1, 1, −1, −1, 1, −1), (1, 1, −1, −1, 1, −1, 1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, −1, 1, −1,−1, 1, 1), (1, −1, 1, 1, −1, −1, 1, −1), (1, 1, −1, −1, 1, −1, 1, −1), (1, −1, −1, −1, −1, 1, 1, 1), (1, 1, 1, −1, −1, −1, −1, 1), (1, −1,−1, 1, 1, −1, −1, 1), (1, 1, 1, 1, 1, 1, 1, 1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,−1, 1, 1, −1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, 1,−1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, 1, −1, 1, −1, 1, 1), (−1, 1, 1, 1, −1, −1,−1, 1), (1, −1, 1, 1, −1, −1, 1, −1), (1, 1, 1, −1, 1, −1, −1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1, 1,−1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, 1, −1, 1, −1, 1, 1), (−1, 1, 1, 1, −1, −1,−1, 1), (1, −1, 1, 1, −1, −1, 1, −1), (1, 1, 1, −1, 1, −1, −1, −1), (−1, −1, 1, 1, 1, 1, −1, −1), (1, −1, 1, −1, −1, 1, −1, 1), (1, −1,−1, 1, 1, −1, −1, 1), (1, 1, 1, 1, 1, 1, 1, 1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1, 1,−1, 1, −1, 1, 1), (−1, 1, 1, 1, −1, −1, −1, 1), (1, −1, 1, 1, −1, −1, 1, −1), (1, 1, 1, −1, 1, −1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, 1, 1, −1, −1,−1, 1), (1, −1, 1, 1, −1, −1, 1, −1), (1, 1, 1, −1, 1, −1, −1, −1), (−1, 1, −1, 1, 1, −1, 1, −1), (1, 1, −1, −1, −1, −1, 1, 1), (1, −1,−1, 1, 1, −1, −1, 1), (1, 1, 1, 1, 1, 1, 1, 1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,−1, 1, 1, −1)}, {(−1, −1, 1, −1, 1, −1, 1, 1), (−1, 1, 1, 1, −1, −1, −1, 1), (1, −1, 1, 1, −1, −1, 1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1, 1,−1, 1, −1, 1, 1), (−1, 1, 1, 1, −1, −1, −1, 1), (1, −1, 1, 1, −1, −1, 1, −1), (1, 1, 1, −1, 1, −1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (−1, 1, 1, 1, −1, −1,−1, 1), (1, −1, 1, 1, −1, −1, 1, −1), (1, 1, 1, −1, 1, −1, −1, −1), (1, −1, 1, −1, −1, 1, −1, 1), (1, 1, −1, −1, −1, −1, 1, 1), (1, −1,−1, 1, 1, −1, −1, 1), (1, 1, 1, 1, 1, 1, 1, 1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,−1, 1, 1, −1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, −1, 1,−1, 1, −1, 1, 1), (1, −1, −1, −1, 1, 1, 1, −1), (1, −1, 1, 1, −1, −1, 1, −1), (1, 1, 1, −1, 1, −1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, −1, 1, −1, 1, −1, 1, 1), (1, −1, −1, −1, 1, 1, 1,−1), (1, −1, 1, 1, −1, −1, 1, −1), (1, 1, 1, −1, 1, −1, −1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, −1, 1,−1, 1, −1, 1, 1), (1, −1, −1, −1, 1, 1, 1, −1), (1, −1, 1, 1, −1, −1, 1, −1), (1, 1, 1, −1, 1, −1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, −1, 1, −1, 1, −1, 1, 1), (1, −1, −1,−1, 1, 1, 1, −1), (1, −1, 1, 1, −1, −1, 1, −1), (1, 1, 1, −1, 1, −1, −1, −1), (−1, −1, 1, 1, 1, 1, −1, −1), (1, −1, 1, −1, −1, 1, −1, 1), (1, −1, −1, 1, 1, −1, −1, 1), (1, 1, 1, 1, 1, 1, 1, 1)}, {(−1, −1, 1, −1, 1, −1, 1, 1), (1, −1, −1, −1, 1, 1, 1, −1), (1, −1, 1, 1, −1,−1, 1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1, −1, 1, 1, −1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1,−1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1, −1, −1, −1), (−1, 1, −1, 1, 1,−1, 1, −1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (1, −1,−1, −1, 1, 1, 1, −1), (1, −1, 1, 1, −1, −1, 1, −1), (1, 1, 1, −1, 1, −1, −1, −1), (−1, 1, −1, 1, 1, −1, 1, −1), (1, 1, −1, −1, −1, −1, 1, 1), (1, −1, −1, 1, 1, −1, −1, 1), (1, 1, 1, 1, 1, 1, 1, 1)}, {(−1, −1, 1, −1, 1 −1, 1, 1), (1, −1, −1, −1, 1, 1, 1, −1), (1, −1, 1, 1, −1,−1, 1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1, −1, 1, 1, −1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1,−1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, −1, 1, −1, 1, −1, 1, 1), (1, −1, −1, −1, 1, 1, 1, −1), (1, −1, 1, 1, −1, −1, 1, −1), (1, 1, 1, −1, 1, −1, −1, −1), (1, −1, 1, −1,−1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, −1, 1, −1, 1, −1, 1, 1), (1,−1, −1, −1, 1, 1, 1, −1), (1, −1, 1, 1, −1, −1, 1, −1), (1, 1, 1, −1, 1, −1, −1, −1), (1, −1, 1, −1, −1, 1, −1, 1), (1, 1, −1, −1, −1,−1, 1, 1), (1, −1, −1, 1, 1, −1, −1, 1), (1, 1, 1, 1, 1, 1, 1, 1)}, {(−1, −1, 1, −1, 1, −1, 1, 1), (1, −1, 1, −1, 1, 1, −1, −1), (1,−1, 1, 1, −1, −1, 1, −1), (1, 1, −1, −1, 1, −1, 1, −1), (−1, −1, −1, 1, 1, 1, 1, −1), (−1, 1, 1, 1, 1, −1, −1, −1), (−1, −1, −1, −1, −1, −1,−1, −1), (−1, 1, 1, −1, −1, 1, 1, −1)}, {(−1, −1, 1, −1, 1, −1, 1, 1), (1, −1, 1, −1, 1, 1, −1, −1), (1, −1, 1, 1, −1, −1, 1, −1), (1, 1,−1, −1, 1, −1, 1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1,−1, 1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1, −1), (−1, −1,−1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1, −1), (−1, −1, −1, 1, 1, 1, 1, −1), (−1, 1, 1, 1, 1, −1,−1, −1), (1, −1, −1, 1, 1, −1, −1, 1), (1, 1, 1, 1, 1, 1, 1, 1)}, {(−1, −1, 1, −1, 1, −1, 1, 1), (1, −1, 1, −1, 1, 1, −1, −1), (1,−1, 1, 1, −1, −1, 1, −1), (1, 1, −1, −1, 1, −1, 1, −1), (−1, −1, −1, 1, 1, 1, 1, −1), (1, −1, −1, −1, −1, 1, 1, 1, 1), (−1, −1, −1, −1, −1, −1, −1,−1, −1), (−1, 1, 1, −1, −1, 1, 1, −1)}, {(−1, −1, 1, −1, 1, −1, 1, 1), (1, −1, 1, −1, 1, 1, −1, −1), (1, −1, 1, 1, −1, −1, 1, −1), (1, 1,−1, −1, 1, −1, 1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1,−1, 1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1, −1), (−1, −1,−1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1, −1), (−1, −1, −1, 1, 1, 1, 1, −1), (1, −1, −1, −1,−1, 1, 1, 1), (1, −1, −1, 1, 1, −1, −1, 1), (1, 1, 1, 1, 1, 1, 1, 1)}, {(−1, −1, 1, −1, 1, −1, 1, 1), (1, −1, 1, −1, 1, 1, −1, −1), (1,−1, 1, 1, −1, −1, 1, −1), (1, 1, −1, −1, 1, −1, 1, −1), (−1, 1, 1, 1, 1, −1, −1, −1), (1, 1, 1, −1, −1, −1, −1, 1), (−1, −1, −1, −1, −1, −1,−1, −1), (−1, 1, 1, −1, −1, 1, 1, −1)}, {(−1, −1, 1, −1, 1, −1, 1, 1), (1, −1, 1, −1, 1, 1, −1, −1), (1, −1, 1, 1, −1, −1, 1, −1), (1, 1,−1, −1, 1, −1, 1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1,−1, 1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, −1, 1,−1, 1, 1), (1, −1, 1, −1, 1, 1, −1, −1), (1, −1, 1, 1, −1, −1, 1, −1), (1, 1, −1, −1, 1, −1, 1, −1), (−1, 1, 1, 1, 1, −1, −1, −1), (1, 1, 1,−1, −1, −1, −1, 1), (1, −1, −1, 1, 1, −1, −1, 1), (1, 1, 1, 1, 1, 1, 1, 1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1, −1), (1, −1, −1, −1, −1, 1, 1, 1), (1, 1, 1, −1, −1, −1, −1, 1), (−1, −1, −1, −1,−1, −1, −1, −1), (−1, 1, 1, −1, −1, 1, 1, −1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1, −1), (1, −1, −1, −1, −1, 1, 1, 1), (1, 1, 1, −1, −1, −1, −1, 1), (−1, −1, −1, −1, −1, −1, −1, −1), (1, −1,−1, 1, 1, −1, −1, 1)}, {(−1, −1, 1, −1, 1, −1, 1, 1), (1, −1, 1, −1, 1, 1, −1, −1), (1, −1, 1, 1, −1, −1, 1, −1), (1, 1, −1, −1, 1, −1, 1,−1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1,−1, 1, −1, 1, 1), (1, −1, 1, −1, 1, 1, −1, −1), (1, −1, 1, 1, −1, −1, 1, −1), (1, 1, −1, −1, 1, −1, 1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, −1, 1, 1, 1, −1), (−1, 1, −1, −1,−1, 1, 1, 1), (−1, 1, 1, 1, −1, 1, −1, −1), (1, 1, 1, −1, −1, −1, 1, −1), (−1, 1, −1, 1, 1, −1, 1, −1), (−1, 1, 1, −1, 1, −1, −1, 1), (−1,−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (−1, 1, 1, 1,−1, 1, −1, −1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, −1, 1, −1, 1, 1, 1, −1), (−1, 1, −1, −1, −1, 1, 1, 1), (−1, 1, 1, 1, −1, 1, −1, −1), (1, 1, 1, −1,−1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1,−1, 1, −1, 1, 1, 1, −1), (−1, 1, −1, −1, −1, 1, 1, 1), (−1, 1, 1, 1, −1, 1, −1, −1), (1, 1, 1, −1, −1, −1, 1, −1), (−1, 1, −1, 1, 1, −1, 1,−1), (−1, 1, 1, −1, 1, −1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1, −1,−1, 1, 1, 1), (−1, 1, 1, 1, −1, 1, −1, −1), (1, 1, 1, −1, −1, −1, 1, −1), (−1, 1, −1, 1, 1, −1, 1, −1), (1, −1, −1, 1, −1, 1, 1, −1), (−1,−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (−1, 1, 1, 1,−1, 1, −1, −1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, −1, 1, −1, 1, 1, 1, −1), (−1, 1, −1, −1, −1, 1, 1, 1), (−1, 1, 1, 1, −1, 1, −1, −1), (1, 1, 1, −1,−1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1,−1, 1, −1, 1, 1, 1, −1), (−1, 1, −1, −1, −1, 1, 1, 1), (−1, 1, 1, 1, −1, 1, −1, −1), (1, 1, 1, −1, −1, −1, 1, −1), (−1, 1, −1, 1, 1, −1, 1,−1), (1, −1, −1, 1, −1, 1, 1, −1), (1, 1, −1, −1, 1, 1, −1, −1), (1, 1, 1, 1, 1, 1, 1, 1)}, {(−1, −1, 1, −1, 1, 1, 1, −1), (−1, 1, −1, −1,−1, 1, 1, 1), (−1, 1, 1, 1, −1, 1, −1, −1), (1, 1, 1, −1, −1, −1, 1, −1), (−1, 1, 1, −1, 1, −1, −1, 1), (1, −1, 1, −1, −1, 1, −1, 1), (−1,−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (−1, 1, 1, 1,−1, 1, −1, −1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, −1, 1, −1, 1, 1, 1, −1), (−1, 1, −1, −1, −1, 1, 1, 1), (−1, 1, 1, 1, −1, 1, −1, −1), (1, 1, 1, −1,−1, −1, 1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1,−1, 1, −1, 1, 1, 1, −1), (−1, 1, −1, −1, −1, 1, 1, 1), (−1, 1, 1, 1, −1, 1, −1, −1), (1, 1, 1, −1, −1, −1, 1, −1), (−1, 1, 1, −1, 1, −1,−1, 1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1,−1, −1, 1, 1, 1), (−1, 1, 1, 1, −1, 1, −1, −1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (−1, 1, 1, 1,−1, 1, −1, −1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, −1, 1, −1, 1, 1, 1, −1), (−1, 1, −1, −1, −1, 1, 1, 1), (−1, 1, 1, 1, −1, 1, −1, −1), (1, 1, 1, −1,−1, −1, 1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1,−1, 1, −1, 1, 1, 1, −1), (−1, 1, −1, −1, −1, 1, 1, 1), (−1, 1, 1, 1, −1, 1, −1, −1), (1, 1, 1, −1, −1, −1, 1, −1), (1, −1, −1, 1, −1, 1, 1,−1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1, −1,−1, 1, 1, 1), (1, −1, −1, −1, 1, −1, 1, 1), (1, 1, 1, −1, −1, −1, 1, −1), (−1, 1, −1, 1, 1, −1, 1, −1), (−1, 1, 1, −1, 1, −1, −1, 1), (−1,−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (1, −1, −1, −1, 1,−1, 1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, −1, 1, −1, 1, 1, 1, −1), (−1, 1, −1, −1, −1, 1, 1, 1), (1, −1, −1, −1, 1, −1, 1, 1), (1, 1, 1, −1,−1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1,−1, 1, −1, 1, 1, 1, −1), (−1, 1, −1, −1, −1, 1, 1, 1), (1, −1, −1, −1, 1, −1, 1, 1), (1, 1, 1, −1, −1, −1, 1, −1), (−1, 1, −1, 1, 1, −1, 1,−1), (−1, 1, 1, −1, 1, −1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1, −1,−1, 1, 1, 1), (1, −1, −1, −1, 1, −1, 1, 1), (1, 1, 1, −1, −1, −1, 1, −1), (−1, 1, −1, 1, 1, −1, 1, −1), (1, −1, −1, 1, −1, 1, 1, −1), (−1,−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (1, −1, −1, −1, 1,−1, 1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, −1, 1, −1, 1, 1, 1, −1), (−1, 1, −1, −1, −1, 1, 1, 1), (1, −1, −1, −1, 1, −1, 1, 1), (1, 1, 1, −1,−1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1,−1, 1, −1, 1, 1, 1, −1), (−1, 1, −1, −1, −1, 1, 1, 1), (1, −1, −1, −1, 1, −1, 1, 1), (1, 1, 1, −1, −1, −1, 1, −1), (−1, 1, −1, 1, 1, −1, 1,−1), (1, −1, −1, 1, −1, 1, 1, −1), (1, 1, −1, −1, 1, 1, −1, −1), (1, 1, 1, 1, 1, 1, 1, 1)}, {(−1, −1, 1, −1, 1, 1, 1, −1), (−1, 1, −1, −1,−1, 1, 1, 1), (1, −1, −1, −1, 1, −1, 1, 1), (1, 1, 1, −1, −1, −1, 1, −1), (−1, 1, 1, −1, 1, −1, −1, 1), (1, −1, 1, −1, −1, 1, −1, 1), (−1,−1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (1, −1, −1, −1, 1,−1, 1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, −1, 1, −1, 1, 1, 1, −1), (−1, 1, −1, −1, −1, 1, 1, 1), (1, −1, −1, −1, 1, −1, 1, 1), (1, 1, 1, −1,−1, −1, 1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1,−1, 1, −1, 1, 1, 1, −1), (−1, 1, −1, −1, −1, 1, 1, 1), (1, −1, −1, −1, 1, −1, 1, 1), (1, 1, 1, −1, −1, −1, 1, −1), (−1, 1, 1, −1, 1, −1,−1, 1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1,−1, −1, 1, 1, 1), (1, −1, −1, −1, 1, −1, 1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, 1, −1, 1, 1, 1, −1), (−1, 1, −1, −1, −1, 1, 1, 1), (1, −1, −1,−1, 1, −1, 1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, −1, 1, −1, 1, 1, 1, −1), (−1, 1, −1, −1, −1, 1, 1, 1), (1, −1, −1, −1, 1, −1, 1, 1), (1, 1, 1, −1,−1, −1, 1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1,−1, 1, −1, 1, 1, 1, −1), (−1, 1, −1, −1, −1, 1, 1, 1), (1, −1, −1, −1, 1, −1, 1, 1), (1, 1, 1, −1, −1, −1, 1, −1), (1, −1, −1, 1, −1, 1, 1,−1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, −1, 1,−1, 1, 1, −1), (−1, 1, 1, −1, −1, 1, −1, 1), (1, 1, 1, −1, −1, −1, 1, −1), (−1, 1, −1, −1, 1, −1, 1, 1), (−1, 1, 1, 1, 1, −1, −1, −1), (−1,−1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (−1, 1, 1, −1,−1, 1, −1, 1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1, −1), (1, 1, −1, −1, 1, 1, −1, −1)}, {(−1, −1, 1, −1, 1, 1, 1, −1), (−1, 1, −1, 1, −1, 1, 1, −1), (−1, 1, 1, −1, −1, 1, −1, 1), (1, 1, 1, −1,−1, −1, 1, −1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1,−1, 1, −1, 1, 1, 1, −1), (−1, 1, −1, 1, −1, 1, 1, −1), (−1, 1, 1, −1, −1, 1, −1, 1), (1, 1, 1, −1, −1, −1, 1, −1), (−1, 1, −1, −1, 1,−1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1,−1, 1, −1, 1, 1, −1), (−1, 1, 1, −1, −1, 1, −1, 1), (1, 1, 1, −1, −1, −1, 1, −1), (−1, 1, −1, −1, 1, −1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (−1, 1, 1,−1, −1, 1, −1, 1), (1, 1, 1, −1, −1, −1, 1, −1), (−1, 1, −1, −1, 1, −1, 1, 1), (1, −1, −1, −1, −1, 1, 1, 1), (−1, −1, −1, −1, −1, −1, −1,−1), (1, 1, −1, −1, 1, 1, −1, −1)}, {(−1, −1, 1, −1, 1, 1, 1, −1), (−1, 1, −1, 1, −1, 1, 1, −1), (−1, 1, 1, −1, −1, 1, −1, 1), (1, 1, 1,−1, −1, −1, 1, −1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, 1, −1, 1, 1, 1, −1), (−1, 1, −1, 1, −1, 1, 1, −1), (−1, 1, 1, −1, −1, 1, −1, 1), (1, 1, 1, −1, −1, −1, 1, −1), (−1, 1, −1, −1, 1,−1, 1, 1), (1, −1, −1, −1, −1, 1, 1, 1), (1, 1, −1, −1, 1, 1, −1, −1), (1, 1, 1, 1, 1, 1, 1, 1)}, {(−1, −1, 1, −1, 1, 1, 1, −1), (−1, 1,−1, 1, −1, 1, 1, −1), (−1, 1, 1, −1, −1, 1, −1, 1), (1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (−1, 1, 1,−1, −1, 1, −1, 1), (1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1,−1), (1, 1, −1, −1, 1, 1, −1, −1)}, {(−1, −1, 1, −1, 1, 1, 1, −1), (−1, 1, −1, 1, −1, 1, 1, −1), (−1, 1, 1, −1, −1, 1, −1, 1), (1, 1, 1,−1, −1, −1, 1, −1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, 1, −1, 1, 1, 1, −1), (−1, 1, −1, 1, −1, 1, 1, −1), (−1, 1, 1, −1, −1, 1, −1, 1), (1, 1, 1, −1, −1, −1, 1, −1), (−1, 1, 1, 1, 1, −1,−1, −1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1,−1, 1, −1, 1, 1, −1), (−1, 1, 1, −1, −1, 1, −1, 1), (1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (−1, 1, 1,−1, −1, 1, −1, 1), (1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1,−1), (1, 1, −1, −1, 1, 1, −1, −1)}, {(−1, −1, 1, −1, 1, 1, 1, −1), (−1, 1, −1, 1, −1, 1, 1, −1), (−1, 1, 1, −1, −1, 1, −1, 1), (1, 1, 1,−1, −1, −1, 1, −1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, 1, −1, 1, 1, 1, −1), (−1, 1, −1, 1, −1, 1, 1, −1), (−1, 1, 1, −1, −1, 1, −1, 1), (1, 1, 1, −1, −1, −1, 1, −1), (1, −1, −1, −1,−1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1,−1, 1, −1, 1, 1, −1), (1, −1, −1, 1, 1, −1, 1, −1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (1, −1,−1, 1, 1, −1, 1, −1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1,−1), (1, 1, −1, −1, 1, 1, −1, −1)}, {(−1, −1, 1, −1, 1, 1, 1, −1), (−1, 1, −1, 1, −1, 1, 1, −1), (1, −1, −1, 1, 1, −1, 1, −1), (1, 1, 1,−1, −1, −1, 1, −1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1, 1, −1, 1, 1, 1, −1), (−1, 1, −1, 1, −1, 1, 1, −1), (1, −1, −1, 1, 1, −1, 1, −1), (1, 1, 1, −1, −1, −1, 1, −1), (−1, 1, −1, −1, 1,−1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1,−1, 1, −1, 1, 1, −1), (1, −1, −1, 1, 1, −1, 1, −1), (1, 1, 1, −1, −1, −1, 1, −1), (−1, 1, −1, −1, 1, −1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (1, −1,−1, 1, 1, −1, 1, −1), (1, 1, 1, −1, −1, −1, 1, −1), (−1, 1, −1, −1, 1, −1, 1, 1), (1, −1, −1, −1, −1, 1, 1, 1), (−1, −1, −1, −1, −1, −1, −1,−1), (1, 1, −1, −1, 1, 1, −1, −1)}, {(−1, −1, 1, −1, 1, 1, 1, −1), (−1, 1, −1, 1, −1, 1, 1, −1), (1, −1, −1, 1, 1, −1, 1, −1), (1, 1, 1,−1, −1, −1, 1, −1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, −1, 1, −1, 1, 1, 1, −1), (−1, 1, −1, 1, −1, 1, 1, −1), (1, −1, −1, 1, 1, −1, 1, −1), (1, 1, 1, −1, −1, −1, 1, −1), (−1, 1, −1, −1, 1,−1, 1, 1), (1, −1, −1, −1, −1, 1, 1, 1), (1, 1, −1, −1, 1, 1, −1, −1), (1, 1, 1, 1, 1, 1, 1, 1)}, {(−1, −1, 1, −1, 1, 1, 1, −1), (−1, 1,−1, 1, −1, 1, 1, −1), (1, −1, −1, 1, 1, −1, 1, −1), (1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (1, −1,−1, 1, 1, −1, 1, −1), (1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1,−1), (1, 1, −1, −1, 1, 1, −1, −1)}, {(−1, −1, 1, −1, 1, 1, 1, −1), (−1, 1, −1, 1, −1, 1, 1, −1), (1, −1, −1, 1, 1, −1, 1, −1), (1, 1, 1,−1, −1, −1, 1, −1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, −1, 1, −1, 1, 1, 1, −1), (−1, 1, −1, 1, −1, 1, 1, −1), (1, −1, −1, 1, 1, −1, 1, −1), (1, 1, 1, −1, −1, −1, 1, −1), (−1, 1, 1, 1, 1, −1,−1, −1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1,−1, 1, −1, 1, 1, −1), (1, −1, −1, 1, 1, −1, 1, −1), (1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, −1, 1, −1, 1, 1, −1), (1, −1,−1, 1, 1, −1, 1, −1), (1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1,−1), (1, 1, −1, −1, 1, 1, −1, −1)}, {(−1, −1, 1, −1, 1, 1, 1, −1), (−1, 1, −1, 1, −1, 1, 1, −1), (1, −1, −1, 1, 1, −1, 1, −1), (1, 1, 1,−1, −1, −1, 1, −1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, −1, 1, −1, 1, 1, 1, −1), (−1, 1, −1, 1, −1, 1, 1, −1), (1, −1, −1, 1, 1, −1, 1, −1), (1, 1, 1, −1, −1, −1, 1, −1), (1, −1, −1, −1,−1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, −1, −1, 1, −1, 1, 1), (−1, 1, 1, 1, 1, −1,−1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, −1, −1,−1, −1, −1, −1), (1, 1, −1, −1, 1, 1, −1, −1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1,−1, 1, −1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1,−1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, −1, −1, 1,−1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, −1, −1, 1, −1, 1, 1), (1, −1, −1, −1,−1, 1, 1, 1), (−1, −1, −1, −1, −1, −1, −1, −1), (1, 1, −1, −1, 1, 1, −1, −1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, 1, 1, −1,−1, 1, 1), (1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1,−1, −1, −1, 1, −1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, 1, 1, 1, −1,−1, −1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, 1, 1, 1, −1, −1, −1), (1, −1, 1, 1, −1, 1,−1, −1), (−1, −1, −1, −1, −1, −1, −1, −1), (1, 1, −1, −1, 1, 1, −1, −1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, 1, 1, −1,−1, 1, 1), (1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1,−1, −1, −1, 1, −1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (1, −1, −1, −1,−1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (1, −1, −1, −1, −1, 1, 1, 1), (1, −1, 1, 1, −1, 1,−1, −1), (−1, −1, −1, −1, −1, −1, −1, −1), (1, 1, −1, −1, 1, 1, −1, −1)}, {(−1, −1, 1, −1, 1, 1, 1, −1), (−1, 1, 1, −1, −1, 1, −1, 1), (1, −1, 1, −1, 1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, 1, 1, −1,−1, 1, 1), (1, 1, 1, 1, 1, 1, 1, 1)}, {(−1, −1, 1, −1, 1, 1, 1, −1), (−1, 1, 1, −1, −1, 1, −1, 1), (1, −1, 1, −1, 1, −1, −1, 1), (1, 1, 1,−1, −1, −1, 1, −1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1,−1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1,−1, −1, 1), (−1, −1, −1, −1, −1, −1, −1, −1), (1, 1, −1, −1, 1, 1, −1, −1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1, −1, −1, 1), (−1, −1, 1, 1, −1,−1, 1, 1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1,−1, −1, −1, 1, −1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1,−1, 1, −1), (1, −1, −1, 1, −1, 1, 1, −1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (1, −1, −1, 1,−1, 1, 1, −1), (−1, −1, −1, −1, −1, −1, −1, −1), (1, 1, −1, −1, 1, 1, −1, −1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, −1, 1, 1, −1, 1, −1), (1, −1, −1, 1, −1, 1, 1, −1), (−1, −1, 1, 1, −1,−1, 1, 1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1,−1, −1, −1, 1, −1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, 1, −1, 1, −1,−1, 1), (1, −1, 1, −1, −1, 1, −1, 1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (−1, 1, 1, −1, 1, −1, −1, 1), (1, −1, 1, −1, −1, 1,−1, 1), (−1, −1, −1, −1, −1, −1, −1, −1), (1, 1, −1, −1, 1, 1, −1, −1)}, {(−1, −1, 1, −1, 1, 1, 1, −1), (−1, 1, 1, 1, −1, 1, −1, −1), (1,−1, 1, 1, 1, −1, −1, −1), (1, 1, 1, −1, −1, −1, 1, −1), (−1, 1, 1, −1, 1, −1, −1, 1), (1, −1, 1, −1, −1, 1, −1, 1), (−1, −1, 1, 1, −1,−1, 1, 1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1,−1, −1, −1, 1, −1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (1, −1, −1, 1,−1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (1, −1, −1, 1, −1, 1, 1, −1), (1, −1, 1, −1,−1, 1, −1, 1), (−1, −1, −1, −1, −1, −1, −1, −1), (1, 1, −1, −1, 1, 1, −1, −1)}, {(−1, −1, 1, −1, 1, 1, 1, −1), (−1, 1, 1, 1, −1, 1, −1, −1), (1, −1, 1, 1, 1, −1, −1, −1), (1, 1, 1, −1, −1, −1, 1, −1), (1, −1, −1, 1, −1, 1, 1, −1), (1, −1, 1, −1, −1, 1, −1, 1), (−1, −1, 1, 1, −1,−1, 1, 1), (1, 1, 1, 1, 1, 1, 1, 1)}, {(−1, −1, 1, −1, 1, 1, 1, −1), (−1, 1, 1, 1, −1, 1, −1, −1), (1, −1, 1, 1, 1, −1, −1, −1), (1, 1, 1,−1, −1, −1, 1, −1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1,−1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1,−1, −1, 1), (−1, −1, −1, −1, −1, −1, −1, −1), (1, 1, −1, −1, 1, 1, −1, −1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (−1, 1, 1, −1, 1, −1, −1, 1), (−1, −1, 1, 1, −1,−1, 1, 1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1,−1, −1, −1, 1, −1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1,−1, 1, −1), (1, −1, −1, 1, −1, 1, 1, −1), (−1, −1, −1, −1, −1, −1, −1, −1), (−1, −1, 1, 1, −1, −1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (1, −1, −1, 1,−1, 1, 1, −1), (−1, −1, −1, −1, −1, −1, −1, −1), (1, 1, −1, −1, 1, 1, −1, −1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, −1, 1, 1, −1, 1, −1), (1, −1, −1, 1, −1, 1, 1, −1), (−1, −1, 1, 1, −1,−1, 1, 1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1,−1, −1, −1, 1, −1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (−1, 1, 1, −1, 1, −1,−1, 1), (1, −1, 1, −1, −1, 1, −1, 1), (−1, −1, −1, −1, −1, −1, −1, −1), (−1, −1, 1, 1, −1, −1, 1, 1)}, {(−1, −1, 1, −1, 1, 1, 1, −1), (1,−1, −1, −1, 1, −1, 1, 1), (1, −1, 1, 1, 1, −1, −1, −1), (1, 1, 1, −1, −1, −1, 1, −1), (−1, 1, 1, −1, 1, −1, −1, 1), (1, −1, 1, −1, −1, 1,−1, 1), (−1, −1, −1, −1, −1, −1, −1, −1), (1, 1, −1, −1, 1, 1, −1, −1)}, {(−1, −1, 1, −1, 1, 1, 1, −1), (1, −1, −1, −1, 1, −1, 1, 1), (1,−1, 1, 1, 1, −1, −1, −1), (1, 1, 1, −1, −1, −1, 1, −1), (−1, 1, 1, −1, 1, −1, −1, 1), (1, −1, 1, −1, −1, 1, −1, 1), (−1, −1, 1, 1, −1,−1, 1, 1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1,−1, −1, −1, 1, −1), (−1, 1, 1, −1, 1, −1, −1, 1), (1, −1, −1, 1, −1, 1, 1, −1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (1, −1, −1, 1,−1, 1, 1, −1), (1, −1, 1, −1,−1, 1, −1, 1), (−1, −1, −1, −1, −1, −1, −1, −1), (1, 1, −1, −1, 1, 1, −1, −1)}, {(−1, −1, 1, −1, 1, 1, 1, −1), (1, −1, −1, −1, 1, −1, 1, 1), (1, −1, 1, 1, 1, −1, −1, −1), (1, 1, 1, −1, −1, −1, 1, −1), (1, −1, −1, 1, −1, 1, 1, −1), (1, −1, 1, −1, −1, 1, −1, 1), (−1, −1, 1, 1, −1,−1, 1, 1), (1, 1, 1, 1, 1, 1, 1, 1)}, {(−1, −1, 1, −1, 1, 1, 1, −1), (1, −1, −1, −1, 1, −1, 1, 1), (1, −1, 1, 1, 1, −1, −1, −1), (1, 1, 1,−1, −1, −1, 1, −1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, −1, −1, 1,−1, 1, 1), (−1, 1, 1, 1, 1, −1,−1, −1), (−1, −1, −1, −1, −1, −1, −1, −1), (1, 1, −1, −1, 1, 1, −1, −1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, 1, 1, −1,−1, 1, 1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1,−1, −1, −1, 1, −1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, −1, −1, 1,−1, 1, 1), (1, −1, −1, −1, −1, 1, 1, 1), (−1, −1, −1, −1, −1, −1, −1, −1), (−1, −1, 1, 1, −1, −1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, −1, −1, 1, −1, 1, 1), (1, −1, −1, −1,−1, 1, 1, 1), (−1, −1, −1, −1, −1, −1, −1, −1), (1, 1, −1, −1, 1, 1, −1, −1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, 1, 1, −1,−1, 1, 1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1,−1, −1, −1, 1, −1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, 1, 1, 1, −1,−1, −1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, 1, 1, 1, −1, −1, −1), (1, −1, 1, 1, −1, 1,−1, −1), (−1, −1, −1, −1, −1, −1, −1, −1), (1, 1, −1, −1, 1, 1, −1, −1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, 1, 1, −1,−1, 1, 1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1,−1, −1, −1, 1, −1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (1, −1, −1, −1,−1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (1, −1, −1, −1, −1, 1, 1, 1), (1, −1, 1, 1, −1, 1,−1, −1), (−1, −1, −1, −1, −1, −1, −1, −1), (1, 1, −1, −1, 1, 1, −1, −1)}, {(−1, −1, 1, −1, 1, 1, 1, −1), (1, −1, −1, 1, 1, −1, 1, −1), (1, −1, 1, −1, 1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, 1, 1, −1,−1, 1, 1), (1, 1, 1, 1, 1, 1, 1, 1)}, {(−1, −1, 1, −1, 1, 1, 1, −1), (1, −1, −1, 1, 1, −1, 1, −1), (1, −1, 1, −1, 1, −1, −1, 1), (1, 1, 1,−1, −1, −1, 1, −1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (−1, −1, −1,−1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, −1, 1,−1, 1), (−1, −1, 1, 1, 1, −1, 1, −1), (−1, 1, −1, 1, −1, −1, 1, 1), (−1, 1, −1, 1, 1, 1, −1, −1), (−1, −1, −1, −1, 1, 1, 1, 1), (−1, 1, 1,−1, 1, −1, −1, 1), (−1, −1, −1, −1, −1, −1, −1, −1), (1, −1, −1, 1, 1, −1, −1, 1)}, {(−1, −1, 1, 1, −1, 1, −1, 1), (−1, −1, 1, 1, 1, −1, 1,−1), (−1, 1, −1, 1, −1, −1, 1, 1), (−1, 1, −1, 1, 1, 1, −1, −1), (−1, −1, −1, −1, 1, 1, 1, 1), (−1, 1, 1, −1, 1, −1, −1, 1), (−1, 1, 1, −1,−1, 1, 1, −1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (−1, −1, −1, −1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1,−1, −1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1, −1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (−1, −1, −1,−1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, −1, 1,−1, 1), (−1, −1, 1, 1, 1, −1, 1, −1), (−1, 1, −1, 1, −1, −1, 1, 1), (−1, 1, −1, 1, 1, 1, −1, −1), (−1, −1, −1, −1, 1, 1, 1, 1), (1, −1,−1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (−1, −1, −1, −1, 1, 1, 1, 1), (1, −1, −1, 1, −1, 1, 1, −1), (1, −1, −1, 1, 1,−1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (−1, 1,−1, 1, 1, 1, −1, −1), (−1, 1, 1, −1, 1, −1, −1, 1), (1, 1, 1, 1, −1, −1, −1, −1), (−1, −1, −1, −1, −1, −1, −1, −1), (−1, 1, 1, −1, −1, 1, 1,−1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (−1, 1, 1,−1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, −1, 1,−1, 1), (−1, −1, 1, 1, 1, −1, 1, −1), (−1, 1, −1, 1, −1, −1, 1, 1), (−1, 1, −1, 1, 1, 1, −1, −1), (−1, 1, 1, −1, 1, −1, −1, 1), (1, 1, 1, 1,−1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (−1, 1, 1, −1, 1, −1, −1, 1), (1, 1, 1, 1, −1, −1, −1, −1), (1, −1, −1, 1, 1, −1,−1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (−1, 1,−1, 1, 1, 1, −1, −1), (1, −1, −1, 1, −1, 1, 1, −1), (1, 1, 1, 1, −1, −1, −1, −1), (−1, −1, −1, −1, −1, −1, −1, −1), (−1, 1, 1, −1, −1, 1, 1,−1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (1, −1,−1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, −1, 1,−1, 1), (−1, −1, 1, 1, 1, −1, 1, −1), (−1, 1, −1, 1, −1, −1, 1, 1), (−1, 1, −1, 1, 1, 1, −1, −1), (1, −1, −1, 1, −1, 1, 1, −1), (1, 1, 1, 1,−1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (−1, 1, −1, 1, 1, 1, −1, −1), (1, −1, −1, 1, −1, 1, 1, −1), (1, 1, 1, 1, −1, −1, −1, −1), (1, −1, −1, 1, 1, −1,−1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (1, −1, 1,−1, −1, −1, 1, 1), (−1, −1, −1, −1, 1, 1, 1, 1), (−1, 1, 1, −1, 1, −1, −1, 1), (−1, −1, −1, −1, −1, −1, −1, −1), (−1, 1, 1, −1, −1, 1, 1,−1)}, {(−1, −1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1), (−1, −1,−1, −1, 1, 1, 1, 1), (−1, 1, 1, −1, 1, −1, −1, 1), (−1, −1, −1, −1, −1, −1, −1, −1), (1, −1, −1, 1, 1, −1, −1, 1)}, {(−1, −1, 1, 1, −1, 1,−1, 1), (−1, −1, 1, 1, 1, −1, 1, −1), (−1, 1, −1, 1, −1, −1, 1, 1), (1, −1, 1, −1, −1, −1, 1, 1), (−1, −1, −1, −1, 1, 1, 1, 1), (−1, 1, 1,−1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1), (−1, −1, −1, −1, 1, 1, 1, 1), (−1, 1, 1, −1, 1, −1, −1, 1), (1, −1, −1, 1, 1, −1,−1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (1, −1, 1,−1, −1, −1, 1, 1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1,−1)}, {(−1, −1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1), (−1, −1,−1, −1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, −1, 1,−1, 1), (−1, −1, 1, 1, 1, −1, 1, −1), (−1, 1, −1, 1, −1, −1, 1, 1), (1, −1, 1, −1, −1, −1, 1, 1), (−1, −1, −1, −1, 1, 1, 1, 1), (1, −1,−1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1), (−1, −1, −1, −1, 1, 1, 1, 1), (1, −1, −1, 1, −1, 1, 1, −1), (1, −1, −1, 1, 1,−1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (1,−1, 1, −1, −1, −1, 1, 1), (−1, 1, 1, −1, 1, −1, −1, 1), (1, 1, 1, 1, −1, −1, −1, −1), (−1, −1, −1, −1, −1, −1, −1, −1), (−1, 1, 1, −1,−1, 1, 1, −1)}, {(−1, −1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1,−1, 1, −1, 1), (−1, −1, 1, 1, 1, −1, 1, −1), (−1, 1, −1, 1, −1, −1, 1, 1), (1, −1, 1, −1, −1, −1, 1, 1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1,−1, 1, −1), (−1, 1, −1, 1, −1, −1, 1, 1), (1, −1, 1, −1, −1, −1, 1, 1), (−1, 1, 1, −1, 1, −1, −1, 1), (1, 1, 1, 1, −1, −1, −1, −1), (1, −1,−1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1), (1, −1, −1, 1, −1, 1, 1, −1), (1, 1, 1, 1, −1, −1, −1, −1), (−1, −1, −1, −1, −1, −1, −1, −1), (−1, 1, 1, −1,−1, 1, 1, −1)}, {(−1, −1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1), (1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1,−1, 1, 1, −1, 1, −1, 1), (−1, −1, 1, 1, 1, −1, 1, −1), (−1, 1, −1, 1, −1, −1, 1, 1), (1, −1, 1, −1, −1, −1, 1, 1), (1, −1, −1, 1, −1, 1, 1,−1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1,−1, 1, 1, 1, −1, 1, −1), (−1, 1, −1, 1, −1, −1, 1, 1), (1, −1, 1, −1, −1, −1, 1, 1), (1, −1, −1, 1, −1, 1, 1, −1), (1, 1, 1, 1, −1, −1, −1,−1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1,−1, 1, 1, 1, −1, −1), (1, −1, 1, −1, 1, 1, −1, −1), (−1, −1, −1, −1, 1, 1, 1, 1), (−1, 1, 1, −1, 1, −1, −1, 1), (−1, −1, −1, −1, −1, −1, −1,−1), (−1, 1, 1, −1, −1, 1, 1, −1)}, {(−1, −1, 1, 1, −1, 1, −1, 1), (−1, −1, 1, 1, 1, −1, 1, −1), (−1, 1, −1, 1, 1, 1, −1, −1), (1, −1, 1,−1, 1, 1, −1, −1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1, −1,−1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1), (−1, −1,−1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1), (−1, −1, −1, −1, 1, 1, 1, 1), (−1, 1, 1, −1, 1, −1,−1, 1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1,−1, 1, 1, 1, −1, −1), (1, −1, 1, −1, 1, 1, −1, −1), (−1, −1, −1, −1, 1, 1, 1, 1), (1, −1, −1, 1, −1, 1, 1, −1), (−1, −1, −1, −1, −1, −1, −1,−1), (−1, 1, 1, −1, −1, 1, 1, −1)}, {(−1, −1, 1, 1, −1, 1, −1, 1), (−1, −1, 1, 1, 1, −1, 1, −1), (−1, 1, −1, 1, 1, 1, −1, −1), (1, −1, 1,−1, 1, 1, −1, −1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1,−1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1), (−1, −1,−1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1), (−1, −1, −1, −1, 1, 1, 1, 1), (1, −1, −1, 1,−1, 1, 1, −1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1), (−1, 1, 1, −1, 1, −1, −1, 1), (1, 1, 1, 1, −1, −1, −1, −1), (−1, −1, −1, −1, −1,−1, −1, −1), (−1, 1, 1, −1, −1, 1, 1, −1)}, {(−1, −1, 1, 1, −1, 1, −1, 1), (−1, −1, 1, 1, 1, −1, 1, −1), (−1, 1, −1, 1, 1, 1, −1, −1), (1,−1, 1, −1, 1, 1, −1, −1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1,−1, −1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1,−1, 1), (−1, −1, 1, 1, 1, −1, 1, −1), (−1, 1, −1, 1, 1, 1, −1, −1), (1, −1, 1, −1, 1, 1, −1, −1), (−1, 1, 1, −1, 1, −1, −1, 1), (1, 1, 1, 1,−1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1), (1, −1, −1, 1, −1, 1, 1, −1), (1, 1, 1, 1, −1, −1, −1, −1), (−1, −1, −1, −1, −1,−1, −1, −1), (−1, 1, 1, −1, −1, 1, 1, −1)}, {(−1, −1, 1, 1, −1, 1, −1, 1), (−1, −1, 1, 1, 1, −1, 1, −1), (−1, 1, −1, 1, 1, 1, −1, −1), (1,−1, 1, −1, 1, 1, −1, −1), (1, −1, −1, 1, −1, 1, 1, −1), (1, 1, 1, 1, −1, −1, −1, −1), (−1, −1, −1, −1, −1, −1, −1, −1), (1, −1, −1, 1, 1,−1, −1, 1)}, {(−1, −1, 1, 1, −1, 1, −1, 1), (−1, −1, 1, 1, 1, −1, 1, −1), (−1, 1, −1, 1, 1, 1, −1, −1), (1, −1, 1, −1, 1, 1, −1, −1), (1,−1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1,−1, 1), (−1, −1, 1, 1, 1, −1, 1, −1), (−1, 1, −1, 1, 1, 1, −1, −1), (1, −1, 1, −1, 1, 1, −1, −1), (1, −1, −1, 1, −1, 1, 1, −1), (1, 1, 1, 1,−1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (1,−1, 1, −1, −1, −1, 1, 1), (1, −1, 1, −1, 1, 1, −1, −1), (−1, −1, −1, −1, 1, 1, 1, 1), (−1, 1, 1, −1, 1, −1, −1, 1), (−1, −1, −1, −1, −1, −1,−1, −1), (−1, 1, 1, −1, −1, 1, 1, −1)}, {(−1, −1, 1, 1, −1, 1, −1, 1), (−1, −1, 1, 1, 1, −1, 1, −1), (1, −1, 1, −1, −1, −1, 1, 1), (1,−1, 1, −1, 1, 1, −1, −1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1,−1, −1, 1)}, {(−1, −1, 1, 1, −1, 1, −1, 1), (−1, −1, 1, 1, 1, −1, 1, −1), (1, −1, 1, −1, −1, −1, 1, 1), (1, −1, 1, −1, 1, 1, −1, −1), (−1,−1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1), (1, −1, 1, −1, −1, −1, 1, 1), (1, −1, 1, −1, 1, 1, −1, −1), (−1, −1, −1, −1, 1, 1, 1, 1), (−1, 1, 1, −1, 1,−1, −1, 1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (1,−1, 1, −1, −1, −1, 1, 1), (1, −1, 1, −1, 1, 1, −1, −1), (−1, −1, −1, −1, 1, 1, 1, 1), (1, −1, −1, 1, −1, 1, 1, −1), (−1, −1, −1, −1, −1, −1,−1, −1), (−1, 1, 1, −1, −1, 1, 1, −1)}, {(−1, −1, 1, 1, −1, 1, −1, 1), (−1, −1, 1, 1, 1, −1, 1, −1), (1, −1, 1, −1, −1, −1, 1, 1), (1,−1, 1, −1, 1, 1, −1, −1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1,−1, −1, 1)}, {(−1, −1, 1, 1, −1, 1, −1, 1), (−1, −1, 1, 1, 1, −1, 1, −1), (1, −1, 1, −1, −1, −1, 1, 1), (1, −1, 1, −1, 1, 1, −1, −1), (−1,−1, −1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (−1, −1, 1, 1, 1, −1, 1, −1), (1, −1, 1, −1, −1, −1, 1, 1), (1, −1, 1, −1, 1, 1, −1, −1), (−1, −1, −1, −1, 1, 1, 1, 1), (1, −1, −1, 1,−1, 1, 1, −1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (1,−1, 1, −1, −1, −1, 1, 1), (1, −1, 1, −1, 1, 1, −1, −1), (−1, 1, 1, −1, 1, −1, −1, 1), (1, 1, 1, 1, −1, −1, −1, −1), (−1, −1, −1, −1, −1, −1,−1, −1), (−1, 1, 1, −1, −1, 1, 1, −1)}, {(−1, −1, 1, 1, −1, 1, −1, 1), (−1, −1, 1, 1, 1, −1, 1, −1), (1, −1, 1, −1, −1, −1, 1, 1), (1,−1, 1, −1, 1, 1, −1, −1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1,−1, −1, 1)}, {(−1, −1, 1, 1, −1, 1, −1, 1), (−1, −1, 1, 1, 1, −1, 1, −1), (1, −1, 1, −1, −1, −1, 1, 1), (1, −1, 1, −1, 1, 1, −1, −1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1,−1, 1), (−1, −1, 1, 1, 1, −1, 1, −1), (1, −1, 1, −1, −1, −1, 1, 1), (1, −1, 1, −1, 1, 1, −1, −1), (−1, 1, 1, −1, 1, −1, −1, 1), (1, 1, 1, 1,−1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, −1, 1, 1, 1, −1, 1, −1), (1,−1, 1, −1, −1, −1, 1, 1), (1, −1, 1, −1, 1, 1, −1, −1), (1, −1, −1, 1, −1, 1, 1, −1), (1, 1, 1, 1, −1, −1, −1, −1), (−1, −1, −1, −1, −1, −1,−1, −1), (−1, 1, 1, −1, −1, 1, 1, −1)}, {(−1, −1, 1, 1, −1, 1, −1, 1), (−1, −1, 1, 1, 1, −1, 1, −1), (1, −1, 1, −1, −1, −1, 1, 1), (1,−1, 1, −1, 1, 1, −1, −1), (1, −1, −1, 1, −1, 1, 1, −1), (1, 1, 1, 1, −1, −1, −1, −1), (−1, −1, −1, −1, −1, −1, −1, −1), (1, −1, −1, 1, 1,−1, −1, 1)}, {(−1, −1, 1, 1, −1, 1, −1, 1), (−1, −1, 1, 1, 1, −1, 1, −1), (1, −1, 1, −1, −1, −1, 1, 1), (1, −1, 1, −1, 1, 1, −1, −1), (1,−1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1,−1, 1), (−1, −1, 1, 1, 1, −1, 1, −1), (1, −1, 1, −1, −1, −1, 1, 1), (1, −1, 1, −1, 1, 1, −1, −1), (1, −1, −1, 1, −1, 1, 1, −1), (1, 1, 1, 1,−1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, −1, 1, 1, −1, 1), (−1, 1, −1, 1, −1, −1, 1, 1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1,−1, −1, −1), (−1, 1, 1, −1, −1, 1, 1, −1)}, {(−1, −1, 1, 1, −1, 1, −1, 1), (−1, 1, −1, −1, 1, 1, −1, 1), (−1, 1, −1, 1, −1, −1, 1, 1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1,−1, 1, 1, −1, −1, 1)}, {(−1, −1, 1, 1, −1, 1, −1, 1), (−1, 1, −1, −1, 1, 1, −1, 1), (−1, 1, −1, 1, −1, −1, 1, 1), (1, 1, −1, 1, −1, 1, −1,−1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, 1,−1, 1, −1, 1), (−1, 1, −1, −1, 1, 1, −1, 1), (−1, 1, −1, 1, −1, −1, 1, 1), (1, 1, −1, 1, −1, 1, −1, −1), (−1, −1, −1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, −1, 1, 1,−1, 1), (−1, 1, −1, 1, −1, −1, 1, 1), (1, 1, −1, 1, −1, 1, −1, −1), (−1, −1, −1, 1, 1, 1, 1, −1), (1, −1, −1, −1, −1, 1, 1, 1), (−1, −1, −1,−1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1), (−1, 1, −1, 1, −1,−1, 1, 1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (1,−1, −1, 1, 1, −1, −1, 1)}, {(−1, −1, 1, 1, −1, 1, −1, 1), (−1, 1, −1, −1, 1, 1, −1, 1), (−1, 1, −1, 1, −1, −1, 1, 1), (1, 1, −1, 1, −1, 1,−1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1,−1, 1, 1, −1, 1, −1, 1), (−1, 1, −1, −1, 1, 1, −1, 1), (−1, 1, −1, 1, −1, −1, 1, 1), (1, 1, −1, 1, −1, 1, −1, −1), (−1, −1, −1, 1, 1, 1, 1,−1), (1, −1, −1, −1, −1, 1, 1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1,−1, 1, 1, −1, 1), (−1, 1, −1, 1, −1, −1, 1, 1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1), (−1, 1, −1, 1,−1, −1, 1, 1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, −1, 1, 1, −1, 1), (−1, 1, −1, 1, −1, −1, 1, 1), (1, 1, −1, 1,−1, 1, −1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1,−1, 1, 1, −1, 1, −1, 1), (−1, 1, −1, −1, 1, 1, −1, 1), (−1, 1, −1, 1, −1, −1, 1, 1), (1, 1, −1, 1, −1, 1, −1, −1), (−1, 1, 1, 1, 1, −1, −1,−1), (1, 1, 1, −1, −1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1,−1, 1, 1, −1, 1), (−1, 1, −1, 1, −1, −1, 1, 1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1), (−1, 1, −1, 1,−1, −1, 1, 1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, −1, 1, 1, −1, 1), (−1, 1, −1, 1, −1, −1, 1, 1), (1, 1, −1, 1,−1, 1, −1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1,−1, 1, 1, −1, 1, −1, 1), (−1, 1, −1, −1, 1, 1, −1, 1), (−1, 1, −1, 1, −1, −1, 1, 1), (1, 1, −1, 1, −1, 1, −1, −1), (1, −1, −1, −1,−1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1,−1, −1, 1, 1, −1, 1), (1, −1, 1, −1, 1, 1, −1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1), (1, −1, 1,−1, 1, 1, −1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1,−1), (1, −1, −1, 1, 1, −1, −1, 1)}, {(−1, −1, 1, 1, −1, 1, −1, 1), (−1, 1, −1, −1, 1, 1, −1, 1), (1, −1, 1, −1, 1, 1, −1, −1), (1, 1,−1, 1, −1, 1, −1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (−1, −1,−1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (−1, −1, −1, 1, 1, 1, 1, −1), (1, −1, −1, −1,−1, 1, 1, 1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1,−1, −1, −1, −1), (1, −1, −1, 1, 1, −1, −1, 1)}, {(−1, −1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, 1, −1, 1, −1, 1), (−1, 1, −1, −1, 1, 1, −1, 1), (1, −1, 1, −1, 1, 1, −1, −1), (1, 1, −1, 1, −1, 1,−1, −1), (−1, −1, −1, 1, 1, 1, 1, −1), (1, −1, −1, −1, −1, 1, 1, 1), (1, −1, −1, 1, 1, −1, −1, 1), (1, 1, 1, 1, 1, 1, 1, 1)}, {(−1,−1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (−1, 1, 1, 1, 1, −1, −1,−1), (1, 1, 1, −1, −1, −1, −1, 1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (−1, 1, 1, 1, 1, −1, −1, −1), (1, 1, 1, −1, −1, −1,−1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, −1, 1, 1, −1, 1), (1,−1, 1, −1, 1, 1, −1, −1), (1, 1, −1, 1, −1, 1, −1, −1), (−1, 1, 1, 1, 1, −1, −1, −1), (1, 1, 1, −1, −1, −1, −1, 1), (−1, 1, 1, −1, −1, 1, 1,−1), (1, 1, 1, 1, 1, 1, 1, 1)}, {(−1, −1, 1, 1, −1, 1, −1, 1), (−1, 1, −1, −1, 1, 1, −1, 1), (1, −1, 1, −1, 1, 1, −1, −1), (1, 1, −1, 1,−1, 1, −1, −1), (−1, 1, 1, 1, 1, −1, −1, −1), (1, 1, 1, −1, −1, −1, −1, 1), (1, −1, −1, 1, 1, −1, −1, 1), (1, 1, 1, 1, 1, 1, 1, 1)}, {(−1,−1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (1, −1, −1, −1,−1, 1, 1, 1), (1, 1, 1, −1, −1, −1, −1, 1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (1, −1, −1, −1, −1, 1, 1, 1), (1, 1, 1, −1, −1,−1, −1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, −1, 1, 1, −1, 1), (1, −1, 1, −1, 1, 1, −1, −1), (1, 1, −1, 1, −1, 1, −1, −1), (1, −1, −1, −1, −1, 1, 1, 1), (1, 1, 1, −1, −1, −1, −1, 1), (−1, 1, 1, −1,−1, 1, 1, −1), (1, 1, 1, 1, 1, 1, 1, 1)}, {(−1, −1, 1, 1, −1, 1, −1, 1), (−1, 1, −1, −1, 1, 1, −1, 1), (1, −1, 1, −1, 1, 1, −1, −1), (1, 1,−1, 1, −1, 1, −1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1), (−1, −1, −1,−1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, −1, 1,−1, 1), (−1, 1, −1, 1, −1, −1, 1, 1), (−1, 1, −1, 1, 1, 1, −1, −1), (1, 1, −1, −1, −1, 1, −1, 1), (−1, −1, −1, −1, 1, 1, 1, 1), (−1, 1, 1,−1, 1, −1, −1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, −1,−1, 1, 1), (−1, 1, −1, 1, 1, 1, −1, −1), (1, 1, −1, −1, −1, 1, −1, 1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (−1, 1, −1, 1, 1, 1, −1,−1), (1, 1, −1, −1, −1, 1, −1, 1), (−1, −1, −1, −1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1,−1, 1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1), (−1, −1, −1,−1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, −1, 1,−1, 1), (−1, 1, −1, 1, −1, −1, 1, 1), (−1, 1, −1, 1, 1, 1, −1, −1), (1, 1, −1, −1, −1, 1, −1, 1), (−1, −1, −1, −1, 1, 1, 1, 1), (1, −1,−1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1), (−1, −1, −1, −1, 1, 1, 1, 1), (1, −1, −1, 1, −1, 1, 1, −1), (1, −1, −1, 1, 1,−1, −1, 1), (1, 1, 1, 1, 1, 1, 1, 1)}, {(−1, −1, 1, 1, −1, 1, −1, 1), (−1, 1, −1, 1, −1, −1, 1, 1), (−1, 1, −1, 1, 1, 1, −1, −1), (1, 1,−1, −1, −1, 1, −1, 1), (−1, 1, 1, −1, 1, −1, −1, 1), (1, 1, 1, 1, −1, −1, −1, −1), (−1, −1, −1, −1, −1, −1, −1, −1), (−1, 1, 1, −1,−1, 1, 1, −1)}, {(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1,−1, 1, −1, 1), (−1, 1, −1, 1, −1, −1, 1, 1), (−1, 1, −1, 1, 1, 1, −1, −1), (1, 1, −1, −1, −1, 1, −1, 1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1,−1, 1, 1), (−1, 1, −1, 1, 1, 1, −1, −1), (1, 1, −1, −1, −1, 1, −1, 1), (−1, 1, 1, −1, 1, −1, −1, 1), (1, 1, 1, 1, −1, −1, −1, −1), (1, −1,−1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1), (1, −1, −1, 1, −1, 1, 1, −1), (1, 1, 1, 1, −1, −1, −1, −1), (−1, −1, −1, −1, −1, −1, −1, −1), (−1, 1, 1, −1,−1, 1, 1, −1)}, {(−1, −1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1), (1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1,−1, 1, 1, −1, 1, −1, 1), (−1, 1, −1, 1, −1, −1, 1, 1), (−1, 1, −1, 1, 1, 1, −1, −1), (1, 1, −1, −1, −1, 1, −1, 1), (1, −1, −1, 1, −1, 1, 1,−1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1,−1, −1, 1, 1), (−1, 1, −1, 1, 1, 1, −1, −1), (1, 1, −1, −1, −1, 1, −1, 1), (1, −1, −1, 1, −1, 1, 1, −1), (1, 1, 1, 1, −1, −1, −1, −1), (1,−1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1, −1, 1, −1, −1,−1, 1, 1), (1, 1, −1, −1, −1, 1, −1, 1), (−1, −1, −1, −1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1,−1, 1, −1, 1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1), (−1, −1, −1,−1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1), (−1, −1, −1, −1, 1, 1, 1, 1), (−1, 1, 1, −1, 1, −1,−1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1, −1, 1,−1, −1, −1, 1, 1), (1, 1, −1, −1, −1, 1, −1, 1), (−1, −1, −1, −1, 1, 1, 1, 1), (1, −1, −1, 1, −1, 1, 1, −1), (−1, −1, −1, −1, −1, −1, −1,−1), (−1, 1, 1, −1, −1, 1, 1, −1)}, {(−1, −1, 1, 1, −1, 1, −1, 1), (−1, 1, −1, 1, −1, −1, 1, 1), (1, −1, 1, −1, −1, −1, 1, 1), (1, 1, −1,−1, −1, 1, −1, 1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1,−1, 1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1), (−1, −1,−1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1), (−1, −1, −1, −1, 1, 1, 1, 1), (1, −1, −1, 1,−1, 1, 1, −1), (1, −1, −1, 1, 1, −1, −1, 1), (1, 1, 1, 1, 1, 1, 1)}, {(−1, −1, 1, 1, −1, 1, −1, 1), (−1, 1, −1, 1, −1, −1, 1, 1), (1,−1, 1, −1, −1, −1, 1, 1), (1, 1, −1, −1, −1, 1, −1, 1), (−1, 1, 1, −1, 1, −1, −1, 1), (1, 1, 1, 1, −1, −1, −1, −1), (−1, −1, −1, −1, −1, −1,−1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, −1, −1, −1, 1, 1), (1, 1,−1, −1, −1, 1, −1, 1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1,−1, 1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1,−1, 1), (−1, 1, −1, 1, −1, −1, 1, 1), (1, −1, 1, −1, −1, −1, 1, 1), (1, 1, −1, −1, −1, 1, −1, 1), (−1, 1, 1, −1, 1, −1, −1, 1), (1, 1, 1, 1,−1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1,−1, 1, −1, −1, −1, 1, 1), (1, 1, −1, −1, −1, 1, −1, 1), (1, −1, −1, 1, −1, 1, 1, −1), (1, 1, 1, 1, −1, −1, −1, −1), (−1, −1, −1, −1, −1, −1,−1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, −1, −1, −1, 1, 1), (1, 1,−1, −1, −1, 1, −1, 1), (1, −1, −1, 1, −1, 1, 1, −1), (1, 1, 1, 1, −1, −1, −1, −1), (−1, −1, −1, −1, −1, −1, −1, −1), (1, −1, −1, 1, 1, −1,−1, 1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1), (1, −1,−1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (1, −1, 1, −1, −1, −1, 1, 1), (1, 1, −1, −1, −1, 1, −1, 1), (1, −1, −1, 1, −1, 1, 1, −1), (1, 1, 1, 1, −1, −1,−1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1,−1, 1, 1, −1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1,−1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, 1, −1, −1, 1, −1), (1, 1,−1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1,−1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1,−1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1, −1, 1, 1, 1, 1, −1), (−1, 1, 1, 1, 1, −1,−1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1,−1, 1, 1, −1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1,−1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, 1, −1, −1, 1, −1), (1, 1,−1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1,−1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1,−1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, −1, −1, 1, 1, 1, 1, −1), (1, −1, −1, −1,−1, 1, 1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1,−1, 1, 1, −1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1,−1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, 1, −1, −1, 1, −1), (1, 1,−1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1,−1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, 1, −1, 1,−1, 1), (−1, 1, −1, 1, −1, −1, 1, 1), (1, −1, 1, 1, −1, −1, 1, −1), (1, 1, −1, 1, −1, 1, −1, −1), (−1, 1, 1, 1, 1, −1, −1, −1), (1, 1, 1,−1, −1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1,−1, −1, −1, −1), (−1, 1, 1, −1, −1, 1, 1, −1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (1, −1,−1, 1, 1, −1, −1, 1)}, {(−1, −1, 1, 1, −1, 1, −1, 1), (−1, 1, −1, 1, −1, −1, 1, 1), (1, −1, 1, 1, −1, −1, 1, −1), (1, 1, −1, 1, −1, 1, −1,−1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, 1,−1, 1, −1, 1), (−1, 1, −1, 1, −1, −1, 1, 1), (1, −1, 1, 1, −1, −1, 1, −1), (1, 1, −1, 1, −1, 1, −1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, 1, 1,−1, −1), (1, −1, 1, −1, 1, 1, −1, −1), (1, 1, −1, −1, −1, 1, −1, 1), (−1, −1, −1, −1, 1, 1, 1, 1), (−1, 1, 1, −1, 1, −1, −1, 1), (−1, −1,−1, −1, −1, −1, −1, −1), (−1, 1, 1, −1, −1, 1, 1, −1)}, {(−1, −1, 1, 1, −1, 1, −1, 1), (−1, 1, −1, 1, 1, 1, −1, −1), (1, −1, 1, −1, 1, 1,−1, −1), (1, 1, −1, −1, −1, 1, −1, 1), (−1, −1, −1, −1, 1, 1, 1, 1), (−1, 1, 1, −1, 1, −1, −1, 1), (−1, −1, −1, −1, −1, −1, −1, −1), (1,−1, −1, 1, 1, −1, −1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1,−1, 1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1,−1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1,−1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1, −1, 1, 1, 1, 1), (1, −1, −1, 1,−1, 1, 1, −1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1, −1, 1, 1, 1, 1), (1, −1, −1, 1, −1, 1, 1, −1), (−1, −1, −1, −1,−1, −1, −1, −1), (1, −1, −1, 1, 1, −1, −1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, −1, −1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1,−1, 1), (−1, −1, −1, −1, 1, 1, 1, 1), (1, −1, −1, 1, −1, 1, 1, −1), (1, −1, −1, 1, 1, −1, −1, 1), (1, 1, 1, 1, 1, 1, 1, 1)}, {(−1,−1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, 1, 1, −1, 1, −1,−1, 1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1,−1, −1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (−1, 1, 1, −1,−1, 1, 1, −1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1,−1, −1, −1, 1, −1, 1), (−1, 1, 1, −1, 1, −1, −1, 1), (1, 1, 1, 1, −1, −1, −1, −1), (1, −1, −1, 1, 1, −1, −1, 1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (1, −1, −1, 1,−1, 1, 1, −1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (1, −1, −1, 1, −1, 1, 1, −1), (1, 1, 1, 1, −1, −1,−1, −1), (−1, −1, −1, −1, −1, −1, −1, −1), (1, −1, −1, 1, 1, −1, −1, 1)}, {(−1, −1, 1, 1, −1, 1, −1, 1), (−1, 1, −1, 1, 1, 1, −1, −1), (1, −1, 1, −1, 1, 1, −1, −1), (1, 1, −1, −1, −1, 1, −1, 1), (1, −1, −1, 1, −1, 1, 1, −1), (1, 1, 1, 1, −1, −1, −1, −1), (−1, 1, 1, −1,−1, 1, 1, −1), (1, 1, 1, 1, 1, 1, 1, 1)}, {(−1, −1, 1, 1, −1, 1, −1, 1), (−1, 1, −1, 1, 1, 1, −1, −1), (1, −1, 1, −1, 1, 1, −1, −1), (1, 1,−1, −1, −1, 1, −1, 1), (1, −1, −1, 1, −1, 1, 1, −1), (1, 1, 1, 1, −1, −1, −1, −1), (1, −1, −1, 1, 1, −1, −1, 1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, −1, −1,−1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, −1, 1,−1, 1), (1, −1, 1, −1, −1, −1, 1, 1), (1, −1, 1, −1, 1, 1, −1, −1), (1, 1, −1, −1, −1, 1, −1, 1), (−1, −1, −1, −1, 1, 1, 1, 1), (−1, 1, 1,−1, 1, −1, −1, 1), (−1, −1, −1, −1, −1, −1, −1, −1), (1, −1, −1, 1, 1, −1, −1, 1)}, {(−1, −1, 1, 1, −1, 1, −1, 1), (1, −1, 1, −1, −1,−1, 1, 1), (1, −1, 1, −1, 1, 1, −1, −1), (1, 1, −1, −1, −1, 1, −1, 1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1,−1), (1, 1, −1, −1, −1, 1, −1, 1), (−1, −1, −1, −1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1,−1, 1), (−1, −1, −1, −1, 1, 1, 1, 1), (1, −1, −1, 1, −1, 1, 1, −1), (−1, −1, −1, −1, −1, −1, −1, −1), (−1, 1, 1, −1, −1, 1, 1, −1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, −1, −1,−1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, −1, 1,−1, 1), (1, −1, 1, −1, −1, −1, 1, 1), (1, −1, 1, −1, 1, 1, −1, −1), (1, 1, −1, −1, −1, 1, −1, 1), (−1, −1, −1, −1, 1, 1, 1, 1), (1, −1,−1, 1, −1, 1, 1, −1), (−1, 1, 1, −1, −1, 1, 1, −1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, −1, −1, −1, 1, 1, 1, 1), (1, −1, −1, 1, −1, 1, 1, −1), (1, −1, −1, 1, 1,−1, −1, 1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1, −1), (1, 1,−1, −1, −1, 1, −1, 1), (−1, 1, 1, −1, 1, −1, −1, 1), (1, 1, 1, 1, −1, −1, −1, −1), (−1, −1, −1, −1, −1, −1, −1, −1), (−1, 1, 1, −1,−1, 1, 1, −1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1,−1, 1, −1, 1), (1, −1, 1, −1, −1, −1, 1, 1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (1, −1, 1, −1, −1,−1, 1, 1), (1, −1, 1, −1, 1, 1, −1, −1), (1, 1, −1, −1, −1, 1, −1, 1), (−1, 1, 1, −1, 1, −1, −1, 1), (1, 1, 1, 1, −1, −1, −1, −1), (1, −1,−1, 1, 1, −1, −1, 1), (1, 1, 1, 1, 1, 1, 1, 1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (1, −1, −1, 1, −1, 1, 1, −1), (1, 1, 1, 1, −1, −1, −1, −1), (−1, −1, −1, −1, −1, −1, −1, −1), (−1, 1, 1, −1,−1, 1, 1, −1)}, {(−1, −1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1,−1, 1, 1, −1, 1, −1, 1), (1, −1, 1, −1, −1, −1, 1, 1), (1, −1, 1, −1, 1, 1, −1, −1), (1, 1, −1, −1, −1, 1, −1, 1), (1, −1, −1, 1, −1, 1, 1,−1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, −1, 1, −1, 1), (1, −1, 1, −1,−1, −1, 1, 1), (1, −1, 1, −1, 1, 1, −1, −1), (1, 1, −1, −1, −1, 1, −1, 1), (1, −1, −1, 1, −1, 1, 1, −1), (1, 1, 1, 1, −1, −1, −1, −1), (1,−1, −1, 1, 1, −1, −1, 1), (1, 1, 1, 1, 1, 1, 1, 1)}, {(−1, −1, 1, 1, −1, 1, −1, 1), (1, −1, 1, −1, 1, 1, −1, −1), (1, −1, 1, 1, −1, −1, 1,−1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (−1, 1, 1,−1, −1, 1, 1, −1)}, {(−1, −1, 1, 1, −1, 1, −1, 1), (1, −1, 1, −1, 1, 1, −1, −1), (1, −1, 1, 1, −1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1,−1, 1, 1, −1, 1, −1, 1), (1, −1, 1, −1, 1, 1, −1, −1), (1, −1, 1, 1, −1, −1, 1, −1), (1, 1, −1, 1, −1, 1, −1, −1), (−1, −1, −1, 1, 1, 1, 1,−1), (−1, 1, 1, 1, 1, −1, −1, −1), (−1, 1, 1, −1, −1, 1, 1, −1), (1, 1, 1, 1, 1, 1, 1, 1)}, {(−1, −1, 1, 1, −1, 1, −1, 1), (1, −1, 1,−1, 1, 1, −1, −1), (1, −1, 1, 1, −1, −1, 1, −1), (1, 1, −1, 1, −1, 1, −1, −1), (−1, −1, −1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, −1, 1, 1, −1, 1, −1, 1), (1, −1, 1, −1, 1, 1, −1, −1), (1, −1, 1, 1, −1,−1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1, −1, 1, 1, −1)}, {(−1, −1, 1, 1, −1, 1, −1, 1), (1, −1, 1, −1, 1, 1, −1, −1), (1, −1, 1, 1, −1, −1, 1, −1), (1, 1, −1, 1,−1, 1, −1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, −1, 1, 1, −1, 1, −1, 1), (1, −1, 1, −1, 1, 1, −1, −1), (1, −1, 1, 1, −1, −1, 1, −1), (1, 1, −1, 1, −1, 1, −1, −1), (−1, −1,−1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, −1, 1, 1, −1, 1, −1, 1), (1, −1, 1, −1, 1, 1, −1, −1), (1, −1, 1, 1, −1, −1, 1, −1), (1, 1, −1, 1, −1, 1, −1, −1), (−1, −1, −1, 1, 1, 1, 1, −1), (1, −1, −1, −1,−1, 1, 1, 1), (1, −1, −1, 1, 1, −1, −1, 1), (1, 1, 1, 1, 1, 1, 1, 1)}, {(−1, −1, 1, 1, −1, 1, −1, 1), (1, −1, 1, −1, 1, 1, −1, −1), (1,−1, 1, 1, −1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1,−1, −1), (−1, 1, 1, −1, −1, 1, 1, −1)}, {(−1, −1, 1, 1, −1, 1, −1, 1), (1, −1, 1, −1, 1, 1, −1, −1), (1, −1, 1, 1, −1, −1, 1, −1), (1, 1,−1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1,−1, 1)}, {(−1, −1, 1, 1, −1, 1, −1, 1), (1, −1, 1, −1, 1, 1, −1, −1), (1, −1, 1, 1, −1, −1, 1, −1), (1, 1, −1, 1, −1, 1, −1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, −1, 1, 1, −1, 1,−1, 1), (1, −1, 1, −1, 1, 1, −1, −1), (1, −1, 1, 1, −1, −1, 1, −1), (1, 1, −1, 1, −1, 1, −1, −1), (−1, 1, 1, 1, 1, −1, −1, −1), (1, 1,−1, −1, −1, −1, 1), (1, −1, −1, 1, 1, −1, −1, 1), (1, 1, 1, 1, 1, 1, 1, 1)}, {(−1, −1, 1, 1, −1, 1, −1, 1), (1, −1, 1, −1, 1, 1, −1, −1), (1, −1, 1, 1, −1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1,−1, −1, −1, −1), (−1, 1, 1, −1, −1, 1, 1, −1)}, {(−1, −1, 1, 1, −1, 1, −1, 1), (1, −1, 1, −1, 1, 1, −1, −1), (1, −1, 1, 1, −1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (1, −1,−1, 1, 1, −1, −1, 1)}, {(−1, −1, 1, 1, −1, 1, −1, 1), (1, −1, 1, −1, 1, 1, −1, −1), (1, −1, 1, 1, −1, −1, 1, −1), (1, 1, −1, 1, −1, 1, −1,−1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, −1, 1, 1,−1, 1, −1, 1), (1, −1, 1, −1, 1, 1, −1, −1), (1, −1, 1, 1, −1, −1, 1, −1), (1, 1, −1, 1, −1, 1, −1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, −1,−1, 1, 1), (−1, 1, −1, 1, 1, 1, −1, −1), (1, 1, −1, −1, 1, −1, 1, −1), (−1, −1, −1, −1, 1, 1, 1, 1), (−1, 1, 1, −1, 1, −1, −1, 1), (−1, −1,−1, −1, −1, −1, −1, −1), (−1, 1, 1, −1, −1, 1, 1, −1)}, {(−1, −1, 1, 1, 1, −1, 1, −1), (−1, 1, −1, 1, −1, −1, 1, 1), (−1, 1, −1, 1, 1, 1,−1, −1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (1,−1, −1, 1, 1, −1, −1, 1)}, {(−1, −1, 1, 1, 1, −1, 1, −1), (−1, 1, −1, 1, −1, −1, 1, 1), (−1, 1, −1, 1, 1, 1, −1, −1), (1, 1, −1, −1, 1,−1, 1, −1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1,−1, 1, 1, 1, −1, 1, −1), (−1, 1, −1, 1, −1, −1, 1, 1), (−1, 1, −1, 1, 1, 1, −1, −1), (1, 1, −1, −1, 1, −1, 1, −1), (−1, −1, −1,−1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, −1, −1, 1, 1), (−1, 1, −1, 1, 1, 1, −1, −1), (1, 1, −1, −1, 1, −1, 1, −1), (−1, −1, −1, −1, 1, 1, 1, 1), (1, −1, −1, 1,−1, 1, 1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, −1, −1, 1, 1), (−1, 1, −1, 1, 1, 1, −1, −1), (1, 1, −1, −1, 1, −1, 1, −1), (−1, −1, −1, −1, 1, 1, 1, 1), (1, −1, −1, 1, −1, 1, 1, −1), (−1, −1, −1, −1,−1, −1, −1, −1), (1, −1, −1, 1, 1, −1, −1, 1)}, {(−1, −1, 1, 1, 1, −1, 1, −1), (−1, 1, −1, 1, −1, −1, 1, 1), (−1, 1, −1, 1, 1, 1, −1, −1), (1, 1, −1, −1, 1,−1, 1, −1), (−1, 1, 1, −1, 1, −1, −1, 1), (1, 1, 1, 1, −1, −1, −1, −1), (−1, 1, 1, −1,−1, 1, 1, −1), (1, 1, 1, 1, 1, 1, 1, 1)}, {(−1, −1, 1, 1, 1, −1, 1, −1), (−1, 1, −1, 1, −1, −1, 1, 1), (−1, 1, −1, 1, 1, 1, −1, −1), (1, 1,−1, −1, 1, −1, 1, −1), (−1, 1, 1, −1, 1, −1,−1, 1), (1, 1, 1, 1, −1, −1, −1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, −1, −1, 1, 1), (−1, 1, −1, 1, 1, 1, −1, −1), (1, 1, −1, −1, 1, −1, 1, −1), (1, −1, −1, 1,−1, 1, 1, −1), (1, 1, 1, 1, −1, −1, −1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, −1, −1, 1, 1), (−1, 1, −1, 1, 1, 1, −1, −1), (1, 1, −1, −1, 1, −1, 1, −1), (1, −1, −1, 1, −1, 1, 1, −1), (1, 1, 1, 1, −1, −1,−1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, −1, −1, 1, 1), (−1, 1, −1, 1, 1, 1, −1, −1), (1, 1, −1, −1, 1, −1, 1, −1), (1, −1, −1, 1, −1, 1, 1, −1), (1, 1, 1, 1, −1, −1, −1, −1), (−1, 1, 1, −1,−1, 1, 1, −1), (1, 1, 1, 1, 1, 1, 1, 1)}, {(−1, −1, 1, 1, 1, −1, 1, −1), (−1, 1, −1, 1, −1, −1, 1, 1), (−1, 1, −1, 1, 1, 1, −1, −1), (1, 1,−1, −1, 1, −1, 1, −1), (1, −1, −1, 1, −1, 1, 1, −1), (1, 1, 1, 1, −1, −1, −1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (−1, −1, −1,−1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, 1, −1, 1,−1), (−1, 1, −1, 1, −1, −1, 1, 1), (1, −1, 1, −1, −1, −1, 1, 1), (1, 1, −1, −1, 1, −1, 1, −1), (−1, −1, −1, −1, 1, 1, 1, 1), (−1, 1, 1,−1, 1, −1, −1, 1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, −1,−1, 1, 1), (1, −1, 1, −1, −1, −1, 1, 1), (1, 1, −1, −1, 1, −1, 1, −1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1,−1, 1, −1), (−1, −1, −1, −1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (−1, −1, −1,−1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1, −1, 1, 1, 1, −1, 1,−1), (−1, 1, −1, 1, −1, −1, 1, 1), (1, −1, 1, −1, −1, −1, 1, 1), (1, 1, −1, −1, 1, −1, 1, −1), (−1, −1, −1, −1, 1, 1, 1, 1), (1, −1, −1, 1,−1, 1, 1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, −1, −1, 1, 1), (1,−1, 1, −1, −1, −1, 1, 1), (1, 1, −1, −1, 1, −1, 1, −1), (−1, −1, −1, −1, 1, 1, 1, 1), (1, −1, −1, 1, −1, 1, 1, −1), (1, −1, −1, 1, 1, −1,−1, 1), (1, 1, 1, 1, 1, 1, 1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1,−1, 1, −1, 1, −1), (−1, 1, 1, −1, 1, −1, −1, 1), (1, 1, 1, 1, −1, −1, −1, −1), (−1, −1, −1, −1, −1, −1, −1, −1), (−1, 1, 1, −1, −1, 1, 1,−1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (−1, 1, 1,−1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, 1, −1, 1,−1), (−1, 1, −1, 1, −1, −1, 1, 1), (1, −1, 1, −1, −1, −1, 1, 1), (1, 1, −1, −1, 1, −1, 1, −1), (−1, 1, 1, −1, 1, −1, −1, 1), (1, 1, 1, 1,−1, −1, −1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, −1, −1, 1, 1), (1,−1, 1, −1, −1, −1, 1, 1), (1, 1, −1, −1, 1, −1, 1, −1), (−1, 1, 1, −1, 1, −1, −1, 1), (1, 1, 1, 1, −1, −1, −1, −1), (1, −1, −1, 1, 1, −1,−1, 1), (1, 1, 1, 1, 1, 1, 1, 1)}, {(−1, −1, 1, 1, 1, −1, 1, −1), (−1, 1, −1, 1, −1, −1, 1, 1), (1, −1, 1, −1, −1, −1, 1, 1), (1, 1, −1,−1, 1, −1, 1, −1), (1, −1, −1, 1, −1, 1, 1, −1), (1, 1, 1, 1, −1, −1, −1, −1), (−1, −1, −1, −1, −1, −1, −1, −1), (−1, 1, 1, −1, −1, 1, 1,−1)}, {(−1, −1, 1, 1, 1, −1, 1, −1), (−1, 1, −1, 1, −1, −1, 1, 1), (1, −1, 1, −1, −1, −1, 1, 1), (1, 1, −1, −1, 1, −1, 1, −1), (1, −1,−1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(−1, −1, 1, 1, 1,−1, 1, −1), (−1, 1, −1, 1, −1, −1, 1, 1), (1, −1, 1, −1, −1, −1, 1, 1), (1, 1, −1, −1, 1, −1, 1, −1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, −1,−1, 1, 1), (1, −1, 1, −1, −1, −1, 1, 1), (1, 1, −1, −1, 1, −1, 1, −1), (1, −1, −1, 1, −1, 1, 1, −1), (1, 1, 1, 1, −1, −1, −1, −1), (1, −1,−1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1,−1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1,−1, 1), (−1, 1, −1, −1, 1, −1, 1, 1), (−1, 1, 1, −1, −1, 1, 1, −1), (1, 1, 1, 1, 1, 1, 1, 1)}, {(−1, −1, 1, 1, 1, −1, 1, −1), (−1, 1,−1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (−1, 1, −1, −1, 1, −1, 1, 1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1,−1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1,−1, −1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1,−1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, −1, 1, −1, 1, 1, −1, 1), (1, −1, 1, 1, −1, 1,−1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1,−1, −1, −1), (−1, 1, 1, −1, −1, 1, 1, −1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (1, −1,−1, 1, 1, −1, −1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1,−1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1,−1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (−1, 1, −1, −1, 1,−1, 1, 1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (−1, 1,−1, 1, 1, 1, −1, −1), (−1, 1, 1, 1, −1, −1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1,−1, −1, −1), (1, −1, −1, 1, 1, −1, −1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (−1, 1, 1, 1, −1, −1, −1, 1), (1, 1, 1, −1, 1, −1,−1, −1), (1, −1, 1, 1, −1, 1, −1, −1), (1, 1, −1, 1, −1, −1, 1, −1), (1, −1, −1, 1, 1, −1, −1, 1), (1, 1, 1, 1, 1, 1, 1, 1)}, {(−1,−1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1,−1, 1), (−1, 1, −1, −1, 1, −1, 1, 1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (−1, 1, −1, −1, 1,−1, 1, 1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (−1, 1, −1, −1, 1, −1, 1, 1), (−1, 1, 1, −1,−1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (−1, 1, −1, −1, 1, −1, 1, 1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1,−1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1,−1, 1), (1, −1, 1, 1, −1, 1, −1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, −1, 1, −1, 1, 1, −1, 1), (1, −1, 1, 1, −1, 1,−1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1, −1,−1, 1, 1, 1, −1), (1, 1, 1, −1, 1, −1, −1, −1), (−1, −1, 1, −1, 1, 1, −1, 1), (1, −1, 1, 1, −1, 1, −1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1,−1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, 1, −1, −1, 1,−1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (−1, 1, −1, −1, 1, −1, 1, 1), (1, 1, −1, 1, −1,−1, 1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1,−1, −1, 1, 1, 1, −1), (1, 1, 1, −1, 1, −1, −1, −1), (−1, 1, −1, −1, 1, −1, 1, 1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1,−1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (1, −1, 1, 1, −1, 1,−1, −1), (1, 1, −1, 1, −1, −1, 1, −1), (−1, −1, −1, −1, −1, −1, −1, −1), (1, −1, −1, 1, 1, −1, −1, 1)}, {(−1, −1, 1, 1, 1, −1, 1, −1), (−1, 1, −1, 1, 1, 1, −1, −1), (1, −1, −1, −1, 1, 1, 1, −1), (1, 1, 1, −1, 1, −1, −1, −1), (1, −1, 1, 1, −1, 1, −1, −1), (1, 1, −1, 1, −1,−1, 1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1,−1, −1, 1, 1, 1, −1), (1, 1, 1, −1, 1, −1, −1, −1), (1, −1, 1, 1, −1, 1, −1, −1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1,−1, 1, −1), (−1, −1, −1, −1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, −1, −1,−1, 1, 1, 1, 1), (−1, 1, 1, −1, 1, −1, −1, 1), (−1, −1, −1, −1, −1, −1, −1, −1), (1, −1, −1, 1, 1, −1, −1, 1)}, {(−1, −1, 1, 1, 1, −1, 1,−1), (−1, 1, −1, 1, 1, 1, −1, −1), (1, −1, 1, −1, 1, 1, −1, −1), (1, 1, −1, −1, 1, −1, 1, −1), (−1, −1, −1, −1, 1, 1, 1, 1), (−1, 1, 1,−1, 1, −1, −1, 1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, −1, −1, −1, 1, 1, 1, 1), (−1, 1, 1, −1, 1, −1, −1, 1), (1, −1, −1, 1, 1,−1, −1, 1), (1, 1, 1, 1, 1, 1, 1, 1)}, {(−1, −1, 1, 1, 1, −1, 1, −1), (−1, 1, −1, 1, 1, 1, −1, −1), (1, −1, 1, −1, 1, 1, −1, −1), (1, 1,−1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (−1, 1, 1, −1,−1, 1, 1, −1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(−1,−1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, −1, −1,−1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, −1, −1, −1, 1, 1, 1, 1), (1, −1, −1, 1,−1, 1, 1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1,−1, 1, −1, 1, 1, −1, −1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1,−1, −1), (−1, 1, 1, −1, −1, 1, 1, −1)}, {(−1, −1, 1, 1, 1, −1, 1, −1), (−1, 1, −1, 1, 1, 1, −1, −1), (1, −1, 1, −1, 1, 1, −1, −1), (1, 1,−1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1,−1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, 1, −1, 1,−1), (−1, 1, −1, 1, 1, 1, −1, −1), (1, −1, 1, −1, 1, 1, −1, −1), (1, 1, −1, −1, 1, −1, 1, −1), (−1, 1, 1, −1, 1, −1, −1, 1), (1, 1, 1, 1,−1, −1, −1, −1), (1, −1, −1, 1, 1, −1, −1, 1), (1, 1, 1, 1, 1, 1, 1, 1)}, {(−1, −1, 1, 1, 1, −1, 1, −1), (−1, 1, −1, 1, 1, 1, −1, −1), (1,−1, 1, −1, 1, 1, −1, −1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1,−1, −1), (−1, 1, 1, −1, −1, 1, 1, −1)}, {(−1, −1, 1, 1, 1, −1, 1, −1), (−1, 1, −1, 1, 1, 1, −1, −1), (1, −1, 1, −1, 1, 1, −1, −1), (1, 1,−1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (1, −1, −1, 1, 1, −1,−1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (1, −1,−1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, 1, −1, 1, −1), (−1, 1, −1, 1, 1, 1, −1, −1), (1, −1, 1, −1, 1, 1, −1, −1), (1, 1, −1, −1, 1, −1, 1, −1), (1, −1, −1, 1, −1, 1, 1, −1), (1, 1, 1, 1, −1, −1,−1, −1), (1, −1, −1, 1, 1, −1, −1, 1), (1, 1, 1, 1, 1, 1, 1, 1)}, {(−1, −1, 1, 1, 1, −1, 1, −1), (−1, 1, 1, 1, −1, −1, −1, 1), (1, −1, 1,−1, −1, −1, 1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1,−1), (−1, 1, 1, −1, −1, 1, 1, −1)}, {(−1, −1, 1, 1, 1, −1, 1, −1), (−1, 1, 1, 1, −1, −1, −1, 1), (1, −1, 1, −1, −1, −1, 1, 1), (1, 1, 1,−1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1,−1, 1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (−1,−1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (−1, −1, 1, −1, 1, 1, −1, 1), (−1, 1, −1, −1, 1,−1, 1, 1), (1, −1, −1, 1, 1, −1, −1, 1), (1, 1, 1, 1, 1, 1, 1, 1)}, {(−1, −1, 1, 1, 1, −1, 1, −1), (−1, 1, 1, 1, −1, −1, −1, 1), (1, −1, 1,−1, −1, −1, 1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1,−1), (−1, 1, 1, −1, −1, 1, 1, −1)}, {(−1, −1, 1, 1, 1, −1, 1, −1), (−1, 1, 1, 1, −1, −1, −1, 1), (1, −1, 1, −1, −1, −1, 1, 1), (1, 1, 1,−1, 1, −1, −1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1,−1, 1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (−1,−1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (−1, −1, 1, −1, 1, 1, −1, 1), (1, −1, 1, 1, −1, 1,−1, −1), (1, −1, −1, 1, 1, −1, −1, 1), (1, 1, 1, 1, 1, 1, 1, 1)}, {(−1, −1, 1, 1, 1, −1, 1, −1), (−1, 1, 1, 1, −1, −1, −1, 1), (1, −1, 1,−1, −1, −1, 1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1,−1), (−1, 1, 1, −1, −1, 1, 1, −1)}, {(−1, −1, 1, 1, 1, −1, 1, −1), (−1, 1, 1, 1, −1, −1, −1, 1), (1, −1, 1, −1, −1, −1, 1, 1), (1, 1, 1,−1, 1, −1, −1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (−1, 1,−1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (−1, 1, −1, −1, 1, −1, 1, 1), (1, 1, −1, 1, −1,−1, 1, −1), (1, −1, −1, 1, 1, −1, −1, 1), (1, 1, 1, 1, 1, 1, 1, 1)}, {(−1, −1, 1, 1, 1, −1, 1, −1), (−1, 1, 1, 1, −1, −1, −1, 1), (1,−1, 1, −1, −1, −1, 1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1,−1, −1), (−1, 1, 1, −1, −1, 1, 1, −1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (1, −1,−1, 1, 1, −1, −1, 1)}, {(−1, −1, 1, 1, 1, −1, 1, −1), (−1, 1, 1, 1, −1, −1, −1, 1), (1, −1, 1, −1, −1, −1, 1, 1), (1, 1, 1, −1, 1, −1, −1,−1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1,−1, 1, 1, 1, −1, 1, −1), (−1, 1, 1, 1, −1, −1, −1, 1), (1, −1, 1, −1, −1, −1, 1, 1), (1, 1, 1, −1, 1, −1, −1, −1), (1, −1, 1, 1, −1, 1, −1,−1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (1, −1, −1,−1, 1, 1, 1, −1), (1, −1, 1, −1, −1, −1, 1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1, −1, 1, 1, −1)}, {(−1, −1, 1, 1, 1, −1, 1, −1), (1, −1, −1, −1, 1, 1, 1, −1), (1, −1, 1, −1,−1, −1, 1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, −1, 1, 1, 1, −1, 1, −1), (1, −1, −1, −1, 1, 1, 1, −1), (1, −1, 1, −1, −1, −1, 1, 1), (1, 1, 1, −1, 1,−1, −1, −1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1,−1, 1, 1, 1, −1, 1, −1), (1, −1, −1, −1, 1, 1, 1, −1), (1, −1, 1, −1, −1, −1, 1, 1), (1, 1, 1, −1, 1, −1, −1, −1), (−1, −1, 1, −1, 1, 1,−1, 1), (−1, 1, −1, −1, 1, −1, 1, 1), (1, −1, −1, 1, 1, −1, −1, 1), (1, 1, 1, 1, 1, 1, 1, 1)}, {(−1, −1, 1, 1, 1, −1, 1, −1), (1, −1, −1,−1, 1, 1, 1, −1), (1, −1, 1, −1, −1, −1, 1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1, −1, 1, 1, −1)}, {(−1, −1, 1, 1, 1, −1, 1, −1), (1, −1, −1, −1, 1, 1, 1, −1), (1, −1, 1, −1,−1, −1, 1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, −1, 1, 1, 1, −1, 1, −1), (1, −1, −1, −1, 1, 1, 1, −1), (1, −1, 1, −1, −1, −1, 1, 1), (1, 1, 1, −1, 1,−1, −1, −1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1,−1, 1, 1, 1, −1, 1, −1), (1, −1, −1, −1, 1, 1, 1, −1), (1, −1, 1, −1, −1, −1, 1, 1), (1, 1, 1, −1, 1, −1, −1, −1), (−1, −1, 1, −1, 1, 1,−1, 1), (1, −1, 1, 1, −1, 1, −1, −1), (1, −1, −1, 1, 1, −1, −1, 1), (1, 1, 1, 1, 1, 1, 1, 1)}, {(−1, −1, 1, 1, 1, −1, 1, −1), (1, −1, −1,−1, 1, 1, 1, −1), (1, −1, 1, −1, −1, −1, 1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1, −1, 1, 1, −1)}, {(−1, −1, 1, 1, 1, −1, 1, −1), (1, −1, −1, −1, 1, 1, 1, −1), (1, −1, 1, −1,−1, −1, 1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, −1, 1, 1, 1, −1, 1, −1), (1, −1, −1, −1, 1, 1, 1, −1), (1, −1, 1, −1, −1, −1, 1, 1), (1, 1, 1, −1, 1,−1, −1, −1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1,−1, 1, 1, 1, −1, 1, −1), (1, −1, −1, −1, 1, 1, 1, −1), (1, −1, 1, −1, −1, −1, 1, 1), (1, 1, 1, −1, 1, −1, −1, −1), (−1, 1, −1, −1, 1,−1, 1, 1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (1, −1,−1, −1, 1, 1, 1, −1), (1, −1, 1, −1, −1, −1, 1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1, −1, 1, 1, −1)}, {(−1, −1, 1, 1, 1, −1, 1, −1), (1, −1, −1, −1, 1, 1, 1, −1), (1, −1, 1,−1, −1, −1, 1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1,−1), (1, −1, −1, 1, 1, −1, −1, 1)}, {(−1, −1, 1, 1, 1, −1, 1, −1), (1, −1, −1, −1, 1, 1, 1, −1), (1, −1, 1, −1, −1, −1, 1, 1), (1, 1, 1,−1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, −1, 1, 1, 1, −1, 1, −1), (1, −1, −1, −1, 1, 1, 1, −1), (1, −1, 1, −1, −1, −1, 1, 1), (1, 1, 1, −1, 1, −1, −1, −1), (1, −1, 1, 1, −1, 1,−1, −1), (1, 1, −1, 1, −1, −1, 1, −1), (1, −1, −1, 1, 1, −1, −1, 1), (1, 1, 1, 1, 1, 1, 1, 1)}, {(−1, −1, 1, 1, 1, −1, 1, −1), (1, −1, 1,−1, −1, −1, 1, 1), (1, −1, 1, −1, 1, 1, −1, −1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, −1, 1, 1, 1, −1, 1, −1), (1, −1, 1, −1, −1, −1, 1, 1), (1, −1, 1,−1, 1, 1, −1, −1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1,−1), (1, −1, −1, 1, 1, −1, −1, 1)}, {(−1, −1, 1, 1, 1, −1, 1, −1), (1, −1, 1, −1, −1, −1, 1, 1), (1, −1, 1, −1, 1, 1, −1, −1), (1, 1, −1,−1, 1, −1, 1, −1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (−1, −1, −1,−1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, −1, 1, 1, 1, −1, 1, −1), (1,−1, 1, −1, −1, −1, 1, 1), (1, −1, 1, −1, 1, 1, −1, −1), (1, 1, −1, −1, 1, −1, 1, −1), (1, −1, −1, 1, −1, 1, 1, −1), (1, −1, −1, 1, 1, −1, −1, 1), (1, 1, 1, 1, 1, 1, 1, 1)}, {(−1, −1, 1, 1, 1, −1, 1, −1), (1,−1, 1, −1, −1, −1, 1, 1), (1, −1, 1, −1, 1, 1, −1, −1), (1, 1, −1, −1, 1, −1, 1, −1), (−1, 1, 1, −1, 1, −1, −1, 1), (1, 1, 1, 1, −1, −1, −1,−1), (−1, −1, −1, −1, −1, −1, −1, −1), (−1, 1, 1, −1, −1, 1, 1, −1)}, {(−1, −1, 1, 1, 1, −1, 1, −1), (1, −1, 1, −1, −1, −1, 1, 1), (1,−1, 1, −1, 1, 1, −1, −1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1,−1, −1), (1, −1, −1, 1, 1, −1, −1, 1)}, {(−1, −1, 1, 1, 1, −1, 1, −1), (1, −1, 1, −1, −1, −1, 1, 1), (1, −1, 1, −1, 1, 1, −1, −1), (1, 1,−1, −1, 1, −1, 1, −1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (−1, 1, 1, −1, 1,−1, −1, 1), (1, 1, 1, 1, −1, −1, −1, −1), (1, −1, −1, 1, 1, −1, −1, 1), (1, 1, 1, 1, 1, 1, 1, 1)}, {(−1, −1, 1, 1, 1, −1, 1, −1), (1,−1, 1, −1, −1, −1, 1, 1), (1, −1, 1, −1, 1, 1, −1, −1), (1, 1, −1, −1, 1, −1, 1, −1), (1, −1, −1, 1, −1, 1, 1, −1), (1, 1, 1, 1, −1, −1, −1,−1), (−1, −1, −1, −1, −1, −1, −1, −1), (−1, 1, 1, −1, −1, 1, 1, −1)}, {(−1, −1, 1, 1, 1, −1, 1, −1), (1, −1, 1, −1, −1, −1, 1, 1), (1,−1, 1, −1, 1, 1, −1, −1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1,−1, −1), (1, −1, −1, 1, 1, −1, −1, 1)}, {(−1, −1, 1, 1, 1, −1, 1, −1), (1, −1, 1, −1, −1, −1, 1, 1), (1, −1, 1, −1, 1, 1, −1, −1), (1, 1,−1, −1, 1, −1, 1, −1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, −1, 1, 1, 1, −1, 1, −1), (1, −1, 1, −1, −1, −1, 1, 1), (1, −1, 1, −1, 1, 1, −1, −1), (1, 1, −1, −1, 1, −1, 1, −1), (1, −1, −1, 1,−1, 1, 1, −1), (1, 1, 1, 1, −1, −1, −1, −1), (1, −1, −1, 1, 1, −1, −1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, −1, 1, 1, 1, 1, −1), (−1, −1, 1, −1, 1, 1,−1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, −1, 1, 1, 1, 1, −1), (−1, −1, 1, −1, 1, 1, −1, 1), (−1, −1, −1, −1, −1,−1, −1, −1), (1, 1, −1, −1, 1, 1, −1, −1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1, −1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, −1, 1, −1, 1, −1), (−1, 1, 1, 1, −1, 1,−1, −1), (−1, −1, −1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(−1, 1, −1,−1, −1, 1, 1, 1), (−1, 1, −1, 1, 1, −1, −1, 1), (−1, 1, 1, −1, 1, −1, 1, –1), (–1, 1, 1, 1, –1, 1, –1, –1), (–1, –1, –1, 1, 1, 1, 1, –1), (1, 1, –1, 1, –1, –1, 1, –1), (–1, –1, –1, –1, –1, –1, –1, –1), (–1, –1, 1, 1, –1, –1, 1, 1)}, {(–1, 1, –1, –1, –1, 1, 1, 1), (–1, 1,–1, 1, 1, –1, –1, 1), (–1, 1, 1, –1, 1, –1, 1, –1), (–1, 1, 1, 1, –1, 1, –1, –1), (–1, –1, –1, 1, 1, 1, 1, –1), (1, 1, –1, 1, –1, –1, 1, –1), (–1, –1, –1, –1, –1, –1, –1, –1), (1, 1, –1, –1, 1, 1, –1, –1)}, {(–1, 1, –1, –1, –1, 1, 1, 1), (–1, 1, –1, 1, 1, –1, –1, 1), (–1, 1, 1,–1, 1, –1, 1, –1), (–1, 1, 1, 1, –1, 1, –1, –1), (–1, –1, –1, 1, 1, 1, 1, –1), (1, 1, –1, 1, –1, –1, 1, –1), (–1, –1, 1, 1, –1, –1, 1, 1), (1, 1, 1, 1, 1, 1, 1, 1)}, {(–1, 1, –1, –1, –1, 1, 1, 1), (–1, 1, –1, 1, 1, –1, –1, 1), (–1, 1, 1, –1, 1, –1, 1, –1), (–1, 1, 1, 1, –1, 1,–1, –1), (–1, –1, –1, 1, 1, 1, 1, –1), (1, 1, –1, 1, –1, –1, 1, –1), (1, 1, –1, –1, 1, 1, –1, –1), (1, 1, 1, 1, 1, 1, 1, 1)}, {(–1, 1, –1,–1, –1, 1, 1, 1), (–1, 1, –1, 1, 1, –1, –1, 1), (–1, 1, 1, –1, 1, –1, 1, –1), (–1, 1, 1, 1, –1, 1, –1, –1), (–1, –1, 1, –1, 1, 1, –1, 1), (1, 1, 1, –1, –1, –1, –1, 1), (–1, –1, –1, –1, –1, –1, –1, –1), (–1, –1, 1, 1, –1, –1, 1, 1)}, {(–1, 1, –1, –1, –1, 1, 1, 1), (–1, 1,–1, 1, 1, –1, –1, 1), (–1, 1, 1, –1, 1, –1, 1, –1), (–1, 1, 1, 1, –1, 1, –1, –1), (–1, –1, 1, –1, 1, 1, –1, 1), (1, 1, 1, –1, –1, –1, –1, 1), (–1, –1, –1, –1, –1, –1, –1, –1), (1, 1, –1, –1, 1, 1, –1, –1)}, {(–1, 1, –1, –1, –1, 1, 1, 1), (–1, 1, –1, 1, 1, –1, –1, 1), (–1, 1, 1,–1, 1, –1, 1, –1), (–1, 1, 1, 1, –1, 1, –1, –1), (–1, –1, 1, –1, 1, 1, –1, 1), (1, 1, 1, –1, –1, –1, –1, 1), (–1, –1, 1, 1, –1, –1, 1, 1), (1, 1, 1, 1, 1, 1, 1, 1)}, {(–1, 1, –1, –1, –1, 1, 1, 1), (–1, 1, –1, 1, 1, –1, –1, 1), (–1, 1, 1, –1, 1, –1, 1, –1), (–1, 1, 1, 1, –1, 1,–1, –1), (–1, –1, 1, –1, 1, 1, –1, 1), (1, 1, 1, –1, –1, –1, –1, 1), (1, 1, –1, –1, 1, 1, –1, –1), (1, 1, 1, 1, 1, 1, 1, 1)}, {(–1, 1, –1,–1, –1, 1, 1, 1), (–1, 1, –1, 1, 1, –1, –1, 1), (–1, 1, 1, –1, 1, –1, 1, –1), (–1, 1, 1, 1, –1, 1, –1, –1), (1, 1, –1, 1, –1, –1, 1, –1), (1, 1, 1, –1, –1, –1, –1, 1), (–1, –1, –1, –1, –1, –1, –1, –1), (–1, –1, 1, 1, –1, –1, 1, 1)}, {(–1, 1, –1, –1, –1, 1, 1, 1), (–1, 1,–1, 1, 1, –1, –1, 1), (–1, 1, 1, –1, 1, –1, 1, –1), (–1, 1, 1, 1, –1, 1, –1, –1), (1, 1, –1, 1, –1, –1, 1, –1), (1, 1, 1, –1, –1, –1, –1, 1), (–1, –1, –1, –1, –1, –1, –1, –1), (1, 1, –1, –1, 1, 1, –1, –1)}, {(–1, 1, –1, –1, –1, 1, 1, 1), (–1, 1, –1, 1, 1, –1, –1, 1), (–1, 1, 1,–1, 1, –1, 1, –1), (–1, 1, 1, 1, –1, 1, –1, –1), (1, 1, –1, 1, –1, –1, 1, –1), (1, 1, 1, –1, –1, –1, –1, 1), (–1, –1, 1, 1, –1, –1, 1, 1), (1, 1, 1, 1, 1, 1, 1, 1)}, {(–1, 1, –1, –1, –1, 1, 1, 1), (–1, 1, –1, 1, 1, –1, –1, 1), (–1, 1, 1, –1, 1, –1, 1, –1), (–1, 1, 1, 1, –1, 1,–1, –1), (1, 1, –1, 1, –1, –1, 1, –1), (1, 1, 1, –1, –1, –1, –1, 1), (1, 1, –1, –1, 1, 1, –1, –1), (1, 1, 1, 1, 1, 1, 1, 1)}, {(–1, 1, –1,–1, –1, 1, 1, 1), (–1, 1, –1, 1, 1, –1, –1, 1), (–1, 1, 1, –1, 1, –1, 1, –1), (1, –1, –1, –1, 1, –1, 1, 1), (–1, –1, –1, 1, 1, 1, 1, –1), (–1, –1, 1, –1, 1, 1, –1, 1), (–1, –1, –1, –1, –1, –1, –1, –1), (–1, –1, 1, 1, –1, –1, 1, 1)}, {(–1, 1, –1, –1, –1, 1, 1, 1), (–1, 1,–1, 1, 1, –1, –1, 1), (–1, 1, 1, –1, 1, –1, 1, –1), (1, –1, –1, –1, 1, –1, 1, 1), (–1, –1, –1, 1, 1, 1, 1, –1), (–1, –1, 1, –1, 1, 1, –1, 1), (–1, –1, –1, –1, –1, –1, –1, –1), (1, 1, –1, –1, 1, 1, –1, –1)}, {(–1, 1, –1, –1, –1, 1, 1, 1), (–1, 1, –1, 1, 1, –1, –1, 1), (–1, 1, 1,–1, 1, –1, 1, –1), (1, –1, –1, –1, 1, –1, 1, 1), (–1, –1, –1, 1, 1, 1, 1, –1), (–1, –1, 1, –1, 1, 1, –1, 1), (–1, –1, 1, 1, –1, –1, 1, 1), (1, 1, 1, 1, 1, 1, 1, 1)}, {(–1, 1, –1, –1, –1, 1, 1, 1), (–1, 1, –1, 1, 1, –1, –1, 1), (–1, 1, 1, –1, 1, –1, 1, –1), (1, –1, –1, –1, 1,–1, 1, 1), (–1, –1, –1, 1, 1, 1, 1, –1), (–1, –1, 1, –1, 1, 1, –1, 1), (1, 1, –1, –1, 1, 1, –1, –1), (1, 1, 1, 1, 1, 1, 1, 1)}, {(–1, 1,–1, –1, –1, 1, 1, 1), (–1, 1, –1, 1, 1, –1, –1, 1), (–1, 1, 1, –1, 1, –1, 1, –1), (1, –1, –1, –1, 1, –1, 1, 1), (–1, –1, –1, 1, 1, 1, 1, –1), (1, 1, –1, 1, –1, –1, 1, –1), (–1, –1, –1, –1, –1, –1, –1, –1), (–1, –1, 1, 1, –1, –1, 1, 1)}, {(–1, 1, –1, –1, –1, 1, 1, 1), (–1, 1,–1, 1, 1, –1, –1, 1), (–1, 1, 1, –1, 1, –1, 1, –1), (1, –1, –1, –1, 1, –1, 1, 1), (–1, –1, –1, 1, 1, 1, 1, –1), (1, 1, –1, 1, –1, –1, 1, –1), (–1, –1, –1, –1, –1, –1, –1, –1), (1, 1, –1, –1, 1, 1, –1, –1)}, {(–1, 1, –1, –1, –1, 1, 1, 1), (–1, 1, –1, 1, 1, –1, –1, 1), (–1, 1, 1,–1, 1, –1, 1, –1), (1, –1, –1, –1, 1, –1, 1, 1), (–1, –1, –1, 1, 1, 1, 1, –1), (1, 1, –1, 1, –1, –1, 1, –1), (–1, –1, 1, 1, –1, –1, 1, 1), (1, 1, 1, 1, 1, 1, 1, 1)}, {(–1, 1, –1, –1, –1, 1, 1, 1), (–1, 1, –1, 1, 1, –1, –1, 1), (–1, 1, 1, –1, 1, –1, 1, –1), (1, –1, –1, –1, 1,–1, 1, 1), (1, 1, –1, 1, –1, –1, 1, –1), (1, 1, 1, –1, –1, –1, –1, 1), (1, 1, –1, –1, 1, 1, –1, –1), (1, 1, 1, 1, 1, 1, 1, 1)}, {(–1, 1,–1, –1, –1, 1, 1, 1), (–1, 1, –1, 1, 1, –1, –1, 1), (–1, 1, 1, 1, –1, 1, –1, –1), (1, –1, –1, 1, –1, 1, –1, 1), (–1, –1, –1, 1, 1, 1, 1, –1), (–1, –1, 1, –1, 1, 1, –1, 1), (–1, –1, –1, –1, –1, –1, –1, –1), (–1, –1, 1, 1, –1, –1, 1, 1)}, {(–1, 1, –1, –1, –1, 1, 1, 1), (–1, 1,–1, 1, 1, –1, –1, 1), (–1, 1, 1, 1, –1, 1, –1, –1), (1, –1, –1, 1, –1, 1, –1, 1), (–1, –1, –1, 1, 1, 1, 1, –1), (–1, –1, 1, –1, 1, 1, –1, 1), (–1, –1, –1, –1, –1, –1, –1, –1), (1, 1, –1, –1, 1, 1, –1, –1)}, {(–1, 1, –1, –1, –1, 1, 1, 1), (–1, 1, –1, 1, 1, –1, –1, 1), (–1, 1, 1, 1, –1, 1, –1, –1), (1, –1, –1, 1, –1, 1, –1, 1), (–1, –1, –1, 1, 1, 1, 1, –1), (–1, –1, 1, –1, 1, 1, –1, 1), (–1, –1, 1, 1, –1,–1, 1, 1), (1, 1, 1, 1, 1, 1, 1, 1)}, {(–1, 1, –1, –1, –1, 1, 1, 1), (–1, 1, –1, 1, 1, –1, –1, 1), (–1, 1, 1, 1, –1, 1, –1, –1), (1, –1,–1, 1, –1, 1, –1, 1), (–1, –1, –1, 1, 1, 1, 1, –1), (–1, –1, 1, –1, 1, 1, –1, 1), (1, 1, –1, –1, 1, 1, –1, –1), (1, 1, 1, 1, 1, 1, 1, 1)}, {(–1, 1, –1, –1, –1, 1, 1, 1), (–1, 1, –1, 1, 1, –1, –1, 1), (–1, 1, 1, 1, –1, 1, –1, –1), (1, –1, –1, 1, –1, 1, –1, 1), (–1, –1,–1, 1, 1, 1, 1, –1), (1, 1, –1, 1, –1, –1, 1, –1), (–1, –1, –1, –1, –1, –1, –1, –1), (–1, –1, 1, 1, –1, –1, 1, 1)}, {(–1, 1, –1, –1,–1, 1, 1, 1), (–1, 1, –1, 1, 1, –1, –1, 1), (–1, 1, 1, 1, –1, 1, –1, –1), (1, –1, –1, 1, –1, 1, –1, 1), (–1, –1, –1, 1, 1, 1, 1, –1), (1, 1,–1, 1, –1, –1, 1, –1), (–1, –1, –1, –1, –1, –1, –1, –1), (1, 1, –1, –1, 1, 1, –1, –1)}, {(–1, 1, –1, –1, –1, 1, 1, 1), (–1, 1, –1, 1, 1,–1, –1, 1), (–1, 1, 1, 1, –1, 1, –1, –1), (1, –1, –1, 1, –1, 1, –1, 1), (–1, –1, –1, 1, 1, 1, 1, –1), (1, 1, –1, 1, –1, –1, 1, –1), (–1,–1, 1, 1, –1, –1, 1, 1), (1, 1, 1, 1, 1, 1, 1, 1)}, {(–1, 1, –1, –1, –1, 1, 1, 1), (–1, 1, –1, 1, 1, –1, –1, 1), (–1, 1, 1, 1, –1, 1, –1, –1), (1, –1, –1, 1, –1, 1, –1, 1), (–1, –1, –1, 1, 1, 1, 1, –1), (1, 1, –1, 1, –1, –1, 1, –1), (1, 1, –1, –1, 1, 1, –1, –1), (1, 1, 1, 1, 1, 1, 1, 1)}, {(–1, 1, –1, –1, –1, 1, 1, 1), (–1, 1, –1, 1, 1, –1, –1, 1), (–1, 1, 1, 1, –1, 1, –1, –1), (1, –1, –1, 1, –1, 1,–1, 1), (–1, –1, 1, –1, 1, 1, –1, 1), (1, 1, 1, –1, –1, –1, –1, 1), (–1, –1, –1, −1, −1, −1, −1, −1), (−1, −1, 1, 1, −1, −1, 1, 1)}, {(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1, −1, 1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1, −1, 1), (−1, −1, 1, −1, 1, 1, −1, 1), (1, 1, 1, −1, −1, −1,−1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, 1,−1, 1, −1, −1), (1, −1, −1, 1, −1, 1, −1, 1), (−1, −1, 1, −1, 1, 1, −1, 1), (1, 1, 1, −1, −1, −1, −1, 1), (1, 1, −1, −1, 1, 1, −1, −1), (1, 1, 1, 1, 1, 1, 1, 1)}, {(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1,−1, 1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1, −1, 1, 1)}, {(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1, −1, 1), (1, 1, −1, 1, −1,−1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1, −1, 1), (1, 1, −1, 1, −1, −1, 1, −1), (1, 1, 1, −1, −1,−1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (−1, 1, 1, 1, −1, 1, −1, −1), (1, −1, −1, 1, −1, 1, −1, 1), (1, 1, −1, 1, −1, −1, 1, −1), (1, 1, 1, −1, −1, −1, −1, 1), (1, 1, −1, −1, 1, 1,−1, −1), (1, 1, 1, 1, 1, 1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1,−1, 1, −1, 1, −1, 1), (−1, −1, −1, 1, 1, 1, 1, −1), (−1, −1, 1, −1, 1, 1, −1, 1), (−1, −1, −1, −1, −1, −1, −1, −1), (−1, −1, 1, 1, −1,−1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1, −1, 1, −1, 1, −1, 1), (−1,−1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1, −1,−1, 1, 1, 1), (−1, 1, −1, 1, 1, −1, −1, 1), (1, −1, −1, −1, 1, −1, 1, 1), (1, −1, −1, 1, −1, 1, −1, 1), (−1, −1, −1, 1, 1, 1, 1, −1), (−1,−1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1, −1, 1, −1, 1, −1, 1), (−1, −1, −1, 1, 1, 1, 1, −1), (−1, −1, 1, −1, 1, 1, −1, 1), (1, 1, −1, −1, 1, 1,−1, −1), (1, 1, 1, 1, 1, 1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1,−1, 1, −1, 1, −1, 1), (−1, −1, −1, 1, 1, 1, 1, −1), (1, 1, −1, 1, −1, −1, 1, −1), (−1, −1, −1, −1, −1, −1, −1, −1), (4, 4, 1, 1, 4,−1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1, −1, 1, −1, 1, −1, 1), (−1,−1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1, −1,−1, 1, 1, 1), (−1, 1, −1, 1, 1, −1, −1, 1), (1, −1, −1, −1, 1, −1, 1, 1), (1, −1, −1, 1, −1, 1, −1, 1), (−1, −1, −1, 1, 1, 1, 1, −1), (1, 1,−1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1, −1, 1, −1, 1, −1, 1), (−1, −1, −1, 1, 1, 1, 1, −1), (1, 1, −1, 1, −1, −1, 1, −1), (1, 1, −1, −1, 1, 1,−1, −1), (1, 1, 1, 1, 1, 1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1,−1, 1, −1, 1, −1, 1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1,−1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1, −1, 1, −1, 1, −1, 1), (−1,−1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1, −1,−1, 1, 1, 1), (−1, 1, −1, 1, 1, −1, −1, 1), (1, −1, −1, −1, 1, −1, 1, 1), (1, −1, −1, 1, −1, 1, −1, 1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1,−1, 1), (1, −1, −1, −1, 1, −1, 1, 1), (1, −1, −1, 1, −1, 1, −1, 1), (−1, −1, 1, −1, 1, 1, −1, 1), (1, 1, 1, −1, −1, −1, −1, 1), (1, 1, −1,−1, 1, 1, −1, −1), (1, 1, 1, 1, 1, 1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1, −1, 1, −1, 1, −1, 1), (1, 1, −1, 1, −1, −1, 1, −1), (1, 1, 1, −1, −1, −1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, −1, 1, 1, −1, −1, 1), (1, −1, −1, −1, 1, −1, 1, 1), (1, −1, −1, 1, −1, 1, −1, 1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, −1, 1, 1, −1, −1, 1), (1, −1, −1, −1, 1, −1, 1, 1), (1, −1, −1, 1, −1, 1, −1, 1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, −1, 1, 1, −1,−1, 1), (1, −1, −1, −1, 1, −1, 1, 1), (1, −1, −1, 1, −1, 1, −1, 1), (1, 1, −1, 1, −1, −1, 1, −1), (1, 1, 1, −1, −1, −1, −1, 1), (1, 1, −1,−1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1, −1, 1,−1), (−1, 1, 1, 1, −1, 1, −1, −1), (1, −1, 1, −1, −1, 1, 1, −1), (−1, −1, −1, 1, 1, 1, 1, −1), (−1, −1, 1, −1, 1, 1, −1, 1), (1, 1, −1,−1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1,−1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1,−1, 1, −1), (−1, 1, 1, 1, −1, 1, −1, −1), (1, −1, 1, −1, −1, 1, 1, −1), (−1, −1, −1, 1, 1, 1, 1, −1), (1, 1, −1, 1, −1, −1, 1, −1), (1, 1,−1, −1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, −1, 1, −1, 1, −1), (−1, 1, 1, 1, −1, 1, −1, −1), (1, −1, 1, −1, −1, 1, 1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1,−1, 1, −1), (−1, 1, 1, 1, −1, 1, −1, −1), (1, −1, 1, −1, −1, 1, 1, −1), (−1, −1, 1, −1, 1, 1, −1, 1), (1, 1, 1, −1, −1, −1, −1, 1), (1, 1,−1, −1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, −1, 1, −1, 1, −1), (−1, 1, 1, 1, −1, 1, −1, −1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, −1, 1, −1, 1, −1), (−1, 1, 1, 1, −1, 1, −1, −1), (1, −1, 1, −1, −1, 1, 1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1,−1, 1, −1), (−1, 1, 1, 1, −1, 1, −1, −1), (1, −1, 1, −1, −1, 1, 1, −1), (1, 1, −1, 1, −1, −1, 1, −1), (1, 1, 1, −1, −1, −1, −1, 1), (1, 1,−1, −1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1, −1, 1,−1), (1, −1, −1, −1, 1, −1, 1, 1), (1, −1, 1, −1, −1, 1, 1, −1), (−1, −1, −1, 1, 1, 1, 1, −1), (−1, −1, 1, −1, 1, 1, −1, 1), (1, 1, −1,−1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, −1, 1, 1, 1, 1, −1), (1, 1, −1, 1, −1, −1, 1, −1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1,−1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1,−1, 1, −1), (1, −1, −1, −1, 1, −1, 1, 1), (1, −1, 1, −1, −1, 1, 1, −1), (−1, −1, −1, 1, 1, 1, 1, −1), (1, 1, −1, 1, −1, −1, 1, −1), (1, 1,−1, −1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, −1, 1, −1, 1, −1), (1, −1, −1, −1, 1, −1, 1, 1), (1, −1, 1, −1, −1, 1, 1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1,−1, 1, −1), (1, −1, −1, −1, 1, −1, 1, 1), (1, −1, 1, −1, −1, 1, 1, −1), (−1, −1, 1, −1, 1, 1, −1, 1), (1, 1, 1, −1, −1, −1, −1, 1), (1, 1,−1, −1, 1, 1, −1, −1), (1, 1, 1, 1, 1, 1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, −1, 1, −1, 1, −1), (1, −1, −1, −1, 1, −1, 1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, −1, 1, −1, 1, −1), (1, −1, −1, −1, 1, −1, 1, 1), (1, −1, 1, −1, −1, 1, 1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, −1, 1,−1, 1, −1), (1, −1, −1, −1, 1, −1, 1, 1), (1, −1, 1, −1, −1, 1, 1, −1), (1, 1, −1, 1, −1, −1, 1, −1), (1, 1, 1, −1, −1, −1, −1, 1), (1, 1,−1, −1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (1, 1, −1,−1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1,−1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1,−1, −1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (1, 1,−1, −1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, 1, −1, 1, −1, −1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1,−1, −1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (1, 1, −1,−1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, 1, −1, 1, −1, −1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, 1, −1, 1, −1, −1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1,−1, −1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (1, 1, −1,−1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1, −1,−1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (1, 1, −1,−1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, 1, −1,−1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1,−1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (1, 1, −1,−1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, 1, −1, 1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1,−1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (1, 1, −1,−1, 1, 1, −1, −1), (1, 1, 1, 1, 1, 1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (−1, −1, 1, 1,−1, −1, 1, 1)}, {(−1, 1, −1, −1, −1, 1, 1, 1), (−1, 1, 1, 1, −1, 1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, 1, −1,−1, −1, 1, 1, 1), (−1, 1, 1, 1, −1, 1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, 1, −1, −1, −1, 1, 1, 1), (−1, 1, 1, 1, −1, 1,−1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (1, 1, −1,−1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1,−1, −1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, −1,−1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1,−1, 1, 1), (1, −1, −1, 1, −1, 1, −1, 1), (1, −1, 1, −1, −1, 1, 1, −1), (−1, −1, −1, 1, 1, 1, 1, −1), (−1, −1, 1, −1, 1, 1, −1, 1), (1, 1,−1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1,−1, −1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, −1,−1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1,−1, 1, 1), (1, −1, −1, 1, −1, 1, −1, 1), (1, −1, 1, −1, −1, 1, 1, −1), (−1, −1, −1, 1, 1, 1, 1, −1), (1, 1, −1, 1, −1, −1, 1, −1), (1, 1,−1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1,−1, −1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, −1,−1, −1, 1, 1, 1), (1, −1, −1, −1, 1, −1, 1, 1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1,−1, 1, 1), (1, −1, −1, 1, −1, 1, −1, 1), (1, −1, 1, −1, −1, 1, 1, −1), (−1, −1, 1, −1, 1, 1, −1, 1), (1, 1, 1, −1, −1, −1, −1, 1), (1, 1,−1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,−1, −1, 1, 1)}, {(−1, 1, −1, −1, −1, 1, 1, 1), (1, −1, −1, −1, 1, −1, 1, 1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, −1,−1, −1, 1, 1, 1), (1, −1, −1, −1, 1, −1, 1, 1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1,−1, 1, 1), (1, −1, −1, 1, −1, 1, −1, 1), (1, −1, 1, −1, −1, 1, 1, −1), (1, 1, −1, 1, −1, −1, 1, −1), (1, 1, 1, −1, −1, −1, −1, 1), (1, 1,−1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (−1, −1, 1, 1,−1, −1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(−1, 1, −1,−1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1,−1, 1, 1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (1, 1,−1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (−1, −1, 1, 1,−1, −1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(−1, 1, −1,−1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1,−1, 1, 1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (1, 1,−1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (−1, −1, 1, 1,−1, −1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(−1, 1, −1,−1, −1, 1, 1, 1), (1, −1, −1, −1, 1, −1, 1, 1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1,−1, 1, 1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (1, 1,−1, −1, 1, 1, −1, −1), (1, 1, 1, 1, 1, 1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (−1, −1, 1, 1,−1, −1, 1, 1)}, {(−1, 1, −1, −1, −1, 1, 1, 1), (1, −1, −1, −1, 1, −1, 1, 1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(−1, 1, −1,−1, −1, 1, 1, 1), (1, −1, −1, −1, 1, −1, 1, 1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(−1, 1, −1, −1, −1, 1, 1, 1), (1, −1, −1, −1, 1,−1, 1, 1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (1, 1,−1, −1, 1, 1, −1, −1), (1, 1, 1, 1, 1, 1, 1, 1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1,−1, 1, 1, −1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(−1, 1, −1,−1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, 1, −1, −1, 1, 1, −1, 1), (−1, 1, −1, 1, −1,−1, 1, 1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (1, −1,−1, 1, 1, −1, −1, 1), (1, 1, 1, 1, 1, 1, 1, 1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1,−1, 1, 1, −1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(−1, 1, −1,−1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, 1, −1, −1, 1, 1, −1, 1), (−1, 1, −1, 1, −1,−1, 1, 1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (1, −1,−1, 1, 1, −1, −1, 1), (1, 1, 1, 1, 1, 1, 1, 1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1,−1, 1, 1, −1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(−1, 1, −1,−1, 1, 1, −1, 1), (−1, 1, −1, 1, −1, −1, 1, 1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, 1, −1, −1, 1, 1, −1, 1), (−1, 1, −1, 1, −1,−1, 1, 1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (1, −1,−1, 1, 1, −1, −1, 1), (1, 1, 1, 1, 1, 1, 1, 1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1,−1, 1, 1, −1)}, {(−1, 1, −1, −1, 1, 1, −1, 1), (−1, 1, −1, 1, −1, −1, 1, 1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(−1, 1, −1,−1, 1, 1, −1, 1), (−1, 1, −1, 1, −1, −1, 1, 1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, 1, −1, −1, 1, 1, −1, 1), (−1, 1, −1, 1, −1,−1, 1, 1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (1, −1,−1, 1, 1, −1, −1, 1), (1, 1, 1, 1, 1, 1, 1, 1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1, −1, 1, 1, −1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, 1, −1,−1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, 1, −1, −1, 1, 1, −1, 1), (−1, 1, 1, 1, −1, −1,−1, 1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, 1, −1,−1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, 1, −1, −1, 1, 1, −1, 1), (−1, 1, 1, 1, −1, −1,−1, 1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (1, −1,−1, 1, 1, −1, −1, 1), (1, 1, 1, 1, 1, 1, 1, 1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,−1, 1, 1, −1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, 1, −1,−1, 1, 1, −1, 1), (−1, 1, 1, 1, −1, −1, −1, 1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, 1, −1, −1, 1, 1, −1, 1), (−1, 1, 1, 1, −1, −1,−1, 1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (1, −1,−1, 1, 1, −1, −1, 1), (1, 1, 1, 1, 1, 1, 1, 1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,−1, 1, 1, −1)}, {(−1, 1, −1, −1, 1, 1, −1, 1), (−1, 1, 1, 1, −1, −1, −1, 1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, 1, −1,−1, 1, 1, −1, 1), (−1, 1, 1, 1, −1, −1, −1, 1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, 1, −1, −1, 1, 1, −1, 1), (−1, 1, 1, 1, −1, −1,−1, 1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (1, −1,−1, 1, 1, −1, −1, 1), (1, 1, 1, 1, 1, 1, 1, 1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,−1, 1, 1, −1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, 1, −1,−1, 1, 1, −1, 1), (1, −1, −1, −1, 1, 1, 1, −1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, 1, −1, −1, 1, 1, −1, 1), (1, −1, −1, −1, 1, 1, 1,−1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(−1, 1, −1,−1, 1, 1, −1, 1), (1, −1, −1, −1, 1, 1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, 1, −1, −1, 1, 1, −1, 1), (1, −1, −1,−1, 1, 1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (1, −1, −1, 1, 1, −1, −1, 1), (1, 1, 1, 1, 1, 1, 1, 1)}, {(−1, 1, −1, −1, 1, 1, −1, 1), (1, −1, −1, −1, 1, 1, 1, −1), (1, 1, −1, 1, −1, 1,−1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1, −1, 1, 1, −1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1,−1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1, −1, −1, −1), (−1, 1, −1, 1, 1,−1, 1, −1), (1, 1, −1, −1, −1, −1, 1, 1), (−1, 1, 1, −1, −1, 1, 1, −1), (1, 1, 1, 1, 1, 1, 1, 1)}, {(−1, 1, −1, −1, 1, 1, −1, 1), (1, −1,−1, −1, 1, 1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (1, −1, −1, 1, 1, −1, −1, 1), (1, 1, 1, 1, 1, 1, 1, 1)}, {(−1, 1, −1, −1, 1, 1, −1, 1), (1, −1, −1, −1, 1, 1, 1, −1), (1, 1, −1, 1, −1, 1,−1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1, −1, 1, 1, −1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1,−1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(−1, 1, −1, −1, 1, 1, −1, 1), (1, −1, −1, −1, 1, 1, 1, −1), (1, 1, −1, 1, −1, 1, −1, −1), (1, 1, 1, −1, 1, −1, −1, −1), (1, −1, 1, −1,−1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, 1, −1, −1, 1, 1, −1, 1), (1,−1, −1, −1, 1, 1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1,−1, 1, 1), (1, −1, −1, 1, 1, −1, −1, 1), (1, 1, 1, 1, 1, 1, 1, 1)}, {(−1, 1, −1, −1, 1, 1, −1, 1), (1, −1, 1, −1, 1, 1, −1, −1), (1, 1, −1,−1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1,−1), (−1, 1, 1, −1, −1, 1, 1, −1)}, {(−1, 1, −1, −1, 1, 1, −1, 1), (1, −1, 1, −1, 1, 1, −1, −1), (1, 1, −1, −1, 1, −1, 1, −1), (1, 1,−1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1,−1, 1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1, −1), (−1, −1,−1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1,−1, −1), (1, −1, −1, 1, 1, −1, −1, 1), (1, 1, 1, 1, 1, 1, 1, 1)}, {(−1, 1, −1, −1, 1, 1, −1, 1), (1, −1, 1, −1, 1, 1, −1, −1), (1, 1, −1,−1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1,−1), (−1, 1, 1, −1, −1, 1, 1, −1)}, {(−1, 1, −1, −1, 1, 1, −1, 1), (1, −1, 1, −1, 1, 1, −1, −1), (1, 1, −1, −1, 1, −1, 1, −1), (1, 1,−1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1,−1, 1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1, −1), (−1, −1,−1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1, −1), (−1, −1, −1, 1, 1, 1, 1, −1), (1, −1, −1, −1,−1, 1, 1, 1), (1, −1, −1, 1, 1, −1, −1, 1), (1, 1, 1, 1, 1, 1, 1, 1)}, {(−1, 1, −1, −1, 1, 1, −1, 1), (1, −1, 1, −1, 1, 1, −1, −1), (1, 1,−1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1,−1, −1), (−1, 1, 1, −1, −1, 1, 1, −1)}, {(−1, 1, −1, −1, 1, 1, −1, 1), (1, −1, 1, −1, 1, 1, −1, −1), (1, 1, −1, −1, 1, −1, 1, −1), (1, 1,−1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1,−1, 1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, 1, −1, −1, 1, 1,−1, 1), (1, −1, 1, −1, 1, 1, −1, −1), (1, 1, −1, −1, 1, −1, 1, −1), (1, 1, −1, 1, −1, 1, −1, −1), (−1, 1, 1, 1, 1, −1, −1, −1), (1, 1, 1,−1, −1, −1, −1, 1), (1, −1, −1, 1, 1, −1, −1, 1), (1, 1, 1, 1, 1, 1, 1, 1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1,−1, −1, −1, −1), (−1, 1, 1, −1, −1, 1, 1, −1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (1, −1,−1, 1, 1, −1, −1, 1)}, {(−1, 1, −1, −1, 1, 1, −1, 1), (1, −1, 1, −1, 1, 1, −1, −1), (1, 1, −1, −1, 1, −1, 1, −1), (1, 1, −1, 1, −1, 1, −1,−1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, 1, −1,−1, 1, 1, −1, 1), (1, −1, 1, −1, 1, 1, −1, −1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, 1, −1, 1, −1, −1, 1, 1), (−1, 1, −1, 1, 1, 1,−1, −1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1, −1, 1), (−1, −1,−1, −1, −1, −1, −1, −1), (−1, 1, 1, −1, −1, 1, 1, −1)}, {(−1, 1, −1, 1, −1, −1, 1, 1), (−1, 1, −1, 1, 1, 1, −1, −1), (1, 1, −1, −1, −1, 1,−1, 1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (1, −1,−1, 1, 1, −1, −1, 1)}, {(−1, 1, −1, 1, −1, −1, 1, 1), (−1, 1, −1, 1, 1, 1, −1, −1), (1, 1, −1, −1, −1, 1, −1, 1), (1, 1, −1, −1, 1, −1, 1,−1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, 1, −1, 1,−1, −1, 1, 1), (−1, 1, −1, 1, 1, 1, −1, −1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, 1, −1, 1, −1, −1, 1, 1), (−1, 1, −1, 1, 1, 1, −1,−1), (1, 1, −1, −1, −1, 1, −1, 1), (1, 1, −1, −1, 1, −1, 1, −1), (−1, −1, −1, −1, 1, 1, 1, 1), (1, −1, −1, 1, −1, 1, 1, −1), (−1, −1, −1,−1, −1, −1, −1, −1), (−1, 1, 1, −1, −1, 1, 1, −1)}, {(−1, 1, −1, 1, −1, −1, 1, 1), (−1, 1, −1, 1, 1, 1, −1, −1), (1, 1, −1, −1, −1, 1,−1, 1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (1, −1,−1, 1, 1, −1, −1, 1)}, {(−1, 1, −1, 1, −1, −1, 1, 1), (−1, 1, −1, 1, 1, 1, −1, −1), (1, 1, −1, −1, −1, 1, −1, 1), (1, 1, −1, −1, 1, −1, 1,−1), (−1, −1, −1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, 1, −1, 1,−1, −1, 1, 1), (−1, 1, −1, 1, 1, 1, −1, −1), (1, 1, −1, −1, −1, 1, −1, 1), (1, 1, −1, −1, 1, −1, 1, −1), (−1, −1, −1, −1, 1, 1, 1, 1), (1,−1, −1, 1, −1, 1, 1, −1), (1, −1, −1, 1, 1, −1, −1, 1), (1, 1, 1, 1, 1, 1, 1, 1)}, {(−1, 1, −1, 1, −1, −1, 1, 1), (−1, 1, −1, 1, 1, 1, −1,−1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (−1, −1, −1,−1, −1, −1, −1, −1), (−1, 1, 1, −1, −1, 1, 1, −1)}, {(−1, 1, −1, 1, −1, −1, 1, 1), (−1, 1, −1, 1, 1, 1, −1, −1), (1, 1, −1, −1, −1, 1,−1, 1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (1, −1,−1, 1, 1, −1, −1, 1)}, {(−1, 1, −1, 1, −1, −1, 1, 1), (−1, 1, −1, 1, 1, 1, −1, −1), (1, 1, −1, −1, −1, 1, −1, 1), (1, 1, −1, −1, 1, −1, 1,−1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, 1, −1, 1,−1, −1, 1, 1), (−1, 1, −1, 1, 1, 1, −1, −1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (1, −1, −1, 1, 1, −1, −1, 1), (1, 1, 1, 1, 1, 1, 1, 1)}, {(−1, 1, −1, 1, −1, −1, 1, 1), (−1, 1, −1, 1, 1, 1,−1, −1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (−1, −1,−1, −1, −1, −1, −1, −1), (−1, 1, 1, −1, −1, 1, 1, −1)}, {(−1, 1, −1, 1, −1, −1, 1, 1), (−1, 1, −1, 1, 1, 1, −1, −1), (1, 1, −1, −1, −1, 1,−1, 1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (1, −1,−1, 1, 1, −1, −1, 1)}, {(−1, 1, −1, 1, −1, −1, 1, 1), (−1, 1, −1, 1, 1, 1, −1, −1), (1, 1, −1, −1, −1, 1, −1, 1), (1, 1, −1, −1, 1, −1, 1,−1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, 1, −1, 1,−1, −1, 1, 1), (−1, 1, −1, 1, 1, 1, −1, −1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (1, −1, −1, 1, 1, −1, −1, 1), (1, 1, 1, 1, 1, 1, 1, 1)}, {(−1, 1, −1, 1, −1, −1, 1, 1), (1, −1, 1, −1, −1,−1, 1, 1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1, −1, 1), (−1, −1,−1, −1, −1, −1, −1, −1), (−1, 1, 1, −1, −1, 1, 1, −1)}, {(−1, 1, −1, 1, −1, −1, 1, 1), (1, −1, 1, −1, −1, −1, 1, 1), (1, 1, −1, −1, −1, 1,−1, 1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (1, −1,−1, 1, 1, −1, −1, 1)}, {(−1, 1, −1, 1, −1, −1, 1, 1), (1, −1, 1, −1, −1, −1, 1, 1), (1, 1, −1, −1, −1, 1, −1, 1), (1, 1, −1, −1, 1, −1, 1,−1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, 1, −1, 1,−1, −1, 1, 1), (1, −1, 1, −1, −1, −1, 1, 1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1, −1, 1), (1, −1, −1, 1, 1, −1, −1, 1), (1, 1, 1, 1, 1, 1, 1, 1)}, {(−1, 1, −1, 1, −1, −1, 1, 1), (1, −1, 1, −1, −1,−1, 1, 1), (1, 1, −1, −1, −1, 1, −1, 1), (1, 1, −1, −1, 1, −1, 1, −1), (−1, −1, −1, −1, 1, 1, 1, 1), (1, −1, −1, 1, −1, 1, 1, −1), (−1, −1,−1, −1, −1, −1, −1, −1), (−1, 1, 1, −1, −1, 1, 1, −1)}, {(−1, 1, −1, 1, −1, −1, 1, 1), (1, −1, 1, −1, −1, −1, 1, 1), (1, 1, −1, −1, −1, 1,−1, 1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (1, −1,−1, 1, 1, −1, −1, 1)}, {(−1, 1, −1, 1, −1, −1, 1, 1), (1, −1, 1, −1, −1, −1, 1, 1), (1, 1, −1, −1, −1, 1, −1, 1), (1, 1, −1, −1, 1, −1, 1,−1), (−1, −1, −1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, 1, −1, 1,−1, −1, 1, 1), (1, −1, 1, −1, −1, −1, 1, 1), (1, 1, −1, −1, −1, 1, −1, 1), (1, 1, −1, −1, 1, −1, 1, −1), (−1, −1, −1, −1, 1, 1, 1, 1), (1,−1, −1, 1, −1, 1, 1, −1), (1, −1, −1, 1, 1, −1, −1, 1), (1, 1, 1, 1, 1, 1, 1, 1)}, {(−1, 1, −1, 1, −1, −1, 1, 1), (1, −1, 1, −1, −1,−1, 1, 1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (−1, −1,−1, −1, −1, −1, −1, −1), (−1, 1, 1, −1, −1, 1, 1, −1)}, {(−1, 1, −1, 1, −1, −1, 1, 1), (1, −1, 1, −1, −1, −1, 1, 1), (1, 1, −1, −1, −1, 1,−1, 1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (1, −1,−1, 1, 1, −1, −1, 1)}, {(−1, 1, −1, 1, −1, −1, 1, 1), (1, −1, 1, −1, −1, −1, 1, 1), (1, 1, −1, −1, −1, 1, −1, 1), (1, 1, −1, −1, 1, −1, 1,−1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, 1, −1, 1,−1, −1, 1, 1), (1, −1, 1, −1, −1, −1, 1, 1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (1, −1, −1, 1, 1, −1, −1, 1), (1, 1, 1, 1, 1, 1, 1, 1)}, {(−1, 1, −1, 1, −1, −1, 1, 1), (1, −1, 1, −1, −1,−1, 1, 1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (−1, −1,−1, −1, −1, −1, −1, −1), (−1, 1, 1, −1, −1, 1, 1, −1)}, {(−1, 1, −1, 1, −1, −1, 1, 1), (1, −1, 1, −1, −1, −1, 1, 1), (1, 1, −1, −1, −1, 1,−1, 1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (1, −1,−1, 1, 1, −1, −1, 1)}, {(−1, 1, −1, 1, −1, −1, 1, 1), (1, −1, 1, −1, −1, −1, 1, 1), (1, 1, −1, −1, −1, 1, −1, 1), (1, 1, −1, −1, 1, −1, 1,−1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, 1, −1, 1,−1, −1, 1, 1), (1, −1, 1, −1, −1, −1, 1, 1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (1, −1, −1, 1, 1, −1, −1, 1), (1, 1, 1, 1, 1, 1, 1, 1)}, {(−1, 1, −1, 1, −1, −1, 1, 1), (1, −1, 1, 1, −1,−1, 1, −1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1,−1, −1, −1, −1, −1, −1), (−1, 1, 1, −1, −1, 1, 1, −1)}, {(−1, 1, −1, 1, −1, −1, 1, 1), (1, −1, 1, 1, −1, −1, 1, −1), (1, 1, −1, −1, 1,−1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1,−1, −1, 1, 1, −1, −1, 1)}, {(−1, 1, −1, 1, −1, −1, 1, 1), (1, −1, 1, 1, −1, −1, 1, −1), (1, 1, −1, −1, 1, −1, 1, −1), (1, 1, −1, 1, −1, 1,−1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(−1, 1,−1, 1, −1, −1, 1, 1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (1, −1, −1, 1, 1, −1, −1, 1), (1, 1, 1, 1, 1, 1, 1, 1)}, {(−1, 1, −1, 1, −1, −1, 1, 1), (1, −1, 1, 1, −1,−1, 1, −1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1,−1, −1, −1, −1, −1, −1), (−1, 1, 1, −1, −1, 1, 1, −1)}, {(−1, 1, −1, 1, −1, −1, 1, 1), (1, −1, 1, 1, −1, −1, 1, −1), (1, 1, −1, −1, 1,−1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (1,−1, −1, 1, 1, −1, −1, 1)}, {(−1, 1, −1, 1, −1, −1, 1, 1), (1, −1, 1, 1, −1, −1, 1, −1), (1, 1, −1, −1, 1, −1, 1, −1), (1, 1, −1, 1, −1, 1,−1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(−1, 1,−1, 1, −1, −1, 1, 1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (1, −1, −1, 1, 1, −1, −1, 1), (1, 1, 1, 1, 1, 1, 1, 1)}, {(−1, 1, −1, 1, −1, −1, 1, 1), (1, −1, 1, 1, −1,−1, 1, −1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1,−1, −1, −1, −1, −1, −1), (−1, 1, 1, −1, −1, 1, 1, −1)}, {(−1, 1, −1, 1, −1, −1, 1, 1), (1, −1, 1, 1, −1, −1, 1, −1), (1, 1, −1, −1, 1,−1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (1,−1, −1, 1, 1, −1, −1, 1)}, {(−1, 1, −1, 1, −1, −1, 1, 1), (1, −1, 1, 1, −1, −1, 1, −1), (1, 1, −1, −1, 1, −1, 1, −1), (1, 1, −1, 1, −1, 1,−1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(−1, 1, −1, 1, −1, −1, 1, 1), (1, −1, 1, 1, −1, −1, 1, −1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (1, −1, −1, 1, 1, −1, −1, 1), (1, 1, 1, 1, 1, 1, 1, 1)}, {(−1, 1, −1, 1, −1, −1, 1, 1), (1, −1, 1, 1, −1,−1, 1, −1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (−1, −1,−1, −1, −1, −1, −1, −1), (−1, 1, 1, −1, −1, 1, 1, −1)}, {(−1, 1, −1, 1, −1, −1, 1, 1), (1, −1, 1, 1, −1, −1, 1, −1), (1, 1, −1, −1, 1,−1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (1,−1, −1, 1, 1, −1, −1, 1)}, {(−1, 1, −1, 1, −1, −1, 1, 1), (1, −1, 1, 1, −1, −1, 1, −1), (1, 1, −1, −1, 1, −1, 1, −1), (1, 1, −1, 1, −1, 1,−1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(−1, 1,−1, 1, −1, −1, 1, 1), (1, −1, 1, 1, −1, −1, 1, −1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (1, −1, −1, 1, 1, −1, −1, 1), (1, 1, 1, 1, 1, 1, 1, 1)}, {(−1, 1, −1, 1, −1, 1, 1, −1), (−1, 1, −1, 1, 1, −1,−1, 1), (−1, 1, 1, −1, −1, 1, −1, 1), (−1, 1, 1, −1, 1, −1, 1, −1), (−1, −1, −1, −1, 1, 1, 1, 1), (−1, −1, 1, 1, 1, 1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,−1, 1), (−1, 1, 1, −1, 1, −1, 1, −1), (−1, −1, −1, −1, 1, 1, 1, 1), (−1, −1, 1, 1, 1, 1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (−1, 1, 1, −1, 1, −1, 1,−1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (−1, 1, 1, −1, −1, 1, −1, 1), (−1, 1, 1, −1, 1, −1, 1, −1), (−1, −1, −1, −1, 1, 1, 1, 1), (−1,−1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1, −1, 1), (−1, 1, 1, −1, −1, 1, −1, 1), (−1, 1, 1, −1, 1, −1, 1, −1), (−1, −1, −1, −1, 1, 1, 1, 1), (1, 1, −1, −1, −1, −1, 1, 1), (−1, −1, −1, −1,−1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1, −1, 1), (−1, 1, 1, −1, 1, −1, 1, −1), (−1, −1, −1, −1, 1, 1, 1, 1), (1, 1, −1, −1, −1, −1, 1, 1), (−1, −1, −1, −1, −1, −1, −1, −1), (1, 1, −1,−1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (−1, 1, 1, −1, 1, −1, 1, −1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (−1, 1, 1, −1, −1, 1, −1, 1), (−1, 1, 1, −1, 1, −1, 1, −1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (−1, 1, 1, −1, −1, 1, −1, 1), (−1, 1, 1, −1, 1, −1, 1, −1), (−1, −1, 1, 1, 1, 1, −1, −1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,−1, 1), (−1, 1, 1, −1, 1, −1, 1, −1), (−1, −1, 1, 1, 1, 1, −1, −1), (1, 1, 1, 1, −1, −1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (−1, 1, 1, −1, 1, −1, 1,−1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (−1, 1, 1, −1, −1, 1, −1, 1), (−1, 1, 1, −1, 1, −1, 1, −1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (−1, 1, 1, −1, −1, 1, −1, 1), (−1, 1, 1, −1, 1, −1, 1, −1), (1, 1, −1, −1, −1, −1, 1, 1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,−1, 1), (−1, 1, 1, −1, 1, −1, 1, −1), (1, 1, −1, −1, −1, −1, 1, 1), (1, 1, 1, 1, −1, −1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (−1, 1, 1, −1, 1, −1, 1,−1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (−1, 1, 1, −1, −1, 1, −1, 1), (−1, 1, 1, −1, 1, −1, 1, −1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (−1, 1, 1, −1, −1, 1, −1, 1), (1, −1, −1, 1, −1, 1, −1, 1), (−1, −1, −1, −1, 1, 1, 1, 1), (−1, −1, 1, 1, 1, 1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,−1, 1), (1, −1, −1, 1, −1, 1, −1, 1), (−1, −1, −1, −1, 1, 1, 1, 1), (−1, −1, 1, 1, 1, 1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (1, −1, −1, 1, −1, 1,−1, 1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1,−1, 1, −1, 1, 1, −1), (−1, 1, −1, 1, 1, −1, −1, 1), (−1, 1, 1, −1, −1, 1, −1, 1), (1, −1, −1, 1, −1, 1, −1, 1), (−1, −1, −1, −1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (−1, 1, 1, −1, −1, 1, −1, 1), (1, −1, −1, 1, −1, 1, −1, 1), (−1, −1, −1, −1, 1, 1, 1, 1), (1, 1, −1, −1, −1, −1, 1, 1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,−1, 1), (1, −1, −1, 1, −1, 1, −1, 1), (−1, −1, −1, −1, 1, 1, 1, 1), (1, 1, −1, −1, −1, −1, 1, 1), (−1, −1, −1, −1, −1, −1, −1, −1), (1, 1,−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (1, −1, −1, 1, −1, 1,−1, 1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1,−1, 1, −1, 1, 1, −1), (−1, 1, −1, 1, 1, −1, −1, 1), (−1, 1, 1, −1, −1, 1, −1, 1), (1, −1, −1, 1, −1, 1, −1, 1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (−1, 1, 1, −1, −1, 1, −1, 1), (1, −1, −1, 1, −1, 1, −1, 1), (−1, −1, 1, 1, 1, 1, −1, −1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,−1, 1), (1, −1, −1, 1, −1, 1, −1, 1), (−1, −1, 1, 1, 1, 1, −1, −1), (1, 1, 1, 1, −1, −1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (1, −1, −1, 1, −1, 1,−1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1,−1, 1, −1, 1, 1, −1), (−1, 1, −1, 1, 1, −1, −1, 1), (−1, 1, 1, −1, −1, 1, −1, 1), (1, −1, −1, 1, −1, 1, −1, 1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (−1, 1, 1, −1, −1, 1, −1, 1), (1, −1, −1, 1, −1, 1, −1, 1), (1, 1, −1, −1, −1, −1, 1, 1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, −1, 1,−1, 1), (1, −1, −1, 1, −1, 1, −1, 1), (1, 1, −1, −1, −1, −1, 1, 1), (1, 1, 1, 1, −1, −1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, −1, 1, 1, −1, −1, 1), (−1, 1, 1, −1, −1, 1, −1, 1), (1, −1, −1, 1, −1, 1,−1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1,−1, 1, −1, 1, 1, −1), (−1, 1, −1, 1, 1, −1, −1, 1), (−1, 1, 1, −1, −1, 1, −1, 1), (1, −1, −1, 1, −1, 1, −1, 1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (−1, 1, 1, −1, 1, −1, 1, −1), (1, −1, −1, 1, 1, −1, 1, −1), (−1, −1, −1, −1, 1, 1, 1, 1), (−1, −1, 1, 1, 1, 1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, 1, −1, 1,−1), (1, −1, −1, 1, 1, −1, 1, −1), (−1, −1, −1, −1, 1, 1, 1, 1), (−1, −1, 1, 1, 1, 1, −1, −1), (−1, −1, −1, −1, −1, −1, −1, −1), (1, 1, −1,−1, 1, 1, −1, −1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, −1, −1, 1, 1, 1, 1), (−1,−1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, −1, −1, 1, 1, 1, 1), (1, 1, −1, −1, −1, −1, 1, 1), (−1, −1, −1, −1,−1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, −1, −1, 1, 1, 1, 1), (1, 1, −1, −1, −1, −1, 1, 1), (−1, −1, −1, −1, −1, −1, −1, −1), (1, 1, −1,−1, 1, 1, −1, −1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (−1, 1, 1, −1, 1, −1, 1, −1), (1, −1, −1, 1, 1, −1, 1, −1), (−1, −1, 1, 1, 1, 1, −1, −1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, 1, −1, 1,−1), (1, −1, −1, 1, 1, −1, 1, −1), (−1, −1, 1, 1, 1, 1, −1, −1), (1, 1, 1, 1, −1, −1, −1, −1), (−1, −1, −1, −1, −1, −1, −1, −1), (1, 1, −1,−1, 1, 1, −1, −1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (−1, 1, 1, −1, 1, −1, 1, −1), (1, −1, −1, 1, 1, −1, 1, −1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (−1, 1, 1, −1, 1, −1, 1, −1), (1, −1, −1, 1, 1, −1, 1, −1), (1, 1, −1, −1, −1, −1, 1, 1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (−1, 1, 1, −1, 1, −1, 1,−1), (1, −1, −1, 1, 1, −1, 1, −1), (1, 1, −1, −1, −1, −1, 1, 1), (1, 1, 1, 1, −1, −1, −1, −1), (−1, −1, −1, −1, −1, −1, −1, −1), (1, 1, −1,−1, 1, 1, −1, −1)}, {(−1, 1, −1, 1, −1, 1, 1, −1), (−1, 1, −1, 1, 1, −1, −1, 1), (−1, 1, 1, −1, 1, −1, 1, −1), (1, −1, −1, 1, 1, −1, 1, −1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (−1, 1, 1, −1, 1, −1, 1, −1), (1, −1, −1, 1, 1, −1, 1, −1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (1, −1, −1, 1, −1, 1, −1, 1), (1, −1, −1, 1, 1, −1, 1, −1), (−1, −1, −1, −1, 1, 1, 1, 1), (−1, −1, 1, 1, 1, 1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (1, −1, −1, 1, −1, 1,−1, 1), (1, −1, −1, 1, 1, −1, 1, −1), (−1, −1, −1, −1, 1, 1, 1, 1), (−1, −1, 1, 1, 1, 1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1,−1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (−1,−1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (1, 1, −1, −1, −1, −1, 1, 1), (−1, −1, −1, −1,−1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (1, 1, −1, −1, −1, −1, 1, 1), (−1, −1, −1, −1, −1, −1, −1, −1), (1, 1, −1,−1, 1, 1, −1, −1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (1, −1, −1, 1, −1, 1, −1, 1), (1, −1, −1, 1, 1, −1, 1, −1), (−1, −1, 1, 1, 1, 1, −1, −1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (1, −1, −1, 1, −1, 1,−1, 1), (1, −1, −1, 1, 1, −1, 1, −1), (−1, −1, 1, 1, 1, 1, −1, −1), (1, 1, 1, 1, −1, −1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1,−1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (1, −1, −1, 1, −1, 1, −1, 1), (1, −1, −1, 1, 1, −1, 1, −1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, −1, 1, 1, −1,−1, 1), (1, −1, −1, 1, −1, 1, −1, 1), (1, −1, −1, 1, 1, −1, 1, −1), (1, 1, −1, −1, −1, −1, 1, 1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, −1, 1, 1, −1, −1, 1), (1, −1, −1, 1, −1, 1,−1, 1), (1, −1, −1, 1, 1, −1, 1, −1), (1, 1, −1, −1, −1, −1, 1, 1), (1, 1, 1, 1, −1, −1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, −1, 1, 1, −1, −1, 1), (1, −1, −1, 1, −1, 1, −1, 1), (1, −1, −1, 1, 1, −1, 1,−1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, −1, 1, 1, −1, −1, 1), (1, −1, −1, 1, −1, 1, −1, 1), (1, −1, −1, 1, 1, −1, 1, −1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1,−1, 1), (−1, 1, 1, −1, 1, −1, 1, −1), (1, −1, 1, −1, −1, 1, 1, −1), (−1, −1, −1, −1, 1, 1, 1, 1), (−1, −1, 1, 1, 1, 1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (−1, 1, 1, −1, 1, −1, 1,−1), (1, −1, 1, −1, −1, 1, 1, −1), (−1, −1, −1, −1, 1, 1, 1, 1), (−1, −1, 1, 1, 1, 1, −1, −1), (−1, −1, −1, −1, −1, −1, −1, −1), (1, 1, −1,−1, 1, 1, −1, −1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (−1,−1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, −1, −1,−1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, −1, −1, −1, −1, −1, −1), (1, 1, −1,−1, 1, 1, −1, −1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1,−1, 1), (−1, 1, 1, −1, 1, −1, 1, −1), (1, −1, 1, −1, −1, 1, 1, −1), (−1, −1, 1, 1, 1, 1, −1, −1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (−1, 1, 1, −1, 1, −1, 1,−1), (1, −1, 1, −1, −1, 1, 1, −1), (−1, −1, 1, 1, 1, 1, −1, −1), (1, 1, 1, 1, −1, −1, −1, −1), (−1, −1, −1, −1, −1, −1, −1, −1), (1, 1, −1,−1, 1, 1, −1, −1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (−1, 1, 1, −1, 1, −1, 1, −1), (1, −1, 1, −1, −1, 1, 1, −1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1,−1, 1), (−1, 1, 1, −1, 1, −1, 1, −1), (1, −1, 1, −1, −1, 1, 1, −1), (1, 1, −1, −1, −1, −1, 1, 1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (−1, 1, 1, −1, 1, −1, 1,−1), (1, −1, 1, −1, −1, 1, 1, −1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, −1, 1, 1, −1), (−1, 1, 1, −1, −1, 1, −1, 1), (−1, 1, 1, −1, 1, −1, 1, −1), (1, −1, 1, −1, −1, 1, 1, −1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (−1, 1, 1, −1, 1, −1, 1, −1), (1, −1, 1, −1, −1, 1, 1, −1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1,−1, 1), (1, −1, −1, 1, −1, 1, −1, 1), (1, −1, 1, −1, −1, 1, 1, −1), (−1, −1, −1, −1, 1, 1, 1, 1), (−1, −1, 1, 1, 1, 1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (1, −1, −1, 1, −1, 1,−1, 1), (1, −1, 1, −1, −1, 1, 1, −1), (−1, −1, −1, −1, 1, 1, 1, 1), (−1, −1, 1, 1, 1, 1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, 1, −1, −1, 1, −1, 1), (1, −1, −1, 1, −1, 1, −1, 1), (1, −1, 1, −1, −1, 1, 1,−1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (1, −1, −1, 1, −1, 1, −1, 1), (1, −1, 1, −1, −1, 1, 1, −1), (−1, −1, −1, −1, 1, 1, 1, 1), (−1,−1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1, −1, 1), (1, −1, −1, 1, −1, 1, −1, 1), (1, −1, 1, −1, −1, 1, 1, −1), (−1, −1, −1, −1, 1, 1, 1, 1), (1, 1, −1, −1, −1, −1, 1, 1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (1, −1, −1, 1, −1, 1, −1, 1), (1, −1, 1, −1, −1, 1, 1, −1), (−1, −1, −1, −1, 1, 1, 1, 1), (1, 1, −1, −1, −1, −1, 1, 1), (−1, −1, −1, −1, −1, −1, −1, −1), (1, 1, −1,−1, 1, 1, −1, −1)}, {(−1, 1, −1, 1, −1, 1, 1, −1), (−1, 1, 1, −1, −1, 1, −1, 1), (1, −1, −1, 1, −1, 1, −1, 1), (1, −1, 1, −1, −1, 1, 1, −1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (1, −1, −1, 1, −1, 1, −1, 1), (1, −1, 1, −1, −1, 1, 1, −1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1,−1, 1), (1, −1, −1, 1, −1, 1, −1, 1), (1, −1, 1, −1, −1, 1, 1, −1), (−1, −1, 1, 1, 1, 1, −1, −1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (1, −1, −1, 1, −1, 1,−1, 1), (1, −1, 1, −1, −1, 1, 1, −1), (−1, −1, 1, 1, 1, 1, −1, −1), (1, 1, 1, 1, −1, −1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, 1, −1, −1, 1, −1, 1), (1, −1, −1, 1, −1, 1, −1, 1), (1, −1, 1, −1, −1, 1, 1, −1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (1, −1, −1, 1, −1, 1, −1, 1), (1, −1, 1, −1, −1, 1, 1, −1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1,−1, 1), (1, −1, −1, 1, −1, 1, −1, 1), (1, −1, 1, −1, −1, 1, 1, −1), (1, 1, −1, −1, −1, −1, 1, 1), (1, 1, 1, 1, −1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (1, −1, −1, 1, −1, 1,−1, 1), (1, −1, 1, −1, −1, 1, 1, −1), (1, 1, −1, −1, −1, −1, 1, 1), (1, 1, 1, 1, −1, −1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, 1, −1, −1, 1, −1, 1), (1, −1, −1, 1, −1, 1, −1, 1), (1, −1, 1, −1, −1, 1, 1,−1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (1, −1, −1, 1, −1, 1, −1, 1), (1, −1, 1, −1, −1, 1, 1, −1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1,−1, 1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (1, 1, −1, 1, −1, −1,−1, 1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, 1, −1, −1, 1, −1, 1), (1, 1, −1, 1, −1, −1, −1, 1), (1, 1, 1, −1, −1, −1, 1,−1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1,−1, 1), (1, 1, −1, 1, −1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (1, 1, −1, 1, −1, −1,−1, 1), (1, 1, 1, −1, −1, −1, 1, −1), (−1, 1, −1, −1, 1, −1, 1, 1), (1, −1, −1, −1, −1, 1, 1, 1), (−1, −1, −1, −1, −1, −1, −1, −1), (1, 1,−1, −1, 1, 1, −1, −1)}, {(−1, 1, −1, 1, −1, 1, 1, −1), (−1, 1, 1, −1, −1, 1, −1, 1), (1, 1, −1, 1, −1, −1, −1, 1), (1, 1, 1, −1, −1, −1, 1,−1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (1, 1, −1, 1, −1, −1, −1, 1), (1, 1, 1, −1, −1, −1, 1, −1), (−1, 1, −1, −1, 1, −1, 1, 1), (1,−1, −1, −1, −1, 1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1,−1, 1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (1, 1, −1, 1, −1, −1,−1, 1), (1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, 1, −1, −1, 1, −1, 1), (1, 1, −1, 1, −1, −1, −1, 1), (1, 1, 1, −1, −1, −1, 1,−1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (1, 1, −1, 1, −1, −1, −1, 1), (1, 1, 1, −1, −1, −1, 1, −1), (−1, 1, 1, 1, 1, −1, −1, −1), (1,−1, 1, 1, −1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, −1, 1,−1, 1), (1, 1, −1, 1, −1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, −1, 1, −1, 1), (1, 1, −1, 1, −1, −1,−1, 1), (1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1, −1), (1, 1,−1, −1, 1, 1, −1, −1)}, {(−1, 1, −1, 1, −1, 1, 1, −1), (−1, 1, 1, −1, −1, 1, −1, 1), (1, 1, −1, 1, −1, −1, −1, 1), (1, 1, 1, −1, −1, −1, 1,−1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, −1, 1, −1, 1), (1, 1, −1, 1, −1, −1, −1, 1), (1, 1, 1, −1, −1, −1, 1, −1), (1, −1, −1, −1, −1, 1, 1, 1), (1,−1, 1, 1, −1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, 1, −1, 1,−1), (1, −1, −1, 1, 1, −1, 1, −1), (1, −1, 1, −1, −1, 1, 1, −1), (−1, −1, −1, −1, 1, 1, 1, 1), (−1, −1, 1, 1, 1, 1, −1, −1), (−1, −1, −1,−1, −1, −1, −1, −1), (−1, −1, 1, 1, −1, −1, 1, 1)}, {(−1, 1, −1, 1, −1, 1, 1, −1), (−1, 1, 1, −1, 1, −1, 1, −1), (1, −1, −1, 1, 1, −1, 1,−1), (1, −1, 1, −1, −1, 1, 1, −1), (−1, −1, −1, −1, 1, 1, 1, 1), (−1, −1, 1, 1, 1, 1, −1, −1), (−1, −1, −1, −1, −1, −1, −1, −1), (1, 1, −1,−1, 1, 1, −1, −1)}, {(−1, 1, −1, 1, −1, 1, 1, −1), (−1, 1, 1, −1, 1, −1, 1, −1), (1, −1, −1, 1, 1, −1, 1, −1), (1, −1, 1, −1, −1, 1, 1, −1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, 1, −1, 1, −1), (1, −1, −1, 1, 1, −1, 1, −1), (1, −1, 1, −1, −1, 1, 1, −1), (−1, −1, −1, −1, 1, 1, 1, 1), (−1,−1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, 1, −1, 1, −1), (1, −1, −1, 1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, −1, −1,−1, −1, −1, −1), (−1, −1, 1, 1, −1, −1, 1, 1)}, {(−1, 1, −1, 1, −1, 1, 1, −1), (−1, 1, 1, −1, 1, −1, 1, −1), (1, −1, −1, 1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, −1, −1, −1, −1, −1, −1), (1, 1, −1,−1, 1, 1, −1, −1)}, {(−1, 1, −1, 1, −1, 1, 1, −1), (−1, 1, 1, −1, 1, −1, 1, −1), (1, −1, −1, 1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1,−1, 1, 1, −1), (−1, 1, 1, −1, 1, −1, 1, −1), (1, −1, −1, 1, 1, −1, 1, −1), (1, −1, 1, −1, −1, 1, 1, −1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (−1, 1, 1, −1, 1,−1, 1, −1), (1, −1, −1, 1, 1, −1, 1, −1), (1, −1, 1, −1, −1, 1, 1, −1), (−1, −1, 1, 1, 1, 1, −1, −1), (1, 1, 1, 1, −1, −1, −1, −1), (−1, −1,−1, −1, −1, −1, −1, −1), (−1, −1, 1, 1, −1, −1, 1, 1)}, {(−1, 1, −1, 1, −1, 1, 1, −1), (−1, 1, 1, −1, 1, −1, 1, −1), (1, −1, −1, 1, 1,−1, 1, −1), (1, −1, 1, −1, −1, 1, 1, −1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, −1, 1, 1, −1), (−1, 1, 1, −1, 1, −1, 1, −1), (1, −1, −1, 1, 1, −1, 1, −1), (1, −1, 1, −1,−1, 1, 1, −1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, −1, 1, 1, −1), (−1, 1, 1, −1, 1, −1, 1, −1), (1, −1, −1, 1, 1, −1, 1, −1), (1, −1, 1, −1, −1, 1, 1, −1), (−1, −1, 1, 1, 1, 1,−1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (−1, 1, 1,−1, 1, −1, 1, −1), (1, −1, −1, 1, 1, −1, 1, −1), (1, −1, 1, −1, −1, 1, 1, −1), (1, 1, −1, −1, −1, −1, 1, 1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, −1, 1, 1, −1), (−1, 1, 1, −1, 1, −1, 1, −1), (1, −1,−1, 1, 1, −1, 1, −1), (1, −1, 1, −1, −1, 1, 1, −1), (1, 1, −1, −1, −1, −1, 1, 1), (1, 1, 1, 1, −1, −1, −1, −1), (−1, −1, −1, −1, −1, −1, −1,−1), (1, 1, −1, −1, 1, 1, −1, −1)}, {(−1, 1, −1, 1, −1, 1, 1, −1), (−1, 1, 1, −1, 1, −1, 1, −1), (1, −1, −1, 1, 1, −1, 1, −1), (1, −1, 1,−1, −1, 1, 1, −1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, −1, 1, 1, −1), (−1, 1, 1, −1, 1, −1, 1, −1), (1, −1, −1, 1, 1, −1, 1, −1), (1, −1, 1, −1, −1, 1, 1, −1), (1, 1, −1, −1, −1,−1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (1, −1,−1, 1, −1, 1, −1, 1), (1, −1, −1, 1, 1, −1, 1, −1), (1, −1, 1, −1, −1, 1, 1, −1), (−1, −1, −1, −1, 1, 1, 1, 1), (−1, −1, 1, 1, 1, 1, −1, −1), (−1, −1, −1, −1, −1, −1, −1, −1), (−1, −1, 1, 1, −1, −1, 1, 1)}, {(−1, 1, −1, 1, −1, 1, 1, −1), (1, −1, −1, 1, −1, 1, −1, 1), (1, −1,−1, 1, 1, −1, 1, −1), (1, −1, 1, −1, −1, 1, 1, −1), (−1, −1, −1, −1, 1, 1, 1, 1), (−1, −1, 1, 1, 1, 1, −1, −1), (−1, −1, −1, −1, −1, −1, −1,−1), (1, 1, −1, −1, 1, 1, −1, −1)}, {(−1, 1, −1, 1, −1, 1, 1, −1), (1, −1, −1, 1, −1, 1, −1, 1), (1, −1, −1, 1, 1, −1, 1, −1), (1, −1, 1,−1, −1, 1, 1, −1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (−1, −1, −1,−1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, −1, 1, −1, 1, 1, −1), (1,−1, −1, 1, −1, 1, −1, 1), (1, −1, −1, 1, 1, −1, 1, −1), (1, −1, 1, −1, −1, 1, 1, −1), (−1, −1, −1, −1, 1, 1, 1, 1), (1, 1, −1, −1, −1,−1, 1, 1), (−1, −1, −1, −1, −1, −1, −1, −1), (−1, −1, 1, 1, −1, −1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, −1, −1,−1, −1, −1, −1), (1, 1, −1, −1, 1, 1, −1, −1)}, {(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1, −1,−1, 1, 1, −1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (−1, −1, 1, 1, 1, 1,−1, −1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (−1, −1, 1, 1, 1, 1, −1, −1), (1, 1, 1, 1, −1, −1,−1, −1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (−1, −1, 1, 1, 1, 1, −1, −1), (1, 1, 1, 1, −1, −1, −1, −1), (−1, −1, 1, 1, −1,−1, 1, 1), (1, 1, 1, 1, 1, 1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1,−1, −1, 1, 1, −1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (1, 1, −1, −1, −1,−1, 1, 1), (1, 1, 1, 1, −1, −1, −1, −1), (−1, −1, −1, −1, −1, −1, −1, −1), (−1, −1, 1, 1, −1, −1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (1, 1, −1, −1, −1, −1, 1, 1), (1, 1, 1, 1, −1, −1,−1, −1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, −1, 1, −1, 1), (1, −1, −1, 1, 1, −1, 1, −1), (1, −1, 1, −1, −1, 1, 1, −1), (1, 1, −1, −1, −1, −1, 1, 1), (1, 1, 1, 1, −1, −1, −1, −1), (−1, −1, 1, 1, −1,−1, 1, 1), (1, 1, 1, 1, 1, 1, 1, 1)}, {(−1, 1, −1, 1, −1, 1, 1, −1), (1, −1, −1, 1, −1, 1, −1, 1), (1, −1, −1, 1, 1, −1, 1, −1), (1, −1, 1,−1, −1, 1, 1, −1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, −1, −1, 1,−1, 1, 1), (−1, 1, 1, 1, 1, −1, −1, −1), (−1, −1, −1, −1, −1, −1, −1, −1), (−1, −1, 1, 1, −1, −1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1,−1, −1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, 1, 1, −1,−1, 1, 1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1,−1, −1, −1, 1, −1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, −1, −1, 1,−1, 1, 1), (1, −1, −1, −1, −1, 1, 1, 1), (−1, −1, −1, −1, −1, −1, −1, −1), (−1, −1, 1, 1, −1, −1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, −1, −1, 1, −1, 1, 1), (1, −1, −1, −1,−1, 1, 1, 1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, 1, 1, −1,−1, 1, 1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1,−1, −1, −1, 1, −1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, 1, 1, 1, −1,−1, −1), (1, −1, 1, 1, −1, 1, −1, −1), (−1, −1, −1, −1, −1, −1, −1, −1), (−1, −1, 1, 1, −1, −1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1,−1, −1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, 1, 1, −1,−1, 1, 1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1,−1, −1, −1, 1, −1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (1, −1, −1, −1,−1, 1, 1, 1), (1, −1, 1, 1, −1, 1, −1, −1), (−1, −1, −1, −1, −1, −1, −1, −1), (−1, −1, 1, 1, −1, −1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (1, −1, −1, −1, −1, 1, 1, 1), (1, −1, 1, 1, −1, 1,−1, −1), (−1, −1, −1, −1, −1, −1, −1, −1), (1, 1, −1, −1, 1, 1, −1, −1)}, {(−1, 1, −1, 1, −1, 1, 1, −1), (1, −1, −1, 1, 1, −1, 1, −1), (1, 1, −1, 1, −1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, 1, 1, −1,−1, 1, 1), (1, 1, 1, 1, 1, 1, 1, 1)}, {(−1, 1, −1, 1, −1, 1, 1, −1), (1, −1, −1, 1, 1, −1, 1, −1), (1, 1, −1, 1, −1, −1, −1, 1), (1, 1, 1,−1, −1, −1, 1, −1), (1, −1, −1, −1, −1, 1, 1, 1), (1, −1, 1, 1, −1, 1, −1, −1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (−1, −1, −1,−1, 1, 1, 1, 1), (−1, −1, 1, 1, 1, 1, −1, −1), (−1, −1, −1, −1, −1, −1, −1, −1), (−1, −1, 1, 1, −1, −1, 1, 1)}, {(−1, 1, −1, 1, 1, −1,−1, 1), (−1, 1, 1, −1, −1, 1, −1, 1), (−1, 1, 1, −1, 1, −1, 1, −1), (1, −1, 1, −1, 1, −1, −1, 1), (−1, −1, −1, −1, 1, 1, 1, 1), (−1,−1, 1, 1, 1, 1, −1, −1), (−1, −1, −1, −1, −1, −1, −1, −1), (1, 1, −1, −1, 1, 1, −1, −1)}, {(−1, 1, −1, 1, 1, −1, −1, 1), (−1, 1, 1, −1,−1, 1, −1, 1), (−1, 1, 1, −1, 1, −1, 1, −1), (1, −1, 1, −1, 1, −1, −1, 1), (−1, −1, −1, −1, 1, 1, 1, 1), (−1, −1, 1, 1, 1, 1, −1, −1), (−1,−1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (−1, −1, −1, −1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1,−1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1, −1, −1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (−1, −1, −1,−1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1, −1, 1, 1, −1,−1, 1), (−1, 1, 1, −1, −1, 1, −1, 1), (−1, 1, 1, −1, 1, −1, 1, −1), (1, −1, 1, −1, 1, −1, −1, 1), (−1, −1, −1, −1, 1, 1, 1, 1), (1, 1, −1,−1, −1, −1, 1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (−1, −1, −1, −1, 1, 1, 1, 1), (1, 1, −1, −1, −1, −1, 1, 1), (1, 1, −1, −1, 1, 1,−1, −1), (1, 1, 1, 1, 1, 1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1,−1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1, −1,−1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (−1,−1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, −1, 1, 1,−1, −1, 1), (−1, 1, 1, −1, −1, 1, −1, 1), (−1, 1, 1, −1, 1, −1, 1, −1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1,−1, 1), (−1, 1, 1, −1, 1, −1, 1, −1), (1, −1, 1, −1, 1, −1, −1, 1), (−1, −1, 1, 1, 1, 1, −1, −1), (1, 1, 1, 1, −1, −1, −1, −1), (1, 1, −1,−1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, −1, 1, −1, 1), (−1, 1, 1, −1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1,−1, 1), (−1, 1, 1, −1, 1, −1, 1, −1), (1, −1, 1, −1, 1, −1, −1, 1), (1, 1, −1, −1, −1, −1, 1, 1), (1, 1, 1, 1, −1, −1, −1, −1), (1, 1, −1,−1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1,−1, 1), (1, −1, −1, 1, −1, 1, −1, 1), (1, −1, 1, −1, 1, −1, −1, 1), (−1, −1, −1, −1, 1, 1, 1, 1), (−1, −1, 1, 1, 1, 1, −1, −1), (1, 1, −1,−1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1,−1, 1), (1, −1, −1, 1, −1, 1, −1, 1), (1, −1, 1, −1, 1, −1, −1, 1), (−1, −1, −1, −1, 1, 1, 1, 1), (1, 1, −1, −1, −1, −1, 1, 1), (1, 1, −1,−1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1,−1, 1), (1, −1, −1, 1, −1, 1, −1, 1), (1, −1, 1, −1, 1, −1, −1, 1), (−1, −1, 1, 1, 1, 1, −1, −1), (1, 1, 1, 1, −1, −1, −1, −1), (1, 1, −1,−1, 1, 1, −1, −1), (1, 1, 1, 1, 1, 1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, −1, 1, −1, 1), (1, −1, −1, 1, −1, 1, −1, 1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, −1, 1,−1, 1), (1, −1, −1, 1, −1, 1, −1, 1), (1, −1, 1, −1, 1, −1, −1, 1), (1, 1, −1, −1, −1, −1, 1, 1), (1, 1, 1, 1, −1, −1, −1, −1), (1, 1, −1,−1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (−1, 1, 1, 1, −1, 1, −1, −1), (1, −1, 1, 1, 1, −1, −1, −1), (−1, −1, −1, 1, 1, 1, 1, −1), (−1, −1, 1, −1, 1, 1, −1, 1), (1, 1,−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (−1, 1, 1, 1, −1, 1, −1, −1), (1, −1, 1, 1, 1, −1, −1, −1), (−1, −1, −1, 1, 1, 1, 1, −1), (1, 1, −1, 1, −1, −1, 1, −1), (1, 1,−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (−1, 1, 1, 1, −1, 1, −1, −1), (1, −1, 1, 1, 1, −1, −1, −1), (−1, −1, 1, −1, 1, 1, −1, 1), (1, 1, 1, −1, −1, −1, −1, 1), (1, 1,−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (−1, 1, 1, 1, −1, 1, −1, −1), (1, −1, 1, 1, 1, −1, −1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (−1, 1, 1, 1, −1, 1, −1, −1), (1, −1, 1, 1, 1, −1, −1, −1), (1, 1, −1, 1, −1, −1, 1, −1), (1, 1, 1, −1, −1, −1, −1, 1), (1, 1,−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (1, −1, −1, −1, 1, −1, 1, 1), (1, −1, 1, 1, 1, −1, −1, −1), (−1, −1, −1, 1, 1, 1, 1, −1), (−1, −1, 1, −1, 1, 1, −1, 1), (1, 1,−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (1, −1, −1, −1, 1, −1, 1, 1), (1, −1, 1, 1, 1, −1, −1, −1), (−1, −1, −1, 1, 1, 1, 1, −1), (1, 1, −1, 1, −1, −1, 1, −1), (1, 1,−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (1, −1, −1, −1, 1, −1, 1, 1), (1, −1, 1, 1, 1, −1, −1, −1), (−1, −1, 1, −1, 1, 1, −1, 1), (1, 1, 1, −1, −1, −1, −1, 1), (1, 1,−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (1, −1, −1, −1, 1, −1, 1, 1), (1, −1, 1, 1, 1, −1, −1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (1, −1, −1, −1, 1, −1, 1, 1), (1, −1, 1, 1, 1, −1, −1, −1), (1, 1, −1, 1, −1, −1, 1, −1), (1, 1, 1, −1, −1, −1, −1, 1), (1, 1,−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (1, −1, −1, 1, 1, −1, 1, −1), (1, −1, 1, −1, 1, −1, −1, 1), (−1, −1, −1, −1, 1, 1, 1, 1), (−1, −1, 1, 1, 1, 1, −1, −1), (1, 1,−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (1, 1,−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (1, 1,−1, −1, 1, 1, −1, −1), (1, 1, 1, 1, 1, 1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1,−1, −1, 1, 1)}, {(−1, 1, −1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1,−1, 1, 1, −1, −1, 1), (−1, 1, 1, −1, 1, −1, 1, −1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (−1, 1, 1, −1, 1,−1, 1, −1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (1, 1,−1, −1, 1, 1, −1, −1), (1, 1, 1, 1, 1, 1, 1, 1)}, {(−1, 1, −1, 1, 1, −1, −1, 1), (−1, 1, 1, 1, −1, 1, −1, −1), (1, −1, −1, 1, −1, 1, −1, 1), (1, −1, 1, 1, 1, −1, −1, −1), (−1, −1, −1, 1, 1, 1, 1, −1), (−1, −1, 1, −1, 1, 1, –1, 1), (–1, –1, –1, –1, –1, –1, –1, –1), (–1, –1, 1, 1,–1, –1, 1, 1)}, {(–1, 1, –1, 1, 1, –1, –1, 1), (–1, 1, 1, 1, –1, 1, –1, –1), (1, –1, –1, 1, –1, 1, –1, 1), (1, –1, 1, 1, 1, –1, –1, –1), (–1, –1, –1, 1, 1, 1, 1, –1), (–1, –1, 1, –1, 1, 1, –1, 1), (–1, –1, –1, –1, –1, –1, –1, –1), (1, 1, –1, –1, 1, 1, –1, –1)}, {(–1, 1,–1, 1, 1, –1, –1, 1), (–1, 1, 1, 1, –1, 1, –1, –1), (1, –1, –1, 1, –1, 1, –1, 1), (1, –1, 1, 1, 1, –1, –1, –1), (–1, –1, –1, 1, 1, 1, 1, –1), (–1, –1, 1, –1, 1, 1, –1, 1), (–1, –1, 1, 1, –1, –1, 1, 1), (1, 1, 1, 1, 1, 1, 1, 1)}, {(–1, 1, –1, 1, 1, –1, –1, 1), (–1, 1, 1, 1, –1, 1,–1, –1), (1, –1, –1, 1, –1, 1, –1, 1), (1, –1, 1, 1, 1, –1, –1, –1), (–1, –1, –1, 1, 1, 1, 1, –1), (–1, –1, 1, –1, 1, 1, –1, 1), (1, 1, –1,–1, 1, 1, –1, –1), (1, 1, 1, 1, 1, 1, 1, 1)}, {(–1, 1, –1, 1, 1, –1, –1, 1), (–1, 1, 1, 1, –1, 1, –1, –1), (1, –1, –1, 1, –1, 1, –1, 1), (1, –1, 1, 1, 1, –1, –1, –1), (–1, –1, –1, 1, 1, 1, 1, –1), (1, 1, –1, 1, –1, –1, 1, –1), (–1, –1, –1, –1, –1, –1, –1, –1), (–1, –1, 1, 1,–1, –1, 1, 1)}, {(–1, 1, –1, 1, 1, –1, –1, 1), (–1, 1, 1, 1, –1, 1, –1, –1), (1, –1, –1, 1, –1, 1, –1, 1), (1, –1, 1, 1, 1, –1, –1, –1), (–1, –1, –1, 1, 1, 1, 1, –1), (1, 1, –1, 1, –1, –1, 1, –1), (–1, –1, –1, –1, –1, –1, –1, –1), (1, 1, –1, –1, 1, 1, –1, –1)}, {(–1, 1,–1, 1, 1, –1, –1, 1), (–1, 1, 1, 1, –1, 1, –1, –1), (1, –1, –1, 1, –1, 1, –1, 1), (1, –1, 1, 1, 1, –1, –1, –1), (–1, –1, –1, 1, 1, 1, 1, –1), (1, 1, –1, 1, –1, –1, 1, –1), (–1, –1, 1, 1, –1, –1, 1, 1), (1, 1, 1, 1, 1, 1, 1, 1)}, {(–1, 1, –1, 1, 1, –1, –1, 1), (–1, 1, 1, 1, –1, 1,–1, –1), (1, –1, –1, 1, –1, 1, –1, 1), (1, –1, 1, 1, 1, –1, –1, –1), (–1, –1, –1, 1, 1, 1, 1, –1), (1, 1, –1, 1, –1, –1, 1, –1), (1, 1, –1,–1, 1, 1, –1, –1), (1, 1, 1, 1, 1, 1, 1, 1)}, {(–1, 1, –1, 1, 1, –1, –1, 1), (–1, 1, 1, 1, –1, 1, –1, –1), (1, –1, –1, 1, –1, 1, –1, 1), (1, –1, 1, 1, 1, –1, –1, –1), (–1, –1, 1, –1, 1, 1, –1, 1), (1, 1, 1, –1, –1, –1, –1, 1), (–1, –1, –1, –1, –1, –1, –1, –1), (–1, –1, 1, 1,–1, –1, 1, 1)}, {(–1, 1, –1, 1, 1, –1, –1, 1), (–1, 1, 1, 1, –1, 1, –1, –1), (1, –1, –1, 1, –1, 1, –1, 1), (1, –1, 1, 1, 1, –1, –1, –1), (–1, –1, 1, –1, 1, 1, –1, 1), (1, 1, 1, –1, –1, –1, –1, 1), (–1, –1, –1, –1, –1, –1, –1, –1), (1, 1, –1, –1, 1, 1, –1, –1)}, {(–1, 1,–1, 1, 1, –1, –1, 1), (–1, 1, 1, 1, –1, 1, –1, –1), (1, –1, –1, 1, –1, 1, –1, 1), (1, –1, 1, 1, 1, –1, –1, –1), (–1, –1, 1, –1, 1, 1, –1, 1), (1, 1, 1, –1, –1, –1, –1, 1), (–1, –1, 1, 1, –1, –1, 1, 1), (1, 1, 1, 1, 1, 1, 1, 1)}, {(–1, 1, –1, 1, 1, –1, –1, 1), (–1, 1, 1, 1, –1, 1,–1, –1), (1, –1, –1, 1, –1, 1, –1, 1), (1, –1, 1, 1, 1, –1, –1, –1), (–1, –1, 1, –1, 1, 1, –1, 1), (1, 1, 1, –1, –1, –1, –1, 1), (1, 1, –1,–1, 1, 1, –1, –1), (1, 1, 1, 1, 1, 1, 1, 1)}, {(–1, 1, –1, 1, 1, –1, –1, 1), (–1, 1, 1, 1, –1, 1, –1, –1), (1, –1, –1, 1, –1, 1, –1, 1), (1, –1, 1, 1, 1, –1, –1, –1), (1, 1, –1, 1, –1, –1, 1, –1), (1, 1, 1, –1, –1, –1, –1, 1), (–1, –1, –1, –1, –1, –1, –1, –1), (–1, –1, 1, 1,–1, –1, 1, 1)}, {(–1, 1, –1, 1, 1, –1, –1, 1), (–1, 1, 1, 1, –1, 1, –1, –1), (1, –1, –1, 1, –1, 1, –1, 1), (1, –1, 1, 1, 1, –1, –1, –1), (1, 1, –1, 1, –1, –1, 1, –1), (1, 1, 1, –1, –1, –1, –1, 1), (–1, –1, –1, –1, –1, –1, –1, –1), (1, 1, –1, –1, 1, 1, –1, –1)}, {(–1, 1,–1, 1, 1, –1, –1, 1), (–1, 1, 1, 1, –1, 1, –1, –1), (1, –1, –1, 1, –1, 1, –1, 1), (1, –1, 1, 1, 1, –1, –1, –1), (1, 1, –1, 1, –1, –1, 1, –1), (1, 1, 1, –1, –1, –1, –1, 1), (–1, –1, 1, 1, –1, –1, 1, 1), (1, 1, 1, 1, 1, 1, 1, 1)}, {(–1, 1, –1, 1, 1, –1, –1, 1), (–1, 1, 1, 1, –1, 1,–1, –1), (1, –1, –1, 1, –1, 1, –1, 1), (1, –1, 1, 1, 1, –1, –1, –1), (1, 1, –1, 1, –1, –1, 1, –1), (1, 1, 1, –1, –1, –1, –1, 1), (1, 1, –1,–1, 1, 1, –1, –1), (1, 1, 1, 1, 1, 1, 1, 1)}, {(–1, 1, –1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (–1, –1, –1, 1, 1, 1, 1, –1), (–1, –1, 1, –1, 1, 1, –1, 1), (–1, –1, –1, –1, –1, –1, –1, –1), (–1, –1, 1, 1,–1, –1, 1, 1)}, {(–1, 1, –1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (–1, –1, –1, 1, 1, 1, 1, –1), (–1, –1, 1, –1, 1, 1, –1, 1), (–1, –1, –1, –1, –1, –1, –1, –1), (1, 1, –1, –1, 1, 1, –1, –1)}, {(–1, 1,–1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (–1, –1, –1, 1, 1, 1, 1, –1), (–1, –1, 1, –1, 1, 1, –1, 1), (–1, –1, 1, 1, –1, –1, 1, 1), (1, 1, 1, 1, 1, 1, 1, 1)}, {(–1, 1, –1, 1, 1, –1, –1, 1), (1, –1, –1, –1, 1,–1, 1, 1), (1, –1, –1, 1, –1, 1, –1, 1), (1, –1, 1, 1, 1, –1, –1, –1), (–1, –1, –1, 1, 1, 1, 1, –1), (–1, –1, 1, –1, 1, 1, –1, 1), (1, 1,–1, –1, 1, 1, –1, –1), (1, 1, 1, 1, 1, 1, 1, 1)}, {(–1, 1, –1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (–1, –1, –1, 1, 1, 1, 1, –1), (1, 1, –1, 1, –1, –1, 1, –1), (–1, –1, –1, –1, –1, –1, –1, –1), (–1, –1, 1, 1,–1, –1, 1, 1)}, {(–1, 1, –1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (–1, –1, –1, 1, 1, 1, 1, –1), (1, 1, –1, 1, –1, –1, 1, –1), (–1, –1, –1, –1, –1, –1, –1, –1), (1, 1, –1, –1, 1, 1, –1, –1)}, {(–1, 1,–1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (–1, –1, –1, 1, 1, 1, 1, –1), (1, 1, –1, 1, –1, –1, 1, –1), (–1, –1, 1, 1, –1, –1, 1, 1), (1, 1, 1, 1, 1, 1, 1, 1)}, {(–1, 1, –1, 1, 1, –1, –1, 1), (1, –1, –1, –1, 1,–1, 1, 1), (1, –1, –1, 1, –1, 1, –1, 1), (1, –1, 1, 1, 1, –1, –1, –1), (–1, –1, –1, 1, 1, 1, 1, –1), (1, 1, –1, 1, –1, –1, 1, –1), (1, 1,–1, –1, 1, 1, –1, –1), (1, 1, 1, 1, 1, 1, 1, 1)}, {(–1, 1, –1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (–1, –1, 1, –1, 1, 1, –1, 1), (1, 1, 1, –1, –1, –1, –1, 1), (–1, –1, –1, –1, –1, –1, –1, –1), (–1, –1, 1, 1,–1, –1, 1, 1)}, {(–1, 1, –1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (–1, –1, 1, –1, 1, 1, –1, 1), (1, 1, 1, –1, –1, –1, –1, 1), (–1, –1, –1, –1, –1, –1, –1, –1), (1, 1, –1, –1, 1, 1, –1, –1)}, {(–1, 1,–1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (–1, –1, 1, –1, 1, 1, –1, 1), (1, 1, 1, –1, –1, –1, –1, 1), (–1, –1, 1, 1, –1, –1, 1, 1), (1, 1, 1, 1, 1, 1, 1, 1)}, {(–1, 1, –1, 1, 1, –1, –1, 1), (1, –1, –1, –1, 1,–1, 1, 1), (1, –1, –1, 1, –1, 1, –1, 1), (1, –1, 1, 1, 1, –1, –1, –1), (–1, –1, 1, –1, 1, 1, –1, 1), (1, 1, 1, –1, –1, –1, –1, 1), (1, 1,–1, –1, 1, 1, –1, –1), (1, 1, 1, 1, 1, 1, 1, 1)}, {(–1, 1, –1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (1, 1, –1, 1, –1, –1, 1, –1), (1, 1, 1, –1, –1, –1, –1, 1), (–1, –1, –1, –1, –1, –1, –1, –1), (–1, –1, 1, 1,–1, –1, 1, 1)}, {(–1, 1, –1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (1, 1, –1, 1, –1, –1, 1, –1), (1, 1, 1, –1, –1, –1, –1, 1), (–1, –1, –1, –1, –1, –1, –1, –1), (1, 1, –1, –1, 1, 1, –1, –1)}, {(–1, 1,–1, 1, 1, –1, –1, 1), (1, –1, –1, –1, 1, –1, 1, 1), (1, –1, –1, 1, –1, 1, –1, 1), (1, –1, 1, 1, 1, –1, –1, –1), (1, 1, –1, 1, –1, –1, 1, –1), (1, 1, 1, –1, –1, –1, –1, 1), (–1, –1, 1, 1, –1, –1, 1, 1), (1, 1, 1, 1, 1, 1, 1, 1)}, {(–1, 1, –1, 1, 1, –1, –1, 1), (1, –1, –1, –1, 1,–1, 1, 1), (1, –1, –1, 1, –1, 1, –1, 1), (1, –1, 1, 1, 1, –1, –1, –1), (1, 1, –1, 1, –1, –1, 1, –1), (1, 1, 1, –1, –1, –1, –1, 1), (1, 1,–1, –1, 1, 1, –1, –1), (1, 1, 1, 1, 1, 1, 1, 1)}, {(–1, 1, –1, 1, 1, –1, –1, 1), (1, –1, –1, 1, –1, 1, –1, 1), (1, –1, –1, 1, 1, –1, 1, –1), (1, –1, 1, –1, 1, –1, –1, 1), (–1, –1, –1, –1, 1, 1, 1, 1), (–1, –1, 1, 1, 1, 1, –1, –1), (–1, –1, –1, –1, –1, –1, –1, –1), (–1, –1, 1, 1,–1, –1, 1, 1)}, {(–1, 1, –1, 1, 1, –1, –1, 1), (1, –1, –1, 1, –1, 1, –1, 1), (1, –1, –1, 1, 1, –1, 1, –1), (1, –1, 1, –1, 1, –1, –1, 1), (–1, –1, –1, –1, 1, 1, 1, 1), (–1, –1, 1, 1, 1, 1, –1, –1), (–1, –1, –1, –1, –1, –1, –1, –1), (1, 1, –1, –1, 1, 1, –1, –1)}, {(–1, 1,–1, 1, 1, –1, –1, 1), (1, –1, –1, 1, –1, 1, –1, 1), (1, –1, –1, 1, 1, –1, 1, –1), (1, –1, 1, –1, 1, –1, –1, 1), (–1, –1, –1, –1, 1, 1, 1, 1), (–1, –1, 1, 1, 1, 1, –1, –1), (–1, –1, 1, 1, –1, –1, 1, 1), (1, 1, 1, 1, 1, 1, 1, 1)}, {(–1, 1, –1, 1, 1, –1, –1, 1), (1, –1, –1, 1, –1, 1,–1, 1), (1, –1, –1, 1, 1, –1, 1, –1), (1, –1, 1, –1, 1, –1, –1, 1), (–1, –1, –1, –1, 1, 1, 1, 1), (–1, –1, 1, 1, 1, 1, –1, –1), (1, 1, –1,–1, 1, 1, –1, –1), (1, 1, 1, 1, 1, 1, 1, 1)}, {(–1, 1, –1, 1, 1, –1, –1, 1), (1, –1, –1, 1, –1, 1, –1, 1), (1, –1, –1, 1, 1, –1, 1, –1), (1, –1, 1, –1, 1, –1, –1, 1), (–1, –1, –1, –1, 1, 1, 1, 1), (1, 1, –1, –1, –1, –1, 1, 1), (–1, –1, –1, –1, –1, –1, –1, –1), (–1, –1, 1, 1,−1, −1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1,−1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, −1, 1, 1, −1, −1, 1), (1, −1, −1, 1, −1, 1,−1, 1), (1, −1, −1, 1, 1, −1, 1, −1), (1, −1, 1, −1, 1, −1, −1, 1), (−1, −1, −1, −1, 1, 1, 1, 1), (1, 1, −1, −1, −1, −1, 1, 1), (1, 1, −1,−1, 1, 1, −1, −1), (1, 1, 1, 1, 1, 1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1,−1, −1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1,−1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (1, −1, −1, 1, −1, 1,−1, 1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1,−1, −1, 1, 1)}, {(−1, 1, −1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1,−1, 1, 1, −1, −1, 1), (1, −1, −1, 1, −1, 1, −1, 1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, −1, 1, 1, −1, −1, 1), (1, −1, −1, 1, −1, 1,−1, 1), (1, −1, −1, 1, 1, −1, 1, −1), (1, −1, 1, −1, 1, −1, −1, 1), (1, 1, −1, −1, −1, −1, 1, 1), (1, 1, 1, 1, −1, −1, −1, −1), (1, 1, −1,−1, 1, 1, −1, −1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, 1,−1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, 1, −1, 1, 1, 1, −1, −1), (−1, 1, 1, 1, −1, −1,−1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (1, −1,−1, 1, 1, −1, −1, 1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1,−1, 1, 1, −1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, 1,−1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(−1, 1, −1, 1, 1, 1, −1, −1), (−1, 1, 1, 1, −1, −1,−1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (1, −1,−1, 1, 1, −1, −1, 1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1,−1, 1, 1, −1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, 1,−1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, 1, −1, 1, 1, 1, −1, −1), (−1, 1, 1, 1, −1, −1,−1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (1, −1,−1, 1, 1, −1, −1, 1), (1, 1, 1, 1, 1, 1, 1, 1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1,−1, 1, 1, −1)}, {(−1, 1, −1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, 1,−1, 1, 1, 1, −1, −1), (−1, 1, 1, 1, −1, −1, −1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, 1, −1, 1, 1, 1, −1, −1), (−1, 1, 1, 1, −1, −1,−1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (1, −1,−1, 1, 1, −1, −1, 1), (1, 1, 1, 1, 1, 1, 1, 1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, 1,−1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, 1, −1, 1, 1, 1, −1, −1), (1, −1, −1, −1, 1, 1, 1, −1), (1, 1, −1, −1,−1, 1, −1, 1), (1, 1, 1, −1, 1, −1, −1, −1), (−1, −1, 1, −1, 1, 1, −1, 1), (−1, 1, −1, −1, 1, −1, 1, 1), (1, −1, −1, 1, 1, −1, −1, 1), (1, 1, 1, 1, 1, 1, 1, 1)}, {(−1, 1, −1, 1, 1, 1, −1, −1), (1,−1, −1, −1, 1, 1, 1, −1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1,−1), (1, −1, −1, 1, 1, −1, −1, 1), (1, 1, 1, 1, 1, 1, 1, 1)}, {(−1, 1, −1, 1, 1, 1, −1, −1), (1, −1, −1, −1, 1, 1, 1, −1), (1, 1, −1, −1,−1, 1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1, −1, 1, 1, −1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1,−1, −1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (−1, 1, −1, −1, 1,−1, 1, 1), (1, 1, −1, 1, −1, −1, 1, −1), (−1, 1, 1, −1, −1, 1, 1, −1), (1, 1, 1, 1, 1, 1, 1, 1)}, {(−1, 1, −1, 1, 1, 1, −1, −1), (1, −1,−1, −1, 1, 1, 1, −1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (1, −1, −1, 1, 1, −1, −1, 1), (1, 1, 1, 1, 1, 1, 1, 1)}, {(−1, 1, −1, 1, 1, 1, −1, −1), (1, −1, −1, −1, 1, 1, 1, −1), (1, 1, −1, −1, −1, 1,−1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1, −1, 1, 1, −1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1,−1, −1, −1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, 1, −1, 1, 1, 1, −1, −1), (1, −1, −1, −1, 1, 1, 1, −1), (1, 1, −1, −1, −1, 1, −1, 1), (1, 1, 1, −1, 1, −1, −1, −1), (1, −1, 1, 1,−1, 1, −1, −1), (1, 1, −1, 1, −1, −1, 1, −1), (−1, 1, 1, −1, −1, 1, 1, −1), (1, 1, 1, 1, 1, 1, 1, 1)}, {(−1, 1, −1, 1, 1, 1, −1, −1), (1,−1, −1, −1, 1, 1, 1, −1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1,−1), (1, −1, −1, 1, 1, −1, −1, 1), (1, 1, 1, 1, 1, 1, 1, 1)}, {(−1, 1, −1, 1, 1, 1, −1, −1), (1, −1, 1, −1, 1, 1, −1, −1), (1, 1, −1, −1,−1, 1, −1, 1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (−1, 1, 1, −1, −1, 1, 1, −1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1,−1, 1, −1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1, −1, −1, 1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1, −1, 1, −1), (−1, −1, −1,−1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(−1, 1, −1, 1, 1, 1, −1, −1), (1,−1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1,−1, 1), (1, −1, −1, 1, 1, −1, −1, 1), (1, 1, 1, 1, 1, 1, 1, 1)}, {(−1, 1, −1, 1, 1, 1, −1, −1), (1, −1, 1, −1, 1, 1, −1, −1), (1, 1, −1,−1, −1, 1, −1, 1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1,−1), (−1, 1, 1, −1, −1, 1, 1, −1)}, {(−1, 1, −1, 1, 1, 1, −1, −1), (1, −1, 1, −1, 1, 1, −1, −1), (1, 1, −1, −1, −1, 1, −1, 1), (1, 1, −1,−1, 1, −1, 1, −1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1,−1, 1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1, −1, 1, −1), (−1, −1,−1, −1, 1, 1, 1, 1), (1, −1, −1, 1, −1, 1, 1, −1), (−1, 1, 1, −1, −1, 1, 1, −1), (1, 1, 1, 1, 1, 1, 1, 1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1), (1, −1, −1, 1,−1, 1, 1, −1), (1, −1, −1, 1, 1, −1, −1, 1), (1, 1, 1, 1, 1, 1, 1, 1)}, {(−1, 1, −1, 1, 1, 1, −1, −1), (1, −1, 1, −1, 1, 1, −1, −1), (1, 1,−1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1,−1, −1), (−1, 1, 1, −1, −1, 1, 1, −1)}, {(−1, 1, −1, 1, 1, 1, −1, −1), (1, −1, 1, −1, 1, 1, −1, −1), (1, 1, −1, −1, −1, 1, −1, 1), (1, 1,−1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1,−1, 1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(−1, 1, −1, 1, 1, 1, −1,−1), (1, −1, 1, −1, 1, 1, −1, −1), (1, 1, −1, −1, −1, 1, −1, 1), (1, 1, −1, −1, 1, −1, 1, −1), (−1, 1, 1, −1, 1, −1, −1, 1), (1, 1, 1, 1,−1, −1, −1, −1), (1, −1, −1, 1, 1, −1, −1, 1), (1, 1, 1, 1, 1, 1, 1, 1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (−1, −1, −1, −1,−1, −1, −1, −1), (−1, 1, 1, −1, −1, 1, 1, −1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (1, −1,−1, 1, 1, −1, −1, 1)}, {(−1, 1, −1, 1, 1, 1, −1, −1), (1, −1, 1, −1, 1, 1, −1, −1), (1, 1, −1, −1, −1, 1, −1, 1), (1, 1, −1, −1, 1, −1, 1,−1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(−1, 1,−1, 1, 1, 1, −1, −1), (1, −1, 1, −1, 1, 1, −1, −1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (1, −1, −1, 1, 1, −1, −1, 1), (1, 1, 1, 1, 1, 1, 1, 1)}, {(−1, 1, 1, −1, −1, 1, −1, 1), (−1, 1, 1, −1, 1,−1, 1, −1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1,−1, −1, −1, −1, −1, −1), (−1, −1, 1, 1, −1, −1, 1, 1)}, {(−1, 1, 1, −1, −1, 1, −1, 1), (−1, 1, 1, −1, 1, −1, 1, −1), (1, −1, 1, −1,−1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(−1, 1, 1, −1, −1, 1, −1, 1), (−1, 1, 1, −1, 1, −1, 1, −1), (1, −1, 1, −1, −1, 1, 1, −1), (1, −1, 1,−1, 1, −1, −1, 1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, 1, −1, −1, 1, −1, 1), (−1, 1, 1, −1, 1, −1, 1, −1), (1, −1, 1, −1, −1, 1, 1, −1), (1, −1, 1, −1, 1, −1, −1, 1), (−1, −1, −1,−1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, 1, −1, −1, 1, −1, 1), (−1, 1, 1, −1, 1, −1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1,−1, 1, 1), (−1, −1, −1, −1, −1, −1, −1, −1), (−1, −1, 1, 1, −1, −1, 1, 1)}, {(−1, 1, 1, −1, −1, 1, −1, 1), (−1, 1, 1, −1, 1, −1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (−1, −1, −1, −1,−1, −1, −1, −1), (1, 1, −1, −1, 1, 1, −1, −1)}, {(−1, 1, 1, −1, −1, 1, −1, 1), (−1, 1, 1, −1, 1, −1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, 1, −1, −1, 1, −1, 1), (−1, 1, 1, −1, 1, −1, 1, −1), (1, −1, 1, −1, −1, 1, 1, −1), (1, −1, 1, −1, 1, −1,−1, 1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, 1,−1, −1, 1, −1, 1), (−1, 1, 1, −1, 1, −1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1, −1, −1, 1, 1)}, {(−1, 1, 1, −1, −1, 1, −1, 1), (−1, 1, 1,−1, 1, −1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, 1, −1, −1, 1, −1, 1), (−1, 1, 1, −1, 1, −1, 1, −1), (1, −1, 1, −1,−1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, 1, −1, −1, 1, −1, 1), (−1, 1, 1, −1, 1, −1, 1, −1), (1, −1, 1, −1, −1, 1, 1, −1), (1, −1, 1, −1, 1, −1,−1, 1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, 1,−1, −1, 1, −1, 1), (−1, 1, 1, −1, 1, −1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1, −1, −1, 1, 1)}, {(−1, 1, 1, −1, −1, 1, −1, 1), (−1, 1, 1,−1, 1, −1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1, 1, −1, −1, 1, −1, 1), (−1, 1, 1, −1, 1, −1, 1, −1), (1, −1, 1, −1,−1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, 1, −1, −1, 1, −1, 1), (−1, 1, 1, −1, 1, −1, 1, −1), (1, −1, 1, −1, −1, 1, 1, −1), (1, −1, 1, −1, 1, −1,−1, 1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, 1,−1, −1, 1, −1, 1), (1, −1, −1, 1, −1, 1, −1, 1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (−1, −1, 1, 1, −1, −1, 1, 1)}, {(−1, 1, 1, −1, −1, 1, −1, 1), (1, −1, −1, 1,−1, 1, −1, 1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (−1,−1, −1, −1, −1, −1, −1, −1), (1, 1, −1, −1, 1, 1, −1, −1)}, {(−1, 1, 1, −1, −1, 1, −1, 1), (1, −1, −1, 1, −1, 1, −1, 1), (1, −1, 1, −1,−1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, 1, −1, −1, 1, −1, 1), (1, −1, −1, 1, −1, 1, −1, 1), (1, −1, 1, −1, −1, 1, 1, −1), (1, −1, 1, −1, 1, −1,−1, 1), (−1, −1, −1, −1, 1, 1, 1, 1), (−1, −1, 1, 1, 1, 1, −1, −1), (1, 1, −1, −1, 1, 1, −1, −1), (1, 1, 1, 1, 1, 1, 1, 1)}, {(−1, 1, 1,−1, −1, 1, −1, 1), (1, −1, −1, 1, −1, 1, −1, 1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1, −1, −1, 1, 1)}, {(−1, 1, 1, −1, −1, 1, −1, 1), (1, −1,−1, 1, −1, 1, −1, 1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1, 1, −1, −1, 1, −1, 1), (1, −1, −1, 1, −1, 1, −1, 1), (1, −1, 1,−1, −1, 1, 1, −1), (1, −1, 1, −1, 1, −1, −1, 1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, 1, −1, −1, 1, −1, 1), (1, −1, −1, 1, −1, 1, −1, 1), (1, −1, 1, −1, −1, 1, 1, −1), (1, −1, 1, −1, 1, −1,−1, 1), (−1, −1, −1, −1, 1, 1, 1, 1), (1, 1, −1, −1, −1, −1, 1, 1), (1, 1, −1, −1, 1, 1, −1, −1), (1, 1, 1, 1, 1, 1, 1, 1)}, {(−1, 1, 1,−1, −1, 1, −1, 1), (1, −1, −1, 1, −1, 1, −1, 1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1, −1, −1, 1, 1)}, {(−1, 1, 1, −1, −1, 1, −1, 1), (1, −1,−1, 1, −1, 1, −1, 1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, 1, −1, −1, 1, −1, 1), (1, −1, −1, 1, −1, 1, −1, 1), (1, −1, 1,−1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, 1, −1, −1, 1, −1, 1), (1, −1, −1, 1, −1, 1, −1, 1), (1, −1, 1, −1, −1, 1, 1, −1), (1, −1, 1, −1, 1, −1,−1, 1), (−1, −1, 1, 1, 1, 1, −1, −1), (1, 1, 1, 1, −1, −1, −1, −1), (1, 1, −1, −1, 1, 1, −1, −1), (1, 1, 1, 1, 1, 1, 1, 1)}, {(−1, 1, 1,−1, −1, 1, −1, 1), (1, −1, −1, 1, −1, 1, −1, 1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1, −1, −1, 1, 1)}, {(−1, 1, 1, −1, −1, 1, −1, 1), (1, −1,−1, 1, −1, 1, −1, 1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1, 1, −1, −1, 1, −1, 1), (1, −1, −1, 1, −1, 1, −1, 1), (1, −1, 1,−1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, 1, −1, −1, 1, −1, 1), (1, −1, −1, 1, −1, 1, −1, 1), (1, −1, 1, −1, −1, 1, 1, −1), (1, −1, 1, −1, 1, −1,−1, 1), (1, 1, −1, −1, −1, −1, 1, 1), (1, 1, 1, 1, −1, −1, −1, −1), (1, 1, −1, −1, 1, 1, −1, −1), (1, 1, 1, 1, 1, 1, 1, 1)}, {(−1, 1, 1,−1, −1, 1, −1, 1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1, −1), (−1, −1, 1, 1, −1, −1, 1, 1)}, {(−1, 1, 1, −1, −1, 1, −1, 1), (1, −1, 1,−1, 1, −1, −1, 1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1, −1), (1, 1, −1, −1, 1, 1, −1, −1)}, {(−1, 1, 1, −1, −1, 1, −1, 1), (1, −1, 1, −1, 1, −1, −1, 1), (1, 1, −1, 1,−1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(−1, 1, 1, −1, −1, 1, −1, 1), (1, −1, 1, −1, 1, −1, −1, 1), (1, 1, −1, 1, −1, −1, −1, 1), (1, 1, 1, −1, −1,−1, 1, −1), (−1, 1, −1, −1, 1, −1, 1, 1), (−1, 1, 1, 1, 1, −1, −1, −1), (1, 1, −1, −1, 1, 1, −1, −1), (1, 1, 1, 1, 1, 1, 1, 1)}, {(−1, 1, 1, −1, −1, 1, −1, 1), (1, −1, 1, −1, 1, −1, −1, 1), (1, 1, −1, 1, −1, −1, −1, 1), (1, 1, 1, −1, −1, −1, 1, −1), (−1, 1, −1, −1, 1,−1, 1, 1), (1, −1, −1, −1, −1, 1, 1, 1), (−1, −1, −1, −1, −1, −1, −1, −1), (−1, −1, 1, 1, −1, −1, 1, 1)}, {(−1, 1, 1, −1, −1, 1, −1, 1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1), (1, −1, −1, −1,−1, 1, 1, 1), (−1, −1, −1, −1, −1, −1, −1, −1), (1, 1, −1, −1, 1, 1, −1, −1)}, {(−1, 1, 1, −1, −1, 1, −1, 1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, 1, 1, −1,−1, 1, 1), (1, 1, 1, 1, 1, 1, 1, 1)}, {(−1, 1, 1, −1, −1, 1, −1, 1), (1, −1, 1, −1, 1, −1, −1, 1), (1, 1, −1, 1, −1, −1, −1, 1), (1, 1, 1,−1, −1, −1, 1, −1), (−1, 1, −1, −1, 1, −1, 1, 1), (1, −1, −1, −1, −1, 1, 1, 1), (1, 1, −1, −1, 1, 1, −1, −1), (1, 1, 1, 1, 1, 1, 1, 1)}, {(−1, 1, 1, −1, −1, 1, −1, 1), (1, −1, 1, −1, 1, −1, −1, 1), (1, 1, −1, 1, −1, −1, −1, 1), (1, 1, 1, −1, −1, −1, 1, −1), (−1, 1, 1, 1, 1, −1,−1, −1), (1, −1, 1, 1, −1, 1, −1, −1), (−1, −1, −1, −1, −1, −1, −1, −1), (−1, −1, 1, 1, −1, −1, 1, 1)}, {(−1, 1, 1, −1, −1, 1, −1, 1), (1, −1, 1, −1, 1, −1, −1, 1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1,−1, −1), (−1, −1, −1, −1, −1, −1, −1, −1), (1, 1, −1, −1, 1, 1, −1, −1)}, {(−1, 1, 1, −1, −1, 1, −1, 1), (1, −1, 1, −1, 1, −1, −1, 1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, 1, 1, −1,−1, 1, 1), (1, 1, 1, 1, 1, 1, 1, 1)}, {(−1, 1, 1, −1, −1, 1, −1, 1), (1, −1, 1, −1, 1, −1, −1, 1), (1, 1, −1, 1, −1, −1, −1, 1), (1, 1, 1,−1, −1, −1, 1, −1), (−1, 1, 1, 1, 1, −1, −1, −1), (1, −1, 1, 1, −1, 1, −1, −1), (1, 1, −1, −1, 1, 1, −1, −1), (1, 1, 1, 1, 1, 1, 1, 1)}, {(1, −1, −1, 1, −1, 1, −1, 1, −1, 1), (1, −1, 1, −1, 1, −1, −1, 1, −1), (1, −1, 1, −1, −1, 1, 1, −1), (1, −1, 1, −1, −1, 1, −1, −1, 1), (1, −1, 1, 1, 1, −1, −1, −1), (−1, −1,−1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(−1, 1, 1, −1, 1,−1, 1, −1), (−1, 1, 1, 1, −1, 1, −1, −1), (1, −1, 1, −1, −1, 1, 1, −1), (1, −1, 1, 1, 1, −1, −1, −1), (−1, −1, −1, 1, 1, 1, 1, −1), (−1,−1, 1, −1, 1, 1, −1, 1), (−1, −1, −1, −1, −1, −1, −1, −1), (1, 1, −1, −1, 1, 1, −1, −1)}, {(−1, 1, 1, −1, 1, −1, 1, −1), (−1, 1, 1, 1,−1, 1, −1, −1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1,−1, 1, 1, −1, −1, 1, 1), (1, 1, 1, 1, 1, 1, 1, 1)}, {(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1,−1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)}, {(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1, −1, −1), (−1, −1,−1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, 1, −1, 1,−1, 1, −1), (−1, 1, 1, 1, −1, 1, −1, −1), (1, −1, 1, −1, −1, 1, 1, −1), (1, −1, 1, 1, 1, −1, −1, −1), (−1, −1, −1, 1, 1, 1, 1, −1), (1, 1,−1, 1, −1, −1, 1, −1), (−1, −1, 1, 1, −1, −1, 1, 1), (1, 1, 1, 1, 1, 1, 1, 1)}, {(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (1, 1, −1, −1, 1, 1,−1, −1), (1, 1, 1, 1, 1, 1, 1, 1)}, {(−1, 1, 1, −1, 1, −1, 1, −1), (−1, 1, 1, 1, −1, 1, −1, −1), (1, −1, 1, −1, −1, 1, 1, −1), (1,−1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1,−1, 1, 1)}, {(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1, −1, −1), (−1,−1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, 1, −1, 1,−1, 1, −1), (−1, 1, 1, 1, −1, 1, −1, −1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, 1, −1, 1, −1, 1, −1), (−1, 1, 1, 1, −1, 1,−1, −1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (1, 1, −1,−1, 1, 1, −1, −1), (1, 1, 1, 1, 1, 1, 1, 1)}, {(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,−1, −1, 1, 1)}, {(−1, 1, 1, −1, 1, −1, 1, −1), (−1, 1, 1, 1, −1, 1, −1, −1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, 1,−1, 1, −1, 1, −1), (−1, 1, 1, 1, −1, 1, −1, −1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, 1, −1, 1, −1, 1, −1), (−1, 1, 1, 1, −1, 1,−1, −1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (1, 1, −1,−1, 1, 1, −1, −1), (1, 1, 1, 1, 1, 1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1,−1, −1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (1, 1, −1, −1, 1, 1, −1, −1)}, {(−1, 1, 1,−1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, 1, −1, 1, −1, 1, −1), (1, −1, −1, −1, 1,−1, 1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (1, 1,−1, −1, 1, 1, −1, −1), (1, 1, 1, 1, 1, 1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1,−1, −1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(−1, 1, 1,−1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, 1, −1, 1, −1, 1, −1), (1, −1, −1, −1, 1,−1, 1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (1, 1,−1, −1, 1, 1, −1, −1), (1, 1, 1, 1, 1, 1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1,−1, −1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(−1, 1, 1,−1, 1, −1, 1, −1), (1, −1, −1, −1, 1, −1, 1, 1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (−1, −1, 1, 1, −1, −1, 1, 1), (1, 1, 1, 1, 1, 1, 1, 1)}, {(−1, 1, 1, −1, 1, −1, 1, −1), (1, −1, −1, −1, 1,−1, 1, 1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (1, 1,−1, −1, 1, 1, −1, −1), (1, 1, 1, 1, 1, 1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1,−1, −1, 1, 1)}, {(−1, 1, 1, −1, 1, −1, 1, −1), (1, −1, −1, −1, 1, −1, 1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(−1, 1, 1,−1, 1, −1, 1, −1), (1, −1, −1, −1, 1, −1, 1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (−1, −1, 1, 1, −1, −1, 1, 1), (1, 1, 1, 1, 1, 1, 1, 1)}, {(−1, 1, 1, −1, 1, −1, 1, −1), (1, −1, −1, −1, 1,−1, 1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (1, 1,−1, −1, 1, 1, −1, −1), (1, 1, 1, 1, 1, 1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (−1, −1, 1, 1,−1, −1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(−1, 1, 1,−1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1, 1, 1, −1, −1, 1, 1), (1, 1, 1, 1, 1, 1, 1, 1)}, {(−1, 1, 1, −1, 1, −1, 1, −1), (1, −1, −1, 1, 1, −1, 1,−1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (1, 1, −1,−1, 1, 1, −1, −1), (1, 1, 1, 1, 1, 1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1,−1, −1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(−1, 1, 1,−1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(−1, 1, 1, −1, 1, −1, 1, −1), (1, −1, −1, 1, 1,−1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (1, 1,−1, −1, 1, 1, −1, −1), (1, 1, 1, 1, 1, 1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1,−1, −1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(−1, 1, 1,−1, 1, −1, 1, −1), (1, −1, −1, 1, 1, −1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(−1, 1, 1, −1, 1, −1, 1, −1), (1, −1, −1, 1, 1,−1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (1, 1,−1, −1, 1, 1, −1, −1), (1, 1, 1, 1, 1, 1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1,−1, −1, 1, 1)}, {(−1, 1, 1, −1, 1, −1, 1, −1), (1, −1, −1, 1, 1, −1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(−1, 1, 1,−1, 1, −1, 1, −1), (1, −1, −1, 1, 1, −1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(−1, 1, 1, −1, 1, −1, 1, −1), (1, −1, −1, 1, 1,−1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (1, 1,−1, −1, 1, 1, −1, −1), (1, 1, 1, 1, 1, 1, 1, 1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(−1, 1, 1, 1,−1, −1, −1, 1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(−1, 1, 1, 1, −1, −1, −1, 1), (1, −1, 1, −1, −1,−1, 1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (1, −1,−1, 1, 1, −1, −1, 1), (1, 1, 1, 1, 1, 1, 1, 1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1,−1, 1, 1, −1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(−1, 1, 1, 1,−1, −1, −1, 1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (1,−1, 1, 1, −1, 1, −1, −1), (−1, 1, 1, −1, −1, 1, 1, −1), (1, 1, 1, 1, 1, 1, 1, 1)}, {(−1, 1, 1, 1, −1, −1, −1, 1), (1, −1, 1, −1, −1,−1, 1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (1, −1,−1, 1, 1, −1, −1, 1), (1, 1, 1, 1, 1, 1, 1, 1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1,−1, 1, 1, −1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(−1, 1, 1, 1,−1, −1, −1, 1), (1, −1, 1, −1, −1, −1, 1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(−1, 1, 1, 1, −1, −1, −1, 1), (1, −1, 1, −1, −1,−1, 1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (1, −1,−1, 1, 1, −1, −1, 1), (1, 1, 1, 1, 1, 1, 1, 1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1,−1, 1, 1, −1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(−1, 1, 1, 1, −1, −1, −1, 1), (1, −1, 1, −1, −1, −1, 1, 1), (1, 1, −1, −1, −1, 1, −1, 1), (1, 1, 1, −1, 1, −1, −1, −1), (1, −1, 1, 1, −1, 1,−1, −1), (1, 1, −1, 1, −1, −1, 1, −1), (−1, 1, 1, −1, −1, 1, 1, −1), (1, 1, 1, 1, 1, 1, 1, 1)}, {(−1, 1, 1, 1, −1, −1, −1, 1), (1, −1, 1,−1, −1, −1, 1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (1, −1, −1, 1, 1, −1, −1, 1), (1, 1, 1, 1, 1, 1, 1, 1)}, {(−1, 1, 1, 1, −1, −1, −1, 1), (1, −1, 1, 1, −1, −1, 1, −1), (1, 1, −1, 1, −1, 1,−1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1, −1, 1, 1, −1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1,−1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1,−1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1,−1, 1, −1), (1, −1, −1, 1, 1, −1, −1, 1), (1, 1, 1, 1, 1, 1, 1, 1)}, {(−1, 1, 1, 1, −1, −1, −1, 1), (1, −1, 1, 1, −1, −1, 1, −1), (1, 1,−1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1,−1, −1), (−1, 1, 1, −1, −1, 1, 1, −1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (1, −1,−1, 1, 1, −1, −1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1,−1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(−1, 1, 1, 1,−1, −1, −1, 1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (1,−1, 1, −1, −1, 1, −1, 1), (1, −1, −1, 1, 1, −1, −1, 1), (1, 1, 1, 1, 1, 1, 1, 1)}, {(−1, 1, 1, 1, −1, −1, −1, 1), (1, −1, 1, 1, −1, −1, 1,−1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (−1, −1, −1,−1, −1, −1, −1, −1), (−1, 1, 1, −1, −1, 1, 1, −1)}, {(−1, 1, 1, 1, −1, −1, −1, 1), (1, −1, 1, 1, −1, −1, 1, −1), (1, 1, −1, 1, −1, 1, −1,−1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (1, −1,−1, 1, 1, −1, −1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1,−1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(−1, 1, 1, 1,−1, −1, −1, 1), (1, −1, 1, 1, −1, −1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (1, −1, −1, 1, 1, −1, −1, 1), (1, 1, 1, 1, 1, 1, 1, 1)}, {(−1, 1, 1, 1, −1, −1, −1, 1), (1, −1, 1, 1, −1,−1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (−1, −1,−1, −1, −1, −1, −1, −1), (−1, 1, 1, −1, −1, 1, 1, −1)}, {(−1, 1, 1, 1, −1, −1, −1, 1), (1, −1, 1, 1, −1, −1, 1, −1), (1, 1, −1, 1, −1, 1,−1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (1,−1, −1, 1, 1, −1, −1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1,−1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(−1, 1, 1, 1, −1, −1, −1, 1), (1, −1, 1, 1, −1, −1, 1, −1), (1, 1, −1, 1, −1, 1, −1, −1), (1, 1, 1, −1, 1, −1, −1, −1), (1, −1, 1, −1, −1, 1,−1, 1), (1, 1, −1, −1, −1, −1, 1, 1), (1, −1, −1, 1, 1, −1, −1, 1), (1, 1, 1, 1, 1, 1, 1, 1)}, {(−1, 1, 1, 1, −1, 1, −1, −1), (1, −1,−1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(−1, 1, 1, 1, −1, 1, −1, −1), (1, −1, −1, 1, −1, 1, −1, 1), (1, −1, 1,−1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1, −1, −1, −1, −1, −1, −1,−1), (1, 1, −1, −1, 1, 1, −1, −1)}, {(−1, 1, 1, 1, −1, 1, −1, −1), (1, −1, −1, 1, −1, 1, −1, 1), (1, −1, 1, −1, −1, 1, 1, −1), (1,−1, 1, 1, 1, −1, −1, −1), (−1, −1, −1, 1, 1, 1, 1, −1), (−1, −1, 1, −1, 1, 1, −1, 1), (−1, −1, 1, 1, −1, −1, 1, 1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1,−1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1,−1, 1, −1), (−1, −1, −1, −1, −1, −1, −1, −1), (−1, −1, 1, 1, −1, −1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (−1, −1, −1, −1,−1, −1, −1, −1), (1, 1, −1, −1, 1, 1, −1, −1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (−1, −1, 1, 1, −1, −1, 1, 1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1,−1, −1), (−1, −1, −1, 1, 1, 1, 1, −1), (1, 1, −1, 1, −1, −1, 1, −1), (1, 1, −1, −1, 1, 1, −1, −1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (−1, −1, 1, −1, 1, 1,−1, 1), (1, 1, 1, −1, −1, −1, −1, 1), (−1, −1, −1, −1, −1, −1, −1, −1), (−1, −1, 1, 1, −1, −1, 1, 1)}, {(−1, 1, 1, 1, −1, 1, −1, −1), (1,−1, −1, 1, −1, 1, −1, 1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1,−1, 1), (−1, −1, −1, −1, −1, −1, −1, −1), (1, 1, −1, −1, 1, 1, −1, −1)}, {(−1, 1, 1, 1, −1, 1, −1, −1), (1, −1, −1, 1, −1, 1, −1, 1), (1,−1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (−1, −1, 1, 1, −1,−1, 1, 1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1,−1, 1, 1, 1, −1, −1, −1), (−1, −1, 1, −1, 1, 1, −1, 1), (1, 1, 1, −1, −1, −1, −1, 1), (1, 1, −1, −1, 1, 1, −1, −1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (1, 1, −1, 1, −1,−1, 1, −1), (1, 1, 1, −1, −1, −1, −1, 1), (−1, −1, −1, −1, −1, −1, −1, −1), (−1, −1, 1, 1, −1, −1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1,−1, −1, 1), (−1, −1, −1, −1, −1, −1, −1, −1), (1, 1, −1, −1, 1, 1, −1, −1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (−1, −1, 1, 1, −1,−1, 1, 1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (1, 1, −1, −1, 1, 1, −1, −1), (1, 1, 1, 1, 1, 1, 1, 1)}, {(−1, 1, 1, 1, −1, 1, −1, −1), (1, −1, −1, 1, −1, 1, −1, 1), (1, −1, 1, −1, −1, 1, 1, −1), (1,−1, 1, 1, 1, −1, −1, −1), (1, 1, −1, 1, −1, −1, −1, 1), (1, 1, 1, −1, −1, −1, 1, −1), (−1, 1, −1, 1, 1,−1, 1, −1), (−1, 1, 1, −1, 1, −1, −1, 1), (−1, −1, −1, −1, −1, −1, −1, −1), (−1, −1, 1, 1, −1, −1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1,−1, −1, 1), (−1, −1, −1, −1, −1, −1, −1, −1), (1, 1, −1, −1, 1, 1, −1, −1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, 1, 1, −1,−1, 1, 1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1,−1, −1, −1, 1, −1), (−1, 1, −1, 1, 1, −1, 1, −1), (−1, 1, 1, −1, 1, −1, −1, 1), (1, 1, −1, −1, 1, 1, −1, −1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1,−1, 1, −1), (1, −1, −1, 1, −1, 1, 1, −1), (−1, −1, −1, −1, −1, −1, −1, −1), (−1, −1, 1, 1, −1, −1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1,−1, 1, 1, −1), (−1, −1, −1, −1, −1, −1, −1, −1), (1, 1, −1, −1, 1, 1, −1, −1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, 1, 1, −1,−1, 1, 1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1,−1, −1, −1, 1, −1), (−1, 1, −1, 1, 1, −1, 1, −1), (1, −1, −1, 1, −1, 1, 1, −1), (1, 1, −1, −1, 1, 1, −1, −1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, 1, −1, 1, −1,−1, 1), (1, −1, 1, −1, −1, 1, −1, 1), (−1, −1, −1, −1, −1, −1, −1, −1), (−1, −1, 1, 1, −1, −1, 1, 1)}, {(−1, 1, 1, 1, −1, 1, −1, −1), (1,−1, 1, 1, 1, −1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1,−1, 1), (−1, −1, −1, −1, −1, −1, −1, −1), (1, 1, −1, −1, 1, 1, −1, −1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, 1, 1, −1,−1, 1, 1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1,−1, −1, −1, 1, −1), (−1, 1, 1, −1, 1, −1, −1, 1), (1, −1, 1, −1, −1, 1, −1, 1), (1, 1, −1, −1, 1, 1, −1, −1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (1, −1, −1, 1,−1, 1, 1, −1), (1, −1, 1, −1, −1, 1, −1, 1), (−1, −1, −1, −1, −1, −1, −1, −1), (−1, −1, 1, 1, −1, −1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1,−1, 1, −1, 1), (−1, −1, −1, −1, −1, −1, −1, −1), (1, 1, −1, −1, 1, 1, −1, −1)}, {(−1, 1, 1, 1, −1, 1, −1, −1), (1, −1, 1, 1, 1, −1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, 1, 1, −1,−1, 1, 1), (1, 1, 1, 1, 1, 1, 1, 1)}, {(−1, 1, 1, 1, −1, 1, −1, −1), (1, −1, 1, 1, 1, −1, −1, −1), (1, 1, −1, 1, −1, −1, −1, 1), (1, 1, 1,−1, −1, −1, 1, −1), (1, −1, −1, 1, −1, 1, 1, −1), (1, −1, 1, −1, −1, 1, −1, 1), (1, 1, −1, −1, 1, 1, −1, −1), (1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (−1, −1,−1, 1, 1, 1, 1, −1), (−1, −1, 1, −1, 1, 1, −1, 1), (−1, −1, −1, −1, −1, −1, −1, −1), (−1, −1, 1, 1, −1, −1, 1, 1)}, {(1, −1, −1, −1, 1,−1, 1, 1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (−1,−1, 1, −1, 1, 1, −1, 1), (−1, −1, −1, −1, −1, −1, −1, −1), (1, 1, −1, −1, 1, 1, −1, −1)}, {(1, −1, −1, −1, 1, −1, 1, 1), (1, −1, −1, 1,−1, 1, −1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (−1,−1, 1, 1, −1, −1, 1, 1), (1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (−1, −1, 1, −1, 1, 1, −1, 1), (1, 1, −1, −1, 1, 1, −1, −1), (1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1,−1, −1), (−1, −1, −1, 1, 1, 1, 1, −1), (1, 1, −1, 1, −1, −1, 1, −1), (−1, −1, −1, −1, −1, −1, −1, −1), (−1, −1, 1, 1, −1, −1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (−1, −1,−1, 1, 1, 1, 1, −1), (1, 1, −1, 1, −1, −1, 1, −1), (−1, −1, −1, −1, −1, −1, −1, −1), (1, 1, −1, −1, 1, 1, −1, −1)}, {(1, −1, −1, −1, 1,−1, 1, 1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (1, 1,−1, 1, −1, −1, 1, −1), (−1, −1, 1, 1, −1, −1, 1, 1), (1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (−1, −1, −1, 1, 1, 1, 1, −1), (1, 1, −1, 1, −1, −1, 1, −1), (1, 1, −1, −1, 1, 1,−1, −1), (1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1), (1,−1, 1, 1, 1, −1, −1, −1), (−1, −1, 1, −1, 1, 1, −1, 1), (1, 1, 1, −1, −1, −1, −1, 1), (−1, −1, −1, −1, −1, −1, −1, −1), (−1, −1, 1, 1, −1,−1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (−1,−1, 1, −1, 1, 1, −1, 1), (1, 1, 1, −1, −1, −1, −1, 1), (−1, −1, −1, −1, −1, −1, −1, −1), (1, 1, −1, −1, 1, 1, −1, −1)}, {(1, −1, −1, −1, 1,−1, 1, 1), (1, −1, −1, 1, −1, 1, −1, 1), (1, −1, 1, −1, −1, 1, 1, −1), (1, −1, 1, 1, 1, −1, −1, −1), (−1, −1, 1, −1, 1, 1, −1, 1), (1, 1, 1,1, −1, −1, −1, 1), (−1, −1, 1, 1, −1, −1, 1, 1), (1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (−1, −1, 1, −1, 1, 1, −1, 1), (1, 1, 1, −1, −1, −1, −1, 1), (1, 1, −1, −1, 1, 1,−1, −1), (1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1), (1,−1, 1, 1, 1, −1, −1, −1), (1, 1, −1, 1, −1, −1, 1, −1), (1, 1, 1, −1, −1, −1, −1, 1), (−1, −1, −1, −1, −1, −1, −1, −1), (−1, −1, 1, 1, −1,−1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (1, 1,−1, 1, −1, −1, 1, −1), (1, 1, 1, −1, −1, −1, −1, 1), (−1, −1, −1, −1, −1, −1, −1, −1), (1, 1, −1, −1, 1, 1, −1, −1)}, {(1, −1, −1, −1, 1,−1, 1, 1), (1, −1, −1, 1, −1, 1, −1, 1), (1, −1, 1, −1, −1, 1, 1, −1), (1, −1, 1, 1, 1, −1, −1, −1), (1, 1, −1, 1, −1, −1, 1, −1), (1, 1, 1,−1, −1, −1, −1, 1), (−1, −1, 1, 1, −1, −1, 1, 1), (1, 1, 1, 1, 1, 1, 1, 1)}, {(1, −1, −1, −1, 1, −1, 1, 1), (1, −1, −1, 1, −1, 1, −1, 1), (1, −1, 1, −1, −1, 1, 1, −1), (1, −1, 1, 1, 1, −1, −1, −1), (1, 1, −1, 1, −1, −1, 1, −1), (1, 1, 1, −1, −1, −1, −1, 1), (1, 1, −1, −1, 1, 1,−1, −1), (1, 1, 1, 1, 1, 1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1,−1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (−1, −1, 1, 1, −1,−1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, −1, −1, −1, −1, −1, −1), (1, 1, −1, −1, 1, 1, −1, −1)}, {(1, −1, −1,−1, 1, −1, 1, 1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (−1, −1, 1, 1, −1, −1, 1, 1), (1, 1, 1, 1, 1, 1, 1, 1)}, {(1, −1, −1, −1, 1, −1, 1, 1), (1, −1, 1, 1, 1, −1, −1,−1), (1, 1, −1, 1, −1, −1, −1, 1), (1, 1, 1, −1, −1, −1, 1, −1), (−1, 1, −1, 1, 1, −1, 1, −1), (−1, 1, 1, −1, 1, −1, −1, 1), (1, 1, −1,−1, 1, 1, −1, −1), (1, 1, 1, 1, 1, 1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (−1, −1, 1, 1,−1, −1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, −1, −1, −1, −1, −1, −1), (1, 1, −1, −1, 1, 1, −1, −1)}, {(1, −1, −1,−1, 1, −1, 1, 1), (1, −1, 1, 1, 1, −1, −1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (−1, −1, 1, 1, −1, −1, 1, 1), (1, 1, 1, 1, 1, 1, 1, 1)}, {(1, −1, −1, −1, 1, −1, 1, 1), (1, −1, 1, 1, 1, −1,−1, −1), (1, 1, −1, 1, −1, −1, −1, 1), (1, 1, 1, −1, −1, −1, 1, −1), (−1, 1, −1, 1, 1, −1, 1, −1), (1, −1, −1, 1, −1, 1, 1, −1), (1, 1, −1,−1, 1, 1, −1, −1), (1, 1, 1, 1, 1, 1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (−1, −1, 1, 1,−1, −1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, −1, −1, −1, −1, −1, −1), (1, 1, −1, −1, 1, 1, −1, −1)}, {(1, −1, −1,−1, 1, −1, 1, 1), (1, −1, 1, 1, 1, −1, −1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (−1, −1, 1, 1, −1, −1, 1, 1), (1, 1, 1, 1, 1, 1, 1, 1)}, {(1, −1, −1, −1, 1, −1, 1, 1), (1, −1, 1, 1, 1, −1,−1, −1), (1, 1, −1, 1, −1, −1, −1, 1), (1, 1, 1, −1, −1, −1, 1, −1), (−1, 1, 1, −1, 1, −1, −1, 1), (1, −1, 1, −1, −1, 1, −1, 1), (1, 1, −1,−1, 1, 1, −1, −1), (1, 1, 1, 1, 1, 1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (−1, −1, 1, 1,−1, −1, 1, 1)}, {(1, −1, −1, −1, 1, −1, 1, 1), (1, −1, 1, 1, 1, −1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, −1, −1, −1, −1, −1, −1), (1, 1, −1, −1, 1, 1, −1, −1)}, {(1, −1, −1,−1, 1, −1, 1, 1), (1, −1, 1, 1, 1, −1, −1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (−1, −1, 1, 1, −1, −1, 1, 1), (1, 1, 1, 1, 1, 1, 1, 1)}, {(1, −1, −1, −1, 1, −1, 1, 1), (1, −1, 1, 1, 1, −1,−1, −1), (1, 1, −1, 1, −1, −1, −1, 1), (1, 1, 1, −1, −1, −1, 1, −1), (1, −1, −1, 1, −1, 1, 1, −1), (1, −1, 1, −1, −1, 1, −1, 1), (1, 1, −1,−1, 1, 1, −1, −1), (1, 1, 1, 1, 1, 1, 1, 1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (−1, 1, 1, −1,−1, 1, 1, −1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, −1, −1, −1, −1, −1, −1, −1), (1, −1, −1, 1, 1, −1, −1, 1)}, {(1, −1, −1,−1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (−1, 1, 1, −1, −1, 1, 1, −1), (1, 1, 1, 1, 1, 1, 1, 1)}, {(1, −1, −1, −1, 1, 1, 1, −1), (1, −1, 1, −1, −1,−1, 1, 1), (1, 1, −1, −1, −1, 1, −1, 1), (1, 1, 1, −1, 1, −1, −1, −1), (−1, −1, 1, −1, 1, 1, −1, 1), (−1, 1, −1, −1, 1, −1, 1, 1), (1, −1,−1, 1, 1, −1, −1, 1), (1, 1, 1, 1, 1, 1, 1, 1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (−1, 1, 1, −1,−1, 1, 1, −1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (−1, −1, −1, −1, −1, −1, −1, −1), (1, −1, −1, 1, 1, −1, −1, 1)}, {(1, −1, −1,−1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (−1, 1, 1, −1, −1, 1, 1, −1), (1, 1, 1, 1, 1, 1, 1, 1)}, {(1, −1, −1, −1, 1, 1, 1, −1), (1, −1, 1, −1, −1,−1, 1, 1), (1, 1, −1, −1, −1, 1, −1, 1), (1, 1, 1, −1, 1, −1, −1, −1), (−1, −1, 1, −1, 1, 1, −1, 1), (1, −1, 1, 1, −1, 1, −1, −1), (1, −1,−1, 1, 1, −1, −1, 1), (1, 1, 1, 1, 1, 1, 1, 1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (−1, 1, 1, −1,−1, 1, 1, −1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, −1, −1, −1, −1, −1, −1, −1), (1, −1, −1, 1, 1, −1, −1, 1)}, {(1, −1, −1,−1, 1, 1, 1, −1), (1, −1, 1, −1, −1, −1, 1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (−1, 1, 1, −1, −1, 1, 1, −1), (1, 1, 1, 1, 1, 1, 1, 1)}, {(1, −1, −1, −1, 1, 1, 1, −1), (1, −1, 1, −1, −1,−1, 1, 1), (1, 1, −1, −1, −1, 1, −1, 1), (1, 1, 1, −1, 1, −1, −1, −1), (−1, 1, −1, −1, 1, −1, 1, 1), (1, 1, −1, 1, −1, −1, 1, −1), (1, −1,−1, 1, 1, −1, −1, 1), (1, 1, 1, 1, 1, 1, 1, 1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (−1, 1, 1, −1,−1, 1, 1, −1)}, {(1, −1, −1, −1, 1, 1, 1, −1), (1, −1, 1, −1, −1, −1, 1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, −1, −1, −1, −1, −1, −1, −1), (1, −1, −1, 1, 1, −1, −1, 1)}, {(1, −1, −1,−1, 1, 1, 1, −1), (1, −1, 1, −1, −1, −1, 1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (−1, 1, 1, −1, −1, 1, 1, −1), (1, 1, 1, 1, 1, 1, 1, 1)}, {(1, −1, −1, −1, 1, 1, 1, −1), (1, −1, 1, −1, −1,−1, 1, 1), (1, 1, −1, −1, −1, 1, −1, 1), (1, 1, 1, −1, 1, −1, −1, −1), (1, −1, 1, 1, −1, 1, −1, −1), (1, 1, −1, 1, −1, −1, 1, −1), (1, −1,−1, 1, 1, −1, −1, 1), (1, 1, 1, 1, 1, 1, 1, 1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (−1, 1, 1, −1,−1, 1, 1, −1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, −1, −1, −1, −1, −1, −1, −1), (1, −1, −1, 1, 1, −1, −1, 1)}, {(1, −1, −1,−1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (−1, 1, 1, −1, −1, 1, 1, −1), (1, 1, 1, 1, 1, 1, 1, 1)}, {(1, −1, −1, −1, 1, 1, 1, −1), (1, −1, 1, 1, −1, −1, 1,−1), (1, 1, −1, 1, −1, 1, −1, −1), (1, 1, 1, −1, 1, −1, −1, −1), (−1, −1, 1, 1, 1, 1, −1, −1), (−1, 1, −1, 1, 1, −1, 1, −1), (1, −1,−1, 1, 1, −1, −1, 1), (1, 1, 1, 1, 1, 1, 1, 1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (−1, 1, 1, −1,−1, 1, 1, −1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, −1, −1, −1, −1, −1, −1, −1), (1, −1, −1, 1, 1, −1, −1, 1)}, {(1, −1, −1,−1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (−1, 1, 1, −1, −1, 1, 1, −1), (1, 1, 1, 1, 1, 1, 1, 1)}, {(1, −1, −1, −1, 1, 1, 1, −1), (1, −1, 1, 1, −1,−1, 1, −1), (1, 1, −1, 1, −1, 1, −1, −1), (1, 1, 1, −1, 1, −1, −1, −1), (−1, −1, 1, 1, 1, 1, −1, −1), (1, −1, 1, −1, −1, 1, −1, 1), (1, −1,−1, 1, 1, −1, −1, 1), (1, 1, 1, 1, 1, 1, 1, 1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (−1, 1, 1, −1,−1, 1, 1, −1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (−1, −1, −1, −1, −1, −1, −1, −1), (1, −1, −1, 1, 1, −1, −1, 1)}, {(1, −1, −1,−1, 1, 1, 1, −1), (1, −1, 1, 1, −1, −1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (−1, 1, 1, −1, −1, 1, 1, −1), (1, 1, 1, 1, 1, 1, 1, 1)}, {(1, −1, −1, −1, 1, 1, 1, −1), (1, −1, 1, 1, −1,−1, 1, −1), (1, 1, −1, 1, −1, 1, −1, −1), (1, 1, 1, −1, 1, −1, −1, −1), (−1, 1, −1, 1, 1, −1, 1, −1), (1, 1, −1, −1, −1, −1, 1, 1), (1, −1,−1, 1, 1, −1, −1, 1), (1, 1, 1, 1, 1, 1, 1, 1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (−1, 1, 1, −1,−1, 1, 1, −1)}, {(1, −1, −1, −1, 1, 1, 1, −1), (1, −1, 1, 1, −1, −1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (−1, −1, −1, −1, −1, −1, −1, −1), (1, −1, −1, 1, 1, −1, −1, 1)}, {(1, −1, −1,−1, 1, 1, 1, −1), (1, −1, 1, 1, −1, −1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (−1, 1, 1, −1, −1, 1, 1, −1), (1, 1, 1, 1, 1, 1, 1, 1)}, {(1, −1, −1, −1, 1, 1, 1, −1), (1, −1, 1, 1, −1,−1, 1, −1), (1, 1, −1, 1, −1, 1, −1, −1), (1, 1, 1, −1, 1, −1, −1, −1), (1, −1, 1, −1, −1, 1, −1, 1), (1, 1, −1, −1, −1, −1, 1, 1), (1, −1,−1, 1, 1, −1, −1, 1), (1, 1, 1, 1, 1, 1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (−1, −1, 1, 1,−1, −1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (−1, −1, −1, −1, −1, −1, −1, −1), (1, 1, −1, −1, 1, 1, −1, −1)}, {(1, −1, −1, 1,−1, 1, −1, 1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (−1,−1, 1, 1, 1, 1, −1, −1), (−1, −1, 1, 1, −1, −1, 1, 1), (1, 1, 1, 1, 1, 1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (−1, −1, 1, 1, 1, 1, −1, −1), (1, 1, −1, −1, 1, 1,−1, −1), (1, 1, 1, 1, 1, 1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1,−1, 1, −1, −1, 1), (−1, −1, −1, −1, 1, 1, 1, 1), (1, 1, −1, −1, −1, −1, 1, 1), (−1, −1, −1, −1, −1, −1, −1, −1), (−1, −1, 1, 1, −1,−1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1), (−1,−1, −1, −1, 1, 1, 1, 1), (1, 1, −1, −1, −1, −1, 1, 1), (−1, −1, −1, −1, −1, −1, −1, −1), (1, 1, −1, −1, 1, 1, −1, −1)}, {(1, −1, −1, 1,−1, 1, −1, 1), (1, −1, −1, 1, 1, −1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (−1, −1, 1, 1, −1, −1, 1, 1), (1, 1, 1, 1, 1, 1, 1, 1)}, {(1, −1, −1, 1, −1, 1, −1, 1), (1, −1, −1, 1, 1,−1, 1, −1), (1, −1, 1, −1, −1, 1, 1, −1), (1, −1, 1, −1, 1, −1, −1, 1), (−1, −1, −1, −1, 1, 1, 1, 1), (1, 1, −1, −1, −1, −1, 1, 1), (1, 1,−1, −1, 1, 1, −1, −1), (1, 1, 1, 1, 1, 1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (−1, −1, 1, 1,−1, −1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, −1, −1, −1, −1, −1, −1), (1, 1, −1, −1, 1, 1, −1, −1)}, {(1, −1, −1, 1,−1, 1, −1, 1), (1, −1, −1, 1, 1, −1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (−1, −1, 1, 1, −1, −1, 1, 1), (1, 1, 1, 1, 1, 1, 1, 1)}, {(1, −1, −1, 1, −1, 1, −1, 1), (1, −1, −1, 1, 1,−1, 1, −1), (1, −1, 1, −1, −1, 1, 1, −1), (1, −1, 1, −1, 1, −1, −1, 1), (−1, −1, 1, 1, 1, 1, −1, −1), (1, 1, 1, 1, −1, −1, −1, −1), (1, 1,−1, −1, 1, 1, −1, −1), (1, 1, 1, 1, 1, 1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (−1, −1, 1, 1,−1, −1, 1, 1)}, {(1, −1, −1, 1, −1, 1, −1, 1), (1, −1, −1, 1, 1, −1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, −1, −1, −1, −1, −1, −1), (1, 1, −1, −1, 1, 1, −1, −1)}, {(1, −1,−1, 1, −1, 1, −1, 1), (1, −1, −1, 1, 1, −1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (−1, −1, 1, 1, −1, −1, 1, 1), (1, 1, 1, 1, 1, 1, 1, 1)}, {(1, −1, −1, 1, −1, 1, −1, 1), (1, −1, −1, 1, 1,−1, 1, −1), (1, −1, 1, −1, −1, 1, 1, −1), (1, −1, 1, −1, 1, −1, −1, 1), (1, 1, −1, −1, −1, −1, 1, 1), (1, 1, 1, 1, −1, −1, −1, −1), (1, 1,−1, −1, 1, 1, −1, −1), (1, 1, 1, 1, 1, 1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1, −1), (−1, −1, 1, 1,−1, −1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, −1, −1, −1, −1, −1, −1), (1, 1, −1, −1, 1, 1, −1, −1)}, {(1, −1,−1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1), (−1, −1, 1, 1, −1, −1, 1, 1), (1, 1, 1, 1, 1, 1, 1, 1)}, {(1, −1, −1, 1, 1, −1, 1, −1), (1, −1, 1, −1, 1, −1,−1, 1), (1, 1, −1, 1, −1, −1, −1, 1), (1, 1, 1, −1, −1, −1, 1, −1), (−1, 1, −1, −1, 1, −1, 1, 1), (−1, 1, 1, 1, 1, −1, −1, −1), (1, 1, −1,−1, 1, 1, −1, −1), (1, 1, 1, 1, 1, 1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1), (1, −1, −1, −1, −1, 1, 1, 1, 1), (−1, −1, −1, −1, −1, −1, −1, −1), (−1, −1, 1, 1,−1, −1, 1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, −1, −1, −1, −1, −1, −1), (1, 1, −1, −1, 1, 1, −1, −1)}, {(1, −1,−1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, −1, −1, 1, −1, 1, 1), (1, −1, −1, −1, −1, 1, 1, 1), (−1, −1, 1, 1, −1, −1, 1, 1), (1, 1, 1, 1, 1, 1, 1, 1)}, {(1, −1, −1, 1, 1, −1, 1, −1), (1, −1, 1, −1, 1, −1,−1, 1), (1, 1, −1, 1, −1, −1, −1, 1), (1, 1, 1, −1, −1, −1, 1, −1), (−1, 1, −1, −1, 1, −1, 1, 1), (1, −1, −1, −1, −1, 1, 1, 1), (1, 1, −1,−1, 1, 1, −1, −1), (1, 1, 1, 1, 1, 1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1, −1), (−1, −1, 1, 1,−1, −1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, −1, −1, −1, −1, −1, −1), (1, 1, −1, −1, 1, 1, −1, −1)}, {(1, −1,−1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1, −1, −1), (−1, −1, 1, 1, −1, −1, 1, 1), (1, 1, 1, 1, 1, 1, 1, 1)}, {(1, −1, −1, 1, 1, −1, 1, −1), (1, −1, 1, −1, 1, −1,−1, 1), (1, 1, −1, 1, −1, −1, −1, 1), (1, 1, 1, −1, −1, −1, 1, −1), (−1, 1, 1, 1, 1, −1, −1, −1), (1, −1, 1, 1, −1, 1, −1, −1), (1, 1, −1,−1, 1, 1, −1, −1), (1, 1, 1, 1, 1, 1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1, −1), (−1, −1, 1, 1,−1, −1, 1, 1)}, {(1, −1, −1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, −1, −1, −1, −1, −1, −1), (1, 1, −1, −1, 1, 1, −1, −1)}, {(1, −1,−1, 1, 1, −1, 1, −1), (1, −1, 1, −1, 1, −1, −1, 1), (1, 1, −1, 1, −1, −1, −1, 1), (1, 1, 1, −1, −1, −1, 1, −1), (1, −1, −1, −1, −1, 1, 1, 1), (1, −1, 1, 1, −1, 1, −1, −1), (−1, −1, 1, 1, −1, −1, 1, 1), (1, 1, 1, 1, 1, 1, 1, 1)}, {(1, −1, −1, 1, 1, −1, 1, −1), (1, −1, 1, −1, 1, −1,−1, 1), (1, 1, −1, 1, −1, −1, −1, 1), (1, 1, 1, −1, −1, −1, 1, −1), (1, −1, −1, −1, −1, 1, 1, 1), (1, −1, 1, 1, −1, 1, −1, −1), (1, 1, −1,−1, 1, 1, −1, −1), (1, 1, 1, 1, 1, 1, 1, 1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (−1, 1, 1, −1,−1, 1, 1, −1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1, −1, 1), (−1, −1, −1, −1, −1, −1, −1, −1), (1, −1, −1, 1, 1, −1, −1, 1)}, {(1, −1, 1, −1,−1, −1, 1, 1), (1, −1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1, −1, 1), (−1, 1, 1, −1, −1, 1, 1, −1), (1, 1, 1, 1, 1, 1, 1, 1)}, {(1, −1, 1, −1, −1, −1, 1, 1), (1, −1, 1, −1, 1, 1, −1,−1), (1, 1, −1, −1, −1, 1, −1, 1), (1, 1, −1, −1, 1, −1, 1, −1), (−1, −1, −1, −1, 1, 1, 1, 1), (−1, 1, 1, −1, 1, −1, −1, 1), (1, −1,−1, 1, 1, −1, −1, 1), (1, 1, 1, 1, 1, 1, 1, 1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (−1, 1, 1, −1,−1, 1, 1, −1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1), (1, −1, −1, 1, −1, 1, 1, −1), (−1, −1, −1, −1, −1, −1, −1, −1), (1, −1, −1, 1, 1, −1, −1, 1)}, {(1, −1, 1, −1,−1, −1, 1, 1), (1, −1, 1, −1, 1, 1, −1, −1), (1, 1, −1, −1, −1, 1, −1, 1), (1, 1, −1, −1, 1, −1, 1, −1), (−1, −1, −1, −1, 1, 1, 1, 1), (1,−1, −1, 1, −1, 1, 1, −1), (−1, 1, 1, −1, −1, 1, 1, −1), (1, 1, 1, 1, 1, 1, 1, 1)}, {(1, −1, 1, −1, −1, −1, 1, 1), (1, −1, 1, −1, 1, 1, −1,−1), (1, 1, −1, −1, −1, 1, −1, 1), (1, 1, −1, −1, 1, −1, 1, −1), (−1, −1, −1, −1, 1, 1, 1, 1), (1, −1, −1, 1, −1, 1, 1, −1), (1, −1,−1, 1, 1, −1, −1, 1), (1, 1, 1, 1, 1, 1, 1, 1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (−1, 1, 1, −1,−1, 1, 1, −1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (−1, −1, −1, −1, −1, −1, −1, −1), (1, −1, −1, 1, 1, −1, −1, 1)}, {(1, −1, 1, −1,−1, −1, 1, 1), (1, −1, 1, −1, 1, 1, −1, −1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (−1, 1, 1, −1, −1, 1, 1, −1), (1, 1, 1, 1, 1, 1, 1, 1)}, {(1, −1, 1, −1, −1, −1, 1, 1), (1, −1, 1, −1, 1, 1,−1, −1), (1, 1, −1, −1, −1, 1, −1, 1), (1, 1, −1, −1, 1, −1, 1, −1), (−1, 1, 1, −1, 1, −1, −1, 1), (1, 1, 1, 1, −1, −1, −1, −1), (1, −1,−1, 1, 1, −1, −1, 1), (1, 1, 1, 1, 1, 1, 1, 1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (−1, 1, 1, −1,−1, 1, 1, −1)}, {(1, −1, 1, −1, −1, −1, 1, 1), (1, −1, 1, −1, 1, 1, −1, −1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (−1, −1, −1, −1, −1, −1, −1, −1), (1, −1, −1, 1, 1, −1, −1, 1)}, {(1, −1, 1,−1, −1, −1, 1, 1), (1, −1, 1, −1, 1, 1, −1, −1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (−1, 1, 1, −1, −1, 1, 1, −1), (1, 1, 1, 1, 1, 1, 1, 1)}, {(1, −1, 1, −1, −1, −1, 1, 1), (1, −1, 1, −1, 1, 1,−1, −1), (1, 1, −1, −1, −1, 1, −1, 1), (1, 1, −1, −1, 1, −1, 1, −1), (1, −1, −1, 1, −1, 1, 1, −1), (1, 1, 1, 1, −1, −1, −1, −1), (1, −1,−1, 1, 1, −1, −1, 1), (1, 1, 1, 1, 1, 1, 1, 1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (−1, 1, 1, −1,−1, 1, 1, −1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, −1, −1, −1, −1, −1, −1, −1), (1, −1, −1, 1, 1, −1, −1, 1)}, {(1, −1, 1,−1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (−1, 1, 1, −1, −1, 1, 1, −1), (1, 1, 1, 1, 1, 1, 1, 1)}, {(1, −1, 1, −1, 1, 1, −1, −1), (1, −1, 1, 1, −1, −1, 1,−1), (1, 1, −1, −1, 1, −1, 1, −1), (1, 1, −1, 1, −1, 1, −1, −1), (−1, −1, −1, 1, 1, 1, 1, −1), (−1, 1, 1, 1, 1, −1, −1, −1), (1, −1,−1, 1, 1, −1, −1, 1), (1, 1, 1, 1, 1, 1, 1, 1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (−1, 1, 1, −1,−1, 1, 1, −1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, −1, −1, −1, −1, −1, −1, −1), (1, −1, −1, 1, 1, −1, −1, 1)}, {(1, −1, 1,−1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (−1, 1, 1, −1, −1, 1, 1, −1), (1, 1, 1, 1, 1, 1, 1, 1)}, {(1, −1, 1, −1, 1, 1, −1, −1), (1, −1, 1, 1, −1,−1, 1, −1), (1, 1, −1, −1, 1, −1, 1, −1), (1, 1, −1, 1, −1, 1, −1, −1), (−1, −1, −1, 1, 1, 1, 1, −1), (1, −1, −1, −1, −1, 1, 1, 1), (1, −1,−1, 1, 1, −1, −1, 1), (1, 1, 1, 1, 1, 1, 1, 1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (−1, 1, 1, −1,−1, 1, 1, −1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, −1, −1, −1, −1, −1, −1, −1), (1, −1, −1, 1, 1, −1, −1, 1)}, {(1, −1, 1,−1, 1, 1, −1, −1), (1, −1, 1, 1, −1, −1, 1, −1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (−1, 1, 1, −1, −1, 1, 1, −1), (1, 1, 1, 1, 1, 1, 1, 1)}, {(1, −1, 1, −1, 1, 1, −1, −1), (1, −1, 1, 1, −1,−1, 1, −1), (1, 1, −1, −1, 1, −1, 1, −1), (1, 1, −1, 1, −1, 1, −1, −1), (−1, 1, 1, 1, 1, −1, −1, −1), (1, 1, 1, −1, −1, −1, −1, 1), (1, −1,−1, 1, 1, −1, −1, 1), (1, 1, 1, 1, 1, 1, 1, 1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (−1, 1, 1, −1,−1, 1, 1, −1)}, {(1, −1, 1, −1, 1, 1, −1, −1), (1, −1, 1, 1, −1, −1, 1, −1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (−1, −1, −1, −1, −1, −1, −1, −1), (1, −1, −1, 1, 1, −1, −1, 1)}, {(1, −1, 1,−1, 1, 1, −1, −1), (1, −1, 1, 1, −1, −1, 1, −1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (−1, 1, 1, −1, −1, 1, 1, −1), (1, 1, 1, 1, 1, 1, 1, 1)}, {(1, −1, 1, −1, 1, 1, −1, −1), (1, −1, 1, 1, −1,−1, 1, −1), (1, 1, −1, −1, 1, −1, 1, −1), (1, 1, −1, 1, −1, 1, −1, −1), (1, −1, −1, −1, −1, 1, 1, 1), (1, 1, 1, −1, −1, −1, −1, 1), (1, −1,−1, 1, 1, −1, −1, 1), (1, 1, 1, 1, 1, 1, 1, 1)} wherein, a set of values between a pair of round brackets represents the code and the plurality of codes in between a pair of braces represents the set of codes.

* * * * *